US00RE45294E

(19) United States
(12) Reissued Patent
Grill et al.

(10) Patent Number: US RE45,294 E
(45) Date of Reissued Patent: Dec. 16, 2014

(54) ANALYSIS FILTERBANK, SYNTHESIS FILTERBANK, ENCODER, DE-CODER, MIXER AND CONFERENCING SYSTEM

(71) Applicant: Fraunhofer-Gesellschaft zur Foerderung der angewandten Forschung e.V., Munich (DE)

(72) Inventors: Bernhard Grill, Lauf (DE); Markus Schnell, Nuremberg (DE); Ralf Geiger, Erlangen (DE); Gerald Schuller, Erfurt (DE)

(73) Assignee: Fraunhofer-Gesellschaft zur Foerderung der angewandten Forschung e.V., Munich (DE)

(21) Appl. No.: 14/052,689

(22) Filed: Oct. 11, 2013

Related U.S. Patent Documents

Reissue of:
(64) Patent No.: 8,036,903
Issued: Oct. 11, 2011
Appl. No.: 11/744,641
Filed: May 4, 2007

U.S. Applications:
(60) Provisional application No. 60/862,032, filed on Oct. 18, 2006.

(51) Int. Cl.
*G10L 19/00* (2013.01)

(52) U.S. Cl.
USPC ..... 704/500; 704/205

(58) Field of Classification Search
None
See application file for complete search history.

(56) References Cited

U.S. PATENT DOCUMENTS 5,297,236 A * 3/1994 Antill et al. ..... 704/203
5,394,473 A * 2/1995 Davidson ..... 704/200.1
5,570,363 A 10/1996 Holm
5,606,642 A * 2/1997 Stautner et al. ..... 704/205
5,848,391 A * 12/1998 Bosi et al. ..... 704/200.1

(Continued)

FOREIGN PATENT DOCUMENTS

CA 2776988 8/2004
EP 0602653 A2 6/1994

(Continued)

OTHER PUBLICATIONS

"Coding of Speech at 8 kbit/s Using Conjugate-Structure Algebraic-Code-Excited Linear-Prediction (CS-ACELP)", ITU-T Recommendation G.729, General Aspects of Digital Transmission Systems, Mar. 1996, 40 pages.

(Continued)

*Primary Examiner* — Brian Albertalli
(74) *Attorney, Agent, or Firm* — Michael A. Glenn; Perkins Coie LLP

(57) ABSTRACT

An embodiment of an analysis filterbank for filtering a plurality of time domain input frames, wherein an input frame comprises a number of ordered input samples, comprises a windower configured to generate a plurality of windowed frames, wherein a windowed frame comprises a plurality of windowed samples, wherein the windower is configured to process the plurality of input frames in an overlapping manner using a sample advance value, wherein the sample advance value is less than the number of ordered input samples of an input frame divided by two, and a time/frequency converter configured to provide an output frame comprising a number of output values, wherein an output frame is a spectral representation of a windowed frame.

11 Claims, 25 Drawing Sheets

(56) References Cited

U.S. PATENT DOCUMENTS

| | | | | |
|---|---|---|---|---|
| 5,867,819 | A * | 2/1999 | Fukuchi et al. | 704/500 |
| 5,890,106 | A * | 3/1999 | Bosi-Goldberg | 704/203 |
| 5,946,352 | A * | 8/1999 | Rowlands et al. | 375/242 |
| 6,205,430 | B1 * | 3/2001 | Hui | 704/500 |
| 6,226,608 | B1 | 5/2001 | Fielder et al. | |
| 6,687,663 | B1 * | 2/2004 | McGrath et al. | 704/200.1 |
| 6,707,869 | B1 | 3/2004 | Zhang | |
| 6,982,377 | B2 * | 1/2006 | Sakurai et al. | 84/654 |
| 7,516,064 | B2 * | 4/2009 | Vinton et al. | 704/206 |
| 8,090,122 | B2 * | 1/2012 | Baumgarte | 381/107 |
| 2001/0027393 | A1 | 10/2001 | Touimi et al. | |
| 2003/0093282 | A1 | 5/2003 | Goodwin | |
| 2006/0269086 | A1 * | 11/2006 | Page et al. | 381/119 |

FOREIGN PATENT DOCUMENTS

| | | | |
|---|---|---|---|
| EP | 1160977 | A2 | 12/2001 |
| EP | 1285436 | B1 | 2/2003 |
| JP | 2000029498 | | 1/2000 |
| JP | 2001-127641 | | 5/2001 |
| JP | 2001134274 | | 5/2001 |
| JP | 2004184536 | | 7/2004 |
| JP | 2006-243664 | | 9/2006 |
| RU | 2251795 | C2 | 5/2005 |
| WO | WO-9802971 | A1 | 1/1998 |
| WO | WO-2006046546 | | 5/2006 |

OTHER PUBLICATIONS

"Method for the Subjective Assessment of Intermediate Sound Quality (MUSHRA)", International Telecommunication Union, ITU-R Recommendation BS; Geneva, Switzerland, 2001, 17 pages.

Benjelloun, Touimi A. et al., "A summation Algorithm for MPEG-1 coded audio signals: a first step towards audio processed domain un algorithme de sommation des signaux audio codes MPEG-1: Premiereetape Vers Le Traitment Audio Dans Le Domaine Compresse", Annales des telecommunications, Paris, France; vol. 55, No. 3/04; XP000948703, Mar. 1, 2000, pp. 108-116.

Bosi, Marina et al., "ISO/IEC MPEG-2 Advanced Audio Coding", 101st Audio Engineering Society Convention, Los Angeles, California, USA, Nov. 1996, 43 pages.

Daubechies, Ingrid et al., "Factoring Wavelet Transforms into Lifting Steps", Sep. 1996, pp. 1-26.

Dietz, Martin et al., "Spectral Band Replication, a Novel Approach in Audio Coding", 112th AES Convention, Munich, Germany, May 2002, 8 pages.

Ekstrand, Per , "Bandwidth extension of audio signals by spectral band replication", Proc. 1st IEEE Benelux Workshop on Model Based Processing and Coding of Audio, Leuven, Belgium, Nov. 15, 2002, pp. 53-58.

Gayer, Marc et al., "mplementing MPEG Advanced Audio Coding and Layer-3 Encoders on 32-Bit and 16-Bit Fixed Point Processors", 115th AES Convention, New York, USA, Oct. 2003, 8 pages.

Geiger, et al., "Audio Coding based on Integer Transforms", Audio Engineering Society, Convention Paper 5471, Presented at the 111th Convention, New York, USA, Sep. 21-24, 2001, 10 pages.

Geiger, et al., "Enhanced MPEG-4 Low Delay AAC—Low Bitrate High Quality Communication", Audio Engineering Society, Convention Paper 6998, Presented at the 122nd Convention, Vienna, Austria, May 5-8, 2007, 13 pages.

Hilpert, Johannes et al., "Real-Time Implementation of the MPEG-4 Low Delay Advanced Audio Coding Algorithm (AAC-LD) on Motorola DPSP56300", 108th AES Convention, Paris, France, Feb. 2000, 17 pages.

Lutzky, Manfred et al., "Structural Analysis of Low Latency Audio Coding Schemes", 119th AES Convention, New York, USA, Oct. 2005, 14 pages.

Nayebi, Kambiz et al., "Design of Low Delay FIR Analysis-Synthesis Filter Bank Systems", Proc. Conf. on Info. Sci. and Sys., Mar. 1991, pp. 233-238.

Nguyen, Truong Q. , "A Class of Generalized Cosine-Modulated Filter Bank", International Symposium on Circuits and Systems, San Diego, IEEE, 1992, pp. 943-946.

Princen, J.P. et al., "Subband/Transform Coding Using Filter Bank Designs Based on Time Domain Aliasing Cancellation", IEEE, 1987, pp. 2161-2164.

Schnell, Markus et al., "Delayless Mixing—on the benefits of MPEG-4 AAC-ELD in High Quality Communication Systems", 124th AES Convention, Amsterdam, The Netherlands; XP002548564, May 17, 2008, 10 pages.

Schnell, Markus et al., "Enhanced mpeg-4 Low Delay AAC—Low Bitrate High quality Communication", 122nd AES Convention, Vienna, Austria; XP040373327, May 5, 2007, 14 pages.

Schuller, Gerald et al., "A General Formulation for Modulated Perfect Reconstruction Filter Banks with Variable System Delay", NJIT 94 Symposium on Appl. of Subbands and Wavelets, Mar. 1994, 10 pages.

Schuller, Gerald et al., "Efficient Low Delay Filter Banks", DSP Workshop, Yosemite, California, Oct. 1994, 4 pages.

Schuller, Gerald D. et al., "Modulated Filter Banks with Arbitrary System Delay: Efficient Implementations and the Time-Varying Case", IEEE Transactions on Signal Processing, vol. 48, No. 3, Mar. 2000, pp. 737-748.

Schuller, Gerald D. et al., "New Framework for Modulated Perfect Reconstruction Filter Banks", IEEE Transactions on Signal Processing, vol. 44, No. 8, Aug. 1996, pp. 1941-1953.

M. Bosi, et al., "ISO/IEC MPEG-2 Advanced Audio Coding," Oct. 1997, J. Audio Eng. Soc., vol. 45, No. 10, pp. 789-813.

J. Hilpert, et al., "Real-Time Implementation of the MPEG-4 Low Delay Advanced Audio Coding Algorithm (AAC-LD) on Motorola DPSP56300," Feb. 2000, 108$^{th}$ AES Convention, Paris, France.

M. Dietz, et al., "Spectral Band Replication, a Novel Approach in Audio Coding," Apr. 2002, 112$^{th}$ AES Convention, Munich, Germany.

P. Ekstrand, "Bandwidth Extension of Audio Signals by Spectral Band Replication," Nov. 15, 2002, Proc. 1$^{st}$ IEEE Benelux Workshop on Model Based Processing and Coding of Audio, Leuven, Belgium.

J. Princen, et al., "Subband/Transform Coding Using Filter Bank Designs Based on Time Domain Aliasing Cancellation," 1987, ICASSP, pp. 2161-2164.

K. Nayebi, "Design of Low Delay FIR Analysis-Synthesis Filter Bank Systems," Mar. 1991, Proc. Conf. on Info. Sci. and Sys.

T.Q. Nguyen, "A Class of Generalized Cosine-Modulated Filter Bank," 1992, International Symposium on Circuits and Systems, San Diego, pp. 943-946.

Gerald Schuller, et al., "A General Formulation for Modulated Perfect Reconstruction Filter Banks with Variable System Delay," Mar. 1994, NJIT 94 Symposium on Appl. of Subbands and Wavelets.

Gerald Schuller, et al., "Efficient Low Delay Filter Banks," Oct. 1994, DSP Workshop, Yosemite, California.

Gerald D. T. Schuller, et al., "New Framework for Modulated Perfect Reconstruction Filter Banks," Aug. 1996, IEEE Transactions on Signal Processing, vol. 44, No. 8.

Gerald D. T. Schuller, et al., "Modulated Filter Banks with Arbitrary System Delay: Efficient Implementations and the Time-Varying Case," Mar. 2000, IEEE Transactions on Signal Processing, vol. 48, No. 3.

Manfred Lutzky, et al., "Structural Analysis of Low Latency Audio Coding Schemes," Oct. 2005, 119$^{th}$ AES Convention, New York, USA.

ITU-R Recommendation BS. 1543-1, "Method for the Subjective Assessment of Intermediate Sound Quality (MUSHRA)," 2001, International Telecommunication Union, Geneva, Switzerland.

I. Daubechies, et al., "Factoring Wavelet Transforms into Lifting Steps," 1996, Tech. Rep., Bell Laboratories, Lucent Technologies.

M. Gayer, et al., "Implementing MPEG Advanced Audio Coding and Layer-3 Encoders on 32-Bit and 16-Bit Fixed Point Processors," Oct. 2003, 115$^{th}$ AES Convention, New York, USA.

Benjelloun Touimi, A. et al.; "A summation Algorithm for MPEG-1 coded audio signals: A first step towards audio processed domain un algorithme de sommation des signaux audio codes MPEG-1: Premiereetape Vers Le Traitment Audio Dans Le Domaine Compresse", Mar. 1, 2000; Annales des telecommunications, get Lavoisier, Paris, FR, vol. 55, No. 3/04, pp. 108-116, XP000948703.

Geiger, Ralf et al.; "Utilizing AAC-ELD for delayless mixing in frequency domain", Apr. 18, 2007; Joint Video Team (JVT) of ISO/IEC MPEG & ITU-T VCEG (ISO/IEC JTC1/SC29/WG11 and ITU-T SG 16 Q6), No. M14516, San Jose, CA; XP030043153, whole document.

* cited by examiner

| Codec | Delay Source | delay [samples] | delay [ms] |
|---|---|---|---|
| AAC-LD + SBR | MDCT/IMDCT/ dualrate | $960 \cdot 2$ | 40 |
| | QMF | 577 | 12 |
| | SBR-Overlap | 384 | 8 |
| | | 2881 | 60 |
| AAC-ELD | low-delay filterbank/ dualrate | $720 \cdot 2$ | 30 |
| | QMF | 577 | 12 |
| | SBR-Overlap | 0 | - |
| | | 2017 | 42 |

Fig. 15

| M = 512 | | Instructions | |
|---|---|---|---|
| First modulation | $2 \cdot M$ | | 1024 |
| Complex FFT size | $M_2 = \frac{M}{2}$ | 256 | |
| Number of Bfys | $\frac{M_2}{2}$ | 128 | |
| Operations per Bfy | 6 | 6 | |
| Number of stages | $log2(M_2)$ | 8 | |
| Total $= 6 \cdot log2(M_2) \cdot \frac{M_2}{2}$ | | 6144 | 6144 |
| Second modulation | $2 \cdot M$ | | 1024 |
| Window and overlap-add | $2.75 \cdot M$ | | 1408 |
| Total | | | 9600 |

Fig. 20

| M = 512 | | Instructions | |
|---|---|---|---|
| First modulation | $2 \cdot M$ | | 1024 |
| Complex FFT size | $M_2 = \frac{M}{2}$ | 256 | |
| Number of Bfys | $\frac{M_2}{2}$ | 128 | |
| Operations per Bfy | 6 | 6 | |
| Number of stages | $log2(M_2)$ | 8 | |
| Total $= 6 \cdot log2(M_2) \cdot \frac{M_2}{2}$ | | 6144 | 6144 |
| Second modulation | $2 \cdot M$ | | 1024 |
| Window and overlap-add | $2 \cdot M$ | | 1024 |
| Total | | | 9216 |

Fig. 21

| M = | 1024 | | | | | Instructions |
|---|---|---|---|---|---|---|
| | | | | | | |
| first modulation | | | | 2*M | | 2048 |
| complex FFT of size | | | | M2 = M/2 | 512 | |
| | number of bfy | | | (M2/2) | 256 | |
| | operations per bfy | | | 6 | 6 | |
| | number of stages | | | log2(M2) | 9 | |
| | total = 6*log2(M2)(M2/2) | | | | 13824 | 13824 |
| second modulation | | | | 2*M | | 2048 |
| window and ovlp add | | | | 2*M | | 2048 |
| | | | | | | |
| Total | | | | | | 19968 |

Fig. 22

| Codec | frame length | working buffer | state buffer | sum [words] |
|---|---|---|---|---|
| AAC-LD | 512 | 512 | 256 | 768 |
| AAC-ELD | 512 | 512 | 256+512 | 1280 |
| AAC-LC | 1024 | 1024 | 512 | 1536 |

Fig. 23a

| Codec | frame length | window coefficients | sum [words] |
|---|---|---|---|
| AAC-LD | 512 | $2 \cdot 512$ | 1024 |
| AAC-ELD | 512 | $3 \cdot 512 - \frac{512}{4}$ | 1408 |
| AAC-LC | 1024 | $2 \cdot 1024 + 2 \cdot 128$ | 2304 |

Fig. 23b

| codec number | AOT | description | bitrate | sampling rate |
|---|---|---|---|---|
| | | | | |
| 1 | 0 | original | / | / |
| 2 | | 3.5 kHz anchor | / | / |
| 3 | | 7 kHz anchor | / | / |
| 4 | 23 | AAC LD | 32 kBit/s | 24 kHz |
| 5 | 23 | AAC LD | 48 kBit/s | 32 kHz |
| 6 | X + 5 | AAC LD + LDFB + LD SBR | 32 kBit/s | 48 / 24 kHz |
| 7 | X | AAC LD + LDFB | 48 kBit/s | 32 kHz |
| 8 | 23 + 5 | AAC LD + LD SBR | 32 kBit/s | 48 / 24 kHz |

Fig. 24

ANALYSIS FILTERBANK, SYNTHESIS FILTERBANK, ENCODER, DE-CODER, MIXER AND CONFERENCING SYSTEM

Matter enclosed in heavy brackets [ ] appears in the original patent but forms no part of this reissue specification; matter printed in italics indicates the additions made by reissue.

CROSS-REFERENCE TO RELATED APPLICATION

This application *is a reissue application of issued U.S. Pat. No. 8,036,903 which* claims priority of U.S. Provisional Patent Application No. 60/862,032, filed on Oct. 18, 2006, and is incorporated herein by reference in its entirety.

*More than one reissue application has been filed on Oct. 11, 2013 for the reissue of U.S. Pat. No. 8,036,903. The reissue applications are application Ser. Nos. 14/052,686, 14/052,689 (the present application), Ser. Nos. 14/052,690, 14/052,694, and 14/052,697, all of which are divisional reissues of U.S. Pat. No. 8,036,903.*

BACKGROUND

The present invention relates to an analysis filterbank, a synthesis filterbank and systems comprising any of the aforementioned filterbanks, which can, for instance, be implemented in the field of modern audio encoding, audio decoding or other audio transmission-related applications. Moreover, the present invention also relates to a mixer and a conferencing system.

Modern digital audio processing is typically based on coding schemes which enable a significant reduction in terms of bitrates, transmission bandwidths and storage space, compared to a direct transmission or storage of the respective audio data. This is achieved by encoding the audio data on the sender site and decoding the encoded data on the receiver site before, for instance, providing the decoded audio data to a listener.

Such digital audio processing systems can be implemented with respect to a wide range of parameters comprising a typical storage space for a typical potentially standardized stream of audio data, bitrates, computational complexity especially in terms of an efficiency of an implementation, achievable qualities suitable for different applications and in terms of the delay caused during both, the encoding and the decoding of the audio data and the encoded audio data, respectively. In other words, digital audio systems can be applied in many different fields of applications ranging from an ultra-low quality transmission to a high-end-transmission and storage of audio data (e.g. for a high-quality music listening experience).

However, in many cases compromises may have to be taken in terms of the different parameters such as the bitrate, the computational complexity, quality and delay. For instance, a digital audio system comprising a low delay may require a higher bitrate of a transmission bandwidth compared to an audio system with a higher delay at a comparable quality level.

SUMMARY

An embodiment of an analysis filterbank for filtering a plurality of time-domain input frames, wherein an input frame comprises a number of ordered input samples, comprises a windower configured to generate a plurality of windowed frames, wherein a windowed frame comprises a plurality of windowed samples, wherein the windower is configured to process the plurality of input frames in an overlapping manner using a sample advance value, wherein the sample advance value is less than the number of ordered input samples of an input frame divided by two, and a time/frequency converter configured to provide an output frame comprising a number of output values, wherein an output frame is a spectral representation of a windowed frame.

An embodiment of a synthesis filterbank for filtering a plurality of input frames, wherein each input frame comprises a number of ordered input values, comprises a frequency/time converter configured to provide a plurality of output frames, wherein an output frame comprises a number of ordered output samples, wherein an output frame is a time representation of an input frame, a windower configured to generate a plurality of windowed frames. A windowed frame comprises a plurality of windowed samples. The windower is furthermore configured to provide the plurality of windowed samples for a processing in an overlapping manner based on a sample advance value. The embodiment of the synthesis filterbank further comprises an overlap/adder configured to provide an added frame comprising a start section and a remainder section, wherein an added frame comprises a plurality of added samples by adding at least three windowed samples from at least three windowed frames for an added sample in the remainder section of an added frame and by adding at least two windowed samples from at least two different windowed frames for an added sample in the start section. The number of windowed samples added to obtain an added sample in the remainder section is at least one sample higher compared to the number of windowed samples added to obtain an added sample in the start section, Or the windower is configured to disregard at least the earliest output value according to the order of the ordered output samples or to setting the corresponding windowed samples to a predetermined value or to at least a value in a predetermined range for each windowed frame of the plurality of windowed frames. The overlap/adder (230) is configured to provide the added sample in the remainder section of an added frame based on at least three windowed samples from at least three different windowed frames and an added sample in the start section based on at least two windowed samples from at least two different windowed frames.

An embodiment of a synthesis filterbank for filtering a plurality of input frames, wherein each input frame comprises M ordered input values $y_k(0), \ldots, x_k(M-1)$, wherein M is a positive integer, and wherein k is an integer indicating a frame index, comprises an inverse type-IV discrete cosine transform frequency/time converter configured to provide a plurality of output frames, an output frame comprising 2M ordered output samples $x_k(0), \ldots, x_k(2M-1)$ based on the input values $y_k(0), \ldots, y_k(M-1)$, a windower configured to generate a plurality of windowed frames, a windowed frame comprising a plurality of windowed samples zk(0), . . . , zk(2M−1) based on the equation $$z_k(n)=w(n)\cdot x_k(n)$$

$$\text{for } n=0, \ldots, 2M-1,$$

wherein n is an integer indicating a sample index, and wherein w(n) is a real-valued window function coefficient corresponding to the sample index n, an overlap/adder configured to provide an intermediate frame comprising a plurality of intermediate samples mk(0), . . . , mk(M−1) based on the equation $$m_k(n)=z_k(n)+z_{k-1}(n+M)$$

for n=0, . . . , M−1, and a lifter configured to provide an added frame comprising a plurality of added samples outk(0), . . . , outk(M−1) based on the equation $$out_k(n)=m_k(n)+l(n-M/2)\cdot m_{k-1}(M-1-n)$$

for n=M/2, . . . , M−1 and $$out_k(n)=m_k(n)+l(M-1-n)\cdot out_{k-1}(M-1-n)$$

for n=0, . . . , M/2−1, wherein l(0), . . . , l(M−1) are real-valued lifting coefficients.

An embodiment of an encoder comprises an analysis filterbank for filtering a plurality of time-domain input frames, wherein an input frame comprises a number of ordered input samples, comprises a windower configured to generate a plurality of windowed frames, a windowed frame comprising a plurality of windowed samples, wherein the windower is configured to process the plurality of input frames in an overlapping manner using a sample advance value, wherein the sample advance value is less than the number of ordered input samples of an input frame divided by 2 and a time/frequency converter configured to provide an output frame comprising a number of output values, an output frame being a spectral representation of a windowed frame.

An embodiment of a decoder comprises a synthesis filterbank for filtering a plurality of input frames, wherein each input frame comprising a number of ordered input values, comprises a frequency/time converter configured to provide a plurality of output frames, an output frame comprising a number of ordered output samples, an output frame being a time representation of an input frame, windower configured to generate a plurality of windowed frames, a windowed frame comprising a plurality of windowed samples, and wherein the windower is configured to provide the plurality of windowed samples for a processing in an overlapping manner based on a sample advance value, an overlap/adder configured to provide an added frame comprising a start section and a remainder section, an added frame comprising a plurality of added samples by adding at least three windowed samples from at least three windowed frames for an added sample in the remainder section of an added frame and by adding at least two windowed samples from at least two different windowed frames for an added sample in the start section, wherein the number of windowed samples added to obtain an added sample in the remainder section is at least one sample higher compared to the number of windowed samples added to obtain an added sample in the start section, or wherein the windower is configured to disregard at least the earliest output value according to the order of the ordered output samples or to setting the corresponding windowed samples to a predetermined value or to at least a value in a predetermined range for each windowed frame of the plurality of windowed frames; and wherein the overlap/adder is configured to provide the added sample in the remainder section of an added frame based on at least three windowed samples from at least three different windowed frames and an added sample in the start section based on at least two windowed samples from at least two different windowed frames.

A further embodiment of a decoder comprises a synthesis filterbank for filtering a plurality of input frames, wherein each input frame comprising M ordered input values $y_k(0)$, . . . , $y_k(M-1)$, wherein M is a positive integer, and wherein k is an integer indicating a frame index, comprises an inverse type-IV discrete cosine transform frequency/time converter configured to provide a plurality of output frames, an output frame comprising 2M ordered output samples $x_k(0)$, . . . , $x_k(2M-1)$ based on the input values $y_k(0)$, . . . , $y_k(M-1)$, a windower configured to generate a plurality of windowed frames, a windowed frame comprising a plurality of windowed samples $z_k(0)$, . . . , $z_k(2M-1)$ based on the equation $$z_k(n)=w(n)\cdot x_k(n)$$

for n=0, . . . , 2M−1, wherein n is an integer indicating a sample index, and wherein w(n) is a real-valued window function coefficient corresponding to the sample index n, an overlap/adder configured to provide an intermediate frame comprising a plurality of intermediate samples mk(0), . . . , mk(M−1) based on the equation $$m_k(n)=z_k(n)+z_{k-1}(n+M)$$

for n=0, . . . , M−1, and a lifter configured to provide an added frame comprising a plurality of added samples outk(0), . . . , outk(M−1) based on the equation $$out_k(n)=m_k(n)+l(n-M/2)\cdot m_{k-1}(M-1-n)$$

for n=M/2, . . . , M−1 and $$out_k(n)=m_k(n)+l(M-1-n)\cdot out_{k-1}(M-1-n)$$

for n=0, . . . , M/2−1, wherein l(0), . . . , l(M−1) are real-valued lifting coefficients.

An embodiment of a mixer for mixing a plurality of input frames, wherein each input frame is a spectral representation of a corresponding time-domain frame and each input frame of the plurality of input frames is provided from a different source, comprises an entropy decoder configured to entropy decode a plurality of input frames, a scaler configured to scale the plurality entropy decoded input frames in the frequency domain and configured to obtain a plurality of scaled frames in the frequency domain, wherein each scaled frame corresponds to an entropy encoded frame, an added configured to add the scaled frames in the frequency domain to generate an added frame in the frequency domain, and an entropy encoder configured to entropy encoding the added frame to obtain a mixed frame.

An embodiment of a conferencing system comprises a mixer for mixing a plurality of input frames, wherein each input frame is a spectral representation of a corresponding time-domain frame and each input frame of the plurality of input frames being provided from a different source, comprises an entropy decoder configured to entropy decode the plurality of input frames, a scaler configured to scale the plurality of entropy decoded input frames in the frequency domain and configured to obtain a plurality of scaled frames in the frequency domain, each scaled frame corresponding to an entropy decoded input frame, an adder configured to add up the scaled frames in the frequency domain to generate an added frame in the frequency domain, and an entropy encoder configured to entropy encoding the added frame to obtain a mixed frame.

BRIEF DESCRIPTION OF THE DRAWINGS

Embodiments of the present invention are described hereinafter, making reference to the appended drawings.

FIG. 14b shows different sources for delays comprised in the system shown in FIG. 14a;

FIG. 15 shows a table comprising a comparison of delays;

FIG. 20 shows a table comprising an evaluation of a computational efficiency of an embodiment of a synthesis filterbank or an analysis filterbank (AAC ELD codec);

FIG. 21 shows a table comprising an evaluation of a computational efficiency of a AAC LD codec;

FIG. 22 shows a table comprising an evaluation of a computational complexity of a AAC LC codec;

FIGS. 23a show tables comprising a comparison of an and 23b evaluation of a memory efficiency of RAM and ROM for three different codecs; and FIG. 24 shows a table comprising a list of used codex for a MUSHRA test.

DETAILED DESCRIPTION OF THE EMBODIMENTS

FIGS. 1 to 24 show block diagrams and further diagrams describing the functional properties and features of different embodiments of an analysis filterbank, a synthesis filterbank, an encoder, a decoder, a mixer, a conferencing system and other embodiments of the present invention. However, before describing an embodiment of a synthesis filterbank, with respect to FIGS. 1 and 2, an embodiment of an analysis filterbank and a schematic representation of input frames being processed by an embodiment of an analysis filterbank will be described in more detail.

Figure 1:
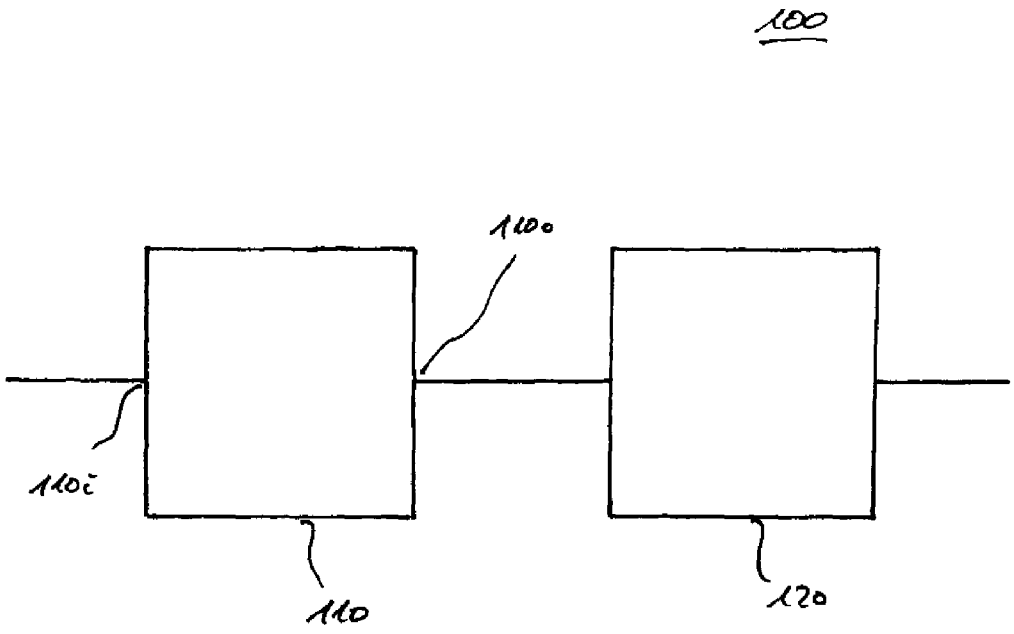
FIG. 1 shows a block diagram of an analysis filterbank.

FIG. 1 shows a first embodiment of an analysis filterbank 100 comprising a windower 110 and time/frequency converter 120. To be more precise, the windower 110 is configured to a plurality of time-domain input frames, each input frame comprising a number of ordered input samples at an input 110i. The windower 110 is furthermore adapted to generate a plurality of windowed frames, which are provided by the windower at the output 110o of the windower 110. Each of the windowed frames comprises a plurality of windowed samples, wherein the windower 110 is furthermore configured to process the plurality of windowed frames in an overlapping manner using a sample advance value as will be explained in more detail in the context of FIG. 2.

The time/frequency converter 120 is capable of receiving the windowed frames as output by the windower 110 and configured to provide an output frame comprising a number of output values, such that an output frame is a spectral representation of a windowed frame.

Figure 2:
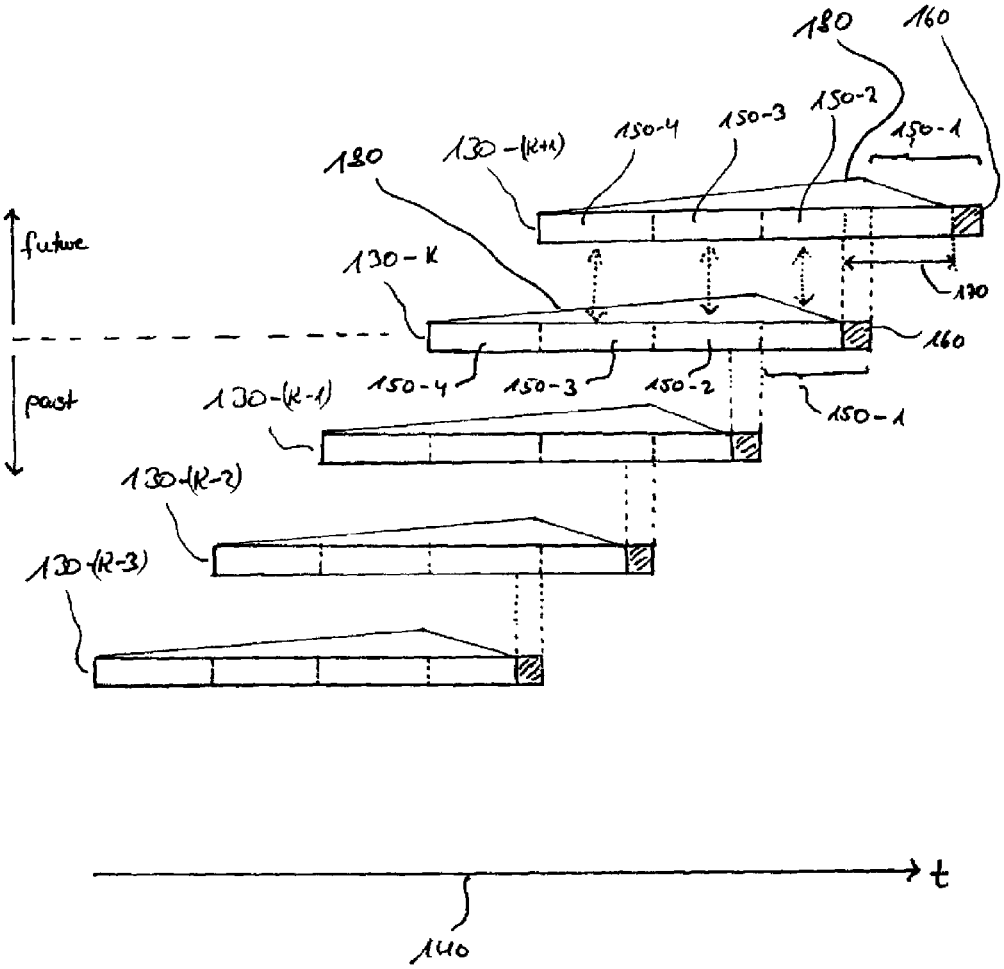
FIG. 2 shows a schematic representation of input frames being processed by an embodiment of an analysis filterbank.

In order to illustrate and outline, the functional properties and features of an embodiment of an analysis filterbank 100, FIG. 2 shows a schematic representation of five input frames 130-(k−3), 130-(k−2), 130-(k−1), 130-k and 130-(k+1) as a function of time, as indicated by an arrow 140 at the bottom of FIG. 2.

In the following, the operation of an embodiment of an analysis filterbank 100 will be described in more detail with reference to the input frame 130-k, as indicated by the dashed line in FIG. 2. With respect to this input frame 130-k, the input frame 103-(k+1) is a future input frame, whereas the three input frames 130-(k−1), 130-(k−2), and 130-(k−3) are past input frames. In other words, k is an integer indicating a frame index, such that the larger the frame index is, the farther the respective input frame is located "in the future". Accordingly, the smaller the index k is, the farther the input frame is located "in the past".

Each of the input frames 130 comprises at least two subsections 150, which are equally long. To be more precise, in the case of an embodiment of an analysis filterbank 100, on which the schematic representation shown in FIG. 2 is based, the input frame 130-k as well as the other input frames 130 comprise subsections 150-2, 150-3 and 150-4 which are equal in length in terms of input samples. Each of these subsections 150 of the input frame 130 comprises M input samples, wherein M is a positive integer. Moreover, the input frame 130 also comprises a first subsection 150-1 which may comprise also M input frames. In this case, the first subsection 150-1 comprises an initial section 160 of the input frame 130, which may comprise input samples or other values, as will be explain in more detail at a later stage. However, depending on the concrete implementation of the embodiment of an analysis filterbank, the first subsection 150-1 is not required to comprise an initial section 160 at all. In other words, the first subsection 150-1 may in principle comprise a lower number of input samples compared to the other subsections 150-2, 150-3, 150-4. Examples for this case will also be illustrated later on.

Optionally, apart from the first subsection 150-1, the other subsections 150-2, 150-3, 150-4 comprise typically the same number of input samples M, which is equal to the so-called sample advance value 170, which indicates a number of input samples by which two consecutive input frames 130 are moved with respect to time and each other. In other words, as the sample advance value M, as indicated by an arrow 170 is, in the case of an embodiment of an analysis filterbank 100, as illustrated in FIGS. 1 and 2 equal to the length of the subsections 150-2, 150-3, 150-4, the input frames 130 are generated and processed by the windower 110 in an overlapping manner. Furthermore, the sample advance value M (arrow 170) is also identical with the length of the subsections 150-2 to 150-4.

The input frames 130-k and 130-(k+1) are, hence, in terms of a significant number of input samples, equal in the sense that both input frames comprise these input samples, while they are shifted with respect to the individual subsections 150 of the two input frames 130. To be more precise, the third subsection 150-3 of the input frame 130-k is equal to the fourth subsection 150-4 of the input frame 130-(k+1). Accordingly, the second subsection 150-2 of the input frame 130-k is identical to the third subsection 150-3 of the input frame 130-(k+1).

In yet other words, the two input frames 130-k, 130-(k+1) corresponding to the frame indices k and (k+1) are in terms of two subsections 150 in the case of the embodiments shown in FIG. 2, identical, apart from the fact that in terms of the input frame with the index frame (k+1), the samples are moved.

The two aforementioned input frames 130-k and 130-(k+1) furthermore share at least one sample from the first subsection 150-1 of the input frame 130-k. To be more precise, in the case of the embodiment shown in FIG. 2, all input samples in the first subsection 150-1 of the input frame 130-k, which are not part of the initial section 160, appear as part of the second subsection 150-2 of the input frame 130-(k+1). However, the input samples of the second subsection 150-2 corresponding to the initial section 160 of the input frame 130-k before, may or may not be based on the input values or input samples of the initial section 160 of the respective input frame 130, depending on the concrete implementation of an embodiment of an analysis filterbank.

In the case of the initial section 160 existing so that the number of input frames in the first subsection 150-1 is equal to the number of input samples in the other subsections 150-2 to 150-4, in principle two different cases have to be considered, although also further cases in between these two "extreme" cases, which will be explained, are possible.

If the initial section 160 comprises "meaningful" encoded input samples in the sense that the input samples in the initial section 160 do represent an audio signal in the time-domain, these input samples will also be part of the subsection 150-2 of the following input frame 130-(k+1). This case, is however, in many applications of an embodiment of an analysis filterbank, not an optimal implementation, as this option might cause additional delay.

In the case, however, that the initial section 160 does not comprise "meaningful" input samples, which in this case can also be referred to as input values, the corresponding input values of the initial section 160 may comprise random values, a predetermined, fixed, adaptable or programmable value, which can for instance be provided in terms of an algorithmic calculation, determination or other fixing by a unit or module, which may be coupled to the input 110i of the windower 110 of the embodiment of the analysis filterbank. In this case, however, this module is typically required to provide as the input frame 130-(k+1), an input frame which comprises in the second subsection 150-2 in the area corresponding to the initial section 160 of the input frame before "meaningful" input samples, which do correspond to the corresponding audio signal. Moreover, the unit or module coupled to the input 110i of the windower 110 is typically also required to provide meaningful input samples corresponding to the audio signal in the framework of the first subsection 150-1 of the input frame 130-(k+1).

In other words, in this case, the input frame 130-k corresponding to the frame index k is provided to the embodiment of an analysis filterbank 100 after sufficient input samples are gathered, such that the subsection 150-1 of this input frame can be filled with these input samples. The rest of the first subsection 150-1, namely the initial section 160 is then filled up with input samples or input values, which may comprise random values or any other values such as a predetermined, fixed, adaptable or programmable value or any other combination of values. As this can, in principle, be done at a very high speed compared to a typical sampling frequency, providing the initial section 160 of the input frame 130-k with such "meaningless" input samples, does not require a significant period of time on the scale presented by a typical sampling frequency, such as a sampling frequency in the range between a few kHz and up to several 100 kHz.

However, the unit or module continues collecting input samples based on the audio signal to incorporate these input samples into the following input frame 130-(k+1) corresponding to the frame index k+1. In other words, although the module or unit did not finish collecting sufficient input samples to provide the input frame 130-k in terms of the first subsection 150-1 with sufficient input samples to completely fill up the first subsection 150-1 of this input frame, but provides this input frame to the embodiment of the analysis filterbank 100 as soon as enough input samples are available, such that the first subsection 150-1 can be filled up with input samples without the initial section 160.

The following input samples will be used to fill up the remaining input samples of the second subsection 150-2 of the following input frame 130-(k+1) until enough input samples are gathered, such that the first subsection 150-1 of this next input frame can also be filled until the initial section 160 of this frame begins. Next, once again, the initial section 160 will be filled up with random numbers or other "meaningless" input samples or input values.

As a consequence, although the sample advance value 170, which is equal to the length of the subsection 150-2 to 150-4 in the case of the embodiment shown in FIG. 2 is indicated in FIG. 2 and the error representing the sample advance value 170 is shown in FIG. 2 from the beginning of the initial section 160 of the input frame 130-k until the beginning of the initial section 160 of the following input frame 130-(k+1).

As a further consequence, an input sample corresponding to an event in the audio signal corresponding to the initial section 160 will in the last two cases will not be present in the respective input frames 130-k, but in the following input frame 130-(k+1) in the framework of the second subsection 150-2.

In other words, many embodiments of an analysis filterbank 100 may provide an output frame with a reduced delay as the input samples corresponding to the initial section 160 are not part of the respective input frame 130-k but will only be influencing the later input frame 130-(k+1). In other words, an embodiment of an analysis filterbank may offer in many applications and implementations the advantage of providing the output frame based on the input frame sooner, as the first subsection 150-1 is not required to comprise the same number of input samples as the other subsection 150-2 to 150-4. However, the information comprised in the "missing section" is comprised in the next input frame 130 in the framework of the second subsection 150-2 of that respective input frame 130.

However, as indicated earlier, there may also exist the case, in which none of the input frames 130 does comprise the initial section 160. In this case, the length of each of the input frames 130 is no longer an integer multiple of the sample advance value 170 or the length of the subsection 150-2 to 150-4. To be more precise, in this case, the length of each of the input frames 130 differs from the corresponding integer multiples of the sample advance value by the number of input samples, which the module or unit providing the windower 110 with the respective input frames stops short of providing the full first subsection 150-1. In other words, the overall length of such an input frame 130 differs from the respective integer number of sample advance values by the difference between the lengths of the first subsection 150-1 compared to the length of the other subsections 150-2 to 150-4.

However, in the last two cases mentioned, the module or unit, which can for instance comprise a sampler, a sample-and-hold-stage, a sample-and-holder or a quantizer, may start providing the corresponding input frame 130 short of a predetermined number of input samples, such that each of the input frames 130 can be provided to the embodiment of an analysis filterbank 100 with a shorter delay as compared to the case in which the complete first subsection 150-1 is filled with corresponding input samples.

As already indicated, such a unit or module which can be coupled to the input 110i of the windower 110 may for instance comprise a sampler and/or a quantizer such as an analog/digital converter (A/D converter). However, depending on the concrete implementation, such a module or unit may further comprise some memory or registers to store the input samples corresponding to the audio signal.

Moreover, such a unit or module may provide each of the input frames in an overlapping manner, based on a sample advanced value M. In other words, an input frame comprises more than twice the number of input samples compared to the number of samples gathered per frame or block. Such a unit or module is in many embodiments adapted such that two consecutively generated input frames are based on a plurality of samples which are shifted with respect to time by the sample advance value. In this case, the later input frame of the two consecutively generated input frames is based on at least one fresh output sample as the earliest output sample and the aforementioned plurality of samples is shifted later by the sample advance value in the earlier input frame of the two input frames.

Although, so far an embodiment of an analysis filterbank 100 has been described in terms of each input frame 130 comprising four subsections 150, wherein the first subsection 150 is not required to comprise the same number of input samples as the other subsections, it is not required to be equal to four as in the case shown in FIG. 2. To be more precise, an input frame 130 may comprise in principle, an arbitrary number of input samples, which is larger than twice the size of the sample advance value M (arrow 170), wherein the number of input values of the initial section 160, if present, are required to be included in this number, as it might be helpful considering some implementations of an embodiment based on a system utilizing frames, wherein each frame comprises a number of samples which is identical to the sample advance value. In other words, any number of subsections, each having a length identical to the sample advance value M (arrow 170) can be used in the framework of an embodiment of an analysis filterbank 100, which is greater or equal to three in the case of a frame based system. If this is not the case, in principle, any number of input samples per input frame 130 can be utilized being greater than twice the sample advance value.

The windower 110 of an embodiment of an analysis filterbank 100, as shown in FIG. 1, is configured to generate a plurality of windowed frames based on the corresponding input frames 130 on the basis of the sample advance value M (arrow 170) in an overlapping manner as previously explained. To be more precise, depending on the concrete implementation of a windower 110, the windower 110 is configured to generate the windowed frame, based on a weighing function, which may for instance comprise a logarithmic dependence to model the hearing characteristics of the human ear. However, other weighing functions may also be implemented, such as a weighing function modeling, the psycho-acoustic characteristics of the human ear. However, the windower function is implemented in an embodiment of an analysis filterbank, can, for instance, also be implemented such that each of the input samples of an input frame is multiplied by a real-valued windower function comprising real-valued sample-specific window coefficients.

An example for such an implementation is shown in FIG. 2. To be more precise, FIG. 2 shows a schematical crude representation of a possible window function or a windowing function 180, by which the windower 110, as shown in FIG. 1 generates the windowed frames, based on the corresponding input frames 130. Depending on the concrete implementation of an analysis filterbank 100, the windower 110 can furthermore provide windowed frames to the time/frequency converter 120 in a different way.

Based on each of the input frames 130, the windower 110 is configured to generate a windowed frame, wherein each of the windowed frames comprises a plurality of windowed samples. To be more precise, the windower 110 can be configured in different ways. Depending on the length of an input frame 130 and depending on the length of the windowed frame to be provided to the time/frequency provider 120, several possibilities of how the windower 110 is implemented to generate the windowed frames can be realized.

If, for instance, an input frame 130 comprises an initial section 160, so that in a case of an embodiment shown in FIG. 2 the first subsection 150-1 of each of the input frames 130 comprises as many input values or input samples as the other subsections 150-2 to 150-4, the windower 110 can for instance be configured such that the windowed frame also comprises the same number of windowed samples as the input frame 130 comprises input samples of input values. In this case, due to the structure of the input frames 130, as described before, all the input samples of the input frame apart from the input values of the input frames 130 in the initial section 160 may be processed by the windower 110 based on the windowing function or the window function as previously described. The input values of the initial section 160 may, in this case, be set to a predetermined value or to at least one value in a predetermined range.

The predetermined value may for instance be an embodiment of some analysis filterbank 100 equal to the value 0 (zero), whereas in other embodiments, different values may be desirable. For instance, it is possible to use, in principle, any value with respect to the initial section 160 of the input frames 130, which indicates that the corresponding values are of no significance in terms of the audio signal. For instance, the predetermined value may be a value which is outside of a typical range of input samples of an audio signal. For instance, windowed samples inside a section of the windowed frame corresponding to the initial section 160 of the input frame 130 may be set to a value of twice or more the maximum amplitude of an input audio signal indicating that these values do not correspond to signals to be processed further. Other values, for instance negative values of an implementation-specific absolute value, may also be used.

Moreover, in embodiments of an analysis filterbank 100, windowed samples of the windowed frames corresponding to the initial section 160 of an input frame 130 can also be set to one or more values in a predetermined range. In principle, such a predetermined range, may for instance be a range of small values, which are in terms of an audio experience meaningless, so that the outcome is audibly indistinguishable or so that the listening experience is not significantly disturbed. In this case, the predetermined range may for instance be expressed as a set of values having an absolute value, which is smaller than or equal to a predetermined, programmable, adaptable or fixed maximum threshold. Such a threshold may for instance be expressed as a power of 10 or a power or two as $10^s$ or $2^s$, where the is an integer value depending on the concrete implementation.

However, in principle the predetermined range may also comprise values, which are larger than some meaningful values. To be more precise, the predetermined range may also comprise values, which comprise an absolute value, which is larger than or equal to a programmable, predetermined or fixed minimum threshold. Such a minimum threshold may in principle be expressed once again in terms of a power of two or a power of ten, as $2^s$ or $10^s$, wherein s is once again an integer depending on the concrete implementation of an embodiment of an analysis filterbank.

In the case of a digital implementation, the predetermined range can for instance comprise values which are expressible by setting or not setting the least significant bit or plurality of least significant bits in the case of a predetermined range comprising small values. In the case that the predetermined range comprises larger values, as previously explained the predetermined range may comprise values, representable by setting or not setting the most significant bit or a plurality of most significant bits. However, the predetermined value as well as the predetermined ranges may also comprise other values, which can for instance be created based on the aforementioned values and thresholds by multiplying these with a factor.

Depending on the concrete implementation of an embodiment of an analysis filterbank 100, the windower 110 may also be adapted such that the windowed frames provided at the output 110o do not comprise windowed samples corresponding to input frames of the initial sections 160 of the input frames 130. In this case, the length of the windowed frame and the length of the corresponding input frames 130, may for instance differ by the length of the initial section 160. In other words, in this case, the windower 110 may be configured or adapted to disregarding at least a latest input sample according to the order of the input samples as previously described in terms of time. In other words, in some embodiments of an analysis filterbank 100, the windower 110 may be configured such that one or more or even all input values or input samples of the initial section 160 of an input frame 130 are disregarded. In this case, the length of the windowed frame is equal to the difference between the lengths of the input frame 130 and the length of the initial section 160 of the input frame 130.

As a further option, each of the input frames 130 may not comprise an initial section 160 at all, as indicated before. In this case, the first subsection 150-1 differs in terms of the length of the respective subsection 150, or in terms of the number of input samples from the other subsections 150-2 to 150-4. In this case, the windowed frame, may or may not, comprise windowed samples or windowed values such that a similar first subsection of the windowed frame corresponding to the first subsection 150-1 of the input frame 130 comprises the same number as windowed samples or windowed values as the other subsections corresponding to the subsections 150 of the input frame 130. In this case, the additional windowed samples or windowed values can be set to a predetermined value or at least one value in the predetermined range, as indicated earlier.

Moreover, the windower 110 may be configured in embodiments of an analysis filterbank 100 such that both, the input frame 130 and the resulting windowed frame comprise the same number of values or samples and wherein both, the input frame 130 and the resulting windowed frames do not comprise the initial section 160 or samples corresponding to the initial section 160. In this case, the first subsection 150-1 of the input frame 130 as well as the corresponding subsection of the windowed frame comprise less values or samples compared to the other subsections 150-2 to 150-4 of the input frame 130 of the corresponding subsections of the windowed frame.

It should be noted that, in principle, the windowed frame is not required to correspond either to a length of an input frame 130 comprising an initial section 160, or to an input frame 130 not comprising an initial section 160. In principle, the windower 110 may also be adapted such that the windowed frame comprises one or more values or samples corresponding to values of the initial section 160 of an input frame 130.

In this context, it should also be noted that in some embodiments of an analysis filterbank 100, the initial section 160 represents or at least comprises a connected subset of sample indices n corresponding to a connected subset of input values or input samples of an input frame 130. Hence, if applicable, also the windowed frames comprising a corresponding initial section comprises a connected subset of sample indices n of windowed samples corresponding to the respective initial section of the windowed frame, which is also referred to as the starting section or start section of the windowed frame. The rest of the windowed frame without the initial section or starting section, which is sometimes also referred to as the remainder section.

As already previously indicated, the windower 110 can in embodiments of an analysis filterbank 100 be adapted to generate the windowed samples of windowed values of a windowed frame not corresponding to the initial section 160 of an input frame 130, if present at all, based on a window function which may incorporate psycho-acoustic models, for instance, in terms of generating the windowed samples based on a logarithmic calculation based on the corresponding input samples. However, the windower 110 can also be adapted in different embodiments of an analysis filterbank 100, such that each of the windowed samples is generated by multiplying a corresponding input sample with a sample-specific windowed coefficient of the window function defined over a definition set.

In many embodiments of an analysis filterbank 100, the corresponding windower 110 is adapted such that the window function, as for instance, described by the window coefficients, is asymmetric over the definition set with respect to a midpoint of the definition set. Furthermore, in many embodiments of an analysis filterbank 100, the window coefficients of the window function comprise an absolute value of more than 10%, 20% or 30%, 50% of a maximum absolute value of all window coefficients of the window function in the first half of the definition set with respect to the midpoint, wherein the window function comprises less window coefficients having an absolute value of more than the aforementioned percentage of the maximum absolute value of the window coefficients in the second half of the definition set, with respect to the midpoint. Such a window function is schematically shown in context of each of the input frames 130 in FIG. 2 as the window function 180. More examples of window functions will be described in the context of the FIGS. 5 to 11, including a brief discussion of spectral and other properties and opportunities offered by some embodiments of an analysis filterbank as well as a synthesis filterbank implementing window functions as shown in these figures and described in passages.

Apart from the windower 110, an embodiment of an analysis filterbank 100 also comprises the time/frequency converter 120, which is provided with the windowed frames from the windower 110. The time/frequency converter 120 is in turn adapted to generate an output frame or a plurality of output frames for each of the windowed frames such that the output frame is a spectral representation of the corresponding windowed frame. As will be explained in more detail later on, the time/frequency converter 120 is adapted such that the output frame comprises less than half the number of output values compared to the number of input samples of an input frame, or compared to half the number of windowed samples of a windowed frame.

Furthermore, the time/frequency converter 120 may be implemented such that it is based on a discrete cosine transform and/or a discrete sine transform such that the number of output samples of an output frame is less than half the number of input samples of an input frame. However, more implementation details of possible embodiments of an analysis filterbank 100 will be outlined shortly.

In some embodiments of an analysis filterbank, a time/frequency converter 120 is configured such that it outputs a number of output samples, which is equal to the number of input samples of a starting section 150-2, 150-3, 150-4, which is not the starting section of the first subsection 150-1 of the input frame 130, or which is identical to the sample advance value 170. In other words, in many embodiments of an analysis filterbank 100, the number of output samples is equal to the integer M representing the sample advance value of a length of the aforementioned subsection 150 of the input frame 130. Typical values of the sample advance value or M are in many embodiments 480 or 512. However, it should be noted that also different integers M can easily be implemented in embodiments of an analysis filterbank, such as M=360.

Moreover, it should be noted that in some embodiments of an analysis filterbank the initial section 160 of an input frame 130 or the difference between the number of samples in the other subsections 150-2, 150-3, 150-4 and the first subsection 150-1 of an input frame 130 is equal to M/4. In other words, in the case of an embodiment of an analysis filterbank 100 in which M=480, the length of the initial section 160 or the aforementioned difference is equal to 120 (=M/4) samples, whereas in the case of M=512, the length of the initial section 160 of the aforementioned difference is equal to 128 (=M/4) in some embodiments of an analysis filterbank 100. It should, however, be noted that also in this case different lengths can also be implemented and do not represent a limit in terms of an embodiment of an analysis filterbank 100.

As also indicated earlier, as the time/frequency converter 120 can for instance be based on a discrete cosine transform or a discrete sine transform, embodiments of an analysis filterbank are sometimes also discussed and explained in terms of parameter N=2M representing a length of an input frame of a modified discrete cosine transform (MDCT) converter. In the aforementioned embodiments of an analysis filterbank 100, the parameter N is hence equal to 960 (M=480) and 1024 (M=512).

As will be explained in more detail later on, embodiments of an analysis filterbank 100 may offer as an advantage a lower delay of a digital audio processing without reducing the audio quality at all, or somehow significantly. In other words, an embodiment of an analysis filterbank offers the opportunity of implementing an enhanced low delay coding mode, for instance in the framework of an (audio) codec (codec=coder/decoder or coding/decoding), offering a lower delay, having at least a comparable frequency response and an enhanced pre-echo behavior compared to many codex available. Moreover, as will be explained in the context of the embodiments of a conferencing system in more detail, only a single window function for all kinds of signals is capable of achieving the aforementioned benefits in some embodiments of an analysis filterbank and embodiments of systems comprising an embodiment of an analysis filterbank 100.

To emphasize, the input frames of embodiments of an analysis filterbank 100 are not required to comprise the four subsections 150-1 to 150-4 as illustrated in FIG. 2. This only represents one possibility that has been chosen for the sake of simplicity. Accordingly, also the windower is not required to be adapted such that the windowed frames also comprise four corresponding subsections or the time/frequency converter 120 to be adapted such that it is capable of providing the output frame based on a windowed frame comprising four subsections. This has simply been chosen in the context of FIG. 2 to be capable of explaining some embodiments of an analysis filterbank 100 in a concise and clear manner. However, statements in the context of the input frame in terms of the length of the input frames 130 can also be transferred to the length of the windowed frames as explained in the context of the different options concerning the initial section 160 and its presence in the input frames 130.

In the following, a possible implementation of an embodiment of an analysis filterbank in view of an error resilient advanced audio codec low delay implementation (ER AAC LD) will be explained with respect to modifications in order to adapt the analysis filterbank of the ER AAC LD to arrive at an embodiment of an analysis filterbank 100 which is also sometimes referred to as a low-delay (analysis filterbank). In other words, in order to achieve a sufficiently reduced or low delay, some modifications to a standard encoder in the case of an ER AAC LD might be useful, as defined in the following.

In this case, the windower 110 of an embodiment of an analysis filterbank 100 is configured to generate the windowed samples $z_{in}$ based on the equation or expression $$z_{i,n}=w(N-1-n)\cdot x'_{i,n}, \tag{1}$$

wherein i is an integer indicating a frame index or a block index of a windowed frame and/or of an input frame, and wherein n is the integer indicating a sample index in the range between −N and N−1.

In other words, in embodiments comprising an initial sequence 160 in the framework of the output frames 130, the windowing is extended to the pass by implementing the expression or equation above for the sample indices n=N−1, wherein w(n) is a window coefficient corresponding to a window function as will be explained in more detail in the context of FIGS. 5 to 11. In the context of an embodiment of the analysis filterbank 100, the synthesis window function w is used as the analysis window function by inverting the order, as can be seen by comparing the argument of the window function w(n−1−n). The window function for an embodiment of a synthesis filterbank, as outlined in the context of FIGS. 3 and 4, may be constructed or generated based on the analysis window function by mirroring (e.g. with respect to the midpoint of the definition set) to obtain a mirrored version. In other words, FIG. 5 shows a plot of the low-delay window functions, wherein the analysis window is simply a time-reverse replica of the synthesis window. In this context, it should also be noted that $x'_{i,n}$ represents an input sample or input value corresponding to the block index i and the sample index n.

In other words, compared to the aforementioned ER AAC LD implementation (e.g. in the form of a codec), which is based on a window length N of 1024 or 960 values based on the sine window, the window length of the low-delay window comprised in the window 110 of the embodiment of the analysis filterbank 100 is 2N(=4M), by extending the windowing into the past.

As will be explained in more detail in the context of FIGS. 5 to 11, the window coefficients w(n) for n=0, . . . , 2N−1 may obey the relations given in table 1 in the annex and table 3 in the annex for N=960 and N=1024 in some embodiments, respectively. Moreover, the window coefficients may comprise the values given in the tables 2 and 4 in the annex for N=960 and N=1024 in the case of some embodiments, respectively.

In terms of the time/frequency converter 120, the core MDCT algorithm (MDCT=Modified Discrete Cosine Transform) as implemented in the framework of the ER AAC LD codec is mostly unchanged, but comprises the longer window as explained, such that n is now running from −N to N−1 instead of running from zero to N−. The spectral coefficients or output values of the output frame $X_{i,k}$ are generated based on the following equation or expression $$X_{i,k} = -2 \cdot \sum_{n=-N}^{N-1} z_{i,n} \cos\left(\frac{2\pi}{N}(n+n_0)\cdot\left(k+\frac{1}{2}\right)\right) \quad (2)$$

$$\text{for } 0 \le k < \frac{N}{2},$$

wherein $z_{i,n}$ is a windowed sample of a windowed frame or a windowed input sequence of a time/frequency converter 120 corresponding to the sample index n and the block index i as previously explained. Moreover, k is an integer indicating the spectral coefficient index and N is an integer indicating twice the number of output values of an output frame, or as previously explained, the window length of one transform window based on the windows_sequence value as implemented in the ER AAC LD codec. The integer $n_o$ is an offset value and given by $$n_0 = \frac{-\frac{N}{2}+1}{2}.$$

Depending on the concrete length of an input frame 130 as explained in the context of FIG. 2, the time/frequency converter may be implemented based on a windowed frame comprising windowed samples corresponding to the initial section 160 of the input frames 130. In other words, in the case of M=480 or N=960, the equations above are based on windowed frames comprising a length of 1920 windowed samples. In the case of an embodiment of an analysis filterbank 100 in which the windowed frames do not comprise windowed samples corresponding to the initial section 160 of the input frames, 130, the windowed frames comprise the length of 1800 windowed samples in the aforementioned case of M=480. In this case the equations given above can be adapted such that the corresponding equations are carried out. In the case of the windower 110, this can for instance lead to the sample index n running from the −N, . . . , 7N/8−1 in the case of M/4=N/8 windowed samples missing in the first subsection, compared to the other subsections of the windowed frame as previously explained.

Accordingly, in the case of a time/frequency converter 120, the equation given above can easily be adapted by modifying the summation indices accordingly to not incorporate the windowed samples of the initial section or starting section of the windowed frame. Of course, further modifications can easily be obtained accordingly in the case of a different length of the initial section 160 of the input frames 130 or in the case of the difference between the length of the first subsection and the other subsections of the windowed frame, as also previously explained.

In other words, depending on the concrete implementation of an embodiment of an analysis filterbank 100, not all calculations as indicated by the expressions and equations above are required to be carried out. Further embodiments of an analysis filterbank may also comprise an implementation in which the number of calculations can be even more reduced, in principle, leading to a higher computational efficiency. An example in the case of the synthesis filterbank will be described in the context of FIG. 19.

In particular, as will also be explained in the context of an embodiment of a synthesis filterbank, an embodiment of an analysis filterbank 100 can be implemented in the framework of a so-called error resilient advanced audio codec enhanced low-delay (ER AAC ELD) which is derived from the aforementioned ER AAC LD codec. As described, the analysis filterbank of the ERAAC LD codec is modified to arrive at an embodiment of an analysis filterbank 100 in order to adopt the low-delay filterbank as an embodiment of an analysis filterbank 100. As will be explained in more detail, the ER AAC ELD codec comprising an embodiment of an analysis filterbank 100 and/or an embodiment of a synthesis filterbank, which will be explained in more detail later on, provides the ability to extend the usage of generic low bitrate audio coding to applications requiring a very low delay of the encoding/decoding chain. Examples come for instance from the field of full-duplex real-time communications, in which different embodiments can be incorporated, such as embodiments of an analysis filterbank, a synthesis filterbank, a decoder, and encoder, a mixer and a conferencing system.

Before describing further embodiments of the present invention in more detail, it should be noted that objects, structures and components with the same or similar functional property are denoted with the same reference signs. Unless explicitly noted otherwise, the description with respect to objects, structures and components with similar or equal functional properties and features can be exchanged with respect to each other. Furthermore, in the following summarizing reference signs for objects, structures or components which are identical or similar in one embodiment or in a structure shown in one of the figures, will be used, unless properties or features of a specific object, structure or component are discussed. As an example, in the context of the input frames 130 summarizing reference signs have already been incorporated. In the description relating to the input frames in FIG. 2, if a specific input frame was referred to, the specific reference sign of that input frame, e.g. 130-k was used, whereas in the case of all input frames or one input frame, which is not specifically distinguished from the others is referred to, the summarizing reference signs 130 has been used. Using summarizing reference signs thereby enable a more compact and clearer description of embodiments of the present invention.

Moreover, in this context it should be noted that in the framework of the present application, a first component which is coupled to a second component can be directly connected or connected via a further circuitry or further component to the second component. In other words, in the framework of the present application, two components being close to each other comprise the two alternatives of the components being directly connected to each other or via a further circuitry of a further component.

Figure 3:
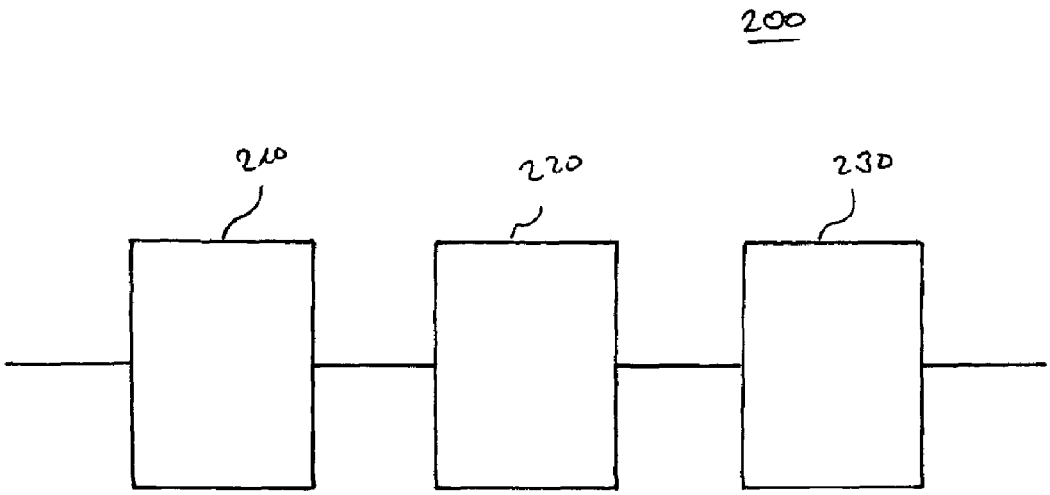
FIG. 3 shows a block diagram of an embodiment of a synthesis filterbank.

FIG. 3 shows an embodiment of a synthesis filterbank 200 for filtering a plurality of input frames, wherein each input frame comprises a number of ordered input values. The embodiment of the synthesis filterbank 200 comprises a frequency/time converter 210, a windower 220 and an overlap/adder 230 coupled in series.

A plurality of input frames provided to the embodiment of the synthesis filter bank 200 will be processed first by the frequency/time converter 210. It is capable of generating a plurality of output frames based on the input frames so that each output frame is a time representation of the corresponding input frame. In other words, the frequency/time converter 210 performs a transition for each input frame from the frequency-domain to the time-domain.

The windower 220, which is coupled to the frequency/time converter 210, is then capable of processing each output frame as provided by the frequency/time converter 210 to generate a windowed frame based on this output frame. In some embodiments of a synthesis filterbank 200, the windower 220 is capable of generating the windowed frames by processing each of the output samples of each of the output frames, wherein each windowed frame comprises a plurality of windowed samples.

Depending on the concrete implementation of an embodiment of a synthesis filterbank 200, the windower 220 is capable of generating the windowed frames based on the output frames by weighing the output samples based on a weighing function. As previously explained in the context of the windower 110 in FIG. 1, the weighing function may, for instance, be based on a psycho-acoustic model incorporating the hearing capabilities or properties of the human ear, such as the logarithmic dependency of the loudness of an audio signal.

Additionally or alternatively, the windower 220 may also generate the windowed frame based on the output frame by multiplying each output sample of an output frame with a sample-specific value of a window, windowing function or window function. These values are also referred to as window coefficients or windowing coefficients. In other words, the windower 220 may be adapted in at least some embodiments of a synthesis filterbank 200 to generate the windowed samples of a windowed frame by multiplying these with a window function attributing a real-valued window coefficient to each of a set of elements of a definition set.

Examples of such window functions will be discussed in more detail in the context of FIGS. 5 to 11. Moreover, it should be noted that these window function may be asymmetric or non-symmetric with respect to a midpoint of the definition set, which in turn is not required to be an element of the definition set itself.

Moreover, the windower 220 generates the plurality of windowed samples for a further processing in an overlapping manner based on a sample advance value by the overlap/adder 230, as will be explained in more detail in the context of FIG. 4. In other words, each of the windowed frames comprises more than twice the number of windowed samples compared to a number of added samples as provided by the overlap/adder 230 coupled to an output of the windower 220. As a consequence, the overlap/adder is than capable of generating an added frame in an overlapping manner by adding up at least three windowed samples from at least three different windowed frames for at least some of the added samples in embodiments of a synthesis filterbank 200.

The overlap/adder 230 coupled to the windower 220 is then capable of generating or providing an added frame for each newly received windowed frame. However, as previously mentioned, the overlap/adder 230 operates the windowed frames in an overlapping manner to generate a single added frame. Each added frame comprises a start section and a remainder section, as will be explained in more detail in the context of FIG. 4, and comprises furthermore a plurality of added samples by adding at least three windowed samples from at least three different windowed frames for an added in the remainder section of an added frame and by adding at least two windowed samples from at least two different windowed frames for an added samples in the starting section. Depending on the implementation, the number of windowed samples added to obtain an added sample in the remainder section may be at least one sample higher compared to the number of windowed samples added to obtain an added sample in the start section.

Alternatively or additionally and depending on the concrete implementation of an embodiment of a synthesis filterbank 200, the windower 220 may also be configured to disregard the earliest output value according to the order of the ordered output samples, to setting the corresponding windowed samples to a predetermined value or to at least a value in the predetermined range for each windowed frame of the plurality of windowed frames. Moreover, the overlap/adder 230 may in this case be capable of providing the added sample in the remainder section of an added frame, based on at least three windowed samples from at least three different windowed frames and an added sample in the starting section based on at least two windowed samples from at least two different windowed frames, as will be explained in the context of FIG. 4.

Figure 4:
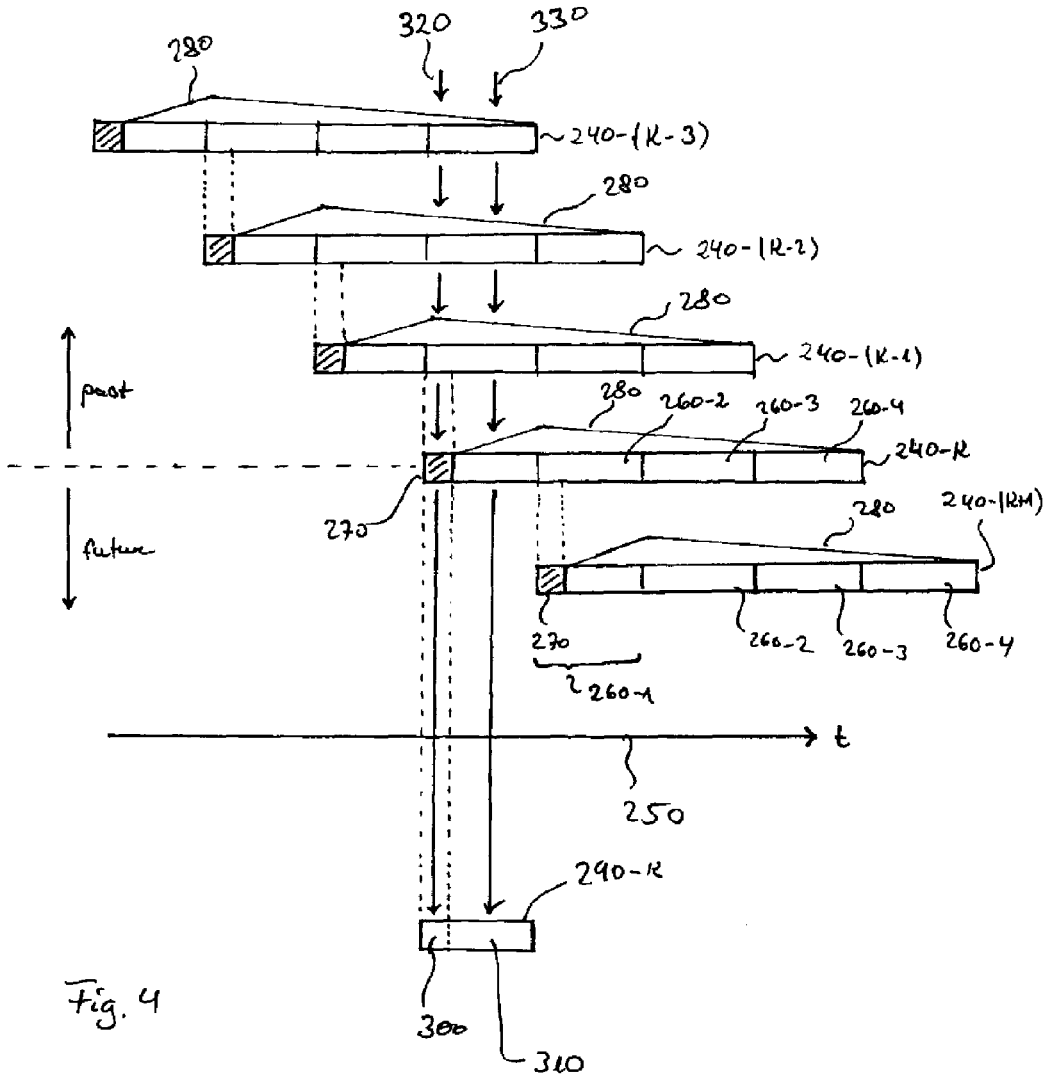
FIG. 4 shows a schematic representation of output frames in the framework of being processed by an embodiment of a synthesis filterbank.
Figure 5:
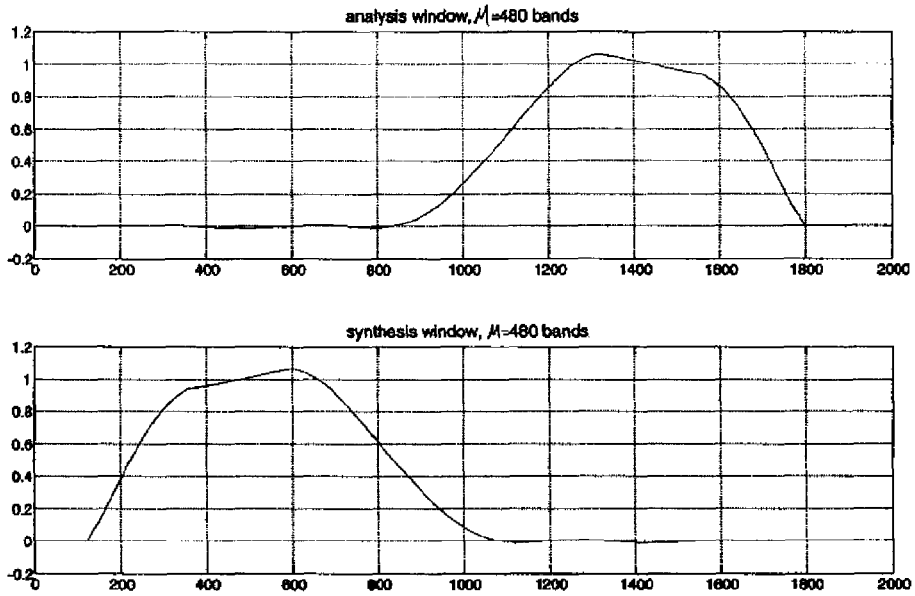
FIG. 5 shows a schematic representation of an analysis window function and s synthesis window function of an embodiment of an analysis filterbank and of a synthesis filterbank.

FIG. 4 shows a schematic representation of five output frames 240 corresponding to the frame indices k, k−1, k−2, k−3 and k+1, which are labeled accordingly. Similar to the schematic representation shown in FIG. 2, the five output frames 240 shown in FIG. 4 are arranged according to their order with respect to time as indicated by an arrow 250. With reference to the output frame 240-k, the output frames 240-(k−1), 240-(k−2) and 240-(k−3) refer to past output frames 240. Accordingly, the output frame 240-(k+1) is with respect to the output frame 240-k a following or future output frame.

As already discussed in the context of the input frames 130 in FIG. 2, also the output frames 240 shown in FIG. 4 comprise, in the case of the embodiment shown in FIG. 4, four subsets 260-1, 260-2, 260-3 and 260-4 each. Depending on the concrete implementation of the embodiment of a synthesis filterbank 200, the first subsection 260-1 of each of the output frames 240, may or may not, comprise an initial section 270, as was already discussed in the framework of FIG. 2 in the context of the initial section 160 of the input frames 130. As a consequence, the first subsection 260-1 may be shorter compared to the other subsections 260-2, 260-3 and 260-4 in the embodiment illustrated in FIG. 4. The other subsections 260-2, 260-3 and 260-4, however, comprise each a number of output samples equal to the aforementioned sample advance value M.

As described in the context of FIG. 3, the frequency/time converter 210 is in the embodiment shown in FIG. 3 provided with a plurality of input frames on the basis of which the frequency/time converter 210 generates a plurality of output frames. In some embodiments of a synthesis filterbank 200, the length of each of each of the input frames is identical to the sample advance value M, wherein M is once again a positive integer. The output frames generated by the frequency/time converter 210 however do comprise at least more than twice the number of input values of an input frame. To be more precise, in an embodiment in accordance with the situation shown in FIG. 4, the output frames 240 comprise even more than three times the number of output samples compared to the number of input values, each of which also comprises in embodiments related to the shown situation M input values. As a consequence, the output frames can be divided into subsections 260, wherein each of the subsections 260 of the output frames 240 (optionally without the first subsection 260-1, as discussed earlies) comprise M output samples. Moreover, the initial section 270 may in some embodiments comprise M/4 samples. In other words, in the case of M=480 or M=512, the initial section 270, if present at all, may comprise 120 or 128 samples or values.

In yet other words, as explained in the context of the embodiments of the analysis filterbank 100 before, the sample advance value M is also identical to the lengths of the subsections 260-2, 260-3 and 260-4 of the output frames 240. Depending on the concrete implementation of an embodiment of a synthesis filterbank 200, also the first subsection 260-1 of the output frame 240 can comprise M output samples. If, however, the initial section 270 of the output frame 240 does not exist, the first subsection 260-1 of each of the output frames 240 is shorter than the remaining subsections 260-2 to 260-4 of the output frames 240.

As previously mentioned, the frequency/time converter 210 provides to the windower 220 a plurality of the output frames 240, wherein each of the output frames comprises a number of output samples being larger than twice the sample advance value M. The windower 220 is then capable of generating windowed frames, based on the current output frame 240, as provided by the frequency/time converter 210. More explicitly, each of the windowed frames corresponding to an output frame 240 is generated based on the weighing function, as previously mentioned. In an embodiment based on the situation shown in FIG. 4, the weighing function is in turn based upon a window function 280, which is schematically shown over each of the output frames 240. In this context, it should also be noted that the window function 280 does not yield any contribution for output samples in the initial section 270 of the output frame 240, if present.

However, as a consequence, depending on the concrete implementations of different embodiments of a synthesis filterbank 200, different cases have to be considered once again. Depending on the frequency/time converter 210, the windower 220 may be adapted or configured quite differently.

If, for instance, on the one hand, the initial section 270 of the output frames 240 is present such that also the first subsections 260-1 of the output frames 240 comprise M output samples, the windower 220 can be adapted such that it may or may not generate windowed frames based on the output frames comprising the same number of windowed samples. In other words, the windower 220 can be implemented such that it generates windowed frames also comprising an initial section 270, which can be implemented, for instance, by setting the corresponding windowed samples to a predetermined value (e.g. 0, twice a maximum allowable signal amplitude, etc.) or to at least one value in a predetermined range, as previously discussed in the context of FIGS. 1 and 2.

In this case, both, the output frame 240 as well as the windowed frame based upon the output frame 240, may comprise the same number of samples or values. However the windowed samples in the initial section 270 of the windowed frame do not necessarily depend on the corresponding output samples of the output frame 240. The first subsection 260-1 of the windowed frame is, however, with respect to the samples not in the initial section 270 based upon the output frame 240 as provided by the frequency/time converter 210.

To summarize, if at least one output sample of the initial section 270 of an output frame 240 is present, the corresponding windowed sample may be set to a predetermined value, or to a value in a predetermined range, as was explained in the context of the embodiment of an analysis filterbank illustrated in FIGS. 1 and 2. In the case of the initial section 270 comprises more than one windowed sample, the same may also be true for this or these other windowed samples or values of the initial section 270.

Moreover, the windower 220 may be adapted such that the windowed frames do not comprise an initial section 270 at all. In the case of such an embodiment of a synthesis filterbank 200, the windower 220 can be configured to disregard the output samples of the output frames 240 in the initial section 270 of the output frame 240.

In any of these cases, depending on the concrete implementation of such an embodiment, the first subsection 260-1 of a windowed frame may or may not comprise the initial section 270. If an initial section of the windowed frame exists, the windowed samples or values of this section are not required to depend on the corresponding output samples of the respective output frame at all.

On the other hand, if the output frame 240 does not comprise the initial section 270, the windower 220 may also be configured to generate a windowed frame based on the output frame 240 comprising or not comprising an initial section 270 itself. If the number of output samples of the first subsection 260-1 is smaller than the sample advance value M, the windower 220 may in some embodiments of a synthesis filterbank 200 be capable of setting the windowed samples corresponding to the "missing output samples" of the initial section 270 of the windowed frame to the predetermined value or to at least one value in the predetermined range. In other words, the windower 220 may in this case be capable of filling up the windowed frame with the predetermined value or at least one value in the predetermined range so that the resulting windowed frame comprises a number of windowed samples, which is an integer multiple of the sample advance value M, the size of an input frame or the length of an added frame.

However, as a further option, which might be implemented, both the output frames 240 and the windowed frames might not comprise an initial section 270 at all. In this case the windower 220 may be configured to simply weigh at least some of the output samples of the output frame to obtain the windowed frame. Additionally or alternatively, the windower 220 might employ a window function 280 or the like.

As previously explained in the context of the embodiment of the analysis filterbank 100 shown in FIGS. 1 and 2, the initial section 270 of the output frames 240 corresponds to the earliest samples in the output frame 250 in the sense that these values correspond to the "freshest" samples having the smallest sample index. In other words, considering all output samples of the output frame 240, these samples refer to samples corresponding to a smallest amount of time will have elapsed when playing back a corresponding added sample as provided by the overlap/adder 230 compared to the other output samples of the output frame 240. In other words, inside the output frame 240 and inside each of the subsections 260 of the output frame, the freshest output samples correspond to a position left in the respective output frame 240 or subsection 260. In yet other words, the time as indicated by the arrow 250 corresponds to the sequence of output frames 240 and not to the sequence of output samples inside each of the output frames 240.

However, before describing the processing of the windowed frames 240 by the overlap/adder 230 in more detail, it should be noted that in many embodiments of the synthesis filterbank 200, the frequency/time converter 210 and/or the windower 220 are adapted such that the initial section 270 of the output frame 240 and the windowed frame are either completely present, or not present at all. In the first case, the number of output or windowed samples in the first subsection 260-1 is accordingly equal to the number of output samples in an output frame, which is equal to M. However, embodiments of a synthesis filterbank 200 can also be implemented, in which the either or both of the frequency/time converter 210 and the windower 220 may be configured such that the initial section 270 is present, but the number of samples in the first subsection 260-1 is yet smaller than the number of output samples in an output frame of a frequency/time converter 210. Moreover, it should be noted that in many embodiments all samples or values of any of the frames are treated as such, although of course only a single or a fraction of the corresponding values or samples may be utilized.

The overlap/adder 230 coupled to the windower 220 is capable of providing an added frame 290, as shown at the bottom of FIG. 4, which comprises a start section 300 and a remainder section 310. Depending on the concrete implementation of an embodiment of a synthesis filterbank 200, the overlap/adder 230 can be implemented such that an added sample as comprised in the added frame in the start section is obtained by adding at least two windowed samples of at least two different windowed frames. To be more precise, as the embodiments shown in FIG. 4 is based on four subsections 260-1 to 260-4 in the case of each output frames 240 and the corresponding windowed frames, an added sample in the start section 300 is based upon three or four windowed samples or values from at least three or four different windowed frames, respectively, as indicated by an arrow 320. The question, whether three or four windowed samples will be used in the case of the embodiment used in FIG. 4 depends on the concrete implementation of the embodiment in terms of the initial section 270 of the windowed frame based on the corresponding output frame 240-k In the following, with reference to FIG. 4, one might think of the output frames 240 as shown in FIG. 4 as the windowed frames provided by the windower 220 based on the respective output frames 240, as the windowed frames are obtained in the situation illustrated in FIG. 4 by multiplying at least the output samples of the output frames 240 outside the initial section 270 with values derived from the window function 280. Hence, in the following with respect to the overlap/adder 230, the reference sign 240 may also be used for a windowed frame.

In the case of the windower 220 being adapted such that the windowed samples in an existing initial section 270 is set to a predetermined value or a value in the predetermined range, the windowed sample or windowed value in the initial section 270 may be utilized in adding up the remaining three added samples from the second subsection of the windowed frame 240-(k−1) (corresponding to the output frame 240-(k−1)), the third subsection from the windowed frame 240-(k−2) (corresponding to the output frame 240-(k−2)) and the fourth subsection of the windowed frame 240-(k−3) (corresponding to the output frame 240-(k−3)), if the predetermined value or the predetermined range are such that summing up the windowed sample from the initial section 270 of the windowed frame 240-k (corresponding to the output frame 240-k) does not significantly disturb or alter the outcome.

In the case that the windower 220 is adapted such that an initial section 270 does not exist in the case of a windowed frame, the corresponding added sample in the start section 300 is normally obtained by adding the at least two windowed samples from the at least two windowed frames. However, as the embodiment shown in FIG. 4 is based upon a windowed frame comprising four subsections 260 each, in this case, the added sample in the start section of the added frame 290 is obtained by adding up the aforementioned three windowed samples from the windowed frames 240-(k−1), 240-(k−2) and 240-(k−3).

This case can, for instance, be caused by the windower 220 being adapted such that a corresponding output sample of an output frame is disregarded by the windower 220. Moreover, it should be noted that if the predetermined value or the predetermined range comprises values, which would lead to a disturbance of the added sample, the overlap/adder 230 may be configured such that the corresponding windowed sample is not taken into consideration for adding up the respective windowed sample to obtain the added sample. In this case, windowed samples in the initial section 270 may also be considered to be disregarded by the overlap/adder, as the corresponding windowed samples will not be used to obtain the added sample in the start section 300.

In terms of an added sample in the remainder section 310, as indicated by arrow 330 in FIG. 4, the overlap/adder 230 is adapted to adding up at least three windowed samples from at least three different windowed frames 240 (corresponding to three different output frames 240). Once again, due to the fact that a windowed frame 240 in the embodiment shown in FIG. 4 comprises four subsections 260, an added sample in the remainder section 310 will be generated by the overlap/adder 230 by adding up four windowed samples from four different windowed frames 240. To be more precise, an added sample in the remainder section 310 of the added frame 290 is obtained by the overlap/adder 230 by adding up the corresponding windowed sample from the first section 260-1 of the windowed frame 240-k, from the second subsection 260-2 of the windowed frame 240-(k−1) of the third subsection 260-3 from the windowed frame 240-(k−2) and from the fourth subsection 260-4 from the windowed frame 240-(k−3).

As a consequence of the described overlap/add procedure as described, the added frame 290 comprises M=N/2 added samples. In other word, the sample advance value M is equal to the length of the added frame 290. Moreover, at least in terms of some embodiments of an synthesis filterbank 200, also the length of an input frame is, as mentioned before, equal to the sample advance value M.

The fact that in the embodiment shown in FIG. 4, at least three or four windowed samples are utilized to obtain an added sample in the start section 300 and the remainder section 310 of the added frame, respectively, is has been chosen for the sake of simplicity only. In the embodiment shown in FIG. 4, each of the output/windowed frames 240 comprises four starting sections 260-1 to 260-4. However, in principle, an embodiment of the synthesis filterbank can easily be implemented in which an output or windowed frame only comprises one windowed sample more than twice the number of added samples of an added frame 290. In other words, an embodiment of a synthesis filterbank 200 can be adapted such that each windowed frame only comprises 2M+1 windowed samples.

As explained in the context of an embodiment of an analysis filterbank 100, an embodiment of a synthesis filterbank 200 can also be incorporated in the framework of an ER AAC ELD codec (codec=coder/decoder) by a modification of an ER AAC LD codec. Therefore, an embodiment of a synthesis filter 200 may be used in the context of an AAC LD codec in order to define a low bitrate and low delay audio coding/ decoding system. For instance, an embodiment of a synthesis filterbank may be comprised in a decoder for the ER AAC ELD codec along with an optional SBR tool (SBR=Spectral Bank Replication). However, in order to achieve a sufficiently low delay, some modifications might be advisable to implement compared to an ER AAC LD codec to arrive at an implementation of an embodiment of a synthesis filterbank 200.

The synthesis filterbank of the aforementioned codecs can be modified in order to adapt an embodiment of a low (synthesis) filterbank, wherein the core IMDCT algorithm (IMDCT=Inverse Modified Discrete Cosine Transform) may remain mostly unchanged in terms of the frequency/time converter 210. However, compared to an IMDCT frequency/time converter, the frequency/time converter 210 can be implemented with a longer window function, such that the sample index n is now running up to 2N−1, rather than up to N−1.

To be more precise, the frequency/time converter 210 can be implemented such that it is configured to provide output values $x_{i,n}$ based on an expression $$x_{i,n} = -\frac{2}{N}\sum_{k=0}^{\frac{N}{2}-1} \mathrm{spec}[i][k]\cdot\cos\left(\frac{2\pi}{N}(n+n_0)\left(k+\frac{1}{2}\right)\right)$$

$$\text{for } 0 \le n < 2N,$$

wherein n is, as previously mentioned, an integer indicating a sample index, i is an integer indicating a window index, k is a spectral coefficient index, N is a window length based on the parameter windows_sequence of an ER AAC LD codec-implementation such that the integer N is twice the number of added samples of an added frame 290. Moreover, $n_0$ is an offset value given by $$n_0 = \frac{-\frac{N}{2}+1}{2},$$

wherein spec[i][k] is an input value corresponding to the spectral coefficient index k and the window index I of the input frame. In some embodiments of a synthesis filterbank 200, the parameter N is equal to 960 or 1024. However, in principle, the parameter N can also acquire any value. In other words, further embodiments of a synthesis filterbank 200 may operate based on a parameter N=360 or other values.

The windower 220 and the overlap/adder 230 may also be modified compared to the windowing and overlap/adds implemented in the framework of an ER AAC LD codec To be more precise, compared to the aforementioned codec, the length N of a window function is replaced by a length 2N window function with more overlap in the past and less overlap in the future. As will be explained in the context of the following FIGS. 5 to 11, in embodiments of a synthesis filterbank 200, window functions comprising M/4=N/8 values or window coefficients may actually be set to zero. As a consequence, these window coefficients correspond to the initial sections 160, 270 of the respective frames. As previously explained, this section is not required to be implemented at all. As a possible alternative, the corresponding modules (e.g. the windowers 110, 220) may be constructed such that multiplying with a value zero is not required. As explained earlier, the windowed samples may be set to zero or disregarded, to mention only two possible implementation-related differences of embodiments.

Accordingly, the windowing performed by the windower 220 in the case of such an embodiment of a synthesis filterbank comprising such a low delay window function can be implemented according to $$z_{i,n}=w(n)\cdot x_{i,n},$$

wherein the window function with window coefficients w(n) now has a length of 2N window coefficients. Hence, the sample index runs from N=0 to N=2N−2, wherein relations as well as values of the window coefficients of different window functions are comprised in the tables 1 to 4 in the annex for different embodiments of a synthesis filterbank.

Moreover, the overlap/adder 230 can furthermore be implemented according to or based on the expression or equation $$\mathrm{out}_{i,n} = z_{i,n} + z_{i-1,n+\frac{N}{2}} + z_{i-2,n+N} + z_{i-3,n+N+\frac{N}{2}}$$

$$\text{for } 0 \le n < \frac{N}{2},$$

wherein the expressions and the equations given before might be slightly altered depending on the concrete implementation of an embodiment of a synthesis filterbank 200. In other words, depending on the concrete implementation, especially in view of the fact that a windowed frame does not necessarily comprise an initial section, the equations and expressions given above might, for instance, be altered in terms of the borders of the summing indices to exclude windowed samples of the initial section in the case an initial section is not present or comprises trivial windowed samples (e.g. zero-valued samples). In other words, by implementing at least one of an embodiment of an analysis filterbank 100 or of a synthesis filterbank 200, an ER AAC LD codec optionally with an appropriate SBR tool can be implemented to obtain an ER AAC ELD codec, which can, for instance, be used to achieve a low bitrate and/or low delay audio coding and decoding system. An overview of an end coder and a decoder will be given in the framework of FIGS. 12 and 13, respectively.

As already indicated several times, both embodiments of an analysis filterbank 100 and of a synthesis filterbank 200 may offer the advantage of enabling an enhanced low delay coding mode by implementing a low delay window function in the framework of an analysis/synthesis filterbank 100, 200 as well as in the framework of embodiments of an encoder and decoder. By implementing an embodiment of an analysis filterbank or a synthesis filterbank, which may comprise one of the window functions, which will be described in more detail in the context of FIGS. 5 to 11, several advantages may be achieved depending on the concrete implementation of an embodiment of a filterbank comprising a low delay window function. Referring to the context of FIG. 2, an implementation of an embodiment of a filterbank may be capable of producing the delay compared to the codec based on orthogonal windows, which are used in all state-off-the-art codex. For instance, in the case of the system based on the parameter N=960, the delay reduction from 960 samples, which equals a delay of 20 ms at a sampling frequency of 48 kHz, to 700 samples can be realized, which is equal to a delay of 15 ms at the same sampling frequency. Moreover, as will be shown, the frequency response of an embodiment of a synthesis filterbank and/or of an analysis filterbank is very similar to the filterbank using a sign window. In comparison to a filterbank employing the so-called low overlap window, the frequency response is even much better. Furthermore, the pre-echo behavior is similar to the low-overlap window, so that an embodiment of a synthesis filterbank and/or of an analysis filterbank can represent an excellent trade-off between quality and low delay depending on the concrete implementation of an embodiment of the filterbanks. As a further advantage, which may, for instance, be employed in the framework of an embodiment of a conferencing system, is that only one window function can be used to process all kinds of signals.

FIG. 5 shows a graphical representation of a possible window function, which can, for instance, be employed in the framework of a windower 110, 220 in the case of an embodiment of an analysis filterbank 100 and in the case of a synthesis filterbank 200. To be more precise, the window functions shown in FIG. 5 correspond to an analysis window function for M=480 bands or a number of output samples in the case of an embodiment of an analysis filterbank in the upper graph. The lower graph of FIG. 5 shows the corresponding synthesis window function for an embodiment of a synthesis filterbank. As both window functions shown in FIG. 5 correspond to M=480 bands or samples of an output frame (analysis filterbank) and an added frame (synthesis filterbank), the window functions shown in FIG. 5 comprise the definition set of 1920 values each with indices n=0, . . . 1919.

Moreover, as the two graphs in FIG. 5 clearly show, with respect to a midpoint of the definition set, which is in the case here not part of the definition set itself, as the midpoint lies between the indices N=959 and N=960, both window functions comprise a significant higher number of window coefficients in one half of the definition set with respect to the aforementioned midpoint having absolute values of the window coefficients, which are larger than 10%, 20%, 30% or 50% of the maximum absolute value of all window coefficients. In the case of the analysis window function in the upper graph of FIG. 5, the respective half of the definition set is the definition set comprising the indices N=960, . . . 1919, whereas in the case of the synthesis window function in the lower graph of FIG. 5, the respective half of the definition set with respect to the midpoint comprises the indices N=0, . . . , 959. As a consequence, with respect to the midpoint, both the analysis window function and the synthesis window function are strongly asymmetric.

As already shown in the context of both the windower 110 of an embodiment of the analysis filterbank as well as in the case of the windower 220 of the embodiment of the synthesis filterbank, the analysis window function and the synthesis window function are in terms of the indices an inverse of each other.

An important aspect with respect to the window function shown in the two graphs in FIG. 5 is that in the case of the analysis window shown in the upper graph, the last 120 windowing coefficients and in the case of the synthesis window function in the bottom graph in FIG. 5, the first 120 window coefficients are set to zero or comprise an absolute value so that they can be considered to be equal to 0 within a reasonable accuracy. In other words, the aforementioned 120 windowing coefficients of the two window functions can therefore be considered to cause an appropriate number of samples to be set to at least one value in a predetermined range by multiplying the 120 window coefficients with the respective samples. In other words, depending on the concrete implementation of embodiments of an analysis filterbank 100 or a synthesis filterbank 200, the 120 zero-valued windowed coefficients will result in creating the initial section 160, 270 of the windowed frames in embodiments of an analysis filterbank and a synthesis filterbank, if applicable, as previously explained. However, even if the initial sections 160, 270 are not present, the 120 zero-valued window coefficients can be interpreted by the windower 110 by the time/frequency converter 120, by the windower 220 and by the overlap/adder 230 in embodiments of an analysis filterbank 100 and a synthesis filterbank 200 to treat or process the different frames accordingly, even in the case that the initial sections 160, 270 of the appropriate frames are not present at all.

By implementing an analysis window function or a synthesis window function as shown in FIG. 5 comprising 120 zero-valued windowing coefficients in the case of M=480 (N=960), appropriate embodiments of an analysis filterbank 100 and a synthesis filterbank 200 will be established in which the initial sections 160, 270 of the corresponding frames comprise M/4 samples or the corresponding first subsections 150-1, 260-1 comprise M/4 values or samples less than the other subsections, to put it in more general terms.

As previously mentioned, the analysis window function shown in the upper graph of FIG. 5 and the synthesis window function shown in the lower graph of FIG. 5 represents low-delay window functions for both an analysis filterbank and a synthesis filterbank. Moreover, both the analysis window function and the synthesis window function as shown in FIG. 5 are mirrored versions of each other with respect to the aforementioned midpoint of the definition set of which both window functions are defined.

It should be noted that the usage of the low-delay window and/or employing an embodiment of an analysis filterbank or a synthesis filterbank in many cases do not result in any noticeable increase in computational complexity and only a marginal increase in storage requirements, as will be outlined later on during the complexity analysis.

The window functions shown in FIG. 5 comprise the values given in table 2 in the annex, which have been put there for the sake of simplicity only. However, by far, it is not necessary for an embodiment of an analysis filterbank or a synthesis filterbank operating on a parameter M=480 to comprise the exact values given in table 2 in the annex. Naturally, the concrete implementation of an embodiment of an analysis filterbank or a synthesis filterbank can easily employ varying window coefficients in the framework of appropriate window functions, so that, in many cases, employing window coefficients will suffice, which employ, in the case of M=480, the relations given in table 1 in the annex.

Moreover, in many embodiments having filter coefficients, window coefficients as well as lifting coefficients, which will be subsequently introduced, the Figs. given are not required to be implemented as precisely as given. In other words, in other embodiments of an analysis filterbank as well as a synthesis filterbank and related embodiments of the present invention, also other window functions may be implemented, which are filter coefficients, window coefficients and other coefficients, such as lifting coefficients, which are different from the coefficients given below in the annex, as long as the variations are within the third digit following the comma or in higher digits, such as the fourth, fifth, etc. digits.

Considering the synthesis window function in the bottom graph of FIG. 5, as previously mentioned, the first M/4=120 window coefficients are set to zero. Afterwards, approximately until index 350, the window function comprises a steep rise, which is followed by more moderate rise up to an index of approximately 600. In this context, it should be noted that around an index of 480 (=M), the window function becomes larger than unity or larger than one. Following index 600 until approximately sample 1100, the window function falls back from its maximum value to a level of less than 0.1. Over the rest of the definition set, the window function comprises slight oscillations around the value 0.

Figure 6:
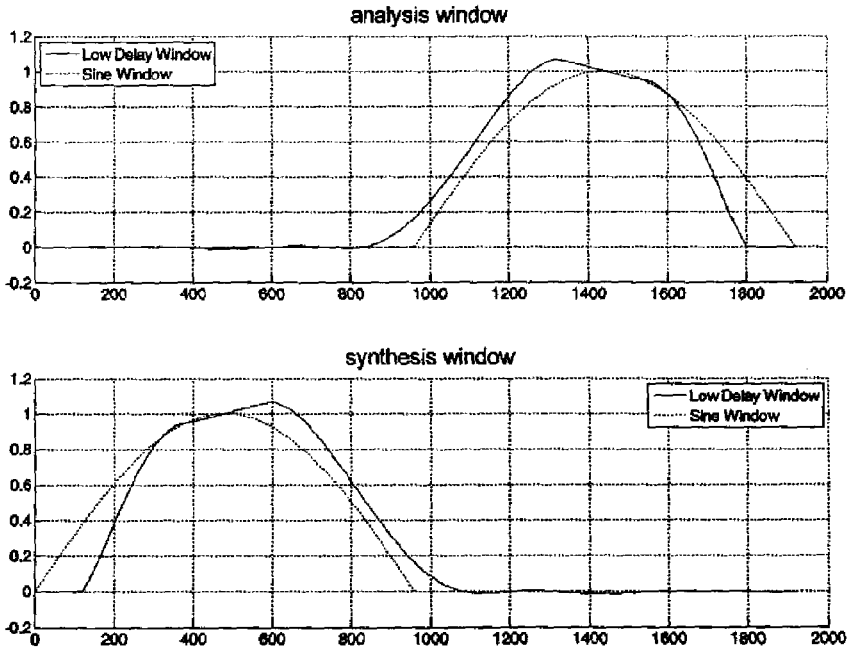
FIG. 6 shows a comparison of an analysis window function and a synthesis window function compared to a sign window function.

FIG. 6 shows a comparison of the window function as shown in FIG. 5 in the case of an analysis window function in the upper graph of FIG. 6, and in the case of a synthesis window function in the lower graph of FIG. 6. Moreover, as a dotted line, two graphs also comprise the so-called sine window function, which is for instance, employed in the aforementioned ER AAC codecs AAC LC and AAC LD. The direct comparison of the sine window and the low-delay window function as shown in the two graphs of FIG. 6 illustrate the different time objects of the time window as explained in the context of FIG. 5. Apart from the fact that the sine window is only defined over 960 samples, the most striking difference between the two window functions shown in the case of an embodiment of an analysis filterbank (upper graph) and in the case of a synthesis filterbank (lower graph) is that the sine window frame function is symmetric about its respective midpoint of the shortened definition set and comprises in the first 120 elements of the definition set (mostly) window coefficients being larger than zero. In contrast, as previously explained, the low-delay window comprises 120 (ideally) zero-valued windowed coefficients and is significantly asymmetric with respect its respective midpoint of the prolonged definition set compared to the definition set of the sine window.

There is a further difference, which distinguishes the low-delay window from the sine window, while both windows approximately acquire a value of approximately 1 and a sample index of 480 (=M), the low-delay window function reaches a maximum of more than one approximately 120 samples after becoming larger than 1 and a sample index of approximately 600 (=M+M/4; M=480), while the symmetric sine window decreases symmetrically down to 0. In other words, the samples which will be treated, for instance by multiplying with zero in a first frame will be multiplied in the following frame with values greater than 1 due to the overlapping mode of operation and the sample advantage value of M=480 in these cases.

A further description of further low-delay windows will be given, which can for instance be employed in other embodiments of an analysis filterbank or a synthesis filterbank 200, the concept of the delay reduction which is achievable with the window functions shown in FIGS. 5 and 6 will be explained with reference to the parameter M=480, N=960 having M/4=120 zero-valued or sufficiently low values. In the analysis window shown in the upper graph of FIG. 6, the parts that access future input values (sample indices 1800 to 1920) is reduced by 120 samples. Correspondingly, in the synthesis window in the lower graph of FIG. 6, the overlap with past output samples, which would require a corresponding delay in the case of a synthesis filterbank is reduced by another 120 samples. In other words, in the case of a synthesis window the overlap with the past output samples, which is needed to complete the overlap/add operation or to finish the overlap/add along with the reduction of 120 samples in the case of an analysis window will be resulting an overall delay reduction of 240 samples in the case of a system comprising both embodiments of an analysis filterbank and a synthesis filterbank.

The extended overlap, however, does not result in any additional delay as it only involves adding values from the past, which can easily be stored without causing additional delay, at least on the scale of the sampling frequency. A comparison of the time of sets of the traditional sine window and the low-delay window shown in FIGS. 5 and 6 illustrate this.

Figure 7:
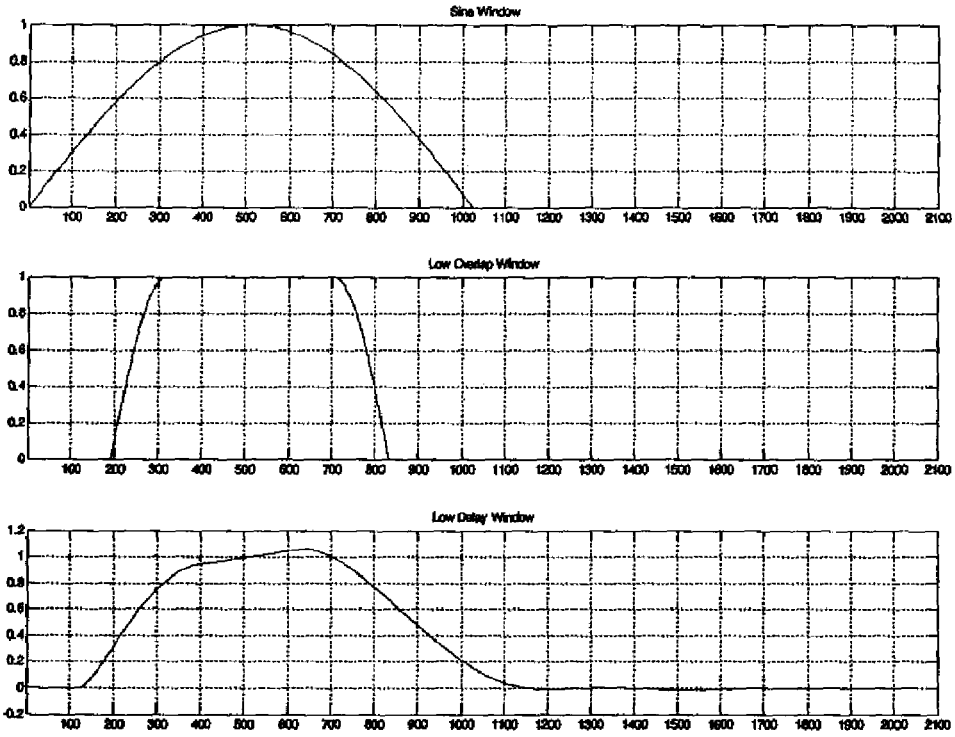
FIG. 7 shows a further comparison of different window functions.

FIG. 7 comprises in three graphs, three different window functions. To be more precise, the upper graph of FIG. 7 shows the aforementioned sine window, whereas the middle graph shows the so-called low-overlap window and the bottom graph shows the low-delay window. However, the three windows shown in FIG. 7 correspond to a sample advance value or parameter M=512 (N=2M=1024). Once again, the sine window as well as the low-overlap window in the two topmost graphs in FIG. 7 are defined only over limited or shortened definition sets comprising 1024 sample indices as compared to the low delay window function as shown in the bottom graph of FIG. 7, which is defined over 2048 sample indices.

The plots of the window shapes of a sine window, the low-overlap window and the low-delay window in FIG. 7 comprise more of less the same characteristics as previously discussed in terms of the sine window and the low delay window. To be more precise, the sine window (top graph in FIG. 7) is once again symmetric with regard to the appropriate midpoint of the definition set lying between indices 511 and 512. The sine window acquires a maximum value at approximately the value M=512 and drops down from the maximum value back to zero again at the border of the definition set.

In the case of the low-delay window shown in the bottom graph of FIG. 7, this low-delay window comprises 128 zero-valued window coefficients, which is once again a quarter of the sample advance value M. Moreover, the low-delay window acquires a value of approximately 1 at a sample index M, while the maximum value of the window coefficients is acquired approximately 128 sample indices n after becoming larger than one in terms of an increasing index (around index 640). Also with respect to the other features of the plot of the window function, the window function for M=512 in the bottom graph of FIG. 7 does not significantly differ from the low delay windows for M=480 shown in FIGS. 5 and 6, apart from an optional shift due to the longer definition sets (2048 indices compared to 1920 indices). The low-delay window shown in the bottom graph of FIG. 7 comprises the values given in table 4 in the annex.

However, as previously explained, it is not necessary for embodiments of a synthesis filterbank or an analysis filterbank to implement the window function with the precise values as given in table 4. In other words, window coefficients may differ from the values given in table 4, as long as they hold the relations given in table 3 in the annex. Moreover, in embodiments of the present invention also variations with respect to the window coefficients can easily be implemented, as long as the variations are within the third digit following the comma, or in higher digits such as the fourth, fifth, etc. digits, as previously explained.

In the middle graph of FIG. 7 the low-overlap window has not been described so far. As previously mentioned the low delay window also comprises a definition set comprising 1024 elements. Moreover, the low-overlap window also comprises at the beginning of a definition set and at the end of a definition set, a connected subset in which the low-overlap window vanishes. However, after this connected subset in which the low-overlap window vanishes, a steep rise or decay follows, which comprises only a little over 100 sample indices each. Moreover, the symmetric low-overlap window does not comprise values larger than 1 and may comprise a lesser stop-band attenuation compared to window functions as employed in some embodiments.

In other words, the low-overlap window comprises a significant lower definition set while having the same sample advance value, as the low delay window and does not acquire values larger than one. Moreover, both the sine window and the low-overlap window are with respect to their respective midpoints of the definition sets orthogonal or symmetric, while the low-delay window is asymmetric in the described manner over the midpoint of its definition set.

Figure 8:
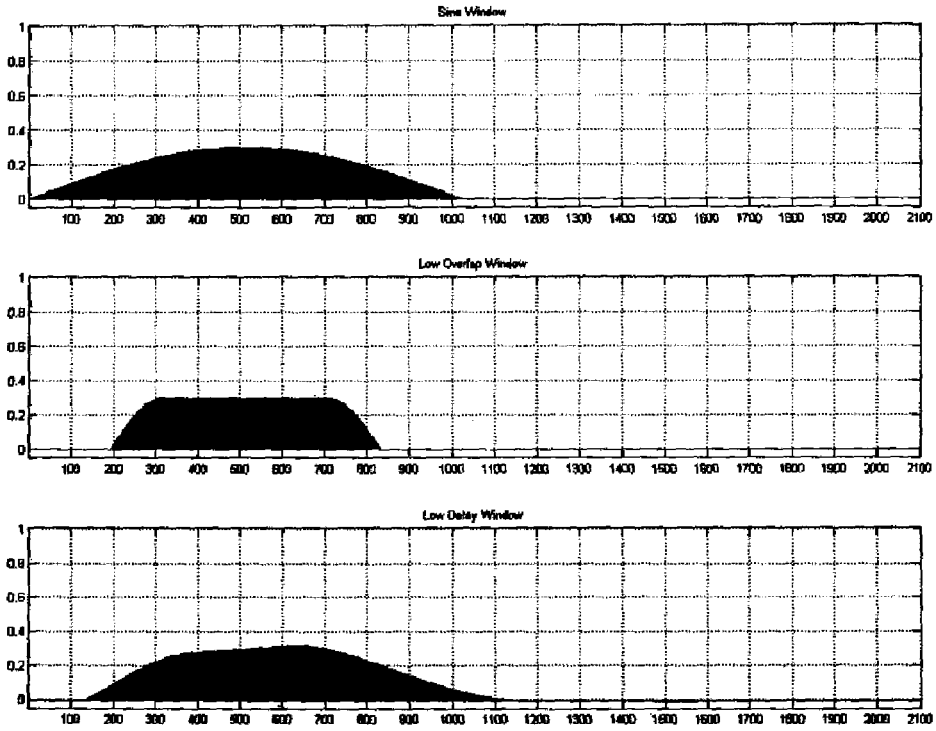
FIG. 8 shows a comparison of a pre-echo behavior for the three different window functions shown in FIG. 7.

The low overlap window was introduced in order to eliminate pre-echo artifacts for transients. The lower overlap avoids spreading of the quantization noise before the signal attack, as illustrated in FIG. 8. The new low-delay window, however, has the same property, but offers a better frequency response, as will be apparent by comparing the frequency responses shown in FIGS. 10 and 11. Therefore, the low delay window is capable of replacing both traditional AAC LD windows, i.e. the sign window at the low-overlap window, so that a dynamic window shape adaptation is not required to be implemented anymore.

FIG. 8 shows for the same window functions shown in FIG. 7 in the same order of graphs an example of quantization noise spreading for the different window shapes of the sine window or the low-overlap window and the low-delay window. The pre-echo behavior of the low-delay window as shown in the bottom graph of FIG. 8 is similar to the low overlap window behavior as shown in the middle graph of FIG. 8, while the pre-echo behavior of the sine window in the top graph of FIG. 8 comprises significant contributions in the first 128 (M=512) samples.

In other words, employing a low-delay window in an embodiment of a synthesis filterbank or an analysis filterbank, may result in an advantage concerning an improved pre-echo behavior. In the case of an analysis window, the path that accesses future input values and, thus would require a delay, are reduced by more than a sample and preferably by 120/128 samples in the case of a block length or sample advance value of 480/512 samples, such that it reduces the delay in comparison to the MDCT (Modified Discrete Cosine Transform). At the same time it improves the pre-echo behaviors, since a possible attack in the signal, which might be in those 120/128 samples, would only appear one block or one frame later. Correspondingly, in the synthesis window the overlap with past output samples to finish their overlap/add operation, which would also require a corresponding delay, is reduced by another 120/128 samples, resulting in an overall delay reduction of 240/256 samples. This also results in an improved pre-echo behavior since those 120/128 samples would otherwise contribute to the noise spread into the past, before a possible attach. Altogether this means, a pre-echo appears possibly one block or frame later, and the resulting pre-echo from the synthesis side alone is 120/128 samples shorter.

Figure 9:
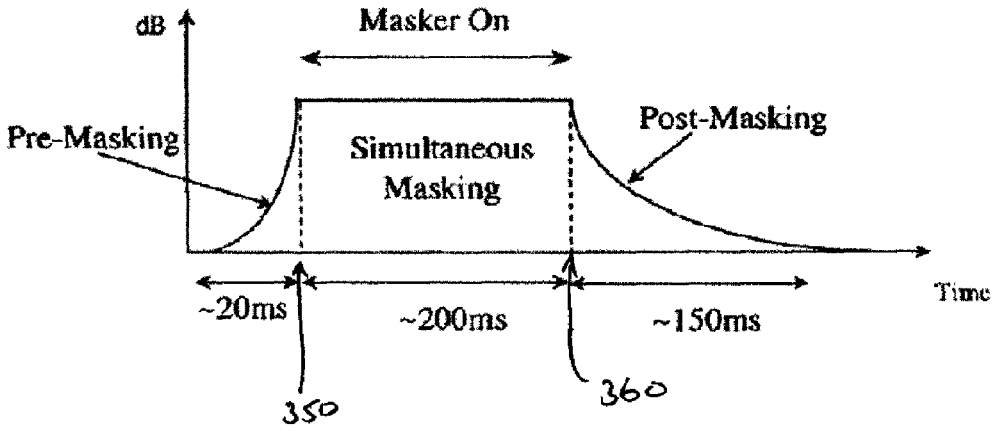
FIG. 9 shows schematically the general temporal masking property of the human ear.

Such a reduction, which might be achievable by employing such a low-delay window, as described in FIGS. 5 to 7, depending on the concrete implementation of an embodiment of a synthesis filterbank or an analysis filterbank can be especially useful when considering the human hearing characteristics, especially in terms of masking. To illustrate this, FIG. 9 shows a schematic sketch of the masking behavior of the human ear. To be more precise, FIG. 9 shows a schematic representation of the hearing threshold level of the human ear, as a function of time, when a sound or a tone having a specific frequency is present during a period of time of approximately 200 ms.

However, shortly before the aforementioned sound or tone is present, as indicated by the arrow 350 in FIG. 9, a pre-masking is present for a short period of time of approximately 20 ms, therefore, enabling a smooth transition between no masking and the masking during the presence of the tone or sound, which is sometimes referred to as simultaneous masking. During the time in which the sound or tone is present, the masking is on. However, when the tone or sound disappears, as indicated by the arrow 360 in FIG. 9, the masking is not immediately lifted, but during a period of time or approximately 150 ms, the masking is slowly reduced, which is also sometimes referred to as post-masking.

That is, FIG. 9 shows a general temporal masking property of human hearing, which comprises a phase of pre-masking as well as a phase of post-masking before and after a sound or tone being present. Due to the reduction of the pre-echo behavior by incorporating a low-delay window in an embodiment of an analysis filterbank 100 and/or a synthesis filterbank 200, audible distortions will be severely limited in many cases as the audible pre-echoes will, at least to some extent, fall into the pre-masking period of the temporal masking effect of the human ear as shown in FIG. 9.

Figure 10:
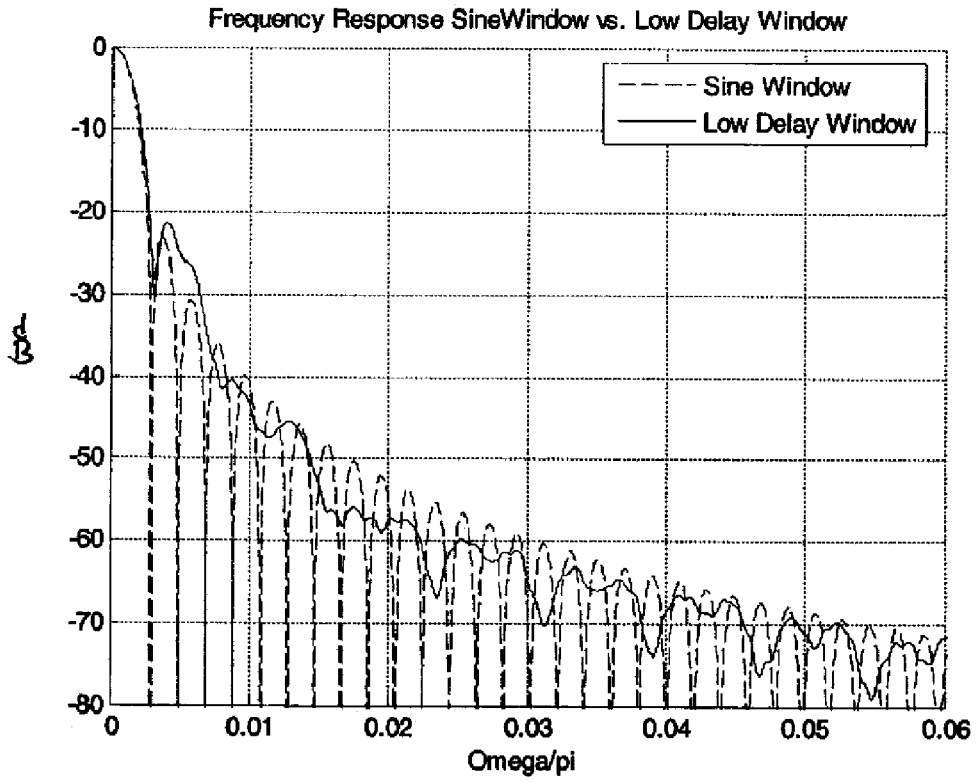
FIG. 10 shows a comparison of the frequency response of a sign window and low delay window.

Moreover, employing a low-delay window function as illustrated in FIGS. 5 to 7, described in more detail with respect to relations and values in tables 1 to 4 in the annex, offers a frequency response, which is similar to that of a sine window. To illustrate this, FIG. 10 shows a comparison of the frequency response between the sine window (dashed line) and an example of a low-delay window (solid line). As can be seen by comparing the two frequency responses of the two aforementioned windows in FIG. 10, the low-delay window is comparable in terms of the frequency selectivity to the sine window. The frequency response of the low-delay window is similar or comparable to the frequency response of the sine window, and much better than the frequency response of the low-overlap window, as in comparison with the frequency responses shown in FIG. 11 illustrate.

Figure 11:
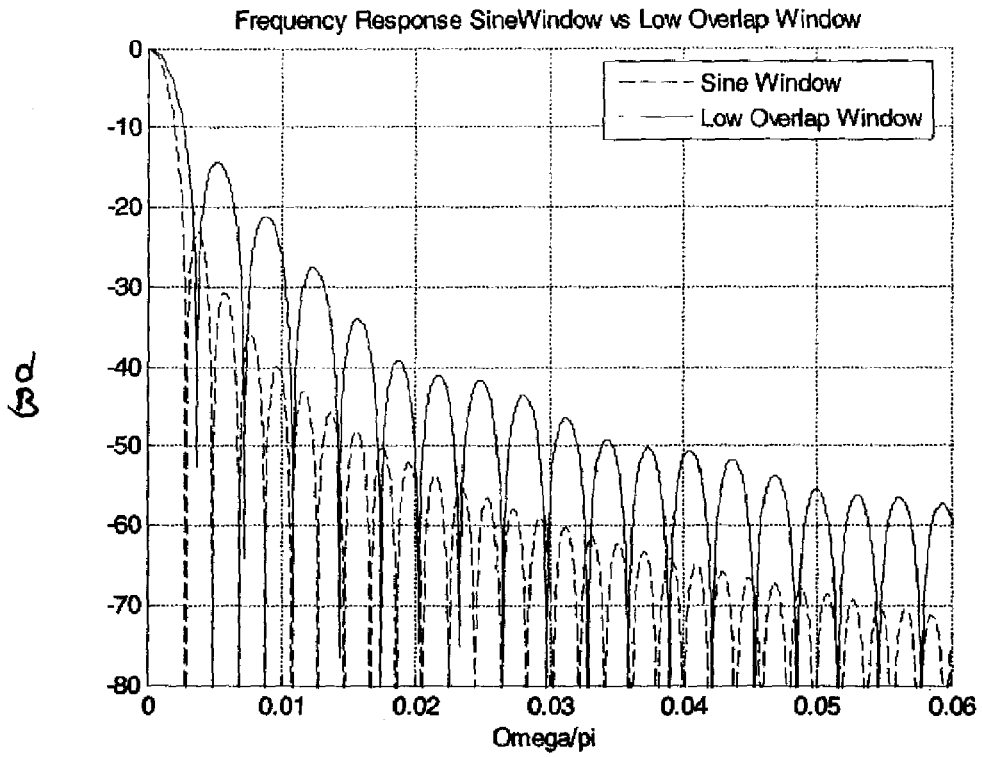
FIG. 11 shows a comparison of a frequency response of a sine window and a low overlap window.

To be more precise, FIG. 11 shows a comparison of the frequency responses between the sine window (dashed line) and the low-overlap window (solid line). As can be seen, the solid line of the frequency response of the low-overlap window is significantly larger than the corresponding frequency response of the sine window. As the low-delay window and the sine window show comparable frequency responses, which can be seen by comparing the two frequency responses shown in FIG. 10, also a comparison between the low-overlap window and the low-delay window can easily be drawn, as the plot shown in FIGS. 10 and 11 both show the frequency response of the sine window and comprise the same scales with respect to the frequency axis and the intensity axis (db). Accordingly, it can easily be concluded that the sine window which can easily implemented in an embodiment of a synthesis filterbank as well as in an embodiment of an analysis filterbank offers compared to the low-overlap window a significantly better frequency response.

As the comparison of the pre-echo behavior shown in FIG. 8 is also shown at the low-delay window offers a considerable advantage compared to pre-echo behavior, while the pre-echo behavior of the low-delay window is comparable to that of a low-overlap window, the low-delay window represents an excellent tradeoff between the two aforementioned windows.

As a consequence, the low-delay window, which can be implemented in the framework of an embodiment of an analysis filterbank as well as an embodiment of a synthesis filterbank and related embodiments, due to this trade-off, the same window function can be used for transient signals, as well as tonal signals, so that no switching between different block lengths or between different windows is necessary. In other words, embodiments of an analysis filterbank, a synthesis filterbank and related embodiments offer the possibility of building an encoder, a decoder and further systems that do not require switching between different sets of operational parameters such as different block sizes, or block lengths, or different windows or window shapes. In other words, by employing an embodiment of an analysis filterbank or a synthesis filterbank with the low-delay window, the construction of an embodiment of an encoder, decoder and related systems can considerably simplified. As an additional opportunity, due to the fact that no switching between different sets of parameters is required, signals from different sources can be processed in the frequency-domain instead of the time-domain, which requires an additional delay as will be outlined in the following sections.

In yet other words, employing an embodiment of a synthesis filterbank or an analysis filterbank offers the possibility of benefiting from an advantage of low computational complexity in some embodiments. To compensate for the lower delay as compared to a MDCT with, for instance, a sine window, a longer overlap is introduced without creating an additional delay. Despite the longer overlap, and correspondingly, a window of about twice the length of the corresponding sine window with twice the amount of overlap and according benefits of the frequency selectivity as outlined before, an implementation can be obtained with only minor additional complexity, due to a possible increase size of block length multiplications and memory elements. However, further details on such an implementation will be explained in the context of FIGS. 19 to 24.

Figure 12:
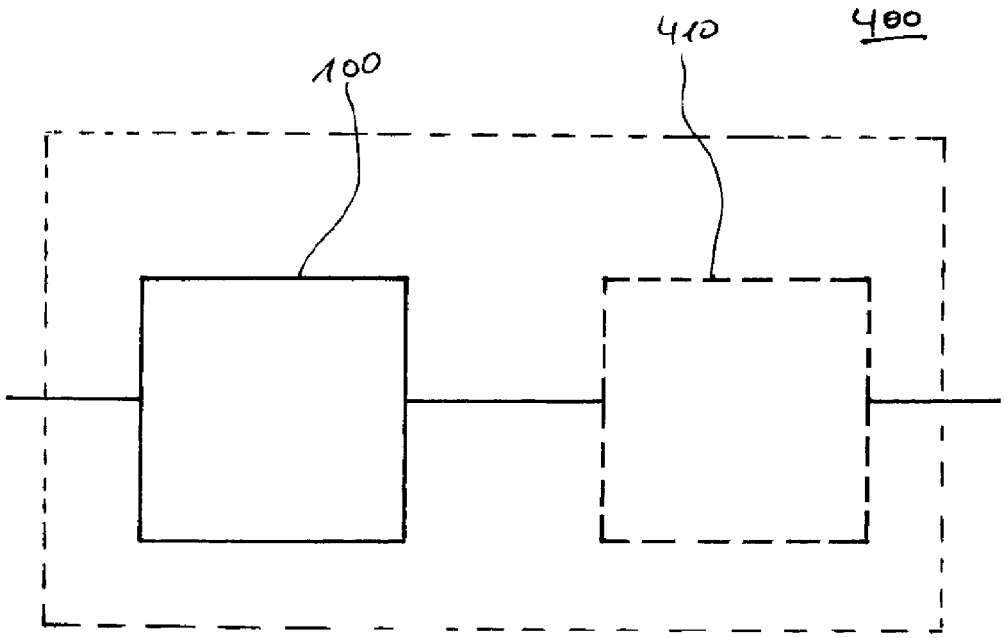
FIG. 12 shows an embodiment of an encoder.

FIG. 12 shows a schematic block diagram of an embodiment of an encoder 400. The encoder 400 comprises an embodiment of an analysis filterbank 100 and, as an optional component, an entropy encoder 410, which is configured to encod the plurality of output frames provided by the analysis filterbank 100 and configured to output a plurality of encoded frames based on the output frames. For instance, the entropy encoder 410 may be implemented as a Huffman encoder or another entropy encoder utilizing an entropy-efficient coding scheme, such as the arithmetic coding-scheme.

Due to employing an embodiment of an analysis filterbank 100 in the framework of an embodiment of an encoder 400, the encoder offers an output of the number of bands N while having a reconstructional delay of less than 2N or 2N−1. Moreover, an in principle an embodiment of an encoder also represents a filter, an embodiment of an encoder 400 offers a finite impulse response of more than 2N samples. That is, an embodiment of an encoder 400 represents an encoder which is capable of processing (audio) data in a delay-efficient way.

Depending on the concrete implementation of an embodiment of an encoder 400 as shown in FIG. 12, such an embodiment may also comprise a quantizer, filter or further components to pre-process the input frames provided to the embodiment of the analysis filterbank 100 or to process the output frames before entropy encoding the respective frames. As an example, an additional quantizer can be provided to an embodiment of an encoder 400 before the analysis filterbank 100 to quantize the data or to requantize the data, depending on the concrete implementation and field of application. As an example for processing behind the analysis filterbank, an equalization or another gain adjustment in terms of the output frames in the frequency-domain can be implemented.

Figure 13:
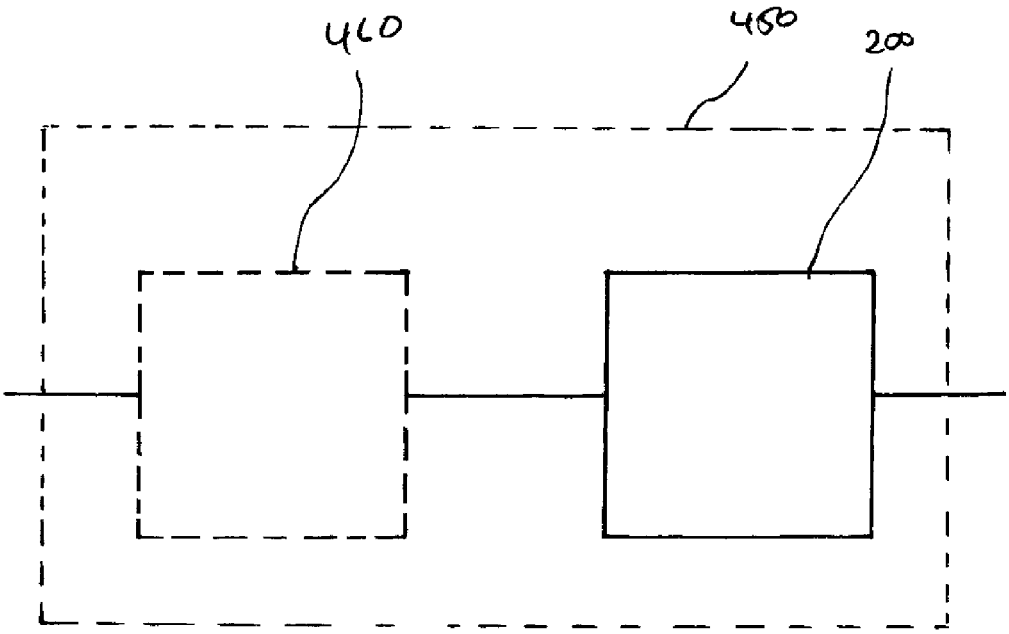
FIG. 13 shows an embodiment of a decoder.

FIG. 13 shows an embodiment of a decoder 450 comprising an entropy decoder 460 as well as an embodiment of a synthesis filterbank 200, as previously described. The entropy decoder 460 of the embodiment of the decoder 450 represents an optional component, which can, for instance, be configured for decoding a plurality of encoded frames, which might, for instance, be provided by an embodiment of an encoder 400. Accordingly, the entropy decoder 460 might by a Huffman or algorithmic decoder or another entropy decoder based on an entropy-encoding/decoding scheme, which is suitable for the application of the decoder 450 at hand. Moreover, the entropy decoder 460 can be configured to provide a plurality of input frames to the synthesis filterbank 200, which, in turn, provides a plurality of added frames at an output of the synthesis filterbank 200 or at an output of the decoder 450.

However, depending on the concrete implementation, the decoder 450 may also comprise additional components, such as a dequantizer or other components such as a gain adjuster. To be more precise, in between the entropy decoder 460 and the synthesis filterbank, a gain adjuster can be implemented as an optional component to allow a gain adjustment or equalization in the frequency-domain before the audio data will be transferred by the synthesis filterbank 200 into the time-domain. Accordingly, an additional quantizer may be implemented in a decoder 450 after the synthesis filterbank 200 to offer the opportunity of requantizing the added frames prior to provide the optionally requantized added frames to an external component of the decoder 450.

Embodiments of an encoder 400 as shown in FIG. 12 and embodiments of a decoder 450 as shown in FIG. 13 can be applied in many fields of audio encoding/decoding as well as audio processing. Such embodiments of an encoder 400 and a decoder 450 can, for instance, be employed in the field of high-quality communications.

Both, an embodiment of an encoder or coder as well as an embodiment for a decoder offer the opportunity of operating the said embodiment without having to implement a change of parameter such as switching the block length or switching between different windows. In other words, compared to other coders and decoders, an embodiment of the present invention in the form of a synthesis filterbank, an analysis filterbank and related embodiments is by far not required to implement different block lengths and/or different window functions.

Initially defined in the version 2 of the MPEG-4 audio specification, a low-delay AAC coder (AAC LD) has, over time, increasing adaptation as a full-bandwidth high-quality communications coder, which is not subjected to limitations that usual speech coders have, such as focusing on single-speakers, speech material, bad performance for music signals, and so on. This particular codec is widely used for video/teleconferencing in other communication applications, which, for instance, have triggered the creation of a low-delay AAC profile due to industry demand. Nonetheless, an enhancement of the coders' coding efficiency is of wide interest to the user community and is the topic of the contribution, which some embodiments of the present invention are capable of providing.

Currently, the MPEG-4 ER AAC LD codec produces good audio quality at a bitrate range of 64 kbit/s to 48 kbit/s per channel. In order to increase the coders' coding efficiency to be competitive with speech coders using the proven spectral band replication tool (SBR) is an excellent choice. An earlier proposal on this topic, however, was not pursued further in the course of the standardization.

In order not to lose the low codec delay that is crucial for many applications, such as serving telecommunication applications, additional measures have to be taken. In many cases, as a requirement for the development of respective coders, it was defined that such a coder should be able to provide an algorithmic delay as low as 20 ms. Fortunately, only minor modifications have to be applied to existing specifications in order to meet this goal. Specifically, only two simple modifications turn out to be necessary, of which one is presented in this document. A replacement of the AAC LD coder filterbank by an embodiment of a low-delay filterbank 100, 200 alleviates a significant delay increase in many applications.

Accompanying by a slight modification to the SBR tool reduces the added delay by introducing this into the coder, such as the embodiment of the encoder 400 as shown in FIG. 12.

As a result, the enhanced AAC ELD coder or AAC EL decoder comprising embodiments of low-delay filterbanks, exhibit a delay comparable to that of a plane AAC LD coder, but is capable of saving a significant amount of the bitrate at the same level of quality, depending on the concrete implementation. To be more precise, an AAC ELD coder may be capable of saving up to 25% or even up to 33% of the bitrate at the same level of quality compared to an AAC LD coder.

Embodiments of a synthesis filterbank or an analysis filterbank can be implemented in a so-called enhanced low-delay AAC codec (AAC ELD), which is capable of extending the range of operation down to 24 kbit/s per channel, depending on the concrete implementation and application specification. In other words, embodiments of the present invention can be implemented in the framework of a coding as an extension of the AAC LD scheme utilizing optionally additional coding tools. Such an optional coding tool is the spectral band replication (SBR) tool, which can be integrated or additionally be employed in the framework of both an embodiment of an encoder as well as an embodiment of a decoder. Especially in the field of low bitrate coding, SBR is an attractive enhancement, as it enables an implementation of a dual rate coder, at which the sampling frequency for a lower part of the frequency spectrum is encoded with only half of the sampling frequency of the original sampler. At the same time, SBR is capable of encoding a higher spectral range of frequencies based on the lower part, such that the overall sampling frequency can, in principle, be reduced by a factor of 2.

In other words, employing SBR tools make an implementation of delay-optimized components especially attractive and beneficial, as due to the reduced sampling frequency of the dual core coder, the delay saved may, in principle, reduce the overall delay of the system by a factor of 2 of the saved delay.

Accordingly, a simple combination of AAC LD and SBR would, however, result in a total algorithmic delay of 60 ms, as will be explained in more detail later on. Thus, such a combination would render the resulting codec unsuitable for communication applications, as generally speaking, a system delay for interactive two-way communications should not exceed 50 ms.

By employing an embodiment of an analysis filterbank and/or of a synthesis filterbank, and, therefore, replacing the MDCT filterbank by one of these dedicated low-delay filterbanks may, therefore, be capable of alleviating the delay increase caused by implementing a dual rate coder as previously explained. By employing the aforementioned embodiments, an AAC ELD coder may exhibit the delay well within the acceptable range for bi-directional communication, while saving of up to 25% to 33% of the rate compared to a regular AAC LD coder, while maintaining the level of audio quality.

Therefore, in terms of its embodiments of a synthesis filterbank, an analysis filterbank and the other related embodiments, the present application describes a description of possible technical modifications along with an evaluation of an achievable coder performance, at least in terms of some of the embodiments of the present invention. Such a low-delay filterbank is capable of achieving a substantial delay reduction by utilizing a different window function, as previously explained, with multiple overlaps instead of employing a MDCT or IMDCT, while at the same time offering the possibility of perfect reconstruction, depending on the concrete implementation. An embodiment of such a low-delay filterbank is capable of reducing the reconstruction delay without reducing the filter length, but still maintaining the perfect reconstruction property under some circumstances in the case of some embodiments.

The resulting filterbanks have the same cosine modulation function as a traditional MDCT, but can have longer window functions, which can be non-symmetric or asymmetric with a generalized or low reconstruction delay. As previously explained, an embodiment of such a new low-delay filterbank employing a new low-delay window may be capable of reducing the MDCT delay from 960 samples in the case of a frame size of M=480 samples to 720 samples. In general, an embodiment of the filterbank may be capable of reducing the delay of 2M to (2M−M/2) samples by implementing M/4 zero-valued window coefficients or by adapting the appropriate components, as previously explained, accordingly such that the first subsections 150-1, 260-1 of the corresponding frames comprise M/4 samples less than the other subsections.

Examples for these low-delay window functions have been shown in the context of FIGS. 5 to 7, wherein FIGS. 6 and 7 comprise the comparison with the traditional sign window as well. However, it should be noted that the analysis window is simply a time-reverses replica of the synthesis window as previously explained.

In the following, a technical description of a combination of a SBR tool with a AAC LD coder in order to achieve a low bitrate and low delay audio coding system will be given. A dual rate system is used to achieve a higher coding gain compared to a single rate system, as explained earlier on. By employing a dual rate system, a more energy efficient encoding as possible having lesser frequency bands will be provided by the corresponding coder, which leads to a bitwise reduction due to some extent, removing redundant information from the frames provided by the coder. To be more precise, an embodiment of a low-delay filterbank as previously described is used in the framework of the AAC LD core coder to arrive at an overall delay that is acceptable for communication applications. In other words, in the following, the delay will be described in terms of both the AAC LD core and the AAC ELD core coder.

By employing an embodiment of a synthesis filterbank or an analysis filterbank, a delay reduction can be achieved by implementing a modified MDCT window/filterbank. Substantial delay reduction is achieved by utilizing the aforementioned and described different window functions with multiple overlap to extend the MDCT and the IMDCT to obtain a low-delay filterbank. The technique of low-delay filterbanks allows utilizing a non-orthogonal window with multiple overlap. In this way, it is possible to obtain a delay, which is lower than the window length. Hence, a low delay with a still long impulse response resulting in good frequency selectivity can be achieved.

The low-delay window for a frame size of M=480 samples reduces the MDCT delay from 960 samples to 720 samples, as previously explained.

To summarize, in contrast to a MPEG-4 ER AAC LD codec, an embodiment of an encoder and an embodiment of a decoder 450 may under certain circumstances be capable of producing a good audio quality at a very small bit range. While the aforementioned ER AAC LD codec produces good audio quality as a bit range of 64 kb/sec to 48 kb/sec per channel, the embodiments of the encoder 400 and the decoder 450, as described in the present document, can be capable of providing an audio coder and decoder, which is under some circumstances able to produce at an equal audio quality at even lower bitrates of about 32 kb/sec per channel. Moreover, embodiments of an encoder and decoder have an algorithmic delay small enough to be utilized for two-way communication systems, which can be implemented in existing technology by using only minimum modifications.

Embodiments of the present invention, especially in the form of an encoder 400 and a decoder 450, achieve this by combining existing MPEG-4 audio technology with a minimum number adaptation necessary for low-delay operations necessary for low-delay operation to arrive at embodiments of the present invention. Specifically, the MPEG-4 ER AAC low-delay coder can be combined with a MPEG-4 spectral band replication (SPR) tool to implement embodiments of an encoder 400 and a decoder 450 by considering the described modifications. The resulting increase in algorithmic delay is alleviated by minor modifications of the SPR tool, which will not be described in the present application, and the use of an embodiment of a low-delay core coder filterbank and an embodiment of an analysis filterbank or a synthesis filterbank. Depending on the concrete implementation, such an enhanced AAC LD coder is capable of saving up to 33% of the bitrate at the same level of quality compared to a plain ACC LD coder while retaining low enough delay for a two-way communication application.

Figure 14A:
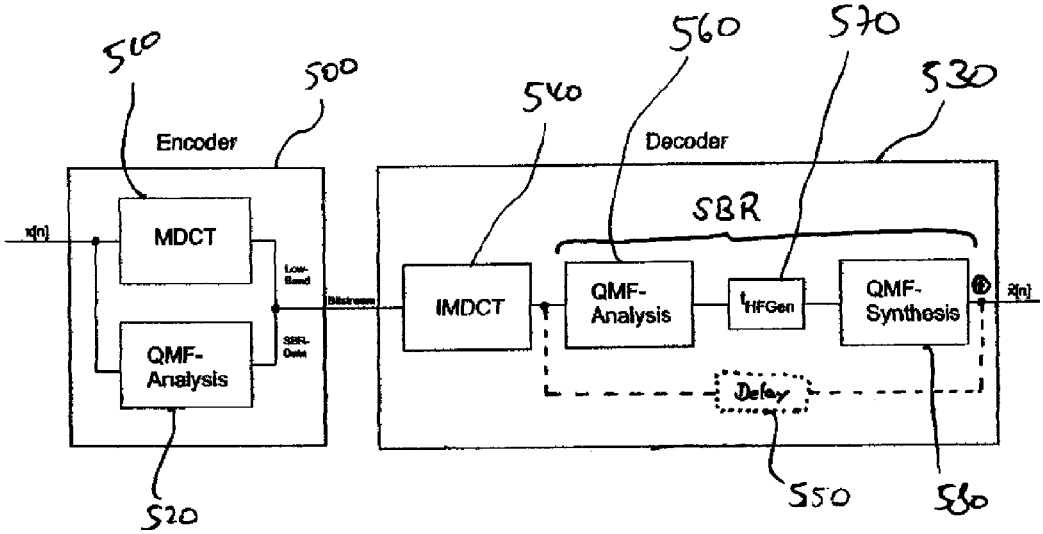
FIG. 14a shows a system comprising an encoder and a decoder.
Figure 14B:
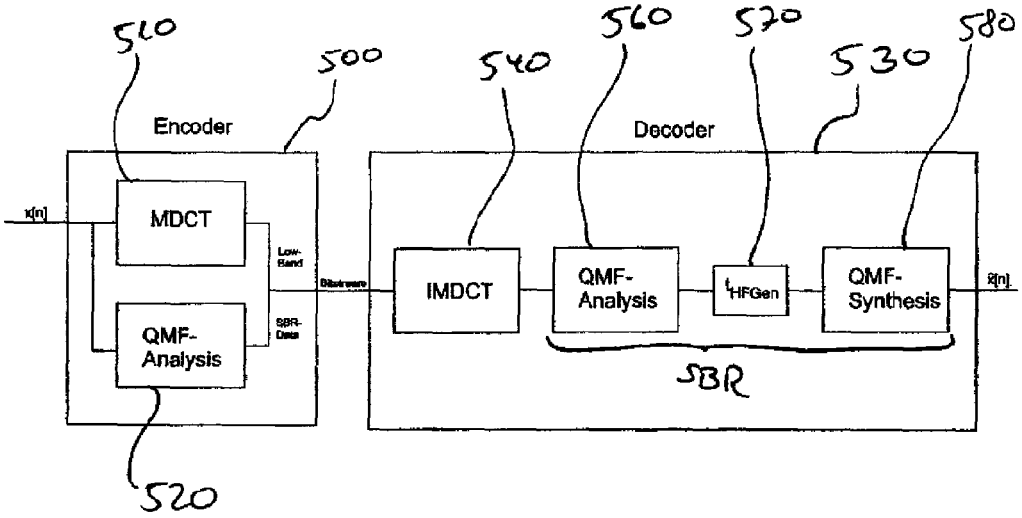

Before a more detailed delay analysis is presented with reference to FIG. 14, a coding system comprising a SBR tool is described. In other words, in this section, all components of a coding system 500 shown in FIG. 14a are analyzed with respect to their contribution to the overall system delay. FIG. 14a gives a detailed overview of the complete system, wherein FIG. 14b puts emphasis on the sources of delay.

The system shown in FIG. 14a comprises an encoder 500, which, in turn, comprises an MDCT time/frequency converter, operates in the dual rate approach as a dual rate coder. Moreover, the encoder 500 also comprises a QMF-analysis filterbank 520, which is part of the SBR tool. Both the MDCT time/frequency converter 510 and the QMF-analysis filterbank (QMF=Quadrature Mirror Filter) are coupled together both in terms of their inputs and their outputs. In other words, both the MDCT converter 510 as well as the QMF-analysis filterbank 520 is provided with the same input data. However, while the MDCT converter 510 provides the low band information, the QMF-analysis filterbank 520 provides the SBR data. Both data are combined into a bit stream and provided to a decoder 530.

The decoder 530 comprises an IMDCT frequency/time converter 540, which is capable of decoding the bit stream to obtain, at least in terms of the low band parts, a time-domain signal, which will be provided to an output of the decoder via a delayer 550. Moreover, an output of the IMDCT converter 540 is coupled to a further QMF-analysis filterbank 560, which is part of a SBR tool of the decoder 530. Furthermore, the SBR tool comprises a HF generator 570, which is coupled to an output of the QMF-analysis filterbank 560 and capable of generating the higher frequency components based on the SBR data of the QMF-analysis filterbank 520 of the encoder 500. An output of the HF generator 570 is coupled to a QMF-synthesis filterbank 580, which transforms the signals in the QMF-domain back into the time domain in which the delayed low band signals are combined with the high band signals, as provided by the SBR tool of the decoder 530. The resulting data will then be provided as the output data of the decoder 530.

Compared to FIG. 14a, FIG. 14b emphasizes the delay sources of the system shown in FIG. 14a. To be even more precise, depending on the concrete implementation of the encoder 500 and the decoder 530, FIG. 14b illustrates the delay sources of the MPEG-4 ER AAC LD system comprising a SBR tool. The appropriate coder of this audio system utilizes a MDCT/IMDCT filterbank for a time/frequency/time transformation or conversion with a frame size of 512 or 480 samples. The results in reconstruction delays, therefore, which are equal to 1024 are 960 samples, depending on the concrete implementation. In case of using the MPEG-4 ER AAC LD codec in combination with SBR in a dual rate mode, the delay value has to be doubled due to the sampling rate conversion.

A more detailed overall delay analysis and requirement shows that in the case of an AAC LD codec in combination with a SBR tool, an overall algorithmic delay of 16 ms at a sampling rate of 48 kHz and the core coder frame size of 480 samples will be the result. FIG. 15 comprises a table, which gives an overview of the delay produced by the different components assuming a sampling rate of 48 kHz and the core coder frame size of 480 samples, wherein the core coder effectively runs at a sampling rate of 24 kHz due to the dual rate approach.

The overview of the delay sources in FIG. 15 shows that in the case of an AAC LD codec along with a SBR tool, an overall algorithmic delay of 16 ms would result, which is substantially higher than what is permissible for telecommunication applications. This evaluation comprises the standard combination of the AAC LD coder along with the SBR tool, which includes the delay contributions from the MDCT/IMDCT dual rate components, the QMF components and the SBR overlap components.

However, using the adaptations described previously and by employing embodiments as described before, an overall delay of only 42 ms is achievable, which includes the delay contributions from the embodiments of the low-delay filterbanks in the dual rate mode (ELD MDCT+IMDCT) and the QMF components.

As with respect to some delay sources in the framework of the AAC core coder as well as with respect to the SBR module, the algorithmic delay of the AAC LD core can be described as being 2M samples, wherein, once again, M is the basic frame length of the core coder. In contrast, the low-delay filterbank reduces the number of samples by M/2 due to introducing the initial sections 160, 270 or by introducing an appropriate number of zero-valued or other values in the framework of the appropriate window functions. In the case of the usage of an AAC core in combination with a SBR tool, the delay is doubled due to the sampling rate conversion of a dual rate system.

To clarify, some of the numbers given in the table in FIG. 15, in the framework of a typical SBR decoder, two delay sources can be identified. On the one hand, the QMF components comprise a filterbank's reconstruction delay of 640 samples. However, since the framing delay of 64−1=63 samples is already introduced by the core coder itself, it can be subtracted to obtain the delayed value given in the table in FIG. 15 of 577 samples.

On the other hand, the SBR HF reconstruction causes an additional delay with a standard SBR tool of 6 QMF slots due to the variable time grid. Accordingly, the delay is in the standard SBR, six times 64 samples of 384 samples.

By implementing embodiments of filterbanks as well as implementing an improved SBR tool, a delay saving of 18 ms can be achieved by not implementing a straightforward combination of a AAC LD coder along with a SBR tool having an overall delay of 60 ms, but an overall delay of 42 ms is achievable. As previously mentioned, these figures are based on a sampling rate of 48 kHz and on a frame length of M=480 samples. In other words, apart from the so-called framing delay of M=480 samples in the aforementioned example, the overlap delay, which is a second important aspect in terms of delay optimization, can be significantly reduced by introducing an embodiment of a synthesis filterbank or an analysis filterbank to achieve a low bitrate and a low-delay audio coding system.

Embodiments of the present invention can be implemented in many fields of application, such as conferencing systems and other bi-directional communication systems. At the time of its conception around 1997, the delayed requirements set for a low-delay general audio coding scheme, which lead to the design of the AAC LD coder, were to achieve an algorithmic delay of 20 ms, which is met by the AAC LD when running at a sample rate of 48 kHz and a frame size of M=480. In contrast to this, many practical applications of this codec, such as teleconferencing, employ a sampling rate of 32 kHz and, thus, work with a delay of 30 ms. Similarly, due to the growing importance of IP-based communications, the delay requirements of modern ITU telecommunication codec allow delay of, roughly speaking, 40 ms. Different examples include the recent G.722.1 annex C coder with an algorithmic delay of 40 ms and the G.729.1 coder with an algorithmic delay of 48 ms. Thus, the overall delay achieved by an enhanced AAC LD coder or AAC ELD coder comprising an embodiment of a low-delay filterbank can be operated to fully lie within the delay range of common telecommunication coders.

Figure 16:
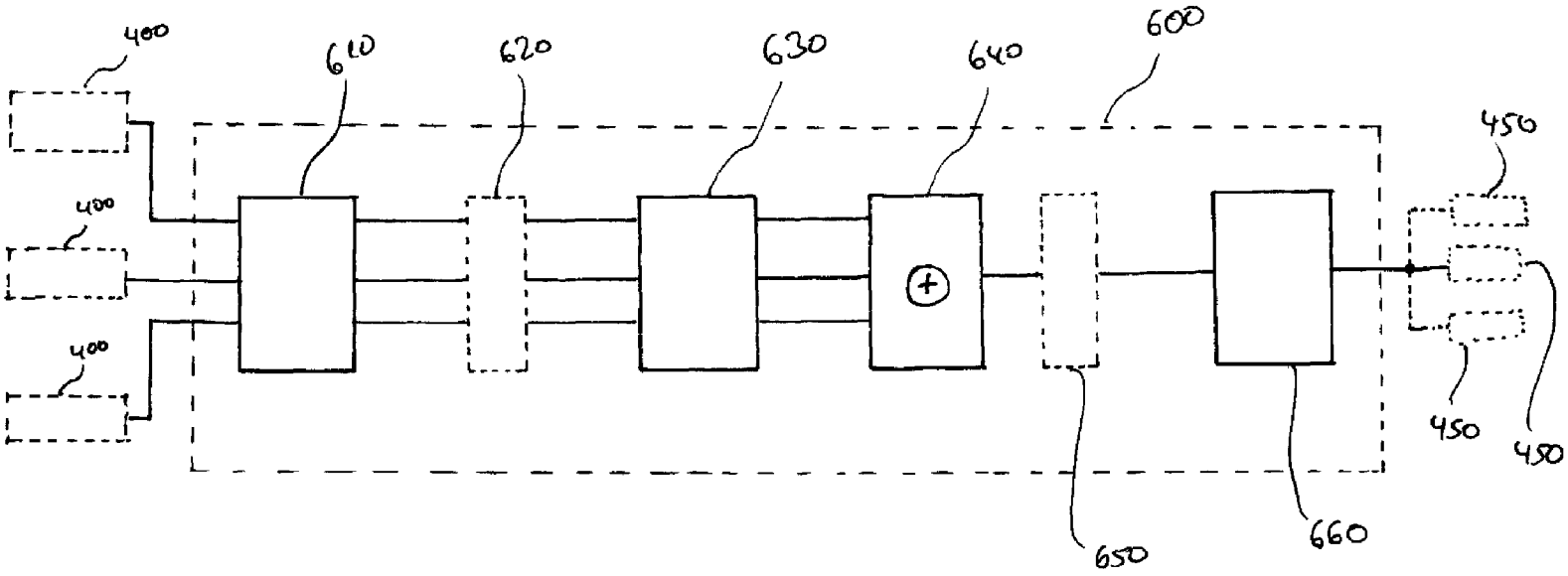
FIG. 16 shows an embodiment of a conferencing system comprising an embodiment of a mixer.

FIG. 16 shows a block diagram of an embodiment of a mixer 600 for mixing a plurality of input frames, wherein each input frame is a spectral representation of a corresponding time-domain frame being provided from a different source. For instance, each input frame for the mixer 600 can be provided by an embodiment of an encoder 400 or another appropriate system or component. It should be noted that in FIG. 16, the mixer 600 is adapted to receive input frames from three different sources. However, this does not represent any limitation. To be more precise, in principle, an embodiment of a mixer 600 can be adapted or configured to process and receive an arbitrary number of input frames, each input frame provided by a different source, such as a different encoder 400.

The embodiment of the mixer 600 shown in FIG. 16 comprises an entropy decoder 610, which is capable of entropy decoding the plurality of input frames provided by the different sources. Depending on the concrete implementation, the entropy decoder 610 can for instance be implemented as a Huffman entropy decoder or as an entropy decoder employing another entropy decoding algorithm such as the so-called Arithmetic Coding, Unary Coding, Elias Gamma Coding, Fibonacci Coding, Golomb Coding or Rice Coding.

The entropy decoded input frames are then provided to an optional dequantizer 620, which can be adapted such that the entropy decoded input frames can be dequantized to accommodate for application-specific circumstances, such as the loudness characteristic of the human ear. The entropy decoded and optionally dequantized input frames are then provided to a scaler 630, which is capable of scaling the plurality of entropy frames in the frequency domain. Depending of the concrete implementation of an embodiment of a mixer 600, the scaler 630 can for instance, scale each of the optionally dequantized and entropy decoded input frames by multiplying each of the values by a constant factor 1/P, wherein P is an integer indicating the number of different sources or encoders 400.

In other words, the scaler 630 is in this case capable of scaling down the frames provided by the dequantizer 620 or the entropy decoder 610 to scale them down to prevent the corresponding signals from becoming too large in order to prevent an overflow or another computational error, or to prevent audible distortions like clipping. Different implementations of the scaler 630 can also be implemented, such as a scaler which is capable of scaling the provided frame in an energy conserving manner, by for instance, evaluating the energy of each of the input frames, depending on one or more spectral frequency bands. In such a case, in each of these spectral frequency bands, the corresponding values in the frequency domain can be multiplied with a constant factor, such that the overall energy with respect to all frequency ranges is identical. Additionally or alternatively, the scaler 630 may also be adapted such that the energy of each of the spectral subgroups is identical with respect to all input frames of all different sources, or that the overall energy of each of the input frames is constant.

The scaler 630 is then coupled to an adder 640, which is capable of adding up the frames provided by the scaler, which are also referred to as scaled frames in the frequency domain to generate an added frame also in the frequency domain. This can for instance be accomplished by adding up all values corresponding to the same sample index from all scaled frames provided by the scaler 630.

The adder 640 is capable of adding up the frames provided by the scaler 6340 in the frequency domain to obtain an added frame, which comprises the information of all sources as provided by the scaler 630. As a further optional component, an embodiment of a mixer 600 may also comprise a quantizer 650 to which the added frame of the adder 640 may be provided to. According to the application-specific requirements, the optional quantizer 650 can for instance be used to adapt the added frame to fulfill some conditions. For instance, the quantizer 650 may be adapted such that the tact of the dequantizer 620 may be reversed. In other words, if for instance, a special characteristic underlies the input frames as provided to the mixer, which has been removed or altered by the dequantizer 620, the quantizer 650 may then be adapted to provide these special requirements of conditions to the added frame. As an example, the quantizer 650 may for instance be adapted to accommodate for the characteristics of the human ear.

As a further component, the embodiment of the mixer 600 may further comprise an entropy encoder 660, which is capable of entropy encoding the optionally quantized added frame and to provide a mixed frame to one or more receivers, for instance, comprising an embodiment of an encoder 450. Once again, the entropy encoder 660 may be adapted to entropy encoding the added frame based on the Huffman algorithm or another of the aforementioned algorithms.

By employing an embodiment of an analysis filterbank, a synthesis filterbank or another related embodiment in the framework of an encoder and a decoder, a mixer can be established and implemented which is capable of mixing signals in the frequency-domain. In other words, by implementing an embodiment of one of the previously described enhanced low-delay AAC codecs, a mixer can be implemented, which is capable of directly mixing a plurality of input frames in the frequency domain, without having to transform the respective input frames into the time-domain to accommodate for the possible switching of parameters, which are implemented in state-of-the-art-codecs for speech communications. As explained in the context of the embodiments of an analysis filterbank and a synthesis filterbank, these embodiments enable an operation without switching parameters, like switching the block lengths or switching between different windows.

Figure 17:
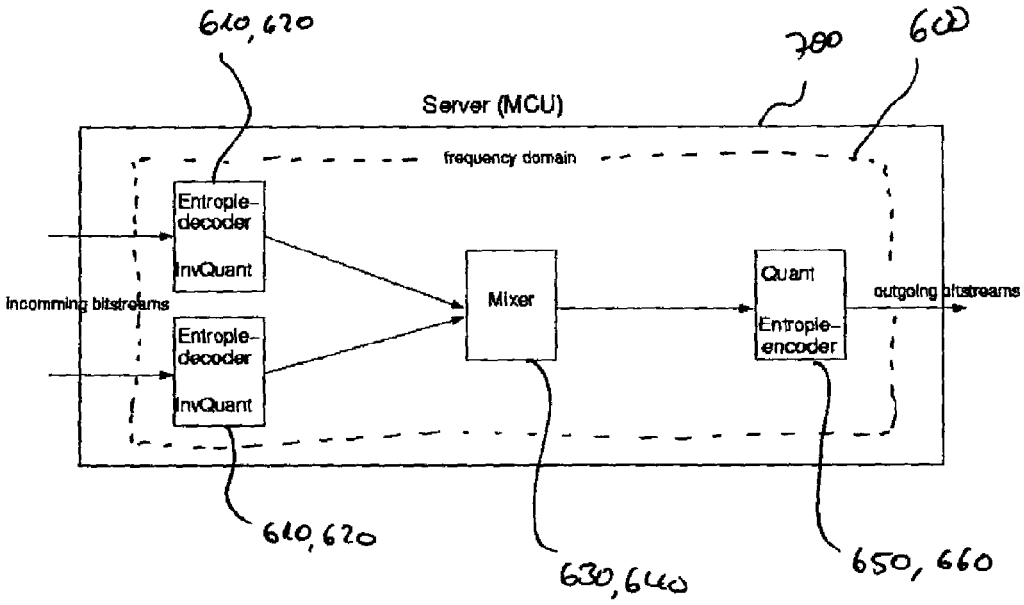
FIG. 17 shows a further embodiment of a conferencing system as a server or a media control unit.

FIG. 17 shows an embodiment of a conferencing system 700 in the form of a MCU (Media Control Unit), which, can for instance be implemented in the framework of a server. The conferencing system 700 or MCU 700 comprises for a plurality of bit streams, of which in FIG. 17, two are shown. A combined entropy decoder and dequantizer 610, 620 as well as a combined unit 630, 640 which are labeled in FIG. 17 as "mixer". Moreover, the output of the combined unit 630, 640 is provided to the combined unit comprising a quantizer 650 and the entropy encoder 660, which provides as the mixed frames an outgoing bit stream.

In other words, FIG. 17 shows an embodiment of a conferencing system 700 which is capable of mixing a plurality of incoming bit streams in the frequency domain, as the incoming bit stream as well as the outgoing bit streams have been created using a low-delay window on the encoder side, whereas the outgoing bit streams are intended and capable of being processed, based on the same low-delay window on the decoder side. In other words, the MCU 700 shown in FIG. 17 is based on the use of one universal low-delay window only.

An embodiment of a mixer 600 as well as an embodiment of a conferencing system 700 is therefore suitable to be applied in the framework of embodiments of the present invention in the form of an analysis filterbank, a synthesis filterbank and the other related embodiments. To be more precise, a technical application of an embodiment of a low-delay codec with only one window allows a mixing in the frequency-domain. For instance, in (tele-) conferencing scenarios with more than two participants or sources, it might often be desirable to receive several codec signals, mix them up to one signal and further transmit the resulting encoded signal. By employing an embodiment of the present invention on the encoder and the decoder side, in some embodiments of a conferencing system 700 and the mixer 600, the implementational method can be reduced compared to a straightforward manner of decoding the incoming signals, mixing the decoded signals in the time-domain and re-encoding the mixed signal again into the frequency-domain.

Figure 18:
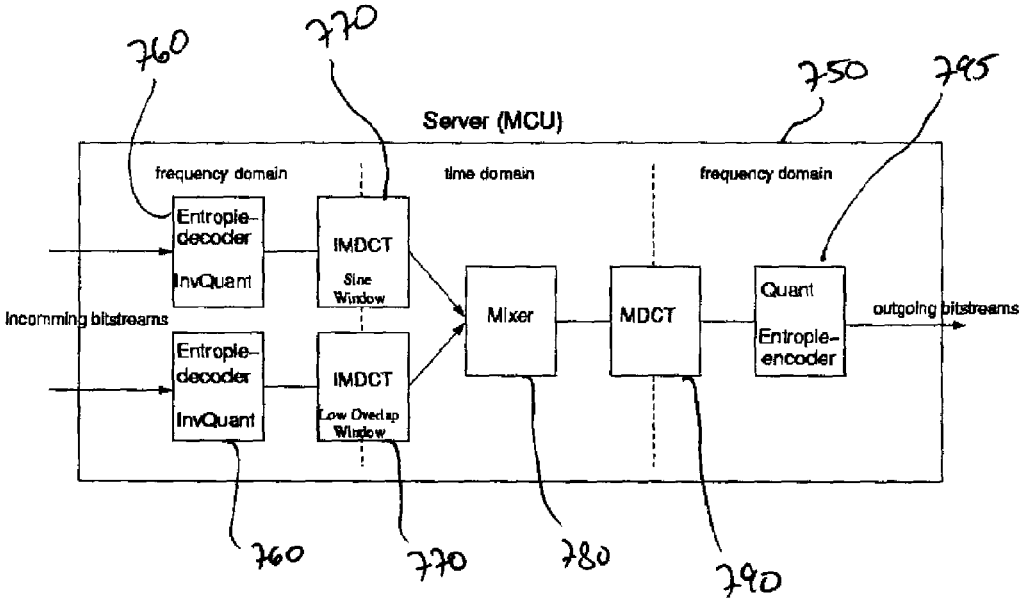
FIG. 18 shows a block diagram of a media control unit.

The implementation of such a straightforward mixer in the form of a MCU is shown in FIG. 18 as a conferencing system 750. The conferencing system 750 also comprises a combined module 760 for each of the incoming bit streams operating in the frequency domain and capable of entropy decoding and dequantization of the incoming bit streams. However, in the conferencing system 750 shown in FIG. 18, the modules 760 are coupled to the IMDCT converter 770 each, of which one is operating in the sine window mode of operation, whereas the other one is currently operating in the low-overlap window mode of operation. In other words, the two IMDCT converters 770 transform the incoming bit streams from the frequency-domain into the time-domain, which is necessary in the case of a conferencing system 750 as the incoming bit streams are based on an encoder, which uses both, the sine window and the low-overlap window, depending on the audio signal to encode the respective signals.

The conferencing system 750 furthermore comprises a mixer 780, which mixes in the time-domain the two incoming signals from the two IMDCT converters 770 and provides a mixed time-domain signal to a MDCT converter 790, which transfers the signal from the time-domain into the frequency-domain.

The mixed signal in the frequency domain as provided by the MDCT 790 is then provided to a combined module 795, which is then capable of quantizing an entropy encoding the signal to form the outgoing bit stream.

However, the approach according to the conferencing system 750 has two disadvantages. Due to the complete decoding and encoding done by the two IMDCT converters 770 and the MDCT 790, the high computational cost is to be paid by implementing the conferencing system 750. Moreover, due to the introduction of the decoding and encoding, an additional delay is introduced which can be high under certain circumstances.

By employing on the decoder and encoder sites, embodiments of the represent invention, or to be more precise, by implementing the new low-delay window, these disadvantages can be overcome or eliminated depending on the concrete implementation in the case of some embodiments. This is achieved by doing the mixing in the frequency domain as explained in the context of the conferencing system 700 in FIG. 17. As a consequence, the embodiment of a conferencing system 700 as shown in FIG. 17 does not comprise transforms and/or filterbanks which have to be implemented in the framework of the conferencing system 750 for decoding an encoding the signals in order to transform the signals from the frequency domain into the time-domain and back again. In other words, the bit stream mixing in the case of different window shapes results in additional cost of one additional block of delay due to the MDCT/IMDCT converter 770, 790.

As consequence, in some embodiments of the mixer 600 and in some embodiments of the conferencing system 700 as additional advantages, lower computational costs and a limitation with respect to additional delay can be implemented, such that in some cases even no additional delay might be achievable.

Figure 19:
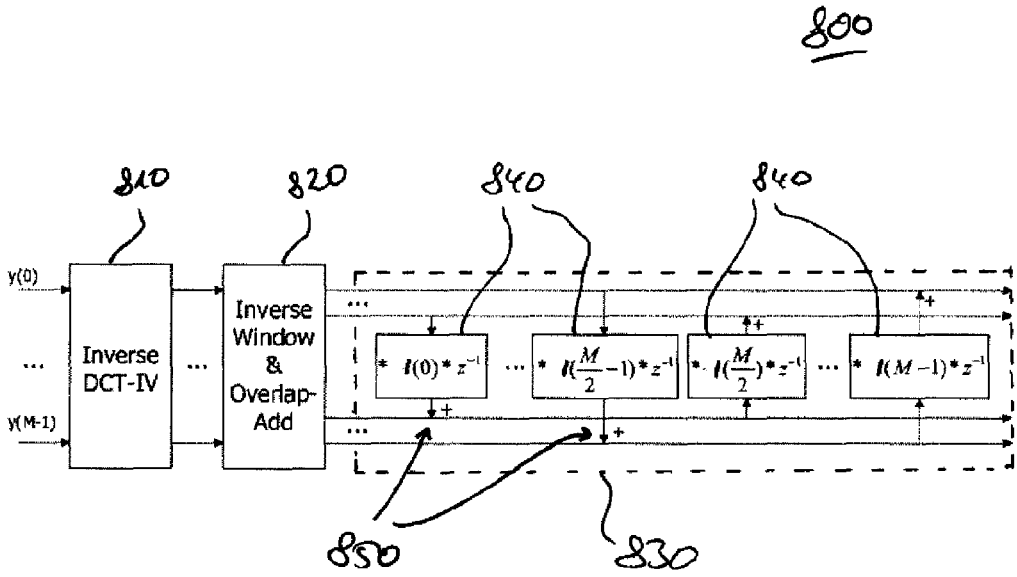
FIG. 19 shows an embodiment of a synthesis filterbank as an efficient implementation.

FIG. 19 shows an embodiment of an efficient implementation of a low-delay filterbank. To be more precise, before discussing the computational complexity and further application related aspects, in the framework of FIG. 19, an embodiment of a synthesis filterbank 800 will be described in more detail, which can for instance be implemented in an embodiment of a decoder. The embodiment of a low-delay analysis filterbank 800, hence, symbolizes a reverse of an embodiment of a synthesis filterbank or an encoder.

The synthesis filterbank 800 comprises an inverse type-iv discrete cosine transform frequency/time converter 810, which is capable of providing a plurality of output frames to a combined module 820 comprising a windower and an overlap/adder. To be more precise, the time/frequency 810 is an inverse type-iv discrete cosine transform converter, which is provided with an input frame comprising M ordered input values $y_k(0), \ldots, y_k(M-1)$, wherein M is once again a positive integer and wherein k is an integer indicating a frame index. The time/frequency converter 810 provides 2M ordered output samples $x_k(0), \ldots, x_k(2M-1)$ based on the input values and provides these output samples to the module 820 which in turn comprises the windower and the overlap/adder mentioned before.

The windower of the module 820 is capable of generating a plurality of windowed frames, wherein each of the windowed frames comprises a plurality of windowed samples $z_k(0), \ldots, z_k(2M-1)$ based on the equation or expression $$z_k(n)=w(n)\cdot x_k(n)$$

$$\text{for } n=0, \ldots, 2M-1,$$

wherein n is once again an integer indicating a sample index and w(n) is a real-valued window function coefficient corresponding to the sample index n. The overlap/adder also comprised in the module 820, provides or generates than in the intermediate frame comprising a plurality of intermediate samples $M_k(0), \ldots M_k(M-1)$ based on the equation or expression $$m_k(n)=z_k(n)+z_{k-1}(n+M)$$

$$\text{for } n=0, \ldots, M-1.$$

The embodiment of the synthesis filterbank 800 further comprises a lifter 850, which produces an added frame comprising a plurality of added samples $out_k(0), \ldots, out_k(m-1)$ based on the equation or expression $$out_k(n)=m_k(n)+l(n-M/2)\cdot m_{k-1}(M-1-n)$$

for $n=M/2, \ldots, M-1$, and $$out_k(n)=m_k(n)+1(M-1-n)\cdot out_{k-1}(M-1-n)$$

for $n=0, \ldots, M/2-1$, wherein $l(M-1'n), \ldots, l(M-1)$ are real-valued lifting coefficients. In FIG. 19, the embodiment of the computationally efficient implementation of a low-delay filterbank 800 comprises in the framework of the lifter 830, a plurality of combined delayers and multipliers 840 as well as a plurality of adders 850 to carry out the aforementioned calculations in the framework of the lifter 830.

Depending on the concrete implementation of an embodiment of a synthesis filterbank 800, the window coefficients or window function coefficients w(n) obey the relations given in table 5 of the annex in the case of an embodiment with M=512 input values per input frame. Table 9 of the annex comprise a set of relations, which the windowing coefficients w(n) obey, in the case of M=480 input values per input frame. Moreover, tables 6 and 10 comprise relations for the lifting coefficients l(n) for embodiments with M=512 and M=480, respectively.

However, in some embodiments of a synthesis filterbank 800, the window coefficients w(n) comprise the values given in table 7 and 11, for embodiments with M=512 and M=480 input values per input frame, respectively. Accordingly, tables 8 and 12 in the annex comprise the values for the lifting coefficient l(n) for embodiments with M=512 and M=480 input samples per input frame, respectively.

In other words, an embodiment of a low-delay filterbank 800 can be implemented as sufficiently as a regular MDCT converter. The general structure of such an embodiment is illustrated in FIG. 19. The inverse DCT-IV and the inverse windowing-overlap/add are performed in the same way as the traditional windows, however, employing the aforementioned windowing coefficients, depending on the concrete implementation of the embodiment. As in the case of the windowing coefficients in the framework of the embodiment of the synthesis filterbank 200, also in this case M/4 window coefficients are zero-valued windowed coefficients, which thus do not, in principle, involve any operation. For the extended overlap into the past, only M additional multiplier-add operations are required, as can be seen in the framework of the lifter 830. These additional operations are sometimes also referred to as "zero-delay matrices". Sometimes these operations are also known as "lifting steps".

The efficient implementation shown in FIG. 19 may under some circumstances be more efficient as a straightforward implementation of a synthesis filterbank 200. To be more precise, depending on the concrete implementation, such a more efficient implementation might result in saving M operations, as in the case of a straightforward implementation for M operations, it might be advisable to implement, as the implementation shown in FIG. 19, requires in principle, 2M operations in the framework of the module 820 and M operations in the framework of the lifter 830.

In terms of an assessment concerning the complexity of an embodiment of a low-delay filterbank, especially in terms of the computational complexity, FIG. 20 comprises a table which illustrates the arithmetic complexity of an embodiment of an implementation of an embodiment of a synthesis filterbank 800 according to FIG. 19 in the case of M=512 input values per input frame. To be more precise, the table in FIG. 20 comprises an estimate of the resulting overall number of operations in the case of an (modified) IMDCT converter along with a windowing in the case of a low-delay window function. The overall number of operations is 9600.

In comparison, FIG. 21 comprises a table of the arithmetic complexity of IMDCT along with the complexity required for windowing based on the sine window for a parameter M=512, which gives the total number of operations for the codec such as the AAC LD codec. To be more precise, the arithmetic complexity of this IMDCT converter along with the windowing for the sine window is 9216 operations, which is of the same order of magnitude as the resulting overall number of operations in the case of the embodiment of the synthesis filterbank 800 shown in FIG. 19.

As a further comparison, FIG. 22 comprises a table for an AAC LC codec, which is also known as the advance audio codec with low complexity. The arithmetic complexity of this IMDCT converter, including the operations for windowing overlap for the AAC LC (M=1024) is 19968.

A comparison of these figures show that in summary, the complexity of the core coder comprising an embodiment of an enhanced low-delay filterbank is essentially comparable to that of a core coder, using a regular MDCT-IMDCT filterbank. Moreover, the number of operations is roughly speaking half the number of operations of an AAC LC codec.

FIG. 23 comprises two tables, wherein FIG. 23a comprises a comparison of the memory requirements of different codecs, whereas FIG. 23b comprises the same estimate with respect to the ROM requirement. To be more precise, the tables in both FIGS. 23a and 23b each comprise for the aforementioned codecs AAC LD, AAC ELD and AAC LC information concerning the frame length, the working buffer and concerning the state buffer in terms of the RAM-requirement (FIG. 23a) and information concerning the frame length, the number of window coefficients and the sum, in terms of the ROM-memory requirements (FIG. 23b). As previously mentioned in the tables in FIGS. 23a and 23b, the abbreviation AAC, ELD refer to an embodiment of a synthesis filterbank, analysis filterbank, encoder, decoder or a later embodiment. To summarize, compared to the IMDCT with sine window, the described efficient implementation according to FIG. 19 of an embodiment of the low-delay filterbank requires an additional state memory of length M and M additional coefficients, the lifting coefficients $l(0), \ldots, l(M-1)$. Thus as a frame length of the AAC LD is half the frame length of the AAC LC, the resulting memory requirement is in the range of that of the AAC LC.

In terms of the memory requirements, the tables shown in FIGS. 23a and 23b, hence, compare the RAM and ROM requirements for the three aforementioned codecs. It can be seen that the memory increase for the low-delay filterbank is only moderate. The overall memory requirement is still much lower compared to an AAC LC codec or implementation.

FIG. 24 comprises a list of used codecs for a MUSHRA test used in the framework of a performance assessment. In the table shown in FIG. 24, the abbreviation AOT stands for Audio Object Type, wherein the entry "X" stands for the audio object tape ER AAC ELD which can also be set to 39. In other words, the AOT, X or AOT 39 identifies an embodiment of a synthesis filterbank or an analysis filterbank. The abbreviation AOT stands in this context for "audio object type".

In the framework of a MUSHRA test, the influence of using an embodiment of the low-delay filterbank on top of the previously described coder was tested by carrying out a listening test for all the combinations in the list. To be more precise, the result of these tests enable the following conclusions. The AAC ELD decoder at 32 kbit/s per channel, performs significantly better than the original AAC L decoder at 32 kb/s. Moreover, the AAC ELD decoder at 32 kb/s per channel performs statistically indistinguishable from the original AAC LD decoder at 48 kb/s per channel. As a check point coder, binding AAC LD and the low-delay filterbank performs statistically indistinguishable from an original AAC LD coder both running at 48 kb/s. This confirms the appropriateness of a low-delay filterbank.

Thus, the overall coder performance remains comparable, while a significant saving in codec delay is achieved. Moreover, it was possible to retain the coder pressure performance.

As previously explained, promising application scenarios or applications of embodiments of the present invention, such as an embodiment of an AAC ELD codec are high fidelity video-teleconferencing and voice over IP applications of the next generation. This includes the transmission of arbitrary audio signals, such as speech or music, or in the context of a multimedia presentation, at high quality levels and competitive bitrates. The low algorithmic delay of an embodiment of the present invention (AAC ELD) makes this codec an excellent choice for all kinds of communication and applications.

Moreover, the present document has described the construction of an enhanced AAC ELD decoder which may optionally be combined with a spectral band replication (SBR) tool. In order to constrain the associated increase in delay, minor modifications in terms of a real, live implementation may become necessary in the SBR tool and the core coder modules. The performance of the resulting enhanced low-delay audio decoding based on the aforementioned technology is significantly increased, compared to what is currently delivered by the MPEG-4 audio standard. Complexity of the core coding scheme remains, however, essentially identical. Moreover, embodiments of the present invention comprise an analysis filterbank or synthesis filterbank including a low-delay analysis window or a low-delay synthesis filter. Moreover, an embodiment of a method of analyzing a signal or synthesizing a signal having a low-delay analysis filtering step or a low-delay synthesis filtering step. Embodiments of a low-delay analysis filter or low-delay synthesis filter are also described. Moreover, computer programs having a program code for implementing one of the above methods when running on a computer are disclosed. An embodiment of the present invention comprises also an encoder having a low delay analysis filter, or decoder having a low delay synthesis filter, or one of the corresponding methods.

Depending on certain implementation requirements of the embodiments of the inventive methods, embodiments of the inventive methods can be implemented in hardware, or in software. The implementation can be performed using a digital storage medium, in particular, a disc a CD, or a DVD having electronically readable control signals stored thereon, which cooperate with the programmable computer or a processor such that an embodiment of the inventive methods is performed. Generally, an embodiment of the present invention is, therefore, a computer program product with program code stored on a machine-readable carrier, the program code being operative for performing an embodiment of the inventive methods when the computer program product runs on the computer or processor. In other words, embodiments of the inventive methods are therefore, a computer program having a program code for performing at least one of the embodiments of the inventive methods, when the computer program runs of the computer or processor. In this context, processors comprise CPUs (Central Processing Unit), ASICs (Application Specific Integrated Circuits) or further integrated circuits (IC).

While the foregoing has particularly been shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concept disclosed herein, and comprehended by the claims that follow.

ANNEX

TABLE 1

| (window coefficients w(n); N = 960) |
|---|
| $\lvert w[0]\rvert \le 0.001$ |
| $\lvert w[1]\rvert \le 0.001$ |
| $\lvert w[2]\rvert \le 0.001$ |
| $\lvert w[3]\rvert \le 0.001$ |
| $\lvert w[4]\rvert \le 0.001$ |
| $\lvert w[5]\rvert \le 0.001$ |
| $\lvert w[6]\rvert \le 0.001$ |
| $\lvert w[7]\rvert \le 0.001$ |
| $\lvert w[8]\rvert \le 0.001$ |
| $\lvert w[9]\rvert \le 0.001$ |
| $\lvert w[10]\rvert \le 0.001$ |
| $\lvert w[11]\rvert \le 0.001$ |
| $\lvert w[12]\rvert \le 0.001$ |
| $\lvert w[13]\rvert \le 0.001$ |
| $\lvert w[14]\rvert \le 0.001$ |
| $\lvert w[15]\rvert \le 0.001$ |
| $\lvert w[16]\rvert \le 0.001$ |
| $\lvert w[17]\rvert \le 0.001$ |
| $\lvert w[18]\rvert \le 0.001$ |
| $\lvert w[19]\rvert \le 0.001$ |
| $\lvert w[20]\rvert \le 0.001$ |
| $\lvert w[21]\rvert \le 0.001$ |
| $\lvert w[22]\rvert \le 0.001$ |
| $\lvert w[23]\rvert \le 0.001$ |
| $\lvert w[24]\rvert \le 0.001$ |
| $\lvert w[25]\rvert \le 0.001$ |
| $\lvert w[26]\rvert \le 0.001$ |
| $\lvert w[27]\rvert \le 0.001$ |
| $\lvert w[28]\rvert \le 0.001$ |
| $\lvert w[29]\rvert \le 0.001$ |
| $\lvert w[30]\rvert \le 0.001$ |
| $\lvert w[31]\rvert \le 0.001$ |
| $\lvert w[32]\rvert \le 0.001$ |
| $\lvert w[33]\rvert \le 0.001$ |
| $\lvert w[34]\rvert \le 0.001$ |
| $\lvert w[35]\rvert \le 0.001$ |
| $\lvert w[36]\rvert \le 0.001$ |
| $\lvert w[37]\rvert \le 0.001$ |
| $\lvert w[38]\rvert \le 0.001$ |
| $\lvert w[39]\rvert \le 0.001$ |
| $\lvert w[40]\rvert \le 0.001$ |
| $\lvert w[41]\rvert \le 0.001$ |
| $\lvert w[42]\rvert \le 0.001$ |
| $\lvert w[43]\rvert \le 0.001$ |
| $\lvert w[44]\rvert \le 0.001$ |
| $\lvert w[45]\rvert \le 0.001$ |
| $\lvert w[46]\rvert \le 0.001$ |
| $\lvert w[47]\rvert \le 0.001$ |
| $\lvert w[48]\rvert \le 0.001$ |
| $\lvert w[49]\rvert \le 0.001$ |
| $\lvert w[50]\rvert \le 0.001$ |
| $\lvert w[51]\rvert \le 0.001$ |
| $\lvert w[52]\rvert \le 0.001$ |
| $\lvert w[53]\rvert \le 0.001$ |
| $\lvert w[54]\rvert \le 0.001$ |
| $\lvert w[55]\rvert \le 0.001$ |
| $\lvert w[56]\rvert \le 0.001$ |
| $\lvert w[57]\rvert \le 0.001$ |

TABLE 1-continued

| (window coefficients w(n); N = 960) |
|---|
| $\lvert w[58]\rvert \le 0.001$ |
| $\lvert w[59]\rvert \le 0.001$ |
| $\lvert w[60]\rvert \le 0.001$ |
| $\lvert w[61]\rvert \le 0.001$ |
| $\lvert w[62]\rvert \le 0.001$ |
| $\lvert w[63]\rvert \le 0.001$ |
| $\lvert w[64]\rvert \le 0.001$ |
| $\lvert w[65]\rvert \le 0.001$ |
| $\lvert w[66]\rvert \le 0.001$ |
| $\lvert w[67]\rvert \le 0.001$ |
| $\lvert w[68]\rvert \le 0.001$ |
| $\lvert w[69]\rvert \le 0.001$ |
| $\lvert w[70]\rvert \le 0.001$ |
| $\lvert w[71]\rvert \le 0.001$ |
| $\lvert w[72]\rvert \le 0.001$ |
| $\lvert w[73]\rvert \le 0.001$ |
| $\lvert w[74]\rvert \le 0.001$ |
| $\lvert w[75]\rvert \le 0.001$ |
| $\lvert w[76]\rvert \le 0.001$ |
| $\lvert w[77]\rvert \le 0.001$ |
| $\lvert w[78]\rvert \le 0.001$ |
| $\lvert w[79]\rvert \le 0.001$ |
| $\lvert w[80]\rvert \le 0.001$ |
| $\lvert w[81]\rvert \le 0.001$ |
| $\lvert w[82]\rvert \le 0.001$ |
| $\lvert w[83]\rvert \le 0.001$ |
| $\lvert w[84]\rvert \le 0.001$ |
| $\lvert w[85]\rvert \le 0.001$ |
| $\lvert w[86]\rvert \le 0.001$ |
| $\lvert w[87]\rvert \le 0.001$ |
| $\lvert w[88]\rvert \le 0.001$ |
| $\lvert w[89]\rvert \le 0.001$ |
| $\lvert w[90]\rvert \le 0.001$ |
| $\lvert w[91]\rvert \le 0.001$ |
| $\lvert w[92]\rvert \le 0.001$ |
| $\lvert w[93]\rvert \le 0.001$ |
| $\lvert w[94]\rvert \le 0.001$ |
| $\lvert w[95]\rvert \le 0.001$ |
| $\lvert w[96]\rvert \le 0.001$ |
| $\lvert w[97]\rvert \le 0.001$ |
| $\lvert w[98]\rvert \le 0.001$ |
| $\lvert w[99]\rvert \le 0.001$ |
| $\lvert w[100]\rvert \le 0.001$ |
| $\lvert w[101]\rvert \le 0.001$ |
| $\lvert w[102]\rvert \le 0.001$ |
| $\lvert w[103]\rvert \le 0.001$ |
| $\lvert w[104]\rvert \le 0.001$ |
| $\lvert w[105]\rvert \le 0.001$ |
| $\lvert w[106]\rvert \le 0.001$ |
| $\lvert w[107]\rvert \le 0.001$ |
| $\lvert w[108]\rvert \le 0.001$ |
| $\lvert w[109]\rvert \le 0.001$ |
| $\lvert w[110]\rvert \le 0.001$ |
| $\lvert w[111]\rvert \le 0.001$ |
| $\lvert w[112]\rvert \le 0.001$ |
| $\lvert w[113]\rvert \le 0.001$ |
| $\lvert w[114]\rvert \le 0.001$ |
| $\lvert w[115]\rvert \le 0.001$ |
| $\lvert w[116]\rvert \le 0.001$ |
| $\lvert w[117]\rvert \le 0.001$ |
| $\lvert w[118]\rvert \le 0.001$ |
| $\lvert w[119]\rvert \le 0.001$ |
| $0.000 \le w[120] \le 0.002$ |
| $0.003 \le w[121] \le 0.005$ |
| $0.006 \le w[122] \le 0.008$ |
| $0.010 \le w[123] \le 0.012$ |
| $0.014 \le w[124] \le 0.016$ |
| $0.018 \le w[125] \le 0.020$ |
| $0.022 \le w[126] \le 0.024$ |
| $0.027 \le w[127] \le 0.029$ |
| $0.031 \le w[128] \le 0.033$ |
| $0.035 \le w[129] \le 0.037$ |
| $0.040 \le w[130] \le 0.042$ |
| $0.044 \le w[131] \le 0.046$ |
| $0.049 \le w[132] \le 0.051$ |
| $0.053 \le w[133] \le 0.055$ |
| $0.057 \le w[134] \le 0.059$ |
| $0.062 \le w[135] \le 0.064$ |

TABLE 1-continued

| (window coefficients w(n); N = 960) |
|---|
| $0.066 \le w[136] \le 0.068$ |
| $0.070 \le w[137] \le 0.072$ |
| $0.074 \le w[138] \le 0.076$ |
| $0.079 \le w[139] \le 0.081$ |
| $0.083 \le w[140] \le 0.085$ |
| $0.087 \le w[141] \le 0.089$ |
| $0.091 \le w[142] \le 0.093$ |
| $0.096 \le w[143] \le 0.098$ |
| $0.100 \le w[144] \le 0.102$ |
| $0.104 \le w[145] \le 0.106$ |
| $0.108 \le w[146] \le 0.110$ |
| $0.113 \le w[147] \le 0.115$ |
| $0.117 \le w[148] \le 0.119$ |
| $0.121 \le w[149] \le 0.123$ |
| $0.126 \le w[150] \le 0.128$ |
| $0.130 \le w[151] \le 0.132$ |
| $0.135 \le w[152] \le 0.137$ |
| $0.139 \le w[153] \le 0.141$ |
| $0.144 \le w[154] \le 0.146$ |
| $0.149 \le w[155] \le 0.151$ |
| $0.153 \le w[156] \le 0.155$ |
| $0.158 \le w[157] \le 0.160$ |
| $0.163 \le w[158] \le 0.165$ |
| $0.168 \le w[159] \le 0.170$ |
| $0.173 \le w[160] \le 0.175$ |
| $0.178 \le w[161] \le 0.180$ |
| $0.183 \le w[162] \le 0.185$ |
| $0.188 \le w[163] \le 0.190$ |
| $0.193 \le w[164] \le 0.195$ |
| $0.198 \le w[165] \le 0.200$ |
| $0.203 \le w[166] \le 0.205$ |
| $0.208 \le w[167] \le 0.210$ |
| $0.213 \le w[168] \le 0.215$ |
| $0.218 \le w[169] \le 0.220$ |
| $0.223 \le w[170] \le 0.225$ |
| $0.229 \le w[171] \le 0.231$ |
| $0.234 \le w[172] \le 0.236$ |
| $0.239 \le w[173] \le 0.241$ |
| $0.244 \le w[174] \le 0.246$ |
| $0.249 \le w[175] \le 0.251$ |
| $0.255 \le w[176] \le 0.257$ |
| $0.260 \le w[177] \le 0.262$ |
| $0.265 \le w[178] \le 0.267$ |
| $0.271 \le w[179] \le 0.273$ |
| $0.276 \le w[180] \le 0.278$ |
| $0.282 \le w[181] \le 0.284$ |
| $0.287 \le w[182] \le 0.289$ |
| $0.293 \le w[183] \le 0.295$ |
| $0.298 \le w[184] \le 0.300$ |
| $0.303 \le w[185] \le 0.305$ |
| $0.309 \le w[186] \le 0.311$ |
| $0.314 \le w[187] \le 0.316$ |
| $0.320 \le w[188] \le 0.322$ |
| $0.325 \le w[189] \le 0.327$ |
| $0.331 \le w[190] \le 0.333$ |
| $0.336 \le w[191] \le 0.338$ |
| $0.342 \le w[192] \le 0.344$ |
| $0.347 \le w[193] \le 0.349$ |
| $0.352 \le w[194] \le 0.354$ |
| $0.358 \le w[195] \le 0.360$ |
| $0.363 \le w[196] \le 0.365$ |
| $0.369 \le w[197] \le 0.371$ |
| $0.374 \le w[198] \le 0.376$ |
| $0.379 \le w[199] \le 0.381$ |
| $0.385 \le w[200] \le 0.387$ |
| $0.390 \le w[201] \le 0.392$ |
| $0.396 \le w[202] \le 0.398$ |
| $0.401 \le w[203] \le 0.403$ |
| $0.406 \le w[204] \le 0.408$ |
| $0.412 \le w[205] \le 0.414$ |
| $0.417 \le w[206] \le 0.419$ |
| $0.422 \le w[207] \le 0.424$ |
| $0.427 \le w[208] \le 0.429$ |
| $0.433 \le w[209] \le 0.435$ |
| $0.438 \le w[210] \le 0.440$ |
| $0.443 \le w[211] \le 0.445$ |
| $0.448 \le w[212] \le 0.450$ |
| $0.453 \le w[213] \le 0.455$ |

TABLE 1-continued

| (window coefficients w(n); N = 960) |
|---|
| 0.459 ≤ w[214] ≤ 0.461 |
| 0.464 ≤ w[215] ≤ 0.466 |
| 0.469 ≤ w[216] ≤ 0.471 |
| 0.474 ≤ w[217] ≤ 0.476 |
| 0.479 ≤ w[218] ≤ 0.481 |
| 0.484 ≤ w[219] ≤ 0.486 |
| 0.489 ≤ w[220] ≤ 0.491 |
| 0.494 ≤ w[221] ≤ 0.496 |
| 0.499 ≤ w[222] ≤ 0.501 |
| 0.504 ≤ w[223] ≤ 0.506 |
| 0.509 ≤ w[224] ≤ 0.511 |
| 0.514 ≤ w[225] ≤ 0.516 |
| 0.519 ≤ w[226] ≤ 0.521 |
| 0.524 ≤ w[227] ≤ 0.526 |
| 0.528 ≤ w[228] ≤ 0.530 |
| 0.533 ≤ w[229] ≤ 0.535 |
| 0.538 ≤ w[230] ≤ 0.540 |
| 0.543 ≤ w[231] ≤ 0.545 |
| 0.547 ≤ w[232] ≤ 0.549 |
| 0.552 ≤ w[233] ≤ 0.554 |
| 0.557 ≤ w[234] ≤ 0.559 |
| 0.561 ≤ w[235] ≤ 0.563 |
| 0.566 ≤ w[236] ≤ 0.568 |
| 0.571 ≤ w[237] ≤ 0.573 |
| 0.575 ≤ w[238] ≤ 0.577 |
| 0.580 ≤ w[239] ≤ 0.582 |
| 0.586 ≤ w[240] ≤ 0.588 |
| 0.591 ≤ w[241] ≤ 0.593 |
| 0.595 ≤ w[242] ≤ 0.597 |
| 0.600 ≤ w[243] ≤ 0.602 |
| 0.604 ≤ w[244] ≤ 0.606 |
| 0.609 ≤ w[245] ≤ 0.611 |
| 0.613 ≤ w[246] ≤ 0.615 |
| 0.617 ≤ w[247] ≤ 0.619 |
| 0.622 ≤ w[248] ≤ 0.624 |
| 0.626 ≤ w[249] ≤ 0.628 |
| 0.630 ≤ w[250] ≤ 0.632 |
| 0.635 ≤ w[251] ≤ 0.637 |
| 0.639 ≤ w[252] ≤ 0.641 |
| 0.643 ≤ w[253] ≤ 0.645 |
| 0.647 ≤ w[254] ≤ 0.649 |
| 0.652 ≤ w[255] ≤ 0.654 |
| 0.656 ≤ w[256] ≤ 0.658 |
| 0.660 ≤ w[257] ≤ 0.662 |
| 0.664 ≤ w[258] ≤ 0.666 |
| 0.668 ≤ w[259] ≤ 0.670 |
| 0.672 ≤ w[260] ≤ 0.674 |
| 0.676 ≤ w[261] ≤ 0.678 |
| 0.680 ≤ w[262] ≤ 0.682 |
| 0.684 ≤ w[263] ≤ 0.686 |
| 0.688 ≤ w[264] ≤ 0.690 |
| 0.692 ≤ w[265] ≤ 0.694 |
| 0.696 ≤ w[266] ≤ 0.698 |
| 0.700 ≤ w[267] ≤ 0.702 |
| 0.704 ≤ w[268] ≤ 0.706 |
| 0.708 ≤ w[269] ≤ 0.710 |
| 0.712 ≤ w[270] ≤ 0.714 |
| 0.715 ≤ w[271] ≤ 0.717 |
| 0.719 ≤ w[272] ≤ 0.721 |
| 0.723 ≤ w[273] ≤ 0.725 |
| 0.727 ≤ w[274] ≤ 0.729 |
| 0.730 ≤ w[275] ≤ 0.732 |
| 0.734 ≤ w[276] ≤ 0.736 |
| 0.738 ≤ w[277] ≤ 0.740 |
| 0.741 ≤ w[278] ≤ 0.743 |
| 0.745 ≤ w[279] ≤ 0.747 |
| 0.748 ≤ w[280] ≤ 0.750 |
| 0.752 ≤ w[281] ≤ 0.754 |
| 0.756 ≤ w[282] ≤ 0.758 |
| 0.759 ≤ w[283] ≤ 0.761 |
| 0.762 ≤ w[284] ≤ 0.764 |
| 0.766 ≤ w[285] ≤ 0.768 |
| 0.769 ≤ w[286] ≤ 0.771 |
| 0.773 ≤ w[287] ≤ 0.775 |
| 0.776 ≤ w[288] ≤ 0.778 |
| 0.779 ≤ w[289] ≤ 0.781 |
| 0.783 ≤ w[290] ≤ 0.785 |
| 0.786 ≤ w[291] ≤ 0.788 |

TABLE 1-continued

| (window coefficients w(n); N = 960) |
|---|
| 0.789 ≤ w[292] ≤ 0.791 |
| 0.792 ≤ w[293] ≤ 0.794 |
| 0.796 ≤ w[294] ≤ 0.798 |
| 0.799 ≤ w[295] ≤ 0.801 |
| 0.802 ≤ w[296] ≤ 0.804 |
| 0.805 ≤ w[297] ≤ 0.807 |
| 0.808 ≤ w[298] ≤ 0.810 |
| 0.811 ≤ w[299] ≤ 0.813 |
| 0.814 ≤ w[300] ≤ 0.816 |
| 0.817 ≤ w[301] ≤ 0.819 |
| 0.820 ≤ w[302] ≤ 0.822 |
| 0.823 ≤ w[303] ≤ 0.825 |
| 0.826 ≤ w[304] ≤ 0.828 |
| 0.829 ≤ w[305] ≤ 0.831 |
| 0.831 ≤ w[306] ≤ 0.833 |
| 0.834 ≤ w[307] ≤ 0.836 |
| 0.837 ≤ w[308] ≤ 0.839 |
| 0.840 ≤ w[309] ≤ 0.842 |
| 0.842 ≤ w[310] ≤ 0.844 |
| 0.845 ≤ w[311] ≤ 0.847 |
| 0.848 ≤ w[312] ≤ 0.850 |
| 0.850 ≤ w[313] ≤ 0.852 |
| 0.853 ≤ w[314] ≤ 0.855 |
| 0.855 ≤ w[315] ≤ 0.857 |
| 0.858 ≤ w[316] ≤ 0.860 |
| 0.860 ≤ w[317] ≤ 0.862 |
| 0.863 ≤ w[318] ≤ 0.865 |
| 0.865 ≤ w[319] ≤ 0.867 |
| 0.867 ≤ w[320] ≤ 0.869 |
| 0.870 ≤ w[321] ≤ 0.872 |
| 0.872 ≤ w[322] ≤ 0.874 |
| 0.874 ≤ w[323] ≤ 0.876 |
| 0.876 ≤ w[324] ≤ 0.878 |
| 0.878 ≤ w[325] ≤ 0.880 |
| 0.881 ≤ w[326] ≤ 0.883 |
| 0.883 ≤ w[327] ≤ 0.885 |
| 0.885 ≤ w[328] ≤ 0.887 |
| 0.887 ≤ w[329] ≤ 0.889 |
| 0.889 ≤ w[330] ≤ 0.891 |
| 0.891 ≤ w[331] ≤ 0.893 |
| 0.893 ≤ w[332] ≤ 0.895 |
| 0.895 ≤ w[333] ≤ 0.897 |
| 0.896 ≤ w[334] ≤ 0.898 |
| 0.898 ≤ w[335] ≤ 0.900 |
| 0.900 ≤ w[336] ≤ 0.902 |
| 0.902 ≤ w[337] ≤ 0.904 |
| 0.904 ≤ w[338] ≤ 0.906 |
| 0.906 ≤ w[339] ≤ 0.908 |
| 0.907 ≤ w[340] ≤ 0.909 |
| 0.909 ≤ w[341] ≤ 0.911 |
| 0.911 ≤ w[342] ≤ 0.913 |
| 0.912 ≤ w[343] ≤ 0.914 |
| 0.914 ≤ w[344] ≤ 0.916 |
| 0.916 ≤ w[345] ≤ 0.918 |
| 0.918 ≤ w[346] ≤ 0.920 |
| 0.919 ≤ w[347] ≤ 0.921 |
| 0.921 ≤ w[348] ≤ 0.923 |
| 0.923 ≤ w[349] ≤ 0.925 |
| 0.924 ≤ w[350] ≤ 0.926 |
| 0.926 ≤ w[351] ≤ 0.928 |
| 0.928 ≤ w[352] ≤ 0.930 |
| 0.929 ≤ w[353] ≤ 0.931 |
| 0.931 ≤ w[354] ≤ 0.933 |
| 0.932 ≤ w[355] ≤ 0.934 |
| 0.934 ≤ w[356] ≤ 0.936 |
| 0.935 ≤ w[357] ≤ 0.937 |
| 0.936 ≤ w[358] ≤ 0.938 |
| 0.937 ≤ w[359] ≤ 0.939 |
| 0.938 ≤ w[360] ≤ 0.940 |
| 0.938 ≤ w[361] ≤ 0.940 |
| 0.938 ≤ w[362] ≤ 0.940 |
| 0.939 ≤ w[363] ≤ 0.941 |
| 0.939 ≤ w[364] ≤ 0.941 |
| 0.940 ≤ w[365] ≤ 0.942 |
| 0.940 ≤ w[366] ≤ 0.942 |
| 0.940 ≤ w[367] ≤ 0.942 |
| 0.941 ≤ w[368] ≤ 0.943 |
| 0.941 ≤ w[369] ≤ 0.943 |

TABLE 1-continued

| (window coefficients w(n); N = 960) |
|---|
| 0.942 ≤ w[370] ≤ 0.944 |
| 0.942 ≤ w[371] ≤ 0.944 |
| 0.942 ≤ w[372] ≤ 0.944 |
| 0.943 ≤ w[373] ≤ 0.945 |
| 0.943 ≤ w[374] ≤ 0.945 |
| 0.944 ≤ w[375] ≤ 0.946 |
| 0.944 ≤ w[376] ≤ 0.946 |
| 0.945 ≤ w[377] ≤ 0.947 |
| 0.945 ≤ w[378] ≤ 0.947 |
| 0.945 ≤ w[379] ≤ 0.947 |
| 0.946 ≤ w[380] ≤ 0.948 |
| 0.946 ≤ w[381] ≤ 0.948 |
| 0.947 ≤ w[382] ≤ 0.949 |
| 0.947 ≤ w[383] ≤ 0.949 |
| 0.948 ≤ w[384] ≤ 0.950 |
| 0.948 ≤ w[385] ≤ 0.950 |
| 0.948 ≤ w[386] ≤ 0.950 |
| 0.949 ≤ w[387] ≤ 0.951 |
| 0.949 ≤ w[388] ≤ 0.951 |
| 0.950 ≤ w[389] ≤ 0.952 |
| 0.950 ≤ w[390] ≤ 0.952 |
| 0.951 ≤ w[391] ≤ 0.953 |
| 0.951 ≤ w[392] ≤ 0.953 |
| 0.952 ≤ w[393] ≤ 0.954 |
| 0.952 ≤ w[394] ≤ 0.954 |
| 0.952 ≤ w[395] ≤ 0.954 |
| 0.953 ≤ w[396] ≤ 0.955 |
| 0.953 ≤ w[397] ≤ 0.955 |
| 0.954 ≤ w[398] ≤ 0.956 |
| 0.954 ≤ w[399] ≤ 0.956 |
| 0.955 ≤ w[400] ≤ 0.957 |
| 0.955 ≤ w[401] ≤ 0.957 |
| 0.956 ≤ w[402] ≤ 0.958 |
| 0.956 ≤ w[403] ≤ 0.958 |
| 0.957 ≤ w[404] ≤ 0.959 |
| 0.957 ≤ w[405] ≤ 0.959 |
| 0.958 ≤ w[406] ≤ 0.960 |
| 0.958 ≤ w[407] ≤ 0.960 |
| 0.959 ≤ w[408] ≤ 0.961 |
| 0.959 ≤ w[409] ≤ 0.961 |
| 0.960 ≤ w[410] ≤ 0.962 |
| 0.960 ≤ w[411] ≤ 0.962 |
| 0.961 ≤ w[412] ≤ 0.963 |
| 0.961 ≤ w[413] ≤ 0.963 |
| 0.962 ≤ w[414] ≤ 0.964 |
| 0.962 ≤ w[415] ≤ 0.964 |
| 0.963 ≤ w[416] ≤ 0.965 |
| 0.963 ≤ w[417] ≤ 0.965 |
| 0.964 ≤ w[418] ≤ 0.966 |
| 0.964 ≤ w[419] ≤ 0.966 |
| 0.965 ≤ w[420] ≤ 0.967 |
| 0.965 ≤ w[421] ≤ 0.967 |
| 0.966 ≤ w[422] ≤ 0.968 |
| 0.966 ≤ w[423] ≤ 0.968 |
| 0.967 ≤ w[424] ≤ 0.969 |
| 0.967 ≤ w[425] ≤ 0.969 |
| 0.968 ≤ w[426] ≤ 0.970 |
| 0.969 ≤ w[427] ≤ 0.971 |
| 0.969 ≤ w[428] ≤ 0.971 |
| 0.970 ≤ w[429] ≤ 0.972 |
| 0.970 ≤ w[430] ≤ 0.972 |
| 0.971 ≤ w[431] ≤ 0.973 |
| 0.971 ≤ w[432] ≤ 0.973 |
| 0.972 ≤ w[433] ≤ 0.974 |
| 0.972 ≤ w[434] ≤ 0.974 |
| 0.973 ≤ w[435] ≤ 0.975 |
| 0.973 ≤ w[436] ≤ 0.975 |
| 0.974 ≤ w[437] ≤ 0.976 |
| 0.975 ≤ w[438] ≤ 0.977 |
| 0.975 ≤ w[439] ≤ 0.977 |
| 0.976 ≤ w[440] ≤ 0.978 |
| 0.976 ≤ w[441] ≤ 0.978 |
| 0.977 ≤ w[442] ≤ 0.979 |
| 0.977 ≤ w[443] ≤ 0.979 |
| 0.978 ≤ w[444] ≤ 0.980 |
| 0.979 ≤ w[445] ≤ 0.981 |
| 0.979 ≤ w[446] ≤ 0.981 |
| 0.980 ≤ w[447] ≤ 0.982 |

TABLE 1-continued

| (window coefficients w(n); N = 960) |
|---|
| 0.980 ≤ w[448] ≤ 0.982 |
| 0.981 ≤ w[449] ≤ 0.983 |
| 0.981 ≤ w[450] ≤ 0.983 |
| 0.982 ≤ w[451] ≤ 0.984 |
| 0.983 ≤ w[452] ≤ 0.985 |
| 0.983 ≤ w[453] ≤ 0.985 |
| 0.984 ≤ w[454] ≤ 0.986 |
| 0.984 ≤ w[455] ≤ 0.986 |
| 0.985 ≤ w[456] ≤ 0.987 |
| 0.985 ≤ w[457] ≤ 0.987 |
| 0.986 ≤ w[458] ≤ 0.988 |
| 0.987 ≤ w[459] ≤ 0.989 |
| 0.987 ≤ w[460] ≤ 0.989 |
| 0.988 ≤ w[461] ≤ 0.990 |
| 0.988 ≤ w[462] ≤ 0.990 |
| 0.989 ≤ w[463] ≤ 0.991 |
| 0.990 ≤ w[464] ≤ 0.992 |
| 0.990 ≤ w[465] ≤ 0.992 |
| 0.991 ≤ w[466] ≤ 0.993 |
| 0.991 ≤ w[467] ≤ 0.993 |
| 0.992 ≤ w[468] ≤ 0.994 |
| 0.992 ≤ w[469] ≤ 0.994 |
| 0.993 ≤ w[470] ≤ 0.995 |
| 0.994 ≤ w[471] ≤ 0.996 |
| 0.994 ≤ w[472] ≤ 0.996 |
| 0.995 ≤ w[473] ≤ 0.997 |
| 0.995 ≤ w[474] ≤ 0.997 |
| 0.996 ≤ w[475] ≤ 0.998 |
| 0.997 ≤ w[476] ≤ 0.999 |
| 0.997 ≤ w[477] ≤ 0.999 |
| 0.998 ≤ w[478] ≤ 1.000 |
| 0.998 ≤ w[479] ≤ 1.000 |
| 1.000 ≤ w[480] ≤ 1.002 |
| 1.000 ≤ w[481] ≤ 1.002 |
| 1.001 ≤ w[482] ≤ 1.003 |
| 1.001 ≤ w[483] ≤ 1.003 |
| 1.002 ≤ w[484] ≤ 1.004 |
| 1.003 ≤ w[485] ≤ 1.005 |
| 1.003 ≤ w[486] ≤ 1.005 |
| 1.004 ≤ w[487] ≤ 1.006 |
| 1.004 ≤ w[488] ≤ 1.006 |
| 1.005 ≤ w[489] ≤ 1.007 |
| 1.006 ≤ w[490] ≤ 1.008 |
| 1.006 ≤ w[491] ≤ 1.008 |
| 1.007 ≤ w[492] ≤ 1.009 |
| 1.007 ≤ w[493] ≤ 1.009 |
| 1.008 ≤ w[494] ≤ 1.010 |
| 1.009 ≤ w[495] ≤ 1.011 |
| 1.009 ≤ w[496] ≤ 1.011 |
| 1.010 ≤ w[497] ≤ 1.012 |
| 1.010 ≤ w[498] ≤ 1.012 |
| 1.011 ≤ w[499] ≤ 1.013 |
| 1.012 ≤ w[500] ≤ 1.014 |
| 1.012 ≤ w[501] ≤ 1.014 |
| 1.013 ≤ w[502] ≤ 1.015 |
| 1.013 ≤ w[503] ≤ 1.015 |
| 1.014 ≤ w[504] ≤ 1.016 |
| 1.015 ≤ w[505] ≤ 1.017 |
| 1.015 ≤ w[506] ≤ 1.017 |
| 1.016 ≤ w[507] ≤ 1.018 |
| 1.016 ≤ w[508] ≤ 1.018 |
| 1.017 ≤ w[509] ≤ 1.019 |
| 1.018 ≤ w[510] ≤ 1.020 |
| 1.018 ≤ w[511] ≤ 1.020 |
| 1.019 ≤ w[512] ≤ 1.021 |
| 1.019 ≤ w[513] ≤ 1.021 |
| 1.020 ≤ w[514] ≤ 1.022 |
| 1.021 ≤ w[515] ≤ 1.023 |
| 1.021 ≤ w[516] ≤ 1.023 |
| 1.022 ≤ w[517] ≤ 1.024 |
| 1.022 ≤ w[518] ≤ 1.024 |
| 1.023 ≤ w[519] ≤ 1.025 |
| 1.023 ≤ w[520] ≤ 1.025 |
| 1.024 ≤ w[521] ≤ 1.026 |
| 1.025 ≤ w[522] ≤ 1.027 |
| 1.025 ≤ w[523] ≤ 1.027 |
| 1.026 ≤ w[524] ≤ 1.028 |
| 1.026 ≤ w[525] ≤ 1.028 |

TABLE 1-continued

| (window coefficients w(n); N = 960) |
|---|
| 1.027 ≤ w[526] ≤ 1.029 |
| 1.028 ≤ w[527] ≤ 1.030 |
| 1.028 ≤ w[528] ≤ 1.030 |
| 1.029 ≤ w[529] ≤ 1.031 |
| 1.029 ≤ w[530] ≤ 1.031 |
| 1.030 ≤ w[531] ≤ 1.032 |
| 1.030 ≤ w[532] ≤ 1.032 |
| 1.031 ≤ w[533] ≤ 1.033 |
| 1.032 ≤ w[534] ≤ 1.034 |
| 1.032 ≤ w[535] ≤ 1.034 |
| 1.033 ≤ w[536] ≤ 1.035 |
| 1.033 ≤ w[537] ≤ 1.035 |
| 1.034 ≤ w[538] ≤ 1.036 |
| 1.034 ≤ w[539] ≤ 1.036 |
| 1.035 ≤ w[540] ≤ 1.037 |
| 1.036 ≤ w[541] ≤ 1.038 |
| 1.036 ≤ w[542] ≤ 1.038 |
| 1.037 ≤ w[543] ≤ 1.039 |
| 1.037 ≤ w[544] ≤ 1.039 |
| 1.038 ≤ w[545] ≤ 1.040 |
| 1.038 ≤ w[546] ≤ 1.040 |
| 1.039 ≤ w[547] ≤ 1.041 |
| 1.039 ≤ w[548] ≤ 1.041 |
| 1.040 ≤ w[549] ≤ 1.042 |
| 1.040 ≤ w[550] ≤ 1.042 |
| 1.041 ≤ w[551] ≤ 1.043 |
| 1.042 ≤ w[552] ≤ 1.044 |
| 1.042 ≤ w[553] ≤ 1.044 |
| 1.043 ≤ w[554] ≤ 1.045 |
| 1.043 ≤ w[555] ≤ 1.045 |
| 1.044 ≤ w[556] ≤ 1.046 |
| 1.044 ≤ w[557] ≤ 1.046 |
| 1.045 ≤ w[558] ≤ 1.047 |
| 1.045 ≤ w[559] ≤ 1.047 |
| 1.046 ≤ w[560] ≤ 1.048 |
| 1.046 ≤ w[561] ≤ 1.048 |
| 1.047 ≤ w[562] ≤ 1.049 |
| 1.047 ≤ w[563] ≤ 1.049 |
| 1.048 ≤ w[564] ≤ 1.050 |
| 1.048 ≤ w[565] ≤ 1.050 |
| 1.049 ≤ w[566] ≤ 1.051 |
| 1.049 ≤ w[567] ≤ 1.051 |
| 1.050 ≤ w[568] ≤ 1.052 |
| 1.050 ≤ w[569] ≤ 1.052 |
| 1.051 ≤ w[570] ≤ 1.053 |
| 1.051 ≤ w[571] ≤ 1.053 |
| 1.052 ≤ w[572] ≤ 1.054 |
| 1.052 ≤ w[573] ≤ 1.054 |
| 1.053 ≤ w[574] ≤ 1.055 |
| 1.053 ≤ w[575] ≤ 1.055 |
| 1.054 ≤ w[576] ≤ 1.056 |
| 1.054 ≤ w[577] ≤ 1.056 |
| 1.055 ≤ w[578] ≤ 1.057 |
| 1.055 ≤ w[579] ≤ 1.057 |
| 1.056 ≤ w[580] ≤ 1.058 |
| 1.056 ≤ w[581] ≤ 1.058 |
| 1.057 ≤ w[582] ≤ 1.059 |
| 1.057 ≤ w[583] ≤ 1.059 |
| 1.058 ≤ w[584] ≤ 1.060 |
| 1.058 ≤ w[585] ≤ 1.060 |
| 1.058 ≤ w[586] ≤ 1.060 |
| 1.059 ≤ w[587] ≤ 1.061 |
| 1.059 ≤ w[588] ≤ 1.061 |
| 1.060 ≤ w[589] ≤ 1.062 |
| 1.060 ≤ w[590] ≤ 1.062 |
| 1.061 ≤ w[591] ≤ 1.063 |
| 1.061 ≤ w[592] ≤ 1.063 |
| 1.062 ≤ w[593] ≤ 1.064 |
| 1.062 ≤ w[594] ≤ 1.064 |
| 1.063 ≤ w[595] ≤ 1.065 |
| 1.063 ≤ w[596] ≤ 1.065 |
| 1.063 ≤ w[597] ≤ 1.065 |
| 1.064 ≤ w[598] ≤ 1.066 |
| 1.064 ≤ w[599] ≤ 1.066 |
| 1.064 ≤ w[600] ≤ 1.066 |
| 1.064 ≤ w[601] ≤ 1.066 |
| 1.064 ≤ w[602] ≤ 1.066 |
| 1.063 ≤ w[603] ≤ 1.065 |

TABLE 1-continued

| (window coefficients w(n); N = 960) |
|---|
| 1.063 ≤ w[604] ≤ 1.065 |
| 1.062 ≤ w[605] ≤ 1.064 |
| 1.061 ≤ w[606] ≤ 1.063 |
| 1.061 ≤ w[607] ≤ 1.063 |
| 1.060 ≤ w[608] ≤ 1.062 |
| 1.059 ≤ w[609] ≤ 1.061 |
| 1.059 ≤ w[610] ≤ 1.061 |
| 1.058 ≤ w[611] ≤ 1.060 |
| 1.057 ≤ w[612] ≤ 1.059 |
| 1.057 ≤ w[613] ≤ 1.059 |
| 1.056 ≤ w[614] ≤ 1.058 |
| 1.055 ≤ w[615] ≤ 1.057 |
| 1.054 ≤ w[616] ≤ 1.056 |
| 1.054 ≤ w[617] ≤ 1.056 |
| 1.053 ≤ w[618] ≤ 1.055 |
| 1.052 ≤ w[619] ≤ 1.054 |
| 1.051 ≤ w[620] ≤ 1.053 |
| 1.050 ≤ w[621] ≤ 1.052 |
| 1.049 ≤ w[622] ≤ 1.051 |
| 1.048 ≤ w[623] ≤ 1.050 |
| 1.048 ≤ w[624] ≤ 1.050 |
| 1.047 ≤ w[625] ≤ 1.049 |
| 1.046 ≤ w[626] ≤ 1.048 |
| 1.045 ≤ w[627] ≤ 1.047 |
| 1.044 ≤ w[628] ≤ 1.046 |
| 1.043 ≤ w[629] ≤ 1.045 |
| 1.042 ≤ w[630] ≤ 1.044 |
| 1.041 ≤ w[631] ≤ 1.043 |
| 1.040 ≤ w[632] ≤ 1.042 |
| 1.039 ≤ w[633] ≤ 1.041 |
| 1.038 ≤ w[634] ≤ 1.040 |
| 1.037 ≤ w[635] ≤ 1.039 |
| 1.036 ≤ w[636] ≤ 1.038 |
| 1.035 ≤ w[637] ≤ 1.037 |
| 1.033 ≤ w[638] ≤ 1.035 |
| 1.032 ≤ w[639] ≤ 1.034 |
| 1.031 ≤ w[640] ≤ 1.033 |
| 1.029 ≤ w[641] ≤ 1.031 |
| 1.028 ≤ w[642] ≤ 1.030 |
| 1.026 ≤ w[643] ≤ 1.028 |
| 1.025 ≤ w[644] ≤ 1.027 |
| 1.023 ≤ w[645] ≤ 1.025 |
| 1.022 ≤ w[646] ≤ 1.024 |
| 1.020 ≤ w[647] ≤ 1.022 |
| 1.019 ≤ w[648] ≤ 1.021 |
| 1.017 ≤ w[649] ≤ 1.019 |
| 1.016 ≤ w[650] ≤ 1.018 |
| 1.014 ≤ w[651] ≤ 1.016 |
| 1.013 ≤ w[652] ≤ 1.015 |
| 1.011 ≤ w[653] ≤ 1.013 |
| 1.009 ≤ w[654] ≤ 1.011 |
| 1.008 ≤ w[655] ≤ 1.010 |
| 1.006 ≤ w[656] ≤ 1.008 |
| 1.004 ≤ w[657] ≤ 1.006 |
| 1.003 ≤ w[658] ≤ 1.005 |
| 1.001 ≤ w[659] ≤ 1.003 |
| 0.999 ≤ w[660] ≤ 1.001 |
| 0.997 ≤ w[661] ≤ 0.999 |
| 0.995 ≤ w[662] ≤ 0.997 |
| 0.993 ≤ w[663] ≤ 0.995 |
| 0.991 ≤ w[664] ≤ 0.993 |
| 0.989 ≤ w[665] ≤ 0.991 |
| 0.987 ≤ w[666] ≤ 0.989 |
| 0.985 ≤ w[667] ≤ 0.987 |
| 0.983 ≤ w[668] ≤ 0.985 |
| 0.981 ≤ w[669] ≤ 0.983 |
| 0.979 ≤ w[670] ≤ 0.981 |
| 0.977 ≤ w[671] ≤ 0.979 |
| 0.974 ≤ w[672] ≤ 0.976 |
| 0.972 ≤ w[673] ≤ 0.974 |
| 0.970 ≤ w[674] ≤ 0.972 |
| 0.968 ≤ w[675] ≤ 0.970 |
| 0.966 ≤ w[676] ≤ 0.968 |
| 0.964 ≤ w[677] ≤ 0.966 |
| 0.962 ≤ w[678] ≤ 0.964 |
| 0.959 ≤ w[679] ≤ 0.961 |
| 0.957 ≤ w[680] ≤ 0.959 |
| 0.955 ≤ w[681] ≤ 0.957 |

TABLE 1-continued

| (window coefficients w(n); N = 960) |
|---|
| 0.952 ≤ w[682] ≤ 0.954 |
| 0.950 ≤ w[683] ≤ 0.952 |
| 0.948 ≤ w[684] ≤ 0.950 |
| 0.945 ≤ w[685] ≤ 0.947 |
| 0.943 ≤ w[686] ≤ 0.945 |
| 0.940 ≤ w[687] ≤ 0.942 |
| 0.938 ≤ w[688] ≤ 0.940 |
| 0.935 ≤ w[689] ≤ 0.937 |
| 0.933 ≤ w[690] ≤ 0.935 |
| 0.930 ≤ w[691] ≤ 0.932 |
| 0.928 ≤ w[692] ≤ 0.930 |
| 0.925 ≤ w[693] ≤ 0.927 |
| 0.923 ≤ w[694] ≤ 0.925 |
| 0.921 ≤ w[695] ≤ 0.923 |
| 0.918 ≤ w[696] ≤ 0.920 |
| 0.916 ≤ w[697] ≤ 0.918 |
| 0.913 ≤ w[698] ≤ 0.915 |
| 0.910 ≤ w[699] ≤ 0.912 |
| 0.908 ≤ w[700] ≤ 0.910 |
| 0.905 ≤ w[701] ≤ 0.907 |
| 0.902 ≤ w[702] ≤ 0.904 |
| 0.900 ≤ w[703] ≤ 0.902 |
| 0.897 ≤ w[704] ≤ 0.899 |
| 0.894 ≤ w[705] ≤ 0.896 |
| 0.892 ≤ w[706] ≤ 0.894 |
| 0.889 ≤ w[707] ≤ 0.891 |
| 0.886 ≤ w[708] ≤ 0.888 |
| 0.884 ≤ w[709] ≤ 0.886 |
| 0.881 ≤ w[710] ≤ 0.883 |
| 0.878 ≤ w[711] ≤ 0.880 |
| 0.876 ≤ w[712] ≤ 0.878 |
| 0.873 ≤ w[713] ≤ 0.875 |
| 0.870 ≤ w[714] ≤ 0.872 |
| 0.867 ≤ w[715] ≤ 0.869 |
| 0.865 ≤ w[716] ≤ 0.867 |
| 0.862 ≤ w[717] ≤ 0.864 |
| 0.859 ≤ w[718] ≤ 0.861 |
| 0.856 ≤ w[719] ≤ 0.858 |
| 0.854 ≤ w[720] ≤ 0.856 |
| 0.851 ≤ w[721] ≤ 0.853 |
| 0.848 ≤ w[722] ≤ 0.850 |
| 0.845 ≤ w[723] ≤ 0.847 |
| 0.842 ≤ w[724] ≤ 0.844 |
| 0.840 ≤ w[725] ≤ 0.842 |
| 0.837 ≤ w[726] ≤ 0.839 |
| 0.834 ≤ w[727] ≤ 0.836 |
| 0.831 ≤ w[728] ≤ 0.833 |
| 0.828 ≤ w[729] ≤ 0.830 |
| 0.825 ≤ w[730] ≤ 0.827 |
| 0.822 ≤ w[731] ≤ 0.824 |
| 0.820 ≤ w[732] ≤ 0.822 |
| 0.817 ≤ w[733] ≤ 0.819 |
| 0.814 ≤ w[734] ≤ 0.816 |
| 0.811 ≤ w[735] ≤ 0.813 |
| 0.808 ≤ w[736] ≤ 0.810 |
| 0.805 ≤ w[737] ≤ 0.807 |
| 0.802 ≤ w[738] ≤ 0.804 |
| 0.799 ≤ w[739] ≤ 0.801 |
| 0.796 ≤ w[740] ≤ 0.798 |
| 0.793 ≤ w[741] ≤ 0.795 |
| 0.790 ≤ w[742] ≤ 0.792 |
| 0.787 ≤ w[743] ≤ 0.789 |
| 0.784 ≤ w[744] ≤ 0.786 |
| 0.781 ≤ w[745] ≤ 0.783 |
| 0.778 ≤ w[746] ≤ 0.780 |
| 0.776 ≤ w[747] ≤ 0.778 |
| 0.773 ≤ w[748] ≤ 0.775 |
| 0.770 ≤ w[749] ≤ 0.772 |
| 0.767 ≤ w[750] ≤ 0.769 |
| 0.764 ≤ w[751] ≤ 0.766 |
| 0.760 ≤ w[752] ≤ 0.762 |
| 0.757 ≤ w[753] ≤ 0.759 |
| 0.754 ≤ w[754] ≤ 0.756 |
| 0.751 ≤ w[755] ≤ 0.753 |
| 0.748 ≤ w[756] ≤ 0.750 |
| 0.745 ≤ w[757] ≤ 0.747 |
| 0.742 ≤ w[758] ≤ 0.744 |
| 0.739 ≤ w[759] ≤ 0.741 |

TABLE 1-continued

| (window coefficients w(n); N = 960) |
|---|
| 0.736 ≤ w[760] ≤ 0.738 |
| 0.733 ≤ w[761] ≤ 0.735 |
| 0.730 ≤ w[762] ≤ 0.732 |
| 0.727 ≤ w[763] ≤ 0.729 |
| 0.724 ≤ w[764] ≤ 0.726 |
| 0.721 ≤ w[765] ≤ 0.723 |
| 0.718 ≤ w[766] ≤ 0.720 |
| 0.715 ≤ w[767] ≤ 0.717 |
| 0.712 ≤ w[768] ≤ 0.714 |
| 0.709 ≤ w[769] ≤ 0.711 |
| 0.705 ≤ w[770] ≤ 0.707 |
| 0.702 ≤ w[771] ≤ 0.704 |
| 0.699 ≤ w[772] ≤ 0.701 |
| 0.696 ≤ w[773] ≤ 0.698 |
| 0.692 ≤ w[774] ≤ 0.694 |
| 0.689 ≤ w[775] ≤ 0.691 |
| 0.686 ≤ w[776] ≤ 0.688 |
| 0.683 ≤ w[777] ≤ 0.685 |
| 0.680 ≤ w[778] ≤ 0.682 |
| 0.677 ≤ w[779] ≤ 0.679 |
| 0.674 ≤ w[780] ≤ 0.676 |
| 0.670 ≤ w[781] ≤ 0.672 |
| 0.667 ≤ w[782] ≤ 0.669 |
| 0.664 ≤ w[783] ≤ 0.666 |
| 0.661 ≤ w[784] ≤ 0.663 |
| 0.658 ≤ w[785] ≤ 0.660 |
| 0.655 ≤ w[786] ≤ 0.657 |
| 0.652 ≤ w[787] ≤ 0.654 |
| 0.649 ≤ w[788] ≤ 0.651 |
| 0.646 ≤ w[789] ≤ 0.648 |
| 0.643 ≤ w[790] ≤ 0.645 |
| 0.640 ≤ w[791] ≤ 0.642 |
| 0.637 ≤ w[792] ≤ 0.639 |
| 0.634 ≤ w[793] ≤ 0.636 |
| 0.630 ≤ w[794] ≤ 0.632 |
| 0.627 ≤ w[795] ≤ 0.629 |
| 0.624 ≤ w[796] ≤ 0.626 |
| 0.620 ≤ w[797] ≤ 0.622 |
| 0.617 ≤ w[798] ≤ 0.619 |
| 0.614 ≤ w[799] ≤ 0.616 |
| 0.610 ≤ w[800] ≤ 0.612 |
| 0.607 ≤ w[801] ≤ 0.609 |
| 0.604 ≤ w[802] ≤ 0.606 |
| 0.600 ≤ w[803] ≤ 0.602 |
| 0.597 ≤ w[804] ≤ 0.599 |
| 0.594 ≤ w[805] ≤ 0.596 |
| 0.591 ≤ w[806] ≤ 0.593 |
| 0.588 ≤ w[807] ≤ 0.590 |
| 0.585 ≤ w[808] ≤ 0.587 |
| 0.582 ≤ w[809] ≤ 0.584 |
| 0.580 ≤ w[810] ≤ 0.582 |
| 0.577 ≤ w[811] ≤ 0.579 |
| 0.574 ≤ w[812] ≤ 0.576 |
| 0.571 ≤ w[813] ≤ 0.573 |
| 0.568 ≤ w[814] ≤ 0.570 |
| 0.565 ≤ w[815] ≤ 0.567 |
| 0.562 ≤ w[816] ≤ 0.564 |
| 0.558 ≤ w[817] ≤ 0.560 |
| 0.555 ≤ w[818] ≤ 0.557 |
| 0.552 ≤ w[819] ≤ 0.554 |
| 0.548 ≤ w[820] ≤ 0.550 |
| 0.545 ≤ w[821] ≤ 0.547 |
| 0.541 ≤ w[822] ≤ 0.543 |
| 0.538 ≤ w[823] ≤ 0.540 |
| 0.535 ≤ w[824] ≤ 0.537 |
| 0.531 ≤ w[825] ≤ 0.533 |
| 0.528 ≤ w[826] ≤ 0.530 |
| 0.525 ≤ w[827] ≤ 0.527 |
| 0.523 ≤ w[828] ≤ 0.525 |
| 0.520 ≤ w[829] ≤ 0.522 |
| 0.517 ≤ w[830] ≤ 0.519 |
| 0.514 ≤ w[831] ≤ 0.516 |
| 0.511 ≤ w[832] ≤ 0.513 |
| 0.508 ≤ w[833] ≤ 0.510 |
| 0.505 ≤ w[834] ≤ 0.507 |
| 0.502 ≤ w[835] ≤ 0.504 |
| 0.499 ≤ w[836] ≤ 0.501 |
| 0.496 ≤ w[837] ≤ 0.498 |

TABLE 1-continued

| (window coefficients w(n); N = 960) |
|---|
| 0.493 ≤ w[838] ≤ 0.495 |
| 0.489 ≤ w[839] ≤ 0.491 |
| 0.486 ≤ w[840] ≤ 0.488 |
| 0.483 ≤ w[841] ≤ 0.485 |
| 0.480 ≤ w[842] ≤ 0.482 |
| 0.477 ≤ w[843] ≤ 0.479 |
| 0.474 ≤ w[844] ≤ 0.476 |
| 0.471 ≤ w[845] ≤ 0.473 |
| 0.468 ≤ w[846] ≤ 0.470 |
| 0.465 ≤ w[847] ≤ 0.467 |
| 0.462 ≤ w[848] ≤ 0.464 |
| 0.459 ≤ w[849] ≤ 0.461 |
| 0.456 ≤ w[850] ≤ 0.458 |
| 0.453 ≤ w[851] ≤ 0.455 |
| 0.450 ≤ w[852] ≤ 0.452 |
| 0.447 ≤ w[853] ≤ 0.449 |
| 0.444 ≤ w[854] ≤ 0.446 |
| 0.441 ≤ w[855] ≤ 0.443 |
| 0.438 ≤ w[856] ≤ 0.440 |
| 0.435 ≤ w[857] ≤ 0.437 |
| 0.432 ≤ w[858] ≤ 0.434 |
| 0.429 ≤ w[859] ≤ 0.431 |
| 0.426 ≤ w[860] ≤ 0.428 |
| 0.423 ≤ w[861] ≤ 0.425 |
| 0.420 ≤ w[862] ≤ 0.422 |
| 0.417 ≤ w[863] ≤ 0.419 |
| 0.414 ≤ w[864] ≤ 0.416 |
| 0.411 ≤ w[865] ≤ 0.413 |
| 0.408 ≤ w[866] ≤ 0.410 |
| 0.405 ≤ w[867] ≤ 0.407 |
| 0.402 ≤ w[868] ≤ 0.404 |
| 0.399 ≤ w[869] ≤ 0.401 |
| 0.397 ≤ w[870] ≤ 0.399 |
| 0.394 ≤ w[871] ≤ 0.396 |
| 0.391 ≤ w[872] ≤ 0.393 |
| 0.388 ≤ w[873] ≤ 0.390 |
| 0.385 ≤ w[874] ≤ 0.387 |
| 0.382 ≤ w[875] ≤ 0.384 |
| 0.379 ≤ w[876] ≤ 0.381 |
| 0.376 ≤ w[877] ≤ 0.378 |
| 0.374 ≤ w[878] ≤ 0.376 |
| 0.371 ≤ w[879] ≤ 0.373 |
| 0.368 ≤ w[880] ≤ 0.370 |
| 0.365 ≤ w[881] ≤ 0.367 |
| 0.362 ≤ w[882] ≤ 0.364 |
| 0.359 ≤ w[883] ≤ 0.361 |
| 0.357 ≤ w[884] ≤ 0.359 |
| 0.354 ≤ w[885] ≤ 0.356 |
| 0.351 ≤ w[886] ≤ 0.353 |
| 0.348 ≤ w[887] ≤ 0.350 |
| 0.345 ≤ w[888] ≤ 0.347 |
| 0.343 ≤ w[889] ≤ 0.345 |
| 0.340 ≤ w[890] ≤ 0.342 |
| 0.337 ≤ w[891] ≤ 0.339 |
| 0.334 ≤ w[892] ≤ 0.336 |
| 0.331 ≤ w[893] ≤ 0.333 |
| 0.329 ≤ w[894] ≤ 0.331 |
| 0.326 ≤ w[895] ≤ 0.328 |
| 0.323 ≤ w[896] ≤ 0.325 |
| 0.320 ≤ w[897] ≤ 0.322 |
| 0.318 ≤ w[898] ≤ 0.320 |
| 0.315 ≤ w[899] ≤ 0.317 |
| 0.312 ≤ w[900] ≤ 0.314 |
| 0.309 ≤ w[901] ≤ 0.311 |
| 0.306 ≤ w[902] ≤ 0.308 |
| 0.304 ≤ w[903] ≤ 0.306 |
| 0.301 ≤ w[904] ≤ 0.303 |
| 0.298 ≤ w[905] ≤ 0.300 |
| 0.295 ≤ w[906] ≤ 0.297 |
| 0.292 ≤ w[907] ≤ 0.294 |
| 0.290 ≤ w[908] ≤ 0.292 |
| 0.287 ≤ w[909] ≤ 0.289 |
| 0.284 ≤ w[910] ≤ 0.286 |
| 0.281 ≤ w[911] ≤ 0.283 |
| 0.279 ≤ w[912] ≤ 0.281 |
| 0.276 ≤ w[913] ≤ 0.278 |
| 0.273 ≤ w[914] ≤ 0.275 |
| 0.270 ≤ w[915] ≤ 0.272 |

TABLE 1-continued

| (window coefficients w(n); N = 960) |
|---|
| 0.268 ≤ w[916] ≤ 0.270 |
| 0.265 ≤ w[917] ≤ 0.267 |
| 0.262 ≤ w[918] ≤ 0.264 |
| 0.260 ≤ w[919] ≤ 0.262 |
| 0.257 ≤ w[920] ≤ 0.259 |
| 0.254 ≤ w[921] ≤ 0.256 |
| 0.252 ≤ w[922] ≤ 0.254 |
| 0.249 ≤ w[923] ≤ 0.251 |
| 0.247 ≤ w[924] ≤ 0.249 |
| 0.244 ≤ w[925] ≤ 0.246 |
| 0.241 ≤ w[926] ≤ 0.243 |
| 0.239 ≤ w[927] ≤ 0.241 |
| 0.236 ≤ w[928] ≤ 0.238 |
| 0.234 ≤ w[929] ≤ 0.236 |
| 0.231 ≤ w[930] ≤ 0.233 |
| 0.229 ≤ w[931] ≤ 0.231 |
| 0.226 ≤ w[932] ≤ 0.228 |
| 0.224 ≤ w[933] ≤ 0.226 |
| 0.221 ≤ w[934] ≤ 0.223 |
| 0.219 ≤ w[935] ≤ 0.221 |
| 0.216 ≤ w[936] ≤ 0.218 |
| 0.214 ≤ w[937] ≤ 0.216 |
| 0.211 ≤ w[938] ≤ 0.213 |
| 0.209 ≤ w[939] ≤ 0.211 |
| 0.206 ≤ w[940] ≤ 0.208 |
| 0.204 ≤ w[941] ≤ 0.206 |
| 0.201 ≤ w[942] ≤ 0.203 |
| 0.199 ≤ w[943] ≤ 0.201 |
| 0.197 ≤ w[944] ≤ 0.199 |
| 0.194 ≤ w[945] ≤ 0.196 |
| 0.192 ≤ w[946] ≤ 0.194 |
| 0.190 ≤ w[947] ≤ 0.192 |
| 0.187 ≤ w[948] ≤ 0.189 |
| 0.185 ≤ w[949] ≤ 0.187 |
| 0.182 ≤ w[950] ≤ 0.184 |
| 0.180 ≤ w[951] ≤ 0.182 |
| 0.178 ≤ w[952] ≤ 0.180 |
| 0.175 ≤ w[953] ≤ 0.177 |
| 0.173 ≤ w[954] ≤ 0.175 |
| 0.171 ≤ w[955] ≤ 0.173 |
| 0.169 ≤ w[956] ≤ 0.171 |
| 0.166 ≤ w[957] ≤ 0.168 |
| 0.164 ≤ w[958] ≤ 0.166 |
| 0.162 ≤ w[959] ≤ 0.164 |
| 0.159 ≤ w[960] ≤ 0.161 |
| 0.157 ≤ w[961] ≤ 0.159 |
| 0.155 ≤ w[962] ≤ 0.157 |
| 0.153 ≤ w[963] ≤ 0.155 |
| 0.150 ≤ w[964] ≤ 0.152 |
| 0.148 ≤ w[965] ≤ 0.150 |
| 0.146 ≤ w[966] ≤ 0.148 |
| 0.144 ≤ w[967] ≤ 0.146 |
| 0.142 ≤ w[968] ≤ 0.144 |
| 0.140 ≤ w[969] ≤ 0.142 |
| 0.138 ≤ w[970] ≤ 0.140 |
| 0.136 ≤ w[971] ≤ 0.138 |
| 0.134 ≤ w[972] ≤ 0.136 |
| 0.132 ≤ w[973] ≤ 0.134 |
| 0.130 ≤ w[974] ≤ 0.132 |
| 0.128 ≤ w[975] ≤ 0.130 |
| 0.126 ≤ w[976] ≤ 0.128 |
| 0.124 ≤ w[977] ≤ 0.126 |
| 0.123 ≤ w[978] ≤ 0.125 |
| 0.121 ≤ w[979] ≤ 0.123 |
| 0.119 ≤ w[980] ≤ 0.121 |
| 0.117 ≤ w[981] ≤ 0.119 |
| 0.115 ≤ w[982] ≤ 0.117 |
| 0.113 ≤ w[983] ≤ 0.115 |
| 0.111 ≤ w[984] ≤ 0.113 |
| 0.109 ≤ w[985] ≤ 0.111 |
| 0.108 ≤ w[986] ≤ 0.110 |
| 0.106 ≤ w[987] ≤ 0.108 |
| 0.104 ≤ w[988] ≤ 0.106 |
| 0.102 ≤ w[989] ≤ 0.104 |
| 0.101 ≤ w[990] ≤ 0.103 |
| 0.099 ≤ w[991] ≤ 0.101 |
| 0.097 ≤ w[992] ≤ 0.099 |
| 0.095 ≤ w[993] ≤ 0.097 |

TABLE 1-continued

| (window coefficients w(n); N = 960) |
|---|
| 0.094 ≤ w[994] ≤ 0.096 |
| 0.092 ≤ w[995] ≤ 0.094 |
| 0.090 ≤ w[996] ≤ 0.092 |
| 0.089 ≤ w[997] ≤ 0.091 |
| 0.087 ≤ w[998] ≤ 0.089 |
| 0.085 ≤ w[999] ≤ 0.087 |
| 0.084 ≤ w[1000] ≤ 0.086 |
| 0.082 ≤ w[1001] ≤ 0.084 |
| 0.081 ≤ w[1002] ≤ 0.083 |
| 0.079 ≤ w[1003] ≤ 0.081 |
| 0.078 ≤ w[1004] ≤ 0.080 |
| 0.076 ≤ w[1005] ≤ 0.078 |
| 0.074 ≤ w[1006] ≤ 0.076 |
| 0.073 ≤ w[1007] ≤ 0.075 |
| 0.071 ≤ w[1008] ≤ 0.073 |
| 0.070 ≤ w[1009] ≤ 0.072 |
| 0.069 ≤ w[1010] ≤ 0.071 |
| 0.067 ≤ w[1011] ≤ 0.069 |
| 0.066 ≤ w[1012] ≤ 0.068 |
| 0.064 ≤ w[1013] ≤ 0.066 |
| 0.063 ≤ w[1014] ≤ 0.065 |
| 0.061 ≤ w[1015] ≤ 0.063 |
| 0.060 ≤ w[1016] ≤ 0.062 |
| 0.059 ≤ w[1017] ≤ 0.061 |
| 0.057 ≤ w[1018] ≤ 0.059 |
| 0.056 ≤ w[1019] ≤ 0.058 |
| 0.055 ≤ w[1020] ≤ 0.057 |
| 0.053 ≤ w[1021] ≤ 0.055 |
| 0.052 ≤ w[1022] ≤ 0.054 |
| 0.051 ≤ w[1023] ≤ 0.053 |
| 0.050 ≤ w[1024] ≤ 0.052 |
| 0.048 ≤ w[1025] ≤ 0.050 |
| 0.047 ≤ w[1026] ≤ 0.049 |
| 0.046 ≤ w[1027] ≤ 0.048 |
| 0.045 ≤ w[1028] ≤ 0.047 |
| 0.043 ≤ w[1029] ≤ 0.045 |
| 0.042 ≤ w[1030] ≤ 0.044 |
| 0.041 ≤ w[1031] ≤ 0.043 |
| 0.040 ≤ w[1032] ≤ 0.042 |
| 0.039 ≤ w[1033] ≤ 0.041 |
| 0.038 ≤ w[1034] ≤ 0.040 |
| 0.037 ≤ w[1035] ≤ 0.039 |
| 0.036 ≤ w[1036] ≤ 0.038 |
| 0.034 ≤ w[1037] ≤ 0.036 |
| 0.033 ≤ w[1038] ≤ 0.035 |
| 0.032 ≤ w[1039] ≤ 0.034 |
| 0.031 ≤ w[1040] ≤ 0.033 |
| 0.030 ≤ w[1041] ≤ 0.032 |
| 0.029 ≤ w[1042] ≤ 0.031 |
| 0.028 ≤ w[1043] ≤ 0.030 |
| 0.027 ≤ w[1044] ≤ 0.029 |
| 0.026 ≤ w[1045] ≤ 0.028 |
| 0.025 ≤ w[1046] ≤ 0.027 |
| 0.024 ≤ w[1047] ≤ 0.026 |
| 0.024 ≤ w[1048] ≤ 0.026 |
| 0.023 ≤ w[1049] ≤ 0.025 |
| 0.022 ≤ w[1050] ≤ 0.024 |
| 0.021 ≤ w[1051] ≤ 0.023 |
| 0.020 ≤ w[1052] ≤ 0.022 |
| 0.019 ≤ w[1053] ≤ 0.021 |
| 0.018 ≤ w[1054] ≤ 0.020 |
| 0.017 ≤ w[1055] ≤ 0.019 |
| 0.017 ≤ w[1056] ≤ 0.019 |
| 0.016 ≤ w[1057] ≤ 0.018 |
| 0.015 ≤ w[1058] ≤ 0.017 |
| 0.014 ≤ w[1059] ≤ 0.016 |
| 0.014 ≤ w[1060] ≤ 0.016 |
| 0.013 ≤ w[1061] ≤ 0.015 |
| 0.012 ≤ w[1062] ≤ 0.014 |
| 0.011 ≤ w[1063] ≤ 0.013 |
| 0.011 ≤ w[1064] ≤ 0.013 |
| 0.010 ≤ w[1065] ≤ 0.012 |
| 0.009 ≤ w[1066] ≤ 0.011 |
| 0.009 ≤ w[1067] ≤ 0.011 |
| 0.008 ≤ w[1068] ≤ 0.010 |
| 0.007 ≤ w[1069] ≤ 0.009 |
| 0.007 ≤ w[1070] ≤ 0.009 |
| 0.006 ≤ w[1071] ≤ 0.008 |

TABLE 1-continued

| (window coefficients w(n); N = 960) |
|---|
| 0.006 ≤ w[1072] ≤ 0.008 |
| 0.005 ≤ w[1073] ≤ 0.007 |
| 0.004 ≤ w[1074] ≤ 0.006 |
| 0.004 ≤ w[1075] ≤ 0.006 |
| 0.003 ≤ w[1076] ≤ 0.005 |
| 0.003 ≤ w[1077] ≤ 0.005 |
| 0.002 ≤ w[1078] ≤ 0.004 |
| 0.002 ≤ w[1079] ≤ 0.004 |
| 0.001 ≤ w[1080] ≤ 0.003 |
| 0.001 ≤ w[1081] ≤ 0.003 |
| 0.000 ≤ w[1082] ≤ 0.002 |
| 0.000 ≤ w[1083] ≤ 0.002 |
| −0.001 ≤ w[1084] ≤ 0.001 |
| −0.001 ≤ w[1085] ≤ 0.001 |
| −0.002 ≤ w[1086] ≤ 0.000 |
| −0.002 ≤ w[1087] ≤ 0.000 |
| −0.002 ≤ w[1088] ≤ 0.000 |
| −0.003 ≤ w[1089] ≤ −0.001 |
| −0.003 ≤ w[1090] ≤ −0.001 |
| −0.004 ≤ w[1091] ≤ −0.002 |
| −0.004 ≤ w[1092] ≤ −0.002 |
| −0.004 ≤ w[1093] ≤ −0.002 |
| −0.005 ≤ w[1094] ≤ −0.003 |
| −0.005 ≤ w[1095] ≤ −0.003 |
| −0.005 ≤ w[1096] ≤ −0.003 |
| −0.005 ≤ w[1097] ≤ −0.003 |
| −0.006 ≤ w[1098] ≤ −0.004 |
| −0.006 ≤ w[1099] ≤ −0.004 |
| −0.006 ≤ w[1100] ≤ −0.004 |
| −0.006 ≤ w[1101] ≤ −0.004 |
| −0.007 ≤ w[1102] ≤ −0.005 |
| −0.007 ≤ w[1103] ≤ −0.005 |
| −0.007 ≤ w[1104] ≤ −0.005 |
| −0.007 ≤ w[1105] ≤ −0.005 |
| −0.008 ≤ w[1106] ≤ −0.006 |
| −0.008 ≤ w[1107] ≤ −0.006 |
| −0.008 ≤ w[1108] ≤ −0.006 |
| −0.008 ≤ w[1109] ≤ −0.006 |
| −0.009 ≤ w[1110] ≤ −0.007 |
| −0.009 ≤ w[1111] ≤ −0.007 |
| −0.009 ≤ w[1112] ≤ −0.007 |
| −0.009 ≤ w[1113] ≤ −0.007 |
| −0.009 ≤ w[1114] ≤ −0.007 |
| −0.009 ≤ w[1115] ≤ −0.007 |
| −0.009 ≤ w[1116] ≤ −0.007 |
| −0.009 ≤ w[1117] ≤ −0.007 |
| −0.010 ≤ w[1118] ≤ −0.008 |
| −0.010 ≤ w[1119] ≤ −0.008 |
| −0.010 ≤ w[1120] ≤ −0.008 |
| −0.010 ≤ w[1121] ≤ −0.008 |
| −0.010 ≤ w[1122] ≤ −0.008 |
| −0.010 ≤ w[1123] ≤ −0.008 |
| −0.010 ≤ w[1124] ≤ −0.008 |
| −0.010 ≤ w[1125] ≤ −0.008 |
| −0.010 ≤ w[1126] ≤ −0.008 |
| −0.010 ≤ w[1127] ≤ −0.008 |
| −0.010 ≤ w[1128] ≤ −0.008 |
| −0.010 ≤ w[1129] ≤ −0.008 |
| −0.010 ≤ w[1130] ≤ −0.008 |
| −0.010 ≤ w[1131] ≤ −0.008 |
| −0.010 ≤ w[1132] ≤ −0.008 |
| −0.010 ≤ w[1133] ≤ −0.008 |
| −0.010 ≤ w[1134] ≤ −0.008 |
| −0.010 ≤ w[1135] ≤ −0.008 |
| −0.010 ≤ w[1136] ≤ −0.008 |
| −0.010 ≤ w[1137] ≤ −0.008 |
| −0.010 ≤ w[1138] ≤ −0.008 |
| −0.010 ≤ w[1139] ≤ −0.008 |
| −0.010 ≤ w[1140] ≤ −0.008 |
| −0.010 ≤ w[1141] ≤ −0.008 |
| −0.010 ≤ w[1142] ≤ −0.008 |
| −0.010 ≤ w[1143] ≤ −0.008 |
| −0.009 ≤ w[1144] ≤ −0.007 |
| −0.009 ≤ w[1145] ≤ −0.007 |
| −0.009 ≤ w[1146] ≤ −0.007 |
| −0.009 ≤ w[1147] ≤ −0.007 |
| −0.009 ≤ w[1148] ≤ −0.007 |
| −0.009 ≤ w[1149] ≤ −0.007 |

TABLE 1-continued

| (window coefficients w(n); N = 960) |
|---|
| −0.009 ≤ w[1150] ≤ −0.007 |
| −0.009 ≤ w[1151] ≤ −0.007 |
| −0.009 ≤ w[1152] ≤ −0.007 |
| −0.009 ≤ w[1153] ≤ −0.007 |
| −0.008 ≤ w[1154] ≤ −0.006 |
| −0.008 ≤ w[1155] ≤ −0.006 |
| −0.008 ≤ w[1156] ≤ −0.006 |
| −0.008 ≤ w[1157] ≤ −0.006 |
| −0.008 ≤ w[1158] ≤ −0.006 |
| −0.008 ≤ w[1159] ≤ −0.006 |
| −0.008 ≤ w[1160] ≤ −0.006 |
| −0.008 ≤ w[1161] ≤ −0.006 |
| −0.007 ≤ w[1162] ≤ −0.005 |
| −0.007 ≤ w[1163] ≤ −0.005 |
| −0.007 ≤ w[1164] ≤ −0.005 |
| −0.007 ≤ w[1165] ≤ −0.005 |
| −0.007 ≤ w[1166] ≤ −0.005 |
| −0.007 ≤ w[1167] ≤ −0.005 |
| −0.006 ≤ w[1168] ≤ −0.004 |
| −0.006 ≤ w[1169] ≤ −0.004 |
| −0.006 ≤ w[1170] ≤ −0.004 |
| −0.006 ≤ w[1171] ≤ −0.004 |
| −0.006 ≤ w[1172] ≤ −0.004 |
| −0.006 ≤ w[1173] ≤ −0.004 |
| −0.005 ≤ w[1174] ≤ −0.003 |
| −0.005 ≤ w[1175] ≤ −0.003 |
| −0.005 ≤ w[1176] ≤ −0.003 |
| −0.005 ≤ w[1177] ≤ −0.003 |
| −0.005 ≤ w[1178] ≤ −0.003 |
| −0.005 ≤ w[1179] ≤ −0.003 |
| −0.004 ≤ w[1180] ≤ −0.002 |
| −0.004 ≤ w[1181] ≤ −0.002 |
| −0.004 ≤ w[1182] ≤ −0.002 |
| −0.004 ≤ w[1183] ≤ −0.002 |
| −0.004 ≤ w[1184] ≤ −0.002 |
| −0.003 ≤ w[1185] ≤ −0.001 |
| −0.003 ≤ w[1186] ≤ −0.001 |
| −0.003 ≤ w[1187] ≤ −0.001 |
| −0.003 ≤ w[1188] ≤ −0.001 |
| −0.003 ≤ w[1189] ≤ −0.001 |
| −0.003 ≤ w[1190] ≤ −0.001 |
| −0.002 ≤ w[1191] ≤ 0.000 |
| −0.002 ≤ w[1192] ≤ 0.000 |
| −0.002 ≤ w[1193] ≤ 0.000 |
| −0.002 ≤ w[1194] ≤ 0.000 |
| −0.002 ≤ w[1195] ≤ 0.000 |
| −0.002 ≤ w[1196] ≤ 0.000 |
| −0.001 ≤ w[1197] ≤ 0.001 |
| −0.001 ≤ w[1198] ≤ 0.001 |
| −0.001 ≤ w[1199] ≤ 0.001 |
| −0.001 ≤ w[1200] ≤ 0.001 |
| −0.001 ≤ w[1201] ≤ 0.001 |
| −0.001 ≤ w[1202] ≤ 0.001 |
| 0.000 ≤ w[1203] ≤ 0.002 |
| 0.000 ≤ w[1204] ≤ 0.002 |
| 0.000 ≤ w[1205] ≤ 0.002 |
| 0.000 ≤ w[1206] ≤ 0.002 |
| 0.000 ≤ w[1207] ≤ 0.002 |
| 0.000 ≤ w[1208] ≤ 0.002 |
| 0.000 ≤ w[1209] ≤ 0.002 |
| 0.001 ≤ w[1210] ≤ 0.003 |
| 0.001 ≤ w[1211] ≤ 0.003 |
| 0.001 ≤ w[1212] ≤ 0.003 |
| 0.001 ≤ w[1213] ≤ 0.003 |
| 0.001 ≤ w[1214] ≤ 0.003 |
| 0.001 ≤ w[1215] ≤ 0.003 |
| 0.002 ≤ w[1216] ≤ 0.004 |
| 0.002 ≤ w[1217] ≤ 0.004 |
| 0.002 ≤ w[1218] ≤ 0.004 |
| 0.002 ≤ w[1219] ≤ 0.004 |
| 0.002 ≤ w[1220] ≤ 0.004 |
| 0.002 ≤ w[1221] ≤ 0.004 |
| 0.002 ≤ w[1222] ≤ 0.004 |
| 0.002 ≤ w[1223] ≤ 0.004 |
| 0.003 ≤ w[1224] ≤ 0.005 |
| 0.003 ≤ w[1225] ≤ 0.005 |
| 0.003 ≤ w[1226] ≤ 0.005 |
| 0.003 ≤ w[1227] ≤ 0.005 |

TABLE 1-continued

| (window coefficients w(n); N = 960) |
|---|
| 0.003 ≤ w[1228] ≤ 0.005 |
| 0.003 ≤ w[1229] ≤ 0.005 |
| 0.003 ≤ w[1230] ≤ 0.005 |
| 0.003 ≤ w[1231] ≤ 0.005 |
| 0.003 ≤ w[1232] ≤ 0.005 |
| 0.003 ≤ w[1233] ≤ 0.005 |
| 0.004 ≤ w[1234] ≤ 0.006 |
| 0.004 ≤ w[1235] ≤ 0.006 |
| 0.004 ≤ w[1236] ≤ 0.006 |
| 0.004 ≤ w[1237] ≤ 0.006 |
| 0.004 ≤ w[1238] ≤ 0.006 |
| 0.004 ≤ w[1239] ≤ 0.006 |
| 0.004 ≤ w[1240] ≤ 0.006 |
| 0.004 ≤ w[1241] ≤ 0.006 |
| 0.004 ≤ w[1242] ≤ 0.006 |
| 0.004 ≤ w[1243] ≤ 0.006 |
| 0.004 ≤ w[1244] ≤ 0.006 |
| 0.004 ≤ w[1245] ≤ 0.006 |
| 0.004 ≤ w[1246] ≤ 0.006 |
| 0.004 ≤ w[1247] ≤ 0.006 |
| 0.004 ≤ w[1248] ≤ 0.006 |
| 0.004 ≤ w[1249] ≤ 0.006 |
| 0.004 ≤ w[1250] ≤ 0.006 |
| 0.004 ≤ w[1251] ≤ 0.006 |
| 0.004 ≤ w[1252] ≤ 0.006 |
| 0.004 ≤ w[1253] ≤ 0.006 |
| 0.004 ≤ w[1254] ≤ 0.006 |
| 0.004 ≤ w[1255] ≤ 0.006 |
| 0.004 ≤ w[1256] ≤ 0.006 |
| 0.004 ≤ w[1257] ≤ 0.006 |
| 0.004 ≤ w[1258] ≤ 0.006 |
| 0.004 ≤ w[1259] ≤ 0.006 |
| 0.004 ≤ w[1260] ≤ 0.006 |
| 0.004 ≤ w[1261] ≤ 0.006 |
| 0.004 ≤ w[1262] ≤ 0.006 |
| 0.004 ≤ w[1263] ≤ 0.006 |
| 0.004 ≤ w[1264] ≤ 0.006 |
| 0.004 ≤ w[1265] ≤ 0.006 |
| 0.004 ≤ w[1266] ≤ 0.006 |
| 0.004 ≤ w[1267] ≤ 0.006 |
| 0.004 ≤ w[1268] ≤ 0.006 |
| 0.004 ≤ w[1269] ≤ 0.006 |
| 0.004 ≤ w[1270] ≤ 0.006 |
| 0.004 ≤ w[1271] ≤ 0.006 |
| 0.004 ≤ w[1272] ≤ 0.006 |
| 0.004 ≤ w[1273] ≤ 0.006 |
| 0.004 ≤ w[1274] ≤ 0.006 |
| 0.004 ≤ w[1275] ≤ 0.006 |
| 0.004 ≤ w[1276] ≤ 0.006 |
| 0.004 ≤ w[1277] ≤ 0.006 |
| 0.004 ≤ w[1278] ≤ 0.006 |
| 0.003 ≤ w[1279] ≤ 0.005 |
| 0.003 ≤ w[1280] ≤ 0.005 |
| 0.003 ≤ w[1281] ≤ 0.005 |
| 0.003 ≤ w[1282] ≤ 0.005 |
| 0.003 ≤ w[1283] ≤ 0.005 |
| 0.003 ≤ w[1284] ≤ 0.005 |
| 0.003 ≤ w[1285] ≤ 0.005 |
| 0.003 ≤ w[1286] ≤ 0.005 |
| 0.003 ≤ w[1287] ≤ 0.005 |
| 0.003 ≤ w[1288] ≤ 0.005 |
| 0.003 ≤ w[1289] ≤ 0.005 |
| 0.002 ≤ w[1290] ≤ 0.004 |
| 0.002 ≤ w[1291] ≤ 0.004 |
| 0.002 ≤ w[1292] ≤ 0.004 |
| 0.002 ≤ w[1293] ≤ 0.004 |
| 0.002 ≤ w[1294] ≤ 0.004 |
| 0.002 ≤ w[1295] ≤ 0.004 |
| 0.002 ≤ w[1296] ≤ 0.004 |
| 0.001 ≤ w[1297] ≤ 0.003 |
| 0.001 ≤ w[1298] ≤ 0.003 |
| 0.001 ≤ w[1299] ≤ 0.003 |
| 0.001 ≤ w[1300] ≤ 0.003 |
| 0.001 ≤ w[1301] ≤ 0.003 |
| 0.001 ≤ w[1302] ≤ 0.003 |
| 0.001 ≤ w[1303] ≤ 0.003 |
| 0.001 ≤ w[1304] ≤ 0.003 |
| 0.000 ≤ w[1305] ≤ 0.002 |

TABLE 1-continued

| (window coefficients w(n); N = 960) |
|---|
| 0.000 ≤ w[1306] ≤ 0.002 |
| 0.000 ≤ w[1307] ≤ 0.002 |
| 0.000 ≤ w[1308] ≤ 0.002 |
| 0.000 ≤ w[1309] ≤ 0.002 |
| 0.000 ≤ w[1310] ≤ 0.002 |
| 0.000 ≤ w[1311] ≤ 0.002 |
| −0.001 ≤ w[1312] ≤ 0.001 |
| −0.001 ≤ w[1313] ≤ 0.001 |
| −0.001 ≤ w[1314] ≤ 0.001 |
| −0.001 ≤ w[1315] ≤ 0.001 |
| −0.001 ≤ w[1316] ≤ 0.001 |
| −0.001 ≤ w[1317] ≤ 0.001 |
| −0.002 ≤ w[1318] ≤ 0.000 |
| −0.002 ≤ w[1319] ≤ 0.000 |
| −0.002 ≤ w[1320] ≤ 0.000 |
| −0.002 ≤ w[1321] ≤ 0.000 |
| −0.002 ≤ w[1322] ≤ 0.000 |
| −0.002 ≤ w[1323] ≤ 0.000 |
| −0.003 ≤ w[1324] ≤ −0.001 |
| −0.003 ≤ w[1325] ≤ −0.001 |
| −0.003 ≤ w[1326] ≤ −0.001 |
| −0.003 ≤ w[1327] ≤ −0.001 |
| −0.003 ≤ w[1328] ≤ −0.001 |
| −0.003 ≤ w[1329] ≤ −0.001 |
| −0.003 ≤ w[1330] ≤ −0.001 |
| −0.004 ≤ w[1331] ≤ −0.002 |
| −0.004 ≤ w[1332] ≤ −0.002 |
| −0.004 ≤ w[1333] ≤ −0.002 |
| −0.004 ≤ w[1334] ≤ −0.002 |
| −0.004 ≤ w[1335] ≤ −0.002 |
| −0.004 ≤ w[1336] ≤ −0.002 |
| −0.005 ≤ w[1337] ≤ −0.003 |
| −0.005 ≤ w[1338] ≤ −0.003 |
| −0.005 ≤ w[1339] ≤ −0.003 |
| −0.005 ≤ w[1340] ≤ −0.003 |
| −0.005 ≤ w[1341] ≤ −0.003 |
| −0.005 ≤ w[1342] ≤ −0.003 |
| −0.005 ≤ w[1343] ≤ −0.003 |
| −0.006 ≤ w[1344] ≤ −0.004 |
| −0.006 ≤ w[1345] ≤ −0.004 |
| −0.006 ≤ w[1346] ≤ −0.004 |
| −0.006 ≤ w[1347] ≤ −0.004 |
| −0.006 ≤ w[1348] ≤ −0.004 |
| −0.006 ≤ w[1349] ≤ −0.004 |
| −0.006 ≤ w[1350] ≤ −0.004 |
| −0.007 ≤ w[1351] ≤ −0.005 |
| −0.007 ≤ w[1352] ≤ −0.005 |
| −0.007 ≤ w[1353] ≤ −0.005 |
| −0.007 ≤ w[1354] ≤ −0.005 |
| −0.007 ≤ w[1355] ≤ −0.005 |
| −0.007 ≤ w[1356] ≤ −0.005 |
| −0.007 ≤ w[1357] ≤ −0.005 |
| −0.008 ≤ w[1358] ≤ −0.006 |
| −0.008 ≤ w[1359] ≤ −0.006 |
| −0.008 ≤ w[1360] ≤ −0.006 |
| −0.008 ≤ w[1361] ≤ −0.006 |
| −0.008 ≤ w[1362] ≤ −0.006 |
| −0.008 ≤ w[1363] ≤ −0.006 |
| −0.009 ≤ w[1364] ≤ −0.007 |
| −0.009 ≤ w[1365] ≤ −0.007 |
| −0.009 ≤ w[1366] ≤ −0.007 |
| −0.009 ≤ w[1367] ≤ −0.007 |
| −0.009 ≤ w[1368] ≤ −0.007 |
| −0.009 ≤ w[1369] ≤ −0.007 |
| −0.009 ≤ w[1370] ≤ −0.007 |
| −0.010 ≤ w[1371] ≤ −0.008 |
| −0.010 ≤ w[1372] ≤ −0.008 |
| −0.010 ≤ w[1373] ≤ −0.008 |
| −0.010 ≤ w[1374] ≤ −0.008 |
| −0.010 ≤ w[1375] ≤ −0.008 |
| −0.010 ≤ w[1376] ≤ −0.008 |
| −0.011 ≤ w[1377] ≤ −0.009 |
| −0.011 ≤ w[1378] ≤ −0.009 |
| −0.011 ≤ w[1379] ≤ −0.009 |
| −0.011 ≤ w[1380] ≤ −0.009 |
| −0.011 ≤ w[1381] ≤ −0.009 |
| −0.011 ≤ w[1382] ≤ −0.009 |
| −0.012 ≤ w[1383] ≤ −0.010 |

TABLE 1-continued

| (window coefficients w(n); N = 960) |
|---|
| −0.012 ≤ w[1384] ≤ −0.010 |
| −0.012 ≤ w[1385] ≤ −0.010 |
| −0.012 ≤ w[1386] ≤ −0.010 |
| −0.012 ≤ w[1387] ≤ −0.010 |
| −0.012 ≤ w[1388] ≤ −0.010 |
| −0.012 ≤ w[1389] ≤ −0.010 |
| −0.013 ≤ w[1390] ≤ −0.011 |
| −0.013 ≤ w[1391] ≤ −0.011 |
| −0.013 ≤ w[1392] ≤ −0.011 |
| −0.013 ≤ w[1393] ≤ −0.011 |
| −0.013 ≤ w[1394] ≤ −0.011 |
| −0.013 ≤ w[1395] ≤ −0.011 |
| −0.013 ≤ w[1396] ≤ −0.011 |
| −0.013 ≤ w[1397] ≤ −0.011 |
| −0.013 ≤ w[1398] ≤ −0.011 |
| −0.014 ≤ w[1399] ≤ −0.012 |
| −0.014 ≤ w[1400] ≤ −0.012 |
| −0.014 ≤ w[1401] ≤ −0.012 |
| −0.014 ≤ w[1402] ≤ −0.012 |
| −0.014 ≤ w[1403] ≤ −0.012 |
| −0.014 ≤ w[1404] ≤ −0.012 |
| −0.014 ≤ w[1405] ≤ −0.012 |
| −0.014 ≤ w[1406] ≤ −0.012 |
| −0.014 ≤ w[1407] ≤ −0.012 |
| −0.014 ≤ w[1408] ≤ −0.012 |
| −0.014 ≤ w[1409] ≤ −0.012 |
| −0.014 ≤ w[1410] ≤ −0.012 |
| −0.014 ≤ w[1411] ≤ −0.012 |
| −0.014 ≤ w[1412] ≤ −0.012 |
| −0.014 ≤ w[1413] ≤ −0.012 |
| −0.014 ≤ w[1414] ≤ −0.012 |
| −0.014 ≤ w[1415] ≤ −0.012 |
| −0.014 ≤ w[1416] ≤ −0.012 |
| −0.014 ≤ w[1417] ≤ −0.012 |
| −0.014 ≤ w[1418] ≤ −0.012 |
| −0.014 ≤ w[1419] ≤ −0.012 |
| −0.014 ≤ w[1420] ≤ −0.012 |
| −0.014 ≤ w[1421] ≤ −0.012 |
| −0.014 ≤ w[1422] ≤ −0.012 |
| −0.014 ≤ w[1423] ≤ −0.012 |
| −0.014 ≤ w[1424] ≤ −0.012 |
| −0.014 ≤ w[1425] ≤ −0.012 |
| −0.014 ≤ w[1426] ≤ −0.012 |
| −0.014 ≤ w[1427] ≤ −0.012 |
| −0.014 ≤ w[1428] ≤ −0.012 |
| −0.014 ≤ w[1429] ≤ −0.012 |
| −0.014 ≤ w[1430] ≤ −0.012 |
| −0.014 ≤ w[1431] ≤ −0.012 |
| −0.014 ≤ w[1432] ≤ −0.012 |
| −0.014 ≤ w[1433] ≤ −0.012 |
| −0.014 ≤ w[1434] ≤ −0.012 |
| −0.014 ≤ w[1435] ≤ −0.012 |
| −0.014 ≤ w[1436] ≤ −0.012 |
| −0.014 ≤ w[1437] ≤ −0.012 |
| −0.014 ≤ w[1438] ≤ −0.012 |
| −0.014 ≤ w[1439] ≤ −0.012 |
| −0.014 ≤ w[1440] ≤ −0.012 |
| −0.014 ≤ w[1441] ≤ −0.012 |
| −0.014 ≤ w[1442] ≤ −0.012 |
| −0.014 ≤ w[1443] ≤ −0.012 |
| −0.014 ≤ w[1444] ≤ −0.012 |
| −0.014 ≤ w[1445] ≤ −0.012 |
| −0.014 ≤ w[1446] ≤ −0.012 |
| −0.014 ≤ w[1447] ≤ −0.012 |
| −0.014 ≤ w[1448] ≤ −0.012 |
| −0.014 ≤ w[1449] ≤ −0.012 |
| −0.014 ≤ w[1450] ≤ −0.012 |
| −0.013 ≤ w[1451] ≤ −0.011 |
| −0.013 ≤ w[1452] ≤ −0.011 |
| −0.013 ≤ w[1453] ≤ −0.011 |
| −0.013 ≤ w[1454] ≤ −0.011 |
| −0.013 ≤ w[1455] ≤ −0.011 |
| −0.013 ≤ w[1456] ≤ −0.011 |
| −0.013 ≤ w[1457] ≤ −0.011 |
| −0.013 ≤ w[1458] ≤ −0.011 |
| −0.013 ≤ w[1459] ≤ −0.011 |
| −0.013 ≤ w[1460] ≤ −0.011 |
| −0.013 ≤ w[1461] ≤ −0.011 |

TABLE 1-continued

| (window coefficients w(n); N = 960) |
|---|
| −0.013 ≤ w[1462] ≤ −0.011 |
| −0.012 ≤ w[1463] ≤ −0.010 |
| −0.012 ≤ w[1464] ≤ −0.010 |
| −0.012 ≤ w[1465] ≤ −0.010 |
| −0.012 ≤ w[1466] ≤ −0.010 |
| −0.012 ≤ w[1467] ≤ −0.010 |
| −0.012 ≤ w[1468] ≤ −0.010 |
| −0.012 ≤ w[1469] ≤ −0.010 |
| −0.012 ≤ w[1470] ≤ −0.010 |
| −0.012 ≤ w[1471] ≤ −0.010 |
| −0.011 ≤ w[1472] ≤ −0.009 |
| −0.011 ≤ w[1473] ≤ −0.009 |
| −0.011 ≤ w[1474] ≤ −0.009 |
| −0.011 ≤ w[1475] ≤ −0.009 |
| −0.011 ≤ w[1476] ≤ −0.009 |
| −0.011 ≤ w[1477] ≤ −0.009 |
| −0.011 ≤ w[1478] ≤ −0.009 |
| −0.011 ≤ w[1479] ≤ −0.009 |
| −0.011 ≤ w[1480] ≤ −0.009 |
| −0.010 ≤ w[1481] ≤ −0.008 |
| −0.010 ≤ w[1482] ≤ −0.008 |
| −0.010 ≤ w[1483] ≤ −0.008 |
| −0.010 ≤ w[1484] ≤ −0.008 |
| −0.010 ≤ w[1485] ≤ −0.008 |
| −0.010 ≤ w[1486] ≤ −0.008 |
| −0.010 ≤ w[1487] ≤ −0.008 |
| −0.010 ≤ w[1488] ≤ −0.008 |
| −0.010 ≤ w[1489] ≤ −0.008 |
| −0.009 ≤ w[1490] ≤ −0.007 |
| −0.009 ≤ w[1491] ≤ −0.007 |
| −0.009 ≤ w[1492] ≤ −0.007 |
| −0.009 ≤ w[1493] ≤ −0.007 |
| −0.009 ≤ w[1494] ≤ −0.007 |
| −0.009 ≤ w[1495] ≤ −0.007 |
| −0.009 ≤ w[1496] ≤ −0.007 |
| −0.009 ≤ w[1497] ≤ −0.007 |
| −0.009 ≤ w[1498] ≤ −0.007 |
| −0.009 ≤ w[1499] ≤ −0.007 |
| −0.009 ≤ w[1500] ≤ −0.007 |
| −0.009 ≤ w[1501] ≤ −0.007 |
| −0.008 ≤ w[1502] ≤ −0.006 |
| −0.008 ≤ w[1503] ≤ −0.006 |
| −0.008 ≤ w[1504] ≤ −0.006 |
| −0.008 ≤ w[1505] ≤ −0.006 |
| −0.008 ≤ w[1506] ≤ −0.006 |
| −0.008 ≤ w[1507] ≤ −0.006 |
| −0.008 ≤ w[1508] ≤ −0.006 |
| −0.008 ≤ w[1509] ≤ −0.006 |
| −0.008 ≤ w[1510] ≤ −0.006 |
| −0.007 ≤ w[1511] ≤ −0.005 |
| −0.007 ≤ w[1512] ≤ −0.005 |
| −0.007 ≤ w[1513] ≤ −0.005 |
| −0.007 ≤ w[1514] ≤ −0.005 |
| −0.007 ≤ w[1515] ≤ −0.005 |
| −0.007 ≤ w[1516] ≤ −0.005 |
| −0.007 ≤ w[1517] ≤ −0.005 |
| −0.006 ≤ w[1518] ≤ −0.004 |
| −0.006 ≤ w[1519] ≤ −0.004 |
| −0.006 ≤ w[1520] ≤ −0.004 |
| −0.006 ≤ w[1521] ≤ −0.004 |
| −0.006 ≤ w[1522] ≤ −0.004 |
| −0.006 ≤ w[1523] ≤ −0.004 |
| −0.006 ≤ w[1524] ≤ −0.004 |
| −0.005 ≤ w[1525] ≤ −0.003 |
| −0.005 ≤ w[1526] ≤ −0.003 |
| −0.005 ≤ w[1527] ≤ −0.003 |
| −0.005 ≤ w[1528] ≤ −0.003 |
| −0.005 ≤ w[1529] ≤ −0.003 |
| −0.005 ≤ w[1530] ≤ −0.003 |
| −0.005 ≤ w[1531] ≤ −0.003 |
| −0.004 ≤ w[1532] ≤ −0.002 |
| −0.004 ≤ w[1533] ≤ −0.002 |
| −0.004 ≤ w[1534] ≤ −0.002 |
| −0.004 ≤ w[1535] ≤ −0.002 |
| −0.004 ≤ w[1536] ≤ −0.002 |
| −0.004 ≤ w[1537] ≤ −0.002 |
| −0.004 ≤ w[1538] ≤ −0.002 |
| −0.003 ≤ w[1539] ≤ −0.001 |

TABLE 1-continued

| (window coefficients w(n); N = 960) |
|---|
| −0.003 ≤ w[1540] ≤ −0.001 |
| −0.003 ≤ w[1541] ≤ −0.001 |
| −0.003 ≤ w[1542] ≤ −0.001 |
| −0.003 ≤ w[1543] ≤ −0.001 |
| −0.003 ≤ w[1544] ≤ −0.001 |
| −0.003 ≤ w[1545] ≤ −0.001 |
| −0.003 ≤ w[1546] ≤ −0.001 |
| −0.003 ≤ w[1547] ≤ −0.001 |
| −0.002 ≤ w[1548] ≤ 0.000 |
| −0.002 ≤ w[1549] ≤ 0.000 |
| −0.002 ≤ w[1550] ≤ 0.000 |
| −0.002 ≤ w[1551] ≤ 0.000 |
| −0.002 ≤ w[1552] ≤ 0.000 |
| −0.002 ≤ w[1553] ≤ 0.000 |
| −0.002 ≤ w[1554] ≤ 0.000 |
| −0.002 ≤ w[1555] ≤ 0.000 |
| −0.002 ≤ w[1556] ≤ 0.000 |
| −0.002 ≤ w[1557] ≤ 0.000 |
| −0.001 ≤ w[1558] ≤ 0.001 |
| −0.001 ≤ w[1559] ≤ 0.001 |
| −0.001 ≤ w[1560] ≤ 0.001 |
| −0.001 ≤ w[1561] ≤ 0.001 |
| −0.001 ≤ w[1562] ≤ 0.001 |
| −0.001 ≤ w[1563] ≤ 0.001 |
| −0.001 ≤ w[1564] ≤ 0.001 |
| −0.001 ≤ w[1565] ≤ 0.001 |
| −0.001 ≤ w[1566] ≤ 0.001 |
| −0.001 ≤ w[1567] ≤ 0.001 |
| −0.001 ≤ w[1568] ≤ 0.001 |
| −0.001 ≤ w[1569] ≤ 0.001 |
| −0.001 ≤ w[1570] ≤ 0.001 |
| −0.001 ≤ w[1571] ≤ 0.001 |
| −0.001 ≤ w[1572] ≤ 0.001 |
| −0.001 ≤ w[1573] ≤ 0.001 |
| −0.001 ≤ w[1574] ≤ 0.001 |
| −0.001 ≤ w[1575] ≤ 0.001 |
| 0.000 ≤ w[1576] ≤ 0.002 |
| 0.000 ≤ w[1577] ≤ 0.002 |
| 0.000 ≤ w[1578] ≤ 0.002 |
| 0.000 ≤ w[1579] ≤ 0.002 |
| 0.000 ≤ w[1580] ≤ 0.002 |
| 0.000 ≤ w[1581] ≤ 0.002 |
| 0.000 ≤ w[1582] ≤ 0.002 |
| 0.000 ≤ w[1583] ≤ 0.002 |
| 0.000 ≤ w[1584] ≤ 0.002 |
| 0.000 ≤ w[1585] ≤ 0.002 |
| 0.000 ≤ w[1586] ≤ 0.002 |
| 0.000 ≤ w[1587] ≤ 0.002 |
| 0.000 ≤ w[1588] ≤ 0.002 |
| 0.000 ≤ w[1589] ≤ 0.002 |
| 0.000 ≤ w[1590] ≤ 0.002 |
| 0.000 ≤ w[1591] ≤ 0.002 |
| 0.000 ≤ w[1592] ≤ 0.002 |
| 0.000 ≤ w[1593] ≤ 0.002 |
| 0.000 ≤ w[1594] ≤ 0.002 |
| 0.000 ≤ w[1595] ≤ 0.002 |
| 0.000 ≤ w[1596] ≤ 0.002 |
| 0.000 ≤ w[1597] ≤ 0.002 |
| 0.000 ≤ w[1598] ≤ 0.002 |
| 0.000 ≤ w[1599] ≤ 0.002 |
| 0.000 ≤ w[1600] ≤ 0.002 |
| 0.000 ≤ w[1601] ≤ 0.002 |
| 0.000 ≤ w[1602] ≤ 0.002 |
| 0.000 ≤ w[1603] ≤ 0.002 |
| 0.000 ≤ w[1604] ≤ 0.002 |
| 0.000 ≤ w[1605] ≤ 0.002 |
| 0.000 ≤ w[1606] ≤ 0.002 |
| 0.000 ≤ w[1607] ≤ 0.002 |
| 0.000 ≤ w[1608] ≤ 0.002 |
| 0.000 ≤ w[1609] ≤ 0.002 |
| 0.000 ≤ w[1610] ≤ 0.002 |
| 0.000 ≤ w[1611] ≤ 0.002 |
| 0.000 ≤ w[1612] ≤ 0.002 |
| 0.000 ≤ w[1613] ≤ 0.002 |
| 0.000 ≤ w[1614] ≤ 0.002 |
| 0.000 ≤ w[1615] ≤ 0.002 |
| 0.000 ≤ w[1616] ≤ 0.002 |
| 0.000 ≤ w[1617] ≤ 0.002 |

TABLE 1-continued

| (window coefficients w(n); N = 960) |
|---|
| −0.001 ≤ w[1618] ≤ 0.001 |
| −0.001 ≤ w[1619] ≤ 0.001 |
| −0.001 ≤ w[1620] ≤ 0.001 |
| −0.001 ≤ w[1621] ≤ 0.001 |
| −0.001 ≤ w[1622] ≤ 0.001 |
| −0.001 ≤ w[1623] ≤ 0.001 |
| −0.001 ≤ w[1624] ≤ 0.001 |
| −0.001 ≤ w[1625] ≤ 0.001 |
| −0.001 ≤ w[1626] ≤ 0.001 |
| −0.001 ≤ w[1627] ≤ 0.001 |
| −0.001 ≤ w[1628] ≤ 0.001 |
| −0.001 ≤ w[1629] ≤ 0.001 |
| −0.001 ≤ w[1630] ≤ 0.001 |
| −0.001 ≤ w[1631] ≤ 0.001 |
| −0.001 ≤ w[1632] ≤ 0.001 |
| −0.001 ≤ w[1633] ≤ 0.001 |
| −0.001 ≤ w[1634] ≤ 0.001 |
| −0.001 ≤ w[1635] ≤ 0.001 |
| −0.001 ≤ w[1636] ≤ 0.001 |
| −0.001 ≤ w[1637] ≤ 0.001 |
| −0.001 ≤ w[1638] ≤ 0.001 |
| −0.001 ≤ w[1639] ≤ 0.001 |
| −0.001 ≤ w[1640] ≤ 0.001 |
| −0.001 ≤ w[1641] ≤ 0.001 |
| −0.001 ≤ w[1642] ≤ 0.001 |
| −0.001 ≤ w[1643] ≤ 0.001 |
| −0.001 ≤ w[1644] ≤ 0.001 |
| −0.001 ≤ w[1645] ≤ 0.001 |
| −0.001 ≤ w[1646] ≤ 0.001 |
| −0.001 ≤ w[1647] ≤ 0.001 |
| −0.001 ≤ w[1648] ≤ 0.001 |
| −0.001 ≤ w[1649] ≤ 0.001 |
| −0.001 ≤ w[1650] ≤ 0.001 |
| −0.001 ≤ w[1651] ≤ 0.001 |
| −0.001 ≤ w[1652] ≤ 0.001 |
| −0.001 ≤ w[1653] ≤ 0.001 |
| −0.001 ≤ w[1654] ≤ 0.001 |
| −0.001 ≤ w[1655] ≤ 0.001 |
| −0.001 ≤ w[1656] ≤ 0.001 |
| −0.001 ≤ w[1657] ≤ 0.001 |
| −0.001 ≤ w[1658] ≤ 0.001 |
| −0.001 ≤ w[1659] ≤ 0.001 |
| −0.001 ≤ w[1660] ≤ 0.001 |
| −0.001 ≤ w[1661] ≤ 0.001 |
| −0.001 ≤ w[1662] ≤ 0.001 |
| −0.001 ≤ w[1663] ≤ 0.001 |
| −0.001 ≤ w[1664] ≤ 0.001 |
| −0.001 ≤ w[1665] ≤ 0.001 |
| −0.001 ≤ w[1666] ≤ 0.001 |
| −0.001 ≤ w[1667] ≤ 0.001 |
| −0.001 ≤ w[1668] ≤ 0.001 |
| −0.001 ≤ w[1669] ≤ 0.001 |
| −0.001 ≤ w[1670] ≤ 0.001 |
| −0.001 ≤ w[1671] ≤ 0.001 |
| −0.001 ≤ w[1672] ≤ 0.001 |
| −0.001 ≤ w[1673] ≤ 0.001 |
| −0.001 ≤ w[1674] ≤ 0.001 |
| −0.001 ≤ w[1675] ≤ 0.001 |
| −0.001 ≤ w[1676] ≤ 0.001 |
| −0.001 ≤ w[1677] ≤ 0.001 |
| −0.001 ≤ w[1678] ≤ 0.001 |
| −0.001 ≤ w[1679] ≤ 0.001 |
| −0.001 ≤ w[1680] ≤ 0.001 |
| −0.001 ≤ w[1681] ≤ 0.001 |
| −0.001 ≤ w[1682] ≤ 0.001 |
| −0.001 ≤ w[1683] ≤ 0.001 |
| −0.001 ≤ w[1684] ≤ 0.001 |
| −0.001 ≤ w[1685] ≤ 0.001 |
| −0.001 ≤ w[1686] ≤ 0.001 |
| −0.001 ≤ w[1687] ≤ 0.001 |
| −0.001 ≤ w[1688] ≤ 0.001 |
| −0.001 ≤ w[1689] ≤ 0.001 |
| −0.001 ≤ w[1690] ≤ 0.001 |
| −0.001 ≤ w[1691] ≤ 0.001 |
| −0.001 ≤ w[1692] ≤ 0.001 |
| −0.001 ≤ w[1693] ≤ 0.001 |
| −0.001 ≤ w[1694] ≤ 0.001 |
| −0.001 ≤ w[1695] ≤ 0.001 |

TABLE 1-continued

| (window coefficients w(n); N = 960) |
|---|
| −0.001 ≤ w[1696] ≤ 0.001 |
| −0.001 ≤ w[1697] ≤ 0.001 |
| −0.001 ≤ w[1698] ≤ 0.001 |
| −0.001 ≤ w[1699] ≤ 0.001 |
| −0.001 ≤ w[1700] ≤ 0.001 |
| −0.001 ≤ w[1701] ≤ 0.001 |
| −0.001 ≤ w[1702] ≤ 0.001 |
| −0.001 ≤ w[1703] ≤ 0.001 |
| −0.001 ≤ w[1704] ≤ 0.001 |
| −0.001 ≤ w[1705] ≤ 0.001 |
| −0.001 ≤ w[1706] ≤ 0.001 |
| −0.001 ≤ w[1707] ≤ 0.001 |
| −0.001 ≤ w[1708] ≤ 0.001 |
| −0.001 ≤ w[1709] ≤ 0.001 |
| −0.001 ≤ w[1710] ≤ 0.001 |
| −0.001 ≤ w[1711] ≤ 0.001 |
| −0.001 ≤ w[1712] ≤ 0.001 |
| −0.001 ≤ w[1713] ≤ 0.001 |
| −0.001 ≤ w[1714] ≤ 0.001 |
| −0.001 ≤ w[1715] ≤ 0.001 |
| −0.001 ≤ w[1716] ≤ 0.001 |
| −0.001 ≤ w[1717] ≤ 0.001 |
| −0.001 ≤ w[1718] ≤ 0.001 |
| −0.001 ≤ w[1719] ≤ 0.001 |
| −0.001 ≤ w[1720] ≤ 0.001 |
| −0.001 ≤ w[1721] ≤ 0.001 |
| −0.001 ≤ w[1722] ≤ 0.001 |
| −0.001 ≤ w[1723] ≤ 0.001 |
| −0.001 ≤ w[1724] ≤ 0.001 |
| −0.001 ≤ w[1725] ≤ 0.001 |
| −0.001 ≤ w[1726] ≤ 0.001 |
| −0.001 ≤ w[1727] ≤ 0.001 |
| −0.001 ≤ w[1728] ≤ 0.001 |
| −0.001 ≤ w[1729] ≤ 0.001 |
| −0.001 ≤ w[1730] ≤ 0.001 |
| −0.001 ≤ w[1731] ≤ 0.001 |
| −0.001 ≤ w[1732] ≤ 0.001 |
| −0.001 ≤ w[1733] ≤ 0.001 |
| −0.001 ≤ w[1734] ≤ 0.001 |
| −0.001 ≤ w[1735] ≤ 0.001 |
| −0.001 ≤ w[1736] ≤ 0.001 |
| −0.001 ≤ w[1737] ≤ 0.001 |
| −0.001 ≤ w[1738] ≤ 0.001 |
| −0.001 ≤ w[1739] ≤ 0.001 |
| −0.001 ≤ w[1740] ≤ 0.001 |
| −0.001 ≤ w[1741] ≤ 0.001 |
| −0.001 ≤ w[1742] ≤ 0.001 |
| −0.001 ≤ w[1743] ≤ 0.001 |
| −0.001 ≤ w[1744] ≤ 0.001 |
| −0.001 ≤ w[1745] ≤ 0.001 |
| −0.001 ≤ w[1746] ≤ 0.001 |
| −0.001 ≤ w[1747] ≤ 0.001 |
| −0.001 ≤ w[1748] ≤ 0.001 |
| −0.001 ≤ w[1749] ≤ 0.001 |
| −0.001 ≤ w[1750] ≤ 0.001 |
| −0.001 ≤ w[1751] ≤ 0.001 |
| −0.001 ≤ w[1752] ≤ 0.001 |
| −0.001 ≤ w[1753] ≤ 0.001 |
| −0.001 ≤ w[1754] ≤ 0.001 |
| −0.001 ≤ w[1755] ≤ 0.001 |
| −0.001 ≤ w[1756] ≤ 0.001 |
| −0.001 ≤ w[1757] ≤ 0.001 |
| −0.001 ≤ w[1758] ≤ 0.001 |
| −0.001 ≤ w[1759] ≤ 0.001 |
| −0.001 ≤ w[1760] ≤ 0.001 |
| −0.001 ≤ w[1761] ≤ 0.001 |
| −0.001 ≤ w[1762] ≤ 0.001 |
| −0.001 ≤ w[1763] ≤ 0.001 |
| −0.001 ≤ w[1764] ≤ 0.001 |
| −0.001 ≤ w[1765] ≤ 0.001 |
| −0.001 ≤ w[1766] ≤ 0.001 |
| −0.001 ≤ w[1767] ≤ 0.001 |
| −0.001 ≤ w[1768] ≤ 0.001 |
| −0.001 ≤ w[1769] ≤ 0.001 |
| −0.001 ≤ w[1770] ≤ 0.001 |
| −0.001 ≤ w[1771] ≤ 0.001 |
| −0.001 ≤ w[1772] ≤ 0.001 |
| −0.001 ≤ w[1773] ≤ 0.001 |

TABLE 1-continued

| (window coefficients w(n); N = 960) |
|---|
| −0.001 ≤ w[1774] ≤ 0.001 |
| −0.001 ≤ w[1775] ≤ 0.001 |
| −0.001 ≤ w[1776] ≤ 0.001 |
| −0.001 ≤ w[1777] ≤ 0.001 |
| −0.001 ≤ w[1778] ≤ 0.001 |
| −0.001 ≤ w[1779] ≤ 0.001 |
| −0.001 ≤ w[1780] ≤ 0.001 |
| −0.001 ≤ w[1781] ≤ 0.001 |
| −0.001 ≤ w[1782] ≤ 0.001 |
| −0.001 ≤ w[1783] ≤ 0.001 |
| −0.001 ≤ w[1784] ≤ 0.001 |
| −0.001 ≤ w[1785] ≤ 0.001 |
| −0.001 ≤ w[1786] ≤ 0.001 |
| −0.001 ≤ w[1787] ≤ 0.001 |
| −0.001 ≤ w[1788] ≤ 0.001 |
| −0.001 ≤ w[1789] ≤ 0.001 |
| −0.001 ≤ w[1790] ≤ 0.001 |
| −0.001 ≤ w[1791] ≤ 0.001 |
| −0.001 ≤ w[1792] ≤ 0.001 |
| −0.001 ≤ w[1793] ≤ 0.001 |
| −0.001 ≤ w[1794] ≤ 0.001 |
| −0.001 ≤ w[1795] ≤ 0.001 |
| −0.001 ≤ w[1796] ≤ 0.001 |
| −0.001 ≤ w[1797] ≤ 0.001 |
| −0.001 ≤ w[1798] ≤ 0.001 |
| −0.001 ≤ w[1799] ≤ 0.001 |
| −0.001 ≤ w[1800] ≤ 0.001 |
| −0.001 ≤ w[1801] ≤ 0.001 |
| −0.001 ≤ w[1802] ≤ 0.001 |
| −0.001 ≤ w[1803] ≤ 0.001 |
| −0.001 ≤ w[1804] ≤ 0.001 |
| −0.001 ≤ w[1805] ≤ 0.001 |
| −0.001 ≤ w[1806] ≤ 0.001 |
| −0.001 ≤ w[1807] ≤ 0.001 |
| −0.001 ≤ w[1808] ≤ 0.001 |
| −0.001 ≤ w[1809] ≤ 0.001 |
| −0.001 ≤ w[1810] ≤ 0.001 |
| −0.001 ≤ w[1811] ≤ 0.001 |
| −0.001 ≤ w[1812] ≤ 0.001 |
| −0.001 ≤ w[1813] ≤ 0.001 |
| −0.001 ≤ w[1814] ≤ 0.001 |
| −0.002 ≤ w[1815] ≤ 0.000 |
| −0.002 ≤ w[1816] ≤ 0.000 |
| −0.002 ≤ w[1817] ≤ 0.000 |
| −0.002 ≤ w[1818] ≤ 0.000 |
| −0.002 ≤ w[1819] ≤ 0.000 |
| −0.002 ≤ w[1820] ≤ 0.000 |
| −0.002 ≤ w[1821] ≤ 0.000 |
| −0.002 ≤ w[1822] ≤ 0.000 |
| −0.002 ≤ w[1823] ≤ 0.000 |
| −0.002 ≤ w[1824] ≤ 0.000 |
| −0.002 ≤ w[1825] ≤ 0.000 |
| −0.002 ≤ w[1826] ≤ 0.000 |
| −0.002 ≤ w[1827] ≤ 0.000 |
| −0.002 ≤ w[1828] ≤ 0.000 |
| −0.002 ≤ w[1829] ≤ 0.000 |
| −0.002 ≤ w[1830] ≤ 0.000 |
| −0.002 ≤ w[1831] ≤ 0.000 |
| −0.002 ≤ w[1832] ≤ 0.000 |
| −0.002 ≤ w[1833] ≤ 0.000 |
| −0.002 ≤ w[1834] ≤ 0.000 |
| −0.002 ≤ w[1835] ≤ 0.000 |
| −0.002 ≤ w[1836] ≤ 0.000 |
| −0.002 ≤ w[1837] ≤ 0.000 |
| −0.002 ≤ w[1838] ≤ 0.000 |
| −0.002 ≤ w[1839] ≤ 0.000 |
| −0.002 ≤ w[1840] ≤ 0.000 |
| −0.002 ≤ w[1841] ≤ 0.000 |
| −0.002 ≤ w[1842] ≤ 0.000 |
| −0.002 ≤ w[1843] ≤ 0.000 |
| −0.002 ≤ w[1844] ≤ 0.000 |
| −0.002 ≤ w[1845] ≤ 0.000 |
| −0.002 ≤ w[1846] ≤ 0.000 |
| −0.002 ≤ w[1847] ≤ 0.000 |
| −0.002 ≤ w[1848] ≤ 0.000 |
| −0.002 ≤ w[1849] ≤ 0.000 |
| −0.002 ≤ w[1850] ≤ 0.000 |
| −0.002 ≤ w[1851] ≤ 0.000 |

TABLE 1-continued

| (window coefficients w(n); N = 960) |
|---|
| −0.002 ≤ w[1852] ≤ 0.000 |
| −0.002 ≤ w[1853] ≤ 0.000 |
| −0.002 ≤ w[1854] ≤ 0.000 |
| −0.002 ≤ w[1855] ≤ 0.000 |
| −0.002 ≤ w[1856] ≤ 0.000 |
| −0.002 ≤ w[1857] ≤ 0.000 |
| −0.002 ≤ w[1858] ≤ 0.000 |
| −0.002 ≤ w[1859] ≤ 0.000 |
| −0.002 ≤ w[1860] ≤ 0.000 |
| −0.002 ≤ w[1861] ≤ 0.000 |
| −0.002 ≤ w[1862] ≤ 0.000 |
| −0.002 ≤ w[1863] ≤ 0.000 |
| −0.002 ≤ w[1864] ≤ 0.000 |
| −0.002 ≤ w[1865] ≤ 0.000 |
| −0.002 ≤ w[1866] ≤ 0.000 |
| −0.002 ≤ w[1867] ≤ 0.000 |
| −0.002 ≤ w[1868] ≤ 0.000 |
| −0.002 ≤ w[1869] ≤ 0.000 |
| −0.002 ≤ w[1870] ≤ 0.000 |
| −0.002 ≤ w[1871] ≤ 0.000 |
| −0.002 ≤ w[1872] ≤ 0.000 |
| −0.002 ≤ w[1873] ≤ 0.000 |
| −0.002 ≤ w[1874] ≤ 0.000 |
| −0.002 ≤ w[1875] ≤ 0.000 |
| −0.002 ≤ w[1876] ≤ 0.000 |
| −0.002 ≤ w[1877] ≤ 0.000 |
| −0.002 ≤ w[1878] ≤ 0.000 |
| −0.002 ≤ w[1879] ≤ 0.000 |
| −0.002 ≤ w[1880] ≤ 0.000 |
| −0.002 ≤ w[1881] ≤ 0.000 |
| −0.002 ≤ w[1882] ≤ 0.000 |
| −0.002 ≤ w[1883] ≤ 0.000 |
| −0.002 ≤ w[1884] ≤ 0.000 |
| −0.002 ≤ w[1885] ≤ 0.000 |
| −0.002 ≤ w[1886] ≤ 0.000 |
| −0.002 ≤ w[1887] ≤ 0.000 |
| −0.002 ≤ w[1888] ≤ 0.000 |
| −0.002 ≤ w[1889] ≤ 0.000 |
| −0.002 ≤ w[1890] ≤ 0.000 |
| −0.002 ≤ w[1891] ≤ 0.000 |
| −0.002 ≤ w[1892] ≤ 0.000 |
| −0.002 ≤ w[1893] ≤ 0.000 |
| −0.002 ≤ w[1894] ≤ 0.000 |
| −0.002 ≤ w[1895] ≤ 0.000 |
| −0.002 ≤ w[1896] ≤ 0.000 |
| −0.002 ≤ w[1897] ≤ 0.000 |
| −0.002 ≤ w[1898] ≤ 0.000 |
| −0.002 ≤ w[1899] ≤ 0.000 |
| −0.002 ≤ w[1900] ≤ 0.000 |
| −0.002 ≤ w[1901] ≤ 0.000 |
| −0.002 ≤ w[1902] ≤ 0.000 |
| −0.002 ≤ w[1903] ≤ 0.000 |
| −0.002 ≤ w[1904] ≤ 0.000 |
| −0.002 ≤ w[1905] ≤ 0.000 |
| −0.002 ≤ w[1906] ≤ 0.000 |
| −0.002 ≤ w[1907] ≤ 0.000 |
| −0.002 ≤ w[1908] ≤ 0.000 |
| −0.002 ≤ w[1909] ≤ 0.000 |
| −0.002 ≤ w[1910] ≤ 0.000 |
| −0.002 ≤ w[1911] ≤ 0.000 |
| −0.002 ≤ w[1912] ≤ 0.000 |
| −0.002 ≤ w[1913] ≤ 0.000 |
| −0.002 ≤ w[1914] ≤ 0.000 |
| −0.002 ≤ w[1915] ≤ 0.000 |
| −0.002 ≤ w[1916] ≤ 0.000 |
| −0.002 ≤ w[1917] ≤ 0.000 |
| −0.002 ≤ w[1918] ≤ 0.000 |
| −0.002 ≤ w[1919] ≤ 0.000 |

TABLE 2

| (window coefficients w(n); N = 960) |
|---|
| w[0] = 0.00000000 |
| w[1] = 0.00000000 |

TABLE 2-continued

| (window coefficients w(n); N = 960) |
|---|
| w[2] = 0.00000000 |
| w[3] = 0.00000000 |
| w[4] = 0.00000000 |
| w[5] = 0.00000000 |
| w[6] = 0.00000000 |
| w[7] = 0.00000000 |
| w[8] = 0.00000000 |
| w[9] = 0.00000000 |
| w[10] = 0.00000000 |
| w[11] = 0.00000000 |
| w[12] = 0.00000000 |
| w[13] = 0.00000000 |
| w[14] = 0.00000000 |
| w[15] = 0.00000000 |
| w[16] = 0.00000000 |
| w[17] = 0.00000000 |
| w[18] = 0.00000000 |
| w[19] = 0.00000000 |
| w[20] = 0.00000000 |
| w[21] = 0.00000000 |
| w[22] = 0.00000000 |
| w[23] = 0.00000000 |
| w[24] = 0.00000000 |
| w[25] = 0.00000000 |
| w[26] = 0.00000000 |
| w[27] = 0.00000000 |
| w[28] = 0.00000000 |
| w[29] = 0.00000000 |
| w[30] = 0.00000000 |
| w[31] = 0.00000000 |
| w[32] = 0.00000000 |
| w[33] = 0.00000000 |
| w[34] = 0.00000000 |
| w[35] = 0.00000000 |
| w[36] = 0.00000000 |
| w[37] = 0.00000000 |
| w[38] = 0.00000000 |
| w[39] = 0.00000000 |
| w[40] = 0.00000000 |
| w[41] = 0.00000000 |
| w[42] = 0.00000000 |
| w[43] = 0.00000000 |
| w[44] = 0.00000000 |
| w[45] = 0.00000000 |
| w[46] = 0.00000000 |
| w[47] = 0.00000000 |
| w[48] = 0.00000000 |
| w[49] = 0.00000000 |
| w[50] = 0.00000000 |
| w[51] = 0.00000000 |
| w[52] = 0.00000000 |
| w[53] = 0.00000000 |
| w[54] = 0.00000000 |
| w[55] = 0.00000000 |
| w[56] = 0.00000000 |
| w[57] = 0.00000000 |
| w[58] = 0.00000000 |
| w[59] = 0.00000000 |
| w[60] = 0.00000000 |
| w[61] = 0.00000000 |
| w[62] = 0.00000000 |
| w[63] = 0.00000000 |
| w[64] = 0.00000000 |
| w[65] = 0.00000000 |
| w[66] = 0.00000000 |
| w[67] = 0.00000000 |
| w[68] = 0.00000000 |
| w[69] = 0.00000000 |
| w[70] = 0.00000000 |
| w[71] = 0.00000000 |
| w[72] = 0.00000000 |
| w[73] = 0.00000000 |
| w[74] = 0.00000000 |
| w[75] = 0.00000000 |
| w[76] = 0.00000000 |
| w[77] = 0.00000000 |
| w[78] = 0.00000000 |
| w[79] = 0.00000000 |

TABLE 2-continued

| (window coefficients w(n); N = 960) |
|---|
| w[80] = 0.00000000 |
| w[81] = 0.00000000 |
| w[82] = 0.00000000 |
| w[83] = 0.00000000 |
| w[84] = 0.00000000 |
| w[85] = 0.00000000 |
| w[86] = 0.00000000 |
| w[87] = 0.00000000 |
| w[88] = 0.00000000 |
| w[89] = 0.00000000 |
| w[90] = 0.00000000 |
| w[91] = 0.00000000 |
| w[92] = 0.00000000 |
| w[93] = 0.00000000 |
| w[94] = 0.00000000 |
| w[95] = 0.00000000 |
| w[96] = 0.00000000 |
| w[97] = 0.00000000 |
| w[98] = 0.00000000 |
| w[99] = 0.00000000 |
| w[100] = 0.00000000 |
| w[101] = 0.00000000 |
| w[102] = 0.00000000 |
| w[103] = 0.00000000 |
| w[104] = 0.00000000 |
| w[105] = 0.00000000 |
| w[106] = 0.00000000 |
| w[107] = 0.00000000 |
| w[108] = 0.00000000 |
| w[109] = 0.00000000 |
| w[110] = 0.00000000 |
| w[111] = 0.00000000 |
| w[112] = 0.00000000 |
| w[113] = 0.00000000 |
| w[114] = 0.00000000 |
| w[115] = 0.00000000 |
| w[116] = 0.00000000 |
| w[117] = 0.00000000 |
| w[118] = 0.00000000 |
| w[119] = 0.00000000 |
| w[120] = 0.00101191 |
| w[121] = 0.00440397 |
| w[122] = 0.00718669 |
| w[123] = 0.01072130 |
| w[124] = 0.01459757 |
| w[125] = 0.01875954 |
| w[126] = 0.02308987 |
| w[127] = 0.02751541 |
| w[128] = 0.03198130 |
| w[129] = 0.03643738 |
| w[130] = 0.04085290 |
| w[131] = 0.04522835 |
| w[132] = 0.04957620 |
| w[133] = 0.05390454 |
| w[134] = 0.05821503 |
| w[135] = 0.06251214 |
| w[136] = 0.06680463 |
| w[137] = 0.07109582 |
| w[138] = 0.07538014 |
| w[139] = 0.07965207 |
| w[140] = 0.08390857 |
| w[141] = 0.08815177 |
| w[142] = 0.09238785 |
| w[143] = 0.09662163 |
| w[144] = 0.10085860 |
| w[145] = 0.10510892 |
| w[146] = 0.10938110 |
| w[147] = 0.11367819 |
| w[148] = 0.11800355 |
| w[149] = 0.12236410 |
| w[150] = 0.12676834 |
| w[151] = 0.13122384 |
| w[152] = 0.13573476 |
| w[153] = 0.14030106 |
| w[154] = 0.14492340 |
| w[155] = 0.14960315 |
| w[156] = 0.15433828 |
| w[157] = 0.15912396 |

TABLE 2-continued (window coefficients w(n); N = 960)

w[158] = 0.16395663
w[159] = 0.16883310
w[160] = 0.17374837
w[161] = 0.17869679
w[162] = 0.18367394
w[163] = 0.18867661
w[164] = 0.19370368
w[165] = 0.19875413
w[166] = 0.20382641
w[167] = 0.20892055
w[168] = 0.21403775
w[169] = 0.21917761
w[170] = 0.22433899
w[171] = 0.22952250
w[172] = 0.23472991
w[173] = 0.23996189
w[174] = 0.24521859
w[175] = 0.25049930
w[176] = 0.25580312
w[177] = 0.26112942
w[178] = 0.26647748
w[179] = 0.27184703
w[180] = 0.27723785
w[181] = 0.28264967
w[182] = 0.28808086
w[183] = 0.29352832
w[184] = 0.29898979
w[185] = 0.30446379
w[186] = 0.30994292
w[187] = 0.31541664
w[188] = 0.32087942
w[189] = 0.32632772
w[190] = 0.33176291
w[191] = 0.33718641
w[192] = 0.34259612
w[193] = 0.34799346
w[194] = 0.35338857
w[195] = 0.35878843
w[196] = 0.36419504
w[197] = 0.36960630
w[198] = 0.37501567
w[199] = 0.38042067
w[200] = 0.38582069
w[201] = 0.39121276
w[202] = 0.39659312
w[203] = 0.40195993
w[204] = 0.40731155
w[205] = 0.41264382
w[206] = 0.41795277
w[207] = 0.42323670
w[208] = 0.42849480
w[209] = 0.43372753
w[210] = 0.43893452
w[211] = 0.44411398
w[212] = 0.44927117
w[213] = 0.45441882
w[214] = 0.45956191
w[215] = 0.46470167
w[216] = 0.46983016
w[217] = 0.47493636
w[218] = 0.48001827
w[219] = 0.48507480
w[220] = 0.49010240
w[221] = 0.49509781
w[222] = 0.50005986
w[223] = 0.50499037
w[224] = 0.50989790
w[225] = 0.51478708
w[226] = 0.51965805
w[227] = 0.52450975
w[228] = 0.52933955
w[229] = 0.53414668
w[230] = 0.53893113
w[231] = 0.54369178
w[232] = 0.54842731
w[233] = 0.55313757
w[234] = 0.55782259
w[235] = 0.56248253

TABLE 2-continued (window coefficients w(n); N = 960)

w[236] = 0.56711762
w[237] = 0.57172819
w[238] = 0.57631468
w[239] = 0.58087761
w[240] = 0.58719976
w[241] = 0.59173064
w[242] = 0.59623644
w[243] = 0.60071719
w[244] = 0.60517294
w[245] = 0.60960372
w[246] = 0.61400958
w[247] = 0.61839056
w[248] = 0.62274670
w[249] = 0.62707805
w[250] = 0.63138475
w[251] = 0.63566700
w[252] = 0.63992500
w[253] = 0.64415895
w[254] = 0.64836893
w[255] = 0.65255499
w[256] = 0.65671715
w[257] = 0.66085548
w[258] = 0.66497005
w[259] = 0.66906094
w[260] = 0.67312824
w[261] = 0.67717199
w[262] = 0.68119219
w[263] = 0.68518882
w[264] = 0.68916187
w[265] = 0.69311129
w[266] = 0.69703698
w[267] = 0.70093884
w[268] = 0.70481679
w[269] = 0.70867071
w[270] = 0.71250047
w[271] = 0.71630596
w[272] = 0.72008705
w[273] = 0.72384360
w[274] = 0.72757549
w[275] = 0.73128256
w[276] = 0.73496463
w[277] = 0.73862141
w[278] = 0.74225263
w[279] = 0.74585799
w[280] = 0.74943730
w[281] = 0.75299039
w[282] = 0.75651711
w[283] = 0.76001729
w[284] = 0.76349062
w[285] = 0.76693670
w[286] = 0.77035516
w[287] = 0.77374564
w[288] = 0.77710790
w[289] = 0.78044169
w[290] = 0.78374678
w[291] = 0.78702291
w[292] = 0.79026979
w[293] = 0.79348715
w[294] = 0.79667471
w[295] = 0.79983215
w[296] = 0.80295914
w[297] = 0.80605536
w[298] = 0.80912047
w[299] = 0.81215417
w[300] = 0.81515616
w[301] = 0.81812616
w[302] = 0.82106389
w[303] = 0.82396915
w[304] = 0.82684176
w[305] = 0.82968154
w[306] = 0.83248830
w[307] = 0.83526186
w[308] = 0.83800204
w[309] = 0.84070866
w[310] = 0.84338156
w[311] = 0.84602058
w[312] = 0.84862556
w[313] = 0.85119636

TABLE 2-continued

| (window coefficients w(n); N = 960) |
|---|
| w[314] = 0.85373292 |
| w[315] = 0.85623523 |
| w[316] = 0.85870326 |
| w[317] = 0.86113701 |
| w[318] = 0.86353649 |
| w[319] = 0.86590173 |
| w[320] = 0.86823275 |
| w[321] = 0.87052968 |
| w[322] = 0.87279275 |
| w[323] = 0.87502220 |
| w[324] = 0.87721829 |
| w[325] = 0.87938130 |
| w[326] = 0.88151157 |
| w[327] = 0.88360940 |
| w[328] = 0.88567517 |
| w[329] = 0.88770954 |
| w[330] = 0.88971328 |
| w[331] = 0.89168716 |
| w[332] = 0.89363199 |
| w[333] = 0.89554856 |
| w[334] = 0.89743771 |
| w[335] = 0.89930025 |
| w[336] = 0.90113740 |
| w[337] = 0.90295086 |
| w[338] = 0.90474240 |
| w[339] = 0.90651380 |
| w[340] = 0.90826684 |
| w[341] = 0.91000335 |
| w[342] = 0.91172515 |
| w[343] = 0.91343416 |
| w[344] = 0.91513276 |
| w[345] = 0.91682357 |
| w[346] = 0.91850924 |
| w[347] = 0.92019170 |
| w[348] = 0.92187129 |
| w[349] = 0.92354778 |
| w[350] = 0.92522116 |
| w[351] = 0.92688597 |
| w[352] = 0.92852960 |
| w[353] = 0.93013861 |
| w[354] = 0.93169897 |
| w[355] = 0.93319114 |
| w[356] = 0.93458502 |
| w[357] = 0.93587626 |
| w[358] = 0.93694276 |
| w[359] = 0.93825562 |
| w[360] = 0.93882222 |
| w[361] = 0.93910780 |
| w[362] = 0.93944183 |
| w[363] = 0.93981497 |
| w[364] = 0.94021434 |
| w[365] = 0.94062629 |
| w[366] = 0.94103714 |
| w[367] = 0.94144084 |
| w[368] = 0.94184042 |
| w[369] = 0.94223966 |
| w[370] = 0.94264206 |
| w[371] = 0.94304859 |
| w[372] = 0.94345831 |
| w[373] = 0.94387033 |
| w[374] = 0.94428390 |
| w[375] = 0.94469895 |
| w[376] = 0.94511572 |
| w[377] = 0.94553441 |
| w[378] = 0.94595520 |
| w[379] = 0.94637816 |
| w[380] = 0.94680335 |
| w[381] = 0.94723080 |
| w[382] = 0.94766054 |
| w[383] = 0.94809253 |
| w[384] = 0.94852674 |
| w[385] = 0.94896314 |
| w[386] = 0.94940178 |
| w[387] = 0.94984276 |
| w[388] = 0.95028618 |
| w[389] = 0.95073213 |
| w[390] = 0.95118056 |
| w[391] = 0.95163139 |

TABLE 2-continued

| (window coefficients w(n); N = 960) |
|---|
| w[392] = 0.95208451 |
| w[393] = 0.95253992 |
| w[394] = 0.95299770 |
| w[395] = 0.95345799 |
| w[396] = 0.95392092 |
| w[397] = 0.95438653 |
| w[398] = 0.95485472 |
| w[399] = 0.95532539 |
| w[400] = 0.95579847 |
| w[401] = 0.95627397 |
| w[402] = 0.95675201 |
| w[403] = 0.95723273 |
| w[404] = 0.95771618 |
| w[405] = 0.95820232 |
| w[406] = 0.95869103 |
| w[407] = 0.95918218 |
| w[408] = 0.95967573 |
| w[409] = 0.96017172 |
| w[410] = 0.96067026 |
| w[411] = 0.96117144 |
| w[412] = 0.96167526 |
| w[413] = 0.96218157 |
| w[414] = 0.96269026 |
| w[415] = 0.96320119 |
| w[416] = 0.96371437 |
| w[417] = 0.96422988 |
| w[418] = 0.96474782 |
| w[419] = 0.96526824 |
| w[420] = 0.96579106 |
| w[421] = 0.96631614 |
| w[422] = 0.96684334 |
| w[423] = 0.96737257 |
| w[424] = 0.96790390 |
| w[425] = 0.96843740 |
| w[426] = 0.96897315 |
| w[427] = 0.96951112 |
| w[428] = 0.97005119 |
| w[429] = 0.97059318 |
| w[430] = 0.97113697 |
| w[431] = 0.97168253 |
| w[432] = 0.97222994 |
| w[433] = 0.97277928 |
| w[434] = 0.97333058 |
| w[435] = 0.97388375 |
| w[436] = 0.97443863 |
| w[437] = 0.97499505 |
| w[438] = 0.97555292 |
| w[439] = 0.97611230 |
| w[440] = 0.97667326 |
| w[441] = 0.97723589 |
| w[442] = 0.97780016 |
| w[443] = 0.97836592 |
| w[444] = 0.97893300 |
| w[445] = 0.97950127 |
| w[446] = 0.98007071 |
| w[447] = 0.98064139 |
| w[448] = 0.98121342 |
| w[449] = 0.98178684 |
| w[450] = 0.98236156 |
| w[451] = 0.98293743 |
| w[452] = 0.98351428 |
| w[453] = 0.98409205 |
| w[454] = 0.98467078 |
| w[455] = 0.98525056 |
| w[456] = 0.98583146 |
| w[457] = 0.98641348 |
| w[458] = 0.98699650 |
| w[459] = 0.98758037 |
| w[460] = 0.98816497 |
| w[461] = 0.98875030 |
| w[462] = 0.98933647 |
| w[463] = 0.98992356 |
| w[464] = 0.99051163 |
| w[465] = 0.99110062 |
| w[466] = 0.99169038 |
| w[467] = 0.99228079 |
| w[468] = 0.99287177 |
| w[469] = 0.99346341 |

TABLE 2-continued (window coefficients w(n); N = 960)

w[470] = 0.99405581
w[471] = 0.99464907
w[472] = 0.99524320
w[473] = 0.99583812
w[474] = 0.99643375
w[475] = 0.99702997
w[476] = 0.99762671
w[477] = 0.99822386
w[478] = 0.99882134
w[479] = 0.99941903
w[480] = 1.00058131
w[481] = 1.00118006
w[482] = 1.00177930
w[483] = 1.00237893
w[484] = 1.00297887
w[485] = 1.00357902
w[486] = 1.00417927
w[487] = 1.00477954
w[488] = 1.00537972
w[489] = 1.00597973
w[490] = 1.00657959
w[491] = 1.00717940
w[492] = 1.00777926
w[493] = 1.00837925
w[494] = 1.00897929
w[495] = 1.00957926
w[496] = 1.01017901
w[497] = 1.01077847
w[498] = 1.01137769
w[499] = 1.01197678
w[500] = 1.01257582
w[501] = 1.01317482
w[502] = 1.01377365
w[503] = 1.01437217
w[504] = 1.01497025
w[505] = 1.01556786
w[506] = 1.01616510
w[507] = 1.01676205
w[508] = 1.01735876
w[509] = 1.01795514
w[510] = 1.01855103
w[511] = 1.01914627
w[512] = 1.01974076
w[513] = 1.02033455
w[514] = 1.02092772
w[515] = 1.02152037
w[516] = 1.02211247
w[517] = 1.02270387
w[518] = 1.02329439
w[519] = 1.02388387
w[520] = 1.02447229
w[521] = 1.02505972
w[522] = 1.02564624
w[523] = 1.02623190
w[524] = 1.02681660
w[525] = 1.02740017
w[526] = 1.02798242
w[527] = 1.02856326
w[528] = 1.02914272
w[529] = 1.02972087
w[530] = 1.03029778
w[531] = 1.03087344
w[532] = 1.03144768
w[533] = 1.03202035
w[534] = 1.03259127
w[535] = 1.03316042
w[536] = 1.03372788
w[537] = 1.03429373
w[538] = 1.03485801
w[539] = 1.03542064
w[540] = 1.03598146
w[541] = 1.03654030
w[542] = 1.03709708
w[543] = 1.03765185
w[544] = 1.03820470
w[545] = 1.03875571
w[546] = 1.03930488
w[547] = 1.03985206

TABLE 2-continued (window coefficients w(n); N = 960)

w[548] = 1.04039712
w[549] = 1.04093989
w[550] = 1.04148037
w[551] = 1.04201865
w[552] = 1.04255481
w[553] = 1.04308893
w[554] = 1.04362093
w[555] = 1.04415068
w[556] = 1.04467803
w[557] = 1.04520292
w[558] = 1.04572542
w[559] = 1.04624566
w[560] = 1.04676376
w[561] = 1.04727974
w[562] = 1.04779350
w[563] = 1.04830493
w[564] = 1.04881391
w[565] = 1.04932048
w[566] = 1.04982477
w[567] = 1.05032693
w[568] = 1.05082705
w[569] = 1.05132510
w[570] = 1.05182098
w[571] = 1.05231457
w[572] = 1.05280584
w[573] = 1.05329485
w[574] = 1.05378171
w[575] = 1.05426654
w[576] = 1.05474937
w[577] = 1.05523018
w[578] = 1.05570892
w[579] = 1.05618554
w[580] = 1.05666005
w[581] = 1.05713251
w[582] = 1.05760297
w[583] = 1.05807149
w[584] = 1.05853828
w[585] = 1.05900355
w[586] = 1.05946756
w[587] = 1.05993024
w[588] = 1.06039075
w[589] = 1.06084806
w[590] = 1.06130111
w[591] = 1.06175099
w[592] = 1.06220164
w[593] = 1.06265732
w[594] = 1.06312146
w[595] = 1.06358726
w[596] = 1.06403924
w[597] = 1.06446186
w[598] = 1.06484048
w[599] = 1.06516440
w[600] = 1.06527864
w[601] = 1.06498077
w[602] = 1.06470196
w[603] = 1.06425743
w[604] = 1.06372091
w[605] = 1.06311464
w[606] = 1.06246622
w[607] = 1.06179277
w[608] = 1.06110808
w[609] = 1.06042455
w[610] = 1.05974495
w[611] = 1.05906206
w[612] = 1.05836706
w[613] = 1.05765243
w[614] = 1.05691470
w[615] = 1.05615178
w[616] = 1.05536069
w[617] = 1.05454152
w[618] = 1.05370030
w[619] = 1.05284445
w[620] = 1.05198094
w[621] = 1.05111433
w[622] = 1.05024634
w[623] = 1.04937859
w[624] = 1.04851245
w[625] = 1.04764614

TABLE 2-continued (window coefficients w(n); N = 960)

w[626] = 1.04677586
w[627] = 1.04589855
w[628] = 1.04501046
w[629] = 1.04410500
w[630] = 1.04317417
w[631] = 1.04221010
w[632] = 1.04120649
w[633] = 1.04016012
w[634] = 1.03906851
w[635] = 1.03792894
w[636] = 1.03674090
w[637] = 1.03550649
w[638] = 1.03422800
w[639] = 1.03290769
w[640] = 1.03154944
w[641] = 1.03015834
w[642] = 1.02873938
w[643] = 1.02729712
w[644] = 1.02583470
w[645] = 1.02435463
w[646] = 1.02285952
w[647] = 1.02135114
w[648] = 1.01982974
w[649] = 1.01829520
w[650] = 1.01674752
w[651] = 1.01518534
w[652] = 1.01360559
w[653] = 1.01200510
w[654] = 1.01038076
w[655] = 1.00872996
w[656] = 1.00705045
w[657] = 1.00533999
w[658] = 1.00359618
w[659] = 1.00181613
w[660] = 0.99999673
w[661] = 0.99813477
w[662] = 0.99622793
w[663] = 0.99427571
w[664] = 0.99227814
w[665] = 0.99023501
w[666] = 0.98815128
w[667] = 0.98603857
w[668] = 0.98390898
w[669] = 0.98177413
w[670] = 0.97964151
w[671] = 0.97751528
w[672] = 0.97539999
w[673] = 0.97329751
w[674] = 0.97119933
w[675] = 0.96909179
w[676] = 0.96696152
w[677] = 0.96479824
w[678] = 0.96259840
w[679] = 0.96036028
w[680] = 0.95808180
w[681] = 0.95576295
w[682] = 0.95340622
w[683] = 0.95101436
w[684] = 0.94859030
w[685] = 0.94614009
w[686] = 0.94367232
w[687] = 0.94119555
w[688] = 0.93871796
w[689] = 0.93624630
w[690] = 0.93378636
w[691] = 0.93134465
w[692] = 0.92892076
w[693] = 0.92649974
w[694] = 0.92406255
w[695] = 0.92159041
w[696] = 0.91907411
w[697] = 0.91651711
w[698] = 0.91392425
w[699] = 0.91130056
w[700] = 0.90865471
w[701] = 0.90599838
w[702] = 0.90334350
w[703] = 0.90069934

TABLE 2-continued (window coefficients w(n); N = 960)

w[704] = 0.89806435
w[705] = 0.89543132
w[706] = 0.89279335
w[707] = 0.89014496
w[708] = 0.88748403
w[709] = 0.88480945
w[710] = 0.88211997
w[711] = 0.87941558
w[712] = 0.87669794
w[713] = 0.87396891
w[714] = 0.87123030
w[715] = 0.86848394
w[716] = 0.86573164
w[717] = 0.86297523
w[718] = 0.86021649
w[719] = 0.85745725
w[720] = 0.85474342
w[721] = 0.85193656
w[722] = 0.84911455
w[723] = 0.84627969
w[724] = 0.84343424
w[725] = 0.84058046
w[726] = 0.83772057
w[727] = 0.83485680
w[728] = 0.83199134
w[729] = 0.82912621
w[730] = 0.82626143
w[731] = 0.82339529
w[732] = 0.82052619
w[733] = 0.81765147
w[734] = 0.81476433
w[735] = 0.81185593
w[736] = 0.80891701
w[737] = 0.80594452
w[738] = 0.80294885
w[739] = 0.79994431
w[740] = 0.79694485
w[741] = 0.79396166
w[742] = 0.79100220
w[743] = 0.78807349
w[744] = 0.78518123
w[745] = 0.78231422
w[746] = 0.77944709
w[747] = 0.77655407
w[748] = 0.77361369
w[749] = 0.77062281
w[750] = 0.76758806
w[751] = 0.76451506
w[752] = 0.76141145
w[753] = 0.75828860
w[754] = 0.75515892
w[755] = 0.75203479
w[756] = 0.74892561
w[757] = 0.74583682
w[758] = 0.74277342
w[759] = 0.73974008
w[760] = 0.73673754
w[761] = 0.73376310
w[762] = 0.73081444
w[763] = 0.72788616
w[764] = 0.72496070
w[765] = 0.72201426
w[766] = 0.71902283
w[767] = 0.71596990
w[768] = 0.71285541
w[769] = 0.70968427
w[770] = 0.70646064
w[771] = 0.70319589
w[772] = 0.69991077
w[773] = 0.69662714
w[774] = 0.69336592
w[775] = 0.69013742
w[776] = 0.68694302
w[777] = 0.68378420
w[778] = 0.68066143
w[779] = 0.67757157
w[780] = 0.67450951
w[781] = 0.67147030

TABLE 2-continued (window coefficients w(n); N = 960)

w[782] = 0.66844879
w[783] = 0.66543949
w[784] = 0.66243677
w[785] = 0.65943505
w[786] = 0.65642755
w[787] = 0.65340591
w[788] = 0.65036160
w[789] = 0.64728630
w[790] = 0.64417440
w[791] = 0.64102268
w[792] = 0.63782771
w[793] = 0.63458757
w[794] = 0.63130628
w[795] = 0.62799109
w[796] = 0.62464879
w[797] = 0.62128816
w[798] = 0.61792203
w[799] = 0.61456438
w[800] = 0.61122915
w[801] = 0.60792802
w[802] = 0.60466971
w[803] = 0.60146257
w[804] = 0.59831460
w[805] = 0.59522876
w[806] = 0.59220375
w[807] = 0.58923859
w[808] = 0.58632936
w[809] = 0.58346064
w[810] = 0.58061078
w[811] = 0.57775874
w[812] = 0.57488246
w[813] = 0.57195790
w[814] = 0.56896078
w[815] = 0.56586637
w[816] = 0.56266594
w[817] = 0.55937186
w[818] = 0.55599898
w[819] = 0.55256299
w[820] = 0.54909184
w[821] = 0.54562376
w[822] = 0.54219742
w[823] = 0.53884728
w[824] = 0.53559047
w[825] = 0.53243453
w[826] = 0.52938894
w[827] = 0.52645052
w[828] = 0.52358958
w[829] = 0.52076862
w[830] = 0.51795080
w[831] = 0.51510761
w[832] = 0.51222179
w[833] = 0.50927733
w[834] = 0.50625944
w[835] = 0.50317073
w[836] = 0.50002767
w[837] = 0.49685021
w[838] = 0.49364116
w[839] = 0.49048690
w[840] = 0.48726128
w[841] = 0.48404889
w[842] = 0.48090875
w[843] = 0.47783482
w[844] = 0.47481564
w[845] = 0.47184024
w[846] = 0.46889391
w[847] = 0.46595836
w[848] = 0.46301611
w[849] = 0.46005089
w[850] = 0.45705924
w[851] = 0.45404822
w[852] = 0.45102447
w[853] = 0.44799543
w[854] = 0.44497138
w[855] = 0.44196397
w[856] = 0.43898547
w[857] = 0.43604105
w[858] = 0.43312057
w[859] = 0.43020942

TABLE 2-continued (window coefficients w(n); N = 960)

w[860] = 0.42729337
w[861] = 0.42436272
w[862] = 0.42141388
w[863] = 0.41844400
w[864] = 0.41545081
w[865] = 0.41244014
w[866] = 0.40942464
w[867] = 0.40641716
w[868] = 0.40342874
w[869] = 0.40046292
w[870] = 0.39751923
w[871] = 0.39459758
w[872] = 0.39169692
w[873] = 0.38881435
w[874] = 0.38594643
w[875] = 0.38308980
w[876] = 0.38024146
w[877] = 0.37739896
w[878] = 0.37455986
w[879] = 0.37172187
w[880] = 0.36888463
w[881] = 0.36604937
w[882] = 0.36321735
w[883] = 0.36038967
w[884] = 0.35756668
w[885] = 0.35474832
w[886] = 0.35193455
w[887] = 0.34912542
w[888] = 0.34632129
w[889] = 0.34352258
w[890] = 0.34072974
w[891] = 0.33794323
w[892] = 0.33516354
w[893] = 0.33239114
w[894] = 0.32962648
w[895] = 0.32686967
w[896] = 0.32412042
w[897] = 0.32137919
w[898] = 0.31864044
w[899] = 0.31588373
w[900] = 0.31309909
w[901] = 0.31028631
w[902] = 0.30745528
w[903] = 0.30462678
w[904] = 0.30180656
w[905] = 0.29899424
w[906] = 0.29619082
w[907] = 0.29339717
w[908] = 0.29061333
w[909] = 0.28783935
w[910] = 0.28507563
w[911] = 0.28232266
w[912] = 0.27958067
w[913] = 0.27684984
w[914] = 0.27413017
w[915] = 0.27142157
w[916] = 0.26872396
w[917] = 0.26603737
w[918] = 0.26336211
w[919] = 0.26069855
w[920] = 0.25804700
w[921] = 0.25540830
w[922] = 0.25278329
w[923] = 0.25017211
w[924] = 0.24757451
w[925] = 0.24498713
w[926] = 0.24240740
w[927] = 0.23983550
w[928] = 0.23727200
w[929] = 0.23471866
w[930] = 0.23217624
w[931] = 0.22964458
w[932] = 0.22712346
w[933] = 0.22461258
w[934] = 0.22211202
w[935] = 0.21962197
w[936] = 0.21714290
w[937] = 0.21467522

TABLE 2-continued (window coefficients w(n); N = 960)

w[938] = 0.21221877
w[939] = 0.20977323
w[940] = 0.20733693
w[941] = 0.20490860
w[942] = 0.20248823
w[943] = 0.20007615
w[944] = 0.19767358
w[945] = 0.19528091
w[946] = 0.19289781
w[947] = 0.19052347
w[948] = 0.18815661
w[949] = 0.18579693
w[950] = 0.18344441
w[951] = 0.18110010
w[952] = 0.17876595
w[953] = 0.17644344
w[954] = 0.17413400
w[955] = 0.17183905
w[956] = 0.16956003
w[957] = 0.16729836
w[958] = 0.16505547
w[959] = 0.16283278
w[960] = 0.15990780
w[961] = 0.15776021
w[962] = 0.15563325
w[963] = 0.15352557
w[964] = 0.15143584
w[965] = 0.14936270
w[966] = 0.14730481
w[967] = 0.14526081
w[968] = 0.14322937
w[969] = 0.14120918
w[970] = 0.13919977
w[971] = 0.13720138
w[972] = 0.13521422
w[973] = 0.13323852
w[974] = 0.13127445
w[975] = 0.12932216
w[976] = 0.12738181
w[977] = 0.12545358
w[978] = 0.12353773
w[979] = 0.12163457
w[980] = 0.11974436
w[981] = 0.11786730
w[982] = 0.11600347
w[983] = 0.11415293
w[984] = 0.11231573
w[985] = 0.11049201
w[986] = 0.10868196
w[987] = 0.10688578
w[988] = 0.10510362
w[989] = 0.10333551
w[990] = 0.10158143
w[991] = 0.09984133
w[992] = 0.09811524
w[993] = 0.09640327
w[994] = 0.09470556
w[995] = 0.09302228
w[996] = 0.09135347
w[997] = 0.08969907
w[998] = 0.08805903
w[999] = 0.08643326
w[1000] = 0.08482183
w[1001] = 0.08322486
w[1002] = 0.08164249
w[1003] = 0.08007481
w[1004] = 0.07852179
w[1005] = 0.07698335
w[1006] = 0.07545938
w[1007] = 0.07394984
w[1008] = 0.07245482
w[1009] = 0.07097444
w[1010] = 0.06950883
w[1011] = 0.06805800
w[1012] = 0.06662187
w[1013] = 0.06520031
w[1014] = 0.06379324
w[1015] = 0.06240065

TABLE 2-continued (window coefficients w(n); N = 960)

w[1016] = 0.06102266
w[1017] = 0.05965936
w[1018] = 0.05831084
w[1019] = 0.05697701
w[1020] = 0.05565775
w[1021] = 0.05435290
w[1022] = 0.05306239
w[1023] = 0.05178628
w[1024] = 0.05052464
w[1025] = 0.04927758
w[1026] = 0.04804510
w[1027] = 0.04682709
w[1028] = 0.04562344
w[1029] = 0.04443405
w[1030] = 0.04325893
w[1031] = 0.04209822
w[1032] = 0.04095208
w[1033] = 0.03982059
w[1034] = 0.03870371
w[1035] = 0.03760131
w[1036] = 0.03651325
w[1037] = 0.03543944
w[1038] = 0.03437987
w[1039] = 0.03333454
w[1040] = 0.03230348
w[1041] = 0.03128653
w[1042] = 0.03028332
w[1043] = 0.02929346
w[1044] = 0.02831658
w[1045] = 0.02735252
w[1046] = 0.02640127
w[1047] = 0.02546283
w[1048] = 0.02453725
w[1049] = 0.02362471
w[1050] = 0.02272547
w[1051] = 0.02183980
w[1052] = 0.02096810
w[1053] = 0.02011108
w[1054] = 0.01926957
w[1055] = 0.01844439
w[1056] = 0.01763565
w[1057] = 0.01684248
w[1058] = 0.01606394
w[1059] = 0.01529909
w[1060] = 0.01454726
w[1061] = 0.01380802
w[1062] = 0.01308092
w[1063] = 0.01236569
w[1064] = 0.01166273
w[1065] = 0.01097281
w[1066] = 0.01029671
w[1067] = 0.00963479
w[1068] = 0.00898646
w[1069] = 0.00835089
w[1070] = 0.00772725
w[1071] = 0.00711521
w[1072] = 0.00651513
w[1073] = 0.00592741
w[1074] = 0.00535249
w[1075] = 0.00479089
w[1076] = 0.00424328
w[1077] = 0.00371041
w[1078] = 0.00319271
w[1079] = 0.00268947
w[1080] = 0.00219928
w[1081] = 0.00172084
w[1082] = 0.00125271
w[1083] = 0.00079311
w[1084] = 0.00034023
w[1085] = −0.00010786
w[1086] = −0.00055144
w[1087] = −0.00098865
w[1088] = −0.00141741
w[1089] = −0.00183557
w[1090] = −0.00224010
w[1091] = −0.00262725
w[1092] = −0.00299314
w[1093] = −0.00333475

TABLE 2-continued

| (window coefficients w(n); N = 960) |
|---|
| w[1094] = −0.00365250 |
| w[1095] = −0.00394867 |
| w[1096] = −0.00422533 |
| w[1097] = −0.00448528 |
| w[1098] = −0.00473278 |
| w[1099] = −0.00497252 |
| w[1100] = −0.00520916 |
| w[1101] = −0.00544584 |
| w[1102] = −0.00568360 |
| w[1103] = −0.00592326 |
| w[1104] = −0.00616547 |
| w[1105] = −0.00640861 |
| w[1106] = −0.00664914 |
| w[1107] = −0.00688354 |
| w[1108] = −0.00710845 |
| w[1109] = −0.00732136 |
| w[1110] = −0.00752022 |
| w[1111] = −0.00770289 |
| w[1112] = −0.00786789 |
| w[1113] = −0.00801521 |
| w[1114] = −0.00814526 |
| w[1115] = −0.00825839 |
| w[1116] = −0.00835563 |
| w[1117] = −0.00843882 |
| w[1118] = −0.00850996 |
| w[1119] = −0.00857097 |
| w[1120] = −0.00862360 |
| w[1121] = −0.00866943 |
| w[1122] = −0.00871004 |
| w[1123] = −0.00874688 |
| w[1124] = −0.00878091 |
| w[1125] = −0.00881277 |
| w[1126] = −0.00884320 |
| w[1127] = −0.00887248 |
| w[1128] = −0.00890002 |
| w[1129] = −0.00892494 |
| w[1130] = −0.00894641 |
| w[1131] = −0.00896355 |
| w[1132] = −0.00897541 |
| w[1133] = −0.00898104 |
| w[1134] = −0.00897948 |
| w[1135] = −0.00896990 |
| w[1136] = −0.00895149 |
| w[1137] = −0.00892346 |
| w[1138] = −0.00888519 |
| w[1139] = −0.00883670 |
| w[1140] = −0.00877839 |
| w[1141] = −0.00871058 |
| w[1142] = −0.00863388 |
| w[1143] = −0.00854936 |
| w[1144] = −0.00845826 |
| w[1145] = −0.00836179 |
| w[1146] = −0.00826124 |
| w[1147] = −0.00815807 |
| w[1148] = −0.00805372 |
| w[1149] = −0.00794953 |
| w[1150] = −0.00784572 |
| w[1151] = −0.00774156 |
| w[1152] = −0.00763634 |
| w[1153] = −0.00752929 |
| w[1154] = −0.00741941 |
| w[1155] = −0.00730556 |
| w[1156] = −0.00718664 |
| w[1157] = −0.00706184 |
| w[1158] = −0.00693107 |
| w[1159] = −0.00679443 |
| w[1160] = −0.00665200 |
| w[1161] = −0.00650428 |
| w[1162] = −0.00635230 |
| w[1163] = −0.00619718 |
| w[1164] = −0.00603995 |
| w[1165] = −0.00588133 |
| w[1166] = −0.00572169 |
| w[1167] = −0.00556143 |
| w[1168] = −0.00540085 |
| w[1169] = −0.00523988 |
| w[1170] = −0.00507828 |
| w[1171] = −0.00491582 |

TABLE 2-continued

| (window coefficients w(n); N = 960) |
|---|
| w[1172] = −0.00475220 |
| w[1173] = −0.00458693 |
| w[1174] = −0.00441953 |
| w[1175] = −0.00424950 |
| w[1176] = −0.00407681 |
| w[1177] = −0.00390204 |
| w[1178] = −0.00372581 |
| w[1179] = −0.00354874 |
| w[1180] = −0.00337115 |
| w[1181] = −0.00319318 |
| w[1182] = −0.00301494 |
| w[1183] = −0.00283652 |
| w[1184] = −0.00265797 |
| w[1185] = −0.00247934 |
| w[1186] = −0.00230066 |
| w[1187] = −0.00212197 |
| w[1188] = −0.00194331 |
| w[1189] = −0.00176471 |
| w[1190] = −0.00158620 |
| w[1191] = −0.00140787 |
| w[1192] = −0.00122989 |
| w[1193] = −0.00105244 |
| w[1194] = −0.00087567 |
| w[1195] = −0.00069976 |
| w[1196] = −0.00052487 |
| w[1197] = −0.00035115 |
| w[1198] = −0.00017875 |
| w[1199] = −0.00000782 |
| w[1200] = 0.00000779 |
| w[1201] = 0.00017701 |
| w[1202] = 0.00034552 |
| w[1203] = 0.00051313 |
| w[1204] = 0.00067966 |
| w[1205] = 0.00084492 |
| w[1206] = 0.00100873 |
| w[1207] = 0.00117093 |
| w[1208] = 0.00133133 |
| w[1209] = 0.00148978 |
| w[1210] = 0.00164611 |
| w[1211] = 0.00180023 |
| w[1212] = 0.00195211 |
| w[1213] = 0.00210172 |
| w[1214] = 0.00224898 |
| w[1215] = 0.00239383 |
| w[1216] = 0.00253618 |
| w[1217] = 0.00267593 |
| w[1218] = 0.00281306 |
| w[1219] = 0.00294756 |
| w[1220] = 0.00307942 |
| w[1221] = 0.00320864 |
| w[1222] = 0.00333502 |
| w[1223] = 0.00345816 |
| w[1224] = 0.00357762 |
| w[1225] = 0.00369297 |
| w[1226] = 0.00380414 |
| w[1227] = 0.00391140 |
| w[1228] = 0.00401499 |
| w[1229] = 0.00411524 |
| w[1230] = 0.00421242 |
| w[1231] = 0.00430678 |
| w[1232] = 0.00439859 |
| w[1233] = 0.00448799 |
| w[1234] = 0.00457487 |
| w[1235] = 0.00465908 |
| w[1236] = 0.00474045 |
| w[1237] = 0.00481857 |
| w[1238] = 0.00489277 |
| w[1239] = 0.00496235 |
| w[1240] = 0.00502666 |
| w[1241] = 0.00508546 |
| w[1242] = 0.00513877 |
| w[1243] = 0.00518662 |
| w[1244] = 0.00522904 |
| w[1245] = 0.00526648 |
| w[1246] = 0.00529956 |
| w[1247] = 0.00532895 |
| w[1248] = 0.00535532 |
| w[1249] = 0.00537929 |

TABLE 2-continued

| (window coefficients w(n); N = 960) |
|---|
| w[1250] = 0.00540141 |
| w[1251] = 0.00542228 |
| w[1252] = 0.00544196 |
| w[1253] = 0.00545981 |
| w[1254] = 0.00547515 |
| w[1255] = 0.00548726 |
| w[1256] = 0.00549542 |
| w[1257] = 0.00549899 |
| w[1258] = 0.00549732 |
| w[1259] = 0.00548986 |
| w[1260] = 0.00547633 |
| w[1261] = 0.00545664 |
| w[1262] = 0.00543067 |
| w[1263] = 0.00539849 |
| w[1264] = 0.00536061 |
| w[1265] = 0.00531757 |
| w[1266] = 0.00526993 |
| w[1267] = 0.00521822 |
| w[1268] = 0.00516300 |
| w[1269] = 0.00510485 |
| w[1270] = 0.00504432 |
| w[1271] = 0.00498194 |
| w[1272] = 0.00491822 |
| w[1273] = 0.00485364 |
| w[1274] = 0.00478862 |
| w[1275] = 0.00472309 |
| w[1276] = 0.00465675 |
| w[1277] = 0.00458939 |
| w[1278] = 0.00452067 |
| w[1279] = 0.00445003 |
| w[1280] = 0.00437688 |
| w[1281] = 0.00430063 |
| w[1282] = 0.00422062 |
| w[1283] = 0.00413609 |
| w[1284] = 0.00404632 |
| w[1285] = 0.00395060 |
| w[1286] = 0.00384863 |
| w[1287] = 0.00374044 |
| w[1288] = 0.00362600 |
| w[1289] = 0.00350540 |
| w[1290] = 0.00337934 |
| w[1291] = 0.00324885 |
| w[1292] = 0.00311486 |
| w[1293] = 0.00297849 |
| w[1294] = 0.00284122 |
| w[1295] = 0.00270458 |
| w[1296] = 0.00257013 |
| w[1297] = 0.00243867 |
| w[1298] = 0.00231005 |
| w[1299] = 0.00218399 |
| w[1300] = 0.00206023 |
| w[1301] = 0.00193766 |
| w[1302] = 0.00181460 |
| w[1303] = 0.00168938 |
| w[1304] = 0.00156050 |
| w[1305] = 0.00142701 |
| w[1306] = 0.00128831 |
| w[1307] = 0.00114365 |
| w[1308] = 0.00099297 |
| w[1309] = 0.00083752 |
| w[1310] = 0.00067884 |
| w[1311] = 0.00051845 |
| w[1312] = 0.00035760 |
| w[1313] = 0.00019720 |
| w[1314] = 0.00003813 |
| w[1315] = −0.00011885 |
| w[1316] = −0.00027375 |
| w[1317] = −0.00042718 |
| w[1318] = −0.00057975 |
| w[1319] = −0.00073204 |
| w[1320] = −0.00088453 |
| w[1321] = −0.00103767 |
| w[1322] = −0.00119192 |
| w[1323] = −0.00134747 |
| w[1324] = −0.00150411 |
| w[1325] = −0.00166151 |
| w[1326] = −0.00181932 |
| w[1327] = −0.00197723 |

TABLE 2-continued

| (window coefficients w(n); N = 960) |
|---|
| w[1328] = −0.00213493 |
| w[1329] = −0.00229210 |
| w[1330] = −0.00244849 |
| w[1331] = −0.00260415 |
| w[1332] = −0.00275928 |
| w[1333] = −0.00291410 |
| w[1334] = −0.00306879 |
| w[1335] = −0.00322332 |
| w[1336] = −0.00337759 |
| w[1337] = −0.00353145 |
| w[1338] = −0.00368470 |
| w[1339] = −0.00383722 |
| w[1340] = −0.00398892 |
| w[1341] = −0.00413972 |
| w[1342] = −0.00428967 |
| w[1343] = −0.00443889 |
| w[1344] = −0.00458749 |
| w[1345] = −0.00473571 |
| w[1346] = −0.00488366 |
| w[1347] = −0.00503137 |
| w[1348] = −0.00517887 |
| w[1349] = −0.00532610 |
| w[1350] = −0.00547302 |
| w[1351] = −0.00561965 |
| w[1352] = −0.00576598 |
| w[1353] = −0.00591199 |
| w[1354] = −0.00605766 |
| w[1355] = −0.00620300 |
| w[1356] = −0.00634801 |
| w[1357] = −0.00649273 |
| w[1358] = −0.00663727 |
| w[1359] = −0.00678170 |
| w[1360] = −0.00692617 |
| w[1361] = −0.00707084 |
| w[1362] = −0.00721583 |
| w[1363] = −0.00736129 |
| w[1364] = −0.00750735 |
| w[1365] = −0.00765415 |
| w[1366] = −0.00780184 |
| w[1367] = −0.00795060 |
| w[1368] = −0.00810058 |
| w[1369] = −0.00825195 |
| w[1370] = −0.00840487 |
| w[1371] = −0.00855950 |
| w[1372] = −0.00871607 |
| w[1373] = −0.00887480 |
| w[1374] = −0.00903596 |
| w[1375] = −0.00919978 |
| w[1376] = −0.00936650 |
| w[1377] = −0.00953635 |
| w[1378] = −0.00970931 |
| w[1379] = −0.00988421 |
| w[1380] = −0.01005916 |
| w[1381] = −0.01023208 |
| w[1382] = −0.01040130 |
| w[1383] = −0.01056627 |
| w[1384] = −0.01072678 |
| w[1385] = −0.01088259 |
| w[1386] = −0.01103348 |
| w[1387] = −0.01117933 |
| w[1388] = −0.01132004 |
| w[1389] = −0.01145552 |
| w[1390] = −0.01158573 |
| w[1391] = −0.01171065 |
| w[1392] = −0.01183025 |
| w[1393] = −0.01194454 |
| w[1394] = −0.01205352 |
| w[1395] = −0.01215722 |
| w[1396] = −0.01225572 |
| w[1397] = −0.01234911 |
| w[1398] = −0.01243749 |
| w[1399] = −0.01252102 |
| w[1400] = −0.01259985 |
| w[1401] = −0.01267419 |
| w[1402] = −0.01274437 |
| w[1403] = −0.01281078 |
| w[1404] = −0.01287379 |
| w[1405] = −0.01293350 |

TABLE 2-continued

| (window coefficients w(n); N = 960) |
|---|
| w[1406] = −0.01298972 |
| w[1407] = −0.01304224 |
| w[1408] = −0.01309086 |
| w[1409] = −0.01313556 |
| w[1410] = −0.01317644 |
| w[1411] = −0.01321357 |
| w[1412] = −0.01324707 |
| w[1413] = −0.01327697 |
| w[1414] = −0.01330334 |
| w[1415] = −0.01332622 |
| w[1416] = −0.01334570 |
| w[1417] = −0.01336194 |
| w[1418] = −0.01337510 |
| w[1419] = −0.01338538 |
| w[1420] = −0.01339276 |
| w[1421] = −0.01339708 |
| w[1422] = −0.01339816 |
| w[1423] = −0.01339584 |
| w[1424] = −0.01339014 |
| w[1425] = −0.01338116 |
| w[1426] = −0.01336903 |
| w[1427] = −0.01335382 |
| w[1428] = −0.01333545 |
| w[1429] = −0.01331381 |
| w[1430] = −0.01328876 |
| w[1431] = −0.01326033 |
| w[1432] = −0.01322880 |
| w[1433] = −0.01319457 |
| w[1434] = −0.01315806 |
| w[1435] = −0.01311968 |
| w[1436] = −0.01307987 |
| w[1437] = −0.01303906 |
| w[1438] = −0.01299769 |
| w[1439] = −0.01295623 |
| w[1440] = −0.01308207 |
| w[1441] = −0.01304153 |
| w[1442] = −0.01299802 |
| w[1443] = −0.01295155 |
| w[1444] = −0.01290215 |
| w[1445] = −0.01284980 |
| w[1446] = −0.01279450 |
| w[1447] = −0.01273625 |
| w[1448] = −0.01267501 |
| w[1449] = −0.01261077 |
| w[1450] = −0.01254347 |
| w[1451] = −0.01247306 |
| w[1452] = −0.01239950 |
| w[1453] = −0.01232277 |
| w[1454] = −0.01224304 |
| w[1455] = −0.01216055 |
| w[1456] = −0.01207554 |
| w[1457] = −0.01198813 |
| w[1458] = −0.01189829 |
| w[1459] = −0.01180590 |
| w[1460] = −0.01171090 |
| w[1461] = −0.01161335 |
| w[1462] = −0.01151352 |
| w[1463] = −0.01141167 |
| w[1464] = −0.01130807 |
| w[1465] = −0.01120289 |
| w[1466] = −0.01109626 |
| w[1467] = −0.01098830 |
| w[1468] = −0.01087916 |
| w[1469] = −0.01076898 |
| w[1470] = −0.01065793 |
| w[1471] = −0.01054618 |
| w[1472] = −0.01043380 |
| w[1473] = −0.01032068 |
| w[1474] = −0.01020670 |
| w[1475] = −0.01009171 |
| w[1476] = −0.00997585 |
| w[1477] = −0.00985959 |
| w[1478] = −0.00974338 |
| w[1479] = −0.00962765 |
| w[1480] = −0.00951273 |
| w[1481] = −0.00939888 |
| w[1482] = −0.00928634 |
| w[1483] = −0.00917534 |

TABLE 2-continued

| (window coefficients w(n); N = 960) |
|---|
| w[1484] = −0.00906604 |
| w[1485] = −0.00895860 |
| w[1486] = −0.00885313 |
| w[1487] = −0.00874977 |
| w[1488] = −0.00864862 |
| w[1489] = −0.00854979 |
| w[1490] = −0.00845337 |
| w[1491] = −0.00835939 |
| w[1492] = −0.00826785 |
| w[1493] = −0.00817872 |
| w[1494] = −0.00809195 |
| w[1495] = −0.00800745 |
| w[1496] = −0.00792506 |
| w[1497] = −0.00784469 |
| w[1498] = −0.00776588 |
| w[1499] = −0.00768695 |
| w[1500] = −0.00760568 |
| w[1501] = −0.00752004 |
| w[1502] = −0.00742875 |
| w[1503] = −0.00733186 |
| w[1504] = −0.00722976 |
| w[1505] = −0.00712279 |
| w[1506] = −0.00701130 |
| w[1507] = −0.00689559 |
| w[1508] = −0.00677595 |
| w[1509] = −0.00665269 |
| w[1510] = −0.00652610 |
| w[1511] = −0.00639649 |
| w[1512] = −0.00626417 |
| w[1513] = −0.00612943 |
| w[1514] = −0.00599252 |
| w[1515] = −0.00585368 |
| w[1516] = −0.00571315 |
| w[1517] = −0.00557115 |
| w[1518] = −0.00542792 |
| w[1519] = −0.00528367 |
| w[1520] = −0.00513864 |
| w[1521] = −0.00499301 |
| w[1522] = −0.00484693 |
| w[1523] = −0.00470054 |
| w[1524] = −0.00455395 |
| w[1525] = −0.00440733 |
| w[1526] = −0.00426086 |
| w[1527] = −0.00411471 |
| w[1528] = −0.00396904 |
| w[1529] = −0.00382404 |
| w[1530] = −0.00367991 |
| w[1531] = −0.00353684 |
| w[1532] = −0.00339502 |
| w[1533] = −0.00325472 |
| w[1534] = −0.00311618 |
| w[1535] = −0.00297967 |
| w[1536] = −0.00284531 |
| w[1537] = −0.00271307 |
| w[1538] = −0.00258290 |
| w[1539] = −0.00245475 |
| w[1540] = −0.00232860 |
| w[1541] = −0.00220447 |
| w[1542] = −0.00208236 |
| w[1543] = −0.00196233 |
| w[1544] = −0.00184450 |
| w[1545] = −0.00172906 |
| w[1546] = −0.00161620 |
| w[1547] = −0.00150603 |
| w[1548] = −0.00139852 |
| w[1549] = −0.00129358 |
| w[1550] = −0.00119112 |
| w[1551] = −0.00109115 |
| w[1552] = −0.00099375 |
| w[1553] = −0.00089902 |
| w[1554] = −0.00080705 |
| w[1555] = −0.00071796 |
| w[1556] = −0.00063185 |
| w[1557] = −0.00054886 |
| w[1558] = −0.00046904 |
| w[1559] = −0.00039231 |
| w[1560] = −0.00031845 |
| w[1561] = −0.00024728 |

TABLE 2-continued

| (window coefficients w(n); N = 960) |
|---|
| w[1562] = −0.00017860 |
| w[1563] = −0.00011216 |
| w[1564] = −0.00004772 |
| w[1565] = 0.00001500 |
| w[1566] = 0.00007600 |
| w[1567] = 0.00013501 |
| w[1568] = 0.00019176 |
| w[1569] = 0.00024595 |
| w[1570] = 0.00029720 |
| w[1571] = 0.00034504 |
| w[1572] = 0.00038902 |
| w[1573] = 0.00042881 |
| w[1574] = 0.00046456 |
| w[1575] = 0.00049662 |
| w[1576] = 0.00052534 |
| w[1577] = 0.00055114 |
| w[1578] = 0.00057459 |
| w[1579] = 0.00059629 |
| w[1580] = 0.00061684 |
| w[5181] = 0.00063660 |
| w[1582] = 0.00065568 |
| w[1583] = 0.00067417 |
| w[1584] = 0.00069213 |
| w[1585] = 0.00070935 |
| w[1586] = 0.00072545 |
| w[1587] = 0.00074005 |
| w[1588] = 0.00075283 |
| w[1589] = 0.00076356 |
| w[1590] = 0.00077209 |
| w[1591] = 0.00077828 |
| w[1592] = 0.00078205 |
| w[1593] = 0.00078350 |
| w[1594] = 0.00078275 |
| w[1595] = 0.00077992 |
| w[1596] = 0.00077520 |
| w[1597] = 0.00076884 |
| w[1598] = 0.00076108 |
| w[1599] = 0.00075218 |
| w[1600] = 0.00074232 |
| w[1601] = 0.00073170 |
| w[1602] = 0.00072048 |
| w[1603] = 0.00070881 |
| w[1604] = 0.00069680 |
| w[1605] = 0.00068450 |
| w[1606] = 0.00067201 |
| w[1607] = 0.00065934 |
| w[1608] = 0.00064647 |
| w[1609] = 0.00063335 |
| w[1610] = 0.00061994 |
| w[1611] = 0.00060621 |
| w[1612] = 0.00059211 |
| w[1613] = 0.00057763 |
| w[1614] = 0.00056274 |
| w[1615] = 0.00054743 |
| w[1616] = 0.00053169 |
| w[1617] = 0.00051553 |
| w[1618] = 0.00049897 |
| w[1619] = 0.00048206 |
| w[1620] = 0.00046487 |
| w[1621] = 0.00044748 |
| w[1622] = 0.00042996 |
| w[1623] = 0.00041241 |
| w[1624] = 0.00039492 |
| w[1625] = 0.00037759 |
| w[1626] = 0.00036049 |
| w[1627] = 0.00034371 |
| w[1628] = 0.00032732 |
| w[1629] = 0.00031137 |
| w[1630] = 0.00029587 |
| w[1631] = 0.00028080 |
| w[1632] = 0.00026612 |
| w[1633] = 0.00025183 |
| w[1634] = 0.00023789 |
| w[1635] = 0.00022428 |
| w[1636] = 0.00021097 |
| w[1637] = 0.00019797 |
| w[1638] = 0.00018530 |
| w[1639] = 0.00017297 |

TABLE 2-continued

| (window coefficients w(n); N = 960) |
|---|
| w[1640] = 0.00016100 |
| w[1641] = 0.00014942 |
| w[1642] = 0.00013827 |
| w[1643] = 0.00012757 |
| w[1644] = 0.00011736 |
| w[1645] = 0.00010764 |
| w[1646] = 0.00009841 |
| w[1647] = 0.00008969 |
| w[1648] = 0.00008145 |
| w[1649] = 0.00007369 |
| w[1650] = 0.00006641 |
| w[1651] = 0.00005958 |
| w[1652] = 0.00005320 |
| w[1653] = 0.00004725 |
| w[1654] = 0.00004171 |
| w[1655] = 0.00003659 |
| w[1656] = 0.00003186 |
| w[1657] = 0.00002752 |
| w[1658] = 0.00002357 |
| w[1659] = 0.00002000 |
| w[1660] = 0.00001679 |
| w[1661] = 0.00001392 |
| w[1662] = 0.00001140 |
| w[1663] = 0.00000918 |
| w[1664] = 0.00000726 |
| w[1665] = 0.00000562 |
| w[1666] = 0.00000424 |
| w[1667] = 0.00000309 |
| w[1668] = 0.00000217 |
| w[1669] = 0.00000143 |
| w[1670] = 0.00000088 |
| w[1671] = 0.00000048 |
| w[1672] = 0.00000020 |
| w[1673] = 0.00000004 |
| w[1674] = −0.00000004 |
| w[1675] = −0.00000006 |
| w[1676] = −0.00000004 |
| w[1677] = 0.00000000 |
| w[1678] = 0.00000002 |
| w[1679] = 0.00000000 |
| w[1680] = 0.00000000 |
| w[1681] = 0.00000002 |
| w[1682] = 0.00000000 |
| w[1683] = −0.00000004 |
| w[1684] = −0.00000005 |
| w[1685] = −0.00000004 |
| w[1686] = 0.00000004 |
| w[1687] = 0.00000019 |
| w[1688] = 0.00000045 |
| w[1689] = 0.00000083 |
| w[1690] = 0.00000134 |
| w[1691] = 0.00000201 |
| w[1692] = 0.00000285 |
| w[1693] = 0.00000387 |
| w[1694] = 0.00000510 |
| w[1695] = 0.00000654 |
| w[1696] = 0.00000821 |
| w[1697] = 0.00001011 |
| w[1698] = 0.00001227 |
| w[1699] = 0.00001468 |
| w[1700] = 0.00001735 |
| w[1701] = 0.00002030 |
| w[1702] = 0.00002352 |
| w[1703] = 0.00002702 |
| w[1704] = 0.00003080 |
| w[1705] = 0.00003486 |
| w[1706] = 0.00003918 |
| w[1707] = 0.00004379 |
| w[1708] = 0.00004866 |
| w[1709] = 0.00005382 |
| w[1710] = 0.00005924 |
| w[1711] = 0.00006495 |
| w[1712] = 0.00007093 |
| w[1713] = 0.00007719 |
| w[1714] = 0.00008373 |
| w[1715] = 0.00009053 |
| w[1716] = 0.00009758 |
| w[1717] = 0.00010488 |

TABLE 2-continued

| (window coefficients w(n); N = 960) |
|---|
| w[1718] = 0.00011240 |
| w[1719] = 0.00012010 |
| w[1720] = 0.00012796 |
| w[1721] = 0.00013596 |
| w[1722] = 0.00014406 |
| w[1723] = 0.00015226 |
| w[1724] = 0.00016053 |
| w[1725] = 0.00016886 |
| w[1726] = 0.00017725 |
| w[1727] = 0.00018571 |
| w[1728] = 0.00019424 |
| w[1729] = 0.00020286 |
| w[1730] = 0.00021156 |
| w[1731] = 0.00022037 |
| w[1732] = 0.00022928 |
| w[1733] = 0.00023825 |
| w[1734] = 0.00024724 |
| w[1735] = 0.00025621 |
| w[1736] = 0.00026509 |
| w[1737] = 0.00027385 |
| w[1738] = 0.00028241 |
| w[1739] = 0.00029072 |
| w[1740] = 0.00029874 |
| w[1741] = 0.00030643 |
| w[1742] = 0.00031374 |
| w[1743] = 0.00032065 |
| w[1744] = 0.00032715 |
| w[1745] = 0.00033325 |
| w[1746] = 0.00033895 |
| w[1747] = 0.00034425 |
| w[1748] = 0.00034917 |
| w[1749] = 0.00035374 |
| w[1750] = 0.00035796 |
| w[1751] = 0.00036187 |
| w[1752] = 0.00036549 |
| w[1753] = 0.00036883 |
| w[1754] = 0.00037194 |
| w[1755] = 0.00037479 |
| w[1756] = 0.00037736 |
| w[1757] = 0.00037963 |
| w[1758] = 0.00038154 |
| w[1759] = 0.00038306 |
| w[1760] = 0.00038411 |
| w[1761] = 0.00038462 |
| w[1762] = 0.00038453 |
| w[1763] = 0.00038373 |
| w[1764] = 0.00038213 |
| w[1765] = 0.00037965 |
| w[1766] = 0.00037621 |
| w[1767] = 0.00037179 |
| w[1768] = 0.00036636 |
| w[1769] = 0.00035989 |
| w[1770] = 0.00035244 |
| w[1771] = 0.00034407 |
| w[1772] = 0.00033488 |
| w[1773] = 0.00032497 |
| w[1774] = 0.00031449 |
| w[1775] = 0.00030361 |
| w[1776] = 0.00029252 |
| w[1777] = 0.00028133 |
| w[1778] = 0.00027003 |
| w[1779] = 0.00025862 |
| w[1780] = 0.00024706 |
| w[1781] = 0.00023524 |
| w[1782] = 0.00022297 |
| w[1783] = 0.00021004 |
| w[1784] = 0.00019626 |
| w[1785] = 0.00018150 |
| w[1786] = 0.00016566 |
| w[1787] = 0.00014864 |
| w[1788] = 0.00013041 |
| w[1789] = 0.00011112 |
| w[1790] = 0.00009096 |
| w[1791] = 0.00007014 |
| w[1792] = 0.00004884 |
| w[1793] = 0.00002718 |
| w[1794] = 0.00000530 |
| w[1795] = −0.00001667 |

TABLE 2-continued

| (window coefficients w(n); N = 960) |
|---|
| w[1796] = −0.00003871 |
| w[1797] = −0.00006090 |
| w[1798] = −0.00008331 |
| w[1799] = −0.00010600 |
| w[1800] = −0.00012902 |
| w[1801] = −0.00015244 |
| w[1802] = −0.00017631 |
| w[1803] = −0.00020065 |
| w[1804] = −0.00022541 |
| w[1805] = −0.00025052 |
| w[1806] = −0.00027594 |
| w[1807] = −0.00030159 |
| w[1808] = −0.00032740 |
| w[1809] = −0.00035332 |
| w[1810] = −0.00037928 |
| w[1811] = −0.00040527 |
| w[1812] = −0.00043131 |
| w[1813] = −0.00045741 |
| w[1814] = −0.00048357 |
| w[1815] = −0.00050978 |
| w[1816] = −0.00053599 |
| w[1817] = −0.00056217 |
| w[1818] = −0.00058827 |
| w[1819] = −0.00061423 |
| w[1820] = −0.00064002 |
| w[1821] = −0.00066562 |
| w[1822] = −0.00069100 |
| w[1823] = −0.00071616 |
| w[1824] = −0.00074110 |
| w[1825] = −0.00076584 |
| w[1826] = −0.00079036 |
| w[1827] = −0.00081465 |
| w[1828] = −0.00083869 |
| w[1829] = −0.00086245 |
| w[1830] = −0.00088590 |
| w[1831] = −0.00090901 |
| w[1832] = −0.00093176 |
| w[1833] = −0.00095413 |
| w[1834] = −0.00097608 |
| w[1835] = −0.00099758 |
| w[1836] = −0.00101862 |
| w[1837] = −0.00103918 |
| w[1838] = −0.00105924 |
| w[1839] = −0.00107879 |
| w[1840] = −0.00109783 |
| w[1841] = −0.00111635 |
| w[1842] = −0.00113434 |
| w[1843] = −0.00115181 |
| w[1844] = −0.00116873 |
| w[1845] = −0.00118510 |
| w[1846] = −0.00120091 |
| w[1847] = −0.00121615 |
| w[1848] = −0.00123082 |
| w[1849] = −0.00124490 |
| w[1850] = −0.00125838 |
| w[1851] = −0.00127125 |
| w[1852] = −0.00128350 |
| w[1853] = −0.00129511 |
| w[1854] = −0.00130610 |
| w[1855] = −0.00131643 |
| w[1856] = −0.00132610 |
| w[1857] = −0.00133509 |
| w[1858] = −0.00134334 |
| w[1859] = −0.00135069 |
| w[1860] = −0.00135711 |
| w[1861] = −0.00136272 |
| w[1862] = −0.00136768 |
| w[1863] = −0.00137225 |
| w[1864] = −0.00137649 |
| w[1865] = −0.00138042 |
| w[1866] = −0.00138404 |
| w[1867] = −0.00138737 |
| w[1868] = −0.00139041 |
| w[1869] = −0.00139317 |
| w[1870] = −0.00139565 |
| w[1871] = −0.00139785 |
| w[1872] = −0.00139976 |
| w[1873] = −0.00140137 |

TABLE 2-continued

| (window coefficients w(n); N = 960) |
|---|
| w[1874] = −0.00140267 |
| w[1875] = −0.00140366 |
| w[1876] = −0.00140432 |
| w[1877] = −0.00140464 |
| w[1878] = −0.00140461 |
| w[1879] = −0.00140423 |
| w[1880] = −0.00140347 |
| w[1881] = −0.00140235 |
| w[1882] = −0.00140084 |
| w[1883] = −0.00139894 |
| w[1884] = −0.00139664 |
| w[1885] = −0.00139388 |
| w[1886] = −0.00139065 |
| w[1887] = −0.00138694 |
| w[1888] = −0.00138278 |
| w[1889] = −0.00137818 |
| w[1890] = −0.00137317 |
| w[1891] = −0.00136772 |
| w[1892] = −0.00136185 |
| w[1893] = −0.00135556 |
| w[1894] = −0.00134884 |
| w[1895] = −0.00134170 |
| w[1896] = −0.00133415 |
| w[1897] = −0.00132619 |
| w[1898] = −0.00131784 |
| w[1899] = −0.00130908 |
| w[1900] = −0.00129991 |
| w[1901] = −0.00129031 |
| w[1902] = −0.00128031 |
| w[1903] = −0.00126990 |
| w[1904] = −0.00125912 |
| w[1905] = −0.00124797 |
| w[1906] = −0.00123645 |
| w[1907] = −0.00122458 |
| w[1908] = −0.00121233 |
| w[1909] = −0.00119972 |
| w[1910] = −0.00118676 |
| w[1911] = −0.00117347 |
| w[1912] = −0.00115988 |
| w[1913] = −0.00114605 |
| w[1914] = −0.00113200 |
| w[1915] = −0.00111778 |
| w[1916] = −0.00110343 |
| w[1917] = −0.00108898 |
| w[1918] = −0.00107448 |
| w[1919] = −0.00105995 |

TABLE 3

| (window coefficients w(n); N = 1024) |
|---|
| \|w[0]\| ≤ 0.001 |
| \|w[1]\| ≤ 0.001 |
| \|w[2]\| ≤ 0.001 |
| \|w[3]\| ≤ 0.001 |
| \|w[4]\| ≤ 0.001 |
| \|w[5]\| ≤ 0.001 |
| \|w[6]\| ≤ 0.001 |
| \|w[7]\| ≤ 0.001 |
| \|w[8]\| ≤ 0.001 |
| \|w[9]\| ≤ 0.001 |
| \|w[10]\| ≤ 0.001 |
| \|w[11]\| ≤ 0.001 |
| \|w[12]\| ≤ 0.001 |
| \|w[13]\| ≤ 0.001 |
| \|w[14]\| ≤ 0.001 |
| \|w[15]\| ≤ 0.001 |
| \|w[16]\| ≤ 0.001 |
| \|w[17]\| ≤ 0.001 |
| \|w[18]\| ≤ 0.001 |
| \|w[19]\| ≤ 0.001 |
| \|w[20]\| ≤ 0.001 |
| \|w[21]\| ≤ 0.001 |
| \|w[22]\| ≤ 0.001 |
| \|w[23]\| ≤ 0.001 |

TABLE 3-continued

| (window coefficients w(n); N = 1024) |
|---|
| \|w[24]\| ≤ 0.001 |
| \|w[25]\| ≤ 0.001 |
| \|w[26]\| ≤ 0.001 |
| \|w[27]\| ≤ 0.001 |
| \|w[28]\| ≤ 0.001 |
| \|w[29]\| ≤ 0.001 |
| \|w[30]\| ≤ 0.001 |
| \|w[31]\| ≤ 0.001 |
| \|w[32]\| ≤ 0.001 |
| \|w[33]\| ≤ 0.001 |
| \|w[34]\| ≤ 0.001 |
| \|w[35]\| ≤ 0.001 |
| \|w[36]\| ≤ 0.001 |
| \|w[37]\| ≤ 0.001 |
| \|w[38]\| ≤ 0.001 |
| \|w[39]\| ≤ 0.001 |
| \|w[40]\| ≤ 0.001 |
| \|w[41]\| ≤ 0.001 |
| \|w[42]\| ≤ 0.001 |
| \|w[43]\| ≤ 0.001 |
| \|w[44]\| ≤ 0.001 |
| \|w[45]\| ≤ 0.001 |
| \|w[46]\| ≤ 0.001 |
| \|w[47]\| ≤ 0.001 |
| \|w[48]\| ≤ 0.001 |
| \|w[49]\| ≤ 0.001 |
| \|w[50]\| ≤ 0.001 |
| \|w[51]\| ≤ 0.001 |
| \|w[52]\| ≤ 0.001 |
| \|w[53]\| ≤ 0.001 |
| \|w[54]\| ≤ 0.001 |
| \|w[55]\| ≤ 0.001 |
| \|w[56]\| ≤ 0.001 |
| \|w[57]\| ≤ 0.001 |
| \|w[58]\| ≤ 0.001 |
| \|w[59]\| ≤ 0.001 |
| \|w[60]\| ≤ 0.001 |
| \|w[61]\| ≤ 0.001 |
| \|w[62]\| ≤ 0.001 |
| \|w[63]\| ≤ 0.001 |
| \|w[64]\| ≤ 0.001 |
| \|w[65]\| ≤ 0.001 |
| \|w[66]\| ≤ 0.001 |
| \|w[67]\| ≤ 0.001 |
| \|w[68]\| ≤ 0.001 |
| \|w[69]\| ≤ 0.001 |
| \|w[70]\| ≤ 0.001 |
| \|w[71]\| ≤ 0.001 |
| \|w[72]\| ≤ 0.001 |
| \|w[73]\| ≤ 0.001 |
| \|w[74]\| ≤ 0.001 |
| \|w[75]\| ≤ 0.001 |
| \|w[76]\| ≤ 0.001 |
| \|w[77]\| ≤ 0.001 |
| \|w[78]\| ≤ 0.001 |
| \|w[79]\| ≤ 0.001 |
| \|w[80]\| ≤ 0.001 |
| \|w[81]\| ≤ 0.001 |
| \|w[82]\| ≤ 0.001 |
| \|w[83]\| ≤ 0.001 |
| \|w[84]\| ≤ 0.001 |
| \|w[85]\| ≤ 0.001 |
| \|w[86]\| ≤ 0.001 |
| \|w[87]\| ≤ 0.001 |
| \|w[88]\| ≤ 0.001 |
| \|w[89]\| ≤ 0.001 |
| \|w[90]\| ≤ 0.001 |
| \|w[91]\| ≤ 0.001 |
| \|w[92]\| ≤ 0.001 |
| \|w[93]\| ≤ 0.001 |
| \|w[94]\| ≤ 0.001 |
| \|w[95]\| ≤ 0.001 |
| \|w[96]\| ≤ 0.001 |
| \|w[97]\| ≤ 0.001 |
| \|w[98]\| ≤ 0.001 |
| \|w[99]\| ≤ 0.001 |
| \|w[100]\| ≤ 0.001 |
| \|w[101]\| ≤ 0.001 |

TABLE 3-continued

| (window coefficients w(n); N = 1024) |
|---|
| \|w[102]\| ≤ 0.001 |
| \|w[103]\| ≤ 0.001 |
| \|w[104]\| ≤ 0.001 |
| \|w[105]\| ≤ 0.001 |
| \|w[106]\| ≤ 0.001 |
| \|w[107]\| ≤ 0.001 |
| \|w[108]\| ≤ 0.001 |
| \|w[109]\| ≤ 0.001 |
| \|w[110]\| ≤ 0.001 |
| \|w[111]\| ≤ 0.001 |
| \|w[112]\| ≤ 0.001 |
| \|w[113]\| ≤ 0.001 |
| \|w[114]\| ≤ 0.001 |
| \|w[115]\| ≤ 0.001 |
| \|w[116]\| ≤ 0.001 |
| \|w[117]\| ≤ 0.001 |
| \|w[118]\| ≤ 0.001 |
| \|w[119]\| ≤ 0.001 |
| \|w[120]\| ≤ 0.001 |
| \|w[121]\| ≤ 0.001 |
| \|w[122]\| ≤ 0.001 |
| \|w[123]\| ≤ 0.001 |
| \|w[124]\| ≤ 0.001 |
| \|w[125]\| ≤ 0.001 |
| \|w[126]\| ≤ 0.001 |
| \|w[127]\| ≤ 0.001 |
| 0.002 ≤ w[128] ≤ 0.004 |
| 0.005 ≤ w[129] ≤ 0.007 |
| 0.007 ≤ w[130] ≤ 0.009 |
| 0.011 ≤ w[131] ≤ 0.013 |
| 0.014 ≤ w[132] ≤ 0.016 |
| 0.018 ≤ w[133] ≤ 0.020 |
| 0.022 ≤ w[134] ≤ 0.024 |
| 0.026 ≤ w[135] ≤ 0.028 |
| 0.030 ≤ w[136] ≤ 0.032 |
| 0.035 ≤ w[137] ≤ 0.037 |
| 0.039 ≤ w[138] ≤ 0.041 |
| 0.043 ≤ w[139] ≤ 0.045 |
| 0.047 ≤ w[140] ≤ 0.049 |
| 0.051 ≤ w[141] ≤ 0.053 |
| 0.055 ≤ w[142] ≤ 0.057 |
| 0.059 ≤ w[143] ≤ 0.061 |
| 0.063 ≤ w[144] ≤ 0.065 |
| 0.067 ≤ w[145] ≤ 0.069 |
| 0.071 ≤ w[146] ≤ 0.073 |
| 0.075 ≤ w[147] ≤ 0.077 |
| 0.079 ≤ w[148] ≤ 0.081 |
| 0.083 ≤ w[149] ≤ 0.085 |
| 0.086 ≤ w[150] ≤ 0.088 |
| 0.090 ≤ w[151] ≤ 0.092 |
| 0.094 ≤ w[152] ≤ 0.096 |
| 0.098 ≤ w[153] ≤ 0.100 |
| 0.102 ≤ w[154] ≤ 0.104 |
| 0.106 ≤ w[155] ≤ 0.108 |
| 0.110 ≤ w[156] ≤ 0.112 |
| 0.114 ≤ w[157] ≤ 0.116 |
| 0.118 ≤ w[158] ≤ 0.120 |
| 0.122 ≤ w[159] ≤ 0.124 |
| 0.127 ≤ w[160] ≤ 0.129 |
| 0.131 ≤ w[161] ≤ 0.133 |
| 0.135 ≤ w[162] ≤ 0.137 |
| 0.139 ≤ w[163] ≤ 0.141 |
| 0.143 ≤ w[164] ≤ 0.145 |
| 0.148 ≤ w[165] ≤ 0.150 |
| 0.152 ≤ w[166] ≤ 0.154 |
| 0.156 ≤ w[167] ≤ 0.158 |
| 0.161 ≤ w[168] ≤ 0.163 |
| 0.165 ≤ w[169] ≤ 0.167 |
| 0.170 ≤ w[170] ≤ 0.172 |
| 0.175 ≤ w[171] ≤ 0.177 |
| 0.179 ≤ w[172] ≤ 0.181 |
| 0.184 ≤ w[173] ≤ 0.186 |
| 0.189 ≤ w[174] ≤ 0.191 |
| 0.193 ≤ w[175] ≤ 0.195 |
| 0.198 ≤ w[176] ≤ 0.200 |
| 0.203 ≤ w[177] ≤ 0.205 |
| 0.207 ≤ w[178] ≤ 0.209 |
| 0.212 ≤ w[179] ≤ 0.214 |

TABLE 3-continued

| (window coefficients w(n); N = 1024) |
|---|
| 0.217 ≤ w[180] ≤ 0.219 |
| 0.222 ≤ w[181] ≤ 0.224 |
| 0.227 ≤ w[182] ≤ 0.229 |
| 0.232 ≤ w[183] ≤ 0.234 |
| 0.236 ≤ w[184] ≤ 0.238 |
| 0.241 ≤ w[185] ≤ 0.243 |
| 0.246 ≤ w[186] ≤ 0.248 |
| 0.251 ≤ w[187] ≤ 0.253 |
| 0.256 ≤ w[188] ≤ 0.258 |
| 0.261 ≤ w[189] ≤ 0.263 |
| 0.266 ≤ w[190] ≤ 0.268 |
| 0.271 ≤ w[191] ≤ 0.273 |
| 0.276 ≤ w[192] ≤ 0.278 |
| 0.281 ≤ w[193] ≤ 0.283 |
| 0.286 ≤ w[194] ≤ 0.288 |
| 0.291 ≤ w[195] ≤ 0.293 |
| 0.296 ≤ w[196] ≤ 0.298 |
| 0.302 ≤ w[197] ≤ 0.304 |
| 0.307 ≤ w[198] ≤ 0.309 |
| 0.312 ≤ w[199] ≤ 0.314 |
| 0.317 ≤ w[200] ≤ 0.319 |
| 0.322 ≤ w[201] ≤ 0.324 |
| 0.327 ≤ w[202] ≤ 0.329 |
| 0.332 ≤ w[203] ≤ 0.334 |
| 0.337 ≤ w[204] ≤ 0.339 |
| 0.342 ≤ w[205] ≤ 0.344 |
| 0.348 ≤ w[206] ≤ 0.350 |
| 0.353 ≤ w[207] ≤ 0.355 |
| 0.358 ≤ w[208] ≤ 0.360 |
| 0.363 ≤ w[209] ≤ 0.365 |
| 0.368 ≤ w[210] ≤ 0.370 |
| 0.373 ≤ w[211] ≤ 0.375 |
| 0.378 ≤ w[212] ≤ 0.380 |
| 0.383 ≤ w[213] ≤ 0.385 |
| 0.388 ≤ w[214] ≤ 0.390 |
| 0.393 ≤ w[215] ≤ 0.395 |
| 0.398 ≤ w[216] ≤ 0.400 |
| 0.403 ≤ w[217] ≤ 0.405 |
| 0.408 ≤ w[218] ≤ 0.410 |
| 0.413 ≤ w[219] ≤ 0.415 |
| 0.418 ≤ w[220] ≤ 0.420 |
| 0.423 ≤ w[221] ≤ 0.425 |
| 0.428 ≤ w[222] ≤ 0.430 |
| 0.433 ≤ w[223] ≤ 0.435 |
| 0.438 ≤ w[224] ≤ 0.440 |
| 0.443 ≤ w[225] ≤ 0.445 |
| 0.448 ≤ w[226] ≤ 0.450 |
| 0.452 ≤ w[227] ≤ 0.454 |
| 0.457 ≤ w[228] ≤ 0.459 |
| 0.462 ≤ w[229] ≤ 0.464 |
| 0.467 ≤ w[230] ≤ 0.469 |
| 0.472 ≤ w[231] ≤ 0.474 |
| 0.476 ≤ w[232] ≤ 0.478 |
| 0.481 ≤ w[233] ≤ 0.483 |
| 0.486 ≤ w[234] ≤ 0.488 |
| 0.491 ≤ w[235] ≤ 0.493 |
| 0.495 ≤ w[236] ≤ 0.497 |
| 0.500 ≤ w[237] ≤ 0.502 |
| 0.505 ≤ w[238] ≤ 0.507 |
| 0.509 ≤ w[239] ≤ 0.511 |
| 0.514 ≤ w[240] ≤ 0.516 |
| 0.518 ≤ w[241] ≤ 0.520 |
| 0.523 ≤ w[242] ≤ 0.525 |
| 0.527 ≤ w[243] ≤ 0.529 |
| 0.532 ≤ w[244] ≤ 0.534 |
| 0.537 ≤ w[245] ≤ 0.539 |
| 0.541 ≤ w[246] ≤ 0.543 |
| 0.545 ≤ w[247] ≤ 0.547 |
| 0.550 ≤ w[248] ≤ 0.552 |
| 0.554 ≤ w[249] ≤ 0.556 |
| 0.559 ≤ w[250] ≤ 0.561 |
| 0.563 ≤ w[251] ≤ 0.565 |
| 0.567 ≤ w[252] ≤ 0.569 |
| 0.572 ≤ w[253] ≤ 0.574 |
| 0.576 ≤ w[254] ≤ 0.578 |
| 0.580 ≤ w[255] ≤ 0.582 |
| 0.584 ≤ w[256] ≤ 0.586 |
| 0.588 ≤ w[257] ≤ 0.590 |

TABLE 3-continued

| (window coefficients w(n); N = 1024) |
|---|
| 0.592 ≤ w[258] ≤ 0.594 |
| 0.597 ≤ w[259] ≤ 0.599 |
| 0.601 ≤ w[260] ≤ 0.603 |
| 0.605 ≤ w[261] ≤ 0.607 |
| 0.609 ≤ w[262] ≤ 0.611 |
| 0.613 ≤ w[263] ≤ 0.615 |
| 0.617 ≤ w[264] ≤ 0.619 |
| 0.621 ≤ w[265] ≤ 0.623 |
| 0.626 ≤ w[266] ≤ 0.628 |
| 0.630 ≤ w[267] ≤ 0.632 |
| 0.634 ≤ w[268] ≤ 0.636 |
| 0.638 ≤ w[269] ≤ 0.640 |
| 0.642 ≤ w[270] ≤ 0.644 |
| 0.646 ≤ w[271] ≤ 0.648 |
| 0.649 ≤ w[272] ≤ 0.651 |
| 0.653 ≤ w[273] ≤ 0.655 |
| 0.657 ≤ w[274] ≤ 0.659 |
| 0.661 ≤ w[275] ≤ 0.663 |
| 0.665 ≤ w[276] ≤ 0.667 |
| 0.669 ≤ w[277] ≤ 0.671 |
| 0.673 ≤ w[278] ≤ 0.675 |
| 0.676 ≤ w[279] ≤ 0.678 |
| 0.680 ≤ w[280] ≤ 0.682 |
| 0.684 ≤ w[281] ≤ 0.686 |
| 0.688 ≤ w[282] ≤ 0.690 |
| 0.691 ≤ w[283] ≤ 0.693 |
| 0.695 ≤ w[284] ≤ 0.697 |
| 0.699 ≤ w[285] ≤ 0.701 |
| 0.702 ≤ w[286] ≤ 0.704 |
| 0.706 ≤ w[287] ≤ 0.708 |
| 0.710 ≤ w[288] ≤ 0.712 |
| 0.713 ≤ w[289] ≤ 0.715 |
| 0.717 ≤ w[290] ≤ 0.719 |
| 0.720 ≤ w[291] ≤ 0.722 |
| 0.724 ≤ w[292] ≤ 0.726 |
| 0.727 ≤ w[293] ≤ 0.729 |
| 0.731 ≤ w[294] ≤ 0.733 |
| 0.734 ≤ w[295] ≤ 0.736 |
| 0.738 ≤ w[296] ≤ 0.740 |
| 0.741 ≤ w[297] ≤ 0.743 |
| 0.744 ≤ w[298] ≤ 0.746 |
| 0.748 ≤ w[299] ≤ 0.750 |
| 0.751 ≤ w[300] ≤ 0.753 |
| 0.754 ≤ w[301] ≤ 0.756 |
| 0.758 ≤ w[302] ≤ 0.760 |
| 0.761 ≤ w[303] ≤ 0.763 |
| 0.764 ≤ w[304] ≤ 0.766 |
| 0.767 ≤ w[305] ≤ 0.769 |
| 0.771 ≤ w[306] ≤ 0.773 |
| 0.774 ≤ w[307] ≤ 0.776 |
| 0.777 ≤ w[308] ≤ 0.779 |
| 0.780 ≤ w[309] ≤ 0.782 |
| 0.783 ≤ w[310] ≤ 0.785 |
| 0.786 ≤ w[311] ≤ 0.788 |
| 0.789 ≤ w[312] ≤ 0.791 |
| 0.792 ≤ w[313] ≤ 0.794 |
| 0.795 ≤ w[314] ≤ 0.797 |
| 0.798 ≤ w[315] ≤ 0.800 |
| 0.801 ≤ w[316] ≤ 0.803 |
| 0.804 ≤ w[317] ≤ 0.806 |
| 0.807 ≤ w[318] ≤ 0.809 |
| 0.810 ≤ w[319] ≤ 0.812 |
| 0.813 ≤ w[320] ≤ 0.815 |
| 0.815 ≤ w[321] ≤ 0.817 |
| 0.818 ≤ w[322] ≤ 0.820 |
| 0.821 ≤ w[323] ≤ 0.823 |
| 0.824 ≤ w[324] ≤ 0.826 |
| 0.826 ≤ w[325] ≤ 0.828 |
| 0.829 ≤ w[326] ≤ 0.831 |
| 0.832 ≤ w[327] ≤ 0.834 |
| 0.834 ≤ w[328] ≤ 0.836 |
| 0.837 ≤ w[329] ≤ 0.839 |
| 0.839 ≤ w[330] ≤ 0.841 |
| 0.842 ≤ w[331] ≤ 0.844 |
| 0.844 ≤ w[332] ≤ 0.846 |
| 0.847 ≤ w[333] ≤ 0.849 |
| 0.849 ≤ w[334] ≤ 0.851 |
| 0.852 ≤ w[335] ≤ 0.854 |

TABLE 3-continued

| (window coefficients w(n); N = 1024) |
|---|
| 0.854 ≤ w[336] ≤ 0.856 |
| 0.856 ≤ w[337] ≤ 0.858 |
| 0.859 ≤ w[338] ≤ 0.861 |
| 0.861 ≤ w[339] ≤ 0.863 |
| 0.863 ≤ w[340] ≤ 0.865 |
| 0.865 ≤ w[341] ≤ 0.867 |
| 0.868 ≤ w[342] ≤ 0.870 |
| 0.870 ≤ w[343] ≤ 0.872 |
| 0.872 ≤ w[344] ≤ 0.874 |
| 0.874 ≤ w[345] ≤ 0.876 |
| 0.876 ≤ w[346] ≤ 0.878 |
| 0.878 ≤ w[347] ≤ 0.880 |
| 0.880 ≤ w[348] ≤ 0.882 |
| 0.882 ≤ w[349] ≤ 0.884 |
| 0.884 ≤ w[350] ≤ 0.886 |
| 0.886 ≤ w[351] ≤ 0.888 |
| 0.888 ≤ w[352] ≤ 0.890 |
| 0.890 ≤ w[353] ≤ 0.892 |
| 0.891 ≤ w[354] ≤ 0.893 |
| 0.893 ≤ w[355] ≤ 0.895 |
| 0.895 ≤ w[356] ≤ 0.897 |
| 0.897 ≤ w[357] ≤ 0.899 |
| 0.899 ≤ w[358] ≤ 0.901 |
| 0.900 ≤ w[359] ≤ 0.902 |
| 0.902 ≤ w[360] ≤ 0.904 |
| 0.904 ≤ w[361] ≤ 0.906 |
| 0.905 ≤ w[362] ≤ 0.907 |
| 0.907 ≤ w[363] ≤ 0.909 |
| 0.909 ≤ w[364] ≤ 0.911 |
| 0.910 ≤ w[365] ≤ 0.912 |
| 0.912 ≤ w[366] ≤ 0.914 |
| 0.913 ≤ w[367] ≤ 0.915 |
| 0.915 ≤ w[368] ≤ 0.917 |
| 0.917 ≤ w[369] ≤ 0.919 |
| 0.918 ≤ w[370] ≤ 0.920 |
| 0.920 ≤ w[371] ≤ 0.922 |
| 0.921 ≤ w[372] ≤ 0.923 |
| 0.923 ≤ w[373] ≤ 0.925 |
| 0.924 ≤ w[374] ≤ 0.926 |
| 0.926 ≤ w[375] ≤ 0.928 |
| 0.928 ≤ w[376] ≤ 0.930 |
| 0.929 ≤ w[377] ≤ 0.931 |
| 0.931 ≤ w[378] ≤ 0.933 |
| 0.932 ≤ w[379] ≤ 0.934 |
| 0.933 ≤ w[380] ≤ 0.935 |
| 0.934 ≤ w[381] ≤ 0.936 |
| 0.936 ≤ w[382] ≤ 0.938 |
| 0.937 ≤ w[383] ≤ 0.939 |
| 0.938 ≤ w[384] ≤ 0.940 |
| 0.938 ≤ w[385] ≤ 0.940 |
| 0.939 ≤ w[386] ≤ 0.941 |
| 0.939 ≤ w[387] ≤ 0.941 |
| 0.939 ≤ w[388] ≤ 0.941 |
| 0.940 ≤ w[389] ≤ 0.942 |
| 0.940 ≤ w[390] ≤ 0.942 |
| 0.940 ≤ w[391] ≤ 0.942 |
| 0.941 ≤ w[392] ≤ 0.943 |
| 0.941 ≤ w[393] ≤ 0.943 |
| 0.942 ≤ w[394] ≤ 0.944 |
| 0.942 ≤ w[395] ≤ 0.944 |
| 0.942 ≤ w[396] ≤ 0.944 |
| 0.943 ≤ w[397] ≤ 0.945 |
| 0.943 ≤ w[398] ≤ 0.945 |
| 0.943 ≤ w[399] ≤ 0.945 |
| 0.944 ≤ w[400] ≤ 0.946 |
| 0.944 ≤ w[401] ≤ 0.946 |
| 0.945 ≤ w[402] ≤ 0.947 |
| 0.945 ≤ w[403] ≤ 0.947 |
| 0.945 ≤ w[404] ≤ 0.947 |
| 0.946 ≤ w[405] ≤ 0.948 |
| 0.946 ≤ w[406] ≤ 0.948 |
| 0.947 ≤ w[407] ≤ 0.949 |
| 0.947 ≤ w[408] ≤ 0.949 |
| 0.947 ≤ w[409] ≤ 0.949 |
| 0.948 ≤ w[410] ≤ 0.950 |
| 0.948 ≤ w[411] ≤ 0.950 |
| 0.949 ≤ w[412] ≤ 0.951 |
| 0.949 ≤ w[413] ≤ 0.951 |

TABLE 3-continued

| (window coefficients w(n); N = 1024) |
|---|
| 0.950 ≤ w[414] ≤ 0.952 |
| 0.950 ≤ w[415] ≤ 0.952 |
| 0.950 ≤ w[416] ≤ 0.952 |
| 0.951 ≤ w[417] ≤ 0.953 |
| 0.951 ≤ w[418] ≤ 0.953 |
| 0.952 ≤ w[419] ≤ 0.954 |
| 0.952 ≤ w[420] ≤ 0.954 |
| 0.953 ≤ w[421] ≤ 0.955 |
| 0.953 ≤ w[422] ≤ 0.955 |
| 0.953 ≤ w[423] ≤ 0.955 |
| 0.954 ≤ w[424] ≤ 0.956 |
| 0.954 ≤ w[425] ≤ 0.956 |
| 0.955 ≤ w[426] ≤ 0.957 |
| 0.955 ≤ w[427] ≤ 0.957 |
| 0.956 ≤ w[428] ≤ 0.958 |
| 0.956 ≤ w[429] ≤ 0.958 |
| 0.957 ≤ w[430] ≤ 0.959 |
| 0.957 ≤ w[431] ≤ 0.959 |
| 0.957 ≤ w[432] ≤ 0.959 |
| 0.958 ≤ w[433] ≤ 0.960 |
| 0.958 ≤ w[434] ≤ 0.960 |
| 0.959 ≤ w[435] ≤ 0.961 |
| 0.959 ≤ w[436] ≤ 0.961 |
| 0.960 ≤ w[437] ≤ 0.962 |
| 0.960 ≤ w[438] ≤ 0.962 |
| 0.961 ≤ w[439] ≤ 0.963 |
| 0.961 ≤ w[440] ≤ 0.963 |
| 0.962 ≤ w[441] ≤ 0.964 |
| 0.962 ≤ w[442] ≤ 0.964 |
| 0.963 ≤ w[443] ≤ 0.965 |
| 0.963 ≤ w[444] ≤ 0.965 |
| 0.964 ≤ w[445] ≤ 0.966 |
| 0.964 ≤ w[446] ≤ 0.966 |
| 0.965 ≤ w[447] ≤ 0.967 |
| 0.965 ≤ w[448] ≤ 0.967 |
| 0.966 ≤ w[449] ≤ 0.968 |
| 0.966 ≤ w[450] ≤ 0.968 |
| 0.967 ≤ w[451] ≤ 0.969 |
| 0.967 ≤ w[452] ≤ 0.969 |
| 0.968 ≤ w[453] ≤ 0.970 |
| 0.968 ≤ w[454] ≤ 0.970 |
| 0.969 ≤ w[455] ≤ 0.971 |
| 0.969 ≤ w[456] ≤ 0.971 |
| 0.970 ≤ w[457] ≤ 0.972 |
| 0.970 ≤ w[458] ≤ 0.972 |
| 0.971 ≤ w[459] ≤ 0.973 |
| 0.971 ≤ w[460] ≤ 0.973 |
| 0.972 ≤ w[461] ≤ 0.974 |
| 0.972 ≤ w[462] ≤ 0.974 |
| 0.973 ≤ w[463] ≤ 0.975 |
| 0.973 ≤ w[464] ≤ 0.975 |
| 0.974 ≤ w[465] ≤ 0.976 |
| 0.974 ≤ w[466] ≤ 0.976 |
| 0.975 ≤ w[467] ≤ 0.977 |
| 0.975 ≤ w[468] ≤ 0.977 |
| 0.976 ≤ w[469] ≤ 0.978 |
| 0.976 ≤ w[470] ≤ 0.978 |
| 0.977 ≤ w[471] ≤ 0.979 |
| 0.977 ≤ w[472] ≤ 0.979 |
| 0.978 ≤ w[473] ≤ 0.980 |
| 0.978 ≤ w[474] ≤ 0.980 |
| 0.979 ≤ w[475] ≤ 0.981 |
| 0.979 ≤ w[476] ≤ 0.981 |
| 0.980 ≤ w[477] ≤ 0.982 |
| 0.981 ≤ w[478] ≤ 0.983 |
| 0.981 ≤ w[479] ≤ 0.983 |
| 0.982 ≤ w[480] ≤ 0.984 |
| 0.982 ≤ w[481] ≤ 0.984 |
| 0.983 ≤ w[482] ≤ 0.985 |
| 0.983 ≤ w[483] ≤ 0.985 |
| 0.984 ≤ w[484] ≤ 0.986 |
| 0.984 ≤ w[485] ≤ 0.986 |
| 0.985 ≤ w[486] ≤ 0.987 |
| 0.985 ≤ w[487] ≤ 0.987 |
| 0.986 ≤ w[488] ≤ 0.988 |
| 0.987 ≤ w[489] ≤ 0.989 |
| 0.987 ≤ w[490] ≤ 0.989 |
| 0.988 ≤ w[491] ≤ 0.990 |

TABLE 3-continued

| (window coefficients w(n); N = 1024) |
|---|
| 0.988 ≤ w[492] ≤ 0.990 |
| 0.989 ≤ w[493] ≤ 0.991 |
| 0.989 ≤ w[494] ≤ 0.991 |
| 0.990 ≤ w[495] ≤ 0.992 |
| 0.990 ≤ w[496] ≤ 0.992 |
| 0.991 ≤ w[497] ≤ 0.993 |
| 0.991 ≤ w[498] ≤ 0.993 |
| 0.992 ≤ w[499] ≤ 0.994 |
| 0.993 ≤ w[500] ≤ 0.995 |
| 0.993 ≤ w[501] ≤ 0.995 |
| 0.994 ≤ w[502] ≤ 0.996 |
| 0.994 ≤ w[503] ≤ 0.996 |
| 0.995 ≤ w[504] ≤ 0.997 |
| 0.995 ≤ w[505] ≤ 0.997 |
| 0.996 ≤ w[506] ≤ 0.998 |
| 0.996 ≤ w[507] ≤ 0.998 |
| 0.997 ≤ w[508] ≤ 0.999 |
| 0.998 ≤ w[509] ≤ 1.000 |
| 0.998 ≤ w[510] ≤ 1.000 |
| 0.999 ≤ w[511] ≤ 1.001 |
| 0.999 ≤ w[512] ≤ 1.001 |
| 1.000 ≤ w[513] ≤ 1.002 |
| 1.000 ≤ w[514] ≤ 1.002 |
| 1.001 ≤ w[515] ≤ 1.003 |
| 1.002 ≤ w[516] ≤ 1.004 |
| 1.002 ≤ w[517] ≤ 1.004 |
| 1.003 ≤ w[518] ≤ 1.005 |
| 1.003 ≤ w[519] ≤ 1.005 |
| 1.004 ≤ w[520] ≤ 1.006 |
| 1.004 ≤ w[521] ≤ 1.006 |
| 1.005 ≤ w[522] ≤ 1.007 |
| 1.005 ≤ w[523] ≤ 1.007 |
| 1.006 ≤ w[524] ≤ 1.008 |
| 1.007 ≤ w[525] ≤ 1.009 |
| 1.007 ≤ w[526] ≤ 1.009 |
| 1.008 ≤ w[527] ≤ 1.010 |
| 1.008 ≤ w[528] ≤ 1.010 |
| 1.009 ≤ w[529] ≤ 1.011 |
| 1.009 ≤ w[530] ≤ 1.011 |
| 1.010 ≤ w[531] ≤ 1.012 |
| 1.011 ≤ w[532] ≤ 1.013 |
| 1.011 ≤ w[533] ≤ 1.013 |
| 1.012 ≤ w[534] ≤ 1.014 |
| 1.012 ≤ w[535] ≤ 1.014 |
| 1.013 ≤ w[536] ≤ 1.015 |
| 1.013 ≤ w[537] ≤ 1.015 |
| 1.014 ≤ w[538] ≤ 1.016 |
| 1.014 ≤ w[539] ≤ 1.016 |
| 1.015 ≤ w[540] ≤ 1.017 |
| 1.016 ≤ w[541] ≤ 1.018 |
| 1.016 ≤ w[542] ≤ 1.018 |
| 1.017 ≤ w[543] ≤ 1.019 |
| 1.017 ≤ w[544] ≤ 1.019 |
| 1.018 ≤ w[545] ≤ 1.020 |
| 1.018 ≤ w[546] ≤ 1.020 |
| 1.019 ≤ w[547] ≤ 1.021 |
| 1.019 ≤ w[548] ≤ 1.021 |
| 1.020 ≤ w[549] ≤ 1.022 |
| 1.021 ≤ w[550] ≤ 1.023 |
| 1.021 ≤ w[551] ≤ 1.023 |
| 1.022 ≤ w[552] ≤ 1.024 |
| 1.022 ≤ w[553] ≤ 1.024 |
| 1.023 ≤ w[554] ≤ 1.025 |
| 1.023 ≤ w[555] ≤ 1.025 |
| 1.024 ≤ w[556] ≤ 1.026 |
| 1.024 ≤ w[557] ≤ 1.026 |
| 1.025 ≤ w[558] ≤ 1.027 |
| 1.026 ≤ w[559] ≤ 1.028 |
| 1.026 ≤ w[560] ≤ 1.028 |
| 1.027 ≤ w[561] ≤ 1.029 |
| 1.027 ≤ w[562] ≤ 1.029 |
| 1.028 ≤ w[563] ≤ 1.030 |
| 1.028 ≤ w[564] ≤ 1.030 |
| 1.029 ≤ w[565] ≤ 1.031 |
| 1.029 ≤ w[566] ≤ 1.031 |
| 1.030 ≤ w[567] ≤ 1.032 |
| 1.030 ≤ w[568] ≤ 1.032 |
| 1.031 ≤ w[569] ≤ 1.033 |

TABLE 3-continued

| (window coefficients w(n); N = 1024) |
|---|
| 1.032 ≤ w[570] ≤ 1.034 |
| 1.032 ≤ w[571] ≤ 1.034 |
| 1.033 ≤ w[572] ≤ 1.035 |
| 1.033 ≤ w[573] ≤ 1.035 |
| 1.034 ≤ w[574] ≤ 1.036 |
| 1.034 ≤ w[575] ≤ 1.036 |
| 1.035 ≤ w[576] ≤ 1.037 |
| 1.035 ≤ w[577] ≤ 1.037 |
| 1.036 ≤ w[578] ≤ 1.038 |
| 1.036 ≤ w[579] ≤ 1.038 |
| 1.037 ≤ w[580] ≤ 1.039 |
| 1.037 ≤ w[581] ≤ 1.039 |
| 1.038 ≤ w[582] ≤ 1.040 |
| 1.038 ≤ w[583] ≤ 1.040 |
| 1.039 ≤ w[584] ≤ 1.041 |
| 1.039 ≤ w[585] ≤ 1.041 |
| 1.040 ≤ w[586] ≤ 1.042 |
| 1.040 ≤ w[587] ≤ 1.042 |
| 1.041 ≤ w[588] ≤ 1.043 |
| 1.041 ≤ w[589] ≤ 1.043 |
| 1.042 ≤ w[590] ≤ 1.044 |
| 1.042 ≤ w[591] ≤ 1.044 |
| 1.043 ≤ w[592] ≤ 1.045 |
| 1.043 ≤ w[593] ≤ 1.045 |
| 1.044 ≤ w[594] ≤ 1.046 |
| 1.044 ≤ w[595] ≤ 1.046 |
| 1.045 ≤ w[596] ≤ 1.047 |
| 1.045 ≤ w[597] ≤ 1.047 |
| 1.046 ≤ w[598] ≤ 1.048 |
| 1.046 ≤ w[599] ≤ 1.048 |
| 1.047 ≤ w[600] ≤ 1.049 |
| 1.047 ≤ w[601] ≤ 1.049 |
| 1.048 ≤ w[602] ≤ 1.050 |
| 1.048 ≤ w[603] ≤ 1.050 |
| 1.049 ≤ w[604] ≤ 1.051 |
| 1.049 ≤ w[605] ≤ 1.051 |
| 1.050 ≤ w[606] ≤ 1.052 |
| 1.050 ≤ w[607] ≤ 1.052 |
| 1.051 ≤ w[608] ≤ 1.053 |
| 1.051 ≤ w[609] ≤ 1.053 |
| 1.051 ≤ w[610] ≤ 1.053 |
| 1.052 ≤ w[611] ≤ 1.054 |
| 1.052 ≤ w[612] ≤ 1.054 |
| 1.053 ≤ w[613] ≤ 1.055 |
| 1.053 ≤ w[614] ≤ 1.055 |
| 1.054 ≤ w[615] ≤ 1.056 |
| 1.054 ≤ w[616] ≤ 1.056 |
| 1.055 ≤ w[617] ≤ 1.057 |
| 1.055 ≤ w[618] ≤ 1.057 |
| 1.056 ≤ w[619] ≤ 1.058 |
| 1.056 ≤ w[620] ≤ 1.058 |
| 1.056 ≤ w[621] ≤ 1.058 |
| 1.057 ≤ w[622] ≤ 1.059 |
| 1.057 ≤ w[623] ≤ 1.059 |
| 1.058 ≤ w[624] ≤ 1.060 |
| 1.058 ≤ w[625] ≤ 1.060 |
| 1.059 ≤ w[626] ≤ 1.061 |
| 1.059 ≤ w[627] ≤ 1.061 |
| 1.060 ≤ w[628] ≤ 1.062 |
| 1.060 ≤ w[629] ≤ 1.062 |
| 1.060 ≤ w[630] ≤ 1.062 |
| 1.061 ≤ w[631] ≤ 1.063 |
| 1.061 ≤ w[632] ≤ 1.063 |
| 1.062 ≤ w[633] ≤ 1.064 |
| 1.062 ≤ w[634] ≤ 1.064 |
| 1.063 ≤ w[635] ≤ 1.065 |
| 1.063 ≤ w[636] ≤ 1.065 |
| 1.063 ≤ w[637] ≤ 1.065 |
| 1.064 ≤ w[638] ≤ 1.066 |
| 1.064 ≤ w[639] ≤ 1.066 |
| 1.064 ≤ w[640] ≤ 1.066 |
| 1.064 ≤ w[641] ≤ 1.066 |
| 1.063 ≤ w[642] ≤ 1.065 |
| 1.063 ≤ w[643] ≤ 1.065 |
| 1.063 ≤ w[644] ≤ 1.065 |
| 1.062 ≤ w[645] ≤ 1.064 |
| 1.061 ≤ w[646] ≤ 1.063 |
| 1.061 ≤ w[647] ≤ 1.063 |

TABLE 3-continued

| (window coefficients w(n); N = 1024) |
|---|
| 1.060 ≤ w[648] ≤ 1.062 |
| 1.060 ≤ w[649] ≤ 1.062 |
| 1.059 ≤ w[650] ≤ 1.061 |
| 1.058 ≤ w[651] ≤ 1.060 |
| 1.058 ≤ w[652] ≤ 1.060 |
| 1.057 ≤ w[653] ≤ 1.059 |
| 1.056 ≤ w[654] ≤ 1.058 |
| 1.056 ≤ w[655] ≤ 1.058 |
| 1.055 ≤ w[656] ≤ 1.057 |
| 1.054 ≤ w[657] ≤ 1.056 |
| 1.054 ≤ w[658] ≤ 1.056 |
| 1.053 ≤ w[659] ≤ 1.055 |
| 1.052 ≤ w[660] ≤ 1.054 |
| 1.051 ≤ w[661] ≤ 1.053 |
| 1.051 ≤ w[662] ≤ 1.053 |
| 1.050 ≤ w[663] ≤ 1.052 |
| 1.049 ≤ w[664] ≤ 1.051 |
| 1.048 ≤ w[665] ≤ 1.050 |
| 1.047 ≤ w[666] ≤ 1.049 |
| 1.046 ≤ w[667] ≤ 1.048 |
| 1.046 ≤ w[668] ≤ 1.048 |
| 1.045 ≤ w[669] ≤ 1.047 |
| 1.044 ≤ w[670] ≤ 1.046 |
| 1.043 ≤ w[671] ≤ 1.045 |
| 1.042 ≤ w[672] ≤ 1.044 |
| 1.041 ≤ w[673] ≤ 1.043 |
| 1.041 ≤ w[674] ≤ 1.043 |
| 1.040 ≤ w[675] ≤ 1.042 |
| 1.039 ≤ w[676] ≤ 1.041 |
| 1.038 ≤ w[677] ≤ 1.040 |
| 1.037 ≤ w[678] ≤ 1.039 |
| 1.035 ≤ w[679] ≤ 1.037 |
| 1.034 ≤ w[680] ≤ 1.036 |
| 1.033 ≤ w[681] ≤ 1.035 |
| 1.032 ≤ w[682] ≤ 1.034 |
| 1.031 ≤ w[683] ≤ 1.033 |
| 1.029 ≤ w[684] ≤ 1.031 |
| 1.028 ≤ w[685] ≤ 1.030 |
| 1.027 ≤ w[686] ≤ 1.029 |
| 1.025 ≤ w[687] ≤ 1.027 |
| 1.024 ≤ w[688] ≤ 1.026 |
| 1.022 ≤ w[689] ≤ 1.024 |
| 1.021 ≤ w[690] ≤ 1.023 |
| 1.020 ≤ w[691] ≤ 1.022 |
| 1.018 ≤ w[692] ≤ 1.020 |
| 1.017 ≤ w[693] ≤ 1.019 |
| 1.015 ≤ w[694] ≤ 1.017 |
| 1.014 ≤ w[695] ≤ 1.016 |
| 1.012 ≤ w[696] ≤ 1.014 |
| 1.011 ≤ w[697] ≤ 1.013 |
| 1.009 ≤ w[698] ≤ 1.011 |
| 1.008 ≤ w[699] ≤ 1.010 |
| 1.006 ≤ w[700] ≤ 1.008 |
| 1.005 ≤ w[701] ≤ 1.007 |
| 1.003 ≤ w[702] ≤ 1.005 |
| 1.001 ≤ w[703] ≤ 1.003 |
| 1.000 ≤ w[704] ≤ 1.002 |
| 0.998 ≤ w[705] ≤ 1.000 |
| 0.996 ≤ w[706] ≤ 0.998 |
| 0.994 ≤ w[707] ≤ 0.996 |
| 0.993 ≤ w[708] ≤ 0.995 |
| 0.991 ≤ w[709] ≤ 0.993 |
| 0.989 ≤ w[710] ≤ 0.991 |
| 0.987 ≤ w[711] ≤ 0.989 |
| 0.985 ≤ w[712] ≤ 0.987 |
| 0.983 ≤ w[713] ≤ 0.985 |
| 0.981 ≤ w[714] ≤ 0.983 |
| 0.979 ≤ w[715] ≤ 0.981 |
| 0.977 ≤ w[716] ≤ 0.979 |
| 0.975 ≤ w[717] ≤ 0.977 |
| 0.973 ≤ w[718] ≤ 0.975 |
| 0.971 ≤ w[719] ≤ 0.973 |
| 0.969 ≤ w[720] ≤ 0.971 |
| 0.967 ≤ w[721] ≤ 0.969 |
| 0.965 ≤ w[722] ≤ 0.967 |
| 0.963 ≤ w[723] ≤ 0.965 |
| 0.961 ≤ w[724] ≤ 0.963 |
| 0.959 ≤ w[725] ≤ 0.961 |

TABLE 3-continued

| (window coefficients w(n); N = 1024) |
|---|
| 0.957 ≤ w[726] ≤ 0.959 |
| 0.955 ≤ w[727] ≤ 0.957 |
| 0.952 ≤ w[728] ≤ 0.954 |
| 0.950 ≤ w[729] ≤ 0.952 |
| 0.948 ≤ w[730] ≤ 0.950 |
| 0.946 ≤ w[731] ≤ 0.948 |
| 0.943 ≤ w[732] ≤ 0.945 |
| 0.941 ≤ w[733] ≤ 0.943 |
| 0.939 ≤ w[734] ≤ 0.941 |
| 0.936 ≤ w[735] ≤ 0.938 |
| 0.934 ≤ w[736] ≤ 0.936 |
| 0.932 ≤ w[737] ≤ 0.934 |
| 0.929 ≤ w[738] ≤ 0.931 |
| 0.927 ≤ w[739] ≤ 0.929 |
| 0.925 ≤ w[740] ≤ 0.927 |
| 0.923 ≤ w[741] ≤ 0.925 |
| 0.920 ≤ w[742] ≤ 0.922 |
| 0.918 ≤ w[743] ≤ 0.920 |
| 0.915 ≤ w[744] ≤ 0.917 |
| 0.913 ≤ w[745] ≤ 0.915 |
| 0.911 ≤ w[746] ≤ 0.913 |
| 0.908 ≤ w[747] ≤ 0.910 |
| 0.906 ≤ w[748] ≤ 0.908 |
| 0.903 ≤ w[749] ≤ 0.905 |
| 0.901 ≤ w[750] ≤ 0.903 |
| 0.898 ≤ w[751] ≤ 0.900 |
| 0.896 ≤ w[752] ≤ 0.898 |
| 0.893 ≤ w[753] ≤ 0.895 |
| 0.891 ≤ w[754] ≤ 0.893 |
| 0.888 ≤ w[755] ≤ 0.890 |
| 0.886 ≤ w[756] ≤ 0.888 |
| 0.883 ≤ w[757] ≤ 0.885 |
| 0.881 ≤ w[758] ≤ 0.883 |
| 0.878 ≤ w[759] ≤ 0.880 |
| 0.876 ≤ w[760] ≤ 0.878 |
| 0.873 ≤ w[761] ≤ 0.875 |
| 0.871 ≤ w[762] ≤ 0.873 |
| 0.868 ≤ w[763] ≤ 0.870 |
| 0.865 ≤ w[764] ≤ 0.867 |
| 0.863 ≤ w[765] ≤ 0.865 |
| 0.860 ≤ w[766] ≤ 0.862 |
| 0.858 ≤ w[767] ≤ 0.860 |
| 0.855 ≤ w[768] ≤ 0.857 |
| 0.852 ≤ w[769] ≤ 0.854 |
| 0.850 ≤ w[770] ≤ 0.852 |
| 0.847 ≤ w[771] ≤ 0.849 |
| 0.845 ≤ w[772] ≤ 0.847 |
| 0.842 ≤ w[773] ≤ 0.844 |
| 0.839 ≤ w[774] ≤ 0.841 |
| 0.837 ≤ w[775] ≤ 0.839 |
| 0.834 ≤ w[776] ≤ 0.836 |
| 0.831 ≤ w[777] ≤ 0.833 |
| 0.829 ≤ w[778] ≤ 0.831 |
| 0.826 ≤ w[779] ≤ 0.828 |
| 0.823 ≤ w[780] ≤ 0.825 |
| 0.821 ≤ w[781] ≤ 0.823 |
| 0.818 ≤ w[782] ≤ 0.820 |
| 0.815 ≤ w[783] ≤ 0.817 |
| 0.813 ≤ w[784] ≤ 0.815 |
| 0.810 ≤ w[785] ≤ 0.812 |
| 0.807 ≤ w[786] ≤ 0.809 |
| 0.804 ≤ w[787] ≤ 0.806 |
| 0.802 ≤ w[788] ≤ 0.804 |
| 0.799 ≤ w[789] ≤ 0.801 |
| 0.796 ≤ w[790] ≤ 0.798 |
| 0.793 ≤ w[791] ≤ 0.795 |
| 0.790 ≤ w[792] ≤ 0.792 |
| 0.788 ≤ w[793] ≤ 0.790 |
| 0.785 ≤ w[794] ≤ 0.787 |
| 0.782 ≤ w[795] ≤ 0.784 |
| 0.780 ≤ w[796] ≤ 0.782 |
| 0.777 ≤ w[797] ≤ 0.779 |
| 0.774 ≤ w[798] ≤ 0.776 |
| 0.772 ≤ w[799] ≤ 0.774 |
| 0.769 ≤ w[800] ≤ 0.771 |
| 0.766 ≤ w[801] ≤ 0.768 |
| 0.763 ≤ w[802] ≤ 0.765 |
| 0.760 ≤ w[803] ≤ 0.762 |

TABLE 3-continued

| (window coefficients w(n); N = 1024) |
|---|
| 0.757 ≤ w[804] ≤ 0.759 |
| 0.754 ≤ w[805] ≤ 0.756 |
| 0.751 ≤ w[806] ≤ 0.753 |
| 0.749 ≤ w[807] ≤ 0.751 |
| 0.746 ≤ w[808] ≤ 0.748 |
| 0.743 ≤ w[809] ≤ 0.745 |
| 0.740 ≤ w[810] ≤ 0.742 |
| 0.737 ≤ w[811] ≤ 0.739 |
| 0.734 ≤ w[812] ≤ 0.736 |
| 0.732 ≤ w[813] ≤ 0.734 |
| 0.729 ≤ w[814] ≤ 0.731 |
| 0.726 ≤ w[815] ≤ 0.728 |
| 0.723 ≤ w[816] ≤ 0.725 |
| 0.721 ≤ w[817] ≤ 0.723 |
| 0.718 ≤ w[818] ≤ 0.720 |
| 0.715 ≤ w[819] ≤ 0.717 |
| 0.712 ≤ w[820] ≤ 0.714 |
| 0.709 ≤ w[821] ≤ 0.711 |
| 0.706 ≤ w[822] ≤ 0.708 |
| 0.703 ≤ w[823] ≤ 0.705 |
| 0.700 ≤ w[824] ≤ 0.702 |
| 0.697 ≤ w[825] ≤ 0.699 |
| 0.694 ≤ w[826] ≤ 0.696 |
| 0.691 ≤ w[827] ≤ 0.693 |
| 0.688 ≤ w[828] ≤ 0.690 |
| 0.685 ≤ w[829] ≤ 0.687 |
| 0.682 ≤ w[830] ≤ 0.684 |
| 0.679 ≤ w[831] ≤ 0.681 |
| 0.676 ≤ w[832] ≤ 0.678 |
| 0.673 ≤ w[833] ≤ 0.675 |
| 0.671 ≤ w[834] ≤ 0.673 |
| 0.668 ≤ w[835] ≤ 0.670 |
| 0.665 ≤ w[836] ≤ 0.667 |
| 0.662 ≤ w[837] ≤ 0.664 |
| 0.659 ≤ w[838] ≤ 0.661 |
| 0.657 ≤ w[839] ≤ 0.659 |
| 0.654 ≤ w[840] ≤ 0.656 |
| 0.651 ≤ w[841] ≤ 0.653 |
| 0.648 ≤ w[842] ≤ 0.650 |
| 0.645 ≤ w[843] ≤ 0.647 |
| 0.642 ≤ w[844] ≤ 0.644 |
| 0.639 ≤ w[845] ≤ 0.641 |
| 0.636 ≤ w[846] ≤ 0.638 |
| 0.633 ≤ w[847] ≤ 0.635 |
| 0.630 ≤ w[848] ≤ 0.632 |
| 0.627 ≤ w[849] ≤ 0.629 |
| 0.624 ≤ w[850] ≤ 0.626 |
| 0.621 ≤ w[851] ≤ 0.623 |
| 0.617 ≤ w[852] ≤ 0.619 |
| 0.614 ≤ w[853] ≤ 0.616 |
| 0.611 ≤ w[854] ≤ 0.613 |
| 0.608 ≤ w[855] ≤ 0.610 |
| 0.605 ≤ w[856] ≤ 0.607 |
| 0.602 ≤ w[857] ≤ 0.604 |
| 0.599 ≤ w[858] ≤ 0.601 |
| 0.596 ≤ w[859] ≤ 0.598 |
| 0.593 ≤ w[860] ≤ 0.595 |
| 0.591 ≤ w[861] ≤ 0.593 |
| 0.588 ≤ w[862] ≤ 0.590 |
| 0.585 ≤ w[863] ≤ 0.587 |
| 0.582 ≤ w[864] ≤ 0.584 |
| 0.580 ≤ w[865] ≤ 0.582 |
| 0.577 ≤ w[866] ≤ 0.579 |
| 0.574 ≤ w[867] ≤ 0.576 |
| 0.572 ≤ w[868] ≤ 0.574 |
| 0.569 ≤ w[869] ≤ 0.571 |
| 0.566 ≤ w[870] ≤ 0.568 |
| 0.563 ≤ w[871] ≤ 0.565 |
| 0.560 ≤ w[872] ≤ 0.562 |
| 0.557 ≤ w[873] ≤ 0.559 |
| 0.553 ≤ w[874] ≤ 0.555 |
| 0.550 ≤ w[875] ≤ 0.552 |
| 0.547 ≤ w[876] ≤ 0.549 |
| 0.544 ≤ w[877] ≤ 0.546 |
| 0.540 ≤ w[878] ≤ 0.542 |
| 0.537 ≤ w[879] ≤ 0.539 |
| 0.534 ≤ w[880] ≤ 0.536 |
| 0.531 ≤ w[881] ≤ 0.533 |

TABLE 3-continued

| (window coefficients w(n); N = 1024) |
|---|
| 0.528 ≤ w[882] ≤ 0.530 |
| 0.526 ≤ w[883] ≤ 0.528 |
| 0.523 ≤ w[884] ≤ 0.525 |
| 0.520 ≤ w[885] ≤ 0.522 |
| 0.518 ≤ w[886] ≤ 0.520 |
| 0.515 ≤ w[887] ≤ 0.517 |
| 0.512 ≤ w[888] ≤ 0.514 |
| 0.510 ≤ w[889] ≤ 0.512 |
| 0.507 ≤ w[890] ≤ 0.509 |
| 0.504 ≤ w[891] ≤ 0.506 |
| 0.501 ≤ w[892] ≤ 0.503 |
| 0.498 ≤ w[893] ≤ 0.500 |
| 0.495 ≤ w[894] ≤ 0.497 |
| 0.492 ≤ w[895] ≤ 0.494 |
| 0.489 ≤ w[896] ≤ 0.491 |
| 0.486 ≤ w[897] ≤ 0.488 |
| 0.483 ≤ w[898] ≤ 0.485 |
| 0.480 ≤ w[899] ≤ 0.482 |
| 0.477 ≤ w[900] ≤ 0.479 |
| 0.474 ≤ w[901] ≤ 0.476 |
| 0.471 ≤ w[902] ≤ 0.473 |
| 0.469 ≤ w[903] ≤ 0.471 |
| 0.466 ≤ w[904] ≤ 0.468 |
| 0.463 ≤ w[905] ≤ 0.465 |
| 0.460 ≤ w[906] ≤ 0.462 |
| 0.457 ≤ w[907] ≤ 0.459 |
| 0.454 ≤ w[908] ≤ 0.456 |
| 0.452 ≤ w[909] ≤ 0.454 |
| 0.449 ≤ w[910] ≤ 0.451 |
| 0.446 ≤ w[911] ≤ 0.448 |
| 0.443 ≤ w[912] ≤ 0.445 |
| 0.440 ≤ w[913] ≤ 0.442 |
| 0.437 ≤ w[914] ≤ 0.439 |
| 0.435 ≤ w[915] ≤ 0.437 |
| 0.432 ≤ w[916] ≤ 0.434 |
| 0.429 ≤ w[917] ≤ 0.431 |
| 0.426 ≤ w[918] ≤ 0.428 |
| 0.424 ≤ w[919] ≤ 0.426 |
| 0.421 ≤ w[920] ≤ 0.423 |
| 0.418 ≤ w[921] ≤ 0.420 |
| 0.415 ≤ w[922] ≤ 0.417 |
| 0.412 ≤ w[923] ≤ 0.414 |
| 0.409 ≤ w[924] ≤ 0.411 |
| 0.406 ≤ w[925] ≤ 0.408 |
| 0.404 ≤ w[926] ≤ 0.406 |
| 0.401 ≤ w[927] ≤ 0.403 |
| 0.398 ≤ w[928] ≤ 0.400 |
| 0.395 ≤ w[929] ≤ 0.397 |
| 0.392 ≤ w[930] ≤ 0.394 |
| 0.390 ≤ w[931] ≤ 0.392 |
| 0.387 ≤ w[932] ≤ 0.389 |
| 0.384 ≤ w[933] ≤ 0.386 |
| 0.381 ≤ w[934] ≤ 0.383 |
| 0.379 ≤ w[935] ≤ 0.381 |
| 0.376 ≤ w[936] ≤ 0.378 |
| 0.373 ≤ w[937] ≤ 0.375 |
| 0.371 ≤ w[938] ≤ 0.373 |
| 0.368 ≤ w[939] ≤ 0.370 |
| 0.365 ≤ w[940] ≤ 0.367 |
| 0.363 ≤ w[941] ≤ 0.365 |
| 0.360 ≤ w[942] ≤ 0.362 |
| 0.357 ≤ w[943] ≤ 0.359 |
| 0.354 ≤ w[944] ≤ 0.356 |
| 0.352 ≤ w[945] ≤ 0.354 |
| 0.349 ≤ w[946] ≤ 0.351 |
| 0.346 ≤ w[947] ≤ 0.348 |
| 0.344 ≤ w[948] ≤ 0.346 |
| 0.341 ≤ w[949] ≤ 0.343 |
| 0.338 ≤ w[950] ≤ 0.340 |
| 0.336 ≤ w[951] ≤ 0.338 |
| 0.333 ≤ w[952] ≤ 0.335 |
| 0.330 ≤ w[953] ≤ 0.332 |
| 0.328 ≤ w[954] ≤ 0.330 |
| 0.325 ≤ w[955] ≤ 0.327 |
| 0.322 ≤ w[956] ≤ 0.324 |
| 0.320 ≤ w[957] ≤ 0.322 |
| 0.317 ≤ w[958] ≤ 0.319 |
| 0.315 ≤ w[959] ≤ 0.317 |

TABLE 3-continued

| (window coefficients w(n); N = 1024) |
|---|
| 0.312 ≤ w[960] ≤ 0.314 |
| 0.309 ≤ w[961] ≤ 0.311 |
| 0.307 ≤ w[962] ≤ 0.309 |
| 0.304 ≤ w[963] ≤ 0.306 |
| 0.302 ≤ w[964] ≤ 0.304 |
| 0.299 ≤ w[965] ≤ 0.301 |
| 0.296 ≤ w[966] ≤ 0.298 |
| 0.294 ≤ w[967] ≤ 0.296 |
| 0.291 ≤ w[968] ≤ 0.293 |
| 0.289 ≤ w[969] ≤ 0.291 |
| 0.286 ≤ w[970] ≤ 0.288 |
| 0.284 ≤ w[971] ≤ 0.286 |
| 0.281 ≤ w[972] ≤ 0.283 |
| 0.279 ≤ w[973] ≤ 0.281 |
| 0.276 ≤ w[974] ≤ 0.278 |
| 0.274 ≤ w[975] ≤ 0.276 |
| 0.271 ≤ w[976] ≤ 0.273 |
| 0.269 ≤ w[977] ≤ 0.271 |
| 0.266 ≤ w[978] ≤ 0.268 |
| 0.264 ≤ w[979] ≤ 0.266 |
| 0.261 ≤ w[980] ≤ 0.263 |
| 0.259 ≤ w[981] ≤ 0.261 |
| 0.256 ≤ w[982] ≤ 0.258 |
| 0.254 ≤ w[983] ≤ 0.256 |
| 0.251 ≤ w[984] ≤ 0.253 |
| 0.249 ≤ w[985] ≤ 0.251 |
| 0.246 ≤ w[986] ≤ 0.248 |
| 0.244 ≤ w[987] ≤ 0.246 |
| 0.241 ≤ w[988] ≤ 0.243 |
| 0.239 ≤ w[989] ≤ 0.241 |
| 0.237 ≤ w[990] ≤ 0.239 |
| 0.234 ≤ w[991] ≤ 0.236 |
| 0.232 ≤ w[992] ≤ 0.234 |
| 0.229 ≤ w[993] ≤ 0.231 |
| 0.227 ≤ w[994] ≤ 0.229 |
| 0.225 ≤ w[995] ≤ 0.227 |
| 0.222 ≤ w[996] ≤ 0.224 |
| 0.220 ≤ w[997] ≤ 0.222 |
| 0.218 ≤ w[998] ≤ 0.220 |
| 0.215 ≤ w[999] ≤ 0.217 |
| 0.213 ≤ w[1000] ≤ 0.215 |
| 0.211 ≤ w[1001] ≤ 0.213 |
| 0.208 ≤ w[1002] ≤ 0.210 |
| 0.206 ≤ w[1003] ≤ 0.208 |
| 0.204 ≤ w[1004] ≤ 0.206 |
| 0.202 ≤ w[1005] ≤ 0.204 |
| 0.199 ≤ w[1006] ≤ 0.201 |
| 0.197 ≤ w[1007] ≤ 0.199 |
| 0.195 ≤ w[1008] ≤ 0.197 |
| 0.193 ≤ w[1009] ≤ 0.195 |
| 0.190 ≤ w[1010] ≤ 0.192 |
| 0.188 ≤ w[1011] ≤ 0.190 |
| 0.186 ≤ w[1012] ≤ 0.188 |
| 0.184 ≤ w[1013] ≤ 0.186 |
| 0.181 ≤ w[1014] ≤ 0.183 |
| 0.179 ≤ w[1015] ≤ 0.181 |
| 0.177 ≤ w[1016] ≤ 0.179 |
| 0.175 ≤ w[1017] ≤ 0.177 |
| 0.173 ≤ w[1018] ≤ 0.175 |
| 0.171 ≤ w[1019] ≤ 0.173 |
| 0.168 ≤ w[1020] ≤ 0.170 |
| 0.166 ≤ w[1021] ≤ 0.168 |
| 0.164 ≤ w[1022] ≤ 0.166 |
| 0.162 ≤ w[1023] ≤ 0.164 |
| 0.160 ≤ w[1024] ≤ 0.162 |
| 0.158 ≤ w[1025] ≤ 0.160 |
| 0.156 ≤ w[1026] ≤ 0.158 |
| 0.154 ≤ w[1027] ≤ 0.156 |
| 0.152 ≤ w[1028] ≤ 0.154 |
| 0.150 ≤ w[1029] ≤ 0.152 |
| 0.148 ≤ w[1030] ≤ 0.150 |
| 0.146 ≤ w[1031] ≤ 0.148 |
| 0.144 ≤ w[1032] ≤ 0.146 |
| 0.142 ≤ w[1033] ≤ 0.144 |
| 0.140 ≤ w[1034] ≤ 0.142 |
| 0.139 ≤ w[1035] ≤ 0.141 |
| 0.137 ≤ w[1036] ≤ 0.139 |
| 0.135 ≤ w[1037] ≤ 0.137 |

TABLE 3-continued

| (window coefficients w(n); N = 1024) |
|---|
| 0.133 ≤ w[1038] ≤ 0.135 |
| 0.131 ≤ w[1039] ≤ 0.133 |
| 0.129 ≤ w[1040] ≤ 0.131 |
| 0.127 ≤ w[1041] ≤ 0.129 |
| 0.126 ≤ w[1042] ≤ 0.128 |
| 0.124 ≤ w[1043] ≤ 0.126 |
| 0.122 ≤ w[1044] ≤ 0.124 |
| 0.120 ≤ w[1045] ≤ 0.122 |
| 0.119 ≤ w[1046] ≤ 0.121 |
| 0.117 ≤ w[1047] ≤ 0.119 |
| 0.115 ≤ w[1048] ≤ 0.117 |
| 0.113 ≤ w[1049] ≤ 0.115 |
| 0.112 ≤ w[1050] ≤ 0.114 |
| 0.110 ≤ w[1051] ≤ 0.112 |
| 0.108 ≤ w[1052] ≤ 0.110 |
| 0.106 ≤ w[1053] ≤ 0.108 |
| 0.105 ≤ w[1054] ≤ 0.107 |
| 0.103 ≤ w[1055] ≤ 0.105 |
| 0.101 ≤ w[1056] ≤ 0.103 |
| 0.100 ≤ w[1057] ≤ 0.102 |
| 0.098 ≤ w[1058] ≤ 0.100 |
| 0.097 ≤ w[1059] ≤ 0.099 |
| 0.095 ≤ w[1060] ≤ 0.097 |
| 0.093 ≤ w[1061] ≤ 0.095 |
| 0.092 ≤ w[1062] ≤ 0.094 |
| 0.090 ≤ w[1063] ≤ 0.092 |
| 0.089 ≤ w[1064] ≤ 0.091 |
| 0.087 ≤ w[1065] ≤ 0.089 |
| 0.086 ≤ w[1066] ≤ 0.088 |
| 0.084 ≤ w[1067] ≤ 0.086 |
| 0.083 ≤ w[1068] ≤ 0.085 |
| 0.081 ≤ w[1069] ≤ 0.083 |
| 0.080 ≤ w[1070] ≤ 0.082 |
| 0.078 ≤ w[1071] ≤ 0.080 |
| 0.077 ≤ w[1072] ≤ 0.079 |
| 0.075 ≤ w[1073] ≤ 0.077 |
| 0.074 ≤ w[1074] ≤ 0.076 |
| 0.072 ≤ w[1075] ≤ 0.074 |
| 0.071 ≤ w[1076] ≤ 0.073 |
| 0.070 ≤ w[1077] ≤ 0.072 |
| 0.068 ≤ w[1078] ≤ 0.070 |
| 0.067 ≤ w[1079] ≤ 0.069 |
| 0.066 ≤ w[1080] ≤ 0.068 |
| 0.064 ≤ w[1081] ≤ 0.066 |
| 0.063 ≤ w[1082] ≤ 0.065 |
| 0.062 ≤ w[1083] ≤ 0.064 |
| 0.060 ≤ w[1084] ≤ 0.062 |
| 0.059 ≤ w[1085] ≤ 0.061 |
| 0.058 ≤ w[1086] ≤ 0.060 |
| 0.057 ≤ w[1087] ≤ 0.059 |
| 0.055 ≤ w[1088] ≤ 0.057 |
| 0.054 ≤ w[1089] ≤ 0.056 |
| 0.053 ≤ w[1090] ≤ 0.055 |
| 0.052 ≤ w[1091] ≤ 0.054 |
| 0.050 ≤ w[1092] ≤ 0.052 |
| 0.049 ≤ w[1093] ≤ 0.051 |
| 0.048 ≤ w[1094] ≤ 0.050 |
| 0.047 ≤ w[1095] ≤ 0.049 |
| 0.046 ≤ w[1096] ≤ 0.048 |
| 0.045 ≤ w[1097] ≤ 0.047 |
| 0.044 ≤ w[1098] ≤ 0.046 |
| 0.042 ≤ w[1099] ≤ 0.044 |
| 0.041 ≤ w[1100] ≤ 0.043 |
| 0.040 ≤ w[1101] ≤ 0.042 |
| 0.039 ≤ w[1102] ≤ 0.041 |
| 0.038 ≤ w[1103] ≤ 0.040 |
| 0.037 ≤ w[1104] ≤ 0.039 |
| 0.036 ≤ w[1105] ≤ 0.038 |
| 0.035 ≤ w[1106] ≤ 0.037 |
| 0.034 ≤ w[1107] ≤ 0.036 |
| 0.033 ≤ w[1108] ≤ 0.035 |
| 0.032 ≤ w[1109] ≤ 0.034 |
| 0.031 ≤ w[1110] ≤ 0.033 |
| 0.030 ≤ w[1111] ≤ 0.032 |
| 0.029 ≤ w[1112] ≤ 0.031 |
| 0.028 ≤ w[1113] ≤ 0.030 |
| 0.027 ≤ w[1114] ≤ 0.029 |
| 0.027 ≤ w[1115] ≤ 0.029 |

TABLE 3-continued

| (window coefficients w(n); N = 1024) |
|---|
| 0.026 ≤ w[1116] ≤ 0.028 |
| 0.025 ≤ w[1117] ≤ 0.027 |
| 0.024 ≤ w[1118] ≤ 0.026 |
| 0.023 ≤ w[1119] ≤ 0.025 |
| 0.022 ≤ w[1120] ≤ 0.024 |
| 0.021 ≤ w[1121] ≤ 0.023 |
| 0.021 ≤ w[1122] ≤ 0.023 |
| 0.020 ≤ w[1123] ≤ 0.022 |
| 0.019 ≤ w[1124] ≤ 0.021 |
| 0.018 ≤ w[1125] ≤ 0.020 |
| 0.017 ≤ w[1126] ≤ 0.019 |
| 0.017 ≤ w[1127] ≤ 0.019 |
| 0.016 ≤ w[1128] ≤ 0.018 |
| 0.015 ≤ w[1129] ≤ 0.017 |
| 0.014 ≤ w[1130] ≤ 0.016 |
| 0.014 ≤ w[1131] ≤ 0.016 |
| 0.013 ≤ w[1132] ≤ 0.015 |
| 0.012 ≤ w[1133] ≤ 0.014 |
| 0.012 ≤ w[1134] ≤ 0.014 |
| 0.011 ≤ w[1135] ≤ 0.013 |
| 0.010 ≤ w[1136] ≤ 0.012 |
| 0.010 ≤ w[1137] ≤ 0.012 |
| 0.009 ≤ w[1138] ≤ 0.011 |
| 0.008 ≤ w[1139] ≤ 0.010 |
| 0.008 ≤ w[1140] ≤ 0.010 |
| 0.007 ≤ w[1141] ≤ 0.009 |
| 0.007 ≤ w[1142] ≤ 0.009 |
| 0.006 ≤ w[1143] ≤ 0.008 |
| 0.006 ≤ w[1144] ≤ 0.008 |
| 0.005 ≤ w[1145] ≤ 0.007 |
| 0.004 ≤ w[1146] ≤ 0.006 |
| 0.004 ≤ w[1147] ≤ 0.006 |
| 0.003 ≤ w[1148] ≤ 0.005 |
| 0.003 ≤ w[1149] ≤ 0.005 |
| 0.002 ≤ w[1150] ≤ 0.004 |
| 0.002 ≤ w[1151] ≤ 0.004 |
| 0.001 ≤ w[1152] ≤ 0.003 |
| 0.001 ≤ w[1153] ≤ 0.003 |
| 0.001 ≤ w[1154] ≤ 0.003 |
| 0.000 ≤ w[1155] ≤ 0.002 |
| 0.000 ≤ w[1156] ≤ 0.002 |
| −0.001 ≤ w[1157] ≤ 0.001 |
| −0.001 ≤ w[1158] ≤ 0.001 |
| −0.002 ≤ w[1159] ≤ 0.000 |
| −0.002 ≤ w[1160] ≤ 0.000 |
| −0.002 ≤ w[1161] ≤ 0.000 |
| −0.003 ≤ w[1162] ≤ −0.001 |
| −0.003 ≤ w[1163] ≤ −0.001 |
| −0.004 ≤ w[1164] ≤ −0.002 |
| −0.004 ≤ w[1165] ≤ −0.002 |
| −0.004 ≤ w[1166] ≤ −0.002 |
| −0.005 ≤ w[1167] ≤ −0.003 |
| −0.005 ≤ w[1168] ≤ −0.003 |
| −0.005 ≤ w[1169] ≤ −0.003 |
| −0.005 ≤ w[1170] ≤ −0.003 |
| −0.006 ≤ w[1171] ≤ −0.004 |
| −0.006 ≤ w[1172] ≤ −0.004 |
| −0.006 ≤ w[1173] ≤ −0.004 |
| −0.006 ≤ w[1174] ≤ −0.004 |
| −0.006 ≤ w[1175] ≤ −0.004 |
| −0.007 ≤ w[1176] ≤ −0.005 |
| −0.007 ≤ w[1177] ≤ −0.005 |
| −0.007 ≤ w[1178] ≤ −0.005 |
| −0.007 ≤ w[1179] ≤ −0.005 |
| −0.008 ≤ w[1180] ≤ −0.006 |
| −0.008 ≤ w[1181] ≤ −0.006 |
| −0.008 ≤ w[1182] ≤ −0.006 |
| −0.008 ≤ w[1183] ≤ −0.006 |
| −0.008 ≤ w[1184] ≤ −0.006 |
| −0.009 ≤ w[1185] ≤ −0.007 |
| −0.009 ≤ w[1186] ≤ −0.007 |
| −0.009 ≤ w[1187] ≤ −0.007 |
| −0.009 ≤ w[1188] ≤ −0.007 |
| −0.009 ≤ w[1189] ≤ −0.007 |
| −0.009 ≤ w[1190] ≤ −0.007 |
| −0.009 ≤ w[1191] ≤ −0.007 |
| −0.009 ≤ w[1192] ≤ −0.007 |
| −0.010 ≤ w[1193] ≤ −0.008 |

TABLE 3-continued

| (window coefficients w(n); N = 1024) |
|---|
| −0.010 ≤ w[1194] ≤ −0.008 |
| −0.010 ≤ w[1195] ≤ −0.008 |
| −0.010 ≤ w[1196] ≤ −0.008 |
| −0.010 ≤ w[1197] ≤ −0.008 |
| −0.010 ≤ w[1198] ≤ −0.008 |
| −0.010 ≤ w[1199] ≤ −0.008 |
| −0.010 ≤ w[1200] ≤ −0.008 |
| −0.010 ≤ w[1201] ≤ −0.008 |
| −0.010 ≤ w[1202] ≤ −0.008 |
| −0.010 ≤ w[1203] ≤ −0.008 |
| −0.010 ≤ w[1204] ≤ −0.008 |
| −0.010 ≤ w[1205] ≤ −0.008 |
| −0.010 ≤ w[1206] ≤ −0.008 |
| −0.010 ≤ w[1207] ≤ −0.008 |
| −0.010 ≤ w[1208] ≤ −0.008 |
| −0.010 ≤ w[1209] ≤ −0.008 |
| −0.010 ≤ w[1210] ≤ −0.008 |
| −0.010 ≤ w[1211] ≤ −0.008 |
| −0.010 ≤ w[1212] ≤ −0.008 |
| −0.010 ≤ w[1213] ≤ −0.008 |
| −0.010 ≤ w[1214] ≤ −0.008 |
| −0.010 ≤ w[1215] ≤ −0.008 |
| −0.010 ≤ w[1216] ≤ −0.008 |
| −0.010 ≤ w[1217] ≤ −0.008 |
| −0.010 ≤ w[1218] ≤ −0.008 |
| −0.010 ≤ w[1219] ≤ −0.008 |
| −0.010 ≤ w[1220] ≤ −0.008 |
| −0.009 ≤ w[1221] ≤ −0.007 |
| −0.009 ≤ w[1222] ≤ −0.007 |
| −0.009 ≤ w[1223] ≤ −0.007 |
| −0.009 ≤ w[1224] ≤ −0.007 |
| −0.009 ≤ w[1225] ≤ −0.007 |
| −0.009 ≤ w[1226] ≤ −0.007 |
| −0.009 ≤ w[1227] ≤ −0.007 |
| −0.009 ≤ w[1228] ≤ −0.007 |
| −0.009 ≤ w[1229] ≤ −0.007 |
| −0.009 ≤ w[1230] ≤ −0.007 |
| −0.008 ≤ w[1231] ≤ −0.006 |
| −0.008 ≤ w[1232] ≤ −0.006 |
| −0.008 ≤ w[1233] ≤ −0.006 |
| −0.008 ≤ w[1234] ≤ −0.006 |
| −0.008 ≤ w[1235] ≤ −0.006 |
| −0.008 ≤ w[1236] ≤ −0.006 |
| −0.008 ≤ w[1237] ≤ −0.006 |
| −0.008 ≤ w[1238] ≤ −0.006 |
| −0.007 ≤ w[1239] ≤ −0.005 |
| −0.007 ≤ w[1240] ≤ −0.005 |
| −0.007 ≤ w[1241] ≤ −0.005 |
| −0.007 ≤ w[1242] ≤ −0.005 |
| −0.007 ≤ w[1243] ≤ −0.005 |
| −0.007 ≤ w[1244] ≤ −0.005 |
| −0.007 ≤ w[1245] ≤ −0.005 |
| −0.006 ≤ w[1246] ≤ −0.004 |
| −0.006 ≤ w[1247] ≤ −0.004 |
| −0.006 ≤ w[1248] ≤ −0.004 |
| −0.006 ≤ w[1249] ≤ −0.004 |
| −0.006 ≤ w[1250] ≤ −0.004 |
| −0.006 ≤ w[1251] ≤ −0.004 |
| −0.006 ≤ w[1252] ≤ −0.004 |
| −0.005 ≤ w[1253] ≤ −0.003 |
| −0.005 ≤ w[1254] ≤ −0.003 |
| −0.005 ≤ w[1255] ≤ −0.003 |
| −0.005 ≤ w[1256] ≤ −0.003 |
| −0.005 ≤ w[1257] ≤ −0.003 |
| −0.005 ≤ w[1258] ≤ −0.003 |
| −0.004 ≤ w[1259] ≤ −0.002 |
| −0.004 ≤ w[1260] ≤ −0.002 |
| −0.004 ≤ w[1261] ≤ −0.002 |
| −0.004 ≤ w[1262] ≤ −0.002 |
| −0.004 ≤ w[1263] ≤ −0.002 |
| −0.004 ≤ w[1264] ≤ −0.002 |
| −0.003 ≤ w[1265] ≤ −0.001 |
| −0.003 ≤ w[1266] ≤ −0.001 |
| −0.003 ≤ w[1267] ≤ −0.001 |
| −0.003 ≤ w[1268] ≤ −0.001 |
| −0.003 ≤ w[1269] ≤ −0.001 |
| −0.003 ≤ w[1270] ≤ −0.001 |
| −0.002 ≤ w[1271] ≤ 0.000 |

TABLE 3-continued

| (window coefficients w(n); N = 1024) |
|---|
| −0.002 ≤ w[1272] ≤ 0.000 |
| −0.002 ≤ w[1273] ≤ 0.000 |
| −0.002 ≤ w[1274] ≤ 0.000 |
| −0.002 ≤ w[1275] ≤ 0.000 |
| −0.002 ≤ w[1276] ≤ 0.000 |
| −0.001 ≤ w[1277] ≤ 0.001 |
| −0.001 ≤ w[1278] ≤ 0.001 |
| −0.001 ≤ w[1279] ≤ 0.001 |
| −0.001 ≤ w[1280] ≤ 0.001 |
| −0.001 ≤ w[1281] ≤ 0.001 |
| −0.001 ≤ w[1282] ≤ 0.001 |
| 0.000 ≤ w[1283] ≤ 0.002 |
| 0.000 ≤ w[1284] ≤ 0.002 |
| 0.000 ≤ w[1285] ≤ 0.002 |
| 0.000 ≤ w[1286] ≤ 0.002 |
| 0.000 ≤ w[1287] ≤ 0.002 |
| 0.000 ≤ w[1288] ≤ 0.002 |
| 0.000 ≤ w[1289] ≤ 0.002 |
| 0.001 ≤ w[1290] ≤ 0.003 |
| 0.001 ≤ w[1291] ≤ 0.003 |
| 0.001 ≤ w[1292] ≤ 0.003 |
| 0.001 ≤ w[1293] ≤ 0.003 |
| 0.001 ≤ w[1294] ≤ 0.003 |
| 0.001 ≤ w[1295] ≤ 0.003 |
| 0.001 ≤ w[1296] ≤ 0.003 |
| 0.002 ≤ w[1297] ≤ 0.004 |
| 0.002 ≤ w[1298] ≤ 0.004 |
| 0.002 ≤ w[1299] ≤ 0.004 |
| 0.002 ≤ w[1300] ≤ 0.004 |
| 0.002 ≤ w[1301] ≤ 0.004 |
| 0.002 ≤ w[1302] ≤ 0.004 |
| 0.002 ≤ w[1303] ≤ 0.004 |
| 0.002 ≤ w[1304] ≤ 0.004 |
| 0.003 ≤ w[1305] ≤ 0.005 |
| 0.003 ≤ w[1306] ≤ 0.005 |
| 0.003 ≤ w[1307] ≤ 0.005 |
| 0.003 ≤ w[1308] ≤ 0.005 |
| 0.003 ≤ w[1309] ≤ 0.005 |
| 0.003 ≤ w[1310] ≤ 0.005 |
| 0.003 ≤ w[1311] ≤ 0.005 |
| 0.003 ≤ w[1312] ≤ 0.005 |
| 0.003 ≤ w[1313] ≤ 0.005 |
| 0.003 ≤ w[1314] ≤ 0.005 |
| 0.004 ≤ w[1315] ≤ 0.006 |
| 0.004 ≤ w[1316] ≤ 0.006 |
| 0.004 ≤ w[1317] ≤ 0.006 |
| 0.004 ≤ w[1318] ≤ 0.006 |
| 0.004 ≤ w[1319] ≤ 0.006 |
| 0.004 ≤ w[1320] ≤ 0.006 |
| 0.004 ≤ w[1321] ≤ 0.006 |
| 0.004 ≤ w[1322] ≤ 0.006 |
| 0.004 ≤ w[1323] ≤ 0.006 |
| 0.004 ≤ w[1324] ≤ 0.006 |
| 0.004 ≤ w[1325] ≤ 0.006 |
| 0.004 ≤ w[1326] ≤ 0.006 |
| 0.004 ≤ w[1327] ≤ 0.006 |
| 0.004 ≤ w[1328] ≤ 0.006 |
| 0.004 ≤ w[1329] ≤ 0.006 |
| 0.004 ≤ w[1330] ≤ 0.006 |
| 0.004 ≤ w[1331] ≤ 0.006 |
| 0.004 ≤ w[1332] ≤ 0.006 |
| 0.004 ≤ w[1333] ≤ 0.006 |
| 0.004 ≤ w[1334] ≤ 0.006 |
| 0.004 ≤ w[1335] ≤ 0.006 |
| 0.004 ≤ w[1336] ≤ 0.006 |
| 0.005 ≤ w[1337] ≤ 0.007 |
| 0.005 ≤ w[1338] ≤ 0.007 |
| 0.005 ≤ w[1339] ≤ 0.007 |
| 0.005 ≤ w[1340] ≤ 0.007 |
| 0.005 ≤ w[1341] ≤ 0.007 |
| 0.005 ≤ w[1342] ≤ 0.007 |
| 0.005 ≤ w[1343] ≤ 0.007 |
| 0.005 ≤ w[1344] ≤ 0.007 |
| 0.004 ≤ w[1345] ≤ 0.006 |
| 0.004 ≤ w[1346] ≤ 0.006 |
| 0.004 ≤ w[1347] ≤ 0.006 |
| 0.004 ≤ w[1348] ≤ 0.006 |
| 0.004 ≤ w[1349] ≤ 0.006 |

TABLE 3-continued

| (window coefficients w(n); N = 1024) |
|---|
| 0.004 ≤ w[1350] ≤ 0.006 |
| 0.004 ≤ w[1351] ≤ 0.006 |
| 0.004 ≤ w[1352] ≤ 0.006 |
| 0.004 ≤ w[1353] ≤ 0.006 |
| 0.004 ≤ w[1354] ≤ 0.006 |
| 0.004 ≤ w[1355] ≤ 0.006 |
| 0.004 ≤ w[1356] ≤ 0.006 |
| 0.004 ≤ w[1357] ≤ 0.006 |
| 0.004 ≤ w[1358] ≤ 0.006 |
| 0.004 ≤ w[1359] ≤ 0.006 |
| 0.004 ≤ w[1360] ≤ 0.006 |
| 0.004 ≤ w[1361] ≤ 0.006 |
| 0.004 ≤ w[1362] ≤ 0.006 |
| 0.004 ≤ w[1363] ≤ 0.006 |
| 0.003 ≤ w[1364] ≤ 0.005 |
| 0.003 ≤ w[1365] ≤ 0.005 |
| 0.003 ≤ w[1366] ≤ 0.005 |
| 0.003 ≤ w[1367] ≤ 0.005 |
| 0.003 ≤ w[1368] ≤ 0.005 |
| 0.003 ≤ w[1369] ≤ 0.005 |
| 0.003 ≤ w[1370] ≤ 0.005 |
| 0.003 ≤ w[1371] ≤ 0.005 |
| 0.003 ≤ w[1372] ≤ 0.005 |
| 0.003 ≤ w[1373] ≤ 0.005 |
| 0.003 ≤ w[1374] ≤ 0.005 |
| 0.002 ≤ w[1375] ≤ 0.004 |
| 0.002 ≤ w[1376] ≤ 0.004 |
| 0.002 ≤ w[1377] ≤ 0.004 |
| 0.002 ≤ w[1378] ≤ 0.004 |
| 0.002 ≤ w[1379] ≤ 0.004 |
| 0.002 ≤ w[1380] ≤ 0.004 |
| 0.002 ≤ w[1381] ≤ 0.004 |
| 0.002 ≤ w[1382] ≤ 0.004 |
| 0.001 ≤ w[1383] ≤ 0.003 |
| 0.001 ≤ w[1384] ≤ 0.003 |
| 0.001 ≤ w[1385] ≤ 0.003 |
| 0.001 ≤ w[1386] ≤ 0.003 |
| 0.001 ≤ w[1387] ≤ 0.003 |
| 0.001 ≤ w[1388] ≤ 0.003 |
| 0.001 ≤ w[1389] ≤ 0.003 |
| 0.001 ≤ w[1390] ≤ 0.003 |
| 0.001 ≤ w[1391] ≤ 0.003 |
| 0.000 ≤ w[1392] ≤ 0.002 |
| 0.000 ≤ w[1393] ≤ 0.002 |
| 0.000 ≤ w[1394] ≤ 0.002 |
| 0.000 ≤ w[1395] ≤ 0.002 |
| 0.000 ≤ w[1396] ≤ 0.002 |
| 0.000 ≤ w[1397] ≤ 0.002 |
| 0.000 ≤ w[1398] ≤ 0.002 |
| −0.001 ≤ w[1399] ≤ 0.001 |
| −0.001 ≤ w[1400] ≤ 0.001 |
| −0.001 ≤ w[1401] ≤ 0.001 |
| −0.001 ≤ w[1402] ≤ 0.001 |
| −0.001 ≤ w[1403] ≤ 0.001 |
| −0.001 ≤ w[1404] ≤ 0.001 |
| −0.002 ≤ w[1405] ≤ 0.000 |
| −0.002 ≤ w[1406] ≤ 0.000 |
| −0.002 ≤ w[1407] ≤ 0.000 |
| −0.002 ≤ w[1408] ≤ 0.000 |
| −0.002 ≤ w[1409] ≤ 0.000 |
| −0.002 ≤ w[1410] ≤ 0.000 |
| −0.002 ≤ w[1411] ≤ 0.000 |
| −0.003 ≤ w[1412] ≤ −0.001 |
| −0.003 ≤ w[1413] ≤ −0.001 |
| −0.003 ≤ w[1414] ≤ −0.001 |
| −0.003 ≤ w[1415] ≤ −0.001 |
| −0.003 ≤ w[1416] ≤ −0.001 |
| −0.003 ≤ w[1417] ≤ −0.001 |
| −0.003 ≤ w[1418] ≤ −0.001 |
| −0.004 ≤ w[1419] ≤ −0.002 |
| −0.004 ≤ w[1420] ≤ −0.002 |
| −0.004 ≤ w[1421] ≤ −0.002 |
| −0.004 ≤ w[1422] ≤ −0.002 |
| −0.004 ≤ w[1423] ≤ −0.002 |
| −0.004 ≤ w[1424] ≤ −0.002 |
| −0.004 ≤ w[1425] ≤ −0.002 |
| −0.005 ≤ w[1426] ≤ −0.003 |
| −0.005 ≤ w[1427] ≤ −0.003 |

TABLE 3-continued

| (window coefficients w(n); N = 1024) |
|---|
| −0.005 ≤ w[1428] ≤ −0.003 |
| −0.005 ≤ w[1429] ≤ −0.003 |
| −0.005 ≤ w[1430] ≤ −0.003 |
| −0.005 ≤ w[1431] ≤ −0.003 |
| −0.005 ≤ w[1432] ≤ −0.003 |
| −0.006 ≤ w[1433] ≤ −0.004 |
| −0.006 ≤ w[1434] ≤ −0.004 |
| −0.006 ≤ w[1435] ≤ −0.004 |
| −0.006 ≤ w[1436] ≤ −0.004 |
| −0.006 ≤ w[1437] ≤ −0.004 |
| −0.006 ≤ w[1438] ≤ −0.004 |
| −0.006 ≤ w[1439] ≤ −0.004 |
| −0.007 ≤ w[1440] ≤ −0.005 |
| −0.007 ≤ w[1441] ≤ −0.005 |
| −0.007 ≤ w[1442] ≤ −0.005 |
| −0.007 ≤ w[1443] ≤ −0.005 |
| −0.007 ≤ w[1444] ≤ −0.005 |
| −0.007 ≤ w[1445] ≤ −0.005 |
| −0.007 ≤ w[1446] ≤ −0.005 |
| −0.008 ≤ w[1447] ≤ −0.006 |
| −0.008 ≤ w[1448] ≤ −0.006 |
| −0.008 ≤ w[1449] ≤ −0.006 |
| −0.008 ≤ w[1450] ≤ −0.006 |
| −0.008 ≤ w[1451] ≤ −0.006 |
| −0.008 ≤ w[1452] ≤ −0.006 |
| −0.008 ≤ w[1453] ≤ −0.006 |
| −0.009 ≤ w[1454] ≤ −0.007 |
| −0.009 ≤ w[1455] ≤ −0.007 |
| −0.009 ≤ w[1456] ≤ −0.007 |
| −0.009 ≤ w[1457] ≤ −0.007 |
| −0.009 ≤ w[1458] ≤ −0.007 |
| −0.009 ≤ w[1459] ≤ −0.007 |
| −0.009 ≤ w[1460] ≤ −0.007 |
| −0.009 ≤ w[1461] ≤ −0.007 |
| −0.010 ≤ w[1462] ≤ −0.008 |
| −0.010 ≤ w[1463] ≤ −0.008 |
| −0.010 ≤ w[1464] ≤ −0.008 |
| −0.010 ≤ w[1465] ≤ −0.008 |
| −0.010 ≤ w[1466] ≤ −0.008 |
| −0.010 ≤ w[1467] ≤ −0.008 |
| −0.011 ≤ w[1468] ≤ −0.009 |
| −0.011 ≤ w[1469] ≤ −0.009 |
| −0.011 ≤ w[1470] ≤ −0.009 |
| −0.011 ≤ w[1471] ≤ −0.009 |
| −0.011 ≤ w[1472] ≤ −0.009 |
| −0.011 ≤ w[1473] ≤ −0.009 |
| −0.012 ≤ w[1474] ≤ −0.010 |
| −0.012 ≤ w[1475] ≤ −0.010 |
| −0.012 ≤ w[1476] ≤ −0.010 |
| −0.012 ≤ w[1477] ≤ −0.010 |
| −0.012 ≤ w[1478] ≤ −0.010 |
| −0.012 ≤ w[1479] ≤ −0.010 |
| −0.012 ≤ w[1480] ≤ −0.010 |
| −0.013 ≤ w[1481] ≤ −0.011 |
| −0.013 ≤ w[1482] ≤ −0.011 |
| −0.013 ≤ w[1483] ≤ −0.011 |
| −0.013 ≤ w[1484] ≤ −0.011 |
| −0.013 ≤ w[1485] ≤ −0.011 |
| −0.013 ≤ w[1486] ≤ −0.011 |
| −0.013 ≤ w[1487] ≤ −0.011 |
| −0.013 ≤ w[1488] ≤ −0.011 |
| −0.013 ≤ w[1489] ≤ −0.011 |
| −0.014 ≤ w[1490] ≤ −0.012 |
| −0.014 ≤ w[1491] ≤ −0.012 |
| −0.014 ≤ w[1492] ≤ −0.012 |
| −0.014 ≤ w[1493] ≤ −0.012 |
| −0.014 ≤ w[1494] ≤ −0.012 |
| −0.014 ≤ w[1495] ≤ −0.012 |
| −0.014 ≤ w[1496] ≤ −0.012 |
| −0.014 ≤ w[1497] ≤ −0.012 |
| −0.014 ≤ w[1498] ≤ −0.012 |
| −0.014 ≤ w[1499] ≤ −0.012 |
| −0.014 ≤ w[1500] ≤ −0.012 |
| −0.014 ≤ w[1501] ≤ −0.012 |
| −0.014 ≤ w[1502] ≤ −0.012 |
| −0.014 ≤ w[1503] ≤ −0.012 |
| −0.014 ≤ w[1504] ≤ −0.012 |
| −0.014 ≤ w[1505] ≤ −0.012 |

TABLE 3-continued

| (window coefficients w(n); N = 1024) |
|---|
| −0.014 ≤ w[1506] ≤ −0.012 |
| −0.014 ≤ w[1507] ≤ −0.012 |
| −0.014 ≤ w[1508] ≤ −0.012 |
| −0.015 ≤ w[1509] ≤ −0.013 |
| −0.015 ≤ w[1510] ≤ −0.013 |
| −0.015 ≤ w[1511] ≤ −0.013 |
| −0.015 ≤ w[1512] ≤ −0.013 |
| −0.015 ≤ w[1513] ≤ −0.013 |
| −0.015 ≤ w[1514] ≤ −0.013 |
| −0.015 ≤ w[1515] ≤ −0.013 |
| −0.015 ≤ w[1516] ≤ −0.013 |
| −0.015 ≤ w[1517] ≤ −0.013 |
| −0.015 ≤ w[1518] ≤ −0.013 |
| −0.015 ≤ w[1519] ≤ −0.013 |
| −0.015 ≤ w[1520] ≤ −0.013 |
| −0.015 ≤ w[1521] ≤ −0.013 |
| −0.015 ≤ w[1522] ≤ −0.013 |
| −0.015 ≤ w[1523] ≤ −0.013 |
| −0.015 ≤ w[1524] ≤ −0.013 |
| −0.014 ≤ w[1525] ≤ −0.012 |
| −0.014 ≤ w[1526] ≤ −0.012 |
| −0.014 ≤ w[1527] ≤ −0.012 |
| −0.014 ≤ w[1528] ≤ −0.012 |
| −0.014 ≤ w[1529] ≤ −0.012 |
| −0.014 ≤ w[1530] ≤ −0.012 |
| −0.014 ≤ w[1531] ≤ −0.012 |
| −0.014 ≤ w[1532] ≤ −0.012 |
| −0.014 ≤ w[1533] ≤ −0.012 |
| −0.014 ≤ w[1534] ≤ −0.012 |
| −0.014 ≤ w[1535] ≤ −0.012 |
| −0.014 ≤ w[1536] ≤ −0.012 |
| −0.014 ≤ w[1537] ≤ −0.012 |
| −0.014 ≤ w[1538] ≤ −0.012 |
| −0.014 ≤ w[1539] ≤ −0.012 |
| −0.014 ≤ w[1540] ≤ −0.012 |
| −0.014 ≤ w[1541] ≤ −0.012 |
| −0.014 ≤ w[1542] ≤ −0.012 |
| −0.014 ≤ w[1543] ≤ −0.012 |
| −0.014 ≤ w[1544] ≤ −0.012 |
| −0.014 ≤ w[1545] ≤ −0.012 |
| −0.014 ≤ w[1546] ≤ −0.012 |
| −0.014 ≤ w[1547] ≤ −0.012 |
| −0.013 ≤ w[1548] ≤ −0.011 |
| −0.013 ≤ w[1549] ≤ −0.011 |
| −0.013 ≤ w[1550] ≤ −0.011 |
| −0.013 ≤ w[1551] ≤ −0.011 |
| −0.013 ≤ w[1552] ≤ −0.011 |
| −0.013 ≤ w[1553] ≤ −0.011 |
| −0.013 ≤ w[1554] ≤ −0.011 |
| −0.013 ≤ w[1555] ≤ −0.011 |
| −0.013 ≤ w[1556] ≤ −0.011 |
| −0.013 ≤ w[1557] ≤ −0.011 |
| −0.013 ≤ w[1558] ≤ −0.011 |
| −0.013 ≤ w[1559] ≤ −0.011 |
| −0.013 ≤ w[1560] ≤ −0.011 |
| −0.012 ≤ w[1561] ≤ −0.010 |
| −0.012 ≤ w[1562] ≤ −0.010 |
| −0.012 ≤ w[1563] ≤ −0.010 |
| −0.012 ≤ w[1564] ≤ −0.010 |
| −0.012 ≤ w[1565] ≤ −0.010 |
| −0.012 ≤ w[1566] ≤ −0.010 |
| −0.012 ≤ w[1567] ≤ −0.010 |
| −0.012 ≤ w[1568] ≤ −0.010 |
| −0.012 ≤ w[1569] ≤ −0.010 |
| −0.012 ≤ w[1570] ≤ −0.010 |
| −0.011 ≤ w[1571] ≤ −0.009 |
| −0.011 ≤ w[1572] ≤ −0.009 |
| −0.011 ≤ w[1573] ≤ −0.009 |
| −0.011 ≤ w[1574] ≤ −0.009 |
| −0.011 ≤ w[1575] ≤ −0.009 |
| −0.011 ≤ w[1576] ≤ −0.009 |
| −0.011 ≤ w[1577] ≤ −0.009 |
| −0.011 ≤ w[1578] ≤ −0.009 |
| −0.011 ≤ w[1579] ≤ −0.009 |
| −0.010 ≤ w[1580] ≤ −0.008 |
| −0.010 ≤ w[1581] ≤ −0.008 |
| −0.010 ≤ w[1582] ≤ −0.008 |
| −0.010 ≤ w[1583] ≤ −0.008 |

TABLE 3-continued

| (window coefficients w(n); N = 1024) |
|---|
| −0.010 ≤ w[1584] ≤ −0.008 |
| −0.010 ≤ w[1585] ≤ −0.008 |
| −0.010 ≤ w[1586] ≤ −0.008 |
| −0.010 ≤ w[1587] ≤ −0.008 |
| −0.010 ≤ w[1588] ≤ −0.008 |
| −0.010 ≤ w[1589] ≤ −0.008 |
| −0.009 ≤ w[1590] ≤ −0.007 |
| −0.009 ≤ w[1591] ≤ −0.007 |
| −0.009 ≤ w[1592] ≤ −0.007 |
| −0.009 ≤ w[1593] ≤ −0.007 |
| −0.009 ≤ w[1594] ≤ −0.007 |
| −0.009 ≤ w[1595] ≤ −0.007 |
| −0.009 ≤ w[1596] ≤ −0.007 |
| −0.009 ≤ w[1597] ≤ −0.007 |
| −0.009 ≤ w[1598] ≤ −0.007 |
| −0.009 ≤ w[1599] ≤ −0.007 |
| −0.009 ≤ w[1600] ≤ −0.007 |
| −0.009 ≤ w[1601] ≤ −0.007 |
| −0.008 ≤ w[1602] ≤ −0.006 |
| −0.008 ≤ w[1603] ≤ −0.006 |
| −0.008 ≤ w[1604] ≤ −0.006 |
| −0.008 ≤ w[1605] ≤ −0.006 |
| −0.008 ≤ w[1606] ≤ −0.006 |
| −0.008 ≤ w[1607] ≤ −0.006 |
| −0.008 ≤ w[1608] ≤ −0.006 |
| −0.008 ≤ w[1609] ≤ −0.006 |
| −0.008 ≤ w[1610] ≤ −0.006 |
| −0.008 ≤ w[1611] ≤ −0.006 |
| −0.007 ≤ w[1612] ≤ −0.005 |
| −0.007 ≤ w[1613] ≤ −0.005 |
| −0.007 ≤ w[1614] ≤ −0.005 |
| −0.007 ≤ w[1615] ≤ −0.005 |
| −0.007 ≤ w[1616] ≤ −0.005 |
| −0.007 ≤ w[1617] ≤ −0.005 |
| −0.007 ≤ w[1618] ≤ −0.005 |
| −0.007 ≤ w[1619] ≤ −0.005 |
| −0.006 ≤ w[1620] ≤ −0.004 |
| −0.006 ≤ w[1621] ≤ −0.004 |
| −0.006 ≤ w[1622] ≤ −0.004 |
| −0.006 ≤ w[1623] ≤ −0.004 |
| −0.006 ≤ w[1624] ≤ −0.004 |
| −0.006 ≤ w[1625] ≤ −0.004 |
| −0.006 ≤ w[1626] ≤ −0.004 |
| −0.005 ≤ w[1627] ≤ −0.003 |
| −0.005 ≤ w[1628] ≤ −0.003 |
| −0.005 ≤ w[1629] ≤ −0.003 |
| −0.005 ≤ w[1630] ≤ −0.003 |
| −0.005 ≤ w[1631] ≤ −0.003 |
| −0.005 ≤ w[1632] ≤ −0.003 |
| −0.005 ≤ w[1633] ≤ −0.003 |
| −0.004 ≤ w[1634] ≤ −0.002 |
| −0.004 ≤ w[1635] ≤ −0.002 |
| −0.004 ≤ w[1636] ≤ −0.002 |
| −0.004 ≤ w[1637] ≤ −0.002 |
| −0.004 ≤ w[1638] ≤ −0.002 |
| −0.004 ≤ w[1639] ≤ −0.002 |
| −0.004 ≤ w[1640] ≤ −0.002 |
| −0.004 ≤ w[1641] ≤ −0.002 |
| −0.003 ≤ w[1642] ≤ −0.001 |
| −0.003 ≤ w[1643] ≤ −0.001 |
| −0.003 ≤ w[1644] ≤ −0.001 |
| −0.003 ≤ w[1645] ≤ −0.001 |
| −0.003 ≤ w[1646] ≤ −0.001 |
| −0.003 ≤ w[1647] ≤ −0.001 |
| −0.003 ≤ w[1648] ≤ −0.001 |
| −0.003 ≤ w[1649] ≤ −0.001 |
| −0.003 ≤ w[1650] ≤ −0.001 |
| −0.002 ≤ w[1651] ≤ 0.000 |
| −0.002 ≤ w[1652] ≤ 0.000 |
| −0.002 ≤ w[1653] ≤ 0.000 |
| −0.002 ≤ w[1654] ≤ 0.000 |
| −0.002 ≤ w[1655] ≤ 0.000 |
| −0.002 ≤ w[1656] ≤ 0.000 |
| −0.002 ≤ w[1657] ≤ 0.000 |
| −0.002 ≤ w[1658] ≤ 0.000 |
| −0.002 ≤ w[1659] ≤ 0.000 |
| −0.002 ≤ w[1660] ≤ 0.000 |
| −0.002 ≤ w[1661] ≤ 0.000 |

TABLE 3-continued

| (window coefficients w(n); N = 1024) |
|---|
| −0.001 ≤ w[1662] ≤ 0.001 |
| −0.001 ≤ w[1663] ≤ 0.001 |
| −0.001 ≤ w[1664] ≤ 0.001 |
| −0.001 ≤ w[1665] ≤ 0.001 |
| −0.001 ≤ w[1666] ≤ 0.001 |
| −0.001 ≤ w[1667] ≤ 0.001 |
| −0.001 ≤ w[1668] ≤ 0.001 |
| −0.001 ≤ w[1669] ≤ 0.001 |
| −0.001 ≤ w[1670] ≤ 0.001 |
| −0.001 ≤ w[1671] ≤ 0.001 |
| −0.001 ≤ w[1672] ≤ 0.001 |
| −0.001 ≤ w[1673] ≤ 0.001 |
| −0.001 ≤ w[1674] ≤ 0.001 |
| −0.001 ≤ w[1675] ≤ 0.001 |
| −0.001 ≤ w[1676] ≤ 0.001 |
| −0.001 ≤ w[1677] ≤ 0.001 |
| −0.001 ≤ w[1678] ≤ 0.001 |
| −0.001 ≤ w[1679] ≤ 0.001 |
| −0.001 ≤ w[1680] ≤ 0.001 |
| 0.000 ≤ w[1681] ≤ 0.002 |
| 0.000 ≤ w[1682] ≤ 0.002 |
| 0.000 ≤ w[1683] ≤ 0.002 |
| 0.000 ≤ w[1684] ≤ 0.002 |
| 0.000 ≤ w[1685] ≤ 0.002 |
| 0.000 ≤ w[1686] ≤ 0.002 |
| 0.000 ≤ w[1687] ≤ 0.002 |
| 0.000 ≤ w[1688] ≤ 0.002 |
| 0.000 ≤ w[1689] ≤ 0.002 |
| 0.000 ≤ w[1690] ≤ 0.002 |
| 0.000 ≤ w[1691] ≤ 0.002 |
| 0.000 ≤ w[1692] ≤ 0.002 |
| 0.000 ≤ w[1693] ≤ 0.002 |
| 0.000 ≤ w[1694] ≤ 0.002 |
| 0.000 ≤ w[1695] ≤ 0.002 |
| 0.000 ≤ w[1696] ≤ 0.002 |
| 0.000 ≤ w[1697] ≤ 0.002 |
| 0.000 ≤ w[1698] ≤ 0.002 |
| 0.000 ≤ w[1699] ≤ 0.002 |
| 0.000 ≤ w[1700] ≤ 0.002 |
| 0.000 ≤ w[1701] ≤ 0.002 |
| 0.000 ≤ w[1702] ≤ 0.002 |
| 0.000 ≤ w[1703] ≤ 0.002 |
| 0.000 ≤ w[1704] ≤ 0.002 |
| 0.000 ≤ w[1705] ≤ 0.002 |
| 0.000 ≤ w[1706] ≤ 0.002 |
| 0.000 ≤ w[1707] ≤ 0.002 |
| 0.000 ≤ w[1708] ≤ 0.002 |
| 0.000 ≤ w[1709] ≤ 0.002 |
| 0.000 ≤ w[1710] ≤ 0.002 |
| 0.000 ≤ w[1711] ≤ 0.002 |
| 0.000 ≤ w[1712] ≤ 0.002 |
| 0.000 ≤ w[1713] ≤ 0.002 |
| 0.000 ≤ w[1714] ≤ 0.002 |
| 0.000 ≤ w[1715] ≤ 0.002 |
| 0.000 ≤ w[1716] ≤ 0.002 |
| 0.000 ≤ w[1717] ≤ 0.002 |
| 0.000 ≤ w[1718] ≤ 0.002 |
| 0.000 ≤ w[1719] ≤ 0.002 |
| 0.000 ≤ w[1720] ≤ 0.002 |
| 0.000 ≤ w[1721] ≤ 0.002 |
| 0.000 ≤ w[1722] ≤ 0.002 |
| 0.000 ≤ w[1723] ≤ 0.002 |
| 0.000 ≤ w[1724] ≤ 0.002 |
| 0.000 ≤ w[1725] ≤ 0.002 |
| 0.000 ≤ w[1726] ≤ 0.002 |
| −0.001 ≤ w[1727] ≤ 0.001 |
| −0.001 ≤ w[1728] ≤ 0.001 |
| −0.001 ≤ w[1729] ≤ 0.001 |
| −0.001 ≤ w[1730] ≤ 0.001 |
| −0.001 ≤ w[1731] ≤ 0.001 |
| −0.001 ≤ w[1732] ≤ 0.001 |
| −0.001 ≤ w[1733] ≤ 0.001 |
| −0.001 ≤ w[1734] ≤ 0.001 |
| −0.001 ≤ w[1735] ≤ 0.001 |
| −0.001 ≤ w[1736] ≤ 0.001 |
| −0.001 ≤ w[1737] ≤ 0.001 |
| −0.001 ≤ w[1738] ≤ 0.001 |
| −0.001 ≤ w[1739] ≤ 0.001 |

TABLE 3-continued

| (window coefficients w(n); N = 1024) |
|---|
| −0.001 ≤ w[1740] ≤ 0.001 |
| −0.001 ≤ w[1741] ≤ 0.001 |
| −0.001 ≤ w[1742] ≤ 0.001 |
| −0.001 ≤ w[1743] ≤ 0.001 |
| −0.001 ≤ w[1744] ≤ 0.001 |
| −0.001 ≤ w[1745] ≤ 0.001 |
| −0.001 ≤ w[1746] ≤ 0.001 |
| −0.001 ≤ w[1747] ≤ 0.001 |
| −0.001 ≤ w[1748] ≤ 0.001 |
| −0.001 ≤ w[1749] ≤ 0.001 |
| −0.001 ≤ w[1750] ≤ 0.001 |
| −0.001 ≤ w[1751] ≤ 0.001 |
| −0.001 ≤ w[1752] ≤ 0.001 |
| −0.001 ≤ w[1753] ≤ 0.001 |
| −0.001 ≤ w[1754] ≤ 0.001 |
| −0.001 ≤ w[1755] ≤ 0.001 |
| −0.001 ≤ w[1756] ≤ 0.001 |
| −0.001 ≤ w[1757] ≤ 0.001 |
| −0.001 ≤ w[1758] ≤ 0.001 |
| −0.001 ≤ w[1759] ≤ 0.001 |
| −0.001 ≤ w[1760] ≤ 0.001 |
| −0.001 ≤ w[1761] ≤ 0.001 |
| −0.001 ≤ w[1762] ≤ 0.001 |
| −0.001 ≤ w[1763] ≤ 0.001 |
| −0.001 ≤ w[1764] ≤ 0.001 |
| −0.001 ≤ w[1765] ≤ 0.001 |
| −0.001 ≤ w[1766] ≤ 0.001 |
| −0.001 ≤ w[1767] ≤ 0.001 |
| −0.001 ≤ w[1768] ≤ 0.001 |
| −0.001 ≤ w[1769] ≤ 0.001 |
| −0.001 ≤ w[1770] ≤ 0.001 |
| −0.001 ≤ w[1771] ≤ 0.001 |
| −0.001 ≤ w[1772] ≤ 0.001 |
| −0.001 ≤ w[1773] ≤ 0.001 |
| −0.001 ≤ w[1774] ≤ 0.001 |
| −0.001 ≤ w[1775] ≤ 0.001 |
| −0.001 ≤ w[1776] ≤ 0.001 |
| −0.001 ≤ w[1777] ≤ 0.001 |
| −0.001 ≤ w[1778] ≤ 0.001 |
| −0.001 ≤ w[1779] ≤ 0.001 |
| −0.001 ≤ w[1780] ≤ 0.001 |
| −0.001 ≤ w[1781] ≤ 0.001 |
| −0.001 ≤ w[1782] ≤ 0.001 |
| −0.001 ≤ w[1783] ≤ 0.001 |
| −0.001 ≤ w[1784] ≤ 0.001 |
| −0.001 ≤ w[1785] ≤ 0.001 |
| −0.001 ≤ w[1786] ≤ 0.001 |
| −0.001 ≤ w[1787] ≤ 0.001 |
| −0.001 ≤ w[1788] ≤ 0.001 |
| −0.001 ≤ w[1789] ≤ 0.001 |
| −0.001 ≤ w[1790] ≤ 0.001 |
| −0.001 ≤ w[1791] ≤ 0.001 |
| −0.001 ≤ w[1792] ≤ 0.001 |
| −0.001 ≤ w[1793] ≤ 0.001 |
| −0.001 ≤ w[1794] ≤ 0.001 |
| −0.001 ≤ w[1795] ≤ 0.001 |
| −0.001 ≤ w[1796] ≤ 0.001 |
| −0.001 ≤ w[1797] ≤ 0.001 |
| −0.001 ≤ w[1798] ≤ 0.001 |
| −0.001 ≤ w[1799] ≤ 0.001 |
| −0.001 ≤ w[1800] ≤ 0.001 |
| −0.001 ≤ w[1801] ≤ 0.001 |
| −0.001 ≤ w[1802] ≤ 0.001 |
| −0.001 ≤ w[1803] ≤ 0.001 |
| −0.001 ≤ w[1804] ≤ 0.001 |
| −0.001 ≤ w[1805] ≤ 0.001 |
| −0.001 ≤ w[1806] ≤ 0.001 |
| −0.001 ≤ w[1807] ≤ 0.001 |
| −0.001 ≤ w[1808] ≤ 0.001 |
| −0.001 ≤ w[1809] ≤ 0.001 |
| −0.001 ≤ w[1810] ≤ 0.001 |
| −0.001 ≤ w[1811] ≤ 0.001 |
| −0.001 ≤ w[1812] ≤ 0.001 |
| −0.001 ≤ w[1813] ≤ 0.001 |
| −0.001 ≤ w[1814] ≤ 0.001 |
| −0.001 ≤ w[1815] ≤ 0.001 |
| −0.001 ≤ w[1816] ≤ 0.001 |
| −0.001 ≤ w[1817] ≤ 0.001 |

TABLE 3-continued

| (window coefficients w(n); N = 1024) |
|---|
| −0.001 ≤ w[1818] ≤ 0.001 |
| −0.001 ≤ w[1819] ≤ 0.001 |
| −0.001 ≤ w[1820] ≤ 0.001 |
| −0.001 ≤ w[1821] ≤ 0.001 |
| −0.001 ≤ w[1822] ≤ 0.001 |
| −0.001 ≤ w[1823] ≤ 0.001 |
| −0.001 ≤ w[1824] ≤ 0.001 |
| −0.001 ≤ w[1825] ≤ 0.001 |
| −0.001 ≤ w[1826] ≤ 0.001 |
| −0.001 ≤ w[1827] ≤ 0.001 |
| −0.001 ≤ w[1828] ≤ 0.001 |
| −0.001 ≤ w[1829] ≤ 0.001 |
| −0.001 ≤ w[1830] ≤ 0.001 |
| −0.001 ≤ w[1831] ≤ 0.001 |
| −0.001 ≤ w[1832] ≤ 0.001 |
| −0.001 ≤ w[1833] ≤ 0.001 |
| −0.001 ≤ w[1834] ≤ 0.001 |
| −0.001 ≤ w[1835] ≤ 0.001 |
| −0.001 ≤ w[1836] ≤ 0.001 |
| −0.001 ≤ w[1837] ≤ 0.001 |
| −0.001 ≤ w[1838] ≤ 0.001 |
| −0.001 ≤ w[1839] ≤ 0.001 |
| −0.001 ≤ w[1840] ≤ 0.001 |
| −0.001 ≤ w[1841] ≤ 0.001 |
| −0.001 ≤ w[1842] ≤ 0.001 |
| −0.001 ≤ w[1843] ≤ 0.001 |
| −0.001 ≤ w[1844] ≤ 0.001 |
| −0.001 ≤ w[1845] ≤ 0.001 |
| −0.001 ≤ w[1846] ≤ 0.001 |
| −0.001 ≤ w[1847] ≤ 0.001 |
| −0.001 ≤ w[1848] ≤ 0.001 |
| −0.001 ≤ w[1849] ≤ 0.001 |
| −0.001 ≤ w[1850] ≤ 0.001 |
| −0.001 ≤ w[1851] ≤ 0.001 |
| −0.001 ≤ w[1852] ≤ 0.001 |
| −0.001 ≤ w[1853] ≤ 0.001 |
| −0.001 ≤ w[1854] ≤ 0.001 |
| −0.001 ≤ w[1855] ≤ 0.001 |
| −0.001 ≤ w[1856] ≤ 0.001 |
| −0.001 ≤ w[1857] ≤ 0.001 |
| −0.001 ≤ w[1858] ≤ 0.001 |
| −0.001 ≤ w[1859] ≤ 0.001 |
| −0.001 ≤ w[1860] ≤ 0.001 |
| −0.001 ≤ w[1861] ≤ 0.001 |
| −0.001 ≤ w[1862] ≤ 0.001 |
| −0.001 ≤ w[1863] ≤ 0.001 |
| −0.001 ≤ w[1864] ≤ 0.001 |
| −0.001 ≤ w[1865] ≤ 0.001 |
| −0.001 ≤ w[1866] ≤ 0.001 |
| −0.001 ≤ w[1867] ≤ 0.001 |
| −0.001 ≤ w[1868] ≤ 0.001 |
| −0.001 ≤ w[1869] ≤ 0.001 |
| −0.001 ≤ w[1870] ≤ 0.001 |
| −0.001 ≤ w[1871] ≤ 0.001 |
| −0.001 ≤ w[1872] ≤ 0.001 |
| −0.001 ≤ w[1873] ≤ 0.001 |
| −0.001 ≤ w[1874] ≤ 0.001 |
| −0.001 ≤ w[1875] ≤ 0.001 |
| −0.001 ≤ w[1876] ≤ 0.001 |
| −0.001 ≤ w[1877] ≤ 0.001 |
| −0.001 ≤ w[1878] ≤ 0.001 |
| −0.001 ≤ w[1879] ≤ 0.001 |
| −0.001 ≤ w[1880] ≤ 0.001 |
| −0.001 ≤ w[1881] ≤ 0.001 |
| −0.001 ≤ w[1882] ≤ 0.001 |
| −0.001 ≤ w[1883] ≤ 0.001 |
| −0.001 ≤ w[1884] ≤ 0.001 |
| −0.001 ≤ w[1885] ≤ 0.001 |
| −0.001 ≤ w[1886] ≤ 0.001 |
| −0.001 ≤ w[1887] ≤ 0.001 |
| −0.001 ≤ w[1888] ≤ 0.001 |
| −0.001 ≤ w[1889] ≤ 0.001 |
| −0.001 ≤ w[1890] ≤ 0.001 |
| −0.001 ≤ w[1891] ≤ 0.001 |
| −0.001 ≤ w[1892] ≤ 0.001 |
| −0.001 ≤ w[1893] ≤ 0.001 |
| −0.001 ≤ w[1894] ≤ 0.001 |
| −0.001 ≤ w[1895] ≤ 0.001 |

TABLE 3-continued

| (window coefficients w(n); N = 1024) |
|---|
| −0.001 ≤ w[1896] ≤ 0.001 |
| −0.001 ≤ w[1897] ≤ 0.001 |
| −0.001 ≤ w[1898] ≤ 0.001 |
| −0.001 ≤ w[1899] ≤ 0.001 |
| −0.001 ≤ w[1900] ≤ 0.001 |
| −0.001 ≤ w[1901] ≤ 0.001 |
| −0.001 ≤ w[1902] ≤ 0.001 |
| −0.001 ≤ w[1903] ≤ 0.001 |
| −0.001 ≤ w[1904] ≤ 0.001 |
| −0.001 ≤ w[1905] ≤ 0.001 |
| −0.001 ≤ w[1906] ≤ 0.001 |
| −0.001 ≤ w[1907] ≤ 0.001 |
| −0.001 ≤ w[1908] ≤ 0.001 |
| −0.001 ≤ w[1909] ≤ 0.001 |
| −0.001 ≤ w[1910] ≤ 0.001 |
| −0.001 ≤ w[1911] ≤ 0.001 |
| −0.001 ≤ w[1912] ≤ 0.001 |
| −0.001 ≤ w[1913] ≤ 0.001 |
| −0.001 ≤ w[1914] ≤ 0.001 |
| −0.001 ≤ w[1915] ≤ 0.001 |
| −0.001 ≤ w[1916] ≤ 0.001 |
| −0.001 ≤ w[1917] ≤ 0.001 |
| −0.001 ≤ w[1918] ≤ 0.001 |
| −0.001 ≤ w[1919] ≤ 0.001 |
| −0.001 ≤ w[1920] ≤ 0.001 |
| −0.001 ≤ w[1921] ≤ 0.001 |
| −0.001 ≤ w[1922] ≤ 0.001 |
| −0.001 ≤ w[1923] ≤ 0.001 |
| −0.001 ≤ w[1924] ≤ 0.001 |
| −0.001 ≤ w[1925] ≤ 0.001 |
| −0.001 ≤ w[1926] ≤ 0.001 |
| −0.001 ≤ w[1927] ≤ 0.001 |
| −0.001 ≤ w[1928] ≤ 0.001 |
| −0.001 ≤ w[1929] ≤ 0.001 |
| −0.001 ≤ w[1930] ≤ 0.001 |
| −0.001 ≤ w[1931] ≤ 0.001 |
| −0.001 ≤ w[1932] ≤ 0.001 |
| −0.001 ≤ w[1933] ≤ 0.001 |
| −0.001 ≤ w[1934] ≤ 0.001 |
| −0.002 ≤ w[1935] ≤ 0.000 |
| −0.002 ≤ w[1936] ≤ 0.000 |
| −0.002 ≤ w[1937] ≤ 0.000 |
| −0.002 ≤ w[1938] ≤ 0.000 |
| −0.002 ≤ w[1939] ≤ 0.000 |
| −0.002 ≤ w[1940] ≤ 0.000 |
| −0.002 ≤ w[1941] ≤ 0.000 |
| −0.002 ≤ w[1942] ≤ 0.000 |
| −0.002 ≤ w[1943] ≤ 0.000 |
| −0.002 ≤ w[1944] ≤ 0.000 |
| −0.002 ≤ w[1945] ≤ 0.000 |
| −0.002 ≤ w[1946] ≤ 0.000 |
| −0.002 ≤ w[1947] ≤ 0.000 |
| −0.002 ≤ w[1948] ≤ 0.000 |
| −0.002 ≤ w[1949] ≤ 0.000 |
| −0.002 ≤ w[1950] ≤ 0.000 |
| −0.002 ≤ w[1951] ≤ 0.000 |
| −0.002 ≤ w[1952] ≤ 0.000 |
| −0.002 ≤ w[1953] ≤ 0.000 |
| −0.002 ≤ w[1954] ≤ 0.000 |
| −0.002 ≤ w[1955] ≤ 0.000 |
| −0.002 ≤ w[1956] ≤ 0.000 |
| −0.002 ≤ w[1957] ≤ 0.000 |
| −0.002 ≤ w[1958] ≤ 0.000 |
| −0.002 ≤ w[1959] ≤ 0.000 |
| −0.002 ≤ w[1960] ≤ 0.000 |
| −0.002 ≤ w[1961] ≤ 0.000 |
| −0.002 ≤ w[1962] ≤ 0.000 |
| −0.002 ≤ w[1963] ≤ 0.000 |
| −0.002 ≤ w[1964] ≤ 0.000 |
| −0.002 ≤ w[1965] ≤ 0.000 |
| −0.002 ≤ w[1966] ≤ 0.000 |
| −0.002 ≤ w[1967] ≤ 0.000 |
| −0.002 ≤ w[1968] ≤ 0.000 |
| −0.002 ≤ w[1969] ≤ 0.000 |
| −0.002 ≤ w[1970] ≤ 0.000 |
| −0.002 ≤ w[1971] ≤ 0.000 |
| −0.002 ≤ w[1972] ≤ 0.000 |
| −0.002 ≤ w[1973] ≤ 0.000 |

TABLE 3-continued

| (window coefficients w(n); N = 1024) |
|---|
| −0.002 ≤ w[1974] ≤ 0.000 |
| −0.002 ≤ w[1975] ≤ 0.000 |
| −0.002 ≤ w[1976] ≤ 0.000 |
| −0.002 ≤ w[1977] ≤ 0.000 |
| −0.002 ≤ w[1978] ≤ 0.000 |
| −0.002 ≤ w[1979] ≤ 0.000 |
| −0.002 ≤ w[1980] ≤ 0.000 |
| −0.002 ≤ w[1981] ≤ 0.000 |
| −0.002 ≤ w[1982] ≤ 0.000 |
| −0.002 ≤ w[1983] ≤ 0.000 |
| −0.002 ≤ w[1984] ≤ 0.000 |
| −0.002 ≤ w[1985] ≤ 0.000 |
| −0.002 ≤ w[1986] ≤ 0.000 |
| −0.002 ≤ w[1987] ≤ 0.000 |
| −0.002 ≤ w[1988] ≤ 0.000 |
| −0.002 ≤ w[1989] ≤ 0.000 |
| −0.002 ≤ w[1990] ≤ 0.000 |
| −0.002 ≤ w[1991] ≤ 0.000 |
| −0.002 ≤ w[1992] ≤ 0.000 |
| −0.002 ≤ w[1993] ≤ 0.000 |
| −0.002 ≤ w[1994] ≤ 0.000 |
| −0.002 ≤ w[1995] ≤ 0.000 |
| −0.002 ≤ w[1996] ≤ 0.000 |
| −0.002 ≤ w[1997] ≤ 0.000 |
| −0.002 ≤ w[1998] ≤ 0.000 |
| −0.002 ≤ w[1999] ≤ 0.000 |
| −0.002 ≤ w[2000] ≤ 0.000 |
| −0.002 ≤ w[2001] ≤ 0.000 |
| −0.002 ≤ w[2002] ≤ 0.000 |
| −0.002 ≤ w[2003] ≤ 0.000 |
| −0.002 ≤ w[2004] ≤ 0.000 |
| −0.002 ≤ w[2005] ≤ 0.000 |
| −0.002 ≤ w[2006] ≤ 0.000 |
| −0.002 ≤ w[2007] ≤ 0.000 |
| −0.002 ≤ w[2008] ≤ 0.000 |
| −0.002 ≤ w[2009] ≤ 0.000 |
| −0.002 ≤ w[2010] ≤ 0.000 |
| −0.002 ≤ w[2011] ≤ 0.000 |
| −0.002 ≤ w[2012] ≤ 0.000 |
| −0.002 ≤ w[2013] ≤ 0.000 |
| −0.002 ≤ w[2014] ≤ 0.000 |
| −0.002 ≤ w[2015] ≤ 0.000 |
| −0.002 ≤ w[2016] ≤ 0.000 |
| −0.002 ≤ w[2017] ≤ 0.000 |
| −0.002 ≤ w[2018] ≤ 0.000 |
| −0.002 ≤ w[2019] ≤ 0.000 |
| −0.002 ≤ w[2020] ≤ 0.000 |
| −0.002 ≤ w[2021] ≤ 0.000 |
| −0.002 ≤ w[2022] ≤ 0.000 |
| −0.002 ≤ w[2023] ≤ 0.000 |
| −0.002 ≤ w[2024] ≤ 0.000 |
| −0.002 ≤ w[2025] ≤ 0.000 |
| −0.002 ≤ w[2026] ≤ 0.000 |
| −0.002 ≤ w[2027] ≤ 0.000 |
| −0.002 ≤ w[2028] ≤ 0.000 |
| −0.002 ≤ w[2029] ≤ 0.000 |
| −0.002 ≤ w[2030] ≤ 0.000 |
| −0.002 ≤ w[2031] ≤ 0.000 |
| −0.002 ≤ w[2032] ≤ 0.000 |
| −0.002 ≤ w[2033] ≤ 0.000 |
| −0.002 ≤ w[2034] ≤ 0.000 |
| −0.002 ≤ w[2035] ≤ 0.000 |
| −0.002 ≤ w[2036] ≤ 0.000 |
| −0.002 ≤ w[2037] ≤ 0.000 |
| −0.002 ≤ w[2038] ≤ 0.000 |
| −0.002 ≤ w[2039] ≤ 0.000 |
| −0.002 ≤ w[2040] ≤ 0.000 |
| −0.002 ≤ w[2041] ≤ 0.000 |
| −0.002 ≤ w[2042] ≤ 0.000 |
| −0.002 ≤ w[2043] ≤ 0.000 |
| −0.002 ≤ w[2044] ≤ 0.000 |
| −0.002 ≤ w[2045] ≤ 0.000 |
| −0.002 ≤ w[2046] ≤ 0.000 |
| −0.002 ≤ w[2047] ≤ 0.000 |

TABLE 4

| (window coefficients w(n); N = 1024) |
|---|
| w[0] = 0.00000000 |
| w[1] = 0.00000000 |
| w[2] = 0.00000000 |
| w[3] = 0.00000000 |
| w[4] = 0.00000000 |
| w[5] = 0.00000000 |
| w[6] = 0.00000000 |
| w[7] = 0.00000000 |
| w[8] = 0.00000000 |
| w[9] = 0.00000000 |
| w[10] = 0.00000000 |
| w[11] = 0.00000000 |
| w[12] = 0.00000000 |
| w[13] = 0.00000000 |
| w[14] = 0.00000000 |
| w[15] = 0.00000000 |
| w[16] = 0.00000000 |
| w[17] = 0.00000000 |
| w[18] = 0.00000000 |
| w[19] = 0.00000000 |
| w[20] = 0.00000000 |
| w[21] = 0.00000000 |
| w[22] = 0.00000000 |
| w[23] = 0.00000000 |
| w[24] = 0.00000000 |
| w[25] = 0.00000000 |
| w[26] = 0.00000000 |
| w[27] = 0.00000000 |
| w[28] = 0.00000000 |
| w[29] = 0.00000000 |
| w[30] = 0.00000000 |
| w[31] = 0.00000000 |
| w[32] = 0.00000000 |
| w[33] = 0.00000000 |
| w[34] = 0.00000000 |
| w[35] = 0.00000000 |
| w[36] = 0.00000000 |
| w[37] = 0.00000000 |
| w[38] = 0.00000000 |
| w[39] = 0.00000000 |
| w[40] = 0.00000000 |
| w[41] = 0.00000000 |
| w[42] = 0.00000000 |
| w[43] = 0.00000000 |
| w[44] = 0.00000000 |
| w[45] = 0.00000000 |
| w[46] = 0.00000000 |
| w[47] = 0.00000000 |
| w[48] = 0.00000000 |
| w[49] = 0.00000000 |
| w[50] = 0.00000000 |
| w[51] = 0.00000000 |
| w[52] = 0.00000000 |
| w[53] = 0.00000000 |
| w[54] = 0.00000000 |
| w[55] = 0.00000000 |
| w[56] = 0.00000000 |
| w[57] = 0.00000000 |
| w[58] = 0.00000000 |
| w[59] = 0.00000000 |
| w[60] = 0.00000000 |
| w[61] = 0.00000000 |
| w[62] = 0.00000000 |
| w[63] = 0.00000000 |
| w[64] = 0.00000000 |
| w[65] = 0.00000000 |
| w[66] = 0.00000000 |
| w[67] = 0.00000000 |
| w[68] = 0.00000000 |
| w[69] = 0.00000000 |
| w[70] = 0.00000000 |
| w[71] = 0.00000000 |
| w[72] = 0.00000000 |
| w[73] = 0.00000000 |
| w[74] = 0.00000000 |
| w[75] = 0.00000000 |
| w[76] = 0.00000000 |
| w[77] = 0.00000000 |

TABLE 4-continued (window coefficients w(n); N = 1024)

w[78] = 0.00000000
w[79] = 0.00000000
w[80] = 0.00000000
w[81] = 0.00000000
w[82] = 0.00000000
w[83] = 0.00000000
w[84] = 0.00000000
w[85] = 0.00000000
w[86] = 0.00000000
w[87] = 0.00000000
w[88] = 0.00000000
w[89] = 0.00000000
w[90] = 0.00000000
w[91] = 0.00000000
w[92] = 0.00000000
w[93] = 0.00000000
w[94] = 0.00000000
w[95] = 0.00000000
w[96] = 0.00000000
w[97] = 0.00000000
w[98] = 0.00000000
w[99] = 0.00000000
w[100] = 0.00000000
w[101] = 0.00000000
w[102] = 0.00000000
w[103] = 0.00000000
w[104] = 0.00000000
w[105] = 0.00000000
w[106] = 0.00000000
w[107] = 0.00000000
w[108] = 0.00000000
w[109] = 0.00000000
w[110] = 0.00000000
w[111] = 0.00000000
w[112] = 0.00000000
w[113] = 0.00000000
w[114] = 0.00000000
w[115] = 0.00000000
w[116] = 0.00000000
w[117] = 0.00000000
w[118] = 0.00000000
w[119] = 0.00000000
w[120] = 0.00000000
w[121] = 0.00000000
w[122] = 0.00000000
w[123] = 0.00000000
w[124] = 0.00000000
w[125] = 0.00000000
w[126] = 0.00000000
w[127] = 0.00000000
w[128] = 0.00338834
w[129] = 0.00567745
w[130] = 0.00847677
w[131] = 0.01172641
w[132] = 0.01532555
w[133] = 0.01917664
w[134] = 0.02318809
w[135] = 0.02729259
w[136] = 0.03144503
w[137] = 0.03560261
w[138] = 0.03972499
w[139] = 0.04379783
w[140] = 0.04783094
w[141] = 0.05183357
w[142] = 0.05581342
w[143] = 0.05977723
w[144] = 0.06373173
w[145] = 0.06768364
w[146] = 0.07163937
w[147] = 0.07559976
w[148] = 0.07956096
w[149] = 0.08352024
w[150] = 0.08747623
w[151] = 0.09143035
w[152] = 0.09538618
w[153] = 0.09934771
w[154] = 0.10331917
w[155] = 0.10730456

TABLE 4-continued (window coefficients w(n); N = 1024)

w[156] = 0.11130697
w[157] = 0.11532867
w[158] = 0.11937133
w[159] = 0.12343922
w[160] = 0.12753911
w[161] = 0.13167705
w[162] = 0.13585812
w[163] = 0.14008529
w[164] = 0.14435986
w[165] = 0.14868291
w[166] = 0.15305531
w[167] = 0.15747594
w[168] = 0.16194193
w[169] = 0.16645070
w[170] = 0.17099991
w[171] = 0.17558633
w[172] = 0.18020600
w[173] = 0.18485548
w[174] = 0.18953191
w[175] = 0.19423322
w[176] = 0.19895800
w[177] = 0.20370512
w[178] = 0.20847374
w[179] = 0.21326312
w[180] = 0.21807244
w[181] = 0.22290083
w[182] = 0.22774742
w[183] = 0.23261210
w[184] = 0.23749542
w[185] = 0.24239767
w[186] = 0.24731889
w[187] = 0.25225887
w[188] = 0.25721719
w[189] = 0.26219330
w[190] = 0.26718648
w[191] = 0.27219630
w[192] = 0.27722262
w[193] = 0.28226514
w[194] = 0.28732336
w[195] = 0.29239628
w[196] = 0.29748247
w[197] = 0.30258055
w[198] = 0.30768914
w[199] = 0.31280508
w[200] = 0.31792385
w[201] = 0.32304172
w[202] = 0.32815579
w[203] = 0.33326397
w[204] = 0.33836470
w[205] = 0.34345661
w[206] = 0.34853868
w[207] = 0.35361188
w[208] = 0.35867865
w[209] = 0.36374072
w[210] = 0.36879900
w[211] = 0.37385347
w[212] = 0.37890349
w[213] = 0.38394836
w[214] = 0.38898730
w[215] = 0.39401912
w[216] = 0.39904236
w[217] = 0.40405575
w[218] = 0.40905820
w[219] = 0.41404819
w[220] = 0.41902398
w[221] = 0.42398423
w[222] = 0.42892805
w[223] = 0.43385441
w[224] = 0.43876210
w[225] = 0.44365014
w[226] = 0.44851786
w[227] = 0.45336632
w[228] = 0.45819759
w[229] = 0.46301302
w[230] = 0.46781309
w[231] = 0.47259722
w[232] = 0.47736435
w[233] = 0.48211365

TABLE 4-continued

| (window coefficients w(n); N = 1024) |
|---|
| w[234] = 0.48684450 |
| w[235] = 0.49155594 |
| w[236] = 0.49624679 |
| w[237] = 0.50091636 |
| w[238] = 0.50556440 |
| w[239] = 0.51019132 |
| w[240] = 0.51479771 |
| w[241] = 0.51938391 |
| w[242] = 0.52394998 |
| w[243] = 0.52849587 |
| w[244] = 0.53302151 |
| w[245] = 0.53752680 |
| w[246] = 0.54201160 |
| w[247] = 0.54647575 |
| w[248] = 0.55091916 |
| w[249] = 0.55534181 |
| w[250] = 0.55974376 |
| w[251] = 0.56412513 |
| w[252] = 0.56848615 |
| w[253] = 0.57282710 |
| w[254] = 0.57714834 |
| w[255] = 0.58145030 |
| w[256] = 0.58492489 |
| w[257] = 0.58918511 |
| w[258] = 0.59342326 |
| w[259] = 0.59763936 |
| w[260] = 0.60183347 |
| w[261] = 0.60600561 |
| w[262] = 0.61015581 |
| w[263] = 0.61428412 |
| w[264] = 0.61839056 |
| w[265] = 0.62247517 |
| w[266] = 0.62653799 |
| w[267] = 0.63057912 |
| w[268] = 0.63459872 |
| w[269] = 0.63859697 |
| w[270] = 0.64257403 |
| w[271] = 0.64653001 |
| w[272] = 0.65046495 |
| w[273] = 0.65437887 |
| w[274] = 0.65827181 |
| w[275] = 0.66214383 |
| w[276] = 0.66599499 |
| w[277] = 0.66982535 |
| w[278] = 0.67363499 |
| w[279] = 0.67742394 |
| w[280] = 0.68119219 |
| w[281] = 0.68493972 |
| w[282] = 0.68866653 |
| w[283] = 0.69237258 |
| w[284] = 0.69605778 |
| w[285] = 0.69972207 |
| w[286] = 0.70336537 |
| w[287] = 0.70698758 |
| w[288] = 0.71058862 |
| w[289] = 0.71416837 |
| w[290] = 0.71772674 |
| w[291] = 0.72126361 |
| w[292] = 0.72477889 |
| w[293] = 0.72827246 |
| w[294] = 0.73174419 |
| w[295] = 0.73519392 |
| w[296] = 0.73862141 |
| w[297] = 0.74202643 |
| w[298] = 0.74540874 |
| w[299] = 0.74876817 |
| w[300] = 0.75210458 |
| w[301] = 0.75541785 |
| w[302] = 0.75870785 |
| w[303] = 0.76197437 |
| w[304] = 0.76521709 |
| w[305] = 0.76843570 |
| w[306] = 0.77162988 |
| w[307] = 0.77479939 |
| w[308] = 0.77794403 |
| w[309] = 0.78106359 |
| w[310] = 0.78415789 |
| w[311] = 0.78722670 |

TABLE 4-continued

| (window coefficients w(n); N = 1024) |
|---|
| w[312] = 0.79026979 |
| w[313] = 0.79328694 |
| w[314] = 0.79627791 |
| w[315] = 0.79924244 |
| w[316] = 0.80218027 |
| w[317] = 0.80509112 |
| w[318] = 0.80797472 |
| w[319] = 0.81083081 |
| w[320] = 0.81365915 |
| w[321] = 0.81645949 |
| w[322] = 0.81923160 |
| w[323] = 0.82197528 |
| w[324] = 0.82469037 |
| w[325] = 0.82737673 |
| w[326] = 0.83003419 |
| w[327] = 0.83266262 |
| w[328] = 0.83526186 |
| w[329] = 0.83783176 |
| w[330] = 0.84037217 |
| w[331] = 0.84288297 |
| w[332] = 0.84536401 |
| w[333] = 0.84781517 |
| w[334] = 0.85023632 |
| w[335] = 0.85262739 |
| w[336] = 0.85498836 |
| w[337] = 0.85731921 |
| w[338] = 0.85961993 |
| w[339] = 0.86189052 |
| w[340] = 0.86413101 |
| w[341] = 0.86634140 |
| w[342] = 0.86852173 |
| w[343] = 0.87067211 |
| w[344] = 0.87279275 |
| w[345] = 0.87488384 |
| w[346] = 0.87694559 |
| w[347] = 0.87897824 |
| w[348] = 0.88098206 |
| w[349] = 0.88295729 |
| w[350] = 0.88490423 |
| w[351] = 0.88682332 |
| w[352] = 0.88871519 |
| w[353] = 0.89058048 |
| w[354] = 0.89241984 |
| w[355] = 0.89423391 |
| w[356] = 0.89602338 |
| w[357] = 0.89778893 |
| w[358] = 0.89953126 |
| w[359] = 0.90125142 |
| w[360] = 0.90295086 |
| w[361] = 0.90463104 |
| w[362] = 0.90629341 |
| w[363] = 0.90793946 |
| w[364] = 0.90957067 |
| w[365] = 0.91118856 |
| w[366] = 0.91279464 |
| w[367] = 0.91439073 |
| w[368] = 0.91597898 |
| w[369] = 0.91756153 |
| w[370] = 0.91914049 |
| w[371] = 0.92071690 |
| w[372] = 0.92229070 |
| w[373] = 0.92386182 |
| w[374] = 0.92542993 |
| w[375] = 0.92698946 |
| w[376] = 0.92852960 |
| w[377] = 0.93003929 |
| w[378] = 0.93150727 |
| w[379] = 0.93291739 |
| w[380] = 0.93424863 |
| w[381] = 0.93547974 |
| w[382] = 0.93658982 |
| w[383] = 0.93756587 |
| w[384] = 0.93894072 |
| w[385] = 0.93922780 |
| w[386] = 0.93955477 |
| w[387] = 0.93991290 |
| w[388] = 0.94029104 |
| w[389] = 0.94067794 |

TABLE 4-continued (window coefficients w(n); N = 1024)

w[390] = 0.94106258
w[391] = 0.94144084
w[392] = 0.94181549
w[393] = 0.94218963
w[394] = 0.94256628
w[395] = 0.94294662
w[396] = 0.94332998
w[397] = 0.94371562
w[398] = 0.94410280
w[399] = 0.94449122
w[400] = 0.94488106
w[401] = 0.94527249
w[402] = 0.94566568
w[403] = 0.94606074
w[404] = 0.94645772
w[405] = 0.94685665
w[406] = 0.94725759
w[407] = 0.94766054
w[408] = 0.94806547
w[409] = 0.94847234
w[410] = 0.94888115
w[411] = 0.94929190
w[412] = 0.94970469
w[413] = 0.95011960
w[414] = 0.95053672
w[415] = 0.95095604
w[416] = 0.95137751
w[417] = 0.95180105
w[418] = 0.95222658
w[419] = 0.95265413
w[420] = 0.95308380
w[421] = 0.95351571
w[422] = 0.95394994
w[423] = 0.95438653
w[424] = 0.95482538
w[425] = 0.95526643
w[426] = 0.95570958
w[427] = 0.95615486
w[428] = 0.95660234
w[429] = 0.95705214
w[430] = 0.95750433
w[431] = 0.95795892
w[432] = 0.95841582
w[433] = 0.95887493
w[434] = 0.95933616
w[435] = 0.95979949
w[436] = 0.96026500
w[437] = 0.96073277
w[438] = 0.96120286
w[439] = 0.96167526
w[440] = 0.96214986
w[441] = 0.96262655
w[442] = 0.96310522
w[443] = 0.96358586
w[444] = 0.96406853
w[445] = 0.96455330
w[446] = 0.96504026
w[447] = 0.96552936
w[448] = 0.96602051
w[449] = 0.96651360
w[450] = 0.96700850
w[451] = 0.96750520
w[452] = 0.96800376
w[453] = 0.96850424
w[454] = 0.96900670
w[455] = 0.96951112
w[456] = 0.97001738
w[457] = 0.97052533
w[458] = 0.97103488
w[459] = 0.97154597
w[460] = 0.97205867
w[461] = 0.97257304
w[462] = 0.97308915
w[463] = 0.97360694
w[464] = 0.97412631
w[465] = 0.97464711
w[466] = 0.97516923
w[467] = 0.97569262

TABLE 4-continued (window coefficients w(n); N = 1024)

w[468] = 0.97621735
w[469] = 0.97674350
w[470] = 0.97727111
w[471] = 0.97780016
w[472] = 0.97833051
w[473] = 0.97886205
w[474] = 0.97939463
w[475] = 0.97992823
w[476] = 0.98046291
w[477] = 0.98099875
w[478] = 0.98153580
w[479] = 0.98207405
w[480] = 0.98261337
w[481] = 0.98315364
w[482] = 0.98369474
w[483] = 0.98423664
w[484] = 0.98477941
w[485] = 0.98532311
w[486] = 0.98586780
w[487] = 0.98641348
w[488] = 0.98696003
w[489] = 0.98750734
w[490] = 0.98805530
w[491] = 0.98860389
w[492] = 0.98915320
w[493] = 0.98970328
w[494] = 0.99025423
w[495] = 0.99080602
w[496] = 0.99135855
w[497] = 0.99191171
w[498] = 0.99246541
w[499] = 0.99301962
w[500] = 0.99357443
w[501] = 0.99412992
w[502] = 0.99468617
w[503] = 0.99524320
w[504] = 0.99580092
w[505] = 0.99635926
w[506] = 0.99691814
w[507] = 0.99747748
w[508] = 0.99803721
w[509] = 0.99859725
w[510] = 0.99915752
w[511] = 0.99971793
w[512] = 1.00028215
w[513] = 1.00084319
w[514] = 1.00140472
w[515] = 1.00196665
w[516] = 1.00252889
w[517] = 1.00309139
w[518] = 1.00365404
w[519] = 1.00421679
w[520] = 1.00477954
w[521] = 1.00534221
w[522] = 1.00590474
w[523] = 1.00646713
w[524] = 1.00702945
w[525] = 1.00759179
w[526] = 1.00815424
w[527] = 1.00871678
w[528] = 1.00927930
w[529] = 1.00984169
w[530] = 1.01040384
w[531] = 1.01096575
w[532] = 1.01152747
w[533] = 1.01208910
w[534] = 1.01265070
w[535] = 1.01321226
w[536] = 1.01377365
w[537] = 1.01433478
w[538] = 1.01489551
w[539] = 1.01545584
w[540] = 1.01601582
w[541] = 1.01657553
w[542] = 1.01713502
w[543] = 1.01769427
w[544] = 1.01825316
w[545] = 1.01881154

TABLE 4-continued (window coefficients w(n); N = 1024)

w[546] = 1.01936929
w[547] = 1.01992639
w[548] = 1.02048289
w[549] = 1.02103888
w[550] = 1.02159441
w[551] = 1.02214945
w[552] = 1.02270387
w[553] = 1.02325751
w[554] = 1.02381025
w[555] = 1.02436204
w[556] = 1.02491295
w[557] = 1.02546304
w[558] = 1.02601238
w[559] = 1.02656092
w[560] = 1.02710853
w[561] = 1.02765508
w[562] = 1.02820041
w[563] = 1.02874449
w[564] = 1.02928737
w[565] = 1.02982913
w[566] = 1.03036981
w[567] = 1.03090937
w[568] = 1.03144768
w[569] = 1.03198460
w[570] = 1.03252000
w[571] = 1.03305384
w[572] = 1.03358617
w[573] = 1.03411707
w[574] = 1.03464659
w[575] = 1.03517470
w[576] = 1.03570128
w[577] = 1.03622620
w[578] = 1.03674934
w[579] = 1.03727066
w[580] = 1.03779024
w[581] = 1.03830815
w[582] = 1.03882446
w[583] = 1.03933914
w[584] = 1.03985206
w[585] = 1.04036312
w[586] = 1.04087217
w[587] = 1.04137920
w[588] = 1.04188428
w[589] = 1.04238748
w[590] = 1.04288888
w[591] = 1.04338845
w[592] = 1.04388610
w[593] = 1.04438170
w[594] = 1.04487515
w[595] = 1.04536645
w[596] = 1.04585569
w[597] = 1.04634297
w[598] = 1.04682838
w[599] = 1.04731192
w[600] = 1.04779350
w[601] = 1.04827303
w[602] = 1.04875042
w[603] = 1.04922568
w[604] = 1.04969891
w[605] = 1.05017022
w[606] = 1.05063974
w[607] = 1.05110746
w[608] = 1.05157332
w[609] = 1.05203721
w[610] = 1.05249907
w[611] = 1.05295889
w[612] = 1.05341676
w[613] = 1.05387277
w[614] = 1.05432700
w[615] = 1.05477948
w[616] = 1.05523018
w[617] = 1.05567906
w[618] = 1.05612608
w[619] = 1.05657124
w[620] = 1.05701459
w[621] = 1.05745616
w[622] = 1.05789601
w[623] = 1.05833426

TABLE 4-continued (window coefficients w(n); N = 1024)

w[624] = 1.05877109
w[625] = 1.05920669
w[626] = 1.05964125
w[627] = 1.06007444
w[628] = 1.06050542
w[629] = 1.06093335
w[630] = 1.06135746
w[631] = 1.06177909
w[632] = 1.06220164
w[633] = 1.06262858
w[634] = 1.06306309
w[635] = 1.06350050
w[636] = 1.06392837
w[637] = 1.06433391
w[638] = 1.06470443
w[639] = 1.06502996
w[640] = 1.06481076
w[641] = 1.06469765
w[642] = 1.06445004
w[643] = 1.06408002
w[644] = 1.06361382
w[645] = 1.06307719
w[646] = 1.06249453
w[647] = 1.06188365
w[648] = 1.06125612
w[649] = 1.06062291
w[650] = 1.05999418
w[651] = 1.05937132
w[652] = 1.05874726
w[653] = 1.05811486
w[654] = 1.05746728
w[655] = 1.05680000
w[656] = 1.05611070
w[657] = 1.05539715
w[658] = 1.05465735
w[659] = 1.05389329
w[660] = 1.05311083
w[661] = 1.05231578
w[662] = 1.05151372
w[663] = 1.05070811
w[664] = 1.04990044
w[665] = 1.04909210
w[666] = 1.04828434
w[667] = 1.04747647
w[668] = 1.04666590
w[669] = 1.04585003
w[670] = 1.04502628
w[671] = 1.04419009
w[672] = 1.04333499
w[673] = 1.04245452
w[674] = 1.04154244
w[675] = 1.04059452
w[676] = 1.03960846
w[677] = 1.03858207
w[678] = 1.03751326
w[679] = 1.03640189
w[680] = 1.03524976
w[681] = 1.03405868
w[682] = 1.03283047
w[683] = 1.03156812
w[684] = 1.03027574
w[685] = 1.02895743
w[686] = 1.02761717
w[687] = 1.02625804
w[688] = 1.02488222
w[689] = 1.02349184
w[690] = 1.02208892
w[691] = 1.02067450
w[692] = 1.01924861
w[693] = 1.01781123
w[694] = 1.01636229
w[695] = 1.01490045
w[696] = 1.01342315
w[697] = 1.01192778
w[698] = 1.01041175
w[699] = 1.00887284
w[700] = 1.00730915
w[701] = 1.00571882

TABLE 4-continued (window coefficients w(n); N = 1024)

w[702] = 1.00409996
w[703] = 1.00245032
w[704] = 1.00076734
w[705] = 0.99904842
w[706] = 0.99729101
w[707] = 0.99549380
w[708] = 0.99365664
w[709] = 0.99177946
w[710] = 0.98986234
w[711] = 0.98791024
w[712] = 0.98593294
w[713] = 0.98394037
w[714] = 0.98194226
w[715] = 0.97994532
w[716] = 0.97795324
w[717] = 0.97596955
w[718] = 0.97399748
w[719] = 0.97203326
w[720] = 0.97006624
w[721] = 0.96808546
w[722] = 0.96608018
w[723] = 0.96404416
w[724] = 0.96197556
w[725] = 0.95987276
w[726] = 0.95773420
w[727] = 0.95556018
w[728] = 0.95335291
w[729] = 0.95111462
w[730] = 0.94884764
w[731] = 0.94655663
w[732] = 0.94424858
w[733] = 0.94193055
w[734] = 0.93960953
w[735] = 0.93729154
w[736] = 0.93498157
w[737] = 0.93268456
w[738] = 0.93040503
w[739] = 0.92813771
w[740] = 0.92586755
w[741] = 0.92357910
w[742] = 0.92125731
w[743] = 0.91889642
w[744] = 0.91649998
w[745] = 0.91407191
w[746] = 0.91161623
w[747] = 0.90913975
w[748] = 0.90665202
w[749] = 0.90416271
w[750] = 0.90168115
w[751] = 0.89920934
w[752] = 0.89674189
w[753] = 0.89427312
w[754] = 0.89179743
w[755] = 0.88931147
w[756] = 0.88681415
w[757] = 0.88430445
w[758] = 0.88178141
w[759] = 0.87924528
w[760] = 0.87669753
w[761] = 0.87413966
w[762] = 0.87157318
w[763] = 0.86899958
w[764] = 0.86642037
w[765] = 0.86383703
w[766] = 0.86125106
w[767] = 0.85866393
w[768] = 0.85604236
w[769] = 0.85344385
w[770] = 0.85083093
w[771] = 0.84820550
w[772] = 0.84556943
w[773] = 0.84292458
w[774] = 0.84027278
w[775] = 0.83761586
w[776] = 0.83495565
w[777] = 0.83229393
w[778] = 0.82963243
w[779] = 0.82697135

TABLE 4-continued (window coefficients w(n); N = 1024)

w[780] = 0.82430933
w[781] = 0.82164496
w[782] = 0.81897669
w[783] = 0.81630017
w[784] = 0.81360822
w[785] = 0.81089355
w[786] = 0.80814924
w[787] = 0.80537741
w[788] = 0.80258920
w[789] = 0.79979611
w[790] = 0.79700954
w[791] = 0.79423813
w[792] = 0.79148780
w[793] = 0.78876432
w[794] = 0.78607290
w[795] = 0.78340590
w[796] = 0.78074288
w[797] = 0.77806279
w[798] = 0.77534514
w[799] = 0.77258187
w[800] = 0.76977737
w[801] = 0.76693654
w[802] = 0.76406441
w[803] = 0.76116851
w[804] = 0.75825892
w[805] = 0.75534582
w[806] = 0.75243924
w[807] = 0.74954634
w[808] = 0.74667135
w[809] = 0.74381840
w[810] = 0.74099145
w[811] = 0.73819147
w[812] = 0.73541641
w[813] = 0.73266408
w[814] = 0.72993193
w[815] = 0.72720913
w[816] = 0.72447661
w[817] = 0.72171494
w[818] = 0.71890515
w[819] = 0.71603932
w[820] = 0.71312056
w[821] = 0.71015250
w[822] = 0.70713900
w[823] = 0.70409084
w[824] = 0.70102565
w[825] = 0.69796137
w[826] = 0.69491556
w[827] = 0.69189772
w[828] = 0.68890931
w[829] = 0.68595141
w[830] = 0.68302498
w[831] = 0.68012852
w[832] = 0.67725801
w[833] = 0.67440936
w[834] = 0.67157841
w[835] = 0.66876081
w[836] = 0.66595195
w[837] = 0.66314722
w[838] = 0.66034194
w[839] = 0.65753027
w[840] = 0.65470525
w[841] = 0.65185984
w[842] = 0.64898709
w[843] = 0.64608214
w[844] = 0.64314221
w[845] = 0.64016460
w[846] = 0.63714680
w[847] = 0.63409034
w[848] = 0.63100082
w[849] = 0.62788400
w[850] = 0.62474577
w[851] = 0.62159473
w[852] = 0.61844225
w[853] = 0.61529977
w[854] = 0.61217866
w[855] = 0.60908811
w[856] = 0.60603510
w[857] = 0.60302654

TABLE 4-continued (window coefficients w(n); N = 1024)

w[858] = 0.60006916
w[859] = 0.59716588
w[860] = 0.59431580
w[861] = 0.59151787
w[862] = 0.58877068
w[863] = 0.58606495
w[864] = 0.58338353
w[865] = 0.58070891
w[866] = 0.57802356
w[867] = 0.57530864
w[868] = 0.57254404
w[869] = 0.56970958
w[870] = 0.56678577
w[871] = 0.56376860
w[872] = 0.56066951
w[873] = 0.55750064
w[874] = 0.55427451
w[875] = 0.55101301
w[876] = 0.54774732
w[877] = 0.54450907
w[878] = 0.54132936
w[879] = 0.53822744
w[880] = 0.53521072
w[881] = 0.53228613
w[882] = 0.52945979
w[883] = 0.52671997
w[884] = 0.52403708
w[885] = 0.52138072
w[886] = 0.51872085
w[887] = 0.51603570
w[888] = 0.51331170
w[889] = 0.51053560
w[890] = 0.50769466
w[891] = 0.50478931
w[892] = 0.50183308
w[893] = 0.49884001
w[894] = 0.49582406
w[895] = 0.49279905
w[896] = 0.48985748
w[897] = 0.48679641
w[898] = 0.48379429
w[899] = 0.48085363
w[900] = 0.47796576
w[901] = 0.47512151
w[902] = 0.47231151
w[903] = 0.46952402
w[904] = 0.46674486
w[905] = 0.46395979
w[906] = 0.46115496
w[907] = 0.45832607
w[908] = 0.45547830
w[909] = 0.45261727
w[910] = 0.44974866
w[911] = 0.44688011
w[912] = 0.44402125
w[913] = 0.44118178
w[914] = 0.43837094
w[915] = 0.43558772
w[916] = 0.43282082
w[917] = 0.43005847
w[918] = 0.42728913
w[919] = 0.42450572
w[920] = 0.42170567
w[921] = 0.41888658
w[922] = 0.41604633
w[923] = 0.41318897
w[924] = 0.41032472
w[925] = 0.40746405
w[926] = 0.40461724
w[927] = 0.40178943
w[928] = 0.39898066
w[929] = 0.39619073
w[930] = 0.39341940
w[931] = 0.39066519
w[932] = 0.38792536
w[933] = 0.38519713
w[934] = 0.38247773
w[935] = 0.37976476

TABLE 4-continued (window coefficients w(n); N = 1024)

w[936] = 0.37705620
w[937] = 0.37435006
w[938] = 0.37164438
w[939] = 0.36893869
w[940] = 0.36623396
w[941] = 0.36353124
w[942] = 0.36083153
w[943] = 0.35813533
w[944] = 0.35544262
w[945] = 0.35275338
w[946] = 0.35006755
w[947] = 0.34738530
w[948] = 0.34470699
w[949] = 0.34203296
w[950] = 0.33936359
w[951] = 0.33669923
w[952] = 0.33404027
w[953] = 0.33138711
w[954] = 0.32874013
w[955] = 0.32609944
w[956] = 0.32346493
w[957] = 0.32083645
w[958] = 0.31821388
w[959] = 0.31559703
w[960] = 0.31298573
w[961] = 0.31037987
w[962] = 0.30777941
w[963] = 0.30518446
w[964] = 0.30259525
w[965] = 0.30001202
w[966] = 0.29743499
w[967] = 0.29486428
w[968] = 0.29229989
w[969] = 0.28974179
w[970] = 0.28718997
w[971] = 0.28464452
w[972] = 0.28210562
w[973] = 0.27957346
w[974] = 0.27704820
w[975] = 0.27452992
w[976] = 0.27201854
w[977] = 0.26951399
w[978] = 0.26701622
w[979] = 0.26452533
w[980] = 0.26204158
w[981] = 0.25956526
w[982] = 0.25709662
w[983] = 0.25463583
w[984] = 0.25218294
w[985] = 0.24973798
w[986] = 0.24730100
w[987] = 0.24487207
w[988] = 0.24245133
w[989] = 0.24003893
w[990] = 0.23763500
w[991] = 0.23523959
w[992] = 0.23285262
w[993] = 0.23047401
w[994] = 0.22810369
w[995] = 0.22574170
w[996] = 0.22338818
w[997] = 0.22104329
w[998] = 0.21870719
w[999] = 0.21637986
w[1000] = 0.21406117
w[1001] = 0.21175095
w[1002] = 0.20944904
w[1003] = 0.20715535
w[1004] = 0.20486987
w[1005] = 0.20259261
w[1006] = 0.20032356
w[1007] = 0.19806259
w[1008] = 0.19580944
w[1009] = 0.19356385
w[1010] = 0.19132556
w[1011] = 0.18909442
w[1012] = 0.18687040
w[1013] = 0.18465350

TABLE 4-continued

| (window coefficients w(n); N = 1024) |
|---|
| w[1014] = 0.18244372 |
| w[1015] = 0.18024164 |
| w[1016] = 0.17804841 |
| w[1017] = 0.17586521 |
| w[1018] = 0.17369322 |
| w[1019] = 0.17153360 |
| w[1020] = 0.16938755 |
| w[1021] = 0.16725622 |
| w[1022] = 0.16514081 |
| w[1023] = 0.16304247 |
| w[1024] = 0.16098974 |
| w[1025] = 0.15896561 |
| w[1026] = 0.15696026 |
| w[1027] = 0.15497259 |
| w[1028] = 0.15300151 |
| w[1029] = 0.15104590 |
| w[1030] = 0.14910466 |
| w[1031] = 0.14717666 |
| w[1032] = 0.14526081 |
| w[1033] = 0.14335599 |
| w[1034] = 0.14146111 |
| w[1035] = 0.13957570 |
| w[1036] = 0.13769993 |
| w[1037] = 0.13583399 |
| w[1038] = 0.13397806 |
| w[1039] = 0.13213229 |
| w[1040] = 0.13029682 |
| w[1041] = 0.12847178 |
| w[1042] = 0.12665729 |
| w[1043] = 0.12485353 |
| w[1044] = 0.12306074 |
| w[1045] = 0.12127916 |
| w[1046] = 0.11950900 |
| w[1047] = 0.11775043 |
| w[1048] = 0.11600347 |
| w[1049] = 0.11426820 |
| w[1050] = 0.11254465 |
| w[1051] = 0.11083292 |
| w[1052] = 0.10913318 |
| w[1053] = 0.10744559 |
| w[1054] = 0.10577028 |
| w[1055] = 0.10410733 |
| w[1056] = 0.10245672 |
| w[1057] = 0.10081842 |
| w[1058] = 0.09919240 |
| w[1059] = 0.09757872 |
| w[1060] = 0.09597750 |
| w[1061] = 0.09438884 |
| w[1062] = 0.09281288 |
| w[1063] = 0.09124964 |
| w[1064] = 0.08969907 |
| w[1065] = 0.08816111 |
| w[1066] = 0.08663570 |
| w[1067] = 0.08512288 |
| w[1068] = 0.08362274 |
| w[1069] = 0.08213540 |
| w[1070] = 0.08066096 |
| w[1071] = 0.07919944 |
| w[1072] = 0.07775076 |
| w[1073] = 0.07631484 |
| w[1074] = 0.07489161 |
| w[1075] = 0.07348108 |
| w[1076] = 0.07208335 |
| w[1077] = 0.07069851 |
| w[1078] = 0.06932667 |
| w[1079] = 0.06796781 |
| w[1080] = 0.06662187 |
| w[1081] = 0.06528874 |
| w[1082] = 0.06396833 |
| w[1083] = 0.06266065 |
| w[1084] = 0.06136578 |
| w[1085] = 0.06008380 |
| w[1086] = 0.05881480 |
| w[1087] = 0.05755876 |
| w[1088] = 0.05631557 |
| w[1089] = 0.05508511 |
| w[1090] = 0.05386728 |
| w[1091] = 0.05266206 |

TABLE 4-continued

| (window coefficients w(n); N = 1024) |
|---|
| w[1092] = 0.05146951 |
| w[1093] = 0.05028971 |
| w[1094] = 0.04912272 |
| w[1095] = 0.04796855 |
| w[1096] = 0.04682709 |
| w[1097] = 0.04569825 |
| w[1098] = 0.04458194 |
| w[1099] = 0.04347817 |
| w[1100] = 0.04238704 |
| w[1101] = 0.04130868 |
| w[1102] = 0.04024318 |
| w[1103] = 0.03919056 |
| w[1104] = 0.03815071 |
| w[1105] = 0.03712352 |
| w[1106] = 0.03610890 |
| w[1107] = 0.03510679 |
| w[1108] = 0.03411720 |
| w[1109] = 0.03314013 |
| w[1110] = 0.03217560 |
| w[1111] = 0.03122343 |
| w[1112] = 0.03028332 |
| w[1113] = 0.02935494 |
| w[1114] = 0.02843799 |
| w[1115] = 0.02753230 |
| w[1116] = 0.02663788 |
| w[1117] = 0.02575472 |
| w[1118] = 0.02488283 |
| w[1119] = 0.02402232 |
| w[1120] = 0.02317341 |
| w[1121] = 0.02233631 |
| w[1122] = 0.02151124 |
| w[1123] = 0.02069866 |
| w[1124] = 0.01989922 |
| w[1125] = 0.01911359 |
| w[1126] = 0.01834241 |
| w[1127] = 0.01758563 |
| w[1128] = 0.01684248 |
| w[1129] = 0.01611219 |
| w[1130] = 0.01539398 |
| w[1131] = 0.01468726 |
| w[1132] = 0.01399167 |
| w[1133] = 0.01330687 |
| w[1134] = 0.01263250 |
| w[1135] = 0.01196871 |
| w[1136] = 0.01131609 |
| w[1137] = 0.01067527 |
| w[1138] = 0.01004684 |
| w[1139] = 0.00943077 |
| w[1140] = 0.00882641 |
| w[1141] = 0.00823307 |
| w[1142] = 0.00765011 |
| w[1143] = 0.00707735 |
| w[1144] = 0.00651513 |
| w[1145] = 0.00596377 |
| w[1146] = 0.00542364 |
| w[1147] = 0.00489514 |
| w[1148] = 0.00437884 |
| w[1149] = 0.00387530 |
| w[1150] = 0.00338509 |
| w[1151] = 0.00290795 |
| w[1152] = 0.00244282 |
| w[1153] = 0.00198860 |
| w[1154] = 0.00154417 |
| w[1155] = 0.00110825 |
| w[1156] = 0.00067934 |
| w[1157] = 0.00025589 |
| w[1158] = −0.00016357 |
| w[1159] = −0.00057897 |
| w[1160] = −0.00098865 |
| w[1161] = −0.00139089 |
| w[1162] = −0.00178397 |
| w[1163] = −0.00216547 |
| w[1164] = −0.00253230 |
| w[1165] = −0.00288133 |
| w[1166] = −0.00320955 |
| w[1167] = −0.00351626 |
| w[1168] = −0.00380315 |
| w[1169] = −0.00407198 |

TABLE 4-continued

| (window coefficients w(n); N = 1024) |
|---|
| w[1170] = −0.00432457 |
| w[1171] = −0.00456373 |
| w[1172] = −0.00479326 |
| w[1173] = −0.00501699 |
| w[1174] = −0.00523871 |
| w[1175] = −0.00546066 |
| w[1176] = −0.00568360 |
| w[1177] = −0.00590821 |
| w[1178] = −0.00613508 |
| w[1179] = −0.00636311 |
| w[1180] = −0.00658944 |
| w[1181] = −0.00681117 |
| w[1182] = −0.00702540 |
| w[1183] = −0.00722982 |
| w[1184] = −0.00742268 |
| w[1185] = −0.00760226 |
| w[1186] = −0.00776687 |
| w[1187] = −0.00791580 |
| w[1188] = −0.00804933 |
| w[1189] = −0.00816774 |
| w[1190] = −0.00827139 |
| w[1191] = −0.00836122 |
| w[1192] = −0.00843882 |
| w[1193] = −0.00850583 |
| w[1194] = −0.00856383 |
| w[1195] = −0.00861430 |
| w[1196] = −0.00865853 |
| w[1197] = −0.00869781 |
| w[1198] = −0.00873344 |
| w[1199] = −0.00876633 |
| w[1200] = −0.00879707 |
| w[1201] = −0.00882622 |
| w[1202] = −0.00885433 |
| w[1203] = −0.00888132 |
| w[1204] = −0.00890652 |
| w[1205] = −0.00892925 |
| w[1206] = −0.00894881 |
| w[1207] = −0.00896446 |
| w[1208] = −0.00897541 |
| w[1209] = −0.00898088 |
| w[1210] = −0.00898010 |
| w[1211] = −0.00897234 |
| w[1212] = −0.00895696 |
| w[1213] = −0.00893330 |
| w[1214] = −0.00890076 |
| w[1215] = −0.00885914 |
| w[1216] = −0.00880875 |
| w[1217] = −0.00874987 |
| w[1218] = −0.00868282 |
| w[1219] = −0.00860825 |
| w[1220] = −0.00852716 |
| w[1221] = −0.00844055 |
| w[1222] = −0.00834941 |
| w[1223] = −0.00825485 |
| w[1224] = −0.00815807 |
| w[1225] = −0.00806025 |
| w[1226] = −0.00796253 |
| w[1227] = −0.00786519 |
| w[1228] = −0.00776767 |
| w[1229] = −0.00766937 |
| w[1230] = −0.00756971 |
| w[1231] = −0.00746790 |
| w[1232] = −0.00736305 |
| w[1233] = −0.00725422 |
| w[1234] = −0.00714055 |
| w[1235] = −0.00702161 |
| w[1236] = −0.00689746 |
| w[1237] = −0.00676816 |
| w[1238] = −0.00663381 |
| w[1239] = −0.00649489 |
| w[1240] = −0.00635230 |
| w[1241] = −0.00620694 |
| w[1242] = −0.00605969 |
| w[1243] = −0.00591116 |
| w[1244] = −0.00576167 |
| w[1245] = −0.00561155 |
| w[1246] = −0.00546110 |
| w[1247] = −0.00531037 |

TABLE 4-continued

| (window coefficients w(n); N = 1024) |
|---|
| w[1248] = −0.00515917 |
| w[1249] = −0.00500732 |
| w[1250] = −0.00485462 |
| w[1251] = −0.00470075 |
| w[1252] = −0.00454530 |
| w[1253] = −0.00438786 |
| w[1254] = −0.00422805 |
| w[1255] = −0.00406594 |
| w[1256] = −0.00390204 |
| w[1257] = −0.00373686 |
| w[1258] = −0.00357091 |
| w[1259] = −0.00340448 |
| w[1260] = −0.00323770 |
| w[1261] = −0.00307066 |
| w[1262] = −0.00290344 |
| w[1263] = −0.00273610 |
| w[1264] = −0.00256867 |
| w[1265] = −0.00240117 |
| w[1266] = −0.00223365 |
| w[1267] = −0.00206614 |
| w[1268] = −0.00189866 |
| w[1269] = −0.00173123 |
| w[1270] = −0.00156390 |
| w[1271] = −0.00139674 |
| w[1272] = −0.00122989 |
| w[1273] = −0.00106351 |
| w[1274] = −0.00089772 |
| w[1275] = −0.00073267 |
| w[1276] = −0.00056849 |
| w[1277] = −0.00040530 |
| w[1278] = −0.00024324 |
| w[1279] = −0.00008241 |
| w[1280] = 0.00008214 |
| w[1281] = 0.00024102 |
| w[1282] = 0.00039922 |
| w[1283] = 0.00055660 |
| w[1284] = 0.00071299 |
| w[1285] = 0.00086826 |
| w[1286] = 0.00102224 |
| w[1287] = 0.00117480 |
| w[1288] = 0.00132579 |
| w[1289] = 0.00147507 |
| w[1290] = 0.00162252 |
| w[1291] = 0.00176804 |
| w[1292] = 0.00191161 |
| w[1293] = 0.00205319 |
| w[1294] = 0.00219277 |
| w[1295] = 0.00233029 |
| w[1296] = 0.00246567 |
| w[1297] = 0.00259886 |
| w[1298] = 0.00272975 |
| w[1299] = 0.00285832 |
| w[1300] = 0.00298453 |
| w[1301] = 0.00310839 |
| w[1302] = 0.00322990 |
| w[1303] = 0.00334886 |
| w[1304] = 0.00346494 |
| w[1305] = 0.00357778 |
| w[1306] = 0.00368706 |
| w[1307] = 0.00379273 |
| w[1308] = 0.00389501 |
| w[1309] = 0.00399411 |
| w[1310] = 0.00409020 |
| w[1311] = 0.00418350 |
| w[1312] = 0.00427419 |
| w[1313] = 0.00436249 |
| w[1314] = 0.00444858 |
| w[1315] = 0.00453250 |
| w[1316] = 0.00461411 |
| w[1317] = 0.00469328 |
| w[1318] = 0.00476988 |
| w[1319] = 0.00484356 |
| w[1320] = 0.00491375 |
| w[1321] = 0.00497987 |
| w[1322] = 0.00504139 |
| w[1323] = 0.00509806 |
| w[1324] = 0.00514990 |
| w[1325] = 0.00519693 |

TABLE 4-continued (window coefficients w(n); N = 1024)

w[1326] = 0.00523920
w[1327] = 0.00527700
w[1328] = 0.00531083
w[1329] = 0.00534122
w[1330] = 0.00536864
w[1331] = 0.00539357
w[1332] = 0.00541649
w[1333] = 0.00543785
w[1334] = 0.00545809
w[1335] = 0.00547713
w[1336] = 0.00549441
w[1337] = 0.00550936
w[1338] = 0.00552146
w[1339] = 0.00553017
w[1340] = 0.00553494
w[1341] = 0.00553524
w[1342] = 0.00553058
w[1343] = 0.00552066
w[1344] = 0.00550536
w[1345] = 0.00548459
w[1346] = 0.00545828
w[1347] = 0.00542662
w[1348] = 0.00539007
w[1349] = 0.00534910
w[1350] = 0.00530415
w[1351] = 0.00525568
w[1352] = 0.00520418
w[1353] = 0.00515009
w[1354] = 0.00509387
w[1355] = 0.00503595
w[1356] = 0.00497674
w[1357] = 0.00491665
w[1358] = 0.00485605
w[1359] = 0.00479503
w[1360] = 0.00473336
w[1361] = 0.00467082
w[1362] = 0.00460721
w[1363] = 0.00454216
w[1364] = 0.00447517
w[1365] = 0.00440575
w[1366] = 0.00433344
w[1367] = 0.00425768
w[1368] = 0.00417786
w[1369] = 0.00409336
w[1370] = 0.00400363
w[1371] = 0.00390837
w[1372] = 0.00380759
w[1373] = 0.00370130
w[1374] = 0.00358952
w[1375] = 0.00347268
w[1376] = 0.00335157
w[1377] = 0.00322699
w[1378] = 0.00309975
w[1379] = 0.00297088
w[1380] = 0.00284164
w[1381] = 0.00271328
w[1382] = 0.00258700
w[1383] = 0.00246328
w[1384] = 0.00234195
w[1385] = 0.00222281
w[1386] = 0.00210562
w[1387] = 0.00198958
w[1388] = 0.00187331
w[1389] = 0.00175546
w[1390] = 0.00163474
w[1391] = 0.00151020
w[1392] = 0.00138130
w[1393] = 0.00124750
w[1394] = 0.00110831
w[1395] = 0.00096411
w[1396] = 0.00081611
w[1397] = 0.00066554
w[1398] = 0.00051363
w[1399] = 0.00036134
w[1400] = 0.00020940
w[1401] = 0.00005853
w[1402] = −0.00009058
w[1403] = −0.00023783

TABLE 4-continued (window coefficients w(n); N = 1024)

w[1404] = −0.00038368
w[1405] = −0.00052861
w[1406] = −0.00067310
w[1407] = −0.00081757
w[1408] = −0.00096237
w[1409] = −0.00110786
w[1410] = −0.00125442
w[1411] = −0.00140210
w[1412] = −0.00155065
w[1413] = −0.00169984
w[1414] = −0.00184940
w[1415] = −0.00199911
w[1416] = −0.00214872
w[1417] = −0.00229798
w[1418] = −0.00244664
w[1419] = −0.00259462
w[1420] = −0.00274205
w[1421] = −0.00288912
w[1422] = −0.00303596
w[1423] = −0.00318259
w[1424] = −0.00332890
w[1425] = −0.00347480
w[1426] = −0.00362024
w[1427] = −0.00376519
w[1428] = −0.00390962
w[1429] = −0.00405345
w[1430] = −0.00419658
w[1431] = −0.00433902
w[1432] = −0.00448085
w[1433] = −0.00462219
w[1434] = −0.00476309
w[1435] = −0.00490357
w[1436] = −0.00504361
w[1437] = −0.00518321
w[1438] = −0.00532243
w[1439] = −0.00546132
w[1440] = −0.00559988
w[1441] = −0.00573811
w[1442] = −0.00587602
w[1443] = −0.00601363
w[1444] = −0.00615094
w[1445] = −0.00628795
w[1446] = −0.00642466
w[1447] = −0.00656111
w[1448] = −0.00669737
w[1449] = −0.00683352
w[1450] = −0.00696963
w[1451] = −0.00710578
w[1452] = −0.00724208
w[1453] = −0.00737862
w[1454] = −0.00751554
w[1455] = −0.00765295
w[1456] = −0.00779098
w[1457] = −0.00792976
w[1458] = −0.00806941
w[1459] = −0.00821006
w[1460] = −0.00835183
w[1461] = −0.00849485
w[1462] = −0.00863926
w[1463] = −0.00878522
w[1464] = −0.00893293
w[1465] = −0.00908260
w[1466] = −0.00923444
w[1467] = −0.00938864
w[1468] = −0.00954537
w[1469] = −0.00970482
w[1470] = −0.00986715
w[1471] = −0.01003173
w[1472] = −0.01019711
w[1473] = −0.01036164
w[1474] = −0.01052357
w[1475] = −0.01068184
w[1476] = −0.01083622
w[1477] = −0.01098652
w[1478] = −0.01113252
w[1479] = −0.01127409
w[1480] = −0.01141114
w[1481] = −0.01154358

TABLE 4-continued (window coefficients w(n); N = 1024)

w[1482] = −0.01167135
w[1483] = −0.01179439
w[1484] = −0.01191268
w[1485] = −0.01202619
w[1486] = −0.01213493
w[1487] = −0.01223891
w[1488] = −0.01233817
w[1489] = −0.01243275
w[1490] = −0.01252272
w[1491] = −0.01260815
w[1492] = −0.01268915
w[1493] = −0.01276583
w[1494] = −0.01283832
w[1495] = −0.01290685
w[1496] = −0.01297171
w[1497] = −0.01303320
w[1498] = −0.01309168
w[1499] = −0.01314722
w[1500] = −0.01319969
w[1501] = −0.01324889
w[1502] = −0.01329466
w[1503] = −0.01333693
w[1504] = −0.01337577
w[1505] = −0.01341125
w[1506] = −0.01344345
w[1507] = −0.01347243
w[1508] = −0.01349823
w[1509] = −0.01352089
w[1510] = −0.01354045
w[1511] = −0.01355700
w[1512] = −0.01357068
w[1513] = −0.01358164
w[1514] = −0.01359003
w[1515] = −0.01359587
w[1516] = −0.01359901
w[1517] = −0.01359931
w[1518] = −0.01359661
w[1519] = −0.01359087
w[1520] = −0.01358219
w[1521] = −0.01357065
w[1522] = −0.01355637
w[1523] = −0.01353935
w[1524] = −0.01351949
w[1525] = −0.01349670
w[1526] = −0.01347088
w[1527] = −0.01344214
w[1528] = −0.01341078
w[1529] = −0.01337715
w[1530] = −0.01334158
w[1531] = −0.01330442
w[1532] = −0.01326601
w[1533] = −0.01322671
w[1534] = −0.01318689
w[1535] = −0.01314692
w[1536] = −0.01310123
w[1537] = −0.01306470
w[1538] = −0.01302556
w[1539] = −0.01298381
w[1540] = −0.01293948
w[1541] = −0.01289255
w[1542] = −0.01284305
w[1543] = −0.01279095
w[1544] = −0.01273625
w[1545] = −0.01267893
w[1546] = −0.01261897
w[1547] = −0.01255632
w[1548] = −0.01249096
w[1549] = −0.01242283
w[1550] = −0.01235190
w[1551] = −0.01227827
w[1552] = −0.01220213
w[1553] = −0.01212366
w[1554] = −0.01204304
w[1555] = −0.01196032
w[1556] = −0.01187543
w[1557] = −0.01178829
w[1558] = −0.01169884
w[1559] = −0.01160718

TABLE 4-continued (window coefficients w(n); N = 1024)

w[1560] = −0.01151352
w[1561] = −0.01141809
w[1562] = −0.01132111
w[1563] = −0.01122272
w[1564] = −0.01112304
w[1565] = −0.01102217
w[1566] = −0.01092022
w[1567] = −0.01081730
w[1568] = −0.01071355
w[1569] = −0.01060912
w[1570] = −0.01050411
w[1571] = −0.01039854
w[1572] = −0.01029227
w[1573] = −0.01018521
w[1574] = −0.01007727
w[1575] = −0.00996859
w[1576] = −0.00985959
w[1577] = −0.00975063
w[1578] = −0.00964208
w[1579] = −0.00953420
w[1580] = −0.00942723
w[1581] = −0.00932135
w[1582] = −0.00921677
w[1583] = −0.00911364
w[1584] = −0.00901208
w[1585] = −0.00891220
w[1586] = −0.00881412
w[1587] = −0.00871792
w[1588] = −0.00862369
w[1589] = −0.00853153
w[1590] = −0.00844149
w[1591] = −0.00835360
w[1592] = −0.00826785
w[1593] = −0.00818422
w[1594] = −0.00810267
w[1595] = −0.00802312
w[1596] = −0.00794547
w[1597] = −0.00786959
w[1598] = −0.00779533
w[1599] = −0.00772165
w[1600] = −0.00764673
w[1601] = −0.00756886
w[1602] = −0.00748649
w[1603] = −0.00739905
w[1604] = −0.00730681
w[1605] = −0.00721006
w[1606] = −0.00710910
w[1607] = −0.00700419
w[1608] = −0.00689559
w[1609] = −0.00678354
w[1610] = −0.00666829
w[1611] = −0.00655007
w[1612] = −0.00642916
w[1613] = −0.00630579
w[1614] = −0.00618022
w[1615] = −0.00605267
w[1616] = −0.00592333
w[1617] = −0.00579240
w[1618] = −0.00566006
w[1619] = −0.00552651
w[1620] = −0.00539194
w[1621] = −0.00525653
w[1622] = −0.00512047
w[1623] = −0.00498390
w[1624] = −0.00484693
w[1625] = −0.00470969
w[1626] = −0.00457228
w[1627] = −0.00443482
w[1628] = −0.00429746
w[1629] = −0.00416034
w[1630] = −0.00402359
w[1631] = −0.00388738
w[1632] = −0.00375185
w[1633] = −0.00361718
w[1634] = −0.00348350
w[1635] = −0.00335100
w[1636] = −0.00321991
w[1637] = −0.00309043

TABLE 4-continued (window coefficients w(n); N = 1024)

w[1638] = −0.00296276
w[1639] = −0.00283698
w[1640] = −0.00271307
w[1641] = −0.00259098
w[1642] = −0.00247066
w[1643] = −0.00235210
w[1644] = −0.00223531
w[1645] = −0.00212030
w[1646] = −0.00200709
w[1647] = −0.00189576
w[1648] = −0.00178647
w[1649] = −0.00167936
w[1650] = −0.00157457
w[1651] = −0.00147216
w[1652] = −0.00137205
w[1653] = −0.00127418
w[1654] = −0.00117849
w[1655] = −0.00108498
w[1656] = −0.00099375
w[1657] = −0.00090486
w[1658] = −0.00081840
w[1659] = −0.00073444
w[1660] = −0.00065309
w[1661] = −0.00057445
w[1662] = −0.00049860
w[1663] = −0.00042551
w[1664] = −0.00035503
w[1665] = −0.00028700
w[1666] = −0.00022125
w[1667] = −0.00015761
w[1668] = −0.00009588
w[1669] = −0.00003583
w[1670] = 0.00002272
w[1671] = 0.00007975
w[1672] = 0.00013501
w[1673] = 0.00018828
w[1674] = 0.00023933
w[1675] = 0.00028784
w[1676] = 0.00033342
w[1677] = 0.00037572
w[1678] = 0.00041438
w[1679] = 0.00044939
w[1680] = 0.00048103
w[1681] = 0.00050958
w[1682] = 0.00053533
w[1683] = 0.00055869
w[1684] = 0.00058015
w[1685] = 0.00060022
w[1686] = 0.00061935
w[1687] = 0.00063781
w[1688] = 0.00065568
w[1689] = 0.00067303
w[1690] = 0.00068991
w[1691] = 0.00070619
w[1692] = 0.00072155
w[1693] = 0.00073567
w[1694] = 0.00074826
w[1695] = 0.00075912
w[1696] = 0.00076811
w[1697] = 0.00077509
w[1698] = 0.00077997
w[1699] = 0.00078275
w[1700] = 0.00078351
w[1701] = 0.00078237
w[1702] = 0.00077943
w[1703] = 0.00077484
w[1704] = 0.00076884
w[1705] = 0.00076160
w[1706] = 0.00075335
w[1707] = 0.00074423
w[1708] = 0.00073442
w[1709] = 0.00072404
w[1710] = 0.00071323
w[1711] = 0.00070209
w[1712] = 0.00069068
w[1713] = 0.00067906
w[1714] = 0.00066728
w[1715] = 0.00065534

TABLE 4-continued (window coefficients w(n); N = 1024)

w[1716] = 0.00064321
w[1717] = 0.00063086
w[1718] = 0.00061824
w[1719] = 0.00060534
w[1720] = 0.00059211
w[1721] = 0.00057855
w[1722] = 0.00056462
w[1723] = 0.00055033
w[1724] = 0.00053566
w[1725] = 0.00052063
w[1726] = 0.00050522
w[1727] = 0.00048949
w[1728] = 0.00047349
w[1729] = 0.00045728
w[1730] = 0.00044092
w[1731] = 0.00042447
w[1732] = 0.00040803
w[1733] = 0.00039166
w[1734] = 0.00037544
w[1735] = 0.00035943
w[1736] = 0.00034371
w[1737] = 0.00032833
w[1738] = 0.00031333
w[1739] = 0.00029874
w[1740] = 0.00028452
w[1741] = 0.00027067
w[1742] = 0.00025715
w[1743] = 0.00024395
w[1744] = 0.00023104
w[1745] = 0.00021842
w[1746] = 0.00020606
w[1747] = 0.00019398
w[1748] = 0.00018218
w[1749] = 0.00017069
w[1750] = 0.00015953
w[1751] = 0.00014871
w[1752] = 0.00013827
w[1753] = 0.00012823
w[1754] = 0.00011861
w[1755] = 0.00010942
w[1756] = 0.00010067
w[1757] = 0.00009236
w[1758] = 0.00008448
w[1759] = 0.00007703
w[1760] = 0.00006999
w[1761] = 0.00006337
w[1762] = 0.00005714
w[1763] = 0.00005129
w[1764] = 0.00004583
w[1765] = 0.00004072
w[1766] = 0.00003597
w[1767] = 0.00003157
w[1768] = 0.00002752
w[1769] = 0.00002380
w[1770] = 0.00002042
w[1771] = 0.00001736
w[1772] = 0.00001461
w[1773] = 0.00001215
w[1774] = 0.00000998
w[1775] = 0.00000807
w[1776] = 0.00000641
w[1777] = 0.00000499
w[1778] = 0.00000378
w[1779] = 0.00000278
w[1780] = 0.00000196
w[1781] = 0.00000132
w[1782] = 0.00000082
w[1783] = 0.00000046
w[1784] = 0.00000020
w[1785] = 0.00000005
w[1786] = −0.00000003
w[1787] = −0.00000006
w[1788] = −0.00000004
w[1789] = −0.00000001
w[1790] = 0.00000001
w[1791] = 0.00000001
w[1792] = 0.00000001
w[1793] = 0.00000001

TABLE 4-continued (window coefficients w(n); N = 1024)

w[1794] = −0.00000001
w[1795] = −0.00000004
w[1796] = −0.00000005
w[1797] = −0.00000003
w[1798] = 0.00000005
w[1799] = 0.00000020
w[1800] = 0.00000043
w[1801] = 0.00000077
w[1802] = 0.00000123
w[1803] = 0.00000183
w[1804] = 0.00000257
w[1805] = 0.00000348
w[1806] = 0.00000455
w[1807] = 0.00000581
w[1808] = 0.00000727
w[1809] = 0.00000893
w[1810] = 0.00001080
w[1811] = 0.00001290
w[1812] = 0.00001522
w[1813] = 0.00001778
w[1814] = 0.00002057
w[1815] = 0.00002362
w[1816] = 0.00002691
w[1817] = 0.00003044
w[1818] = 0.00003422
w[1819] = 0.00003824
w[1820] = 0.00004250
w[1821] = 0.00004701
w[1822] = 0.00005176
w[1823] = 0.00005676
w[1824] = 0.00006200
w[1825] = 0.00006749
w[1826] = 0.00007322
w[1827] = 0.00007920
w[1828] = 0.00008541
w[1829] = 0.00009186
w[1830] = 0.00009854
w[1831] = 0.00010543
w[1832] = 0.00011251
w[1833] = 0.00011975
w[1834] = 0.00012714
w[1835] = 0.00013465
w[1836] = 0.00014227
w[1837] = 0.00014997
w[1838] = 0.00015775
w[1839] = 0.00016558
w[1840] = 0.00017348
w[1841] = 0.00018144
w[1842] = 0.00018947
w[1843] = 0.00019756
w[1844] = 0.00020573
w[1845] = 0.00021399
w[1846] = 0.00022233
w[1847] = 0.00023076
w[1848] = 0.00023924
w[1849] = 0.00024773
w[1850] = 0.00025621
w[1851] = 0.00026462
w[1852] = 0.00027293
w[1853] = 0.00028108
w[1854] = 0.00028904
w[1855] = 0.00029675
w[1856] = 0.00030419
w[1857] = 0.00031132
w[1858] = 0.00031810
w[1859] = 0.00032453
w[1860] = 0.00033061
w[1861] = 0.00033633
w[1862] = 0.00034169
w[1863] = 0.00034672
w[1864] = 0.00035142
w[1865] = 0.00035580
w[1866] = 0.00035988
w[1867] = 0.00036369
w[1868] = 0.00036723
w[1869] = 0.00037053
w[1870] = 0.00037361
w[1871] = 0.00037647

TABLE 4-continued (window coefficients w(n); N = 1024)

w[1872] = 0.00037909
w[1873] = 0.00038145
w[1874] = 0.00038352
w[1875] = 0.00038527
w[1876] = 0.00038663
w[1877] = 0.00038757
w[1878] = 0.00038801
w[1879] = 0.00038790
w[1880] = 0.00038717
w[1881] = 0.00038572
w[1882] = 0.00038350
w[1883] = 0.00038044
w[1884] = 0.00037651
w[1885] = 0.00037170
w[1886] = 0.00036597
w[1887] = 0.00035936
w[1888] = 0.00035191
w[1889] = 0.00034370
w[1890] = 0.00033480
w[1891] = 0.00032531
w[1892] = 0.00031537
w[1893] = 0.00030512
w[1894] = 0.00029470
w[1895] = 0.00028417
w[1896] = 0.00027354
w[1897] = 0.00026279
w[1898] = 0.00025191
w[1899] = 0.00024081
w[1900] = 0.00022933
w[1901] = 0.00021731
w[1902] = 0.00020458
w[1903] = 0.00019101
w[1904] = 0.00017654
w[1905] = 0.00016106
w[1906] = 0.00014452
w[1907] = 0.00012694
w[1908] = 0.00010848
w[1909] = 0.00008929
w[1910] = 0.00006953
w[1911] = 0.00004935
w[1912] = 0.00002884
w[1913] = 0.00000813
w[1914] = −0.00001268
w[1915] = −0.00003357
w[1916] = −0.00005457
w[1917] = −0.00007574
w[1918] = −0.00009714
w[1919] = −0.00011882
w[1920] = −0.00014082
w[1921] = −0.00016318
w[1922] = −0.00018595
w[1923] = −0.00020912
w[1924] = −0.00023265
w[1925] = −0.00025650
w[1926] = −0.00028060
w[1927] = −0.00030492
w[1928] = −0.00032941
w[1929] = −0.00035400
w[1930] = −0.00037865
w[1931] = −0.00040333
w[1932] = −0.00042804
w[1933] = −0.00045279
w[1934] = −0.00047759
w[1935] = −0.00050243
w[1936] = −0.00052728
w[1937] = −0.00055209
w[1938] = −0.00057685
w[1939] = −0.00060153
w[1940] = −0.00062611
w[1941] = −0.00065056
w[1942] = −0.00067485
w[1943] = −0.00069895
w[1944] = −0.00072287
w[1945] = −0.00074660
w[1946] = −0.00077013
w[1947] = −0.00079345
w[1948] = −0.00081653
w[1949] = −0.00083936

TABLE 4-continued

| (window coefficients w(n); N = 1024) |
|---|
| w[1950] = −0.00086192 |
| w[1951] = −0.00088421 |
| w[1952] = −0.00090619 |
| w[1953] = −0.00092786 |
| w[1954] = −0.00094919 |
| w[1955] = −0.00097017 |
| w[1956] = −0.00099077 |
| w[1957] = −0.00101098 |
| w[1958] = −0.00103077 |
| w[1959] = −0.00105012 |
| w[1960] = −0.00106904 |
| w[1961] = −0.00108750 |
| w[1962] = −0.00110549 |
| w[1963] = −0.00112301 |
| w[1964] = −0.00114005 |
| w[1965] = −0.00115660 |
| w[1966] = −0.00117265 |
| w[1967] = −0.00118821 |
| w[1968] = −0.00120325 |
| w[1969] = −0.00121779 |
| w[1970] = −0.00123180 |
| w[1971] = −0.00124528 |
| w[1972] = −0.00125822 |
| w[1973] = −0.00127061 |
| w[1974] = −0.00128243 |
| w[1975] = −0.00129368 |
| w[1976] = −0.00130435 |
| w[1977] = −0.00131445 |
| w[1978] = −0.00132395 |
| w[1979] = −0.00133285 |
| w[1980] = −0.00134113 |
| w[1981] = −0.00134878 |
| w[1982] = −0.00135578 |
| w[1983] = −0.00136215 |
| w[1984] = −0.00136797 |
| w[1985] = −0.00137333 |
| w[1986] = −0.00137834 |
| w[1987] = −0.00138305 |
| w[1988] = −0.00138748 |
| w[1989] = −0.00139163 |
| w[1990] = −0.00139551 |
| w[1991] = −0.00139913 |
| w[1992] = −0.00140249 |
| w[1993] = −0.00140559 |
| w[1994] = −0.00140844 |
| w[1995] = −0.00141102 |
| w[1996] = −0.00141334 |
| w[1997] = −0.00141538 |
| w[1998] = −0.00141714 |
| w[1999] = −0.00141861 |
| w[2000] = −0.00141978 |
| w[2001] = −0.00142064 |
| w[2002] = −0.00142117 |
| w[2003] = −0.00142138 |
| w[2004] = −0.00142125 |
| w[2005] = −0.00142077 |
| w[2006] = −0.00141992 |
| w[2007] = −0.00141870 |
| w[2008] = −0.00141710 |
| w[2009] = −0.00141510 |
| w[2010] = −0.00141268 |
| w[2011] = −0.00140986 |
| w[2012] = −0.00140663 |
| w[2013] = −0.00140301 |
| w[2014] = −0.00139900 |
| w[2015] = −0.00139460 |
| w[2016] = −0.00138981 |
| w[2017] = −0.00138464 |
| w[2018] = −0.00137908 |
| w[2019] = −0.00137313 |
| w[2020] = −0.00136680 |
| w[2021] = −0.00136010 |
| w[2022] = −0.00135301 |
| w[2023] = −0.00134555 |
| w[2024] = −0.00133772 |
| w[2025] = −0.00132952 |
| w[2026] = −0.00132095 |
| w[2027] = −0.00131201 |

TABLE 4-continued

| (window coefficients w(n); N = 1024) |
|---|
| w[2028] = −0.00130272 |
| w[2029] = −0.00129307 |
| w[2030] = −0.00128309 |
| w[2031] = −0.00127277 |
| w[2032] = −0.00126211 |
| w[2033] = −0.00125113 |
| w[2034] = −0.00123981 |
| w[2035] = −0.00122817 |
| w[2036] = −0.00121622 |
| w[2037] = −0.00120397 |
| w[2038] = −0.00119141 |
| w[2039] = −0.00117859 |
| w[2040] = −0.00116552 |
| w[2041] = −0.00115223 |
| w[2042] = −0.00113877 |
| w[2043] = −0.00112517 |
| w[2044] = −0.00111144 |
| w[2045] = −0.00109764 |
| w[2046] = −0.00108377 |
| w[2047] = −0.00106989 |

TABLE 5

| (window coefficients w(n); M = 512) |
|---|
| −0.582 ≤ w[0] ≤ −0.580 |
| −0.578 ≤ w[1] ≤ −0.576 |
| −0.574 ≤ w[2] ≤ −0.572 |
| −0.569 ≤ w[3] ≤ −0.567 |
| −0.565 ≤ w[4] ≤ −0.563 |
| −0.561 ≤ w[5] ≤ −0.559 |
| −0.556 ≤ w[6] ≤ −0.554 |
| −0.552 ≤ w[7] ≤ −0.550 |
| −0.547 ≤ w[8] ≤ −0.545 |
| −0.543 ≤ w[9] ≤ −0.541 |
| −0.539 ≤ w[10] ≤ −0.537 |
| −0.534 ≤ w[11] ≤ −0.532 |
| −0.529 ≤ w[12] ≤ −0.527 |
| −0.525 ≤ w[13] ≤ −0.523 |
| −0.520 ≤ w[14] ≤ −0.518 |
| −0.516 ≤ w[15] ≤ −0.514 |
| −0.511 ≤ w[16] ≤ −0.509 |
| −0.507 ≤ w[17] ≤ −0.505 |
| −0.502 ≤ w[18] ≤ −0.500 |
| −0.497 ≤ w[19] ≤ −0.495 |
| −0.493 ≤ w[20] ≤ −0.491 |
| −0.488 ≤ w[21] ≤ −0.486 |
| −0.483 ≤ w[22] ≤ −0.481 |
| −0.478 ≤ w[23] ≤ −0.476 |
| −0.474 ≤ w[24] ≤ −0.472 |
| −0.469 ≤ w[25] ≤ −0.467 |
| −0.464 ≤ w[26] ≤ −0.462 |
| −0.459 ≤ w[27] ≤ −0.457 |
| −0.454 ≤ w[28] ≤ −0.452 |
| −0.450 ≤ w[29] ≤ −0.448 |
| −0.445 ≤ w[30] ≤ −0.443 |
| −0.440 ≤ w[31] ≤ −0.438 |
| −0.435 ≤ w[32] ≤ −0.433 |
| −0.430 ≤ w[33] ≤ −0.428 |
| −0.425 ≤ w[34] ≤ −0.423 |
| −0.420 ≤ w[35] ≤ −0.418 |
| −0.415 ≤ w[36] ≤ −0.413 |
| −0.410 ≤ w[37] ≤ −0.408 |
| −0.405 ≤ w[38] ≤ −0.403 |
| −0.400 ≤ w[39] ≤ −0.398 |
| −0.395 ≤ w[40] ≤ −0.393 |
| −0.390 ≤ w[41] ≤ −0.388 |
| −0.385 ≤ w[42] ≤ −0.383 |
| −0.380 ≤ w[43] ≤ −0.378 |
| −0.375 ≤ w[44] ≤ −0.373 |
| −0.370 ≤ w[45] ≤ −0.368 |
| −0.365 ≤ w[46] ≤ −0.363 |
| −0.360 ≤ w[47] ≤ −0.358 |
| −0.355 ≤ w[48] ≤ −0.353 |
| −0.350 ≤ w[49] ≤ −0.348 |

TABLE 5-continued

| (window coefficients w(n); M = 512) |
|---|
| $-0.344 \le w[50] \le -0.342$ |
| $-0.339 \le w[51] \le -0.337$ |
| $-0.334 \le w[52] \le -0.332$ |
| $-0.329 \le w[53] \le -0.327$ |
| $-0.324 \le w[54] \le -0.322$ |
| $-0.319 \le w[55] \le -0.317$ |
| $-0.314 \le w[56] \le -0.312$ |
| $-0.309 \le w[57] \le -0.307$ |
| $-0.304 \le w[58] \le -0.302$ |
| $-0.298 \le w[59] \le -0.296$ |
| $-0.293 \le w[60] \le -0.291$ |
| $-0.288 \le w[61] \le -0.286$ |
| $-0.283 \le w[62] \le -0.281$ |
| $-0.278 \le w[63] \le -0.276$ |
| $-0.273 \le w[64] \le -0.271$ |
| $-0.268 \le w[65] \le -0.266$ |
| $-0.263 \le w[66] \le -0.261$ |
| $-0.258 \le w[67] \le -0.256$ |
| $-0.253 \le w[68] \le -0.251$ |
| $-0.248 \le w[69] \le -0.246$ |
| $-0.243 \le w[70] \le -0.241$ |
| $-0.238 \le w[71] \le -0.236$ |
| $-0.234 \le w[72] \le -0.232$ |
| $-0.229 \le w[73] \le -0.227$ |
| $-0.224 \le w[74] \le -0.222$ |
| $-0.219 \le w[75] \le -0.217$ |
| $-0.214 \le w[76] \le -0.212$ |
| $-0.209 \le w[77] \le -0.207$ |
| $-0.205 \le w[78] \le -0.203$ |
| $-0.200 \le w[79] \le -0.198$ |
| $-0.195 \le w[80] \le -0.193$ |
| $-0.191 \le w[81] \le -0.189$ |
| $-0.186 \le w[82] \le -0.184$ |
| $-0.181 \le w[83] \le -0.179$ |
| $-0.177 \le w[84] \le -0.175$ |
| $-0.172 \le w[85] \le -0.170$ |
| $-0.167 \le w[86] \le -0.165$ |
| $-0.163 \le w[87] \le -0.161$ |
| $-0.158 \le w[88] \le -0.156$ |
| $-0.154 \le w[89] \le -0.152$ |
| $-0.150 \le w[90] \le -0.148$ |
| $-0.145 \le w[91] \le -0.143$ |
| $-0.141 \le w[92] \le -0.139$ |
| $-0.137 \le w[93] \le -0.135$ |
| $-0.133 \le w[94] \le -0.131$ |
| $-0.129 \le w[95] \le -0.127$ |
| $-0.124 \le w[96] \le -0.122$ |
| $-0.120 \le w[97] \le -0.118$ |
| $-0.116 \le w[98] \le -0.114$ |
| $-0.112 \le w[99] \le -0.110$ |
| $-0.108 \le w[100] \le -0.106$ |
| $-0.104 \le w[101] \le -0.102$ |
| $-0.100 \le w[102] \le -0.098$ |
| $-0.096 \le w[103] \le -0.094$ |
| $-0.092 \le w[104] \le -0.090$ |
| $-0.088 \le w[105] \le -0.086$ |
| $-0.085 \le w[106] \le -0.083$ |
| $-0.081 \le w[107] \le -0.079$ |
| $-0.077 \le w[108] \le -0.075$ |
| $-0.073 \le w[109] \le -0.071$ |
| $-0.069 \le w[110] \le -0.067$ |
| $-0.065 \le w[111] \le -0.063$ |
| $-0.061 \le w[112] \le -0.059$ |
| $-0.057 \le w[113] \le -0.055$ |
| $-0.053 \le w[114] \le -0.051$ |
| $-0.049 \le w[115] \le -0.047$ |
| $-0.045 \le w[116] \le -0.043$ |
| $-0.041 \le w[117] \le -0.039$ |
| $-0.037 \le w[118] \le -0.035$ |
| $-0.032 \le w[119] \le -0.030$ |
| $-0.028 \le w[120] \le -0.026$ |
| $-0.024 \le w[121] \le -0.022$ |
| $-0.020 \le w[122] \le -0.018$ |
| $-0.016 \le w[123] \le -0.014$ |
| $-0.013 \le w[124] \le -0.011$ |
| $-0.009 \le w[125] \le -0.007$ |
| $-0.007 \le w[126] \le -0.005$ |
| $-0.004 \le w[127] \le -0.002$ |

TABLE 5-continued

| (window coefficients w(n); M = 512) |
|---|
| $\lvert w[128] \rvert \le 0.001$ |
| $\lvert w[129] \rvert \le 0.001$ |
| $\lvert w[130] \rvert \le 0.001$ |
| $\lvert w[131] \rvert \le 0.001$ |
| $\lvert w[132] \rvert \le 0.001$ |
| $\lvert w[133] \rvert \le 0.001$ |
| $\lvert w[134] \rvert \le 0.001$ |
| $\lvert w[135] \rvert \le 0.001$ |
| $\lvert w[136] \rvert \le 0.001$ |
| $\lvert w[137] \rvert \le 0.001$ |
| $\lvert w[138] \rvert \le 0.001$ |
| $\lvert w[139] \rvert \le 0.001$ |
| $\lvert w[140] \rvert \le 0.001$ |
| $\lvert w[141] \rvert \le 0.001$ |
| $\lvert w[142] \rvert \le 0.001$ |
| $\lvert w[143] \rvert \le 0.001$ |
| $\lvert w[144] \rvert \le 0.001$ |
| $\lvert w[145] \rvert \le 0.001$ |
| $\lvert w[146] \rvert \le 0.001$ |
| $\lvert w[147] \rvert \le 0.001$ |
| $\lvert w[148] \rvert \le 0.001$ |
| $\lvert w[149] \rvert \le 0.001$ |
| $\lvert w[150] \rvert \le 0.001$ |
| $\lvert w[151] \rvert \le 0.001$ |
| $\lvert w[152] \rvert \le 0.001$ |
| $\lvert w[153] \rvert \le 0.001$ |
| $\lvert w[154] \rvert \le 0.001$ |
| $\lvert w[155] \rvert \le 0.001$ |
| $\lvert w[156] \rvert \le 0.001$ |
| $\lvert w[157] \rvert \le 0.001$ |
| $\lvert w[158] \rvert \le 0.001$ |
| $\lvert w[159] \rvert \le 0.001$ |
| $\lvert w[160] \rvert \le 0.001$ |
| $\lvert w[161] \rvert \le 0.001$ |
| $\lvert w[162] \rvert \le 0.001$ |
| $\lvert w[163] \rvert \le 0.001$ |
| $\lvert w[164] \rvert \le 0.001$ |
| $\lvert w[165] \rvert \le 0.001$ |
| $\lvert w[166] \rvert \le 0.001$ |
| $\lvert w[167] \rvert \le 0.001$ |
| $\lvert w[168] \rvert \le 0.001$ |
| $\lvert w[169] \rvert \le 0.001$ |
| $\lvert w[170] \rvert \le 0.001$ |
| $\lvert w[171] \rvert \le 0.001$ |
| $\lvert w[172] \rvert \le 0.001$ |
| $\lvert w[173] \rvert \le 0.001$ |
| $\lvert w[174] \rvert \le 0.001$ |
| $\lvert w[175] \rvert \le 0.001$ |
| $\lvert w[176] \rvert \le 0.001$ |
| $\lvert w[177] \rvert \le 0.001$ |
| $\lvert w[178] \rvert \le 0.001$ |
| $\lvert w[179] \rvert \le 0.001$ |
| $\lvert w[180] \rvert \le 0.001$ |
| $\lvert w[181] \rvert \le 0.001$ |
| $\lvert w[182] \rvert \le 0.001$ |
| $\lvert w[183] \rvert \le 0.001$ |
| $\lvert w[184] \rvert \le 0.001$ |
| $\lvert w[185] \rvert \le 0.001$ |
| $\lvert w[186] \rvert \le 0.001$ |
| $\lvert w[187] \rvert \le 0.001$ |
| $\lvert w[188] \rvert \le 0.001$ |
| $\lvert w[189] \rvert \le 0.001$ |
| $\lvert w[190] \rvert \le 0.001$ |
| $\lvert w[191] \rvert \le 0.001$ |
| $\lvert w[192] \rvert \le 0.001$ |
| $\lvert w[193] \rvert \le 0.001$ |
| $\lvert w[194] \rvert \le 0.001$ |
| $\lvert w[195] \rvert \le 0.001$ |
| $\lvert w[196] \rvert \le 0.001$ |
| $\lvert w[197] \rvert \le 0.001$ |
| $\lvert w[198] \rvert \le 0.001$ |
| $\lvert w[199] \rvert \le 0.001$ |
| $\lvert w[200] \rvert \le 0.001$ |
| $\lvert w[201] \rvert \le 0.001$ |
| $\lvert w[202] \rvert \le 0.001$ |
| $\lvert w[203] \rvert \le 0.001$ |
| $\lvert w[204] \rvert \le 0.001$ |
| $\lvert w[205] \rvert \le 0.001$ |

TABLE 5-continued

| (window coefficients w(n); M = 512) |
|---|
| $\lvert w[206]\rvert \le 0.001$ |
| $\lvert w[207]\rvert \le 0.001$ |
| $\lvert w[208]\rvert \le 0.001$ |
| $\lvert w[209]\rvert \le 0.001$ |
| $\lvert w[210]\rvert \le 0.001$ |
| $\lvert w[211]\rvert \le 0.001$ |
| $\lvert w[212]\rvert \le 0.001$ |
| $\lvert w[213]\rvert \le 0.001$ |
| $\lvert w[214]\rvert \le 0.001$ |
| $\lvert w[215]\rvert \le 0.001$ |
| $\lvert w[216]\rvert \le 0.001$ |
| $\lvert w[217]\rvert \le 0.001$ |
| $\lvert w[218]\rvert \le 0.001$ |
| $\lvert w[219]\rvert \le 0.001$ |
| $\lvert w[220]\rvert \le 0.001$ |
| $\lvert w[221]\rvert \le 0.001$ |
| $\lvert w[222]\rvert \le 0.001$ |
| $\lvert w[223]\rvert \le 0.001$ |
| $\lvert w[224]\rvert \le 0.001$ |
| $\lvert w[225]\rvert \le 0.001$ |
| $\lvert w[226]\rvert \le 0.001$ |
| $\lvert w[227]\rvert \le 0.001$ |
| $\lvert w[228]\rvert \le 0.001$ |
| $\lvert w[229]\rvert \le 0.001$ |
| $\lvert w[230]\rvert \le 0.001$ |
| $\lvert w[231]\rvert \le 0.001$ |
| $\lvert w[232]\rvert \le 0.001$ |
| $\lvert w[233]\rvert \le 0.001$ |
| $\lvert w[234]\rvert \le 0.001$ |
| $\lvert w[235]\rvert \le 0.001$ |
| $\lvert w[236]\rvert \le 0.001$ |
| $\lvert w[237]\rvert \le 0.001$ |
| $\lvert w[238]\rvert \le 0.001$ |
| $\lvert w[239]\rvert \le 0.001$ |
| $\lvert w[240]\rvert \le 0.001$ |
| $\lvert w[241]\rvert \le 0.001$ |
| $\lvert w[242]\rvert \le 0.001$ |
| $\lvert w[243]\rvert \le 0.001$ |
| $\lvert w[244]\rvert \le 0.001$ |
| $\lvert w[245]\rvert \le 0.001$ |
| $\lvert w[246]\rvert \le 0.001$ |
| $\lvert w[247]\rvert \le 0.001$ |
| $\lvert w[248]\rvert \le 0.001$ |
| $\lvert w[249]\rvert \le 0.001$ |
| $\lvert w[250]\rvert \le 0.001$ |
| $\lvert w[251]\rvert \le 0.001$ |
| $\lvert w[252]\rvert \le 0.001$ |
| $\lvert w[253]\rvert \le 0.001$ |
| $\lvert w[254]\rvert \le 0.001$ |
| $\lvert w[255]\rvert \le 0.001$ |
| $-1.001 \le w[256] \le -0.999$ |
| $-1.002 \le w[257] \le -1.000$ |
| $-1.002 \le w[258] \le -1.000$ |
| $-1.003 \le w[259] \le -1.001$ |
| $-1.004 \le w[260] \le -1.002$ |
| $-1.004 \le w[261] \le -1.002$ |
| $-1.005 \le w[262] \le -1.003$ |
| $-1.005 \le w[263] \le -1.003$ |
| $-1.006 \le w[264] \le -1.004$ |
| $-1.006 \le w[265] \le -1.004$ |
| $-1.007 \le w[266] \le -1.005$ |
| $-1.007 \le w[267] \le -1.005$ |
| $-1.008 \le w[268] \le -1.006$ |
| $-1.009 \le w[269] \le -1.007$ |
| $-1.009 \le w[270] \le -1.007$ |
| $-1.010 \le w[271] \le -1.008$ |
| $-1.010 \le w[272] \le -1.008$ |
| $-1.011 \le w[273] \le -1.009$ |
| $-1.011 \le w[274] \le -1.009$ |
| $-1.012 \le w[275] \le -1.010$ |
| $-1.013 \le w[276] \le -1.011$ |
| $-1.013 \le w[277] \le -1.011$ |
| $-1.014 \le w[278] \le -1.012$ |
| $-1.014 \le w[279] \le -1.012$ |
| $-1.015 \le w[280] \le -1.013$ |
| $-1.015 \le w[281] \le -1.013$ |
| $-1.016 \le w[282] \le -1.014$ |
| $-1.016 \le w[283] \le -1.014$ |

TABLE 5-continued

| (window coefficients w(n); M = 512) |
|---|
| $-1.017 \le w[284] \le -1.015$ |
| $-1.018 \le w[285] \le -1.016$ |
| $-1.018 \le w[286] \le -1.016$ |
| $-1.019 \le w[287] \le -1.017$ |
| $-1.019 \le w[288] \le -1.017$ |
| $-1.020 \le w[289] \le -1.018$ |
| $-1.020 \le w[290] \le -1.018$ |
| $-1.021 \le w[291] \le -1.019$ |
| $-1.021 \le w[292] \le -1.019$ |
| $-1.022 \le w[293] \le -1.020$ |
| $-1.023 \le w[294] \le -1.021$ |
| $-1.023 \le w[295] \le -1.021$ |
| $-1.024 \le w[296] \le -1.022$ |
| $-1.024 \le w[297] \le -1.022$ |
| $-1.025 \le w[298] \le -1.023$ |
| $-1.025 \le w[299] \le -1.023$ |
| $-1.026 \le w[300] \le -1.024$ |
| $-1.026 \le w[301] \le -1.024$ |
| $-1.027 \le w[302] \le -1.025$ |
| $-1.028 \le w[303] \le -1.026$ |
| $-1.028 \le w[304] \le -1.026$ |
| $-1.029 \le w[305] \le -1.027$ |
| $-1.029 \le w[306] \le -1.027$ |
| $-1.030 \le w[307] \le -1.028$ |
| $-1.030 \le w[308] \le -1.028$ |
| $-1.031 \le w[309] \le -1.029$ |
| $-1.031 \le w[310] \le -1.029$ |
| $-1.032 \le w[311] \le -1.030$ |
| $-1.032 \le w[312] \le -1.030$ |
| $-1.033 \le w[313] \le -1.031$ |
| $-1.034 \le w[314] \le -1.032$ |
| $-1.034 \le w[315] \le -1.032$ |
| $-1.035 \le w[316] \le -1.033$ |
| $-1.035 \le w[317] \le -1.033$ |
| $-1.036 \le w[318] \le -1.034$ |
| $-1.036 \le w[319] \le -1.034$ |
| $-1.037 \le w[320] \le -1.035$ |
| $-1.037 \le w[321] \le -1.035$ |
| $-1.038 \le w[322] \le -1.036$ |
| $-1.038 \le w[323] \le -1.036$ |
| $-1.039 \le w[324] \le -1.037$ |
| $-1.039 \le w[325] \le -1.037$ |
| $-1.040 \le w[326] \le -1.038$ |
| $-1.040 \le w[327] \le -1.038$ |
| $-1.041 \le w[328] \le -1.039$ |
| $-1.041 \le w[329] \le -1.039$ |
| $-1.042 \le w[330] \le -1.040$ |
| $-1.042 \le w[331] \le -1.040$ |
| $-1.043 \le w[332] \le -1.041$ |
| $-1.043 \le w[333] \le -1.041$ |
| $-1.044 \le w[334] \le -1.042$ |
| $-1.044 \le w[335] \le -1.042$ |
| $-1.045 \le w[336] \le -1.043$ |
| $-1.045 \le w[337] \le -1.043$ |
| $-1.046 \le w[338] \le -1.044$ |
| $-1.046 \le w[339] \le -1.044$ |
| $-1.047 \le w[340] \le -1.045$ |
| $-1.047 \le w[341] \le -1.045$ |
| $-1.048 \le w[342] \le -1.046$ |
| $-1.048 \le w[343] \le -1.046$ |
| $-1.049 \le w[344] \le -1.047$ |
| $-1.049 \le w[345] \le -1.047$ |
| $-1.050 \le w[346] \le -1.048$ |
| $-1.050 \le w[347] \le -1.048$ |
| $-1.051 \le w[348] \le -1.049$ |
| $-1.051 \le w[349] \le -1.049$ |
| $-1.052 \le w[350] \le -1.050$ |
| $-1.052 \le w[351] \le -1.050$ |
| $-1.053 \le w[352] \le -1.051$ |
| $-1.053 \le w[353] \le -1.051$ |
| $-1.053 \le w[354] \le -1.051$ |
| $-1.054 \le w[355] \le -1.052$ |
| $-1.054 \le w[356] \le -1.052$ |
| $-1.055 \le w[357] \le -1.053$ |
| $-1.055 \le w[358] \le -1.053$ |
| $-1.056 \le w[359] \le -1.054$ |
| $-1.056 \le w[360] \le -1.054$ |
| $-1.057 \le w[361] \le -1.055$ |

TABLE 5-continued

| (window coefficients w(n); M = 512) |
|---|
| −1.057 ≤ w[362] ≤ −1.055 |
| −1.058 ≤ w[363] ≤ −1.056 |
| −1.058 ≤ w[364] ≤ −1.056 |
| −1.058 ≤ w[365] ≤ −1.056 |
| −1.059 ≤ w[366] ≤ −1.057 |
| −1.059 ≤ w[367] ≤ −1.057 |
| −1.060 ≤ w[368] ≤ −1.058 |
| −1.060 ≤ w[369] ≤ −1.058 |
| −1.061 ≤ w[370] ≤ −1.059 |
| −1.061 ≤ w[371] ≤ −1.059 |
| −1.062 ≤ w[372] ≤ −1.060 |
| −1.062 ≤ w[373] ≤ −1.060 |
| −1.062 ≤ w[374] ≤ −1.060 |
| −1.063 ≤ w[375] ≤ −1.061 |
| −1.063 ≤ w[376] ≤ −1.061 |
| −1.064 ≤ w[377] ≤ −1.062 |
| −1.064 ≤ w[378] ≤ −1.062 |
| −1.065 ≤ w[379] ≤ −1.063 |
| −1.065 ≤ w[380] ≤ −1.063 |
| −1.065 ≤ w[381] ≤ −1.063 |
| −1.066 ≤ w[382] ≤ −1.064 |
| −1.066 ≤ w[383] ≤ −1.064 |
| −1.066 ≤ w[384] ≤ −1.064 |
| −1.067 ≤ w[385] ≤ −1.065 |
| −1.067 ≤ w[386] ≤ −1.065 |
| −1.067 ≤ w[387] ≤ −1.065 |
| −1.067 ≤ w[388] ≤ −1.065 |
| −1.067 ≤ w[389] ≤ −1.065 |
| −1.067 ≤ w[390] ≤ −1.065 |
| −1.067 ≤ w[391] ≤ −1.065 |
| −1.067 ≤ w[392] ≤ −1.065 |
| −1.066 ≤ w[393] ≤ −1.064 |
| −1.066 ≤ w[394] ≤ −1.064 |
| −1.066 ≤ w[395] ≤ −1.064 |
| −1.066 ≤ w[396] ≤ −1.064 |
| −1.066 ≤ w[397] ≤ −1.064 |
| −1.066 ≤ w[398] ≤ −1.064 |
| −1.065 ≤ w[399] ≤ −1.063 |
| −1.065 ≤ w[400] ≤ −1.063 |
| −1.065 ≤ w[401] ≤ −1.063 |
| −1.065 ≤ w[402] ≤ −1.063 |
| −1.064 ≤ w[403] ≤ −1.062 |
| −1.064 ≤ w[404] ≤ −1.062 |
| −1.063 ≤ w[405] ≤ −1.061 |
| −1.063 ≤ w[406] ≤ −1.061 |
| −1.062 ≤ w[407] ≤ −1.060 |
| −1.062 ≤ w[408] ≤ −1.060 |
| −1.061 ≤ w[409] ≤ −1.059 |
| −1.061 ≤ w[410] ≤ −1.059 |
| −1.060 ≤ w[411] ≤ −1.058 |
| −1.060 ≤ w[412] ≤ −1.058 |
| −1.059 ≤ w[413] ≤ −1.057 |
| −1.059 ≤ w[414] ≤ −1.057 |
| −1.058 ≤ w[415] ≤ −1.056 |
| −1.058 ≤ w[416] ≤ −1.056 |
| −1.057 ≤ w[417] ≤ −1.055 |
| −1.056 ≤ w[418] ≤ −1.054 |
| −1.055 ≤ w[419] ≤ −1.053 |
| −1.055 ≤ w[420] ≤ −1.053 |
| −1.054 ≤ w[421] ≤ −1.052 |
| −1.053 ≤ w[422] ≤ −1.051 |
| −1.052 ≤ w[423] ≤ −1.050 |
| −1.051 ≤ w[424] ≤ −1.049 |
| −1.050 ≤ w[425] ≤ −1.048 |
| −1.049 ≤ w[426] ≤ −1.047 |
| −1.048 ≤ w[427] ≤ −1.046 |
| −1.047 ≤ w[428] ≤ −1.045 |
| −1.045 ≤ w[429] ≤ −1.043 |
| −1.044 ≤ w[430] ≤ −1.042 |
| −1.043 ≤ w[431] ≤ −1.041 |
| −1.042 ≤ w[432] ≤ −1.040 |
| −1.040 ≤ w[433] ≤ −1.038 |
| −1.039 ≤ w[434] ≤ −1.037 |
| −1.037 ≤ w[435] ≤ −1.035 |
| −1.036 ≤ w[436] ≤ −1.034 |
| −1.035 ≤ w[437] ≤ −1.033 |
| −1.033 ≤ w[438] ≤ −1.031 |
| −1.032 ≤ w[439] ≤ −1.030 |

TABLE 5-continued

| (window coefficients w(n); M = 512) |
|---|
| −1.030 ≤ w[440] ≤ −1.028 |
| −1.029 ≤ w[441] ≤ −1.027 |
| −1.027 ≤ w[442] ≤ −1.025 |
| −1.025 ≤ w[443] ≤ −1.023 |
| −1.024 ≤ w[444] ≤ −1.022 |
| −1.022 ≤ w[445] ≤ −1.020 |
| −1.020 ≤ w[446] ≤ −1.018 |
| −1.018 ≤ w[447] ≤ −1.016 |
| −1.017 ≤ w[448] ≤ −1.015 |
| −1.015 ≤ w[449] ≤ −1.013 |
| −1.013 ≤ w[450] ≤ −1.011 |
| −1.011 ≤ w[451] ≤ −1.009 |
| −1.009 ≤ w[452] ≤ −1.007 |
| −1.007 ≤ w[453] ≤ −1.005 |
| −1.005 ≤ w[454] ≤ −1.003 |
| −1.003 ≤ w[455] ≤ −1.001 |
| −1.000 ≤ w[456] ≤ −0.998 |
| −0.998 ≤ w[457] ≤ −0.996 |
| −0.996 ≤ w[458] ≤ −0.994 |
| −0.994 ≤ w[459] ≤ −0.992 |
| −0.991 ≤ w[460] ≤ −0.989 |
| −0.989 ≤ w[461] ≤ −0.987 |
| −0.987 ≤ w[462] ≤ −0.985 |
| −0.985 ≤ w[463] ≤ −0.983 |
| −0.982 ≤ w[464] ≤ −0.980 |
| −0.980 ≤ w[465] ≤ −0.978 |
| −0.978 ≤ w[466] ≤ −0.976 |
| −0.975 ≤ w[467] ≤ −0.973 |
| −0.973 ≤ w[468] ≤ −0.971 |
| −0.971 ≤ w[469] ≤ −0.969 |
| −0.968 ≤ w[470] ≤ −0.966 |
| −0.966 ≤ w[471] ≤ −0.964 |
| −0.963 ≤ w[472] ≤ −0.961 |
| −0.960 ≤ w[473] ≤ −0.958 |
| −0.958 ≤ w[474] ≤ −0.956 |
| −0.955 ≤ w[475] ≤ −0.953 |
| −0.953 ≤ w[476] ≤ −0.951 |
| −0.950 ≤ w[477] ≤ −0.948 |
| −0.947 ≤ w[478] ≤ −0.945 |
| −0.945 ≤ w[479] ≤ −0.943 |
| −0.942 ≤ w[480] ≤ −0.940 |
| −0.939 ≤ w[481] ≤ −0.937 |
| −0.937 ≤ w[482] ≤ −0.935 |
| −0.934 ≤ w[483] ≤ −0.932 |
| −0.931 ≤ w[484] ≤ −0.929 |
| −0.929 ≤ w[485] ≤ −0.927 |
| −0.926 ≤ w[486] ≤ −0.924 |
| −0.924 ≤ w[487] ≤ −0.922 |
| −0.921 ≤ w[488] ≤ −0.919 |
| −0.918 ≤ w[489] ≤ −0.916 |
| −0.915 ≤ w[490] ≤ −0.913 |
| −0.913 ≤ w[491] ≤ −0.911 |
| −0.910 ≤ w[492] ≤ −0.908 |
| −0.907 ≤ w[493] ≤ −0.905 |
| −0.904 ≤ w[494] ≤ −0.902 |
| −0.902 ≤ w[495] ≤ −0.900 |
| −0.899 ≤ w[496] ≤ −0.897 |
| −0.896 ≤ w[497] ≤ −0.894 |
| −0.894 ≤ w[498] ≤ −0.892 |
| −0.891 ≤ w[499] ≤ −0.889 |
| −0.888 ≤ w[500] ≤ −0.886 |
| −0.886 ≤ w[501] ≤ −0.884 |
| −0.883 ≤ w[502] ≤ −0.881 |
| −0.880 ≤ w[503] ≤ −0.878 |
| −0.878 ≤ w[504] ≤ −0.876 |
| −0.875 ≤ w[505] ≤ −0.873 |
| −0.873 ≤ w[506] ≤ −0.871 |
| −0.870 ≤ w[507] ≤ −0.868 |
| −0.867 ≤ w[508] ≤ −0.865 |
| −0.865 ≤ w[509] ≤ −0.863 |
| −0.862 ≤ w[510] ≤ −0.860 |
| −0.860 ≤ w[511] ≤ −0.858 |
| −0.586 ≤ w[512] ≤ −0.584 |
| −0.590 ≤ w[513] ≤ −0.588 |
| −0.594 ≤ w[514] ≤ −0.592 |
| −0.599 ≤ w[515] ≤ −0.597 |
| −0.603 ≤ w[516] ≤ −0.601 |
| −0.607 ≤ w[517] ≤ −0.605 |

TABLE 5-continued

| (window coefficients w(n); M = 512) |
|---|
| −0.611 ≤ w[518] ≤ −0.609 |
| −0.615 ≤ w[519] ≤ −0.613 |
| −0.619 ≤ w[520] ≤ −0.617 |
| −0.623 ≤ w[521] ≤ −0.621 |
| −0.628 ≤ w[522] ≤ −0.626 |
| −0.632 ≤ w[523] ≤ −0.630 |
| −0.636 ≤ w[524] ≤ −0.634 |
| −0.640 ≤ w[525] ≤ −0.638 |
| −0.644 ≤ w[526] ≤ −0.642 |
| −0.648 ≤ w[527] ≤ −0.646 |
| −0.651 ≤ w[528] ≤ −0.649 |
| −0.655 ≤ w[529] ≤ −0.653 |
| −0.659 ≤ w[530] ≤ −0.657 |
| −0.663 ≤ w[531] ≤ −0.661 |
| −0.667 ≤ w[532] ≤ −0.665 |
| −0.671 ≤ w[533] ≤ −0.669 |
| −0.675 ≤ w[534] ≤ −0.673 |
| −0.678 ≤ w[535] ≤ −0.676 |
| −0.682 ≤ w[536] ≤ −0.680 |
| −0.686 ≤ w[537] ≤ −0.684 |
| −0.690 ≤ w[538] ≤ −0.688 |
| −0.693 ≤ w[539] ≤ −0.691 |
| −0.697 ≤ w[540] ≤ −0.695 |
| −0.701 ≤ w[541] ≤ −0.699 |
| −0.704 ≤ w[542] ≤ −0.702 |
| −0.708 ≤ w[543] ≤ −0.706 |
| −0.712 ≤ w[544] ≤ −0.710 |
| −0.715 ≤ w[545] ≤ −0.713 |
| −0.719 ≤ w[546] ≤ −0.717 |
| −0.722 ≤ w[547] ≤ −0.720 |
| −0.726 ≤ w[548] ≤ −0.724 |
| −0.729 ≤ w[549] ≤ −0.727 |
| −0.733 ≤ w[550] ≤ −0.731 |
| −0.736 ≤ w[551] ≤ −0.734 |
| −0.740 ≤ w[552] ≤ −0.738 |
| −0.743 ≤ w[553] ≤ −0.741 |
| −0.746 ≤ w[554] ≤ −0.744 |
| −0.750 ≤ w[555] ≤ −0.748 |
| −0.753 ≤ w[556] ≤ −0.751 |
| −0.756 ≤ w[557] ≤ −0.754 |
| −0.760 ≤ w[558] ≤ −0.758 |
| −0.763 ≤ w[559] ≤ −0.761 |
| −0.766 ≤ w[560] ≤ −0.764 |
| −0.769 ≤ w[561] ≤ −0.767 |
| −0.773 ≤ w[562] ≤ −0.771 |
| −0.776 ≤ w[563] ≤ −0.774 |
| −0.779 ≤ w[564] ≤ −0.777 |
| −0.782 ≤ w[565] ≤ −0.780 |
| −0.785 ≤ w[566] ≤ −0.783 |
| −0.788 ≤ w[567] ≤ −0.786 |
| −0.791 ≤ w[568] ≤ −0.789 |
| −0.794 ≤ w[569] ≤ −0.792 |
| −0.797 ≤ w[570] ≤ −0.795 |
| −0.800 ≤ w[571] ≤ −0.798 |
| −0.803 ≤ w[572] ≤ −0.801 |
| −0.806 ≤ w[573] ≤ −0.804 |
| −0.809 ≤ w[574] ≤ −0.807 |
| −0.812 ≤ w[575] ≤ −0.810 |
| −0.815 ≤ w[576] ≤ −0.813 |
| −0.817 ≤ w[577] ≤ −0.815 |
| −0.820 ≤ w[578] ≤ −0.818 |
| −0.823 ≤ w[579] ≤ −0.821 |
| −0.826 ≤ w[580] ≤ −0.824 |
| −0.828 ≤ w[581] ≤ −0.826 |
| −0.831 ≤ w[582] ≤ −0.829 |
| −0.834 ≤ w[583] ≤ −0.832 |
| −0.836 ≤ w[584] ≤ −0.834 |
| −0.839 ≤ w[585] ≤ −0.837 |
| −0.841 ≤ w[586] ≤ −0.839 |
| −0.844 ≤ w[587] ≤ −0.842 |
| −0.846 ≤ w[588] ≤ −0.844 |
| −0.849 ≤ w[589] ≤ −0.847 |
| −0.851 ≤ w[590] ≤ −0.849 |
| −0.854 ≤ w[591] ≤ −0.852 |
| −0.856 ≤ w[592] ≤ −0.854 |
| −0.858 ≤ w[593] ≤ −0.856 |
| −0.861 ≤ w[594] ≤ −0.859 |
| −0.863 ≤ w[595] ≤ −0.861 |

TABLE 5-continued

| (window coefficients w(n); M = 512) |
|---|
| −0.865 ≤ w[596] ≤ −0.863 |
| −0.867 ≤ w[597] ≤ −0.865 |
| −0.870 ≤ w[598] ≤ −0.868 |
| −0.872 ≤ w[599] ≤ −0.870 |
| −0.874 ≤ w[600] ≤ −0.872 |
| −0.876 ≤ w[601] ≤ −0.874 |
| −0.878 ≤ w[602] ≤ −0.876 |
| −0.880 ≤ w[603] ≤ −0.878 |
| −0.882 ≤ w[604] ≤ −0.880 |
| −0.884 ≤ w[605] ≤ −0.882 |
| −0.886 ≤ w[606] ≤ −0.884 |
| −0.888 ≤ w[607] ≤ −0.886 |
| −0.890 ≤ w[608] ≤ −0.888 |
| −0.892 ≤ w[609] ≤ −0.890 |
| −0.893 ≤ w[610] ≤ −0.891 |
| −0.895 ≤ w[611] ≤ −0.893 |
| −0.897 ≤ w[612] ≤ −0.895 |
| −0.899 ≤ w[613] ≤ −0.897 |
| −0.901 ≤ w[614] ≤ −0.899 |
| −0.902 ≤ w[615] ≤ −0.900 |
| −0.904 ≤ w[616] ≤ −0.902 |
| −0.906 ≤ w[617] ≤ −0.904 |
| −0.907 ≤ w[618] ≤ −0.905 |
| −0.909 ≤ w[619] ≤ −0.907 |
| −0.911 ≤ w[620] ≤ −0.909 |
| −0.912 ≤ w[621] ≤ −0.910 |
| −0.914 ≤ w[622] ≤ −0.912 |
| −0.915 ≤ w[623] ≤ −0.913 |
| −0.917 ≤ w[624] ≤ −0.915 |
| −0.919 ≤ w[625] ≤ −0.917 |
| −0.920 ≤ w[626] ≤ −0.918 |
| −0.922 ≤ w[627] ≤ −0.920 |
| −0.923 ≤ w[628] ≤ −0.921 |
| −0.925 ≤ w[629] ≤ −0.923 |
| −0.926 ≤ w[630] ≤ −0.924 |
| −0.928 ≤ w[631] ≤ −0.926 |
| −0.930 ≤ w[632] ≤ −0.928 |
| −0.931 ≤ w[633] ≤ −0.929 |
| −0.933 ≤ w[634] ≤ −0.931 |
| −0.934 ≤ w[635] ≤ −0.932 |
| −0.935 ≤ w[636] ≤ −0.933 |
| −0.936 ≤ w[637] ≤ −0.934 |
| −0.938 ≤ w[638] ≤ −0.936 |
| −0.939 ≤ w[639] ≤ −0.937 |
| −0.940 ≤ w[640] ≤ −0.938 |
| −0.940 ≤ w[641] ≤ −0.938 |
| −0.941 ≤ w[642] ≤ −0.939 |
| −0.941 ≤ w[643] ≤ −0.939 |
| −0.941 ≤ w[644] ≤ −0.939 |
| −0.942 ≤ w[645] ≤ −0.940 |
| −0.942 ≤ w[646] ≤ −0.940 |
| −0.942 ≤ w[647] ≤ −0.940 |
| −0.943 ≤ w[648] ≤ −0.941 |
| −0.943 ≤ w[649] ≤ −0.941 |
| −0.944 ≤ w[650] ≤ −0.942 |
| −0.944 ≤ w[651] ≤ −0.942 |
| −0.944 ≤ w[652] ≤ −0.942 |
| −0.945 ≤ w[653] ≤ −0.943 |
| −0.945 ≤ w[654] ≤ −0.943 |
| −0.945 ≤ w[655] ≤ −0.943 |
| −0.946 ≤ w[656] ≤ −0.944 |
| −0.946 ≤ w[657] ≤ −0.944 |
| −0.947 ≤ w[658] ≤ −0.945 |
| −0.947 ≤ w[659] ≤ −0.945 |
| −0.947 ≤ w[660] ≤ −0.945 |
| −0.948 ≤ w[661] ≤ −0.946 |
| −0.948 ≤ w[662] ≤ −0.946 |
| −0.949 ≤ w[663] ≤ −0.947 |
| −0.949 ≤ w[664] ≤ −0.947 |
| −0.949 ≤ w[665] ≤ −0.947 |
| −0.950 ≤ w[666] ≤ −0.948 |
| −0.950 ≤ w[667] ≤ −0.948 |
| −0.951 ≤ w[668] ≤ −0.949 |
| −0.951 ≤ w[669] ≤ −0.949 |
| −0.952 ≤ w[670] ≤ −0.950 |
| −0.952 ≤ w[671] ≤ −0.950 |
| −0.952 ≤ w[672] ≤ −0.950 |
| −0.953 ≤ w[673] ≤ −0.951 |

TABLE 5-continued

| (window coefficients w(n); M = 512) |
|---|
| −0.953 ≤ w[674] ≤ −0.951 |
| −0.954 ≤ w[675] ≤ −0.952 |
| −0.954 ≤ w[676] ≤ −0.952 |
| −0.955 ≤ w[677] ≤ −0.953 |
| −0.955 ≤ w[678] ≤ −0.953 |
| −0.955 ≤ w[679] ≤ −0.953 |
| −0.956 ≤ w[680] ≤ −0.954 |
| −0.956 ≤ w[681] ≤ −0.954 |
| −0.957 ≤ w[682] ≤ −0.955 |
| −0.957 ≤ w[683] ≤ −0.955 |
| −0.958 ≤ w[684] ≤ −0.956 |
| −0.958 ≤ w[685] ≤ −0.956 |
| −0.959 ≤ w[686] ≤ −0.957 |
| −0.959 ≤ w[687] ≤ −0.957 |
| −0.959 ≤ w[688] ≤ −0.957 |
| −0.960 ≤ w[689] ≤ −0.958 |
| −0.960 ≤ w[690] ≤ −0.958 |
| −0.961 ≤ w[691] ≤ −0.959 |
| −0.961 ≤ w[692] ≤ −0.959 |
| −0.962 ≤ w[693] ≤ −0.960 |
| −0.962 ≤ w[694] ≤ −0.960 |
| −0.963 ≤ w[695] ≤ −0.961 |
| −0.963 ≤ w[696] ≤ −0.961 |
| −0.964 ≤ w[697] ≤ −0.962 |
| −0.964 ≤ w[698] ≤ −0.962 |
| −0.965 ≤ w[699] ≤ −0.963 |
| −0.965 ≤ w[700] ≤ −0.963 |
| −0.966 ≤ w[701] ≤ −0.964 |
| −0.966 ≤ w[702] ≤ −0.964 |
| −0.967 ≤ w[703] ≤ −0.965 |
| −0.967 ≤ w[704] ≤ −0.965 |
| −0.968 ≤ w[705] ≤ −0.966 |
| −0.968 ≤ w[706] ≤ −0.966 |
| −0.969 ≤ w[707] ≤ −0.967 |
| −0.969 ≤ w[708] ≤ −0.967 |
| −0.970 ≤ w[709] ≤ −0.968 |
| −0.970 ≤ w[710] ≤ −0.968 |
| −0.971 ≤ w[711] ≤ −0.969 |
| −0.971 ≤ w[712] ≤ −0.969 |
| −0.972 ≤ w[713] ≤ −0.970 |
| −0.972 ≤ w[714] ≤ −0.970 |
| −0.973 ≤ w[715] ≤ −0.971 |
| −0.973 ≤ w[716] ≤ −0.971 |
| −0.974 ≤ w[717] ≤ −0.972 |
| −0.974 ≤ w[718] ≤ −0.972 |
| −0.975 ≤ w[719] ≤ −0.973 |
| −0.975 ≤ w[720] ≤ −0.973 |
| −0.976 ≤ w[721] ≤ −0.974 |
| −0.976 ≤ w[722] ≤ −0.974 |
| −0.977 ≤ w[723] ≤ −0.975 |
| −0.977 ≤ w[724] ≤ −0.975 |
| −0.978 ≤ w[725] ≤ −0.976 |
| −0.978 ≤ w[726] ≤ −0.976 |
| −0.979 ≤ w[727] ≤ −0.977 |
| −0.979 ≤ w[728] ≤ −0.977 |
| −0.980 ≤ w[729] ≤ −0.978 |
| −0.980 ≤ w[730] ≤ −0.978 |
| −0.981 ≤ w[731] ≤ −0.979 |
| −0.981 ≤ w[732] ≤ −0.979 |
| −0.982 ≤ w[733] ≤ −0.980 |
| −0.983 ≤ w[734] ≤ −0.981 |
| −0.983 ≤ w[735] ≤ −0.981 |
| −0.984 ≤ w[736] ≤ −0.982 |
| −0.984 ≤ w[737] ≤ −0.982 |
| −0.985 ≤ w[738] ≤ −0.983 |
| −0.985 ≤ w[739] ≤ −0.983 |
| −0.986 ≤ w[740] ≤ −0.984 |
| −0.986 ≤ w[741] ≤ −0.984 |
| −0.987 ≤ w[742] ≤ −0.985 |
| −0.987 ≤ w[743] ≤ −0.985 |
| −0.988 ≤ w[744] ≤ −0.986 |
| −0.989 ≤ w[745] ≤ −0.987 |
| −0.989 ≤ w[746] ≤ −0.987 |
| −0.990 ≤ w[747] ≤ −0.988 |
| −0.990 ≤ w[748] ≤ −0.988 |
| −0.991 ≤ w[749] ≤ −0.989 |
| −0.991 ≤ w[750] ≤ −0.989 |
| −0.992 ≤ w[751] ≤ −0.990 |

TABLE 5-continued

| (window coefficients w(n); M = 512) |
|---|
| −0.992 ≤ w[752] ≤ −0.990 |
| −0.993 ≤ w[753] ≤ −0.991 |
| −0.993 ≤ w[754] ≤ −0.991 |
| −0.994 ≤ w[755] ≤ −0.992 |
| −0.995 ≤ w[756] ≤ −0.993 |
| −0.995 ≤ w[757] ≤ −0.993 |
| −0.996 ≤ w[758] ≤ −0.994 |
| −0.996 ≤ w[759] ≤ −0.994 |
| −0.997 ≤ w[760] ≤ −0.995 |
| −0.997 ≤ w[761] ≤ −0.995 |
| −0.998 ≤ w[762] ≤ −0.996 |
| −0.998 ≤ w[763] ≤ −0.996 |
| −0.999 ≤ w[764] ≤ −0.997 |
| −1.000 ≤ w[765] ≤ −0.998 |
| −1.000 ≤ w[766] ≤ −0.998 |
| −1.001 ≤ w[767] ≤ −0.999 |
| 0.081 ≤ w[768] ≤ 0.083 |
| 0.082 ≤ w[769] ≤ 0.084 |
| 0.083 ≤ w[770] ≤ 0.085 |
| 0.085 ≤ w[771] ≤ 0.087 |
| 0.086 ≤ w[772] ≤ 0.088 |
| 0.088 ≤ w[773] ≤ 0.090 |
| 0.089 ≤ w[774] ≤ 0.091 |
| 0.091 ≤ w[775] ≤ 0.093 |
| 0.092 ≤ w[776] ≤ 0.094 |
| 0.093 ≤ w[777] ≤ 0.095 |
| 0.095 ≤ w[778] ≤ 0.097 |
| 0.096 ≤ w[779] ≤ 0.098 |
| 0.098 ≤ w[780] ≤ 0.100 |
| 0.100 ≤ w[781] ≤ 0.102 |
| 0.101 ≤ w[782] ≤ 0.103 |
| 0.103 ≤ w[783] ≤ 0.105 |
| 0.104 ≤ w[784] ≤ 0.106 |
| 0.106 ≤ w[785] ≤ 0.108 |
| 0.107 ≤ w[786] ≤ 0.109 |
| 0.109 ≤ w[787] ≤ 0.111 |
| 0.111 ≤ w[788] ≤ 0.113 |
| 0.112 ≤ w[789] ≤ 0.114 |
| 0.114 ≤ w[790] ≤ 0.116 |
| 0.116 ≤ w[791] ≤ 0.118 |
| 0.117 ≤ w[792] ≤ 0.119 |
| 0.119 ≤ w[793] ≤ 0.121 |
| 0.121 ≤ w[794] ≤ 0.123 |
| 0.123 ≤ w[795] ≤ 0.125 |
| 0.124 ≤ w[796] ≤ 0.126 |
| 0.126 ≤ w[797] ≤ 0.128 |
| 0.128 ≤ w[798] ≤ 0.130 |
| 0.130 ≤ w[799] ≤ 0.132 |
| 0.132 ≤ w[800] ≤ 0.134 |
| 0.133 ≤ w[801] ≤ 0.135 |
| 0.135 ≤ w[802] ≤ 0.137 |
| 0.137 ≤ w[803] ≤ 0.139 |
| 0.139 ≤ w[804] ≤ 0.141 |
| 0.141 ≤ w[805] ≤ 0.143 |
| 0.142 ≤ w[806] ≤ 0.144 |
| 0.144 ≤ w[807] ≤ 0.146 |
| 0.146 ≤ w[808] ≤ 0.148 |
| 0.148 ≤ w[809] ≤ 0.150 |
| 0.150 ≤ w[810] ≤ 0.152 |
| 0.152 ≤ w[811] ≤ 0.154 |
| 0.154 ≤ w[812] ≤ 0.156 |
| 0.155 ≤ w[813] ≤ 0.157 |
| 0.157 ≤ w[814] ≤ 0.159 |
| 0.159 ≤ w[815] ≤ 0.161 |
| 0.161 ≤ w[816] ≤ 0.163 |
| 0.162 ≤ w[817] ≤ 0.164 |
| 0.164 ≤ w[818] ≤ 0.166 |
| 0.166 ≤ w[819] ≤ 0.168 |
| 0.167 ≤ w[820] ≤ 0.169 |
| 0.169 ≤ w[821] ≤ 0.171 |
| 0.171 ≤ w[822] ≤ 0.173 |
| 0.172 ≤ w[823] ≤ 0.174 |
| 0.174 ≤ w[824] ≤ 0.176 |
| 0.175 ≤ w[825] ≤ 0.177 |
| 0.176 ≤ w[826] ≤ 0.178 |
| 0.178 ≤ w[827] ≤ 0.180 |
| 0.179 ≤ w[828] ≤ 0.181 |
| 0.180 ≤ w[829] ≤ 0.182 |

TABLE 5-continued

| (window coefficients w(n); M = 512) |
|---|
| 0.181 ≤ w[830] ≤ 0.183 |
| 0.182 ≤ w[831] ≤ 0.184 |
| 0.183 ≤ w[832] ≤ 0.185 |
| 0.185 ≤ w[833] ≤ 0.187 |
| 0.186 ≤ w[834] ≤ 0.188 |
| 0.187 ≤ w[835] ≤ 0.189 |
| 0.188 ≤ w[836] ≤ 0.190 |
| 0.190 ≤ w[837] ≤ 0.192 |
| 0.191 ≤ w[838] ≤ 0.193 |
| 0.193 ≤ w[839] ≤ 0.195 |
| 0.194 ≤ w[840] ≤ 0.196 |
| 0.196 ≤ w[841] ≤ 0.198 |
| 0.197 ≤ w[842] ≤ 0.199 |
| 0.199 ≤ w[843] ≤ 0.201 |
| 0.201 ≤ w[844] ≤ 0.203 |
| 0.203 ≤ w[845] ≤ 0.205 |
| 0.204 ≤ w[846] ≤ 0.206 |
| 0.206 ≤ w[847] ≤ 0.208 |
| 0.208 ≤ w[848] ≤ 0.210 |
| 0.210 ≤ w[849] ≤ 0.212 |
| 0.213 ≤ w[850] ≤ 0.215 |
| 0.215 ≤ w[851] ≤ 0.217 |
| 0.217 ≤ w[852] ≤ 0.219 |
| 0.219 ≤ w[853] ≤ 0.221 |
| 0.221 ≤ w[854] ≤ 0.223 |
| 0.224 ≤ w[855] ≤ 0.226 |
| 0.226 ≤ w[856] ≤ 0.228 |
| 0.228 ≤ w[857] ≤ 0.230 |
| 0.231 ≤ w[858] ≤ 0.233 |
| 0.233 ≤ w[859] ≤ 0.235 |
| 0.236 ≤ w[860] ≤ 0.238 |
| 0.239 ≤ w[861] ≤ 0.241 |
| 0.241 ≤ w[862] ≤ 0.243 |
| 0.244 ≤ w[863] ≤ 0.246 |
| 0.247 ≤ w[864] ≤ 0.249 |
| 0.250 ≤ w[865] ≤ 0.252 |
| 0.253 ≤ w[866] ≤ 0.255 |
| 0.256 ≤ w[867] ≤ 0.258 |
| 0.259 ≤ w[868] ≤ 0.261 |
| 0.262 ≤ w[869] ≤ 0.264 |
| 0.265 ≤ w[870] ≤ 0.267 |
| 0.268 ≤ w[871] ≤ 0.270 |
| 0.271 ≤ w[872] ≤ 0.273 |
| 0.274 ≤ w[873] ≤ 0.276 |
| 0.277 ≤ w[874] ≤ 0.279 |
| 0.280 ≤ w[875] ≤ 0.282 |
| 0.283 ≤ w[876] ≤ 0.285 |
| 0.287 ≤ w[877] ≤ 0.289 |
| 0.290 ≤ w[878] ≤ 0.292 |
| 0.293 ≤ w[879] ≤ 0.295 |
| 0.297 ≤ w[880] ≤ 0.299 |
| 0.300 ≤ w[881] ≤ 0.302 |
| 0.304 ≤ w[882] ≤ 0.306 |
| 0.307 ≤ w[883] ≤ 0.309 |
| 0.311 ≤ w[884] ≤ 0.313 |
| 0.314 ≤ w[885] ≤ 0.316 |
| 0.318 ≤ w[886] ≤ 0.320 |
| 0.321 ≤ w[887] ≤ 0.323 |
| 0.325 ≤ w[888] ≤ 0.327 |
| 0.329 ≤ w[889] ≤ 0.331 |
| 0.332 ≤ w[890] ≤ 0.334 |
| 0.336 ≤ w[891] ≤ 0.338 |
| 0.340 ≤ w[892] ≤ 0.342 |
| 0.344 ≤ w[893] ≤ 0.346 |
| 0.347 ≤ w[894] ≤ 0.349 |
| 0.351 ≤ w[895] ≤ 0.353 |
| 0.356 ≤ w[896] ≤ 0.358 |
| 0.360 ≤ w[897] ≤ 0.362 |
| 0.364 ≤ w[898] ≤ 0.366 |
| 0.368 ≤ w[899] ≤ 0.370 |
| 0.372 ≤ w[900] ≤ 0.374 |
| 0.376 ≤ w[901] ≤ 0.378 |
| 0.380 ≤ w[902] ≤ 0.382 |
| 0.384 ≤ w[903] ≤ 0.386 |
| 0.388 ≤ w[904] ≤ 0.390 |
| 0.392 ≤ w[905] ≤ 0.394 |
| 0.396 ≤ w[906] ≤ 0.398 |
| 0.400 ≤ w[907] ≤ 0.402 |

TABLE 5-continued

| (window coefficients w(n); M = 512) |
|---|
| 0.404 ≤ w[908] ≤ 0.406 |
| 0.409 ≤ w[909] ≤ 0.411 |
| 0.413 ≤ w[910] ≤ 0.415 |
| 0.417 ≤ w[911] ≤ 0.419 |
| 0.422 ≤ w[912] ≤ 0.424 |
| 0.426 ≤ w[913] ≤ 0.428 |
| 0.431 ≤ w[914] ≤ 0.433 |
| 0.435 ≤ w[915] ≤ 0.437 |
| 0.440 ≤ w[916] ≤ 0.442 |
| 0.445 ≤ w[917] ≤ 0.447 |
| 0.450 ≤ w[918] ≤ 0.452 |
| 0.454 ≤ w[919] ≤ 0.456 |
| 0.459 ≤ w[920] ≤ 0.461 |
| 0.463 ≤ w[921] ≤ 0.465 |
| 0.468 ≤ w[922] ≤ 0.470 |
| 0.472 ≤ w[923] ≤ 0.474 |
| 0.476 ≤ w[924] ≤ 0.478 |
| 0.481 ≤ w[925] ≤ 0.483 |
| 0.485 ≤ w[926] ≤ 0.487 |
| 0.489 ≤ w[927] ≤ 0.491 |
| 0.493 ≤ w[928] ≤ 0.495 |
| 0.498 ≤ w[929] ≤ 0.500 |
| 0.502 ≤ w[930] ≤ 0.504 |
| 0.506 ≤ w[931] ≤ 0.508 |
| 0.511 ≤ w[932] ≤ 0.513 |
| 0.515 ≤ w[933] ≤ 0.517 |
| 0.520 ≤ w[934] ≤ 0.522 |
| 0.524 ≤ w[935] ≤ 0.526 |
| 0.529 ≤ w[936] ≤ 0.531 |
| 0.533 ≤ w[937] ≤ 0.535 |
| 0.538 ≤ w[938] ≤ 0.540 |
| 0.543 ≤ w[939] ≤ 0.545 |
| 0.547 ≤ w[940] ≤ 0.549 |
| 0.552 ≤ w[941] ≤ 0.554 |
| 0.557 ≤ w[942] ≤ 0.559 |
| 0.562 ≤ w[943] ≤ 0.564 |
| 0.566 ≤ w[944] ≤ 0.568 |
| 0.571 ≤ w[945] ≤ 0.573 |
| 0.575 ≤ w[946] ≤ 0.577 |
| 0.580 ≤ w[947] ≤ 0.582 |
| 0.584 ≤ w[948] ≤ 0.586 |
| 0.589 ≤ w[949] ≤ 0.591 |
| 0.593 ≤ w[950] ≤ 0.595 |
| 0.597 ≤ w[951] ≤ 0.599 |
| 0.602 ≤ w[952] ≤ 0.604 |
| 0.606 ≤ w[953] ≤ 0.608 |
| 0.610 ≤ w[954] ≤ 0.612 |
| 0.614 ≤ w[955] ≤ 0.616 |
| 0.619 ≤ w[956] ≤ 0.621 |
| 0.623 ≤ w[957] ≤ 0.625 |
| 0.627 ≤ w[958] ≤ 0.629 |
| 0.631 ≤ w[959] ≤ 0.633 |
| 0.636 ≤ w[960] ≤ 0.638 |
| 0.640 ≤ w[961] ≤ 0.642 |
| 0.644 ≤ w[962] ≤ 0.646 |
| 0.648 ≤ w[963] ≤ 0.650 |
| 0.653 ≤ w[964] ≤ 0.655 |
| 0.657 ≤ w[965] ≤ 0.659 |
| 0.661 ≤ w[966] ≤ 0.663 |
| 0.666 ≤ w[967] ≤ 0.668 |
| 0.670 ≤ w[968] ≤ 0.672 |
| 0.674 ≤ w[969] ≤ 0.676 |
| 0.678 ≤ w[970] ≤ 0.680 |
| 0.683 ≤ w[971] ≤ 0.685 |
| 0.687 ≤ w[972] ≤ 0.689 |
| 0.691 ≤ w[973] ≤ 0.693 |
| 0.695 ≤ w[974] ≤ 0.697 |
| 0.698 ≤ w[975] ≤ 0.700 |
| 0.702 ≤ w[976] ≤ 0.704 |
| 0.706 ≤ w[977] ≤ 0.708 |
| 0.710 ≤ w[978] ≤ 0.712 |
| 0.714 ≤ w[979] ≤ 0.716 |
| 0.717 ≤ w[980] ≤ 0.719 |
| 0.721 ≤ w[981] ≤ 0.723 |
| 0.725 ≤ w[982] ≤ 0.727 |
| 0.729 ≤ w[983] ≤ 0.731 |
| 0.733 ≤ w[984] ≤ 0.735 |
| 0.736 ≤ w[985] ≤ 0.738 |

TABLE 5-continued

| (window coefficients w(n); M = 512) |
|---|
| 0.740 ≤ w[986] ≤ 0.742 |
| 0.744 ≤ w[987] ≤ 0.746 |
| 0.748 ≤ w[988] ≤ 0.750 |
| 0.751 ≤ w[989] ≤ 0.753 |
| 0.755 ≤ w[990] ≤ 0.757 |
| 0.758 ≤ w[991] ≤ 0.760 |
| 0.762 ≤ w[992] ≤ 0.764 |
| 0.765 ≤ w[993] ≤ 0.767 |
| 0.769 ≤ w[994] ≤ 0.771 |
| 0.772 ≤ w[995] ≤ 0.774 |
| 0.775 ≤ w[996] ≤ 0.777 |
| 0.779 ≤ w[997] ≤ 0.781 |
| 0.782 ≤ w[998] ≤ 0.784 |
| 0.785 ≤ w[999] ≤ 0.787 |
| 0.788 ≤ w[1000] ≤ 0.790 |
| 0.792 ≤ w[1001] ≤ 0.794 |
| 0.795 ≤ w[1002] ≤ 0.797 |
| 0.798 ≤ w[1003] ≤ 0.800 |
| 0.801 ≤ w[1004] ≤ 0.803 |
| 0.805 ≤ w[1005] ≤ 0.807 |
| 0.808 ≤ w[1006] ≤ 0.810 |
| 0.811 ≤ w[1007] ≤ 0.813 |
| 0.814 ≤ w[1008] ≤ 0.816 |
| 0.817 ≤ w[1009] ≤ 0.819 |
| 0.820 ≤ w[1010] ≤ 0.822 |
| 0.822 ≤ w[1011] ≤ 0.824 |
| 0.825 ≤ w[1012] ≤ 0.827 |
| 0.828 ≤ w[1013] ≤ 0.830 |
| 0.831 ≤ w[1014] ≤ 0.833 |
| 0.834 ≤ w[1015] ≤ 0.836 |
| 0.837 ≤ w[1016] ≤ 0.839 |
| 0.839 ≤ w[1017] ≤ 0.841 |
| 0.842 ≤ w[1018] ≤ 0.844 |
| 0.845 ≤ w[1019] ≤ 0.847 |
| 0.847 ≤ w[1020] ≤ 0.849 |
| 0.850 ≤ w[1021] ≤ 0.852 |
| 0.852 ≤ w[1022] ≤ 0.854 |
| 0.855 ≤ w[1023] ≤ 0.857 |

TABLE 6

| (lifting coefficients l(n); M = 512) |
|---|
| −0.162 ≤ l[0] ≤ −0.160 |
| −0.160 ≤ l[1] ≤ −0.158 |
| −0.158 ≤ l[2] ≤ −0.156 |
| −0.156 ≤ l[3] ≤ −0.154 |
| −0.154 ≤ l[4] ≤ −0.152 |
| −0.152 ≤ l[5] ≤ −0.150 |
| −0.150 ≤ l[6] ≤ −0.148 |
| −0.148 ≤ l[7] ≤ −0.146 |
| −0.146 ≤ l[8] ≤ −0.144 |
| −0.144 ≤ l[9] ≤ −0.142 |
| −0.142 ≤ l[10] ≤ −0.140 |
| −0.140 ≤ l[11] ≤ −0.138 |
| −0.138 ≤ l[12] ≤ −0.136 |
| −0.136 ≤ l[13] ≤ −0.134 |
| −0.134 ≤ l[14] ≤ −0.132 |
| −0.132 ≤ l[15] ≤ −0.130 |
| −0.130 ≤ l[16] ≤ −0.128 |
| −0.128 ≤ l[17] ≤ −0.126 |
| −0.126 ≤ l[18] ≤ −0.124 |
| −0.124 ≤ l[19] ≤ −0.122 |
| −0.123 ≤ l[20] ≤ −0.121 |
| −0.121 ≤ l[21] ≤ −0.119 |
| −0.119 ≤ l[22] ≤ −0.117 |
| −0.117 ≤ l[23] ≤ −0.115 |
| −0.115 ≤ l[24] ≤ −0.113 |
| −0.114 ≤ l[25] ≤ −0.112 |
| −0.112 ≤ l[26] ≤ −0.110 |
| −0.110 ≤ l[27] ≤ −0.108 |
| −0.108 ≤ l[28] ≤ −0.106 |
| −0.107 ≤ l[29] ≤ −0.105 |
| −0.105 ≤ l[30] ≤ −0.103 |
| −0.103 ≤ l[31] ≤ −0.101 |

TABLE 6-continued

| (lifting coefficients l(n); M = 512) |
|---|
| −0.102 ≤ l[32] ≤ −0.100 |
| −0.100 ≤ l[33] ≤ −0.098 |
| −0.098 ≤ l[34] ≤ −0.096 |
| −0.097 ≤ l[35] ≤ −0.095 |
| −0.095 ≤ l[36] ≤ −0.093 |
| −0.093 ≤ l[37] ≤ −0.091 |
| −0.092 ≤ l[38] ≤ −0.090 |
| −0.090 ≤ l[39] ≤ −0.088 |
| −0.089 ≤ l[40] ≤ −0.087 |
| −0.087 ≤ l[41] ≤ −0.085 |
| −0.086 ≤ l[42] ≤ −0.084 |
| −0.084 ≤ l[43] ≤ −0.082 |
| −0.083 ≤ l[44] ≤ −0.081 |
| −0.081 ≤ l[45] ≤ −0.079 |
| −0.080 ≤ l[46] ≤ −0.078 |
| −0.078 ≤ l[47] ≤ −0.076 |
| −0.077 ≤ l[48] ≤ −0.075 |
| −0.075 ≤ l[49] ≤ −0.073 |
| −0.074 ≤ l[50] ≤ −0.072 |
| −0.072 ≤ l[51] ≤ −0.070 |
| −0.071 ≤ l[52] ≤ −0.069 |
| −0.070 ≤ l[53] ≤ −0.068 |
| −0.068 ≤ l[54] ≤ −0.066 |
| −0.067 ≤ l[55] ≤ −0.065 |
| −0.066 ≤ l[56] ≤ −0.064 |
| −0.064 ≤ l[57] ≤ −0.062 |
| −0.063 ≤ l[58] ≤ −0.061 |
| −0.062 ≤ l[59] ≤ −0.060 |
| −0.060 ≤ l[60] ≤ −0.058 |
| −0.059 ≤ l[61] ≤ −0.057 |
| −0.058 ≤ l[62] ≤ −0.056 |
| −0.057 ≤ l[63] ≤ −0.055 |
| −0.055 ≤ l[64] ≤ −0.053 |
| −0.054 ≤ l[65] ≤ −0.052 |
| −0.053 ≤ l[66] ≤ −0.051 |
| −0.052 ≤ l[67] ≤ −0.050 |
| −0.051 ≤ l[68] ≤ −0.049 |
| −0.049 ≤ l[69] ≤ −0.047 |
| −0.048 ≤ l[70] ≤ −0.046 |
| −0.047 ≤ l[71] ≤ −0.045 |
| −0.046 ≤ l[72] ≤ −0.044 |
| −0.045 ≤ l[73] ≤ −0.043 |
| −0.044 ≤ l[74] ≤ −0.042 |
| −0.043 ≤ l[75] ≤ −0.041 |
| −0.042 ≤ l[76] ≤ −0.040 |
| −0.041 ≤ l[77] ≤ −0.039 |
| −0.040 ≤ l[78] ≤ −0.038 |
| −0.039 ≤ l[79] ≤ −0.037 |
| −0.038 ≤ l[80] ≤ −0.036 |
| −0.037 ≤ l[81] ≤ −0.035 |
| −0.036 ≤ l[82] ≤ −0.034 |
| −0.035 ≤ l[83] ≤ −0.033 |
| −0.034 ≤ l[84] ≤ −0.032 |
| −0.033 ≤ l[85] ≤ −0.031 |
| −0.032 ≤ l[86] ≤ −0.030 |
| −0.031 ≤ l[87] ≤ −0.029 |
| −0.030 ≤ l[88] ≤ −0.028 |
| −0.029 ≤ l[89] ≤ −0.027 |
| −0.028 ≤ l[90] ≤ −0.026 |
| −0.027 ≤ l[91] ≤ −0.025 |
| −0.026 ≤ l[92] ≤ −0.024 |
| −0.026 ≤ l[93] ≤ −0.024 |
| −0.025 ≤ l[94] ≤ −0.023 |
| −0.024 ≤ l[95] ≤ −0.022 |
| −0.023 ≤ l[96] ≤ −0.021 |
| −0.022 ≤ l[97] ≤ −0.020 |
| −0.021 ≤ l[98] ≤ −0.019 |
| −0.021 ≤ l[99] ≤ −0.019 |
| −0.020 ≤ l[100] ≤ −0.018 |
| −0.019 ≤ l[101] ≤ −0.017 |
| −0.018 ≤ l[102] ≤ −0.016 |
| −0.018 ≤ l[103] ≤ −0.016 |
| −0.017 ≤ l[104] ≤ −0.015 |
| −0.016 ≤ l[105] ≤ −0.014 |
| −0.016 ≤ l[106] ≤ −0.014 |
| −0.015 ≤ l[107] ≤ −0.013 |
| −0.014 ≤ l[108] ≤ −0.012 |
| −0.014 ≤ l[109] ≤ −0.012 |

TABLE 6-continued

| (lifting coefficients l(n); M = 512) |
|---|
| −0.013 ≤ l[110] ≤ −0.011 |
| −0.012 ≤ l[111] ≤ −0.010 |
| −0.012 ≤ l[112] ≤ −0.010 |
| −0.011 ≤ l[113] ≤ −0.009 |
| −0.010 ≤ l[114] ≤ −0.008 |
| −0.010 ≤ l[115] ≤ −0.008 |
| −0.009 ≤ l[116] ≤ −0.007 |
| −0.009 ≤ l[117] ≤ −0.007 |
| −0.008 ≤ l[118] ≤ −0.006 |
| −0.008 ≤ l[119] ≤ −0.006 |
| −0.007 ≤ l[120] ≤ −0.005 |
| −0.007 ≤ l[121] ≤ −0.005 |
| −0.006 ≤ l[122] ≤ −0.004 |
| −0.006 ≤ l[123] ≤ −0.004 |
| −0.005 ≤ l[124] ≤ −0.003 |
| −0.005 ≤ l[125] ≤ −0.003 |
| −0.004 ≤ l[126] ≤ −0.002 |
| −0.004 ≤ l[127] ≤ −0.002 |
| −0.003 ≤ l[128] ≤ −0.001 |
| −0.003 ≤ l[129] ≤ −0.001 |
| −0.002 ≤ l[130] ≤ 0.000 |
| −0.002 ≤ l[131] ≤ 0.000 |
| −0.002 ≤ l[132] ≤ 0.000 |
| −0.001 ≤ l[133] ≤ 0.001 |
| −0.001 ≤ l[134] ≤ 0.001 |
| 0.000 ≤ l[135] ≤ 0.002 |
| 0.000 ≤ l[136] ≤ 0.002 |
| 0.000 ≤ l[137] ≤ 0.002 |
| 0.001 ≤ l[138] ≤ 0.003 |
| 0.001 ≤ l[139] ≤ 0.003 |
| 0.001 ≤ l[140] ≤ 0.003 |
| 0.002 ≤ l[141] ≤ 0.004 |
| 0.002 ≤ l[142] ≤ 0.004 |
| 0.002 ≤ l[143] ≤ 0.004 |
| 0.003 ≤ l[144] ≤ 0.005 |
| 0.003 ≤ l[145] ≤ 0.005 |
| 0.003 ≤ l[146] ≤ 0.005 |
| 0.003 ≤ l[147] ≤ 0.005 |
| 0.004 ≤ l[148] ≤ 0.006 |
| 0.004 ≤ l[149] ≤ 0.006 |
| 0.004 ≤ l[150] ≤ 0.006 |
| 0.004 ≤ l[151] ≤ 0.006 |
| 0.004 ≤ l[152] ≤ 0.006 |
| 0.005 ≤ l[153] ≤ 0.007 |
| 0.005 ≤ l[154] ≤ 0.007 |
| 0.005 ≤ l[155] ≤ 0.007 |
| 0.005 ≤ l[156] ≤ 0.007 |
| 0.005 ≤ l[157] ≤ 0.007 |
| 0.006 ≤ l[158] ≤ 0.008 |
| 0.006 ≤ l[159] ≤ 0.008 |
| 0.006 ≤ l[160] ≤ 0.008 |
| 0.006 ≤ l[161] ≤ 0.008 |
| 0.006 ≤ l[162] ≤ 0.008 |
| 0.007 ≤ l[163] ≤ 0.009 |
| 0.007 ≤ l[164] ≤ 0.009 |
| 0.007 ≤ l[165] ≤ 0.009 |
| 0.007 ≤ l[166] ≤ 0.009 |
| 0.007 ≤ l[167] ≤ 0.009 |
| 0.007 ≤ l[168] ≤ 0.009 |
| 0.007 ≤ l[169] ≤ 0.009 |
| 0.007 ≤ l[170] ≤ 0.009 |
| 0.007 ≤ l[171] ≤ 0.009 |
| 0.007 ≤ l[172] ≤ 0.009 |
| 0.007 ≤ l[173] ≤ 0.009 |
| 0.007 ≤ l[174] ≤ 0.009 |
| 0.007 ≤ l[175] ≤ 0.009 |
| 0.007 ≤ l[176] ≤ 0.009 |
| 0.007 ≤ l[177] ≤ 0.009 |
| 0.008 ≤ l[178] ≤ 0.010 |
| 0.008 ≤ l[179] ≤ 0.010 |
| 0.008 ≤ l[180] ≤ 0.010 |
| 0.008 ≤ l[181] ≤ 0.010 |
| 0.008 ≤ l[182] ≤ 0.010 |
| 0.008 ≤ l[183] ≤ 0.010 |
| 0.008 ≤ l[184] ≤ 0.010 |
| 0.008 ≤ l[185] ≤ 0.010 |
| 0.008 ≤ l[186] ≤ 0.010 |
| 0.008 ≤ l[187] ≤ 0.010 |

TABLE 6-continued

| (lifting coefficients l(n); M = 512) |
|---|
| 0.008 ≤ l[188] ≤ 0.010 |
| 0.008 ≤ l[189] ≤ 0.010 |
| 0.008 ≤ l[190] ≤ 0.010 |
| 0.008 ≤ l[191] ≤ 0.010 |
| 0.008 ≤ l[192] ≤ 0.010 |
| 0.008 ≤ l[193] ≤ 0.010 |
| 0.008 ≤ l[194] ≤ 0.010 |
| 0.008 ≤ l[195] ≤ 0.010 |
| 0.007 ≤ l[196] ≤ 0.009 |
| 0.007 ≤ l[197] ≤ 0.009 |
| 0.007 ≤ l[198] ≤ 0.009 |
| 0.007 ≤ l[199] ≤ 0.009 |
| 0.007 ≤ l[200] ≤ 0.009 |
| 0.007 ≤ l[201] ≤ 0.009 |
| 0.007 ≤ l[202] ≤ 0.009 |
| 0.007 ≤ l[203] ≤ 0.009 |
| 0.007 ≤ l[204] ≤ 0.009 |
| 0.007 ≤ l[205] ≤ 0.009 |
| 0.007 ≤ l[206] ≤ 0.009 |
| 0.007 ≤ l[207] ≤ 0.009 |
| 0.007 ≤ l[208] ≤ 0.009 |
| 0.006 ≤ l[209] ≤ 0.008 |
| 0.006 ≤ l[210] ≤ 0.008 |
| 0.006 ≤ l[211] ≤ 0.008 |
| 0.006 ≤ l[212] ≤ 0.008 |
| 0.006 ≤ l[213] ≤ 0.008 |
| 0.006 ≤ l[214] ≤ 0.008 |
| 0.006 ≤ l[215] ≤ 0.008 |
| 0.006 ≤ l[216] ≤ 0.008 |
| 0.005 ≤ l[217] ≤ 0.007 |
| 0.005 ≤ l[218] ≤ 0.007 |
| 0.005 ≤ l[219] ≤ 0.007 |
| 0.005 ≤ l[220] ≤ 0.007 |
| 0.005 ≤ l[221] ≤ 0.007 |
| 0.005 ≤ l[222] ≤ 0.007 |
| 0.005 ≤ l[223] ≤ 0.007 |
| 0.004 ≤ l[224] ≤ 0.006 |
| 0.004 ≤ l[225] ≤ 0.006 |
| 0.004 ≤ l[226] ≤ 0.006 |
| 0.004 ≤ l[227] ≤ 0.006 |
| 0.004 ≤ l[228] ≤ 0.006 |
| 0.004 ≤ l[229] ≤ 0.006 |
| 0.004 ≤ l[230] ≤ 0.006 |
| 0.003 ≤ l[231] ≤ 0.005 |
| 0.003 ≤ l[232] ≤ 0.005 |
| 0.003 ≤ l[233] ≤ 0.005 |
| 0.003 ≤ l[234] ≤ 0.005 |
| 0.003 ≤ l[235] ≤ 0.005 |
| 0.003 ≤ l[236] ≤ 0.005 |
| 0.002 ≤ l[237] ≤ 0.004 |
| 0.002 ≤ l[238] ≤ 0.004 |
| 0.002 ≤ l[239] ≤ 0.004 |
| 0.002 ≤ l[240] ≤ 0.004 |
| 0.002 ≤ l[241] ≤ 0.004 |
| 0.002 ≤ l[242] ≤ 0.004 |
| 0.001 ≤ l[243] ≤ 0.003 |
| 0.001 ≤ l[244] ≤ 0.003 |
| 0.001 ≤ l[245] ≤ 0.003 |
| 0.001 ≤ l[246] ≤ 0.003 |
| 0.001 ≤ l[247] ≤ 0.003 |
| 0.000 ≤ l[248] ≤ 0.002 |
| 0.000 ≤ l[249] ≤ 0.002 |
| 0.000 ≤ l[250] ≤ 0.002 |
| 0.000 ≤ l[251] ≤ 0.002 |
| 0.000 ≤ l[252] ≤ 0.002 |
| −0.001 ≤ l[253] ≤ 0.001 |
| −0.001 ≤ l[254] ≤ 0.001 |
| −0.001 ≤ l[255] ≤ 0.001 |
| −0.082 ≤ l[256] ≤ −0.080 |
| −0.083 ≤ l[257] ≤ −0.081 |
| −0.084 ≤ l[258] ≤ −0.082 |
| −0.085 ≤ l[259] ≤ −0.083 |
| −0.086 ≤ l[260] ≤ −0.084 |
| −0.086 ≤ l[261] ≤ −0.084 |
| −0.087 ≤ l[262] ≤ −0.085 |
| −0.088 ≤ l[263] ≤ −0.086 |
| −0.089 ≤ l[264] ≤ −0.087 |
| −0.089 ≤ l[265] ≤ −0.087 |

TABLE 6-continued

| (lifting coefficients l(n); M = 512) |
|---|
| −0.090 ≤ l[266] ≤ −0.088 |
| −0.091 ≤ l[267] ≤ −0.089 |
| −0.092 ≤ l[268] ≤ −0.090 |
| −0.092 ≤ l[269] ≤ −0.090 |
| −0.093 ≤ l[270] ≤ −0.091 |
| −0.094 ≤ l[271] ≤ −0.092 |
| −0.095 ≤ l[272] ≤ −0.093 |
| −0.095 ≤ l[273] ≤ −0.093 |
| −0.096 ≤ l[274] ≤ −0.094 |
| −0.097 ≤ l[275] ≤ −0.095 |
| −0.098 ≤ l[276] ≤ −0.096 |
| −0.098 ≤ l[277] ≤ −0.096 |
| −0.099 ≤ l[278] ≤ −0.097 |
| −0.100 ≤ l[279] ≤ −0.098 |
| −0.100 ≤ l[280] ≤ −0.098 |
| −0.101 ≤ l[281] ≤ −0.099 |
| −0.102 ≤ l[282] ≤ −0.100 |
| −0.102 ≤ l[283] ≤ −0.100 |
| −0.103 ≤ l[284] ≤ −0.101 |
| −0.104 ≤ l[285] ≤ −0.102 |
| −0.104 ≤ l[286] ≤ −0.102 |
| −0.105 ≤ l[287] ≤ −0.103 |
| −0.106 ≤ l[288] ≤ −0.104 |
| −0.106 ≤ l[289] ≤ −0.104 |
| −0.107 ≤ l[290] ≤ −0.105 |
| −0.108 ≤ l[291] ≤ −0.106 |
| −0.108 ≤ l[292] ≤ −0.106 |
| −0.109 ≤ l[293] ≤ −0.107 |
| −0.110 ≤ l[294] ≤ −0.108 |
| −0.110 ≤ l[295] ≤ −0.108 |
| −0.111 ≤ l[296] ≤ −0.109 |
| −0.112 ≤ l[297] ≤ −0.110 |
| −0.112 ≤ l[298] ≤ −0.110 |
| −0.113 ≤ l[299] ≤ −0.111 |
| −0.114 ≤ l[300] ≤ −0.112 |
| −0.114 ≤ l[301] ≤ −0.112 |
| −0.115 ≤ l[302] ≤ −0.113 |
| −0.116 ≤ l[303] ≤ −0.114 |
| −0.117 ≤ l[304] ≤ −0.115 |
| −0.118 ≤ l[305] ≤ −0.116 |
| −0.119 ≤ l[306] ≤ −0.117 |
| −0.120 ≤ l[307] ≤ −0.118 |
| −0.121 ≤ l[308] ≤ −0.119 |
| −0.122 ≤ l[309] ≤ −0.120 |
| −0.123 ≤ l[310] ≤ −0.121 |
| −0.124 ≤ l[311] ≤ −0.122 |
| −0.125 ≤ l[312] ≤ −0.123 |
| −0.126 ≤ l[313] ≤ −0.124 |
| −0.128 ≤ l[314] ≤ −0.126 |
| −0.129 ≤ l[315] ≤ −0.127 |
| −0.130 ≤ l[316] ≤ −0.128 |
| −0.132 ≤ l[317] ≤ −0.130 |
| −0.134 ≤ l[318] ≤ −0.132 |
| −0.135 ≤ l[319] ≤ −0.133 |
| −0.137 ≤ l[320] ≤ −0.135 |
| −0.138 ≤ l[321] ≤ −0.136 |
| −0.140 ≤ l[322] ≤ −0.138 |
| −0.142 ≤ l[323] ≤ −0.140 |
| −0.143 ≤ l[324] ≤ −0.141 |
| −0.144 ≤ l[325] ≤ −0.142 |
| −0.146 ≤ l[326] ≤ −0.144 |
| −0.147 ≤ l[327] ≤ −0.145 |
| −0.148 ≤ l[328] ≤ −0.146 |
| −0.149 ≤ l[329] ≤ −0.147 |
| −0.151 ≤ l[330] ≤ −0.149 |
| −0.152 ≤ l[331] ≤ −0.150 |
| −0.153 ≤ l[332] ≤ −0.151 |
| −0.154 ≤ l[333] ≤ −0.152 |
| −0.155 ≤ l[334] ≤ −0.153 |
| −0.155 ≤ l[335] ≤ −0.153 |
| −0.156 ≤ l[336] ≤ −0.154 |
| −0.157 ≤ l[337] ≤ −0.155 |
| −0.158 ≤ l[338] ≤ −0.156 |
| −0.158 ≤ l[339] ≤ −0.156 |
| −0.159 ≤ l[340] ≤ −0.157 |
| −0.160 ≤ l[341] ≤ −0.158 |
| −0.160 ≤ l[342] ≤ −0.158 |
| −0.161 ≤ l[343] ≤ −0.159 |

TABLE 6-continued

| (lifting coefficients l(n); M = 512) |
|---|
| −0.161 ≤ l[344] ≤ −0.159 |
| −0.161 ≤ l[345] ≤ −0.159 |
| −0.162 ≤ l[346] ≤ −0.160 |
| −0.162 ≤ l[347] ≤ −0.160 |
| −0.162 ≤ l[348] ≤ −0.160 |
| −0.163 ≤ l[349] ≤ −0.161 |
| −0.163 ≤ l[350] ≤ −0.161 |
| −0.163 ≤ l[351] ≤ −0.161 |
| −0.163 ≤ l[352] ≤ −0.161 |
| −0.163 ≤ l[353] ≤ −0.161 |
| −0.163 ≤ l[354] ≤ −0.161 |
| −0.163 ≤ l[355] ≤ −0.161 |
| −0.163 ≤ l[356] ≤ −0.161 |
| −0.163 ≤ l[357] ≤ −0.161 |
| −0.163 ≤ l[358] ≤ −0.161 |
| −0.162 ≤ l[359] ≤ −0.160 |
| −0.162 ≤ l[360] ≤ −0.160 |
| −0.162 ≤ l[361] ≤ −0.160 |
| −0.161 ≤ l[362] ≤ −0.159 |
| −0.161 ≤ l[363] ≤ −0.159 |
| −0.161 ≤ l[364] ≤ −0.159 |
| −0.160 ≤ l[365] ≤ −0.158 |
| −0.160 ≤ l[366] ≤ −0.158 |
| −0.159 ≤ l[367] ≤ −0.157 |
| −0.159 ≤ l[368] ≤ −0.157 |
| −0.158 ≤ l[369] ≤ −0.156 |
| −0.158 ≤ l[370] ≤ −0.156 |
| −0.157 ≤ l[371] ≤ −0.155 |
| −0.156 ≤ l[372] ≤ −0.154 |
| −0.156 ≤ l[373] ≤ −0.154 |
| −0.155 ≤ l[374] ≤ −0.153 |
| −0.154 ≤ l[375] ≤ −0.152 |
| −0.154 ≤ l[376] ≤ −0.152 |
| −0.153 ≤ l[377] ≤ −0.151 |
| −0.152 ≤ l[378] ≤ −0.150 |
| −0.151 ≤ l[379] ≤ −0.149 |
| −0.150 ≤ l[380] ≤ −0.148 |
| −0.149 ≤ l[381] ≤ −0.147 |
| −0.148 ≤ l[382] ≤ −0.146 |
| −0.147 ≤ l[383] ≤ −0.145 |
| −0.146 ≤ l[384] ≤ −0.144 |
| −0.145 ≤ l[385] ≤ −0.143 |
| −0.144 ≤ l[386] ≤ −0.142 |
| −0.143 ≤ l[387] ≤ −0.141 |
| −0.142 ≤ l[388] ≤ −0.140 |
| −0.141 ≤ l[389] ≤ −0.139 |
| −0.140 ≤ l[390] ≤ −0.138 |
| −0.139 ≤ l[391] ≤ −0.137 |
| −0.138 ≤ l[392] ≤ −0.136 |
| −0.136 ≤ l[393] ≤ −0.134 |
| −0.135 ≤ l[394] ≤ −0.133 |
| −0.134 ≤ l[395] ≤ −0.132 |
| −0.133 ≤ l[396] ≤ −0.131 |
| −0.131 ≤ l[397] ≤ −0.129 |
| −0.130 ≤ l[398] ≤ −0.128 |
| −0.129 ≤ l[399] ≤ −0.127 |
| −0.127 ≤ l[400] ≤ −0.125 |
| −0.126 ≤ l[401] ≤ −0.124 |
| −0.125 ≤ l[402] ≤ −0.123 |
| −0.123 ≤ l[403] ≤ −0.121 |
| −0.122 ≤ l[404] ≤ −0.120 |
| −0.121 ≤ l[405] ≤ −0.119 |
| −0.119 ≤ l[406] ≤ −0.117 |
| −0.118 ≤ l[407] ≤ −0.116 |
| −0.116 ≤ l[408] ≤ −0.114 |
| −0.115 ≤ l[409] ≤ −0.113 |
| −0.113 ≤ l[410] ≤ −0.111 |
| −0.112 ≤ l[411] ≤ −0.110 |
| −0.111 ≤ l[412] ≤ −0.109 |
| −0.109 ≤ l[413] ≤ −0.107 |
| −0.108 ≤ l[414] ≤ −0.106 |
| −0.106 ≤ l[415] ≤ −0.104 |
| −0.104 ≤ l[416] ≤ −0.102 |
| −0.103 ≤ l[417] ≤ −0.101 |
| −0.101 ≤ l[418] ≤ −0.099 |
| −0.100 ≤ l[419] ≤ −0.098 |
| −0.098 ≤ l[420] ≤ −0.096 |
| −0.097 ≤ l[421] ≤ −0.095 |

TABLE 6-continued

| (lifting coefficients l(n); M = 512) |
|---|
| −0.095 ≤ l[422] ≤ −0.093 |
| −0.094 ≤ l[423] ≤ −0.092 |
| −0.092 ≤ l[424] ≤ −0.090 |
| −0.091 ≤ l[425] ≤ −0.089 |
| −0.089 ≤ l[426] ≤ −0.087 |
| −0.087 ≤ l[427] ≤ −0.085 |
| −0.086 ≤ l[428] ≤ −0.084 |
| −0.084 ≤ l[429] ≤ −0.082 |
| −0.083 ≤ l[430] ≤ −0.081 |
| −0.081 ≤ l[431] ≤ −0.079 |
| −0.080 ≤ l[432] ≤ −0.078 |
| −0.078 ≤ l[433] ≤ −0.076 |
| −0.076 ≤ l[434] ≤ −0.074 |
| −0.075 ≤ l[435] ≤ −0.073 |
| −0.073 ≤ l[436] ≤ −0.071 |
| −0.072 ≤ l[437] ≤ −0.070 |
| −0.070 ≤ l[438] ≤ −0.068 |
| −0.069 ≤ l[439] ≤ −0.067 |
| −0.067 ≤ l[440] ≤ −0.065 |
| −0.065 ≤ l[441] ≤ −0.063 |
| −0.064 ≤ l[442] ≤ −0.062 |
| −0.062 ≤ l[443] ≤ −0.060 |
| −0.061 ≤ l[444] ≤ −0.059 |
| −0.059 ≤ l[445] ≤ −0.057 |
| −0.058 ≤ l[446] ≤ −0.056 |
| −0.056 ≤ l[447] ≤ −0.054 |
| −0.055 ≤ l[448] ≤ −0.053 |
| −0.053 ≤ l[449] ≤ −0.051 |
| −0.052 ≤ l[450] ≤ −0.050 |
| −0.050 ≤ l[451] ≤ −0.048 |
| −0.049 ≤ l[452] ≤ −0.047 |
| −0.047 ≤ l[453] ≤ −0.045 |
| −0.046 ≤ l[454] ≤ −0.044 |
| −0.045 ≤ l[455] ≤ −0.043 |
| −0.043 ≤ l[456] ≤ −0.041 |
| −0.042 ≤ l[457] ≤ −0.040 |
| −0.040 ≤ l[458] ≤ −0.038 |
| −0.039 ≤ l[459] ≤ −0.037 |
| −0.038 ≤ l[460] ≤ −0.036 |
| −0.036 ≤ l[461] ≤ −0.034 |
| −0.035 ≤ l[462] ≤ −0.033 |
| −0.034 ≤ l[463] ≤ −0.032 |
| −0.032 ≤ l[464] ≤ −0.030 |
| −0.031 ≤ l[465] ≤ −0.029 |
| −0.030 ≤ l[466] ≤ −0.028 |
| −0.029 ≤ l[467] ≤ −0.027 |
| −0.027 ≤ l[468] ≤ −0.025 |
| −0.026 ≤ l[469] ≤ −0.024 |
| −0.025 ≤ l[470] ≤ −0.023 |
| −0.024 ≤ l[471] ≤ −0.022 |
| −0.023 ≤ l[472] ≤ −0.021 |
| −0.022 ≤ l[473] ≤ −0.020 |
| −0.021 ≤ l[474] ≤ −0.019 |
| −0.020 ≤ l[475] ≤ −0.018 |
| −0.018 ≤ l[476] ≤ −0.016 |
| −0.017 ≤ l[477] ≤ −0.015 |
| −0.016 ≤ l[478] ≤ −0.014 |
| −0.016 ≤ l[479] ≤ −0.014 |
| −0.015 ≤ l[480] ≤ −0.013 |
| −0.014 ≤ l[481] ≤ −0.012 |
| −0.013 ≤ l[482] ≤ −0.011 |
| −0.012 ≤ l[483] ≤ −0.010 |
| −0.011 ≤ l[484] ≤ −0.009 |
| −0.010 ≤ l[485] ≤ −0.008 |
| −0.010 ≤ l[486] ≤ −0.008 |
| −0.009 ≤ l[487] ≤ −0.007 |
| −0.008 ≤ l[488] ≤ −0.006 |
| −0.007 ≤ l[489] ≤ −0.005 |
| −0.007 ≤ l[490] ≤ −0.005 |
| −0.006 ≤ l[491] ≤ −0.004 |
| −0.006 ≤ l[492] ≤ −0.004 |
| −0.005 ≤ l[493] ≤ −0.003 |
| −0.004 ≤ l[494] ≤ −0.002 |
| −0.004 ≤ l[495] ≤ −0.002 |
| −0.003 ≤ l[496] ≤ −0.001 |
| −0.003 ≤ l[497] ≤ −0.001 |
| −0.003 ≤ l[498] ≤ −0.001 |
| −0.002 ≤ l[499] ≤ 0.000 |

TABLE 6-continued

| (lifting coefficients l(n); M = 512) |
|---|
| −0.002 ≤ l[500] ≤ 0.000 |
| −0.002 ≤ l[501] ≤ 0.000 |
| −0.002 ≤ l[502] ≤ 0.000 |
| −0.001 ≤ l[503] ≤ 0.001 |
| −0.001 ≤ l[504] ≤ 0.001 |
| −0.001 ≤ l[505] ≤ 0.001 |
| −0.001 ≤ l[506] ≤ 0.001 |
| −0.001 ≤ l[507] ≤ 0.001 |
| −0.001 ≤ l[508] ≤ 0.001 |
| −0.001 ≤ l[509] ≤ 0.001 |
| −0.001 ≤ l[510] ≤ 0.001 |
| −0.001 ≤ l[511] ≤ 0.001 |

TABLE 7

| (window coefficients w(n); M = 512) |
|---|
| w[0] = −0.5814503045 |
| w[1] = −0.5771483425 |
| w[2] = −0.5728271028 |
| w[3] = −0.5684861526 |
| w[4] = −0.5641251320 |
| w[5] = −0.5597437553 |
| w[6] = −0.5553418111 |
| w[7] = −0.5509191640 |
| w[8] = −0.5464757549 |
| w[9] = −0.5420116024 |
| w[10] = −0.5375268036 |
| w[11] = −0.5330215135 |
| w[12] = −0.5284958733 |
| w[13] = −0.5239499840 |
| w[14] = −0.5193839081 |
| w[15] = −0.5147977085 |
| w[16] = −0.5101913154 |
| w[17] = −0.5055643952 |
| w[18] = −0.5009163562 |
| w[19] = −0.4962467946 |
| w[20] = −0.4915559394 |
| w[21] = −0.4868445026 |
| w[22] = −0.4821136488 |
| w[23] = −0.4773643469 |
| w[24] = −0.4725972174 |
| w[25] = −0.4678130913 |
| w[26] = −0.4630130178 |
| w[27] = −0.4581975902 |
| w[28] = −0.4533663158 |
| w[29] = −0.4485178627 |
| w[30] = −0.4436501369 |
| w[31] = −0.4387620962 |
| w[32] = −0.4338544061 |
| w[33] = −0.4289280480 |
| w[34] = −0.4239842345 |
| w[35] = −0.4190239765 |
| w[36] = −0.4140481876 |
| w[37] = −0.4090581964 |
| w[38] = −0.4040557507 |
| w[39] = −0.3990423565 |
| w[40] = −0.3940191176 |
| w[41] = −0.3889873029 |
| w[42] = −0.3839483607 |
| w[43] = −0.3789034867 |
| w[44] = −0.3738534660 |
| w[45] = −0.3687990023 |
| w[46] = −0.3637407151 |
| w[47] = −0.3586786540 |
| w[48] = −0.3536118830 |
| w[49] = −0.3485386785 |
| w[50] = −0.3434566147 |
| w[51] = −0.3383646961 |
| w[52] = −0.3332639699 |
| w[53] = −0.3281557852 |
| w[54] = −0.3230417222 |
| w[55] = −0.3179238506 |
| w[56] = −0.3128050784 |
| w[57] = −0.3076891445 |

TABLE 7-continued

| (window coefficients w(n); M = 512) |
|---|
| w[58] = −0.3025805481 |
| w[59] = −0.2974824667 |
| w[60] = −0.2923962815 |
| w[61] = −0.2873233624 |
| w[62] = −0.2822651360 |
| w[63] = −0.2772226243 |
| w[64] = −0.2721963044 |
| w[65] = −0.2671864768 |
| w[66] = −0.2621932979 |
| w[67] = −0.2572171937 |
| w[68] = −0.2522588673 |
| w[69] = −0.2473188875 |
| w[70] = −0.2423976656 |
| w[71] = −0.2374954166 |
| w[72] = −0.2326121005 |
| w[73] = −0.2277474151 |
| w[74] = −0.2229008283 |
| w[75] = −0.2180724405 |
| w[76] = −0.2132631228 |
| w[77] = −0.2084737425 |
| w[78] = −0.2037051218 |
| w[79] = −0.1989580004 |
| w[80] = −0.1942332242 |
| w[81] = −0.1895319122 |
| w[82] = −0.1848554848 |
| w[83] = −0.1802060045 |
| w[84] = −0.1755863325 |
| w[85] = −0.1709999089 |
| w[86] = −0.1664506990 |
| w[87] = −0.1619419312 |
| w[88] = −0.1574759354 |
| w[89] = −0.1530553130 |
| w[90] = −0.1486829107 |
| w[91] = −0.1443598589 |
| w[92] = −0.1400852903 |
| w[93] = −0.1358581172 |
| w[94] = −0.1316770499 |
| w[95] = −0.1275391140 |
| w[96] = −0.1234392159 |
| w[97] = −0.1193713266 |
| w[98] = −0.1153286681 |
| w[99] = −0.1113069687 |
| w[100] = −0.1073045631 |
| w[101] = −0.1033191706 |
| w[102] = −0.0993477087 |
| w[103] = −0.0953861831 |
| w[104] = −0.0914303473 |
| w[105] = −0.0874762304 |
| w[106] = −0.0835202373 |
| w[107] = −0.0795609620 |
| w[108] = −0.0755997597 |
| w[109] = −0.0716393653 |
| w[110] = −0.0676836353 |
| w[111] = −0.0637317296 |
| w[112] = −0.0597772275 |
| w[113] = −0.0558134171 |
| w[114] = −0.0518335706 |
| w[115] = −0.0478309358 |
| w[116] = −0.0437978282 |
| w[117] = −0.0397249946 |
| w[118] = −0.0356026120 |
| w[119] = −0.0314450289 |
| w[120] = −0.0272925912 |
| w[121] = −0.0231880880 |
| w[122] = −0.0191766370 |
| w[123] = −0.0153255503 |
| w[124] = −0.0117264068 |
| w[125] = −0.0084767653 |
| w[126] = −0.0056774478 |
| w[127] = −0.0033883435 |
| w[128] = 0.0000000000 |
| w[129] = 0.0000000000 |
| w[130] = 0.0000000000 |
| w[131] = 0.0000000000 |
| w[132] = 0.0000000000 |
| w[133] = 0.0000000000 |
| w[134] = 0.0000000000 |
| w[135] = 0.0000000000 |

TABLE 7-continued

| (window coefficients w(n); M = 512) |
|---|
| w[136] = 0.0000000000 |
| w[137] = 0.0000000000 |
| w[138] = 0.0000000000 |
| w[139] = 0.0000000000 |
| w[140] = 0.0000000000 |
| w[141] = 0.0000000000 |
| w[142] = 0.0000000000 |
| w[143] = 0.0000000000 |
| w[144] = 0.0000000000 |
| w[145] = 0.0000000000 |
| w[146] = 0.0000000000 |
| w[147] = 0.0000000000 |
| w[148] = 0.0000000000 |
| w[149] = 0.0000000000 |
| w[150] = 0.0000000000 |
| w[151] = 0.0000000000 |
| w[152] = 0.0000000000 |
| w[153] = 0.0000000000 |
| w[154] = 0.0000000000 |
| w[155] = 0.0000000000 |
| w[156] = 0.0000000000 |
| w[157] = 0.0000000000 |
| w[158] = 0.0000000000 |
| w[159] = 0.0000000000 |
| w[160] = 0.0000000000 |
| w[161] = 0.0000000000 |
| w[162] = 0.0000000000 |
| w[163] = 0.0000000000 |
| w[164] = 0.0000000000 |
| w[165] = 0.0000000000 |
| w[166] = 0.0000000000 |
| w[167] = 0.0000000000 |
| w[168] = 0.0000000000 |
| w[169] = 0.0000000000 |
| w[170] = 0.0000000000 |
| w[171] = 0.0000000000 |
| w[172] = 0.0000000000 |
| w[173] = 0.0000000000 |
| w[174] = 0.0000000000 |
| w[175] = 0.0000000000 |
| w[176] = 0.0000000000 |
| w[177] = 0.0000000000 |
| w[178] = 0.0000000000 |
| w[179] = 0.0000000000 |
| w[180] = 0.0000000000 |
| w[181] = 0.0000000000 |
| w[182] = 0.0000000000 |
| w[183] = 0.0000000000 |
| w[184] = 0.0000000000 |
| w[185] = 0.0000000000 |
| w[186] = 0.0000000000 |
| w[187] = 0.0000000000 |
| w[188] = 0.0000000000 |
| w[189] = 0.0000000000 |
| w[190] = 0.0000000000 |
| w[191] = 0.0000000000 |
| w[192] = 0.0000000000 |
| w[193] = 0.0000000000 |
| w[194] = 0.0000000000 |
| w[195] = 0.0000000000 |
| w[196] = 0.0000000000 |
| w[197] = 0.0000000000 |
| w[198] = 0.0000000000 |
| w[199] = 0.0000000000 |
| w[200] = 0.0000000000 |
| w[201] = 0.0000000000 |
| w[202] = 0.0000000000 |
| w[203] = 0.0000000000 |
| w[204] = 0.0000000000 |
| w[205] = 0.0000000000 |
| w[206] = 0.0000000000 |
| w[207] = 0.0000000000 |
| w[208] = 0.0000000000 |
| w[209] = 0.0000000000 |
| w[210] = 0.0000000000 |
| w[211] = 0.0000000000 |
| w[212] = 0.0000000000 |
| w[213] = 0.0000000000 |

TABLE 7-continued (window coefficients w(n); M = 512)

w[214] = 0.0000000000
w[215] = 0.0000000000
w[216] = 0.0000000000
w[217] = 0.0000000000
w[218] = 0.0000000000
w[219] = 0.0000000000
w[220] = 0.0000000000
w[221] = 0.0000000000
w[222] = 0.0000000000
w[223] = 0.0000000000
w[224] = 0.0000000000
w[225] = 0.0000000000
w[226] = 0.0000000000
w[227] = 0.0000000000
w[228] = 0.0000000000
w[229] = 0.0000000000
w[230] = 0.0000000000
w[231] = 0.0000000000
w[232] = 0.0000000000
w[233] = 0.0000000000
w[234] = 0.0000000000
w[235] = 0.0000000000
w[236] = 0.0000000000
w[237] = 0.0000000000
w[238] = 0.0000000000
w[239] = 0.0000000000
w[240] = 0.0000000000
w[241] = 0.0000000000
w[242] = 0.0000000000
w[243] = 0.0000000000
w[244] = 0.0000000000
w[245] = 0.0000000000
w[246] = 0.0000000000
w[247] = 0.0000000000
w[248] = 0.0000000000
w[249] = 0.0000000000
w[250] = 0.0000000000
w[251] = 0.0000000000
w[252] = 0.0000000000
w[253] = 0.0000000000
w[254] = 0.0000000000
w[255] = 0.0000000000
w[256] = −1.0002821459
w[257] = −1.0008431920
w[258] = −1.0014047181
w[259] = −1.0019666452
w[260] = −1.0025288945
w[261] = −1.0030913871
w[262] = −1.0036540441
w[263] = −1.0042167867
w[264] = −1.0047795360
w[265] = −1.0053422132
w[266] = −1.0059047426
w[267] = −1.0064671275
w[268] = −1.0070294494
w[269] = −1.0075917933
w[270] = −1.0081542400
w[271] = −1.0087167765
w[272] = −1.0092792959
w[273] = −1.0098416872
w[274] = −1.0104038431
w[275] = −1.0109657472
w[276] = −1.0115274735
w[277] = −1.0120890999
w[278] = −1.0126507003
w[279] = −1.0132122556
w[280] = −1.0137736534
w[281] = −1.0143347772
w[282] = −1.0148955146
w[283] = −1.0154558417
w[284] = −1.0160158237
w[285] = −1.0165755293
w[286] = −1.0171350233
w[287] = −1.0176942746
w[288] = −1.0182531565
w[289] = −1.0188115379
w[290] = −1.0193692921
w[291] = −1.0199263890

TABLE 7-continued (window coefficients w(n); M = 512)

w[292] = −1.0204828948
w[293] = −1.0210388803
w[294] = −1.0215944116
w[295] = −1.0221494529
w[296] = −1.0227038667
w[297] = −1.0232575109
w[298] = −1.0238102478
w[299] = −1.0243620395
w[300] = −1.0249129481
w[301] = −1.0254630398
w[302] = −1.0260123765
w[303] = −1.0265609206
w[304] = −1.0271085343
w[305] = −1.0276550758
w[306] = −1.0282004072
w[307] = −1.0287444880
w[308] = −1.0292873749
w[309] = −1.0298291289
w[310] = −1.0303698066
w[311] = −1.0309093689
w[312] = −1.0314476809
w[313] = −1.0319846033
w[314] = −1.0325200014
w[315] = −1.0330538376
w[316] = −1.0335861723
w[317] = −1.0341170699
w[318] = −1.0346465910
w[319] = −1.0351747036
w[320] = −1.0357012836
w[321] = −1.0362262031
w[322] = −1.0367493379
w[323] = −1.0372706607
w[324] = −1.0377902401
w[325] = −1.0383081491
w[326] = −1.0388244565
w[327] = −1.0393391358
w[328] = −1.0398520647
w[329] = −1.0403631170
w[330] = −1.0408721707
w[331] = −1.0413792005
w[332] = −1.0418842781
w[333] = −1.0423874793
w[334] = −1.0428888762
w[335] = −1.0433884508
w[336] = −1.0438860955
w[337] = −1.0443816988
w[338] = −1.0448751534
w[339] = −1.0453664528
w[340] = −1.0458556912
w[341] = −1.0463429671
w[342] = −1.0468283752
w[343] = −1.0473119169
w[344] = −1.0477935014
w[345] = −1.0482730334
w[346] = −1.0487504222
w[347] = −1.0492256767
w[348] = −1.0496989060
w[349] = −1.0501702231
w[350] = −1.0506397372
w[351] = −1.0511074619
w[352] = −1.0515733155
w[353] = −1.0520372123
w[354] = −1.0524990700
w[355] = −1.0529588904
w[356] = −1.0534167595
w[357] = −1.0538727667
w[358] = −1.0543269988
w[359] = −1.0547794817
w[360] = −1.0552301803
w[361] = −1.0556790568
w[362] = −1.0561260752
w[363] = −1.0565712379
w[364] = −1.0570145861
w[365] = −1.0574561627
w[366] = −1.0578960136
w[367] = −1.0583342576
w[368] = −1.0587710861
w[369] = −1.0592066934

TABLE 7-continued (window coefficients w(n); M = 512)

w[370] = −1.0596412525
w[371] = −1.0600744361
w[372] = −1.0605054167
w[373] = −1.0609333455
w[374] = −1.0613574636
w[375] = −1.0617790928
w[376] = −1.0622016350
w[377] = −1.0626285827
w[378] = −1.0630630890
w[379] = −1.0635005039
w[380] = −1.0639283741
w[381] = −1.0643339074
w[382] = −1.0647044284
w[383] = −1.0650299578
w[384] = −1.0653032118
w[385] = −1.0655170241
w[386] = −1.0656646006
w[387] = −1.0657477171
w[388] = −1.0657767186
w[389] = −1.0657623227
w[390] = −1.0657151225
w[391] = −1.0656428467
w[392] = −1.0655503595
w[393] = −1.0654424004
w[394] = −1.0653234852
w[395] = −1.0651929817
w[396] = −1.0650451093
w[397] = −1.0648738639
w[398] = −1.0646733351
w[399] = −1.0644397719
w[400] = −1.0641715829
w[401] = −1.0638672705
w[402] = −1.0635254800
w[403] = −1.0631481460
w[404] = −1.0627404919
w[405] = −1.0623078843
w[406] = −1.0618556139
w[407] = −1.0613872264
w[408] = −1.0609045231
w[409] = −1.0604092292
w[410] = −1.0599029825
w[411] = −1.0593854054
w[412] = −1.0588541055
w[413] = −1.0583066026
w[414] = −1.0577403431
w[415] = −1.0571510830
w[416] = −1.0565328879
w[417] = −1.0558797500
w[418] = −1.0551857385
w[419] = −1.0544466960
w[420] = −1.0536602380
w[421] = −1.0528240573
w[422] = −1.0519359242
w[423] = −1.0509953893
w[424] = −1.0500037838
w[425] = −1.0489625166
w[426] = −1.0478730444
w[427] = −1.0467379329
w[428] = −1.0455608564
w[429] = −1.0443455372
w[430] = −1.0430956628
w[431] = −1.0418141089
w[432] = −1.0405029405
w[433] = −1.0391641870
w[434] = −1.0377998352
w[435] = −1.0364108906
w[436] = −1.0349973772
w[437] = −1.0335592765
w[438] = −1.0320965184
w[439] = −1.0306078538
w[440] = −1.0290908538
w[441] = −1.0275430385
w[442] = −1.0259619429
w[443] = −1.0243454510
w[444] = −1.0226917960
w[445] = −1.0209992258
w[446] = −1.0192659750
w[447] = −1.0174899678

TABLE 7-continued (window coefficients w(n); M = 512)

w[448] = −1.0156688177
w[449] = −1.0138001249
w[450] = −1.0118815417
w[451] = −1.0099119237
w[452] = −1.0078913294
w[453] = −1.0058198697
w[454] = −1.0036978644
w[455] = −1.0015304354
w[456] = −0.9993275072
w[457] = −0.9970992128
w[458] = −0.9948555564
w[459] = −0.9926035723
w[460] = −0.9903473251
w[461] = −0.9880907503
w[462] = −0.9858374846
w[463] = −0.9835842882
w[464] = −0.9813210451
w[465] = −0.9790373402
w[466] = −0.9767229520
w[467] = −0.9743721055
w[468] = −0.9719834723
w[469] = −0.9695559176
w[470] = −0.9670883881
w[471] = −0.9645817108
w[472] = −0.9620385928
w[473] = −0.9594618229
w[474] = −0.9568542915
w[475] = −0.9542212248
w[476] = −0.9515701850
w[477] = −0.9489088358
w[478] = −0.9462447978
w[479] = −0.9435847037
w[480] = −0.9409341977
w[481] = −0.9382988815
w[482] = −0.9356839324
w[483] = −0.9330847763
w[484] = −0.9304870874
w[485] = −0.9278761160
w[486] = −0.9252375162
w[487] = −0.9225662342
w[488] = −0.9198665080
w[489] = −0.9171429795
w[490] = −0.9144004110
w[491] = −0.9116463325
w[492] = −0.9088910414
w[493] = −0.9061449555
w[494] = −0.9034181731
w[495] = −0.9007134473
w[496] = −0.8980261849
w[497] = −0.8953514739
w[498] = −0.8926844999
w[499] = −0.8900227020
w[500] = −0.8873657730
w[501] = −0.8847135031
w[502] = −0.8820657360
w[503] = −0.8794235309
w[504] = −0.8767891632
w[505] = −0.8741649612
w[506] = −0.8715532533
w[507] = −0.8689563676
w[508] = −0.8663766324
w[509] = −0.8638163760
w[510] = −0.8612779268
w[511] = −0.8587636128
w[512] = −0.5849248947
w[513] = −0.5891851108
w[514] = −0.5934232557
w[515] = −0.5976393640
w[516] = −0.6018334700
w[517] = −0.6060056081
w[518] = −0.6101558128
w[519] = −0.6142841184
w[520] = −0.6183905594
w[521] = −0.6224751702
w[522] = −0.6265379880
w[523] = −0.6305791151
w[524] = −0.6345987187
w[525] = −0.6385969691

TABLE 7-continued (window coefficients w(n); M = 512)

w[526] = −0.6425740335
w[527] = −0.6465300141
w[528] = −0.6504649478
w[529] = −0.6543788687
w[530] = −0.6582718116
w[531] = −0.6621438279
w[532] = −0.6659949852
w[533] = −0.6698253518
w[534] = −0.6736349946
w[535] = −0.6774239429
w[536] = −0.6811921889
w[537] = −0.6849397229
w[538] = −0.6886665341
w[539] = −0.6923725796
w[540] = −0.6960577846
w[541] = −0.6997220732
w[542] = −0.7033653686
w[543] = −0.7069875827
w[544] = −0.7105886155
w[545] = −0.7141683665
w[546] = −0.7177267351
w[547] = −0.7212636147
w[548] = −0.7247788927
w[549] = −0.7282724563
w[550] = −0.7317441902
w[551] = −0.7351939200
w[552] = −0.7386214124
w[553] = −0.7420264316
w[554] = −0.7454087439
w[555] = −0.7487681690
w[556] = −0.7521045796
w[557] = −0.7554178508
w[558] = −0.7587078536
w[559] = −0.7619743688
w[560] = −0.7652170872
w[561] = −0.7684356952
w[562] = −0.7716298821
w[563] = −0.7747993928
w[564] = −0.7779440282
w[565] = −0.7810635917
w[566] = −0.7841578859
w[567] = −0.7872266964
w[568] = −0.7902697916
w[569] = −0.7932869391
w[570] = −0.7962779060
w[571] = −0.7992424395
w[572] = −0.8021802676
w[573] = −0.8050911173
w[574] = −0.8079747164
w[575] = −0.8108308071
w[576] = −0.8136591462
w[577] = −0.8164594911
w[578] = −0.8192316013
w[579] = −0.8219752794
w[580] = −0.8246903718
w[581] = −0.8273767266
w[582] = −0.8300341921
w[583] = −0.8326626180
w[584] = −0.8352618558
w[585] = −0.8378317570
w[586] = −0.8403721735
w[587] = −0.8428829667
w[588] = −0.8453640072
w[589] = −0.8478151663
w[590] = −0.8502363174
w[591] = −0.8526273878
w[592] = −0.8549883583
w[593] = −0.8573192121
w[594] = −0.8596199332
w[595] = −0.8618905240
w[596] = −0.8641310054
w[597] = −0.8663413992
w[598] = −0.8685217309
w[599] = −0.8706721136
w[600] = −0.8727927482
w[601] = −0.8748838393
w[602] = −0.8769455928
w[603] = −0.8789782436

TABLE 7-continued (window coefficients w(n); M = 512)

w[604] = −0.8809820555
w[605] = −0.8829572934
w[606] = −0.8849042303
w[607] = −0.8868233183
w[608] = −0.8887151887
w[609] = −0.8905804810
w[610] = −0.8924198350
w[611] = −0.8942339098
w[612] = −0.8960233831
w[613] = −0.8977889337
w[614] = −0.8995312563
w[615] = −0.9012514186
w[616] = −0.9029508608
w[617] = −0.9046310394
w[618] = −0.9062934118
w[619] = −0.9079394566
w[620] = −0.9095706736
w[621] = −0.9111885636
w[622] = −0.9127946410
w[623] = −0.9143907324
w[624] = −0.9159789770
w[625] = −0.9175615274
w[626] = −0.9191404896
w[627] = −0.9207168950
w[628] = −0.9222907010
w[629] = −0.9238618179
w[630] = −0.9254299279
w[631] = −0.9269894615
w[632] = −0.9285295974
w[633] = −0.9300392862
w[634] = −0.9315072661
w[635] = −0.9329173908
w[636] = −0.9342486301
w[637] = −0.9354797410
w[638] = −0.9365898239
w[639] = −0.9375658696
w[640] = −0.9389407243
w[641] = −0.9392278019
w[642] = −0.9395547704
w[643] = −0.9399128967
w[644] = −0.9402910449
w[645] = −0.9406779431
w[646] = −0.9410625841
w[647] = −0.9414408404
w[648] = −0.9418154932
w[649] = −0.9421896338
w[650] = −0.9425662831
w[651] = −0.9429466217
w[652] = −0.9433299832
w[653] = −0.9437156185
w[654] = −0.9441027952
w[655] = −0.9444912249
w[656] = −0.9448810645
w[657] = −0.9452724910
w[658] = −0.9456656789
w[659] = −0.9460607386
w[660] = −0.9464577154
w[661] = −0.9468566524
w[662] = −0.9472575908
w[663] = −0.9476605376
w[664] = −0.9480654652
w[665] = −0.9484723441
w[666] = −0.9488811474
w[667] = −0.9492919027
w[668] = −0.9497046932
w[669] = −0.9501196044
w[670] = −0.9505367190
w[671] = −0.9509560439
w[672] = −0.9513775102
w[673] = −0.9518010452
w[674] = −0.9522265800
w[675] = −0.9526541319
w[676] = −0.9530838047
w[677] = −0.9535157068
w[678] = −0.9539499426
w[679] = −0.9543865262
w[680] = −0.9548253809
w[681] = −0.9552664255

TABLE 7-continued (window coefficients w(n); M = 512)

w[682] = −0.9557095822
w[683] = −0.9561548581
w[684] = −0.9566023449
w[685] = −0.9570521385
w[686] = −0.9575043312
w[687] = −0.9579589232
w[688] = −0.9584158223
w[689] = −0.9588749318
w[690] = −0.9593361584
w[691] = −0.9597994912
w[692] = −0.9602650020
w[693] = −0.9607327664
w[694] = −0.9612028566
w[695] = −0.9616752555
w[696] = −0.9621498562
w[697] = −0.9626265474
w[698] = −0.9631052216
w[699] = −0.9635858591
w[700] = −0.9640685290
w[701] = −0.9645533047
w[702] = −0.9650402557
w[703] = −0.9655293624
w[704] = −0.9660205148
w[705] = −0.9665135987
w[706] = −0.9670085033
w[707] = −0.9675052035
w[708] = −0.9680037609
w[709] = −0.9685042408
w[710] = −0.9690067049
w[711] = −0.9695111236
w[712] = −0.9700173751
w[713] = −0.9705253334
w[714] = −0.9710348756
w[715] = −0.9715459690
w[716] = −0.9720586712
w[717] = −0.9725730442
w[718] = −0.9730891459
w[719] = −0.9736069428
w[720] = −0.9741263085
w[721] = −0.9746471123
w[722] = −0.9751692272
w[723] = −0.9756926204
w[724] = −0.9762173542
w[725] = −0.9767434954
w[726] = −0.9772711066
w[727] = −0.9778001556
w[728] = −0.9783305143
w[729] = −0.9788620500
w[730] = −0.9793946335
w[731] = −0.9799282330
w[732] = −0.9804629146
w[733] = −0.9809987487
w[734] = −0.9815358021
w[735] = −0.9820740487
w[736] = −0.9826133692
w[737] = −0.9831536395
w[738] = −0.9836947390
w[739] = −0.9842366395
w[740] = −0.9847794054
w[741] = −0.9853231053
w[742] = −0.9858678047
w[743] = −0.9864134826
w[744] = −0.9869600318
w[745] = −0.9875073406
w[746] = −0.9880553008
w[747] = −0.9886038948
w[748] = −0.9891531961
w[749] = −0.9897032823
w[750] = −0.9902542277
w[751] = −0.9908060177
w[752] = −0.9913585491
w[753] = −0.9919117138
w[754] = −0.9924654078
w[755] = −0.9930196188
w[756] = −0.9935744275
w[757] = −0.9941299187
w[758] = −0.9946861744
w[759] = −0.9952431993

TABLE 7-continued (window coefficients w(n); M = 512)

w[760] = −0.9958009199
w[761] = −0.9963592593
w[762] = −0.9969181401
w[763] = −0.9974774847
w[764] = −0.9980372149
w[765] = −0.9985972524
w[766] = −0.9991575183
w[767] = −0.9997179337
w[768] = 0.0816861552
w[769] = 0.0830243316
w[770] = 0.0843862894
w[771] = 0.0857706497
w[772] = 0.0871760335
w[773] = 0.0886010620
w[774] = 0.0900443561
w[775] = 0.0915045369
w[776] = 0.0929802255
w[777] = 0.0944700429
w[778] = 0.0959726559
w[779] = 0.0974877813
w[780] = 0.0990161861
w[781] = 0.1005586830
w[782] = 0.1021160531
w[783] = 0.1036883501
w[784] = 0.1052749008
w[785] = 0.1068750000
w[786] = 0.1084879826
w[787] = 0.1101140980
w[788] = 0.1117545105
w[789] = 0.1134104241
w[790] = 0.1150829917
w[791] = 0.1167721943
w[792] = 0.1184768406
w[793] = 0.1201956886
w[794] = 0.1219275086
w[795] = 0.1236713601
w[796] = 0.1254265919
w[797] = 0.1271925650
w[798] = 0.1289686319
w[799] = 0.1307539399
w[800] = 0.1325474314
w[801] = 0.1343480400
w[802] = 0.1361547494
w[803] = 0.1379676950
w[804] = 0.1397881641
w[805] = 0.1416174941
w[806] = 0.1434569063
w[807] = 0.1453049464
w[808] = 0.1471574850
w[809] = 0.1490102763
w[810] = 0.1508590965
w[811] = 0.1527002241
w[812] = 0.1545304399
w[813] = 0.1563465467
w[814] = 0.1581453556
w[815] = 0.1599238727
w[816] = 0.1616792992
w[817] = 0.1634088447
w[818] = 0.1651097133
w[819] = 0.1667789871
w[820] = 0.1684136256
w[821] = 0.1700105833
w[822] = 0.1715668295
w[823] = 0.1730796805
w[824] = 0.1745467992
w[825] = 0.1759658637
w[826] = 0.1773345770
w[827] = 0.1786512154
w[828] = 0.1799146287
w[829] = 0.1811236916
w[830] = 0.1822779219
w[831] = 0.1833916286
w[832] = 0.1844939116
w[833] = 0.1856145142
w[834] = 0.1867825502
w[835] = 0.1880126632
w[836] = 0.1893050259
w[837] = 0.1906591820

TABLE 7-continued

| (window coefficients w(n); M = 512) |
|---|
| w[838] = 0.1920746639 |
| w[839] = 0.1935507421 |
| w[840] = 0.1950864260 |
| w[841] = 0.1966807133 |
| w[842] = 0.1983326031 |
| w[843] = 0.2000411259 |
| w[844] = 0.2018053438 |
| w[845] = 0.2036243201 |
| w[846] = 0.2054971261 |
| w[847] = 0.2074230142 |
| w[848] = 0.2094014182 |
| w[849] = 0.2114317797 |
| w[850] = 0.2135135186 |
| w[851] = 0.2156455558 |
| w[852] = 0.2178263132 |
| w[853] = 0.2200541910 |
| w[854] = 0.2223276521 |
| w[855] = 0.2246466062 |
| w[856] = 0.2270124093 |
| w[857] = 0.2294264805 |
| w[858] = 0.2318902558 |
| w[859] = 0.2344055641 |
| w[860] = 0.2369746273 |
| w[861] = 0.2395996842 |
| w[862] = 0.2422829192 |
| w[863] = 0.2450252603 |
| w[864] = 0.2478263794 |
| w[865] = 0.2506858940 |
| w[866] = 0.2536031997 |
| w[867] = 0.2565725933 |
| w[868] = 0.2595832730 |
| w[869] = 0.2626242153 |
| w[870] = 0.2656846645 |
| w[871] = 0.2687600266 |
| w[872] = 0.2718518694 |
| w[873] = 0.2749620283 |
| w[874] = 0.2780925345 |
| w[875] = 0.2812499131 |
| w[876] = 0.2844451837 |
| w[877] = 0.2876895614 |
| w[878] = 0.2909938146 |
| w[879] = 0.2943584445 |
| w[880] = 0.2977736849 |
| w[881] = 0.3012293231 |
| w[882] = 0.3047152291 |
| w[883] = 0.3082231706 |
| w[884] = 0.3117468130 |
| w[885] = 0.3152799045 |
| w[886] = 0.3188166191 |
| w[887] = 0.3223609254 |
| w[888] = 0.3259265871 |
| w[889] = 0.3295277934 |
| w[890] = 0.3331785843 |
| w[891] = 0.3368895603 |
| w[892] = 0.3406678830 |
| w[893] = 0.3445205639 |
| w[894] = 0.3484541473 |
| w[895] = 0.3524644185 |
| w[896] = 0.3565364042 |
| w[897] = 0.3606546633 |
| w[898] = 0.3648037030 |
| w[899] = 0.3689668415 |
| w[900] = 0.3731262081 |
| w[901] = 0.3772638802 |
| w[902] = 0.3813625392 |
| w[903] = 0.3854187559 |
| w[904] = 0.3894429908 |
| w[905] = 0.3934463080 |
| w[906] = 0.3974401618 |
| w[907] = 0.4014449795 |
| w[908] = 0.4054901608 |
| w[909] = 0.4096054956 |
| w[910] = 0.4138200028 |
| w[911] = 0.4181449633 |
| w[912] = 0.4225739206 |
| w[913] = 0.4270996471 |
| w[914] = 0.4317143979 |
| w[915] = 0.4363985395 |

TABLE 7-continued

| (window coefficients w(n); M = 512) |
|---|
| w[916] = 0.4411205492 |
| w[917] = 0.4458483875 |
| w[918] = 0.4505504201 |
| w[919] = 0.4552043331 |
| w[920] = 0.4597971332 |
| w[921] = 0.4643162322 |
| w[922] = 0.4687497127 |
| w[923] = 0.4731010830 |
| w[924] = 0.4773892774 |
| w[925] = 0.4816339008 |
| w[926] = 0.4858545024 |
| w[927] = 0.4900693458 |
| w[928] = 0.4942954093 |
| w[929] = 0.4985496153 |
| w[930] = 0.5028485431 |
| w[931] = 0.5072008793 |
| w[932] = 0.5116074176 |
| w[933] = 0.5160686088 |
| w[934] = 0.5205847376 |
| w[935] = 0.5251522760 |
| w[936] = 0.5297638829 |
| w[937] = 0.5344120512 |
| w[938] = 0.5390891790 |
| w[939] = 0.5437854771 |
| w[940] = 0.5484889693 |
| w[941] = 0.5531875840 |
| w[942] = 0.5578693688 |
| w[943] = 0.5625251077 |
| w[944] = 0.5671483207 |
| w[945] = 0.5717326471 |
| w[946] = 0.5762719025 |
| w[947] = 0.5807639635 |
| w[948] = 0.5852107674 |
| w[949] = 0.5896144279 |
| w[950] = 0.5939771500 |
| w[951] = 0.5983032314 |
| w[952] = 0.6025990628 |
| w[953] = 0.6068711260 |
| w[954] = 0.6111258529 |
| w[955] = 0.6153685329 |
| w[956] = 0.6196033124 |
| w[957] = 0.6238342882 |
| w[958] = 0.6280655472 |
| w[959] = 0.6323009489 |
| w[960] = 0.6365441251 |
| w[961] = 0.6407986979 |
| w[962] = 0.6450681819 |
| w[963] = 0.6493536165 |
| w[964] = 0.6536535660 |
| w[965] = 0.6579664872 |
| w[966] = 0.6622904870 |
| w[967] = 0.6666156210 |
| w[968] = 0.6709238942 |
| w[969] = 0.6751969615 |
| w[970] = 0.6794167770 |
| w[971] = 0.6835721805 |
| w[972] = 0.6876588975 |
| w[973] = 0.6916729528 |
| w[974] = 0.6956108519 |
| w[975] = 0.6994801585 |
| w[976] = 0.7032994945 |
| w[977] = 0.7070879622 |
| w[978] = 0.7108643058 |
| w[979] = 0.7146390269 |
| w[980] = 0.7184143842 |
| w[981] = 0.7221922780 |
| w[982] = 0.7259744783 |
| w[983] = 0.7297597540 |
| w[984] = 0.7335438731 |
| w[985] = 0.7373224730 |
| w[986] = 0.7410910660 |
| w[987] = 0.7448422828 |
| w[988] = 0.7485658728 |
| w[989] = 0.7522514600 |
| w[990] = 0.7558887789 |
| w[991] = 0.7594701061 |
| w[992] = 0.7629902604 |
| w[993] = 0.7664441708 |

TABLE 7-continued

| (window coefficients w(n); M = 512) |
|---|
| w[994] = 0.7698273081 |
| w[995] = 0.7731475971 |
| w[996] = 0.7764254168 |
| w[997] = 0.7796816877 |
| w[998] = 0.7829367728 |
| w[999] = 0.7861982124 |
| w[1000] = 0.7894607247 |
| w[1001] = 0.7927184699 |
| w[1002] = 0.7959654899 |
| w[1003] = 0.7991930985 |
| w[1004] = 0.8023898815 |
| w[1005] = 0.8055443061 |
| w[1006] = 0.8086452325 |
| w[1007] = 0.8116905602 |
| w[1008] = 0.8146872278 |
| w[1009] = 0.8176425672 |
| w[1010] = 0.8205637887 |
| w[1011] = 0.8234553108 |
| w[1012] = 0.8263187601 |
| w[1013] = 0.8291556417 |
| w[1014] = 0.8319673949 |
| w[1015] = 0.8347539423 |
| w[1016] = 0.8375136899 |
| w[1017] = 0.8402449774 |
| w[1018] = 0.8429461451 |
| w[1019] = 0.8456155326 |
| w[1020] = 0.8482514802 |
| w[1021] = 0.8508523276 |
| w[1022] = 0.8534164149 |
| w[1023] = 0.8559420820 |

TABLE 8

| (lifting coefficients l(n); M = 512) |
|---|
| l[0] = −0.1609443332 |
| l[1] = −0.1588316809 |
| l[2] = −0.1567400824 |
| l[3] = −0.1546684166 |
| l[4] = −0.1526155623 |
| l[5] = −0.1505803984 |
| l[6] = −0.1485618038 |
| l[7] = −0.1465586574 |
| l[8] = −0.1445698381 |
| l[9] = −0.1425942248 |
| l[10] = −0.1406307229 |
| l[11] = −0.1386788498 |
| l[12] = −0.1367387349 |
| l[13] = −0.1348105340 |
| l[14] = −0.1328944022 |
| l[15] = −0.1309904769 |
| l[16] = −0.1290988777 |
| l[17] = −0.1272197233 |
| l[18] = −0.1253531342 |
| l[19] = −0.1234992701 |
| l[20] = −0.1216583298 |
| l[21] = −0.1198305138 |
| l[22] = −0.1180160191 |
| l[23] = −0.1162149646 |
| l[24] = −0.1144273912 |
| l[25] = −0.1126533363 |
| l[26] = −0.1108928391 |
| l[27] = −0.1091459794 |
| l[28] = −0.1074128779 |
| l[29] = −0.1056936570 |
| l[30] = −0.1039884357 |
| l[31] = −0.1022972566 |
| l[32] = −0.1006200857 |
| l[33] = −0.0989568856 |
| l[34] = −0.0973076216 |
| l[35] = −0.0956723180 |
| l[36] = −0.0940510581 |
| l[37] = −0.0924439277 |
| l[38] = −0.0908510096 |
| l[39] = −0.0892723116 |

TABLE 8-continued

| (lifting coefficients l(n); M = 512) |
|---|
| l[40] = −0.0877077667 |
| l[41] = −0.0861573048 |
| l[42] = −0.0846208587 |
| l[43] = −0.0830984304 |
| l[44] = −0.0815900912 |
| l[45] = −0.0800959154 |
| l[46] = −0.0786159738 |
| l[47] = −0.0771502574 |
| l[48] = −0.0756986773 |
| l[49] = −0.0742611413 |
| l[50] = −0.0728375604 |
| l[51] = −0.0714279211 |
| l[52] = −0.0700322857 |
| l[53] = −0.0686507196 |
| l[54] = −0.0672832847 |
| l[55] = −0.0659299600 |
| l[56] = −0.0645906422 |
| l[57] = −0.0632652241 |
| l[58] = −0.0619536020 |
| l[59] = −0.0606557487 |
| l[60] = −0.0593717137 |
| l[61] = −0.0581015498 |
| l[62] = −0.0568453060 |
| l[63] = −0.0556029435 |
| l[64] = −0.0543743355 |
| l[65] = −0.0531593517 |
| l[66] = −0.0519578650 |
| l[67] = −0.0507698310 |
| l[68] = −0.0495952880 |
| l[69] = −0.0484342775 |
| l[70] = −0.0472868381 |
| l[71] = −0.0461529343 |
| l[72] = −0.0450324566 |
| l[73] = −0.0439252926 |
| l[74] = −0.0428313336 |
| l[75] = −0.0417505639 |
| l[76] = −0.0406830608 |
| l[77] = −0.0396289057 |
| l[78] = −0.0385881755 |
| l[79] = −0.0375608497 |
| l[80] = −0.0365468098 |
| l[81] = −0.0355459333 |
| l[82] = −0.0345580997 |
| l[83] = −0.0335832379 |
| l[84] = −0.0326213260 |
| l[85] = −0.0316723442 |
| l[86] = −0.0307362666 |
| l[87] = −0.0298129207 |
| l[88] = −0.0289019881 |
| l[89] = −0.0280031437 |
| l[90] = −0.0271160689 |
| l[91] = −0.0262405912 |
| l[92] = −0.0253766838 |
| l[93] = −0.0245243266 |
| l[94] = −0.0236835036 |
| l[95] = −0.0228542987 |
| l[96] = −0.0220368955 |
| l[97] = −0.0212314819 |
| l[98] = −0.0204382549 |
| l[99] = −0.0196576149 |
| l[100] = −0.0188901665 |
| l[101] = −0.0181365226 |
| l[102] = −0.0173972678 |
| l[103] = −0.0166723253 |
| l[104] = −0.0159609574 |
| l[105] = −0.0152623975 |
| l[106] = −0.0145758876 |
| l[107] = −0.0139008669 |
| l[108] = −0.0132369718 |
| l[109] = −0.0125838473 |
| l[110] = −0.0119411575 |
| l[111] = −0.0113090093 |
| l[112] = −0.0106879523 |
| l[113] = −0.0100785551 |
| l[114] = −0.0094813609 |
| l[115] = −0.0088963283 |
| l[116] = −0.0083228305 |
| l[117] = −0.0077602157 |

TABLE 8-continued (lifting coefficients l(n); M = 512)

l[118] = −0.0072078516
l[119] = −0.0066655575
l[120] = −0.0061336051
l[121] = −0.0056122854
l[122] = −0.0051018950
l[123] = −0.0046028579
l[124] = −0.0041157253
l[125] = −0.0036410540
l[126] = −0.0031793665
l[127] = −0.0027303940
l[128] = −0.0022930768
l[129] = −0.0018663206
l[130] = −0.0014490228
l[131] = −0.0010398845
l[132] = −0.0006374113
l[133] = −0.0002400999
l[134] = 0.0001534884
l[135] = 0.0005433081
l[136] = 0.0009278302
l[137] = 0.0013054608
l[138] = 0.0016745789
l[139] = 0.0020329331
l[140] = 0.0023776420
l[141] = 0.0027057969
l[142] = 0.0030145845
l[143] = 0.0033033931
l[144] = 0.0035738121
l[145] = 0.0038275268
l[146] = 0.0040662622
l[147] = 0.0042926610
l[148] = 0.0045102838
l[149] = 0.0047227308
l[150] = 0.0049335409
l[151] = 0.0051448353
l[152] = 0.0053573176
l[153] = 0.0055716300
l[154] = 0.0057883442
l[155] = 0.0060064153
l[156] = 0.0062231812
l[157] = 0.0064359095
l[158] = 0.0066418916
l[159] = 0.0068389637
l[160] = 0.0070255068
l[161] = 0.0071999252
l[162] = 0.0073606631
l[163] = 0.0075070690
l[164] = 0.0076393965
l[165] = 0.0077579383
l[166] = 0.0078630125
l[167] = 0.0079555204
l[168] = 0.0080369468
l[169] = 0.0081088015
l[170] = 0.0081725880
l[171] = 0.0082296607
l[172] = 0.0082812254
l[173] = 0.0083284809
l[174] = 0.0083726124
l[175] = 0.0084144818
l[176] = 0.0084546280
l[177] = 0.0084935759
l[178] = 0.0085318252
l[179] = 0.0085693019
l[180] = 0.0086053580
l[181] = 0.0086393203
l[182] = 0.0086705141
l[183] = 0.0086982231
l[184] = 0.0087216896
l[185] = 0.0087401542
l[186] = 0.0087528597
l[187] = 0.0087591002
l[188] = 0.0087582212
l[189] = 0.0087495705
l[190] = 0.0087325149
l[191] = 0.0087068610
l[192] = 0.0086728551
l[193] = 0.0086307626
l[194] = 0.0085808633
l[195] = 0.0085237633

TABLE 8-continued (lifting coefficients l(n); M = 512)

l[196] = 0.0084603958
l[197] = 0.0083917082
l[198] = 0.0083186507
l[199] = 0.0082422399
l[200] = 0.0081635596
l[201] = 0.0080836960
l[202] = 0.0080036996
l[203] = 0.0079237945
l[204] = 0.0078433781
l[205] = 0.0077618120
l[206] = 0.0076784529
l[207] = 0.0075925408
l[208] = 0.0075031993
l[209] = 0.0074095469
l[210] = 0.0073107210
l[211] = 0.0072062938
l[212] = 0.0070962722
l[213] = 0.0069806821
l[214] = 0.0068595669
l[215] = 0.0067333750
l[216] = 0.0066029600
l[217] = 0.0064691930
l[218] = 0.0063329325
l[219] = 0.0061947460
l[220] = 0.0060549104
l[221] = 0.0059136897
l[222] = 0.0057713374
l[223] = 0.0056278629
l[224] = 0.0054830316
l[225] = 0.0053365982
l[226] = 0.0051883144
l[227] = 0.0050378645
l[228] = 0.0048848649
l[229] = 0.0047289293
l[230] = 0.0045696897
l[231] = 0.0044072046
l[232] = 0.0042419586
l[233] = 0.0040744550
l[234] = 0.0039051877
l[235] = 0.0037344343
l[236] = 0.0035622569
l[237] = 0.0033887077
l[238] = 0.0032138392
l[239] = 0.0030377022
l[240] = 0.0028603463
l[241] = 0.0026818208
l[242] = 0.0025021748
l[243] = 0.0023214447
l[244] = 0.0021396548
l[245] = 0.0019568291
l[246] = 0.0017729940
l[247] = 0.0015882404
l[248] = 0.0014027231
l[249] = 0.0012165999
l[250] = 0.0010300284
l[251] = 0.0008431664
l[252] = 0.0006561715
l[253] = 0.0004692016
l[254] = 0.0002824142
l[255] = 0.0000959671
l[256] = −0.0813792712
l[257] = −0.0821857141
l[258] = −0.0829863415
l[259] = −0.0837813411
l[260] = −0.0845709001
l[261] = −0.0853552062
l[262] = −0.0861344468
l[263] = −0.0869088094
l[264] = −0.0876784815
l[265] = −0.0884436505
l[266] = −0.0892044833
l[267] = −0.0899606716
l[268] = −0.0907114317
l[269] = −0.0914559595
l[270] = −0.0921934875
l[271] = −0.0929240925
l[272] = −0.0936486952
l[273] = −0.0943682534

TABLE 8-continued (lifting coefficients l(n); M = 512)

l[274] = −0.0950836792
l[275] = −0.0957948415
l[276] = −0.0965005657
l[277] = −0.0971996319
l[278] = −0.0978908747
l[279] = −0.0985743841
l[280] = −0.0992515051
l[281] = −0.0999236373
l[282] = −0.1005921615
l[283] = −0.1012580234
l[284] = −0.1019217335
l[285] = −0.1025837837
l[286] = −0.1032446794
l[287] = −0.1039052432
l[288] = −0.1045666148
l[289] = −0.1052299477
l[290] = −0.1058963398
l[291] = −0.1065656157
l[292] = −0.1072363261
l[293] = −0.1079069664
l[294] = −0.1085761526
l[295] = −0.1092452792
l[296] = −0.1099185185
l[297] = −0.1106001636
l[298] = −0.1112944816
l[299] = −0.1120051355
l[300] = −0.1127351848
l[301] = −0.1134876626
l[302] = −0.1142656006
l[303] = −0.1150720001
l[304] = −0.1159098318
l[305] = −0.1167820650
l[306] = −0.1176916699
l[307] = −0.1186416405
l[308] = −0.1196349941
l[309] = −0.1206747489
l[310] = −0.1217639120
l[311] = −0.1229052302
l[312] = −0.1241011905
l[313] = −0.1253542684
l[314] = −0.1266669090
l[315] = −0.1280408583
l[316] = −0.1294771630
l[317] = −0.1309768396
l[318] = −0.1325402437
l[319] = −0.1341525322
l[320] = −0.1357836636
l[321] = −0.1374029357
l[322] = −0.1389802968
l[323] = −0.1405006612
l[324] = −0.1419639094
l[325] = −0.1433705722
l[326] = −0.1447211807
l[327] = −0.1460162664
l[328] = −0.1472563614
l[329] = −0.1484419976
l[330] = −0.1495737072
l[331] = −0.1506520217
l[332] = −0.1516774722
l[333] = −0.1526505899
l[334] = −0.1535719061
l[335] = −0.1544419520
l[336] = −0.1552612596
l[337] = −0.1560303607
l[338] = −0.1567497871
l[339] = −0.1574200700
l[340] = −0.1580417407
l[341] = −0.1586153299
l[342] = −0.1591413689
l[343] = −0.1596203888
l[344] = −0.1600529215
l[345] = −0.1604394986
l[346] = −0.1607806519
l[347] = −0.1610769130
l[348] = −0.1613288133
l[349] = −0.1615368844
l[350] = −0.1617016576
l[351] = −0.1618236647

TABLE 8-continued (lifting coefficients l(n); M = 512)

l[352] = −0.1619034374
l[353] = −0.1619415073
l[354] = −0.1619384064
l[355] = −0.1618946658
l[356] = −0.1618108165
l[357] = −0.1616873893
l[358] = −0.1615249153
l[359] = −0.1613239260
l[360] = −0.1610849534
l[361] = −0.1608085297
l[362] = −0.1604951871
l[363] = −0.1601454570
l[364] = −0.1597598702
l[365] = −0.1593389576
l[366] = −0.1588832500
l[367] = −0.1583932788
l[368] = −0.1578695762
l[369] = −0.1573126744
l[370] = −0.1567231053
l[371] = −0.1561014007
l[372] = −0.1554480914
l[373] = −0.1547637083
l[374] = −0.1540487824
l[375] = −0.1533038449
l[376] = −0.1525294275
l[377] = −0.1517260621
l[378] = −0.1508942803
l[379] = −0.1500346137
l[380] = −0.1491475939
l[381] = −0.1482337526
l[382] = −0.1472936213
l[383] = −0.1463277315
l[384] = −0.1453366145
l[385] = −0.1443208015
l[386] = −0.1432808238
l[387] = −0.1422172130
l[388] = −0.1411305007
l[389] = −0.1400212186
l[390] = −0.1388898983
l[391] = −0.1377370715
l[392] = −0.1365632693
l[393] = −0.1353690234
l[394] = −0.1341548649
l[395] = −0.1329213253
l[396] = −0.1316689358
l[397] = −0.1303982276
l[398] = −0.1291097320
l[399] = −0.1278039807
l[400] = −0.1264815057
l[401] = −0.1251428390
l[402] = −0.1237885126
l[403] = −0.1224190580
l[404] = −0.1210350062
l[405] = −0.1196368881
l[406] = −0.1182252345
l[407] = −0.1168005768
l[408] = −0.1153634470
l[409] = −0.1139143766
l[410] = −0.1124538977
l[411] = −0.1109825416
l[412] = −0.1095008396
l[413] = −0.1080093229
l[414] = −0.1065085227
l[415] = −0.1049989705
l[416] = −0.1034811981
l[417] = −0.1019557373
l[418] = −0.1004231200
l[419] = −0.0988838777
l[420] = −0.0973385416
l[421] = −0.0957876431
l[422] = −0.0942317135
l[423] = −0.0926712840
l[424] = −0.0911068863
l[425] = −0.0895390519
l[426] = −0.0879683123
l[427] = −0.0863951990
l[428] = −0.0848202435
l[429] = −0.0832439774

TABLE 8-continued

| (lifting coefficients l(n); M = 512) |
|---|
| l[430] = −0.0816669322 |
| l[431] = −0.0800896394 |
| l[432] = −0.0785126302 |
| l[433] = −0.0769364362 |
| l[434] = −0.0753615888 |
| l[435] = −0.0737886195 |
| l[436] = −0.0722180597 |
| l[437] = −0.0706504412 |
| l[438] = −0.0690862954 |
| l[439] = −0.0675261540 |
| l[440] = −0.0659705481 |
| l[441] = −0.0644200093 |
| l[442] = −0.0628750688 |
| l[443] = −0.0613362581 |
| l[444] = −0.0598041089 |
| l[445] = −0.0582791526 |
| l[446] = −0.0567619210 |
| l[447] = −0.0552529454 |
| l[448] = −0.0537527573 |
| l[449] = −0.0522618880 |
| l[450] = −0.0507808690 |
| l[451] = −0.0493102317 |
| l[452] = −0.0478505077 |
| l[453] = −0.0464022286 |
| l[454] = −0.0449659259 |
| l[455] = −0.0435421312 |
| l[456] = −0.0421313759 |
| l[457] = −0.0407341912 |
| l[458] = −0.0393511087 |
| l[459] = −0.0379826599 |
| l[460] = −0.0366293762 |
| l[461] = −0.0352917891 |
| l[462] = −0.0339704304 |
| l[463] = −0.0326658313 |
| l[464] = −0.0313785234 |
| l[465] = −0.0301090381 |
| l[466] = −0.0288579069 |
| l[467] = −0.0276256611 |
| l[468] = −0.0264128324 |
| l[469] = −0.0252199523 |
| l[470] = −0.0240475522 |
| l[471] = −0.0228961635 |
| l[472] = −0.0217663179 |
| l[473] = −0.0206585466 |
| l[474] = −0.0195733813 |
| l[475] = −0.0185113532 |
| l[476] = −0.0174729940 |
| l[477] = −0.0164588352 |
| l[478] = −0.0154694082 |
| l[479] = −0.0145052447 |
| l[480] = −0.0135668760 |
| l[481] = −0.0126548337 |
| l[482] = −0.0117696492 |
| l[483] = −0.0109118541 |
| l[484] = −0.0100819798 |
| l[485] = −0.0092805576 |
| l[486] = −0.0085081191 |
| l[487] = −0.0077651958 |
| l[488] = −0.0070523191 |
| l[489] = −0.0063700205 |
| l[490] = −0.0057188316 |
| l[491] = −0.0050992838 |
| l[492] = −0.0045119086 |
| l[493] = −0.0039572375 |
| l[494] = −0.0034358020 |
| l[495] = −0.0029481335 |
| l[496] = −0.0024947635 |
| l[497] = −0.0020762235 |
| l[498] = −0.0016930450 |
| l[499] = −0.0013457594 |
| l[500] = −0.0010348984 |
| l[501] = −0.0007609932 |
| l[502] = −0.0005245755 |
| l[503] = −0.0003261766 |
| l[504] = −0.0001663282 |
| l[505] = −0.0000455615 |
| l[506] = 0.0000355918 |
| l[507] = 0.0000766002 |

TABLE 8-continued

| (lifting coefficients l(n); M = 512) |
|---|
| l[508] = 0.0000769324 |
| l[509] = 0.0000360568 |
| l[510] = −0.0000465581 |
| l[511] = −0.0001714437 |

TABLE 9

| (window coefficients w(n); M = 480) |
|---|
| −0.582 ≤ w[0] ≤ −0.580 |
| −0.577 ≤ w[1] ≤ −0.575 |
| −0.573 ≤ w[2] ≤ −0.571 |
| −0.568 ≤ w[3] ≤ −0.566 |
| −0.563 ≤ w[4] ≤ −0.561 |
| −0.559 ≤ w[5] ≤ −0.557 |
| −0.554 ≤ w[6] ≤ −0.552 |
| −0.549 ≤ w[7] ≤ −0.547 |
| −0.545 ≤ w[8] ≤ −0.543 |
| −0.540 ≤ w[9] ≤ −0.538 |
| −0.535 ≤ w[10] ≤ −0.533 |
| −0.530 ≤ w[11] ≤ −0.528 |
| −0.526 ≤ w[12] ≤ −0.524 |
| −0.521 ≤ w[13] ≤ −0.519 |
| −0.516 ≤ w[14] ≤ −0.514 |
| −0.511 ≤ w[15] ≤ −0.509 |
| −0.506 ≤ w[16] ≤ −0.504 |
| −0.501 ≤ w[17] ≤ −0.499 |
| −0.496 ≤ w[18] ≤ −0.494 |
| −0.491 ≤ w[19] ≤ −0.489 |
| −0.486 ≤ w[20] ≤ −0.484 |
| −0.481 ≤ w[21] ≤ −0.479 |
| −0.476 ≤ w[22] ≤ −0.474 |
| −0.471 ≤ w[23] ≤ −0.469 |
| −0.466 ≤ w[24] ≤ −0.464 |
| −0.461 ≤ w[25] ≤ −0.459 |
| −0.455 ≤ w[26] ≤ −0.453 |
| −0.450 ≤ w[27] ≤ −0.448 |
| −0.445 ≤ w[28] ≤ −0.443 |
| −0.440 ≤ w[29] ≤ −0.438 |
| −0.435 ≤ w[30] ≤ −0.433 |
| −0.429 ≤ w[31] ≤ −0.427 |
| −0.424 ≤ w[32] ≤ −0.422 |
| −0.419 ≤ w[33] ≤ −0.417 |
| −0.414 ≤ w[34] ≤ −0.412 |
| −0.408 ≤ w[35] ≤ −0.406 |
| −0.403 ≤ w[36] ≤ −0.401 |
| −0.398 ≤ w[37] ≤ −0.396 |
| −0.392 ≤ w[38] ≤ −0.390 |
| −0.387 ≤ w[39] ≤ −0.385 |
| −0.381 ≤ w[40] ≤ −0.379 |
| −0.376 ≤ w[41] ≤ −0.374 |
| −0.371 ≤ w[42] ≤ −0.369 |
| −0.365 ≤ w[43] ≤ −0.363 |
| −0.360 ≤ w[44] ≤ −0.358 |
| −0.354 ≤ w[45] ≤ −0.352 |
| −0.349 ≤ w[46] ≤ −0.347 |
| −0.344 ≤ w[47] ≤ −0.342 |
| −0.338 ≤ w[48] ≤ −0.336 |
| −0.333 ≤ w[49] ≤ −0.331 |
| −0.327 ≤ w[50] ≤ −0.325 |
| −0.322 ≤ w[51] ≤ −0.320 |
| −0.316 ≤ w[52] ≤ −0.314 |
| −0.311 ≤ w[53] ≤ −0.309 |
| −0.305 ≤ w[54] ≤ −0.303 |
| −0.300 ≤ w[55] ≤ −0.298 |
| −0.295 ≤ w[56] ≤ −0.293 |
| −0.289 ≤ w[57] ≤ −0.287 |
| −0.284 ≤ w[58] ≤ −0.282 |
| −0.278 ≤ w[59] ≤ −0.276 |
| −0.273 ≤ w[60] ≤ −0.271 |
| −0.267 ≤ w[61] ≤ −0.265 |
| −0.262 ≤ w[62] ≤ −0.260 |
| −0.257 ≤ w[63] ≤ −0.255 |
| −0.251 ≤ w[64] ≤ −0.249 |
| −0.246 ≤ w[65] ≤ −0.244 |

TABLE 9-continued

| (window coefficients w(n); M = 480) |
|---|
| −0.241 ≤ w[66] ≤ −0.239 |
| −0.236 ≤ w[67] ≤ −0.234 |
| −0.231 ≤ w[68] ≤ −0.229 |
| −0.225 ≤ w[69] ≤ −0.223 |
| −0.220 ≤ w[70] ≤ −0.218 |
| −0.215 ≤ w[71] ≤ −0.213 |
| −0.210 ≤ w[72] ≤ −0.208 |
| −0.205 ≤ w[73] ≤ −0.203 |
| −0.200 ≤ w[74] ≤ −0.198 |
| −0.195 ≤ w[75] ≤ −0.193 |
| −0.190 ≤ w[76] ≤ −0.188 |
| −0.185 ≤ w[77] ≤ −0.183 |
| −0.180 ≤ w[78] ≤ −0.178 |
| −0.175 ≤ w[79] ≤ −0.173 |
| −0.170 ≤ w[80] ≤ −0.168 |
| −0.165 ≤ w[81] ≤ −0.163 |
| −0.160 ≤ w[82] ≤ −0.158 |
| −0.155 ≤ w[83] ≤ −0.153 |
| −0.151 ≤ w[84] ≤ −0.149 |
| −0.146 ≤ w[85] ≤ −0.144 |
| −0.141 ≤ w[86] ≤ −0.139 |
| −0.137 ≤ w[87] ≤ −0.135 |
| −0.132 ≤ w[88] ≤ −0.130 |
| −0.128 ≤ w[89] ≤ −0.126 |
| −0.123 ≤ w[90] ≤ −0.121 |
| −0.119 ≤ w[91] ≤ −0.117 |
| −0.115 ≤ w[92] ≤ −0.113 |
| −0.110 ≤ w[93] ≤ −0.108 |
| −0.106 ≤ w[94] ≤ −0.104 |
| −0.102 ≤ w[95] ≤ −0.100 |
| −0.098 ≤ w[96] ≤ −0.096 |
| −0.093 ≤ w[97] ≤ −0.091 |
| −0.089 ≤ w[98] ≤ −0.087 |
| −0.085 ≤ w[99] ≤ −0.083 |
| −0.081 ≤ w[100] ≤ −0.079 |
| −0.076 ≤ w[101] ≤ −0.074 |
| −0.072 ≤ w[102] ≤ −0.070 |
| −0.068 ≤ w[103] ≤ −0.066 |
| −0.064 ≤ w[104] ≤ −0.062 |
| −0.059 ≤ w[105] ≤ −0.057 |
| −0.055 ≤ w[106] ≤ −0.053 |
| −0.051 ≤ w[107] ≤ −0.049 |
| −0.046 ≤ w[108] ≤ −0.044 |
| −0.042 ≤ w[109] ≤ −0.040 |
| −0.037 ≤ w[110] ≤ −0.035 |
| −0.033 ≤ w[111] ≤ −0.031 |
| −0.029 ≤ w[112] ≤ −0.027 |
| −0.024 ≤ w[113] ≤ −0.022 |
| −0.020 ≤ w[114] ≤ −0.018 |
| −0.016 ≤ w[115] ≤ −0.014 |
| −0.012 ≤ w[116] ≤ −0.010 |
| −0.008 ≤ w[117] ≤ −0.006 |
| −0.005 ≤ w[118] ≤ −0.003 |
| −0.002 ≤ w[119] ≤ 0.000 |
| \|w[120]\| ≤ 0.001 |
| \|w[121]\| ≤ 0.001 |
| \|w[122]\| ≤ 0.001 |
| \|w[123]\| ≤ 0.001 |
| \|w[124]\| ≤ 0.001 |
| \|w[125]\| ≤ 0.001 |
| \|w[126]\| ≤ 0.001 |
| \|w[127]\| ≤ 0.001 |
| \|w[128]\| ≤ 0.001 |
| \|w[129]\| ≤ 0.001 |
| \|w[130]\| ≤ 0.001 |
| \|w[131]\| ≤ 0.001 |
| \|w[132]\| ≤ 0.001 |
| \|w[133]\| ≤ 0.001 |
| \|w[134]\| ≤ 0.001 |
| \|w[135]\| ≤ 0.001 |
| \|w[136]\| ≤ 0.001 |
| \|w[137]\| ≤ 0.001 |
| \|w[138]\| ≤ 0.001 |
| \|w[139]\| ≤ 0.001 |
| \|w[140]\| ≤ 0.001 |
| \|w[141]\| ≤ 0.001 |
| \|w[142]\| ≤ 0.001 |
| \|w[143]\| ≤ 0.001 |

TABLE 9-continued

| (window coefficients w(n); M = 480) |
|---|
| \|w[144]\| ≤ 0.001 |
| \|w[145]\| ≤ 0.001 |
| \|w[146]\| ≤ 0.001 |
| \|w[147]\| ≤ 0.001 |
| \|w[148]\| ≤ 0.001 |
| \|w[149]\| ≤ 0.001 |
| \|w[150]\| ≤ 0.001 |
| \|w[151]\| ≤ 0.001 |
| \|w[152]\| ≤ 0.001 |
| \|w[153]\| ≤ 0.001 |
| \|w[154]\| ≤ 0.001 |
| \|w[155]\| ≤ 0.001 |
| \|w[156]\| ≤ 0.001 |
| \|w[157]\| ≤ 0.001 |
| \|w[158]\| ≤ 0.001 |
| \|w[159]\| ≤ 0.001 |
| \|w[160]\| ≤ 0.001 |
| \|w[161]\| ≤ 0.001 |
| \|w[162]\| ≤ 0.001 |
| \|w[163]\| ≤ 0.001 |
| \|w[164]\| ≤ 0.001 |
| \|w[165]\| ≤ 0.001 |
| \|w[166]\| ≤ 0.001 |
| \|w[167]\| ≤ 0.001 |
| \|w[168]\| ≤ 0.001 |
| \|w[169]\| ≤ 0.001 |
| \|w[170]\| ≤ 0.001 |
| \|w[171]\| ≤ 0.001 |
| \|w[172]\| ≤ 0.001 |
| \|w[173]\| ≤ 0.001 |
| \|w[174]\| ≤ 0.001 |
| \|w[175]\| ≤ 0.001 |
| \|w[176]\| ≤ 0.001 |
| \|w[177]\| ≤ 0.001 |
| \|w[178]\| ≤ 0.001 |
| \|w[179]\| ≤ 0.001 |
| \|w[180]\| ≤ 0.001 |
| \|w[181]\| ≤ 0.001 |
| \|w[182]\| ≤ 0.001 |
| \|w[183]\| ≤ 0.001 |
| \|w[184]\| ≤ 0.001 |
| \|w[185]\| ≤ 0.001 |
| \|w[186]\| ≤ 0.001 |
| \|w[187]\| ≤ 0.001 |
| \|w[188]\| ≤ 0.001 |
| \|w[189]\| ≤ 0.001 |
| \|w[190]\| ≤ 0.001 |
| \|w[191]\| ≤ 0.001 |
| \|w[192]\| ≤ 0.001 |
| \|w[193]\| ≤ 0.001 |
| \|w[194]\| ≤ 0.001 |
| \|w[195]\| ≤ 0.001 |
| \|w[196]\| ≤ 0.001 |
| \|w[197]\| ≤ 0.001 |
| \|w[198]\| ≤ 0.001 |
| \|w[199]\| ≤ 0.001 |
| \|w[200]\| ≤ 0.001 |
| \|w[201]\| ≤ 0.001 |
| \|w[202]\| ≤ 0.001 |
| \|w[203]\| ≤ 0.001 |
| \|w[204]\| ≤ 0.001 |
| \|w[205]\| ≤ 0.001 |
| \|w[206]\| ≤ 0.001 |
| \|w[207]\| ≤ 0.001 |
| \|w[208]\| ≤ 0.001 |
| \|w[209]\| ≤ 0.001 |
| \|w[210]\| ≤ 0.001 |
| \|w[211]\| ≤ 0.001 |
| \|w[212]\| ≤ 0.001 |
| \|w[213]\| ≤ 0.001 |
| \|w[214]\| ≤ 0.001 |
| \|w[215]\| ≤ 0.001 |
| \|w[216]\| ≤ 0.001 |
| \|w[217]\| ≤ 0.001 |
| \|w[218]\| ≤ 0.001 |
| \|w[219]\| ≤ 0.001 |
| \|w[220]\| ≤ 0.001 |
| \|w[221]\| ≤ 0.001 |

TABLE 9-continued

| (window coefficients w(n); M = 480) |
|---|
| $\lvert w[222]\rvert \le 0.001$ |
| $\lvert w[223]\rvert \le 0.001$ |
| $\lvert w[224]\rvert \le 0.001$ |
| $\lvert w[225]\rvert \le 0.001$ |
| $\lvert w[226]\rvert \le 0.001$ |
| $\lvert w[227]\rvert \le 0.001$ |
| $\lvert w[228]\rvert \le 0.001$ |
| $\lvert w[229]\rvert \le 0.001$ |
| $\lvert w[230]\rvert \le 0.001$ |
| $\lvert w[231]\rvert \le 0.001$ |
| $\lvert w[232]\rvert \le 0.001$ |
| $\lvert w[233]\rvert \le 0.001$ |
| $\lvert w[234]\rvert \le 0.001$ |
| $\lvert w[235]\rvert \le 0.001$ |
| $\lvert w[236]\rvert \le 0.001$ |
| $\lvert w[237]\rvert \le 0.001$ |
| $\lvert w[238]\rvert \le 0.001$ |
| $\lvert w[239]\rvert \le 0.001$ |
| $-1.002 \le w[240] \le -1.000$ |
| $-1.002 \le w[241] \le -1.000$ |
| $-1.003 \le w[242] \le -1.001$ |
| $-1.003 \le w[243] \le -1.001$ |
| $-1.004 \le w[244] \le -1.002$ |
| $-1.005 \le w[245] \le -1.003$ |
| $-1.005 \le w[246] \le -1.003$ |
| $-1.006 \le w[247] \le -1.004$ |
| $-1.006 \le w[248] \le -1.004$ |
| $-1.007 \le w[249] \le -1.005$ |
| $-1.008 \le w[250] \le -1.006$ |
| $-1.008 \le w[251] \le -1.006$ |
| $-1.009 \le w[252] \le -1.007$ |
| $-1.009 \le w[253] \le -1.007$ |
| $-1.010 \le w[254] \le -1.008$ |
| $-1.011 \le w[255] \le -1.009$ |
| $-1.011 \le w[256] \le -1.009$ |
| $-1.012 \le w[257] \le -1.010$ |
| $-1.012 \le w[258] \le -1.010$ |
| $-1.013 \le w[259] \le -1.011$ |
| $-1.014 \le w[260] \le -1.012$ |
| $-1.014 \le w[261] \le -1.012$ |
| $-1.015 \le w[262] \le -1.013$ |
| $-1.015 \le w[263] \le -1.013$ |
| $-1.016 \le w[264] \le -1.014$ |
| $-1.017 \le w[265] \le -1.015$ |
| $-1.017 \le w[266] \le -1.015$ |
| $-1.018 \le w[267] \le -1.016$ |
| $-1.018 \le w[268] \le -1.016$ |
| $-1.019 \le w[269] \le -1.017$ |
| $-1.020 \le w[270] \le -1.018$ |
| $-1.020 \le w[271] \le -1.018$ |
| $-1.021 \le w[272] \le -1.019$ |
| $-1.021 \le w[273] \le -1.019$ |
| $-1.022 \le w[274] \le -1.020$ |
| $-1.023 \le w[275] \le -1.021$ |
| $-1.023 \le w[276] \le -1.021$ |
| $-1.024 \le w[277] \le -1.022$ |
| $-1.024 \le w[278] \le -1.022$ |
| $-1.025 \le w[279] \le -1.023$ |
| $-1.025 \le w[280] \le -1.023$ |
| $-1.026 \le w[281] \le -1.024$ |
| $-1.027 \le w[282] \le -1.025$ |
| $-1.027 \le w[283] \le -1.025$ |
| $-1.028 \le w[284] \le -1.026$ |
| $-1.028 \le w[285] \le -1.026$ |
| $-1.029 \le w[286] \le -1.027$ |
| $-1.030 \le w[287] \le -1.028$ |
| $-1.030 \le w[288] \le -1.028$ |
| $-1.031 \le w[289] \le -1.029$ |
| $-1.031 \le w[290] \le -1.029$ |
| $-1.032 \le w[291] \le -1.030$ |
| $-1.032 \le w[292] \le -1.030$ |
| $-1.033 \le w[293] \le -1.031$ |
| $-1.034 \le w[294] \le -1.032$ |
| $-1.034 \le w[295] \le -1.032$ |
| $-1.035 \le w[296] \le -1.033$ |
| $-1.035 \le w[297] \le -1.033$ |
| $-1.036 \le w[298] \le -1.034$ |
| $-1.036 \le w[299] \le -1.034$ |

TABLE 9-continued

| (window coefficients w(n); M = 480) |
|---|
| $-1.037 \le w[300] \le -1.035$ |
| $-1.038 \le w[301] \le -1.036$ |
| $-1.038 \le w[302] \le -1.036$ |
| $-1.039 \le w[303] \le -1.037$ |
| $-1.039 \le w[304] \le -1.037$ |
| $-1.040 \le w[305] \le -1.038$ |
| $-1.040 \le w[306] \le -1.038$ |
| $-1.041 \le w[307] \le -1.039$ |
| $-1.041 \le w[308] \le -1.039$ |
| $-1.042 \le w[309] \le -1.040$ |
| $-1.042 \le w[310] \le -1.040$ |
| $-1.043 \le w[311] \le -1.041$ |
| $-1.044 \le w[312] \le -1.042$ |
| $-1.044 \le w[313] \le -1.042$ |
| $-1.045 \le w[314] \le -1.043$ |
| $-1.045 \le w[315] \le -1.043$ |
| $-1.046 \le w[316] \le -1.044$ |
| $-1.046 \le w[317] \le -1.044$ |
| $-1.047 \le w[318] \le -1.045$ |
| $-1.047 \le w[319] \le -1.045$ |
| $-1.048 \le w[320] \le -1.046$ |
| $-1.048 \le w[321] \le -1.046$ |
| $-1.049 \le w[322] \le -1.047$ |
| $-1.049 \le w[323] \le -1.047$ |
| $-1.050 \le w[324] \le -1.048$ |
| $-1.050 \le w[325] \le -1.048$ |
| $-1.051 \le w[326] \le -1.049$ |
| $-1.051 \le w[327] \le -1.049$ |
| $-1.052 \le w[328] \le -1.050$ |
| $-1.052 \le w[329] \le -1.050$ |
| $-1.053 \le w[330] \le -1.051$ |
| $-1.053 \le w[331] \le -1.051$ |
| $-1.054 \le w[332] \le -1.052$ |
| $-1.054 \le w[333] \le -1.052$ |
| $-1.055 \le w[334] \le -1.053$ |
| $-1.055 \le w[335] \le -1.053$ |
| $-1.056 \le w[336] \le -1.054$ |
| $-1.056 \le w[337] \le -1.054$ |
| $-1.057 \le w[338] \le -1.055$ |
| $-1.057 \le w[339] \le -1.055$ |
| $-1.058 \le w[340] \le -1.056$ |
| $-1.058 \le w[341] \le -1.056$ |
| $-1.059 \le w[342] \le -1.057$ |
| $-1.059 \le w[343] \le -1.057$ |
| $-1.060 \le w[344] \le -1.058$ |
| $-1.060 \le w[345] \le -1.058$ |
| $-1.060 \le w[346] \le -1.058$ |
| $-1.061 \le w[347] \le -1.059$ |
| $-1.061 \le w[348] \le -1.059$ |
| $-1.062 \le w[349] \le -1.060$ |
| $-1.062 \le w[350] \le -1.060$ |
| $-1.063 \le w[351] \le -1.061$ |
| $-1.063 \le w[352] \le -1.061$ |
| $-1.064 \le w[353] \le -1.062$ |
| $-1.064 \le w[354] \le -1.062$ |
| $-1.065 \le w[355] \le -1.063$ |
| $-1.065 \le w[356] \le -1.063$ |
| $-1.065 \le w[357] \le -1.063$ |
| $-1.066 \le w[358] \le -1.064$ |
| $-1.066 \le w[359] \le -1.064$ |
| $-1.066 \le w[360] \le -1.064$ |
| $-1.067 \le w[361] \le -1.065$ |
| $-1.067 \le w[362] \le -1.065$ |
| $-1.067 \le w[363] \le -1.065$ |
| $-1.067 \le w[364] \le -1.065$ |
| $-1.067 \le w[365] \le -1.065$ |
| $-1.067 \le w[366] \le -1.065$ |
| $-1.067 \le w[367] \le -1.065$ |
| $-1.066 \le w[368] \le -1.064$ |
| $-1.066 \le w[369] \le -1.064$ |
| $-1.066 \le w[370] \le -1.064$ |
| $-1.066 \le w[371] \le -1.064$ |
| $-1.066 \le w[372] \le -1.064$ |
| $-1.066 \le w[373] \le -1.064$ |
| $-1.065 \le w[374] \le -1.063$ |
| $-1.065 \le w[375] \le -1.063$ |
| $-1.065 \le w[376] \le -1.063$ |
| $-1.064 \le w[377] \le -1.062$ |

TABLE 9-continued

| (window coefficients w(n); M = 480) |
|---|
| −1.064 ≤ w[378] ≤ −1.062 |
| −1.063 ≤ w[379] ≤ −1.061 |
| −1.063 ≤ w[380] ≤ −1.061 |
| −1.062 ≤ w[381] ≤ −1.060 |
| −1.062 ≤ w[382] ≤ −1.060 |
| −1.061 ≤ w[383] ≤ −1.059 |
| −1.061 ≤ w[384] ≤ −1.059 |
| −1.060 ≤ w[385] ≤ −1.058 |
| −1.060 ≤ w[386] ≤ −1.058 |
| −1.059 ≤ w[387] ≤ −1.057 |
| −1.059 ≤ w[388] ≤ −1.057 |
| −1.058 ≤ w[389] ≤ −1.056 |
| −1.057 ≤ w[390] ≤ −1.055 |
| −1.056 ≤ w[391] ≤ −1.054 |
| −1.056 ≤ w[392] ≤ −1.054 |
| −1.055 ≤ w[393] ≤ −1.053 |
| −1.054 ≤ w[394] ≤ −1.052 |
| −1.053 ≤ w[395] ≤ −1.051 |
| −1.052 ≤ w[396] ≤ −1.050 |
| −1.051 ≤ w[397] ≤ −1.049 |
| −1.050 ≤ w[398] ≤ −1.048 |
| −1.049 ≤ w[399] ≤ −1.047 |
| −1.048 ≤ w[400] ≤ −1.046 |
| −1.046 ≤ w[401] ≤ −1.044 |
| −1.045 ≤ w[402] ≤ −1.043 |
| −1.044 ≤ w[403] ≤ −1.042 |
| −1.042 ≤ w[404] ≤ −1.040 |
| −1.041 ≤ w[405] ≤ −1.039 |
| −1.039 ≤ w[406] ≤ −1.037 |
| −1.038 ≤ w[407] ≤ −1.036 |
| −1.036 ≤ w[408] ≤ −1.034 |
| −1.035 ≤ w[409] ≤ −1.033 |
| −1.033 ≤ w[410] ≤ −1.031 |
| −1.032 ≤ w[411] ≤ −1.030 |
| −1.030 ≤ w[412] ≤ −1.028 |
| −1.028 ≤ w[413] ≤ −1.026 |
| −1.027 ≤ w[414] ≤ −1.025 |
| −1.025 ≤ w[415] ≤ −1.023 |
| −1.023 ≤ w[416] ≤ −1.021 |
| −1.021 ≤ w[417] ≤ −1.019 |
| −1.020 ≤ w[418] ≤ −1.018 |
| −1.018 ≤ w[419] ≤ −1.016 |
| −1.016 ≤ w[420] ≤ −1.014 |
| −1.014 ≤ w[421] ≤ −1.012 |
| −1.012 ≤ w[422] ≤ −1.010 |
| −1.009 ≤ w[423] ≤ −1.007 |
| −1.007 ≤ w[424] ≤ −1.005 |
| −1.005 ≤ w[425] ≤ −1.003 |
| −1.003 ≤ w[426] ≤ −1.001 |
| −1.000 ≤ w[427] ≤ −0.998 |
| −0.998 ≤ w[428] ≤ −0.996 |
| −0.996 ≤ w[429] ≤ −0.994 |
| −0.993 ≤ w[430] ≤ −0.991 |
| −0.991 ≤ w[431] ≤ −0.989 |
| −0.988 ≤ w[432] ≤ −0.986 |
| −0.986 ≤ w[433] ≤ −0.984 |
| −0.984 ≤ w[434] ≤ −0.982 |
| −0.981 ≤ w[435] ≤ −0.979 |
| −0.979 ≤ w[436] ≤ −0.977 |
| −0.976 ≤ w[437] ≤ −0.974 |
| −0.974 ≤ w[438] ≤ −0.972 |
| −0.971 ≤ w[439] ≤ −0.969 |
| −0.968 ≤ w[440] ≤ −0.966 |
| −0.966 ≤ w[441] ≤ −0.964 |
| −0.963 ≤ w[442] ≤ −0.961 |
| −0.960 ≤ w[443] ≤ −0.958 |
| −0.958 ≤ w[444] ≤ −0.956 |
| −0.955 ≤ w[445] ≤ −0.953 |
| −0.952 ≤ w[446] ≤ −0.950 |
| −0.949 ≤ w[447] ≤ −0.947 |
| −0.946 ≤ w[448] ≤ −0.944 |
| −0.943 ≤ w[449] ≤ −0.941 |
| −0.941 ≤ w[450] ≤ −0.939 |
| −0.938 ≤ w[451] ≤ −0.936 |
| −0.935 ≤ w[452] ≤ −0.933 |
| −0.932 ≤ w[453] ≤ −0.930 |
| −0.929 ≤ w[454] ≤ −0.927 |
| −0.927 ≤ w[455] ≤ −0.925 |

TABLE 9-continued

| (window coefficients w(n); M = 480) |
|---|
| −0.924 ≤ w[456] ≤ −0.922 |
| −0.921 ≤ w[457] ≤ −0.919 |
| −0.918 ≤ w[458] ≤ −0.916 |
| −0.915 ≤ w[459] ≤ −0.913 |
| −0.912 ≤ w[460] ≤ −0.910 |
| −0.909 ≤ w[461] ≤ −0.907 |
| −0.906 ≤ w[462] ≤ −0.904 |
| −0.903 ≤ w[463] ≤ −0.901 |
| −0.900 ≤ w[464] ≤ −0.898 |
| −0.898 ≤ w[465] ≤ −0.896 |
| −0.895 ≤ w[466] ≤ −0.893 |
| −0.892 ≤ w[467] ≤ −0.890 |
| −0.889 ≤ w[468] ≤ −0.887 |
| −0.886 ≤ w[469] ≤ −0.884 |
| −0.883 ≤ w[470] ≤ −0.881 |
| −0.881 ≤ w[471] ≤ −0.879 |
| −0.878 ≤ w[472] ≤ −0.876 |
| −0.875 ≤ w[473] ≤ −0.873 |
| −0.872 ≤ w[474] ≤ −0.870 |
| −0.869 ≤ w[475] ≤ −0.867 |
| −0.867 ≤ w[476] ≤ −0.865 |
| −0.864 ≤ w[477] ≤ −0.862 |
| −0.861 ≤ w[478] ≤ −0.859 |
| −0.859 ≤ w[479] ≤ −0.857 |
| −0.588 ≤ w[480] ≤ −0.586 |
| −0.593 ≤ w[481] ≤ −0.591 |
| −0.597 ≤ w[482] ≤ −0.595 |
| −0.602 ≤ w[483] ≤ −0.600 |
| −0.606 ≤ w[484] ≤ −0.604 |
| −0.611 ≤ w[485] ≤ −0.609 |
| −0.615 ≤ w[486] ≤ −0.613 |
| −0.619 ≤ w[487] ≤ −0.617 |
| −0.624 ≤ w[488] ≤ −0.622 |
| −0.628 ≤ w[489] ≤ −0.626 |
| −0.632 ≤ w[490] ≤ −0.630 |
| −0.637 ≤ w[491] ≤ −0.635 |
| −0.641 ≤ w[492] ≤ −0.639 |
| −0.645 ≤ w[493] ≤ −0.643 |
| −0.649 ≤ w[494] ≤ −0.647 |
| −0.654 ≤ w[495] ≤ −0.652 |
| −0.658 ≤ w[496] ≤ −0.656 |
| −0.662 ≤ w[497] ≤ −0.660 |
| −0.666 ≤ w[498] ≤ −0.664 |
| −0.670 ≤ w[499] ≤ −0.668 |
| −0.674 ≤ w[500] ≤ −0.672 |
| −0.678 ≤ w[501] ≤ −0.676 |
| −0.682 ≤ w[502] ≤ −0.680 |
| −0.686 ≤ w[503] ≤ −0.684 |
| −0.690 ≤ w[504] ≤ −0.688 |
| −0.694 ≤ w[505] ≤ −0.692 |
| −0.698 ≤ w[506] ≤ −0.696 |
| −0.702 ≤ w[507] ≤ −0.700 |
| −0.706 ≤ w[508] ≤ −0.704 |
| −0.710 ≤ w[509] ≤ −0.708 |
| −0.714 ≤ w[510] ≤ −0.712 |
| −0.717 ≤ w[511] ≤ −0.715 |
| −0.721 ≤ w[512] ≤ −0.719 |
| −0.725 ≤ w[513] ≤ −0.723 |
| −0.729 ≤ w[514] ≤ −0.727 |
| −0.732 ≤ w[515] ≤ −0.730 |
| −0.736 ≤ w[516] ≤ −0.734 |
| −0.740 ≤ w[517] ≤ −0.738 |
| −0.743 ≤ w[518] ≤ −0.741 |
| −0.747 ≤ w[519] ≤ −0.745 |
| −0.750 ≤ w[520] ≤ −0.748 |
| −0.754 ≤ w[521] ≤ −0.752 |
| −0.758 ≤ w[522] ≤ −0.756 |
| −0.761 ≤ w[523] ≤ −0.759 |
| −0.764 ≤ w[524] ≤ −0.762 |
| −0.768 ≤ w[525] ≤ −0.766 |
| −0.771 ≤ w[526] ≤ −0.769 |
| −0.775 ≤ w[527] ≤ −0.773 |
| −0.778 ≤ w[528] ≤ −0.776 |
| −0.781 ≤ w[529] ≤ −0.779 |
| −0.785 ≤ w[530] ≤ −0.783 |
| −0.788 ≤ w[531] ≤ −0.786 |
| −0.791 ≤ w[532] ≤ −0.789 |
| −0.794 ≤ w[533] ≤ −0.792 |

TABLE 9-continued

| (window coefficients w(n); M = 480) |
|---|
| −0.798 ≤ w[534] ≤ −0.796 |
| −0.801 ≤ w[535] ≤ −0.799 |
| −0.804 ≤ w[536] ≤ −0.802 |
| −0.807 ≤ w[537] ≤ −0.805 |
| −0.810 ≤ w[538] ≤ −0.808 |
| −0.813 ≤ w[539] ≤ −0.811 |
| −0.816 ≤ w[540] ≤ −0.814 |
| −0.819 ≤ w[541] ≤ −0.817 |
| −0.822 ≤ w[542] ≤ −0.820 |
| −0.825 ≤ w[543] ≤ −0.823 |
| −0.828 ≤ w[544] ≤ −0.826 |
| −0.831 ≤ w[545] ≤ −0.829 |
| −0.833 ≤ w[546] ≤ −0.831 |
| −0.836 ≤ w[547] ≤ −0.834 |
| −0.839 ≤ w[548] ≤ −0.837 |
| −0.842 ≤ w[549] ≤ −0.840 |
| −0.844 ≤ w[550] ≤ −0.842 |
| −0.847 ≤ w[551] ≤ −0.845 |
| −0.850 ≤ w[552] ≤ −0.848 |
| −0.852 ≤ w[553] ≤ −0.850 |
| −0.855 ≤ w[554] ≤ −0.853 |
| −0.857 ≤ w[555] ≤ −0.855 |
| −0.860 ≤ w[556] ≤ −0.858 |
| −0.862 ≤ w[557] ≤ −0.860 |
| −0.865 ≤ w[558] ≤ −0.863 |
| −0.867 ≤ w[559] ≤ −0.865 |
| −0.869 ≤ w[560] ≤ −0.867 |
| −0.872 ≤ w[561] ≤ −0.870 |
| −0.874 ≤ w[562] ≤ −0.872 |
| −0.876 ≤ w[563] ≤ −0.874 |
| −0.878 ≤ w[564] ≤ −0.876 |
| −0.880 ≤ w[565] ≤ −0.878 |
| −0.883 ≤ w[566] ≤ −0.881 |
| −0.885 ≤ w[567] ≤ −0.883 |
| −0.887 ≤ w[568] ≤ −0.885 |
| −0.889 ≤ w[569] ≤ −0.887 |
| −0.891 ≤ w[570] ≤ −0.889 |
| −0.893 ≤ w[571] ≤ −0.891 |
| −0.895 ≤ w[572] ≤ −0.893 |
| −0.897 ≤ w[573] ≤ −0.895 |
| −0.898 ≤ w[574] ≤ −0.896 |
| −0.900 ≤ w[575] ≤ −0.898 |
| −0.902 ≤ w[576] ≤ −0.900 |
| −0.904 ≤ w[577] ≤ −0.902 |
| −0.906 ≤ w[578] ≤ −0.904 |
| −0.908 ≤ w[579] ≤ −0.906 |
| −0.909 ≤ w[580] ≤ −0.907 |
| −0.911 ≤ w[581] ≤ −0.909 |
| −0.913 ≤ w[582] ≤ −0.911 |
| −0.914 ≤ w[583] ≤ −0.912 |
| −0.916 ≤ w[584] ≤ −0.914 |
| −0.918 ≤ w[585] ≤ −0.916 |
| −0.920 ≤ w[586] ≤ −0.918 |
| −0.921 ≤ w[587] ≤ −0.919 |
| −0.923 ≤ w[588] ≤ −0.921 |
| −0.925 ≤ w[589] ≤ −0.923 |
| −0.926 ≤ w[590] ≤ −0.924 |
| −0.928 ≤ w[591] ≤ −0.926 |
| −0.930 ≤ w[592] ≤ −0.928 |
| −0.931 ≤ w[593] ≤ −0.929 |
| −0.933 ≤ w[594] ≤ −0.931 |
| −0.934 ≤ w[595] ≤ −0.932 |
| −0.936 ≤ w[596] ≤ −0.934 |
| −0.937 ≤ w[597] ≤ −0.935 |
| −0.938 ≤ w[598] ≤ −0.936 |
| −0.939 ≤ w[599] ≤ −0.937 |
| −0.940 ≤ w[600] ≤ −0.938 |
| −0.940 ≤ w[601] ≤ −0.938 |
| −0.940 ≤ w[602] ≤ −0.938 |
| −0.941 ≤ w[603] ≤ −0.939 |
| −0.941 ≤ w[604] ≤ −0.939 |
| −0.942 ≤ w[605] ≤ −0.940 |
| −0.942 ≤ w[606] ≤ −0.940 |
| −0.942 ≤ w[607] ≤ −0.940 |
| −0.943 ≤ w[608] ≤ −0.941 |
| −0.943 ≤ w[609] ≤ −0.941 |
| −0.944 ≤ w[610] ≤ −0.942 |
| −0.944 ≤ w[611] ≤ −0.942 |

TABLE 9-continued

| (window coefficients w(n); M = 480) |
|---|
| −0.944 ≤ w[612] ≤ −0.942 |
| −0.945 ≤ w[613] ≤ −0.943 |
| −0.945 ≤ w[614] ≤ −0.943 |
| −0.946 ≤ w[615] ≤ −0.944 |
| −0.946 ≤ w[616] ≤ −0.944 |
| −0.947 ≤ w[617] ≤ −0.945 |
| −0.947 ≤ w[618] ≤ −0.945 |
| −0.947 ≤ w[619] ≤ −0.945 |
| −0.948 ≤ w[620] ≤ −0.946 |
| −0.948 ≤ w[621] ≤ −0.946 |
| −0.949 ≤ w[622] ≤ −0.947 |
| −0.949 ≤ w[623] ≤ −0.947 |
| −0.950 ≤ w[624] ≤ −0.948 |
| −0.950 ≤ w[625] ≤ −0.948 |
| −0.950 ≤ w[626] ≤ −0.948 |
| −0.951 ≤ w[627] ≤ −0.949 |
| −0.951 ≤ w[628] ≤ −0.949 |
| −0.952 ≤ w[629] ≤ −0.950 |
| −0.952 ≤ w[630] ≤ −0.950 |
| −0.953 ≤ w[631] ≤ −0.951 |
| −0.953 ≤ w[632] ≤ −0.951 |
| −0.954 ≤ w[633] ≤ −0.952 |
| −0.954 ≤ w[634] ≤ −0.952 |
| −0.954 ≤ w[635] ≤ −0.952 |
| −0.955 ≤ w[636] ≤ −0.953 |
| −0.955 ≤ w[637] ≤ −0.953 |
| −0.956 ≤ w[638] ≤ −0.954 |
| −0.956 ≤ w[639] ≤ −0.954 |
| −0.957 ≤ w[640] ≤ −0.955 |
| −0.957 ≤ w[641] ≤ −0.955 |
| −0.958 ≤ w[642] ≤ −0.956 |
| −0.958 ≤ w[643] ≤ −0.956 |
| −0.959 ≤ w[644] ≤ −0.957 |
| −0.959 ≤ w[645] ≤ −0.957 |
| −0.960 ≤ w[646] ≤ −0.958 |
| −0.960 ≤ w[647] ≤ −0.958 |
| −0.961 ≤ w[648] ≤ −0.959 |
| −0.961 ≤ w[649] ≤ −0.959 |
| −0.962 ≤ w[650] ≤ −0.960 |
| −0.962 ≤ w[651] ≤ −0.960 |
| −0.963 ≤ w[652] ≤ −0.961 |
| −0.963 ≤ w[653] ≤ −0.961 |
| −0.964 ≤ w[654] ≤ −0.962 |
| −0.964 ≤ w[655] ≤ −0.962 |
| −0.965 ≤ w[656] ≤ −0.963 |
| −0.965 ≤ w[657] ≤ −0.963 |
| −0.966 ≤ w[658] ≤ −0.964 |
| −0.966 ≤ w[659] ≤ −0.964 |
| −0.967 ≤ w[660] ≤ −0.965 |
| −0.967 ≤ w[661] ≤ −0.965 |
| −0.968 ≤ w[662] ≤ −0.966 |
| −0.968 ≤ w[663] ≤ −0.966 |
| −0.969 ≤ w[664] ≤ −0.967 |
| −0.969 ≤ w[665] ≤ −0.967 |
| −0.970 ≤ w[666] ≤ −0.968 |
| −0.971 ≤ w[667] ≤ −0.969 |
| −0.971 ≤ w[668] ≤ −0.969 |
| −0.972 ≤ w[669] ≤ −0.970 |
| −0.972 ≤ w[670] ≤ −0.970 |
| −0.973 ≤ w[671] ≤ −0.971 |
| −0.973 ≤ w[672] ≤ −0.971 |
| −0.974 ≤ w[673] ≤ −0.972 |
| −0.974 ≤ w[674] ≤ −0.972 |
| −0.975 ≤ w[675] ≤ −0.973 |
| −0.975 ≤ w[676] ≤ −0.973 |
| −0.976 ≤ w[677] ≤ −0.974 |
| −0.977 ≤ w[678] ≤ −0.975 |
| −0.977 ≤ w[679] ≤ −0.975 |
| −0.978 ≤ w[680] ≤ −0.976 |
| −0.978 ≤ w[681] ≤ −0.976 |
| −0.979 ≤ w[682] ≤ −0.977 |
| −0.979 ≤ w[683] ≤ −0.977 |
| −0.980 ≤ w[684] ≤ −0.978 |
| −0.981 ≤ w[685] ≤ −0.979 |
| −0.981 ≤ w[686] ≤ −0.979 |
| −0.982 ≤ w[687] ≤ −0.980 |
| −0.982 ≤ w[688] ≤ −0.980 |
| −0.983 ≤ w[689] ≤ −0.981 |

TABLE 9-continued

| (window coefficients w(n); M = 480) |
|---|
| −0.983 ≤ w[690] ≤ −0.981 |
| −0.984 ≤ w[691] ≤ −0.982 |
| −0.985 ≤ w[692] ≤ −0.983 |
| −0.985 ≤ w[693] ≤ −0.983 |
| −0.986 ≤ w[694] ≤ −0.984 |
| −0.986 ≤ w[695] ≤ −0.984 |
| −0.987 ≤ w[696] ≤ −0.985 |
| −0.987 ≤ w[697] ≤ −0.985 |
| −0.988 ≤ w[698] ≤ −0.986 |
| −0.989 ≤ w[699] ≤ −0.987 |
| −0.989 ≤ w[700] ≤ −0.987 |
| −0.990 ≤ w[701] ≤ −0.988 |
| −0.990 ≤ w[702] ≤ −0.988 |
| −0.991 ≤ w[703] ≤ −0.989 |
| −0.992 ≤ w[704] ≤ −0.990 |
| −0.992 ≤ w[705] ≤ −0.990 |
| −0.993 ≤ w[706] ≤ −0.991 |
| −0.993 ≤ w[707] ≤ −0.991 |
| −0.994 ≤ w[708] ≤ −0.992 |
| −0.994 ≤ w[709] ≤ −0.992 |
| −0.995 ≤ w[710] ≤ −0.993 |
| −0.996 ≤ w[711] ≤ −0.994 |
| −0.996 ≤ w[712] ≤ −0.994 |
| −0.997 ≤ w[713] ≤ −0.995 |
| −0.997 ≤ w[714] ≤ −0.995 |
| −0.998 ≤ w[715] ≤ −0.996 |
| −0.999 ≤ w[716] ≤ −0.997 |
| −0.999 ≤ w[717] ≤ −0.997 |
| −1.000 ≤ w[718] ≤ −0.998 |
| −1.000 ≤ w[719] ≤ −0.998 |
| 0.080 ≤ w[720] ≤ 0.082 |
| 0.081 ≤ w[721] ≤ 0.083 |
| 0.083 ≤ w[722] ≤ 0.085 |
| 0.084 ≤ w[723] ≤ 0.086 |
| 0.086 ≤ w[724] ≤ 0.088 |
| 0.087 ≤ w[725] ≤ 0.089 |
| 0.089 ≤ w[726] ≤ 0.091 |
| 0.091 ≤ w[727] ≤ 0.093 |
| 0.092 ≤ w[728] ≤ 0.094 |
| 0.094 ≤ w[729] ≤ 0.096 |
| 0.095 ≤ w[730] ≤ 0.097 |
| 0.097 ≤ w[731] ≤ 0.099 |
| 0.099 ≤ w[732] ≤ 0.101 |
| 0.100 ≤ w[733] ≤ 0.102 |
| 0.102 ≤ w[734] ≤ 0.104 |
| 0.104 ≤ w[735] ≤ 0.106 |
| 0.105 ≤ w[736] ≤ 0.107 |
| 0.107 ≤ w[737] ≤ 0.109 |
| 0.109 ≤ w[738] ≤ 0.111 |
| 0.110 ≤ w[739] ≤ 0.112 |
| 0.112 ≤ w[740] ≤ 0.114 |
| 0.114 ≤ w[741] ≤ 0.116 |
| 0.116 ≤ w[742] ≤ 0.118 |
| 0.118 ≤ w[743] ≤ 0.120 |
| 0.119 ≤ w[744] ≤ 0.121 |
| 0.121 ≤ w[745] ≤ 0.123 |
| 0.123 ≤ w[746] ≤ 0.125 |
| 0.125 ≤ w[747] ≤ 0.127 |
| 0.127 ≤ w[748] ≤ 0.129 |
| 0.129 ≤ w[749] ≤ 0.131 |
| 0.131 ≤ w[750] ≤ 0.133 |
| 0.133 ≤ w[751] ≤ 0.135 |
| 0.135 ≤ w[752] ≤ 0.137 |
| 0.136 ≤ w[753] ≤ 0.138 |
| 0.138 ≤ w[754] ≤ 0.140 |
| 0.140 ≤ w[755] ≤ 0.142 |
| 0.142 ≤ w[756] ≤ 0.144 |
| 0.144 ≤ w[757] ≤ 0.146 |
| 0.146 ≤ w[758] ≤ 0.148 |
| 0.148 ≤ w[759] ≤ 0.150 |
| 0.150 ≤ w[760] ≤ 0.152 |
| 0.152 ≤ w[761] ≤ 0.154 |
| 0.154 ≤ w[762] ≤ 0.156 |
| 0.156 ≤ w[763] ≤ 0.158 |
| 0.158 ≤ w[764] ≤ 0.160 |
| 0.160 ≤ w[765] ≤ 0.162 |
| 0.162 ≤ w[766] ≤ 0.164 |
| 0.164 ≤ w[767] ≤ 0.166 |

TABLE 9-continued

| (window coefficients w(n); M = 480) |
|---|
| 0.165 ≤ w[768] ≤ 0.167 |
| 0.167 ≤ w[769] ≤ 0.169 |
| 0.169 ≤ w[770] ≤ 0.171 |
| 0.170 ≤ w[771] ≤ 0.172 |
| 0.172 ≤ w[772] ≤ 0.174 |
| 0.174 ≤ w[773] ≤ 0.176 |
| 0.175 ≤ w[774] ≤ 0.177 |
| 0.177 ≤ w[775] ≤ 0.179 |
| 0.178 ≤ w[776] ≤ 0.180 |
| 0.179 ≤ w[777] ≤ 0.181 |
| 0.181 ≤ w[778] ≤ 0.183 |
| 0.182 ≤ w[779] ≤ 0.184 |
| 0.183 ≤ w[780] ≤ 0.185 |
| 0.184 ≤ w[781] ≤ 0.186 |
| 0.185 ≤ w[782] ≤ 0.187 |
| 0.187 ≤ w[783] ≤ 0.189 |
| 0.188 ≤ w[784] ≤ 0.190 |
| 0.189 ≤ w[785] ≤ 0.191 |
| 0.191 ≤ w[786] ≤ 0.193 |
| 0.193 ≤ w[787] ≤ 0.195 |
| 0.194 ≤ w[788] ≤ 0.196 |
| 0.196 ≤ w[789] ≤ 0.198 |
| 0.198 ≤ w[790] ≤ 0.200 |
| 0.200 ≤ w[791] ≤ 0.202 |
| 0.201 ≤ w[792] ≤ 0.203 |
| 0.203 ≤ w[793] ≤ 0.205 |
| 0.205 ≤ w[794] ≤ 0.207 |
| 0.207 ≤ w[795] ≤ 0.209 |
| 0.210 ≤ w[796] ≤ 0.212 |
| 0.212 ≤ w[797] ≤ 0.214 |
| 0.214 ≤ w[798] ≤ 0.216 |
| 0.216 ≤ w[799] ≤ 0.218 |
| 0.219 ≤ w[800] ≤ 0.221 |
| 0.221 ≤ w[801] ≤ 0.223 |
| 0.224 ≤ w[802] ≤ 0.226 |
| 0.226 ≤ w[803] ≤ 0.228 |
| 0.229 ≤ w[804] ≤ 0.231 |
| 0.231 ≤ w[805] ≤ 0.233 |
| 0.234 ≤ w[806] ≤ 0.236 |
| 0.237 ≤ w[807] ≤ 0.239 |
| 0.240 ≤ w[808] ≤ 0.242 |
| 0.243 ≤ w[809] ≤ 0.245 |
| 0.246 ≤ w[810] ≤ 0.248 |
| 0.249 ≤ w[811] ≤ 0.251 |
| 0.252 ≤ w[812] ≤ 0.254 |
| 0.255 ≤ w[813] ≤ 0.257 |
| 0.258 ≤ w[814] ≤ 0.260 |
| 0.261 ≤ w[815] ≤ 0.263 |
| 0.264 ≤ w[816] ≤ 0.266 |
| 0.268 ≤ w[817] ≤ 0.270 |
| 0.271 ≤ w[818] ≤ 0.273 |
| 0.274 ≤ w[819] ≤ 0.276 |
| 0.278 ≤ w[820] ≤ 0.280 |
| 0.281 ≤ w[821] ≤ 0.283 |
| 0.285 ≤ w[822] ≤ 0.287 |
| 0.288 ≤ w[823] ≤ 0.290 |
| 0.292 ≤ w[824] ≤ 0.294 |
| 0.295 ≤ w[825] ≤ 0.297 |
| 0.299 ≤ w[826] ≤ 0.301 |
| 0.303 ≤ w[827] ≤ 0.305 |
| 0.306 ≤ w[828] ≤ 0.308 |
| 0.310 ≤ w[829] ≤ 0.312 |
| 0.314 ≤ w[830] ≤ 0.316 |
| 0.318 ≤ w[831] ≤ 0.320 |
| 0.321 ≤ w[832] ≤ 0.323 |
| 0.325 ≤ w[833] ≤ 0.327 |
| 0.329 ≤ w[834] ≤ 0.331 |
| 0.333 ≤ w[835] ≤ 0.335 |
| 0.337 ≤ w[836] ≤ 0.339 |
| 0.341 ≤ w[837] ≤ 0.343 |
| 0.345 ≤ w[838] ≤ 0.347 |
| 0.349 ≤ w[839] ≤ 0.351 |
| 0.354 ≤ w[840] ≤ 0.356 |
| 0.358 ≤ w[841] ≤ 0.360 |
| 0.362 ≤ w[842] ≤ 0.364 |
| 0.367 ≤ w[843] ≤ 0.369 |
| 0.371 ≤ w[844] ≤ 0.373 |
| 0.376 ≤ w[845] ≤ 0.378 |

TABLE 9-continued

| (window coefficients w(n); M = 480) |
|---|
| 0.380 ≤ w[846] ≤ 0.382 |
| 0.384 ≤ w[847] ≤ 0.386 |
| 0.389 ≤ w[848] ≤ 0.391 |
| 0.393 ≤ w[849] ≤ 0.395 |
| 0.397 ≤ w[850] ≤ 0.399 |
| 0.402 ≤ w[851] ≤ 0.404 |
| 0.406 ≤ w[852] ≤ 0.408 |
| 0.410 ≤ w[853] ≤ 0.412 |
| 0.415 ≤ w[854] ≤ 0.417 |
| 0.419 ≤ w[855] ≤ 0.421 |
| 0.424 ≤ w[856] ≤ 0.426 |
| 0.429 ≤ w[857] ≤ 0.431 |
| 0.434 ≤ w[858] ≤ 0.436 |
| 0.439 ≤ w[859] ≤ 0.441 |
| 0.444 ≤ w[860] ≤ 0.446 |
| 0.449 ≤ w[861] ≤ 0.451 |
| 0.454 ≤ w[862] ≤ 0.456 |
| 0.459 ≤ w[863] ≤ 0.461 |
| 0.464 ≤ w[864] ≤ 0.466 |
| 0.469 ≤ w[865] ≤ 0.471 |
| 0.473 ≤ w[866] ≤ 0.475 |
| 0.478 ≤ w[867] ≤ 0.480 |
| 0.482 ≤ w[868] ≤ 0.484 |
| 0.487 ≤ w[869] ≤ 0.489 |
| 0.491 ≤ w[870] ≤ 0.493 |
| 0.496 ≤ w[871] ≤ 0.498 |
| 0.500 ≤ w[872] ≤ 0.502 |
| 0.505 ≤ w[873] ≤ 0.507 |
| 0.510 ≤ w[874] ≤ 0.512 |
| 0.514 ≤ w[875] ≤ 0.516 |
| 0.519 ≤ w[876] ≤ 0.521 |
| 0.524 ≤ w[877] ≤ 0.526 |
| 0.529 ≤ w[878] ≤ 0.531 |
| 0.534 ≤ w[879] ≤ 0.536 |
| 0.539 ≤ w[880] ≤ 0.541 |
| 0.544 ≤ w[881] ≤ 0.546 |
| 0.549 ≤ w[882] ≤ 0.551 |
| 0.554 ≤ w[883] ≤ 0.556 |
| 0.559 ≤ w[884] ≤ 0.561 |
| 0.564 ≤ w[885] ≤ 0.566 |
| 0.569 ≤ w[886] ≤ 0.571 |
| 0.574 ≤ w[887] ≤ 0.576 |
| 0.579 ≤ w[888] ≤ 0.581 |
| 0.583 ≤ w[889] ≤ 0.585 |
| 0.588 ≤ w[890] ≤ 0.590 |
| 0.593 ≤ w[891] ≤ 0.595 |
| 0.597 ≤ w[892] ≤ 0.599 |
| 0.602 ≤ w[893] ≤ 0.604 |
| 0.606 ≤ w[894] ≤ 0.608 |
| 0.611 ≤ w[895] ≤ 0.613 |
| 0.615 ≤ w[896] ≤ 0.617 |
| 0.620 ≤ w[897] ≤ 0.622 |
| 0.625 ≤ w[898] ≤ 0.627 |
| 0.629 ≤ w[899] ≤ 0.631 |
| 0.634 ≤ w[900] ≤ 0.636 |
| 0.638 ≤ w[901] ≤ 0.640 |
| 0.643 ≤ w[902] ≤ 0.645 |
| 0.647 ≤ w[903] ≤ 0.649 |
| 0.652 ≤ w[904] ≤ 0.654 |
| 0.656 ≤ w[905] ≤ 0.658 |
| 0.661 ≤ w[906] ≤ 0.663 |
| 0.666 ≤ w[907] ≤ 0.668 |
| 0.670 ≤ w[908] ≤ 0.672 |
| 0.675 ≤ w[909] ≤ 0.677 |
| 0.679 ≤ w[910] ≤ 0.681 |
| 0.684 ≤ w[911] ≤ 0.686 |
| 0.688 ≤ w[912] ≤ 0.690 |
| 0.692 ≤ w[913] ≤ 0.694 |
| 0.696 ≤ w[914] ≤ 0.698 |
| 0.701 ≤ w[915] ≤ 0.703 |
| 0.705 ≤ w[916] ≤ 0.707 |
| 0.709 ≤ w[917] ≤ 0.711 |
| 0.713 ≤ w[918] ≤ 0.715 |
| 0.717 ≤ w[919] ≤ 0.719 |
| 0.721 ≤ w[920] ≤ 0.723 |
| 0.725 ≤ w[921] ≤ 0.727 |
| 0.729 ≤ w[922] ≤ 0.731 |
| 0.733 ≤ w[923] ≤ 0.735 |

TABLE 9-continued

| (window coefficients w(n); M = 480) |
|---|
| 0.737 ≤ w[924] ≤ 0.739 |
| 0.741 ≤ w[925] ≤ 0.743 |
| 0.745 ≤ w[926] ≤ 0.747 |
| 0.749 ≤ w[927] ≤ 0.751 |
| 0.753 ≤ w[928] ≤ 0.755 |
| 0.757 ≤ w[929] ≤ 0.759 |
| 0.760 ≤ w[930] ≤ 0.762 |
| 0.764 ≤ w[931] ≤ 0.766 |
| 0.768 ≤ w[932] ≤ 0.770 |
| 0.771 ≤ w[933] ≤ 0.773 |
| 0.775 ≤ w[934] ≤ 0.777 |
| 0.778 ≤ w[935] ≤ 0.780 |
| 0.782 ≤ w[936] ≤ 0.784 |
| 0.785 ≤ w[937] ≤ 0.787 |
| 0.789 ≤ w[938] ≤ 0.791 |
| 0.792 ≤ w[939] ≤ 0.794 |
| 0.796 ≤ w[940] ≤ 0.798 |
| 0.799 ≤ w[941] ≤ 0.801 |
| 0.802 ≤ w[942] ≤ 0.804 |
| 0.806 ≤ w[943] ≤ 0.808 |
| 0.809 ≤ w[944] ≤ 0.811 |
| 0.812 ≤ w[945] ≤ 0.814 |
| 0.815 ≤ w[946] ≤ 0.817 |
| 0.819 ≤ w[947] ≤ 0.821 |
| 0.822 ≤ w[948] ≤ 0.824 |
| 0.825 ≤ w[949] ≤ 0.827 |
| 0.828 ≤ w[950] ≤ 0.830 |
| 0.831 ≤ w[951] ≤ 0.833 |
| 0.834 ≤ w[952] ≤ 0.836 |
| 0.837 ≤ w[953] ≤ 0.839 |
| 0.840 ≤ w[954] ≤ 0.842 |
| 0.842 ≤ w[955] ≤ 0.844 |
| 0.845 ≤ w[956] ≤ 0.847 |
| 0.848 ≤ w[957] ≤ 0.850 |
| 0.851 ≤ w[958] ≤ 0.853 |
| 0.854 ≤ w[959] ≤ 0.856 |

TABLE 10

| (lifting coefficients l(n); M = 480) |
|---|
| −0.161 ≤ l[0] ≤ −0.159 |
| −0.159 ≤ l[1] ≤ −0.157 |
| −0.156 ≤ l[2] ≤ −0.154 |
| −0.154 ≤ l[3] ≤ −0.152 |
| −0.152 ≤ l[4] ≤ −0.150 |
| −0.150 ≤ l[5] ≤ −0.148 |
| −0.148 ≤ l[6] ≤ −0.146 |
| −0.146 ≤ l[7] ≤ −0.144 |
| −0.143 ≤ l[8] ≤ −0.141 |
| −0.141 ≤ l[9] ≤ −0.139 |
| −0.139 ≤ l[10] ≤ −0.137 |
| −0.137 ≤ l[11] ≤ −0.135 |
| −0.135 ≤ l[12] ≤ −0.133 |
| −0.133 ≤ l[13] ≤ −0.131 |
| −0.131 ≤ l[14] ≤ −0.129 |
| −0.129 ≤ l[15] ≤ −0.127 |
| −0.127 ≤ l[16] ≤ −0.125 |
| −0.125 ≤ l[17] ≤ −0.123 |
| −0.123 ≤ l[18] ≤ −0.121 |
| −0.121 ≤ l[19] ≤ −0.119 |
| −0.119 ≤ l[20] ≤ −0.117 |
| −0.117 ≤ l[21] ≤ −0.115 |
| −0.115 ≤ l[22] ≤ −0.113 |
| −0.114 ≤ l[23] ≤ −0.112 |
| −0.112 ≤ l[24] ≤ −0.110 |
| −0.110 ≤ l[25] ≤ −0.108 |
| −0.108 ≤ l[26] ≤ −0.106 |
| −0.106 ≤ l[27] ≤ −0.104 |
| −0.104 ≤ l[28] ≤ −0.102 |
| −0.103 ≤ l[29] ≤ −0.101 |
| −0.101 ≤ l[30] ≤ −0.099 |
| −0.099 ≤ l[31] ≤ −0.097 |
| −0.097 ≤ l[32] ≤ −0.095 |
| −0.095 ≤ l[33] ≤ −0.093 |

TABLE 10-continued

| (lifting coefficients l(n); M = 480) |
|---|
| −0.094 ≤ l[34] ≤ −0.092 |
| −0.092 ≤ l[35] ≤ −0.090 |
| −0.090 ≤ l[36] ≤ −0.088 |
| −0.089 ≤ l[37] ≤ −0.087 |
| −0.087 ≤ l[38] ≤ −0.085 |
| −0.085 ≤ l[39] ≤ −0.083 |
| −0.084 ≤ l[40] ≤ −0.082 |
| −0.082 ≤ l[41] ≤ −0.080 |
| −0.081 ≤ l[42] ≤ −0.079 |
| −0.079 ≤ l[43] ≤ −0.077 |
| −0.077 ≤ l[44] ≤ −0.075 |
| −0.076 ≤ l[45] ≤ −0.074 |
| −0.074 ≤ l[46] ≤ −0.072 |
| −0.073 ≤ l[47] ≤ −0.071 |
| −0.071 ≤ l[48] ≤ −0.069 |
| −0.070 ≤ l[49] ≤ −0.068 |
| −0.068 ≤ l[50] ≤ −0.066 |
| −0.067 ≤ l[51] ≤ −0.065 |
| −0.066 ≤ l[52] ≤ −0.064 |
| −0.064 ≤ l[53] ≤ −0.062 |
| −0.063 ≤ l[54] ≤ −0.061 |
| −0.061 ≤ l[55] ≤ −0.059 |
| −0.060 ≤ l[56] ≤ −0.058 |
| −0.059 ≤ l[57] ≤ −0.057 |
| −0.057 ≤ l[58] ≤ −0.055 |
| −0.056 ≤ l[59] ≤ −0.054 |
| −0.055 ≤ l[60] ≤ −0.053 |
| −0.053 ≤ l[61] ≤ −0.051 |
| −0.052 ≤ l[62] ≤ −0.050 |
| −0.051 ≤ l[63] ≤ −0.049 |
| −0.050 ≤ l[64] ≤ −0.048 |
| −0.048 ≤ l[65] ≤ −0.046 |
| −0.047 ≤ l[66] ≤ −0.045 |
| −0.046 ≤ l[67] ≤ −0.044 |
| −0.045 ≤ l[68] ≤ −0.043 |
| −0.044 ≤ l[69] ≤ −0.042 |
| −0.043 ≤ l[70] ≤ −0.041 |
| −0.041 ≤ l[71] ≤ −0.039 |
| −0.040 ≤ l[72] ≤ −0.038 |
| −0.039 ≤ l[73] ≤ −0.037 |
| −0.038 ≤ l[74] ≤ −0.036 |
| −0.037 ≤ l[75] ≤ −0.035 |
| −0.036 ≤ l[76] ≤ −0.034 |
| −0.035 ≤ l[77] ≤ −0.033 |
| −0.034 ≤ l[78] ≤ −0.032 |
| −0.033 ≤ l[79] ≤ −0.031 |
| −0.032 ≤ l[80] ≤ −0.030 |
| −0.031 ≤ l[81] ≤ −0.029 |
| −0.030 ≤ l[82] ≤ −0.028 |
| −0.029 ≤ l[83] ≤ −0.027 |
| −0.028 ≤ l[84] ≤ −0.026 |
| −0.027 ≤ l[85] ≤ −0.025 |
| −0.026 ≤ l[86] ≤ −0.024 |
| −0.025 ≤ l[87] ≤ −0.023 |
| −0.024 ≤ l[88] ≤ −0.022 |
| −0.023 ≤ l[89] ≤ −0.021 |
| −0.023 ≤ l[90] ≤ −0.021 |
| −0.022 ≤ l[91] ≤ −0.020 |
| −0.021 ≤ l[92] ≤ −0.019 |
| −0.020 ≤ l[93] ≤ −0.018 |
| −0.019 ≤ l[94] ≤ −0.017 |
| −0.018 ≤ l[95] ≤ −0.016 |
| −0.018 ≤ l[96] ≤ −0.016 |
| −0.017 ≤ l[97] ≤ −0.015 |
| −0.016 ≤ l[98] ≤ −0.014 |
| −0.015 ≤ l[99] ≤ −0.013 |
| −0.015 ≤ l[100] ≤ −0.013 |
| −0.014 ≤ l[101] ≤ −0.012 |
| −0.013 ≤ l[102] ≤ −0.011 |
| −0.013 ≤ l[103] ≤ −0.011 |
| −0.012 ≤ l[104] ≤ −0.010 |
| −0.011 ≤ l[105] ≤ −0.009 |
| −0.011 ≤ l[106] ≤ −0.009 |
| −0.010 ≤ l[107] ≤ −0.008 |
| −0.009 ≤ l[108] ≤ −0.007 |
| −0.009 ≤ l[109] ≤ −0.007 |
| −0.008 ≤ l[110] ≤ −0.006 |
| −0.008 ≤ l[111] ≤ −0.006 |

TABLE 10-continued

| (lifting coefficients l(n); M = 480) |
|---|
| −0.007 ≤ l[112] ≤ −0.005 |
| −0.007 ≤ l[113] ≤ −0.005 |
| −0.006 ≤ l[114] ≤ −0.004 |
| −0.006 ≤ l[115] ≤ −0.004 |
| −0.005 ≤ l[116] ≤ −0.003 |
| −0.004 ≤ l[117] ≤ −0.002 |
| −0.004 ≤ l[118] ≤ −0.002 |
| −0.004 ≤ l[119] ≤ −0.002 |
| −0.003 ≤ l[120] ≤ −0.001 |
| −0.003 ≤ l[121] ≤ −0.001 |
| −0.002 ≤ l[122] ≤ 0.000 |
| −0.002 ≤ l[123] ≤ 0.000 |
| −0.001 ≤ l[124] ≤ 0.001 |
| −0.001 ≤ l[125] ≤ 0.001 |
| 0.000 ≤ l[126] ≤ 0.002 |
| 0.000 ≤ l[127] ≤ 0.002 |
| 0.000 ≤ l[128] ≤ 0.002 |
| 0.001 ≤ l[129] ≤ 0.003 |
| 0.001 ≤ l[130] ≤ 0.003 |
| 0.001 ≤ l[131] ≤ 0.003 |
| 0.002 ≤ l[132] ≤ 0.004 |
| 0.002 ≤ l[133] ≤ 0.004 |
| 0.002 ≤ l[134] ≤ 0.004 |
| 0.003 ≤ l[135] ≤ 0.005 |
| 0.003 ≤ l[136] ≤ 0.005 |
| 0.003 ≤ l[137] ≤ 0.005 |
| 0.003 ≤ l[138] ≤ 0.005 |
| 0.004 ≤ l[139] ≤ 0.006 |
| 0.004 ≤ l[140] ≤ 0.006 |
| 0.004 ≤ l[141] ≤ 0.006 |
| 0.004 ≤ l[142] ≤ 0.006 |
| 0.005 ≤ l[143] ≤ 0.007 |
| 0.005 ≤ l[144] ≤ 0.007 |
| 0.005 ≤ l[145] ≤ 0.007 |
| 0.005 ≤ l[146] ≤ 0.007 |
| 0.006 ≤ l[147] ≤ 0.008 |
| 0.006 ≤ l[148] ≤ 0.008 |
| 0.006 ≤ l[149] ≤ 0.008 |
| 0.006 ≤ l[150] ≤ 0.008 |
| 0.006 ≤ l[151] ≤ 0.008 |
| 0.006 ≤ l[152] ≤ 0.008 |
| 0.007 ≤ l[153] ≤ 0.009 |
| 0.007 ≤ l[154] ≤ 0.009 |
| 0.007 ≤ l[155] ≤ 0.009 |
| 0.007 ≤ l[156] ≤ 0.009 |
| 0.007 ≤ l[157] ≤ 0.009 |
| 0.007 ≤ l[158] ≤ 0.009 |
| 0.007 ≤ l[159] ≤ 0.009 |
| 0.007 ≤ l[160] ≤ 0.009 |
| 0.007 ≤ l[161] ≤ 0.009 |
| 0.007 ≤ l[162] ≤ 0.009 |
| 0.007 ≤ l[163] ≤ 0.009 |
| 0.007 ≤ l[164] ≤ 0.009 |
| 0.007 ≤ l[165] ≤ 0.009 |
| 0.008 ≤ l[166] ≤ 0.010 |
| 0.008 ≤ l[167] ≤ 0.010 |
| 0.008 ≤ l[168] ≤ 0.010 |
| 0.008 ≤ l[169] ≤ 0.010 |
| 0.008 ≤ l[170] ≤ 0.010 |
| 0.008 ≤ l[171] ≤ 0.010 |
| 0.008 ≤ l[172] ≤ 0.010 |
| 0.008 ≤ l[173] ≤ 0.010 |
| 0.008 ≤ l[174] ≤ 0.010 |
| 0.008 ≤ l[175] ≤ 0.010 |
| 0.008 ≤ l[176] ≤ 0.010 |
| 0.008 ≤ l[177] ≤ 0.010 |
| 0.008 ≤ l[178] ≤ 0.010 |
| 0.008 ≤ l[179] ≤ 0.010 |
| 0.008 ≤ l[180] ≤ 0.010 |
| 0.008 ≤ l[181] ≤ 0.010 |
| 0.008 ≤ l[182] ≤ 0.010 |
| 0.007 ≤ l[183] ≤ 0.009 |
| 0.007 ≤ l[184] ≤ 0.009 |
| 0.007 ≤ l[185] ≤ 0.009 |
| 0.007 ≤ l[186] ≤ 0.009 |
| 0.007 ≤ l[187] ≤ 0.009 |
| 0.007 ≤ l[188] ≤ 0.009 |
| 0.007 ≤ l[189] ≤ 0.009 |

TABLE 10-continued

| (lifting coefficients l(n); M = 480) |
|---|
| 0.007 ≤ l[190] ≤ 0.009 |
| 0.007 ≤ l[191] ≤ 0.009 |
| 0.007 ≤ l[192] ≤ 0.009 |
| 0.007 ≤ l[193] ≤ 0.009 |
| 0.007 ≤ l[194] ≤ 0.009 |
| 0.006 ≤ l[195] ≤ 0.008 |
| 0.006 ≤ l[196] ≤ 0.008 |
| 0.006 ≤ l[197] ≤ 0.008 |
| 0.006 ≤ l[198] ≤ 0.008 |
| 0.006 ≤ l[199] ≤ 0.008 |
| 0.006 ≤ l[200] ≤ 0.008 |
| 0.006 ≤ l[201] ≤ 0.008 |
| 0.006 ≤ l[202] ≤ 0.008 |
| 0.005 ≤ l[203] ≤ 0.007 |
| 0.005 ≤ l[204] ≤ 0.007 |
| 0.005 ≤ l[205] ≤ 0.007 |
| 0.005 ≤ l[206] ≤ 0.007 |
| 0.005 ≤ l[207] ≤ 0.007 |
| 0.005 ≤ l[208] ≤ 0.007 |
| 0.005 ≤ l[209] ≤ 0.007 |
| 0.004 ≤ l[210] ≤ 0.006 |
| 0.004 ≤ l[211] ≤ 0.006 |
| 0.004 ≤ l[212] ≤ 0.006 |
| 0.004 ≤ l[213] ≤ 0.006 |
| 0.004 ≤ l[214] ≤ 0.006 |
| 0.004 ≤ l[215] ≤ 0.006 |
| 0.003 ≤ l[216] ≤ 0.005 |
| 0.003 ≤ l[217] ≤ 0.005 |
| 0.003 ≤ l[218] ≤ 0.005 |
| 0.003 ≤ l[219] ≤ 0.005 |
| 0.003 ≤ l[220] ≤ 0.005 |
| 0.003 ≤ l[221] ≤ 0.005 |
| 0.002 ≤ l[222] ≤ 0.004 |
| 0.002 ≤ l[223] ≤ 0.004 |
| 0.002 ≤ l[224] ≤ 0.004 |
| 0.002 ≤ l[225] ≤ 0.004 |
| 0.002 ≤ l[226] ≤ 0.004 |
| 0.001 ≤ l[227] ≤ 0.003 |
| 0.001 ≤ l[228] ≤ 0.003 |
| 0.001 ≤ l[229] ≤ 0.003 |
| 0.001 ≤ l[230] ≤ 0.003 |
| 0.001 ≤ l[231] ≤ 0.003 |
| 0.000 ≤ l[232] ≤ 0.002 |
| 0.000 ≤ l[233] ≤ 0.002 |
| 0.000 ≤ l[234] ≤ 0.002 |
| 0.000 ≤ l[235] ≤ 0.002 |
| 0.000 ≤ l[236] ≤ 0.002 |
| −0.001 ≤ l[237] ≤ 0.001 |
| −0.001 ≤ l[238] ≤ 0.001 |
| −0.001 ≤ l[239] ≤ 0.001 |
| −0.083 ≤ l[240] ≤ −0.081 |
| −0.084 ≤ l[241] ≤ −0.082 |
| −0.085 ≤ l[242] ≤ −0.083 |
| −0.085 ≤ l[243] ≤ −0.083 |
| −0.086 ≤ l[244] ≤ −0.084 |
| −0.087 ≤ l[245] ≤ −0.085 |
| −0.088 ≤ l[246] ≤ −0.086 |
| −0.089 ≤ l[247] ≤ −0.087 |
| −0.089 ≤ l[248] ≤ −0.087 |
| −0.090 ≤ l[249] ≤ −0.088 |
| −0.091 ≤ l[250] ≤ −0.089 |
| −0.092 ≤ l[251] ≤ −0.090 |
| −0.093 ≤ l[252] ≤ −0.091 |
| −0.093 ≤ l[253] ≤ −0.091 |
| −0.094 ≤ l[254] ≤ −0.092 |
| −0.095 ≤ l[255] ≤ −0.093 |
| −0.096 ≤ l[256] ≤ −0.094 |
| −0.097 ≤ l[257] ≤ −0.095 |
| −0.097 ≤ l[258] ≤ −0.095 |
| −0.098 ≤ l[259] ≤ −0.096 |
| −0.099 ≤ l[260] ≤ −0.097 |
| −0.100 ≤ l[261] ≤ −0.098 |
| −0.100 ≤ l[262] ≤ −0.098 |
| −0.101 ≤ l[263] ≤ −0.099 |
| −0.102 ≤ l[264] ≤ −0.100 |
| −0.102 ≤ l[265] ≤ −0.100 |
| −0.103 ≤ l[266] ≤ −0.101 |
| −0.104 ≤ l[267] ≤ −0.102 |

TABLE 10-continued

| (lifting coefficients l(n); M = 480) |
|---|
| −0.105 ≤ l[268] ≤ −0.103 |
| −0.105 ≤ l[269] ≤ −0.103 |
| −0.106 ≤ l[270] ≤ −0.104 |
| −0.107 ≤ l[271] ≤ −0.105 |
| −0.107 ≤ l[272] ≤ −0.105 |
| −0.108 ≤ l[273] ≤ −0.106 |
| −0.109 ≤ l[274] ≤ −0.107 |
| −0.109 ≤ l[275] ≤ −0.107 |
| −0.110 ≤ l[276] ≤ −0.108 |
| −0.111 ≤ l[277] ≤ −0.109 |
| −0.112 ≤ l[278] ≤ −0.110 |
| −0.112 ≤ l[279] ≤ −0.110 |
| −0.113 ≤ l[280] ≤ −0.111 |
| −0.114 ≤ l[281] ≤ −0.112 |
| −0.115 ≤ l[282] ≤ −0.113 |
| −0.116 ≤ l[283] ≤ −0.114 |
| −0.116 ≤ l[284] ≤ −0.114 |
| −0.117 ≤ l[285] ≤ −0.115 |
| −0.118 ≤ l[286] ≤ −0.116 |
| −0.119 ≤ l[287] ≤ −0.117 |
| −0.120 ≤ l[288] ≤ −0.118 |
| −0.121 ≤ l[289] ≤ −0.119 |
| −0.123 ≤ l[290] ≤ −0.121 |
| −0.124 ≤ l[291] ≤ −0.122 |
| −0.125 ≤ l[292] ≤ −0.123 |
| −0.126 ≤ l[293] ≤ −0.124 |
| −0.128 ≤ l[294] ≤ −0.126 |
| −0.129 ≤ l[295] ≤ −0.127 |
| −0.131 ≤ l[296] ≤ −0.129 |
| −0.132 ≤ l[297] ≤ −0.130 |
| −0.134 ≤ l[298] ≤ −0.132 |
| −0.136 ≤ l[299] ≤ −0.134 |
| −0.138 ≤ l[300] ≤ −0.136 |
| −0.139 ≤ l[301] ≤ −0.137 |
| −0.141 ≤ l[302] ≤ −0.139 |
| −0.143 ≤ l[303] ≤ −0.141 |
| −0.144 ≤ l[304] ≤ −0.142 |
| −0.146 ≤ l[305] ≤ −0.144 |
| −0.147 ≤ l[306] ≤ −0.145 |
| −0.148 ≤ l[307] ≤ −0.146 |
| −0.150 ≤ l[308] ≤ −0.148 |
| −0.151 ≤ l[309] ≤ −0.149 |
| −0.152 ≤ l[310] ≤ −0.150 |
| −0.153 ≤ l[311] ≤ −0.151 |
| −0.154 ≤ l[312] ≤ −0.152 |
| −0.155 ≤ l[313] ≤ −0.153 |
| −0.156 ≤ l[314] ≤ −0.154 |
| −0.157 ≤ l[315] ≤ −0.155 |
| −0.157 ≤ l[316] ≤ −0.155 |
| −0.158 ≤ l[317] ≤ −0.156 |
| −0.159 ≤ l[318] ≤ −0.157 |
| −0.160 ≤ l[319] ≤ −0.158 |
| −0.160 ≤ l[320] ≤ −0.158 |
| −0.161 ≤ l[321] ≤ −0.159 |
| −0.161 ≤ l[322] ≤ −0.159 |
| −0.161 ≤ l[323] ≤ −0.159 |
| −0.162 ≤ l[324] ≤ −0.160 |
| −0.162 ≤ l[325] ≤ −0.160 |
| −0.162 ≤ l[326] ≤ −0.160 |
| −0.163 ≤ l[327] ≤ −0.161 |
| −0.163 ≤ l[328] ≤ −0.161 |
| −0.163 ≤ l[329] ≤ −0.161 |
| −0.163 ≤ l[330] ≤ −0.161 |
| −0.163 ≤ l[331] ≤ −0.161 |
| −0.163 ≤ l[332] ≤ −0.161 |
| −0.163 ≤ l[333] ≤ −0.161 |
| −0.163 ≤ l[334] ≤ −0.161 |
| −0.163 ≤ l[335] ≤ −0.161 |
| −0.162 ≤ l[336] ≤ −0.160 |
| −0.162 ≤ l[337] ≤ −0.160 |
| −0.162 ≤ l[338] ≤ −0.160 |
| −0.161 ≤ l[339] ≤ −0.159 |
| −0.161 ≤ l[340] ≤ −0.159 |
| −0.161 ≤ l[341] ≤ −0.159 |
| −0.160 ≤ l[342] ≤ −0.158 |
| −0.160 ≤ l[343] ≤ −0.158 |
| −0.159 ≤ l[344] ≤ −0.157 |
| −0.159 ≤ l[345] ≤ −0.157 |

TABLE 10-continued

| (lifting coefficients l(n); M = 480) |
|---|
| −0.158 ≤ l[346] ≤ −0.156 |
| −0.157 ≤ l[347] ≤ −0.155 |
| −0.157 ≤ l[348] ≤ −0.155 |
| −0.156 ≤ l[349] ≤ −0.154 |
| −0.155 ≤ l[350] ≤ −0.153 |
| −0.154 ≤ l[351] ≤ −0.152 |
| −0.154 ≤ l[352] ≤ −0.152 |
| −0.153 ≤ l[353] ≤ −0.151 |
| −0.152 ≤ l[354] ≤ −0.150 |
| −0.151 ≤ l[355] ≤ −0.149 |
| −0.150 ≤ l[356] ≤ −0.148 |
| −0.149 ≤ l[357] ≤ −0.147 |
| −0.148 ≤ l[358] ≤ −0.146 |
| −0.147 ≤ l[359] ≤ −0.145 |
| −0.146 ≤ l[360] ≤ −0.144 |
| −0.145 ≤ l[361] ≤ −0.143 |
| −0.144 ≤ l[362] ≤ −0.142 |
| −0.142 ≤ l[363] ≤ −0.140 |
| −0.141 ≤ l[364] ≤ −0.139 |
| −0.140 ≤ l[365] ≤ −0.138 |
| −0.139 ≤ l[366] ≤ −0.137 |
| −0.138 ≤ l[367] ≤ −0.136 |
| −0.136 ≤ l[368] ≤ −0.134 |
| −0.135 ≤ l[369] ≤ −0.133 |
| −0.134 ≤ l[370] ≤ −0.132 |
| −0.132 ≤ l[371] ≤ −0.130 |
| −0.131 ≤ l[372] ≤ −0.129 |
| −0.130 ≤ l[373] ≤ −0.128 |
| −0.128 ≤ l[374] ≤ −0.126 |
| −0.127 ≤ l[375] ≤ −0.125 |
| −0.125 ≤ l[376] ≤ −0.123 |
| −0.124 ≤ l[377] ≤ −0.122 |
| −0.122 ≤ l[378] ≤ −0.120 |
| −0.121 ≤ l[379] ≤ −0.119 |
| −0.119 ≤ l[380] ≤ −0.117 |
| −0.118 ≤ l[381] ≤ −0.116 |
| −0.116 ≤ l[382] ≤ −0.114 |
| −0.115 ≤ l[383] ≤ −0.113 |
| −0.113 ≤ l[384] ≤ −0.111 |
| −0.112 ≤ l[385] ≤ −0.110 |
| −0.110 ≤ l[386] ≤ −0.108 |
| −0.109 ≤ l[387] ≤ −0.107 |
| −0.107 ≤ l[388] ≤ −0.105 |
| −0.105 ≤ l[389] ≤ −0.103 |
| −0.104 ≤ l[390] ≤ −0.102 |
| −0.102 ≤ l[391] ≤ −0.100 |
| −0.100 ≤ l[392] ≤ −0.098 |
| −0.099 ≤ l[393] ≤ −0.097 |
| −0.097 ≤ l[394] ≤ −0.095 |
| −0.095 ≤ l[395] ≤ −0.093 |
| −0.094 ≤ l[396] ≤ −0.092 |
| −0.092 ≤ l[397] ≤ −0.090 |
| −0.090 ≤ l[398] ≤ −0.088 |
| −0.089 ≤ l[399] ≤ −0.087 |
| −0.087 ≤ l[400] ≤ −0.085 |
| −0.085 ≤ l[401] ≤ −0.083 |
| −0.084 ≤ l[402] ≤ −0.082 |
| −0.082 ≤ l[403] ≤ −0.080 |
| −0.080 ≤ l[404] ≤ −0.078 |
| −0.079 ≤ l[405] ≤ −0.077 |
| −0.077 ≤ l[406] ≤ −0.075 |
| −0.075 ≤ l[407] ≤ −0.073 |
| −0.074 ≤ l[408] ≤ −0.072 |
| −0.072 ≤ l[409] ≤ −0.070 |
| −0.070 ≤ l[410] ≤ −0.068 |
| −0.069 ≤ l[411] ≤ −0.067 |
| −0.067 ≤ l[412] ≤ −0.065 |
| −0.065 ≤ l[413] ≤ −0.063 |
| −0.064 ≤ l[414] ≤ −0.062 |
| −0.062 ≤ l[415] ≤ −0.060 |
| −0.060 ≤ l[416] ≤ −0.058 |
| −0.059 ≤ l[417] ≤ −0.057 |
| −0.057 ≤ l[418] ≤ −0.055 |
| −0.056 ≤ l[419] ≤ −0.054 |
| −0.054 ≤ l[420] ≤ −0.052 |
| −0.052 ≤ l[421] ≤ −0.050 |
| −0.051 ≤ l[422] ≤ −0.049 |
| −0.049 ≤ l[423] ≤ −0.047 |

TABLE 10-continued

| (lifting coefficients l(n); M = 480) |
|---|
| −0.048 ≤ l[424] ≤ −0.046 |
| −0.046 ≤ l[425] ≤ −0.044 |
| −0.045 ≤ l[426] ≤ −0.043 |
| −0.043 ≤ l[427] ≤ −0.041 |
| −0.042 ≤ l[428] ≤ −0.040 |
| −0.040 ≤ l[429] ≤ −0.038 |
| −0.039 ≤ l[430] ≤ −0.037 |
| −0.037 ≤ l[431] ≤ −0.035 |
| −0.036 ≤ l[432] ≤ −0.034 |
| −0.034 ≤ l[433] ≤ −0.032 |
| −0.033 ≤ l[434] ≤ −0.031 |
| −0.032 ≤ l[435] ≤ −0.030 |
| −0.030 ≤ l[436] ≤ −0.028 |
| −0.029 ≤ l[437] ≤ −0.027 |
| −0.028 ≤ l[438] ≤ −0.026 |
| −0.026 ≤ l[439] ≤ −0.024 |
| −0.025 ≤ l[440] ≤ −0.023 |
| −0.024 ≤ l[441] ≤ −0.022 |
| −0.023 ≤ l[442] ≤ −0.021 |
| −0.022 ≤ l[443] ≤ −0.020 |
| −0.020 ≤ l[444] ≤ −0.018 |
| −0.019 ≤ l[445] ≤ −0.017 |
| −0.018 ≤ l[446] ≤ −0.016 |
| −0.017 ≤ l[447] ≤ −0.015 |
| −0.016 ≤ l[448] ≤ −0.014 |
| −0.015 ≤ l[449] ≤ −0.013 |
| −0.014 ≤ l[450] ≤ −0.012 |
| −0.013 ≤ l[451] ≤ −0.011 |
| −0.012 ≤ l[452] ≤ −0.010 |
| −0.011 ≤ l[453] ≤ −0.009 |
| −0.010 ≤ l[454] ≤ −0.008 |
| −0.010 ≤ l[455] ≤ −0.008 |
| −0.009 ≤ l[456] ≤ −0.007 |
| −0.008 ≤ l[457] ≤ −0.006 |
| −0.007 ≤ l[458] ≤ −0.005 |
| −0.007 ≤ l[459] ≤ −0.005 |
| −0.006 ≤ l[460] ≤ −0.004 |
| −0.005 ≤ l[461] ≤ −0.003 |
| −0.005 ≤ l[462] ≤ −0.003 |
| −0.004 ≤ l[463] ≤ −0.002 |
| −0.004 ≤ l[464] ≤ −0.002 |
| −0.003 ≤ l[465] ≤ −0.001 |
| −0.003 ≤ l[466] ≤ −0.001 |
| −0.002 ≤ l[467] ≤ 0.000 |
| −0.002 ≤ l[468] ≤ 0.000 |
| −0.002 ≤ l[469] ≤ 0.000 |
| −0.002 ≤ l[470] ≤ 0.000 |
| −0.001 ≤ l[471] ≤ 0.001 |
| −0.001 ≤ l[472] ≤ 0.001 |
| −0.001 ≤ l[473] ≤ 0.001 |
| −0.001 ≤ l[474] ≤ 0.001 |
| −0.001 ≤ l[475] ≤ 0.001 |
| −0.001 ≤ l[476] ≤ 0.001 |
| −0.001 ≤ l[477] ≤ 0.001 |
| −0.001 ≤ l[478] ≤ 0.001 |
| −0.001 ≤ l[479] ≤ 0.001 |

TABLE 11

| (window coefficients w(n); M = 480) |
|---|
| w[0] = −0.5808776056 |
| w[1] = −0.5763146754 |
| w[2] = −0.5717281871 |
| w[3] = −0.5671176153 |
| w[4] = −0.5624825290 |
| w[5] = −0.5578225921 |
| w[6] = −0.5531375665 |
| w[7] = −0.5484273097 |
| w[8] = −0.5436917768 |
| w[9] = −0.5389311317 |
| w[10] = −0.5341466819 |
| w[11] = −0.5293395465 |
| w[12] = −0.5245097463 |
| w[13] = −0.5196580516 |

TABLE 11-continued

| (window coefficients w(n); M = 480) |
|---|
| w[14] = −0.5147870784 |
| w[15] = −0.5098978959 |
| w[16] = −0.5049903718 |
| w[17] = −0.5000598589 |
| w[18] = −0.4950978110 |
| w[19] = −0.4901024003 |
| w[20] = −0.4850747970 |
| w[21] = −0.4800182654 |
| w[22] = −0.4749363634 |
| w[23] = −0.4698301577 |
| w[24] = −0.4647016655 |
| w[25] = −0.4595619111 |
| w[26] = −0.4544188154 |
| w[27] = −0.4492711729 |
| w[28] = −0.4441139819 |
| w[29] = −0.4389345239 |
| w[30] = −0.4337275264 |
| w[31] = −0.4284948032 |
| w[32] = −0.4232367025 |
| w[33] = −0.4179527735 |
| w[34] = −0.4126438188 |
| w[35] = −0.4073115490 |
| w[36] = −0.4019599335 |
| w[37] = −0.3965931173 |
| w[38] = −0.3912127586 |
| w[39] = −0.3858206901 |
| w[40] = −0.3804206741 |
| w[41] = −0.3750156660 |
| w[42] = −0.3696062960 |
| w[43] = −0.3641950351 |
| w[44] = −0.3587884331 |
| w[45] = −0.3533885718 |
| w[46] = −0.3479934648 |
| w[47] = −0.3425961155 |
| w[48] = −0.3371864064 |
| w[49] = −0.3317629098 |
| w[50] = −0.3263277178 |
| w[51] = −0.3208794245 |
| w[52] = −0.3154166398 |
| w[53] = −0.3099429225 |
| w[54] = −0.3044637885 |
| w[55] = −0.2989897857 |
| w[56] = −0.2935283219 |
| w[57] = −0.2880808589 |
| w[58] = −0.2826496694 |
| w[59] = −0.2772378518 |
| w[60] = −0.2718470270 |
| w[61] = −0.2664774835 |
| w[62] = −0.2611294160 |
| w[63] = −0.2558031168 |
| w[64] = −0.2504992975 |
| w[65] = −0.2452185940 |
| w[66] = −0.2399618912 |
| w[67] = −0.2347299099 |
| w[68] = −0.2295224957 |
| w[69] = −0.2243389896 |
| w[70] = −0.2191776107 |
| w[71] = −0.2140377492 |
| w[72] = −0.2089205534 |
| w[73] = −0.2038264066 |
| w[74] = −0.1987541259 |
| w[75] = −0.1937036815 |
| w[76] = −0.1886766078 |
| w[77] = −0.1836739407 |
| w[78] = −0.1786967929 |
| w[79] = −0.1737483738 |
| w[80] = −0.1688331013 |
| w[81] = −0.1639566302 |
| w[82] = −0.1591239641 |
| w[83] = −0.1543382839 |
| w[84] = −0.1496031509 |
| w[85] = −0.1449234041 |
| w[86] = −0.1403010649 |
| w[87] = −0.1357347609 |
| w[88] = −0.1312238422 |
| w[89] = −0.1267683433 |
| w[90] = −0.1223641005 |
| w[91] = −0.1180035533 |

TABLE 11-continued

| (window coefficients w(n); M = 480) |
|---|
| w[92] = −0.1136781916 |
| w[93] = −0.1093811039 |
| w[94] = −0.1051089224 |
| w[95] = −0.1008585989 |
| w[96] = −0.0966216329 |
| w[97] = −0.0923878456 |
| w[98] = −0.0881517744 |
| w[99] = −0.0839085661 |
| w[100] = −0.0796520722 |
| w[101] = −0.0753801387 |
| w[102] = −0.0710958240 |
| w[103] = −0.0668046295 |
| w[104] = −0.0625121446 |
| w[105] = −0.0582150312 |
| w[106] = −0.0539045359 |
| w[107] = −0.0495761975 |
| w[108] = −0.0452283457 |
| w[109] = −0.0408528996 |
| w[110] = −0.0364373845 |
| w[111] = −0.0319813024 |
| w[112] = −0.0275154064 |
| w[113] = −0.0230898725 |
| w[114] = −0.0187595379 |
| w[115] = −0.0145975714 |
| w[116] = −0.0107213003 |
| w[117] = −0.0071866945 |
| w[118] = −0.0044039657 |
| w[119] = −0.0010119123 |
| w[120] = 0.0000000000 |
| w[121] = 0.0000000000 |
| w[122] = 0.0000000000 |
| w[123] = 0.0000000000 |
| w[124] = 0.0000000000 |
| w[125] = 0.0000000000 |
| w[126] = 0.0000000000 |
| w[127] = 0.0000000000 |
| w[128] = 0.0000000000 |
| w[129] = 0.0000000000 |
| w[130] = 0.0000000000 |
| w[131] = 0.0000000000 |
| w[132] = 0.0000000000 |
| w[133] = 0.0000000000 |
| w[134] = 0.0000000000 |
| w[135] = 0.0000000000 |
| w[136] = 0.0000000000 |
| w[137] = 0.0000000000 |
| w[138] = 0.0000000000 |
| w[139] = 0.0000000000 |
| w[140] = 0.0000000000 |
| w[141] = 0.0000000000 |
| w[142] = 0.0000000000 |
| w[143] = 0.0000000000 |
| w[144] = 0.0000000000 |
| w[145] = 0.0000000000 |
| w[146] = 0.0000000000 |
| w[147] = 0.0000000000 |
| w[148] = 0.0000000000 |
| w[149] = 0.0000000000 |
| w[150] = 0.0000000000 |
| w[151] = 0.0000000000 |
| w[152] = 0.0000000000 |
| w[153] = 0.0000000000 |
| w[154] = 0.0000000000 |
| w[155] = 0.0000000000 |
| w[156] = 0.0000000000 |
| w[157] = 0.0000000000 |
| w[158] = 0.0000000000 |
| w[159] = 0.0000000000 |
| w[160] = 0.0000000000 |
| w[161] = 0.0000000000 |
| w[162] = 0.0000000000 |
| w[163] = 0.0000000000 |
| w[164] = 0.0000000000 |
| w[165] = 0.0000000000 |
| w[166] = 0.0000000000 |
| w[167] = 0.0000000000 |
| w[168] = 0.0000000000 |
| w[169] = 0.0000000000 |

TABLE 11-continued (window coefficients w(n); M = 480)

w[170] = 0.0000000000
w[171] = 0.0000000000
w[172] = 0.0000000000
w[173] = 0.0000000000
w[174] = 0.0000000000
w[175] = 0.0000000000
w[176] = 0.0000000000
w[177] = 0.0000000000
w[178] = 0.0000000000
w[179] = 0.0000000000
w[180] = 0.0000000000
w[181] = 0.0000000000
w[182] = 0.0000000000
w[183] = 0.0000000000
w[184] = 0.0000000000
w[185] = 0.0000000000
w[186] = 0.0000000000
w[187] = 0.0000000000
w[188] = 0.0000000000
w[189] = 0.0000000000
w[190] = 0.0000000000
w[191] = 0.0000000000
w[192] = 0.0000000000
w[193] = 0.0000000000
w[194] = 0.0000000000
w[195] = 0.0000000000
w[196] = 0.0000000000
w[197] = 0.0000000000
w[198] = 0.0000000000
w[199] = 0.0000000000
w[200] = 0.0000000000
w[201] = 0.0000000000
w[202] = 0.0000000000
w[203] = 0.0000000000
w[204] = 0.0000000000
w[205] = 0.0000000000
w[206] = 0.0000000000
w[207] = 0.0000000000
w[208] = 0.0000000000
w[209] = 0.0000000000
w[210] = 0.0000000000
w[211] = 0.0000000000
w[212] = 0.0000000000
w[213] = 0.0000000000
w[214] = 0.0000000000
w[215] = 0.0000000000
w[216] = 0.0000000000
w[217] = 0.0000000000
w[218] = 0.0000000000
w[219] = 0.0000000000
w[220] = 0.0000000000
w[221] = 0.0000000000
w[222] = 0.0000000000
w[223] = 0.0000000000
w[224] = 0.0000000000
w[225] = 0.0000000000
w[226] = 0.0000000000
w[227] = 0.0000000000
w[228] = 0.0000000000
w[229] = 0.0000000000
w[230] = 0.0000000000
w[231] = 0.0000000000
w[232] = 0.0000000000
w[233] = 0.0000000000
w[234] = 0.0000000000
w[235] = 0.0000000000
w[236] = 0.0000000000
w[237] = 0.0000000000
w[238] = 0.0000000000
w[239] = 0.0000000000
w[240] = −1.0005813060
w[241] = −1.0011800551
w[242] = −1.0017792965
w[243] = −1.0023789343
w[244] = −1.0029788729
w[245] = −1.0035790165
w[246] = −1.0041792695
w[247] = −1.0047795360

TABLE 11-continued (window coefficients w(n); M = 480)

w[248] = −1.0053797202
w[249] = −1.0059797344
w[250] = −1.0065795942
w[251] = −1.0071794018
w[252] = −1.0077792625
w[253] = −1.0083792488
w[254] = −1.0089792945
w[255] = −1.0095792616
w[256] = −1.0101790123
w[257] = −1.0107784699
w[258] = −1.0113776929
w[259] = −1.0119767783
w[260] = −1.0125758213
w[261] = −1.0131748221
w[262] = −1.0137736534
w[263] = −1.0143721725
w[264] = −1.0149702477
w[265] = −1.0155678634
w[266] = −1.0161651023
w[267] = −1.0167620501
w[268] = −1.0173587590
w[269] = −1.0179551401
w[270] = −1.0185510312
w[271] = −1.0191462701
w[272] = −1.0197407596
w[273] = −1.0203345472
w[274] = −1.0209277208
w[275] = −1.0215203671
w[276] = −1.0221124681
w[277] = −1.0227038667
w[278] = −1.0232943893
w[279] = −1.0238838739
w[280] = −1.0244722897
w[281] = −1.0250597160
w[282] = −1.0256462354
w[283] = −1.0262318960
w[284] = −1.0268165981
w[285] = −1.0274001663
w[286] = −1.0279824249
w[287] = −1.0285632638
w[288] = −1.0291427184
w[289] = −1.0297208652
w[290] = −1.0302977786
w[291] = −1.0308734354
w[292] = −1.0314476809
w[293] = −1.0320203450
w[294] = −1.0325912691
w[295] = −1.0331604225
w[296] = −1.0337278825
w[297] = −1.0342937293
w[298] = −1.0348580110
w[299] = −1.0354206394
w[300] = −1.0359814562
w[301] = −1.0365403023
w[302] = −1.0370970842
w[303] = −1.0376518520
w[304] = −1.0382046968
w[305] = −1.0387557079
w[306] = −1.0393048768
w[307] = −1.0398520647
w[308] = −1.0403971170
w[309] = −1.0409398906
w[310] = −1.0414803696
w[311] = −1.0420186451
w[312] = −1.0425548108
w[313] = −1.0430889298
w[314] = −1.0436209319
w[315] = −1.0441506792
w[316] = −1.0446780323
w[317] = −1.0452029207
w[318] = −1.0457254236
w[319] = −1.0462456636
w[320] = −1.0467637608
w[321] = −1.0472797406
w[322] = −1.0477935014
w[323] = −1.0483049265
w[324] = −1.0488139110
w[325] = −1.0493204809

TABLE 11-continued (window coefficients w(n); M = 480)

w[326] = −1.0498247725
w[327] = −1.0503269252
w[328] = −1.0508270454
w[329] = −1.0513250983
w[330] = −1.0518209767
w[331] = −1.0523145736
w[332] = −1.0528058386
w[333] = −1.0532948468
w[334] = −1.0537817095
w[335] = −1.0542665354
w[336] = −1.0547493712
w[337] = −1.0552301803
w[338] = −1.0557089161
w[339] = −1.0561855368
w[340] = −1.0566600512
w[341] = −1.0571325116
w[342] = −1.0576029673
w[343] = −1.0580714939
w[344] = −1.0585382760
w[345] = −1.0590035458
w[346] = −1.0594675628
w[347] = −1.0599302428
w[348] = −1.0603907484
w[349] = −1.0608480578
w[350] = −1.0613011130
w[351] = −1.0617509948
w[352] = −1.0622016350
w[353] = −1.0626573152
w[354] = −1.0631214642
w[355] = −1.0635872621
w[356] = −1.0640392362
w[357] = −1.0644618603
w[358] = −1.0648404800
w[359] = −1.0651643956
w[360] = −1.0654251664
w[361] = −1.0656136196
w[362] = −1.0657265986
w[363] = −1.0657736665
w[364] = −1.0657681423
w[365] = −1.0657229990
w[366] = −1.0656483427
w[367] = −1.0655503595
w[368] = −1.0654347872
w[369] = −1.0653068470
w[370] = −1.0651649960
w[371] = −1.0650019838
w[372] = −1.0648105105
w[373] = −1.0645839879
w[374] = −1.0643190063
w[375] = −1.0640139004
w[376] = −1.0636666522
w[377] = −1.0632775749
w[378] = −1.0628518609
w[379] = −1.0623961339
w[380] = −1.0619169042
w[381] = −1.0614189147
w[382] = −1.0609045231
w[383] = −1.0603758114
w[384] = −1.0598346656
w[385] = −1.0592803276
w[386] = −1.0587097831
w[387] = −1.0581201040
w[388] = −1.0575077138
w[389] = −1.0568665583
w[390] = −1.0561892913
w[391] = −1.0554685584
w[392] = −1.0546982085
w[393] = −1.0538747210
w[394] = −1.0529953941
w[395] = −1.0520573811
w[396] = −1.0510596979
w[397] = −1.0500037838
w[398] = −1.0488913636
w[399] = −1.0477242601
w[400] = −1.0465057544
w[401] = −1.0452403539
w[402] = −1.0439325910
w[403] = −1.0425867179

TABLE 11-continued (window coefficients w(n); M = 480)

w[404] = −1.0412057958
w[405] = −1.0397922342
w[406] = −1.0383485590
w[407] = −1.0368765950
w[408] = −1.0353767209
w[409] = −1.0338488566
w[410] = −1.0322930082
w[411] = −1.0307079512
w[412] = −1.0290908538
w[413] = −1.0274386932
w[414] = −1.0257484965
w[415] = −1.0240177488
w[416] = −1.0222443202
w[417] = −1.0204260907
w[418] = −1.0185608337
w[419] = −1.0166458598
w[420] = −1.0146782601
w[421] = −1.0126550645
w[422] = −1.0105741418
w[423] = −1.0084351216
w[424] = −1.0062382570
w[425] = −1.0039835929
w[426] = −1.0016761511
w[427] = −0.9993275072
w[428] = −0.9969500164
w[429] = −0.9945556640
w[430] = −0.9921525489
w[431] = −0.9897454102
w[432] = −0.9873392945
w[433] = −0.9849366913
w[434] = −0.9825299978
w[435] = −0.9801063092
w[436] = −0.9776528709
w[437] = −0.9751598885
w[438] = −0.9726241911
w[439] = −0.9700446101
w[440] = −0.9674196943
w[441] = −0.9647499895
w[442] = −0.9620385928
w[443] = −0.9592889018
w[444] = −0.9565045414
w[445] = −0.9536922062
w[446] = −0.9508611803
w[447] = −0.9480207720
w[448] = −0.9451799557
w[449] = −0.9423462878
w[450] = −0.9395263728
w[451] = −0.9367275150
w[452] = −0.9339502227
w[453] = −0.9311804869
w[454] = −0.9284001393
w[455] = −0.9255912198
w[456] = −0.9227452652
w[457] = −0.9198665080
w[458] = −0.9169606683
w[459] = −0.9140336581
w[460] = −0.9110950392
w[461] = −0.9081573914
w[462] = −0.9052335761
w[463] = −0.9023338144
w[464] = −0.8994575281
w[465] = −0.8965984367
w[466] = −0.8937505821
w[467] = −0.8909094294
w[468] = −0.8880738182
w[469] = −0.8852436029
w[470] = −0.8824184880
w[471] = −0.8795994609
w[472] = −0.8767891632
w[473] = −0.8739904329
w[474] = −0.8712060947
w[475] = −0.8684389740
w[476] = −0.8656918967
w[477] = −0.8629676883
w[478] = −0.8602691745
w[479] = −0.8575991811
w[480] = −0.5871997587
w[481] = −0.5917306441

TABLE 11-continued (window coefficients w(n); M = 480)

w[482] = −0.5962364410
w[483] = −0.6007171911
w[484] = −0.6051729363
w[485] = −0.6096037182
w[486] = −0.6140095787
w[487] = −0.6183905594
w[488] = −0.6227467020
w[489] = −0.6270780549
w[490] = −0.6313847522
w[491] = −0.6356669994
w[492] = −0.6399250047
w[493] = −0.6441589531
w[494] = −0.6483689337
w[495] = −0.6525549851
w[496] = −0.6567171490
w[497] = −0.6608554769
w[498] = −0.6649700456
w[499] = −0.6690609382
w[500] = −0.6731282381
w[501] = −0.6771719903
w[502] = −0.6811921889
w[503] = −0.6851888220
w[504] = −0.6891618747
w[505] = −0.6931112903
w[506] = −0.6970369765
w[507] = −0.7009388417
w[508] = −0.7048167895
w[509] = −0.7086707067
w[510] = −0.7125004708
w[511] = −0.7163059603
w[512] = −0.7200870494
w[513] = −0.7238436039
w[514] = −0.7275754858
w[515] = −0.7312825592
w[516] = −0.7349646272
w[517] = −0.7386214124
w[518] = −0.7422526279
w[519] = −0.7458579928
w[520] = −0.7494372963
w[521] = −0.7529903859
w[522] = −0.7565171125
w[523] = −0.7600172946
w[524] = −0.7634906179
w[525] = −0.7669366989
w[526] = −0.7703551556
w[527] = −0.7737456437
w[528] = −0.7771079020
w[529] = −0.7804416941
w[530] = −0.7837467808
w[531] = −0.7870229064
w[532] = −0.7902697916
w[533] = −0.7934871541
w[534] = −0.7966747102
w[535] = −0.7998321503
w[536] = −0.8029591434
w[537] = −0.8060553579
w[538] = −0.8091204675
w[539] = −0.8121541668
w[540] = −0.8151561630
w[541] = −0.8181261591
w[542] = −0.8210638890
w[543] = −0.8239691508
w[544] = −0.8268417620
w[545] = −0.8296815379
w[546] = −0.8324882961
w[547] = −0.8352618558
w[548] = −0.8380020370
w[549] = −0.8407086604
w[550] = −0.8433815590
w[551] = −0.8460205769
w[552] = −0.8486255557
w[553] = −0.8511963569
w[554] = −0.8537329207
w[555] = −0.8562352295
w[556] = −0.8587032610
w[557] = −0.8611370071
w[558] = −0.8635364863
w[559] = −0.8659017270

TABLE 11-continued (window coefficients w(n); M = 480)

w[560] = −0.8682327539
w[561] = −0.8705296826
w[562] = −0.8727927482
w[563] = −0.8750221998
w[564] = −0.8772182889
w[565] = −0.8793813044
w[566] = −0.8815115693
w[567] = −0.8836093988
w[568] = −0.8856751740
w[569] = −0.8877095389
w[570] = −0.8897132784
w[571] = −0.8916871642
w[572] = −0.8936319855
w[573] = −0.8955485566
w[574] = −0.8974377072
w[575] = −0.8993002548
w[576] = −0.9011374022
w[577] = −0.9029508608
w[578] = −0.9047424020
w[579] = −0.9065137953
w[580] = −0.9082668379
w[581] = −0.9100033534
w[582] = −0.9117251524
w[583] = −0.9134341590
w[584] = −0.9151327603
w[585] = −0.9168235671
w[586] = −0.9185092431
w[587] = −0.9201917021
w[588] = −0.9218712905
w[589] = −0.9235477792
w[590] = −0.9252211580
w[591] = −0.9268859672
w[592] = −0.9285295974
w[593] = −0.9301386071
w[594] = −0.9316989663
w[595] = −0.9331911424
w[596] = −0.9345850188
w[597] = −0.9358762606
w[598] = −0.9369427584
w[599] = −0.9382556163
w[600] = −0.9388222177
w[601] = −0.9391077995
w[602] = −0.9394418319
w[603] = −0.9398149674
w[604] = −0.9402143441
w[605] = −0.9406262913
w[606] = −0.9410371393
w[607] = −0.9414408404
w[608] = −0.9418404173
w[609] = −0.9422396601
w[610] = −0.9426420613
w[611] = −0.9430485899
w[612] = −0.9434583141
w[613] = −0.9438703318
w[614] = −0.9442839016
w[615] = −0.9446989520
w[616] = −0.9451157183
w[617] = −0.9455344122
w[618] = −0.9459552033
w[619] = −0.9463781648
w[620] = −0.9468033458
w[621] = −0.9472307989
w[622] = −0.9476605376
w[623] = −0.9480925301
w[624] = −0.9485267401
w[625] = −0.9489631401
w[626] = −0.9494017777
w[627] = −0.9498427567
w[628] = −0.9502861835
w[629] = −0.9507321323
w[630] = −0.9511805640
w[631] = −0.9516313883
w[632] = −0.9520845139
w[633] = −0.9525399154
w[634] = −0.9529976954
w[635] = −0.9534579867
w[636] = −0.9539209200
w[637] = −0.9543865262

TABLE 11-continued (window coefficients w(n); M = 480)

w[638] = −0.9548547167
w[639] = −0.9553253919
w[640] = −0.9557984656
w[641] = −0.9562739677
w[642] = −0.9567520146
w[643] = −0.9572327253
w[644] = −0.9577161802
w[645] = −0.9582023217
w[646] = −0.9586910295
w[647] = −0.9591821836
w[648] = −0.9596757263
w[649] = −0.9601717220
w[650] = −0.9606702644
w[651] = −0.9611714447
w[652] = −0.9616752555
w[653] = −0.9621815718
w[654] = −0.9626902576
w[655] = −0.9632011906
w[656] = −0.9637143692
w[657] = −0.9642298828
w[658] = −0.9647478229
w[659] = −0.9652682430
w[660] = −0.9657910630
w[661] = −0.9663161413
w[662] = −0.9668433363
w[663] = −0.9673725716
w[664] = −0.9679038978
w[665] = −0.9684373963
w[666] = −0.9689731456
w[667] = −0.9695111236
w[668] = −0.9700511874
w[669] = −0.9705931826
w[670] = −0.9711369691
w[671] = −0.9716825296
w[672] = −0.9722299397
w[673] = −0.9727792770
w[674] = −0.9733305803
w[675] = −0.9738837508
w[676] = −0.9744386273
w[677] = −0.9749950475
w[678] = −0.9755529209
w[679] = −0.9761122971
w[680] = −0.9766732590
w[681] = −0.9772358868
w[682] = −0.9778001556
w[683] = −0.9783659150
w[684] = −0.9789330025
w[685] = −0.9795012708
w[686] = −0.9800707060
w[687] = −0.9806413940
w[688] = −0.9812134228
w[689] = −0.9817868417
w[690] = −0.9823615606
w[691] = −0.9829374261
w[692] = −0.9835142843
w[693] = −0.9840920513
w[694] = −0.9846707798
w[695] = −0.9852505552
w[696] = −0.9858314602
w[697] = −0.9864134826
w[698] = −0.9869964967
w[699] = −0.9875803658
w[700] = −0.9881649673
w[701] = −0.9887503027
w[702] = −0.9893364667
w[703] = −0.9899235559
w[704] = −0.9905116300
w[705] = −0.9911006157
w[706] = −0.9916903795
w[707] = −0.9922807873
w[708] = −0.9928717746
w[709] = −0.9934634139
w[710] = −0.9940558103
w[711] = −0.9946490663
w[712] = −0.9952431993
w[713] = −0.9958381241
w[714] = −0.9964337471
w[715] = −0.9970299744

TABLE 11-continued (window coefficients w(n); M = 480)

w[716] = −0.9976267116
w[717] = −0.9982238638
w[718] = −0.9988213358
w[719] = −0.9994190318
w[720] = 0.0810701994
w[721] = 0.0824861300
w[722] = 0.0839297462
w[723] = 0.0853993744
w[724] = 0.0868933411
w[725] = 0.0884099728
w[726] = 0.0899475958
w[727] = 0.0915045369
w[728] = 0.0930791233
w[729] = 0.0946696709
w[730] = 0.0962746643
w[731] = 0.0978940226
w[732] = 0.0995287425
w[733] = 0.1011798248
w[734] = 0.1028479679
w[735] = 0.1045327810
w[736] = 0.1062333866
w[737] = 0.1079488963
w[738] = 0.1096791223
w[739] = 0.1114252277
w[740] = 0.1131886910
w[741] = 0.1149709618
w[742] = 0.1167721943
w[743] = 0.1185910024
w[744] = 0.1204258726
w[745] = 0.1222753396
w[746] = 0.1241383352
w[747] = 0.1260140867
w[748] = 0.1279018229
w[749] = 0.1298006884
w[750] = 0.1317095161
w[751] = 0.1336270199
w[752] = 0.1355518539
w[753] = 0.1374835659
w[754] = 0.1394234079
w[755] = 0.1413730103
w[756] = 0.1433339769
w[757] = 0.1453049464
w[758] = 0.1472810434
w[759] = 0.1492571027
w[760] = 0.1512280448
w[761] = 0.1531894794
w[762] = 0.1551375357
w[763] = 0.1570683185
w[764] = 0.1589780277
w[765] = 0.1608631511
w[766] = 0.1627203099
w[767] = 0.1645461206
w[768] = 0.1663371079
w[769] = 0.1680896144
w[770] = 0.1697999439
w[771] = 0.1714644023
w[772] = 0.1730796805
w[773] = 0.1746429249
w[774] = 0.1761513119
w[775] = 0.1776021157
w[776] = 0.1789933580
w[777] = 0.1803238244
w[778] = 0.1815915348
w[779] = 0.1828010733
w[780] = 0.1839790443
w[781] = 0.1851620608
w[782] = 0.1863866932
w[783] = 0.1876784652
w[784] = 0.1890416079
w[785] = 0.1904750706
w[786] = 0.1919784037
w[787] = 0.1935507421
w[788] = 0.1951908997
w[789] = 0.1968976587
w[790] = 0.1986698073
w[791] = 0.2005061767
w[792] = 0.2024056322
w[793] = 0.2043670294

TABLE 11-continued (window coefficients w(n); M = 480)

w[794] = 0.2063893042
w[795] = 0.2084716639
w[796] = 0.2106134320
w[797] = 0.2128139518
w[798] = 0.2150721814
w[799] = 0.2173863388
w[800] = 0.2197544827
w[801] = 0.2221746811
w[802] = 0.2246466062
w[803] = 0.2271718307
w[804] = 0.2297520768
w[805] = 0.2323891268
w[806] = 0.2350852998
w[807] = 0.2378433074
w[808] = 0.2406659139
w[809] = 0.2435553270
w[810] = 0.2465119133
w[811] = 0.2495350636
w[812] = 0.2526245761
w[813] = 0.2557762443
w[814] = 0.2589783568
w[815] = 0.2622174341
w[816] = 0.2654801596
w[817] = 0.2687600266
w[818] = 0.2720586286
w[819] = 0.2753781651
w[820] = 0.2787215443
w[821] = 0.2820978200
w[822] = 0.2855205797
w[823] = 0.2890037912
w[824] = 0.2925569483
w[825] = 0.2961742732
w[826] = 0.2998428848
w[827] = 0.3035504491
w[828] = 0.3072859394
w[829] = 0.3110411099
w[830] = 0.3148085534
w[831] = 0.3185807097
w[832] = 0.3223609254
w[833] = 0.3261654034
w[834] = 0.3300114272
w[835] = 0.3339157038
w[836] = 0.3378902579
w[837] = 0.3419434412
w[838] = 0.3460842560
w[839] = 0.3503168602
w[840] = 0.3546294696
w[841] = 0.3590027810
w[842] = 0.3634182708
w[843] = 0.3678563023
w[844] = 0.3722954735
w[845] = 0.3767141575
w[846] = 0.3810906675
w[847] = 0.3854187559
w[848] = 0.3897104181
w[849] = 0.3939790303
w[850] = 0.3982393811
w[851] = 0.4025185204
w[852] = 0.4068525817
w[853] = 0.4112783216
w[854] = 0.4158247716
w[855] = 0.4204946509
w[856] = 0.4252781027
w[857] = 0.4301671925
w[858] = 0.4351443629
w[859] = 0.4401746494
w[860] = 0.4452188692
w[861] = 0.4502382614
w[862] = 0.4552043331
w[863] = 0.4601008550
w[864] = 0.4649124185
w[865] = 0.4696260824
w[866] = 0.4742499397
w[867] = 0.4788080266
w[868] = 0.4833239677
w[869] = 0.4878210958
w[870] = 0.4923207926
w[871] = 0.4968434081

TABLE 11-continued (window coefficients w(n); M = 480)

w[872] = 0.5014098794
w[873] = 0.5060349389
w[874] = 0.5107217655
w[875] = 0.5154705892
w[876] = 0.5202819994
w[877] = 0.5251522760
w[878] = 0.5300727035
w[879] = 0.5350341826
w[880] = 0.5400272699
w[881] = 0.5450395379
w[882] = 0.5500563259
w[883] = 0.5550629020
w[884] = 0.5600457135
w[885] = 0.5649952597
w[886] = 0.5699040243
w[887] = 0.5747640500
w[888] = 0.5795706117
w[889] = 0.5843249186
w[890] = 0.5890297009
w[891] = 0.5936875029
w[892] = 0.5983032314
w[893] = 0.6028845341
w[894] = 0.6074392951
w[895] = 0.6119752102
w[896] = 0.6164984134
w[897] = 0.6210138561
w[898] = 0.6255265365
w[899] = 0.6300413277
w[900] = 0.6345627840
w[901] = 0.6390952489
w[902] = 0.6436432435
w[903] = 0.6482093359
w[904] = 0.6527925051
w[905] = 0.6573906968
w[906] = 0.6620020224
w[907] = 0.6666156210
w[908] = 0.6712100685
w[909] = 0.6757630073
w[910] = 0.6802532089
w[911] = 0.6846688253
w[912] = 0.6890052495
w[913] = 0.6932571047
w[914] = 0.6974240444
w[915] = 0.7015221370
w[916] = 0.7055749949
w[917] = 0.7096060315
w[918] = 0.7136324139
w[919] = 0.7176591828
w[920] = 0.7216883278
w[921] = 0.7257222031
w[922] = 0.7297597540
w[923] = 0.7337959964
w[924] = 0.7378256565
w[925] = 0.7418430032
w[926] = 0.7458383726
w[927] = 0.7497991493
w[928] = 0.7537126749
w[929] = 0.7575673812
w[930] = 0.7613554260
w[931] = 0.7650709820
w[932] = 0.7687072609
w[933] = 0.7722672500
w[934] = 0.7757722581
w[935] = 0.7792479491
w[936] = 0.7827195694
w[937] = 0.7861982124
w[938] = 0.7896781155
w[939] = 0.7931521831
w[940] = 0.7966129079
w[941] = 0.8000490593
w[942] = 0.8034466798
w[943] = 0.8067914414
w[944] = 0.8100729764
w[945] = 0.8132943604
w[946] = 0.8164649031
w[947] = 0.8195935009
w[948] = 0.8226870326
w[949] = 0.8257482488

TABLE 11-continued

| (window coefficients w(n); M = 480) |
|---|
| w[950] = 0.8287788638 |
| w[951] = 0.8317807182 |
| w[952] = 0.8347539423 |
| w[953] = 0.8376966792 |
| w[954] = 0.8406069098 |
| w[955] = 0.8434826180 |
| w[956] = 0.8463217902 |
| w[957] = 0.8491224113 |
| w[958] = 0.8518824667 |
| w[959] = 0.8545999417 |

TABLE 12

| (lifting coefficients l(n); M = 480) |
|---|
| l[0] = −0.1598148971 |
| l[1] = −0.1575742671 |
| l[2] = −0.1553568263 |
| l[3] = −0.1531612141 |
| l[4] = −0.1509860698 |
| l[5] = −0.1488300327 |
| l[6] = −0.1466917425 |
| l[7] = −0.1445698381 |
| l[8] = −0.1424629572 |
| l[9] = −0.1403698024 |
| l[10] = −0.1382898802 |
| l[11] = −0.1362233769 |
| l[12] = −0.1341704751 |
| l[13] = −0.1321313605 |
| l[14] = −0.1301061894 |
| l[15] = −0.1280951060 |
| l[16] = −0.1260982528 |
| l[17] = −0.1241157989 |
| l[18] = −0.1221479724 |
| l[19] = −0.1201950169 |
| l[20] = −0.1182571768 |
| l[21] = −0.1163346158 |
| l[22] = −0.1144273912 |
| l[23] = −0.1125355474 |
| l[24] = −0.1106591341 |
| l[25] = −0.1087982545 |
| l[26] = −0.1069530564 |
| l[27] = −0.1051236905 |
| l[28] = −0.1033102801 |
| l[29] = −0.1015128359 |
| l[30] = −0.0997313099 |
| l[31] = −0.0979656549 |
| l[32] = −0.0962158633 |
| l[33] = −0.0944820161 |
| l[34] = −0.0927642188 |
| l[35] = −0.0910625764 |
| l[36] = −0.0893771170 |
| l[37] = −0.0877077667 |
| l[38] = −0.0860544394 |
| l[39] = −0.0844170572 |
| l[40] = −0.0827956330 |
| l[41] = −0.0811902561 |
| l[42] = −0.0796010185 |
| l[43] = −0.0780279844 |
| l[44] = −0.0764710998 |
| l[45] = −0.0749302501 |
| l[46] = −0.0734053209 |
| l[47] = −0.0718962485 |
| l[48] = −0.0704030823 |
| l[49] = −0.0689259036 |
| l[50] = −0.0674647926 |
| l[51] = −0.0660197446 |
| l[52] = −0.0645906422 |
| l[53] = −0.0631773542 |
| l[54] = −0.0617797588 |
| l[55] = −0.0603978345 |
| l[56] = −0.0590316445 |
| l[57] = −0.0576812550 |
| l[58] = −0.0563467014 |
| l[59] = −0.0550278894 |

TABLE 12-continued

| (lifting coefficients l(n); M = 480) |
|---|
| l[60] = −0.0537246576 |
| l[61] = −0.0524368449 |
| l[62] = −0.0511643458 |
| l[63] = −0.0499071781 |
| l[64] = −0.0486653945 |
| l[65] = −0.0474390463 |
| l[66] = −0.0462281088 |
| l[67] = −0.0450324566 |
| l[68] = −0.0438519520 |
| l[69] = −0.0426864678 |
| l[70] = −0.0415359993 |
| l[71] = −0.0404006439 |
| l[72] = −0.0392805027 |
| l[73] = −0.0381756423 |
| l[74] = −0.0370859853 |
| l[75] = −0.0360113790 |
| l[76] = −0.0349516738 |
| l[77] = −0.0339067522 |
| l[78] = −0.0328765709 |
| l[79] = −0.0318611062 |
| l[80] = −0.0308603358 |
| l[81] = −0.0298740872 |
| l[82] = −0.0289019881 |
| l[83] = −0.0279436420 |
| l[84] = −0.0269986700 |
| l[85] = −0.0260668844 |
| l[86] = −0.0251482606 |
| l[87] = −0.0242427689 |
| l[88] = −0.0233504184 |
| l[89] = −0.0224713632 |
| l[90] = −0.0216058392 |
| l[91] = −0.0207540629 |
| l[92] = −0.0199163936 |
| l[93] = −0.0190934960 |
| l[94] = −0.0182861133 |
| l[95] = −0.0174949985 |
| l[96] = −0.0167202234 |
| l[97] = −0.0159609574 |
| l[98] = −0.0152162628 |
| l[99] = −0.0144852303 |
| l[100] = −0.0137672085 |
| l[101] = −0.0130617688 |
| l[102] = −0.0123684629 |
| l[103] = −0.0116870070 |
| l[104] = −0.0110177681 |
| l[105] = −0.0103614489 |
| l[106] = −0.0097187621 |
| l[107] = −0.0090900224 |
| l[108] = −0.0084746720 |
| l[109] = −0.0078719022 |
| l[110] = −0.0072809198 |
| l[111] = −0.0067013924 |
| l[112] = −0.0061336051 |
| l[113] = −0.0055779155 |
| l[114] = −0.0050346895 |
| l[115] = −0.0045044616 |
| l[116] = −0.0039879015 |
| l[117] = −0.0034857105 |
| l[118] = −0.0029983024 |
| l[119] = −0.0025249308 |
| l[120] = −0.0020642270 |
| l[121] = −0.0016148850 |
| l[122] = −0.0011754489 |
| l[123] = −0.0007441679 |
| l[124] = −0.0003192310 |
| l[125] = 0.0001012088 |
| l[126] = 0.0005174658 |
| l[127] = 0.0009278302 |
| l[128] = 0.0013303544 |
| l[129] = 0.0017230404 |
| l[130] = 0.0021030588 |
| l[131] = 0.0024668979 |
| l[132] = 0.0028109593 |
| l[133] = 0.0031324408 |
| l[134] = 0.0034317682 |
| l[135] = 0.0037111065 |
| l[136] = 0.0039724193 |
| l[137] = 0.0042183519 |

TABLE 12-continued (lifting coefficients l(n); M = 480)

l[138] = 0.0044529075
l[139] = 0.0046804736
l[140] = 0.0049054343
l[141] = 0.0051307175
l[142] = 0.0053573176
l[143] = 0.0055860040
l[144] = 0.0058173896
l[145] = 0.0060499627
l[146] = 0.0062804178
l[147] = 0.0065054394
l[148] = 0.0067218866
l[149] = 0.0069274216
l[150] = 0.0071201476
l[151] = 0.0072980738
l[152] = 0.0074598511
l[153] = 0.0076054670
l[154] = 0.0077353227
l[155] = 0.0078497553
l[156] = 0.0079497152
l[157] = 0.0080369468
l[158] = 0.0081132889
l[159] = 0.0081805582
l[160] = 0.0082403765
l[161] = 0.0082941972
l[162] = 0.0083434886
l[163] = 0.0083895977
l[164] = 0.0084334010
l[165] = 0.0084755113
l[166] = 0.0085165997
l[167] = 0.0085569311
l[168] = 0.0085959207
l[169] = 0.0086327272
l[170] = 0.0086665401
l[171] = 0.0086964994
l[172] = 0.0087216896
l[173] = 0.0087411886
l[174] = 0.0087540800
l[175] = 0.0087595144
l[176] = 0.0087567031
l[177] = 0.0087448389
l[178] = 0.0087232763
l[179] = 0.0086920132
l[180] = 0.0086513980
l[181] = 0.0086017292
l[182] = 0.0085435416
l[183] = 0.0084778526
l[184] = 0.0084058264
l[185] = 0.0083286085
l[186] = 0.0082474165
l[187] = 0.0081635596
l[188] = 0.0080783592
l[189] = 0.0079930481
l[190] = 0.0079077741
l[191] = 0.0078217649
l[192] = 0.0077342598
l[193] = 0.0076444424
l[194] = 0.0075513279
l[195] = 0.0074538472
l[196] = 0.0073509104
l[197] = 0.0072417283
l[198] = 0.0071261555
l[199] = 0.0070042471
l[200] = 0.0068760236
l[201] = 0.0067419291
l[202] = 0.0066029600
l[203] = 0.0064601783
l[204] = 0.0063146109
l[205] = 0.0061669031
l[206] = 0.0060173749
l[207] = 0.0058663586
l[208] = 0.0057140927
l[209] = 0.0055604594
l[210] = 0.0054051481
l[211] = 0.0052478684
l[212] = 0.0050882785
l[213] = 0.0049259352
l[214] = 0.0047603726
l[215] = 0.0045911156

TABLE 12-continued (lifting coefficients l(n); M = 480)

l[216] = 0.0044181288
l[217] = 0.0042419586
l[218] = 0.0040632209
l[219] = 0.0038825037
l[220] = 0.0037001115
l[221] = 0.0035161089
l[222] = 0.0033305623
l[223] = 0.0031435338
l[224] = 0.0029550848
l[225] = 0.0027652750
l[226] = 0.0025741650
l[227] = 0.0023818069
l[228] = 0.0021882343
l[229] = 0.0019934764
l[230] = 0.0017975612
l[231] = 0.0016005829
l[232] = 0.0014027231
l[233] = 0.0012041740
l[234] = 0.0010051268
l[235] = 0.0008057730
l[236] = 0.0006063039
l[237] = 0.0004069110
l[238] = 0.0002077857
l[239] = 0.0000091193
l[240] = −0.0818101091
l[241] = −0.0826667764
l[242] = −0.0835169550
l[243] = −0.0843608724
l[244] = −0.0851987562
l[245] = −0.0860308341
l[246] = −0.0868573332
l[247] = −0.0876784815
l[248] = −0.0884945079
l[249] = −0.0893055909
l[250] = −0.0901112837
l[251] = −0.0909106184
l[252] = −0.0917025959
l[253] = −0.0924865174
l[254] = −0.0932629294
l[255] = −0.0940330188
l[256] = −0.0947979867
l[257] = −0.0955583264
l[258] = −0.0963129719
l[259] = −0.0970604178
l[260] = −0.0977991730
l[261] = −0.0985290321
l[262] = −0.0992515051
l[263] = −0.0999683044
l[264] = −0.1006810830
l[265] = −0.1013909223
l[266] = −0.1020984234
l[267] = −0.1028041775
l[268] = −0.1035088838
l[269] = −0.1042137144
l[270] = −0.1049200652
l[271] = −0.1056293947
l[272] = −0.1063422848
l[273] = −0.1070574106
l[274] = −0.1077729340
l[275] = −0.1084869953
l[276] = −0.1092005928
l[277] = −0.1099185185
l[278] = −0.1106460126
l[279] = −0.1113882209
l[280] = −0.1121494977
l[281] = −0.1129335269
l[282] = −0.1137439975
l[283] = −0.1145845783
l[284] = −0.1154588961
l[285] = −0.1163705530
l[286] = −0.1173231524
l[287] = −0.1183203124
l[288] = −0.1193656879
l[289] = −0.1204629392
l[290] = −0.1216157337
l[291] = −0.1228274693
l[292] = −0.1241011905
l[293] = −0.1254399011

TABLE 12-continued (lifting coefficients l(n); M = 480)

l[294] = −0.1268465303
l[295] = −0.1283231123
l[296] = −0.1298707727
l[297] = −0.1314912723
l[298] = −0.1331808167
l[299] = −0.1349132527
l[300] = −0.1366508132
l[301] = −0.1383557241
l[302] = −0.1400003264
l[303] = −0.1415792473
l[304] = −0.1430937443
l[305] = −0.1445443185
l[306] = −0.1459316441
l[307] = −0.1472563614
l[308] = −0.1485191168
l[309] = −0.1497205559
l[310] = −0.1508613239
l[311] = −0.1519420653
l[312] = −0.1529634248
l[313] = −0.1539260471
l[314] = −0.1548305773
l[315] = −0.1556776610
l[316] = −0.1564679435
l[317] = −0.1572020700
l[318] = −0.1578806850
l[319] = −0.1585044331
l[320] = −0.1590739586
l[321] = −0.1595899063
l[322] = −0.1600529215
l[323] = −0.1604636495
l[324] = −0.1608227355
l[325] = −0.1611308249
l[326] = −0.1613885625
l[327] = −0.1615965934
l[328] = −0.1617555626
l[329] = −0.1618661154
l[330] = −0.1619288972
l[331] = −0.1619445533
l[332] = −0.1619137287
l[333] = −0.1618370680
l[334] = −0.1617152155
l[335] = −0.1615488155
l[336] = −0.1613385128
l[337] = −0.1610849534
l[338] = −0.1607887829
l[339] = −0.1604506472
l[340] = −0.1600711912
l[341] = −0.1596510590
l[342] = −0.1591908950
l[343] = −0.1586913434
l[344] = −0.1581530496
l[345] = −0.1575766595
l[346] = −0.1569628190
l[347] = −0.1563121734
l[348] = −0.1556253675
l[349] = −0.1549030453
l[350] = −0.1541458514
l[351] = −0.1533544304
l[352] = −0.1525294275
l[353] = −0.1516714882
l[354] = −0.1507812576
l[355] = −0.1498593810
l[356] = −0.1489065035
l[357] = −0.1479232704
l[358] = −0.1469103267
l[359] = −0.1458683173
l[360] = −0.1447978870
l[361] = −0.1436996806
l[362] = −0.1425743430
l[363] = −0.1414225194
l[364] = −0.1402448551
l[365] = −0.1390419952
l[366] = −0.1378145850
l[367] = −0.1365632693
l[368] = −0.1352886931
l[369] = −0.1339915012
l[370] = −0.1326723384
l[371] = −0.1313318495

TABLE 12-continued (lifting coefficients l(n); M = 480)

l[372] = −0.1299706792
l[373] = −0.1285894724
l[374] = −0.1271888745
l[375] = −0.1257695312
l[376] = −0.1243320883
l[377] = −0.1228771910
l[378] = −0.1214054840
l[379] = −0.1199176115
l[380] = −0.1184142179
l[381] = −0.1168959479
l[382] = −0.1153634470
l[383] = −0.1138173604
l[384] = −0.1122583337
l[385] = −0.1106870119
l[386] = −0.1091040395
l[387] = −0.1075100614
l[388] = −0.1059057222
l[389] = −0.1042916673
l[390] = −0.1026685419
l[391] = −0.1010369917
l[392] = −0.0993976618
l[393] = −0.0977511971
l[394] = −0.0960982423
l[395] = −0.0944394423
l[396] = −0.0927754420
l[397] = −0.0911068863
l[398] = −0.0894344204
l[399] = −0.0877586894
l[400] = −0.0860803382
l[401] = −0.0844000121
l[402] = −0.0827183560
l[403] = −0.0810360150
l[404] = −0.0793536341
l[405] = −0.0776718582
l[406] = −0.0759913322
l[407] = −0.0743127011
l[408] = −0.0726366100
l[409] = −0.0709637041
l[410] = −0.0692946285
l[411] = −0.0676300282
l[412] = −0.0659705481
l[413] = −0.0643168332
l[414] = −0.0626695282
l[415] = −0.0610292783
l[416] = −0.0593967286
l[417] = −0.0577725242
l[418] = −0.0561573102
l[419] = −0.0545517317
l[420] = −0.0529564335
l[421] = −0.0513720606
l[422] = −0.0497992578
l[423] = −0.0482386703
l[424] = −0.0466909433
l[425] = −0.0451567219
l[426] = −0.0436366511
l[427] = −0.0421313759
l[428] = −0.0406415411
l[429] = −0.0391677918
l[430] = −0.0377107729
l[431] = −0.0362711296
l[432] = −0.0348495068
l[433] = −0.0334465498
l[434] = −0.0320629035
l[435] = −0.0306992128
l[436] = −0.0293561228
l[437] = −0.0280342785
l[438] = −0.0267343248
l[439] = −0.0254569069
l[440] = −0.0242026698
l[441] = −0.0229722584
l[442] = −0.0217663179
l[443] = −0.0205854931
l[444] = −0.0194304291
l[445] = −0.0183017708
l[446] = −0.0172001635
l[447] = −0.0161262520
l[448] = −0.0150806814
l[449] = −0.0140640969

TABLE 12-continued

| (lifting coefficients l(n); M = 480) |
|---|
| l[450] = −0.0130771434 |
| l[451] = −0.0121204660 |
| l[452] = −0.0111947097 |
| l[453] = −0.0103005195 |
| l[454] = −0.0094385404 |
| l[455] = −0.0086094172 |
| l[456] = −0.0078137951 |
| l[457] = −0.0070523191 |
| l[458] = −0.0063256342 |
| l[459] = −0.0056343854 |
| l[460] = −0.0049792179 |
| l[461] = −0.0043607767 |
| l[462] = −0.0037797066 |
| l[463] = −0.0032366528 |
| l[464] = −0.0027322602 |
| l[465] = −0.0022671739 |
| l[466] = −0.0018420390 |
| l[467] = −0.0014575004 |
| l[468] = −0.0011142031 |
| l[469] = −0.0008127923 |
| l[470] = −0.0005539128 |
| l[471] = −0.0003382098 |
| l[472] = −0.0001663282 |
| l[473] = −0.0000389130 |
| l[474] = 0.0000433906 |
| l[475] = 0.0000799378 |
| l[476] = 0.0000700834 |
| l[477] = 0.0000131825 |
| l[478] = −0.0000914101 |
| l[479] = −0.0002443392 |

The invention claimed is:

[1. Analysis filterbank for filtering a plurality of time-domain input frames of an audio signal, an input frame comprising a number of ordered input samples, comprising:

a windower configured to generate a plurality of windowed frames, a windowed frame comprising a plurality of windowed samples, wherein the windower is configured to process the plurality of input frames in an overlapping manner using a sample advance value, wherein the sample advance value is less than the number of ordered input samples of an input frame divided by 2; and a time/frequency converter configured to provide an output frame comprising a number of output values, an output frame being a spectral representation of a windowed frame, wherein the windower or the time/frequency converter comprises a hardware implementation.]

[2. Analysis filterbank according to claim 1, wherein the windower is configured to consecutively generate two windowed frames based on two input frames, which comprise more than half the number of the same ordered input samples.]

[3. Analysis filterbank according to claim 2, wherein the windower is configured to generate the plurality of windowed frames such that the same ordered input samples of the two input frames, on which the two consecutively generated windowed frames are based, are shifted with respect to the order of the input samples of the input frame by the sample advance value.]

[4. Analysis filterbank according to claim 1, wherein the windower is configured to disregard at least a latest input sample according to the order of the ordered input samples or to setting at least a latest windowed sample corresponding to the order of input samples to a predetermined value or to at least a value in a predetermined range.]

[5. Analysis filterbank according to claim 4, wherein the windower is configured to generate the plurality of windowed frames such that a later input frame of the two input frames with respect to time, on which the two consecutively generated windowed frames are based, comprise at least one fresh input sample as the latest input sample and with respect to time the same input samples of the earlier input frame of the two input frames earlier with respect to the order of the input samples.]

[6. Analysis filter bank according to claim 1, wherein the windower is configured to disregard or set a plurality of input samples to the predetermined value or to at least a value in the predetermined range, wherein the plurality of input samples comprises a connected subset of input samples comprising the latest input sample according to the order of the ordered input samples.]

[7. Analysis filterbank according to claim 1, wherein the windower is configured to generate a windowed frame based on an input frame and a weighing function by weighing at least an input sample based on the weighing function.]

[8. Analysis filterbank according to claim 1, wherein the windower is configured to generate a windowed frame based on an input frame by weighing at least a plurality of input samples of the input frame with a window function.]

[9. Analysis filterbank according to claim 8, wherein the windower is configured such that weighing the input frame comprises multiplying at least a plurality of input samples of the input frame with an input sample-specific windowing coefficient of the window function.]

[10. Analysis filterbank according to claim 8, wherein the windower is configured such that weighing the input frame comprises multiplying each input sample of the input frame with an input sample-specific windowing coefficient of the window function.]

[11. Analysis filterbank according to claim 1, wherein the windower is configured to generate a windowed sample $z_{i,n}$ based on an expression $z_{i,n}=w(N-1-n)\cdot x'_{i,n}$, wherein i is an integer indicating a frame index or a block index of a windowed frame and/or of an input frame, wherein n=−N, . . . , N−1 is an integer indicating a sample index, wherein N is an integer indicating twice the number of the output values of an output frame, wherein w(N−1−n) is the window function and wherein $x'_{i,n}$ is an input sample with a sample index n and the frame index i.]

[12. Analysis filterbank according to claim 1, wherein the windower is configured to generate a windowed sample $z_{i,n}$ based on an expression $$z_{i,n}=w(N-1-n)\cdot x'_{i,n},$$

wherein i is an integer indicating a frame index or a block index of a windowed frame and/or of an input frame, wherein n=−N, . . . , 7N/8−1 is an integer indicating a sample index, wherein N is an integer indicating twice the number of the output values of an output frame, wherein w(N−1−n) is the window function and wherein $x'_{i,n}$ is an input sample with a sample index n and the frame index i.]

[13. Analysis filterbank according to claim 11, wherein the windower is configured such that N is equal to 960 and the window coefficients w(0) to w(2N−1) obey the relations given in table 1 in the annex.]

[14. Analysis filterbank according to claim 13, wherein the windower is configured such that the window coefficients w(0) to w(2N−1) comprise the values given in table 2 in the annex.]

[15. Analysis filterbank according to claim 11, wherein the windower is configured such that N is equal to 1024 and the window coefficients w(0) to w(2N−1) obey the relations given in table 3 in the annex.]

[16. Analysis filterbank according to claim 15, wherein the windower is configured such that the window coefficients w(0) to w(2N−1) comprise the values as given in table 4 in the annex.]

[17. Analysis filterbank according to claim 8, wherein the windower is configured such that the window function attributes real-valued window coefficients to a definition set.]

[18. Analysis filterbank according to claim 17, wherein the windower is configured such that the definition set comprises at least a number of elements being greater than or equal to the difference between the number of the ordered input samples of an input frame and the number of input samples to be disregarded or the number of windowed samples of a windowed frame set to the predetermined value or set to at least a value in the predetermined range by the windower or greater than or equal to the number of ordered input samples.]

[19. Analysis filterbank according to claim 8, wherein the windower is configured such that the window function is asymmetric over the definition set with respect to a midpoint of the definition set.]

[20. Analysis filterbank according to claim 19, wherein the windower is configured such that the window function comprises more window coefficients with an absolute value of more than 10% of a maximum absolute value of the window coefficients of the window function in a first half of the definition set than in a second half of the definition set with respect to the midpoint of the definition set, wherein the first half corresponds to the latest half of the input samples.]

[21. Analysis filterbank according to claim 1, wherein the sample advance value is greater than twice the number of output values of an output frame.]

[22. Analysis filterbank according to claim 1, wherein the windower is configured such that the predetermined value is 0.]

[23. Analysis filterbank according to claim 1, wherein the windower is configured to set a windowed sample to a value in the predetermined range by setting the corresponding windowed sample to a value comprising an absolute value less than a minimum threshold and/or to a value comprising an absolute value more than a maximum threshold.]

[24. Analysis filterbank according to claim 23, wherein the minimum threshold and/or the maximum threshold is given by $10^s$ or $2^s$, wherein s is an integer.]

[25. Analysis filterbank according to claim 23, wherein the minimum threshold is determined by an absolute maximum value representable by a least significant bit or a plurality of least significant bits and/or a maximum threshold is determined by an absolute minimum value representable by a most significant bit or a plurality of most significant bits in the case of a binary representation of the input samples and/or the windowed samples.]

[26. Analysis filterbank according to claim 1, wherein the windower is configured such that the number of input samples disregarded, the number of windowed samples set to the predetermined value or to at least a value in the predetermined range is greater than or equal to the number of output values of an output frame divided by 16.]

[27. Analysis filterbank according to claim 1, wherein the windower is configured to disregard or setting to the predetermined value or to a value in the predetermined range 128 or 120 windowed samples.]

[28. Analysis filterbank according to claim 1, wherein the time/frequency converter is configured to provide output frames comprising less than half the number of output values compared to the number of input samples of an input frame.]

[29. Analysis filterbank according to claim 1, wherein time/frequency converter is configured to provide output frames comprising a number of output values, which is equal to a number of input samples of an input frame divided by an integer number greater than 2.]

[30. Analysis filterbank according to claim 1, wherein the time/frequency converter is configured to provide an output frame comprising a number of output values, which is equal to the number of input samples of an input frame divided by 4.]

[31. Analysis filterbank according to claim 1, wherein the time/frequency converter is based on at least one of a discrete cosine transform and a discrete sine transform.]

[32. Analysis filterbank according to claim 1, wherein the time/frequency converter is configured to provide output values $X_{i,k}$ based on an expression $$X_{i,k} = -2 \cdot \sum_{n=-N}^{N-1} z_{i,n} \cdot \cos\left(\frac{2\pi}{N}(n + n_0) \cdot \left(k + \frac{1}{2}\right)\right)$$

for $0 \le k < N/2$, wherein i is an integer indicating a block index or a frame index, wherein k is an integer indicating a spectral coefficient index, wherein n is a sample index, wherein N is an integer indicating twice the number of output values of an output frame, wherein $$n_0 = \frac{-\frac{N}{2} + 1}{2}$$

is an offset value, and wherein $z_{i,n}$ is a windowed sample corresponding to the spectral coefficient k and the frame index i.]

[33. Analysis filterbank according to claim 32, wherein the time/frequency converter is configured such that N is equal to 960 or 1024.]

[34. Synthesis filterbank for filtering a plurality of input frames of an audio signal, each input frame comprising a number of ordered input values, comprising:

a frequency/time converter configured to provide a plurality of output frames, an output frame comprising a number of ordered output samples, an output frame being a time representation of an input frame;

a windower configured to generate a plurality of windowed frames, a windowed frame comprising a plurality of windowed samples; and wherein the windower is configured to provide the plurality of windowed samples for a processing in an overlapping manner based on a sample advance value;

an overlap/adder configured to provide an added frame comprising a start section and a remainder section, an added frame comprising a plurality of added samples by adding at least three windowed samples from at least three windowed frames for an added sample in the remainder section of an added frame and by adding at least two windowed samples from at least two different windowed frames for an added sample in the start section, wherein the number of windowed samples added to obtain an added sample in the remainder section is at least one sample higher compared to the number of windowed samples added to obtain an added sample in the start section, or wherein the windower is configured to disregard at least the earliest output value according to the order of the ordered output samples or to setting the corresponding windowed samples to a predetermined value or to at least a value in a predetermined range for each windowed frame of the plurality of windowed frames; and wherein the overlap/adder is configured to provide the added sample in the remainder section of an added frame based on at least three windowed samples from at least three different windowed frames and an added sample in the start section based on at least two windowed samples from at least two different windowed frames, wherein the frequency/time converter, the windower, or the overlap/adder comprises a hardware implementation.]

[35. Synthesis filterbank according to claim 34, wherein the overlap/adder is configured such that an added sample in the remainder section of an added frame corresponds to output samples which are not disregarded, windowed samples set to the predetermined value or set to a value in the predetermined range by the windower, and wherein an added sample in the start section of an added frame corresponds to an output sample which is disregarded or to a windowed sample set to the predetermined value or set to a value in the predetermined range by the windower.]

[36. Synthesis filterbank according to claim 34, wherein the frequency/time converter is configured to provide output frames comprising more than twice the number of output samples compared to the number of input values of an input frame.]

[37. Synthesis filterbank according to claim 34, wherein the frequency/time converter is configured to provide output frames comprising a number of output samples, which is equal to a number of input values of an input frame multiplied by an integer number greater than 2.]

[38. Synthesis filterbank according to claim 34, wherein the frequency/time converter is configured to provide an output frame comprising a number of output samples, which is equal to the number of input values of an input frame multiplied by 4.]

[39. Synthesis filterbank according to claim 34, wherein the frequency/time converter is based on at least one of a discrete cosine transform and a discrete sine transform.]

[40. Synthesis filterbank according to claim 34, wherein the frequency/time converter is configured to provide output samples $x_{i,n}$ based on an expression $$x_{i,n} = -\frac{2}{N}\sum_{k=0}^{\frac{N}{2}-1} \mathrm{spec}[i][k]\cdot\cos\left(\frac{2\pi}{N}(n+n_0)\left(k+\frac{1}{2}\right)\right)$$

for $0 \le n < 2N$, wherein i is an integer indicating a window index, block index or frame index, wherein n is an integer indicating a sample index, wherein k is an integer indicating a spectral coefficient index, wherein N is an integer indicating half the number of output samples of an output frame, wherein $$n_0 = \frac{-\frac{N}{2}+1}{2}$$

is an offset value, and wherein spec[i][k] is an input value corresponding to the spectral coefficient index k and the window index i.]

[41. Synthesis filterbank according to claim 40, wherein the frequency/time converter is configured such that N is equal to 960 or 1024.]

[42. Synthesis filterbank according to claim 34, wherein the windower is configured to disregard a plurality of output samples of an output frame or setting a plurality of windowed samples to the predetermined value or to at least a value in the predetermined range.]

[43. Synthesis filterbank according to claim 42, wherein the windower is configured such that plurality of disregarded output samples comprises a connected subset of output samples comprising the earliest output sample according to the order of the ordered output samples, or wherein the plurality of windowed samples, which are set to the predetermined value or to at least a value in the predetermined range, comprises a connected subset of windowed samples comprising at least a windowed sample corresponding to the earliest output sample.]

[44. Synthesis filterbank according to claim 34, wherein the windower is configured to generate a windowed frame based on an output frame and a weighing function by weighing at least an output sample of the output frame based on the weighing function.]

[45. Synthesis filterbank according to claim 34, wherein the windower is configured to generate a windowed frame based on an output frame by multiplying an output sample of the output frame with a value based on a window function.]

[46. Synthesis filterbank according to claim 34, wherein the windower is configured to multiply at least a plurality of output samples of the output frame with an output sample-specific windowing coefficient of a window function.]

[47. Synthesis filterbank according to claim 46, wherein the windower is configured to multiply each output sample of the output frame with an output sample-specific windowing coefficient of the window function.]

[48. Synthesis filterbank according to claim 34, wherein the windower is configured to generate a windowed sample $z_{i,n}$ based on an expression $$z_{i,n}=w(n)\cdot x_{i,n},$$

wherein i is an integer indicating a frame index or a block index of a windowed frame and/or of an output frame, wherein n=0, . . . , 2N−1 is an integer indicating a sample index, wherein N is an integer indicating twice the number of the input values of an input frame and/or half the number of output sample of an output frame and/or of the windowed samples of a windowed frame, wherein w(n) is the window function and wherein $x_{i,n}$ is an output sample with a sample index n and the frame index i.]

[49. Synthesis filterbank according to claim 34, wherein the windower is configured to generate a windowed sample $z_{i,n}$ based on an expression $$z_{i,n}=w(n)\cdot x_{i,n},$$

wherein i is an integer indicating a frame index or a block index of a windowed frame and/or of an output frame, wherein n=N/8, . . . , 2N−1 is an integer indicating a sample index, wherein N is an integer indicating twice the number of the input values of an input frame and/or half the number of output samples of an output frame and/or of the windowed samples of a windowed frame, wherein w(n) is the window function and wherein $x_{i,n}$ is an output sample with a sample index n and the frame index i.]

[50. Synthesis filterbank according to claim 48, wherein the windower is configured such that N is equal to 960 and the window coefficients w(0) to w(2N−1) obey the relations given in table 1 in the annex.]

[51. Synthesis filterbank according to claim 50, wherein the windower is configured such that the window coefficients w(0) to w(2N−1) comprise the values given in table 2 in the annex.]

[52. Synthesis filterbank according to claim 48, wherein the windower is configured such that N is equal to 1024 and the window coefficients w(0) to w(2N−1) obey the relations given in table 3 in the annex.]

[53. Synthesis filterbank according to claim 52, wherein the windower is configured such that the window coefficients w(0) to w(2N−1) comprise the values given in table 4 of the annex.]

[54. Synthesis filterbank according to claim 45, wherein the windower is configured such that the window function attributes real-valued window coefficients to elements of a definition set.]

[55. Synthesis filterbank according to claim 45, wherein the windower is configured such that the window function is asymmetric over the definition set with respect to a midpoint of a definition set.]

[56. Synthesis filterbank according to claim 55, wherein the windower is configured such that the window function comprises more window coefficients with an absolute value of 10% of a maximum absolute value of the window coefficients of the window function in a first half of the definition set than in the second half of the definition set with respect to the midpoint of the definition set wherein the first half corresponds to the earlier half of the output values.]

[57. Synthesis filterbank according to claim 45, wherein the windower is configured such that the window function is based on, mirrored variant of or identical with a window function based on which the input frames are generated for the synthesis filterbank.]

[58. Synthesis filterbank according to claim 45, wherein the windower is configured such that the window function is a mirrored window function with respect to a midpoint of the definition set of the window function compared to a window function based on which the input frames are generated for the synthesis filterbank.]

[59. Synthesis filterbank according to claim 34, wherein the windower is configured such that the predetermined value is 0.]

[60. Synthesis filterbank according to claim 34, wherein the windower is configured to set a windowed sample to a value in the predetermined range by at least one of setting the corresponding windowed sample to a value comprising an absolute value less than a minimum threshold and setting the corresponding windowed sample to a value comprising an absolute value more than a maximum threshold.]

[61. Synthesis filterbank according to claim 60, wherein the minimum threshold or the maximum threshold is given by $10^s$ or $2^s$, wherein s is an integer.]

[62. Synthesis filterbank according to claim 60, wherein the minimum threshold is determined by a maximum absolute value representable by a least significant bit or a plurality of a least significant bits or the maximum threshold is determined by a minimum absolute value representable by a most significant bit or a plurality of most significant bits in the case of a binary representation of at least one of the input values, the output samples and the windowed samples.]

[63. Synthesis filterbank according to claim 34, wherein the windower is configured such that the number of output samples disregarded or the number of windowed samples set to the predetermined value or to at least a value in the predetermined range is greater than or equal to the number of output samples of an output frame divided by 64.]

[64. Synthesis filterbank according to claim 34, wherein the windower is configured such that the number of output values disregarded or the number of windowed samples set to the predetermined value or to at least a value in the predetermined range is greater than or equal to the number of added samples of an added frame divided by 16.]

[65. Synthesis filterbank according to claim 34, wherein the windower is configured to disregard 128 or 120 or setting to the predetermined value or to at least a value in the predetermined range 128 or 120 windowed samples.]

[66. Synthesis filterbank according to claim 34, wherein the overlap/adder is configured to generate the added frame based on at least three consecutively generated windowed frames by the windower.]

[67. Synthesis filterbank according to claim 34, wherein the overlap/adder is configured to generate the added frame based on at least three consecutively generated output frames by the frequency/time converter.]

[68. Synthesis filterbank according to claim 34, wherein the overlap/adder is configured to generate the added frame comprising a number of added samples which is equal to the sample advance value.]

[69. Synthesis filterbank according to claim 34, wherein the overlap/adder is configured to provide an added frame comprising a plurality of added samples based on at least 4 windowed samples from at least 4 different windowed frames for an added sample corresponding to a windowed sample, which is not based on a disregarded output sample, set to the predetermined value and to a value in the predetermined range by the windower, and based on at least 3 windowed samples from at least 3 different windowed frames for an added sample corresponding to an output sample which is disregarded or set to the predetermined value or to a value in the predetermined range by the windower.]

[70. Synthesis filterbank according to claim 34, wherein the overlap/adder is configured to provide added frames comprising a number of added samples, which is less than the number of output values of an output frame divided by 2.]

[71. Synthesis filterbank according to claim 34, wherein the overlap/adder is configured to provide added frames comprising a number of added samples, which is equal to the number of output samples of an output frame divided by an integer larger than 2.]

[72. Synthesis filterbank according to claim 34, wherein the overlap/adder is configured to provide added frames comprising a number of added samples, which is equal to the number of output samples of an output frame divided by 4.]

[73. Synthesis filterbank according to claim 34, wherein the overlap/adder is configured to provide an added sample $out_{i,n}$ based on an expression $$out_{i,n} = z_{i,n} + z_{i-1,n+\frac{N}{2}} + z_{i-2,n+N} + z_{i-3,n+N+\frac{N}{2}}$$

$$\text{for } 0 \le n < N/2,$$

wherein i is an integer indicating a frame index or a block index of a windowed frame and/or of an added frame, wherein n is an integer indicating a sample index, wherein N is an integer indicating half the number of the output samples of an output frame and/or of the windowed samples of the windowed frame, wherein $z_{i,n}$ is the windowed sample corresponding to a sample index n and the frame index i.]

[74. Synthesis filterbank for filtering a plurality of input frames of an audio signal, each input frame comprising M ordered input values $y_k(0), \ldots, y_k(M-1)$, wherein M is a positive integer, and wherein k is an integer indicating a frame index, comprising:

an inverse type-IV discrete cosine transform frequency/time converter configured to provide a plurality of output frames, an output frame comprising 2M ordered output samples $x_k(0), \ldots, x_k(2M-1)$ based on the input values $y_k(0), \ldots, y_k(M-1)$;

a windower configured to generate a plurality of windowed frames, a windowed frame comprising a plurality of windowed samples $z_k(0), \ldots, z_k(2M-1)$ based on the equation $$z_k(n)=w(n)\cdot x_k(n)$$

$$\text{for } n=0, \ldots, 2M-1,$$

wherein n is an integer indicating a sample index, and wherein w(n) is a real-valued window function coefficient corresponding to the sample index n;

an overlap/adder configured to provide an intermediate frame comprising a plurality of intermediate samples $m_k(0), \ldots, m_k(M-1)$ based on the equation $$m_k(n)=z_k(n)+z_{k-1}(n+M)$$

$$\text{for } n=0, \ldots, M-1;$$

and a lifter configured to provide an added frame comprising a plurality of added samples $out_k(0), \ldots, out_k(M-1)$ based on the equation $$out_k(n)=m_k(n)+l(n-M/2)\cdot m_{k-1}(M-1-n)$$

$$\text{for } n=M/2, \ldots, M-1$$

and $$out_k(n)=m_k(n)+l(M-1-n)\cdot out_{k-1}(M-1-n)$$

$$\text{for } n=0, \ldots, M/2-1,$$

wherein $l(0), \ldots, l(M-1)$ are real-valued lifting coefficients, wherein inverse type-IV discrete cosine transform frequency/time converter, the windower, the overlap/adder, or the lifter comprises a hardware implementation.]

[75. Synthesis filterbank according to claim 74, wherein the windower is configured such that M is equal to 512 and the window coefficients $w(0), \ldots, w(2M-1)$ obey the relations given in table 5 in the annex, and wherein the lifter is configured such that the lifting coefficients $l(0), \ldots, l(M-1)$ obey the relations given in table 6 in the annex.]

[76. Synthesis filterbank according to claim 75, wherein the windower is configured such the window coefficients $w(0), \ldots, w(2M-1)$ comprise the values given in table 7 of the annex, and wherein the lifter is configured such that the lifting coefficients $l(0), \ldots, l(2M-1)$ comprise the values given in table 8.]

[77. Synthesis filterbank according to claim 74, wherein the windower is configured such that M is equal to 480 and the window coefficients $w(0), \ldots, w(2M-1)$ obey the relations given in table 9 in the annex, and wherein the lifter is configured such that the lifting coefficients $l(0), \ldots, l(M-1)$ obey the relations given in table 10 in the annex.]

[78. Synthesis filterbank according to claim 77, wherein the windower is configured such the window coefficients $w(0), \ldots, w(2M-1)$ comprise the values given in table 11 of the annex, and where in the lifter is configured such that the lifting coefficients $l(0), \ldots, l(2M-1)$ comprise the values given in table 12.]

[79. Encoder comprising:

an analysis filterbank for filtering a plurality of time-domain input frames, an input frame comprising a number of ordered input samples, comprising:

a windower configured to generate a plurality of windowed frames, a windowed frame comprising a plurality of windowed samples, wherein the windower is configured to process the plurality of input frames in an overlapping manner using a sample advance value, wherein the sample advance value is less than the number of ordered input samples of an input frame divided by 2; and a time/frequency converter configured to provide an output frame comprising a number of output values, an output frame being a spectral representation of a windowed frame, wherein the windower or the time/frequency converter comprises a hardware implementation.]

[80. Encoder according to claim 79, further comprising an entropy encoder, configured to encode the plurality of output frames provided by the analysis filterbank and configured to output a plurality of encoded frames based on the output frames.]

[81. Audio decoder comprising:

a synthesis filterbank for filtering a plurality of input frames, each input frame comprising a number of ordered input values, comprising:

a frequency/time converter configured to provide a plurality of output frames, an output frame comprising a number of ordered output samples, an output frame being a time representation of an input frame;

a windower configured to generate a plurality of windowed frames, a windowed frame comprising a plurality of windowed samples; and wherein the windower is configured to provide the plurality of windowed samples for a processing in an overlapping manner based on a sample advance value;

an overlap/adder configured to provide an added frame comprising a start section and a remainder section, an added frame comprising a plurality of added samples by adding at least three windowed samples from at least three windowed frames for an added sample in the remainder section of an added frame and by adding at least two windowed samples from at least two different windowed frames for an added sample in the start section, wherein the number of windowed samples added to obtain an added sample in the remainder section is at least one sample higher compared to the number of windowed samples added to obtain an added sample in the start section, or wherein the windower is configured to disregard at least the earliest output value according to the order of the ordered output samples or to setting the corresponding windowed samples to a predetermined value or to at least a value in a predetermined range for each windowed frame of the plurality of windowed frames; and wherein the overlap/adder is configured to provide the added sample in the remainder section of an added frame based on at least three windowed samples from at least three different windowed frames and an added sample in the start section based on at least two windowed samples from at least two different windowed frames, wherein the frequency/time converter, the windower, or the overlap/adder comprises a hardware implementation.]

[82. Audio decoder according to claim 81, further comprising an entropy decoder configured to decode a plurality of encoded frames and configured to provide a plurality of input frames based on the encoded frames to the synthesis filterbank.]

[83. Audio decoder comprising:

a synthesis filterbank for filtering a plurality of input frames, each input frame comprising M ordered input values $y_k(0), \ldots, y_k(M-1)$, wherein M is a positive integer, and wherein k is an integer indicating a frame index, comprising:

an inverse type-IV discrete cosine transform frequency/time converter configured to provide a plurality of output frames, an output frame comprising 2M ordered output samples $x_k(0), \ldots, x_k(2M-1)$ based on the input values $y_k(0), \ldots, y_k(M-1)$;

a windower configured to generate a plurality of windowed frames, a windowed frame comprising a plurality of windowed samples $z_k(0), \ldots, z_k(2M-1)$ based on the equation $$z_k(n)=w(n)\cdot x_k(n)$$

$$\text{for } n=0, \ldots, 2M-1,$$

wherein n is an integer indicating a sample index, and wherein w(n) is a real-valued window function coefficient corresponding to the sample index n;

an overlap/adder configured to provide an intermediate frame comprising a plurality of intermediate samples $m_k(0), \ldots, m_k(M-1)$ based on the equation $$m_k(n)=z_k(n)+z_{k-1}(n+M)$$

$$\text{for } n=0, \ldots, M-1;$$

and a lifter configured to provide an added frame comprising a plurality of added samples $out_k(0), \ldots, out_k(M-1)$ based on the equation $$out_k(n)=m_k(n)+l(n-M/2)\cdot m_{k-1}(M-1-n)$$

$$\text{for } n=M/2, \ldots, M-1$$

and $$out_k(n)=m_k(n)+l(M-1-n)\cdot out_{k-1}(M-1-n)$$

$$\text{for } n=0, \ldots, M/2-1,$$

wherein $l(0), \ldots, l(M-1)$ are real-valued lifting coefficients, wherein inverse type-IV discrete cosine transform frequency/time converter, the windower, the overlap/adder, or the lifter comprises a hardware implementation.]

[84. Audio decoder according to claim 83, further comprising an entropy decoder configured to decode a plurality of encoded frames and configured to provide a plurality of input frames based on the encoded frames to the synthesis filterbank.]

85. Mixer for mixing a plurality of input frames, each input frame being a spectral representation of a corresponding time-domain frame and each input frame of the plurality of input frames being provided from a different audio source, comprising:

an entropy decoder configured to entropy decode the plurality of input frames;

a scaler configured to scale the plurality of entropy decoded input frames in the frequency domain and configured to obtain a plurality of scaled frames in the frequency domain, each scaled frame corresponding to an entropy decoded input frame;

an adder configured to add up the scaled frames in the frequency domain to generate an added frame in the frequency domain; and an entropy encoder configured to entropy encoding the added frame to obtain a mixed frame, wherein the entropy decoder, the scaler, the adder, or the entropy encoder comprises a hardware implementation.

86. Mixer according to claim 85, further comprising a dequantizer configured to dequantize the entropy decoded input frames and to provide the entropy decoded input frames to the scaler in a dequantized form.

87. Mixer according to claim 85, further comprising a quantizer configured to quantize the added frame and to provide the added frame in a quantized form to the entropy encoder.

88. Mixer according to claim 85, wherein the scaler is configured to scale the dequantized input frames by multiplying each input value of the plurality of input frames by 1/P, wherein P is an integer indicating a number of different sources.

89. Mixer according to claim 85, wherein the scaler is configured to scale the entropy decoded input frames by scaling the input values of the input frames in an energy-conserving manner.

90. Mixer according to claim 85, wherein the mixer is configured to provide the mixed frame based on the plurality of input frames, wherein each input frame of the plurality of input frames is generated based on the same synthesis window function.

91. Mixer according to claim 85, wherein the mixer is configured to generate the mixed frame based on the plurality of input frames, wherein each of the input frames of the plurality of input frames is generated by an encoder comprising an analysis filterbank for filtering a plurality of time-domain input frames, an input frame comprising a number of ordered input samples, comprising a windower configured to generate a plurality of windowed frames, a windowed frame comprising a plurality of windowed samples, wherein the windower is configured to process the plurality of input frames in an overlapping manner using a sample advance value, wherein the sample advance value is less than the number of ordered input samples of an input frame divided by 2; and a time/frequency converter configured to provide an output frame comprising a number of output values, an output frame being a spectral representation of a windowed frame.

92. Mixer according to claim 85, wherein the mixer is configured to process the plurality of input frames and to provide the mixed frame based corresponding to a bitrate of less than 36 kbit/s per channel.

93. Conferencing system comprising:

a mixer for mixing a plurality of input frames, each input frame being a spectral representation of a corresponding time-domain frame and each input frame of the plurality of input frames being provided from an audio different source, comprising:

an entropy decoder configured to entropy decode the plurality of input frames;

a scaler configured to scale the plurality of entropy decoded input frames in the frequency domain and configured to obtain a plurality of scaled frames in the frequency domain, each scaled frame corresponding to an entropy decoded input frame;

an adder configured to add up the scaled frames in the frequency domain to generate an added frame in the frequency domain; and an entropy encoder configured to entropy encoding the added frame to obtain a mixed frame, wherein the entropy decoder, the scaler, the adder, or the entropy encoder comprises a hardware implementation.

[94. Method for filtering a plurality of time domain input frames of an audio signal, an input frame comprising a number of ordered input samples, the method comprising:

generating, performed by a windower, a plurality of windowed frames by processing the plurality of input frames in an overlapping manner using a sample advance value;

wherein the sample advance value is less than the number of ordered input samples of an input frame divided by 2; and providing, performed by a time/frequency converter, a plurality of output frames comprising a number of output values by performing a time/frequency conversion, an output frame being a spectral representation of a windowed frame, wherein the windower or the time/frequency converter comprises a hardware implementation.]

[95. Method for filtering a plurality of input frames of an audio signal, each input frame comprising a number of ordered input values, the method comprising:

performing, performed by a frequency/time converter, a frequency/time conversion and providing a plurality of output frames, an output frame comprising a number of ordered output samples, an output frame being a time representation of an input frame;

generating, performed by a windower, a plurality of windowed frames, a windowed frame comprising a plurality of windowed samples by processing the plurality of output samples for processing the windowed frames in an overlapping manner based on a sample advanced value;

generating, performed by an overlap/adder, an added frame comprising a start section and a remainder section, wherein a added frame comprises an added sample by adding at least three windowed samples from at least three different windowed frames for an added sample in the remainder section of an added frame and an added sample by adding at least two windowed samples from at least two different windowed frames for an added sample in the start section, wherein the number of windowed samples added to obtain an added sample is in the remainder section at least one sample higher compared to the number of windowed samples added to obtain an added sample in the start section;

or wherein generating the plurality of windowed frames comprises disregarding at least the earliest output sample according to the order of the ordered output sample or to setting the corresponding windowed sample to a predetermined value to at least a value in a predetermined range for each windowed frame of the plurality of windowed frames; and wherein providing an added frame comprises providing an added sample by adding at least three windowed samples from at least three different windowed frames for an added sample in the remainder section of an added frame and an added sample by adding at least two windowed samples from at least two different windowed frames for an added sample in the start section, wherein the frequency/time converter, the windower, or the overlap/adder comprises a hardware implementation.]

[96. Method for filtering a plurality of input frames of an audio signal, each input frame comprising M ordered input values $y_k(0), \ldots, y_k(M-1)$, wherein M is a positive integer, and wherein k is an integer indicating an index of the input frame, the method comprising:

performing, performed by an inverse type-IV discrete cosine transform/time converter, an inverse type-IV discrete cosine transform and providing a plurality of output frames $x_k(0), \ldots, x_k(2M-1)$ based on the input values $y_k(0), \ldots, y_k(M-1)$;

generating, performed by a windower, a plurality of windowed frames, a windowed frame comprising a plurality of windowed samples $z_k(0), \ldots, z_k(2M-1)$ based on an equation $$z_k(n)=w(n)\cdot x_k(n)$$

$$\text{for } n=0, \ldots, 2M-1,$$

wherein n is an integer;

generating, performed by an overlap/adder, a plurality of intermediate frames, each intermediate frame comprising a plurality of intermediate samples mk(0), . . . , mk(M−1) based on the equation $$m_k(n)=z_k(n)+z_{k-1}(n+M)$$

$$\text{for } n=0, \ldots, M-1;$$

and generating, performed by a lifter, a plurality of added frames comprising a plurality of added samples $out_k(0), \ldots, out_k(M)$ based on an equation $$out_k(n)=m_k(n)+l(n-M/2)\cdot m_{k-1}(M-1-n)$$

$$\text{for } n=M/2, \ldots, M-1$$

and $$out_k(n)=m_k(n)+l(M-1-n)\cdot out_{k-1}(M-1-n)$$

$$\text{for } n=0, \ldots, M/2-1,$$

wherein $w(0), \ldots, w(2M-1)$ are real-valued window coefficients;

wherein $l(0), \ldots, l(M-1)$ are real-valued lifting coefficients; and wherein inverse type-IV discrete cosine transform frequency/time converter, the windower, the overlap/adder, or the lifter comprises a hardware implementation.]

[97. Non-transitory computer-readable medium having stored thereon a computer program for performing, when running on a computer, a method for filtering a plurality of time domain input frames of an audio signal, an input frame comprising a number of ordered input samples, comprising:

generating a plurality of windowed frames by processing the plurality of input frames in an overlapping manner using a sample advance value;

wherein the sample advance value is less than the number of ordered input samples of an input frame divided by 2; and providing a plurality of output frames comprising a number of output values by performing a time/frequency conversion, an output frame being a spectral representation of a windowed frame.]

[98. Non-transitory computer-readable medium having stored thereon a computer program for performing, when running on a computer, a method for filtering a plurality of input frames of an audio signal, each input frame comprising a number of ordered input values, comprising:

performing a frequency/time conversion and providing a plurality of output frames, an output frame comprising a number of ordered output samples, an output frame being a time representation of an input frame;

generating a plurality of windowed frames, a windowed frame comprising a plurality of windowed samples by processing the plurality of output samples for processing the windowed frames in an overlapping manner based on a sample advanced value;

generating an added frame comprising a start section and a remainder section, wherein a added frame comprises an added sample by adding at least three windowed samples from at least three different windowed frames for an added sample in the remainder section of an added frame and an added sample by adding at least two windowed samples from at least two different windowed frames for an added sample in the start section, wherein the number of windowed samples added to obtain an added sample is in the remainder section at least one sample higher compared to the number of windowed samples added to obtain an added sample in the start section;

or wherein generating the plurality of windowed frames comprises disregarding at least the earliest output sample according to the order of the ordered output sample or to setting the corresponding windowed sample to a predetermined value to at least a value in a predetermined range for each windowed frame of the plurality of windowed frames; and wherein providing an added frame comprises providing an added sample by adding at least three windowed samples from at least three different windowed frames for an added sample in the remainder section of an added frame and an added sample by adding at least two windowed samples from at least two different windowed frames for an added sample in the start section.]

[99. Non-transitory computer-readable medium having stored thereon a computer program for performing, when running on a computer, a method for filtering a plurality of input frames of an audio signal, each input frame comprising M ordered input values $y_k(0), \ldots, y_k(M-1)$, wherein M is a positive integer, and wherein k is an integer indicating an index of the input frame, comprising:

performing an inverse type-IV discrete cosine transform and providing a plurality of output frames $x_k(0), \ldots, x_k(2M-1)$ based on the input values $y_k(0), \ldots, y_k(M-1)$;

generating a plurality of windowed frames, a windowed frame comprising a plurality of windowed samples $z_k(0), \ldots, z_k(2M-1)$ based on an equation $$z_k(n)=w(n)\cdot x_k(n)$$

$$\text{for } n=0, \ldots, 2M-1,$$

wherein n is an integer;

generating a plurality of intermediate frames, each intermediate frame comprising a plurality of intermediate samples $m_k(0), \ldots, m_k(M-1)$ based on the equation $$m_k(n)=z_k(n)+z_{k-1}(n+M)$$

$$\text{for } n=0, \ldots, M-1;$$

and generating a plurality of added frames comprising a plurality of added samples $out_k(0), \ldots, out_k(M)$ based on an equation $$out_k(n)=m_k(n)+l(n-M/2)\cdot m_{k-1}(M-1-n)$$

$$\text{for } n=M/2, \ldots, M-1$$

and $$out_k(n)=m_k(n)+l(M-1-n)\cdot out_{k-1}(M-1-n)$$

$$\text{for } n=0, \ldots, M/2-1,$$

wherein $w(0), \ldots, w(2M-1)$ are real-valued window coefficients; and wherein $l(0), \ldots, l(M-1)$ are real-valued lifting coefficients.]

*100. Method for mixing a plurality of input frames, each input frame being a spectral representation of a corresponding time-domain frame and each input frame of the plurality of input frames being provided from a different audio source,*

*the method comprising:*

*entropy decoding, performed by an entropy decoder, the plurality of input frames;*

*scaling, performed by a scaler, the plurality of entropy decoded input frames in the frequency domain and configured to obtain a plurality of scaled frames in the frequency domain, each scaled frame corresponding to an entropy decoded input frame;*

*adding-up, performed by an adder, the scaled frames in the frequency domain to generate an added frame in the frequency domain; and*

*entropy encoding, performed by an entropy encoder, the added frame to obtain a mixed frame, wherein the entropy decoder, the scaler, the adder, or the entropy encoder comprises a hardware implementation.*

*101. Non-transitory computer-readable medium having stored thereon a computer program for performing, when running on a computer, a method for mixing a plurality of input frames, each input frame being a spectral representation of a corresponding time-domain frame and each input frame of the plurality of input frames being provided from a different audio source,*

*the method comprising:*

*entropy decoding the plurality of input frames;*

*scaling the plurality of entropy decoded input frames in the frequency domain and configured to obtain a plurality of scaled frames in the frequency domain, each scaled frame corresponding to an entropy decoded input frame;*

*adding-up the scaled frames in the frequency domain to generate an added frame in the frequency domain; and*

*entropy encoding, performed by an entropy encoder, the added frame to obtain a mixed frame.*

* * * * *